US010936072B2

(12) United States Patent
Nakamura et al.

(10) Patent No.: US 10,936,072 B2
(45) **Date of Patent: *Mar. 2, 2021**

(54) HAPTIC INFORMATION PRESENTATION SYSTEM AND METHOD

(71) Applicants: National Institute of Advanced Industrial Science and Technology, Tokyo (JP); MIRAISENS, Inc., Ibaraki (JP)

(72) Inventors: Norio Nakamura, Ibaraki (JP); Yukio Fukui, Ibaraki (JP); Masataka Sakai, Ibaraki (JP); Natsuo Koda, Ibaraki (JP); Koji Osaki, Ibaraki (JP)

(73) Assignees: NATIONAL INSTITUTE OF ADVANCED INDUSTRIAL SCIENCE AND TECHNOLOGY, Tokyo (JP); MIRAISENS, INC., Ibaraki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/511,760

(22) Filed: Jul. 15, 2019

(65) Prior Publication Data

US 2020/0012349 A1 Jan. 9, 2020

Related U.S. Application Data

(63) Continuation of application No. 15/285,083, filed on Oct. 4, 2016, now Pat. No. 10,416,767, which is a
(Continued)

(30) Foreign Application Priority Data

Nov. 20, 2003 (JP) ................................ 2003-390802
Dec. 2, 2003 (JP) ................................ 2003-402892
(Continued)

(51) Int. Cl.
*G06F 3/01* (2006.01)
*G06F 3/041* (2006.01)
(Continued)

(52) U.S. Cl.
CPC ........... *G06F 3/016* (2013.01); *A63F 13/285* (2014.09); *B06B 1/0611* (2013.01); *B06B 1/16* (2013.01);
(Continued)

(58) Field of Classification Search
CPC combination set(s) only.
See application file for complete search history.

(56) References Cited

U.S. PATENT DOCUMENTS 6,166,723 A * 12/2000 Schena ................. G05G 9/047 345/157
6,275,213 B1 8/2001 Tremblay et al.
(Continued)

FOREIGN PATENT DOCUMENTS

JP 9/221753 8/1997
JP 11-150794 6/1999
(Continued)

OTHER PUBLICATIONS

U.S. Appl. No. 10/579,672, filed Sep. 21, 2006.
(Continued)

*Primary Examiner* — Deeprose Subedi

(57) ABSTRACT

A haptic information presentation system uses a human sensory characteristic or illusion to suitably control a physical quantity, and causes a person to feel a force which cannot exist physically, or a haptic sensory physical characteristic.

16 Claims, 338 Drawing Sheets

Related U.S. Application Data continuation-in-part of application No. 14/840,423, filed on Aug. 31, 2015, now Pat. No. 9,495,804, which is a continuation of application No. 13/855,935, filed on Apr. 3, 2013, now Pat. No. 9,171,437, which is a continuation of application No. 12/710,813, filed on Feb. 23, 2010, now Pat. No. 9,041,520, which is a continuation of application No. 10/579,672, filed as application No. PCT/JP2004/017277 on Nov. 19, 2004, now abandoned.

(60) Provisional application No. 62/237,101, filed on Oct. 5, 2015.

(30) Foreign Application Priority Data

Nov. 15, 2004 (JP) ................................ 2004-331263
Oct. 5, 2015 (JP) ................................ 2015-208387

(51) Int. Cl.
*G08B 6/00* (2006.01)
*A63F 13/285* (2014.01)
*B06B 1/06* (2006.01)
*B06B 1/16* (2006.01)
*G10K 15/04* (2006.01)

(52) U.S. Cl.
CPC ............... *G06F 3/014* (2013.01); *G08B 6/00* (2013.01); *G10K 15/04* (2013.01); *G06F 2203/013* (2013.01)

(56) References Cited

U.S. PATENT DOCUMENTS

| | | | | |
|---|---|---|---|---|
| 6,448,977 | B1 | 9/2002 | Braun et al. | |
| 7,079,995 | B1 | 7/2006 | Buttafoco | |
| 7,084,884 | B1 | 8/2006 | Nelson et al. | |
| 7,148,875 | B2 * | 12/2006 | Rosenberg | G06F 3/03547 345/156 |
| 7,218,310 | B2 | 5/2007 | Tierling et al. | |
| 2002/0021277 | A1 * | 2/2002 | Kramer | G06F 3/016 345/156 |
| 2002/0030663 | A1 * | 3/2002 | Tierling | A63F 13/06 345/156 |
| 2002/0163497 | A1 * | 11/2002 | Cunningham | G06F 3/016 345/156 |
| 2006/0061545 | A1 * | 3/2006 | Hughes | G06F 3/016 345/156 |
| 2006/0197753 | A1 | 9/2006 | Hotelling | |

FOREIGN PATENT DOCUMENTS

| | | |
|---|---|---|
| JP | 2000-126459 | 5/2000 |
| JP | 2000-148393 | 5/2000 |
| JP | 2002-359888 | 12/2002 |
| JP | 2003-251277 | 9/2003 |
| WO | WO 95/20788 | 8/1995 |
| WO | WO 02/073385 | 9/2002 |

OTHER PUBLICATIONS

U.S. Appl. No. 12/710,813, filed Feb. 23, 2010, which is a continuation of U.S. Appl. No. 10/579,672, filed Sep. 21, 2006.
U.S. Appl. No. 13/855,844, filed Apr. 3, 2013, which is a continuation of U.S. Appl. No. 12/710,813, filed Feb. 23, 2010.
U.S. Appl. No. 13/855,881, filed Apr. 3, 2013, which is a continuation of U.S. Appl. No. 12/710,813, filed Feb. 23, 2010.
U.S. Appl. No. 13/855,935, filed Apr. 3, 2013, which is a continuation of U.S. Appl. No. 12/710,813, filed Feb. 23, 2010.
U.S. Appl. No. 14/718,539, filed May 21, 2015, which is a continuation of U.S. Appl. No. 12/710,813, filed Feb. 23, 2010.
U.S. Appl. No. 14/840,423, filed Aug. 31, 2015, which is a continuation of U.S. Appl. No. 13/855,935, filed Apr. 3, 2013.
U.S. Appl. No. 15/285,083, filed Oct. 4, 2016, which is a continuation in part of U.S. Appl. No. 14/840,423, filed Aug. 31, 2015.
U.S. Appl. No. 15/285,109, filed Oct. 4, 2016, which is a continuation in part of U.S. Appl. No. 14/840,423, filed Aug. 31, 2015.
U.S. Appl. No. 15/293,609, filed Oct. 14, 2016, which is a continuation of U.S. Appl. No. 14/840,423, filed Aug. 31, 2015.
U.S. Appl. No. 16/232,811, filed Dec. 26, 2018, which is a continuation of U.S. Appl. No. 15/293,609, filed Oct. 14, 2016.
Mar. 8, 2005 International Search Report in PCT/JP/2004/017277, National Institute of Advanced Industrial Science and Technology, Applicant, 2 pages.
Jul. 17, 2012 Office Action in KR 10-2012-7008624, National Institute of Advanced Industrial Science and Technology, Applicant, 4 pages.
Oct. 28, 2011 Office Action in CA 2,547,961, National Institute of Advanced Industrial Science and Technology, Applicant, 2 pages.
Yokichi Tanaka et al., "Mobile Torque Display and Haptic Characteristics of Human Palm," ICAT 2001, Dec. 5-7, Tokyo, Japan, 6 pages.
Yoshie Masayuki et al., "Development of Non-grounded Force Display Using Gyro Moment Effect," Transactions of the Virtual Reality Society of Japan, vol. 7, No. 3, 6 pages (plus 3 pages partial translation) (2002).
Tanaka, Y., et al., "Mobile Torque Display and Haptic Characteristics of Human Palm," ICAT 2001, Dec. 5-7, 2001, 6 pages.

* cited by examiner

311 HYSTERESIS SENSORY CHARACTERISTIC

※ HYSTERESIS:
SENSORY QUANTITY IS DIFFERENT BETWEEN INCREASE AND DECREASE OF DISPLACEMENT

811 TWIN ECCENTRIC ROTATOR

821 PHASE RELATION OF TWIN ECCENTRIC ROTATOR FOR VIBRATION PRESENTATION

831 PHASE RELATION OF TWIN ECCENTRIC ROTATOR FOR TORQUE PRESENTATION

841 PHASE RELATION OF TWIN ECCENTRIC ROTATOR FOR FORCE PRESENTATION

1311 GYROSCOPE TYPE

1312 RESULTANT ANGULAR MOMENTUM VECTOR DIFFERENTIAL TYPE

1330 INERTIA COORDINATE SYSTEM

1341 VIBRATION

1342 ONE-DIMENSIONAL TORQUE PRESENTATION

1343 TWO-DIMENSIONAL TORQUE PRESENTATION

1344 THREE-DIMENSIONAL TORQUE PRESENTATION

1351 STABILIZER

TWO-DIMENSIONAL SECTIONAL VIEW OF HAPTIC PRESENTATION DEVICE
(EXPANSION MAY BE MADE TO THREE DIMENSIONS)

TWO-DIMENSIONAL SECTIONAL VIEW OF HAPTIC PRESENTATION DEVICE
(EXPANSION MAY BE MADE TO THREE DIMENSIONS)

FIG.50

*Haptic sense*
*= pressure sense, tactile sense, and force sense*

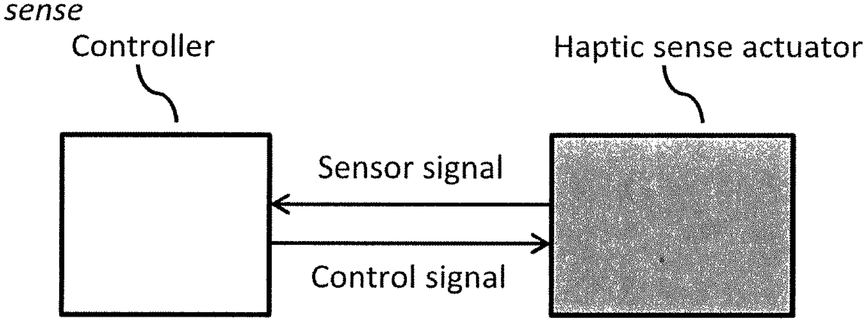

- Sensor signal: position, velocity, acceleration, pressure, temperature, humidity,...
- Controller (Control algorithm): changes displacement, momentum, vibration amplitude, displacement stimulus, vibration stimulus, or stimulus intensity with time in accordance with a finger movement.
- Control signal: drive voltage for force information (t) and amplitude information (t)
- Actuator: any actuator can be used as long as it generates displacement or vibration, such as a motor, piezoelectric element, artificial muscle, shape-memory alloy, molecular motor, electrostatic, coil, magnetic force, and static electricity.

- Object: To reproduce a haptic sense (Pressure sense, tactile sense, and force sense) on a panel display.
  - Means: Displacement or vibration is controlled in accordance with a finger movement.
  - Advantageous effects: A three-dimensional touch with a sense of depth is presented even on a flat plate.
  - A pressure sense and force sense are presented even in response to displacements or vibrations in different directions.
  - Product: System and parts (Button, slider, dial, and switch)

A force sense is generated by asymmetrically accelerating and decelerating a waveform.

A force sense is generated by asymmetrically accelerating and decelerating a waveform.

In order to generate a sense of click by vibrating a panel for a short period of time, frequency is changed per waveform to change the sense.

In the present implementation, two patterns shown to the left are used.

FIG.106

E.g.,) Amplitude occurs in the Y-direction, but depression is felt in the Z-direction of the button.

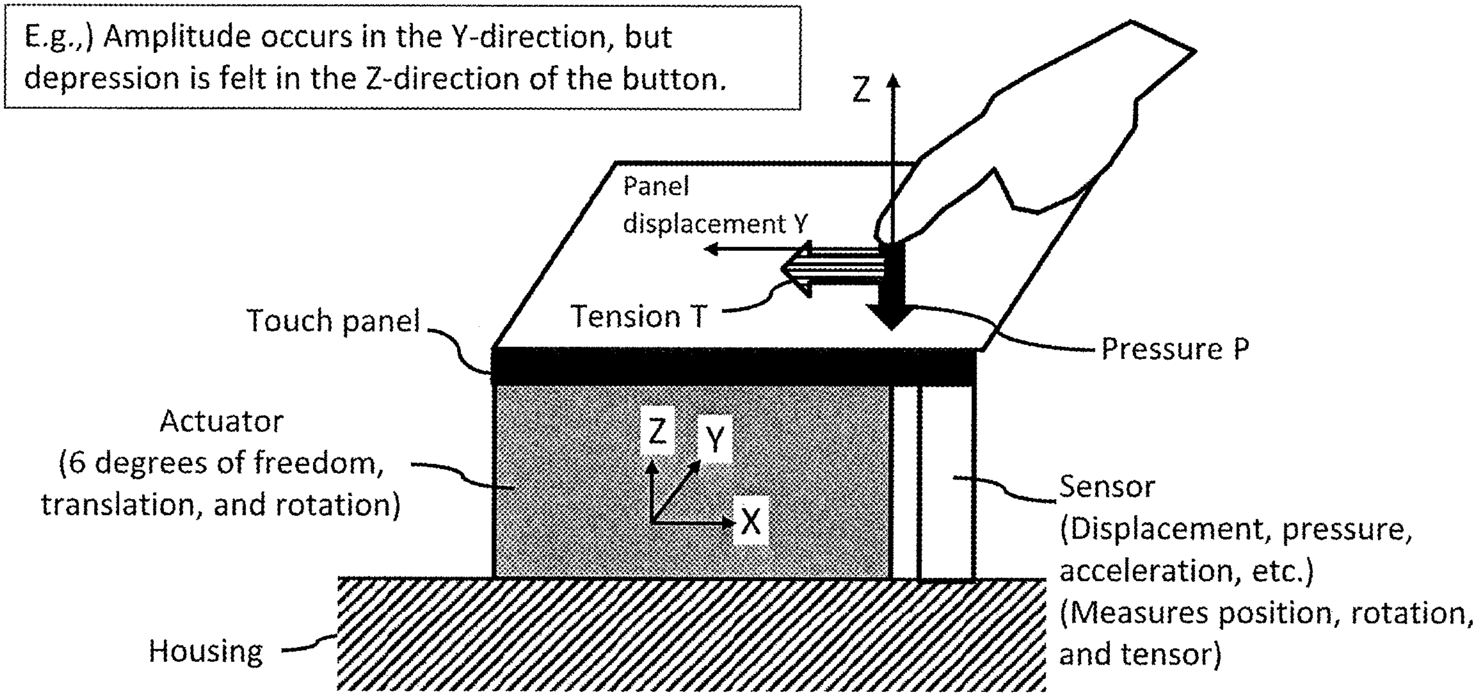

· Illusion patterns (9 combination patterns) = depression pressure directions (3 directions) × actuator vibration/amplitude directions (3 directions).
· Besides, there is also a rotation pattern.
Notes: Illusion phenomena can be analyzed through the study of the influence of sensitivity and determination threshold.

FIG.107

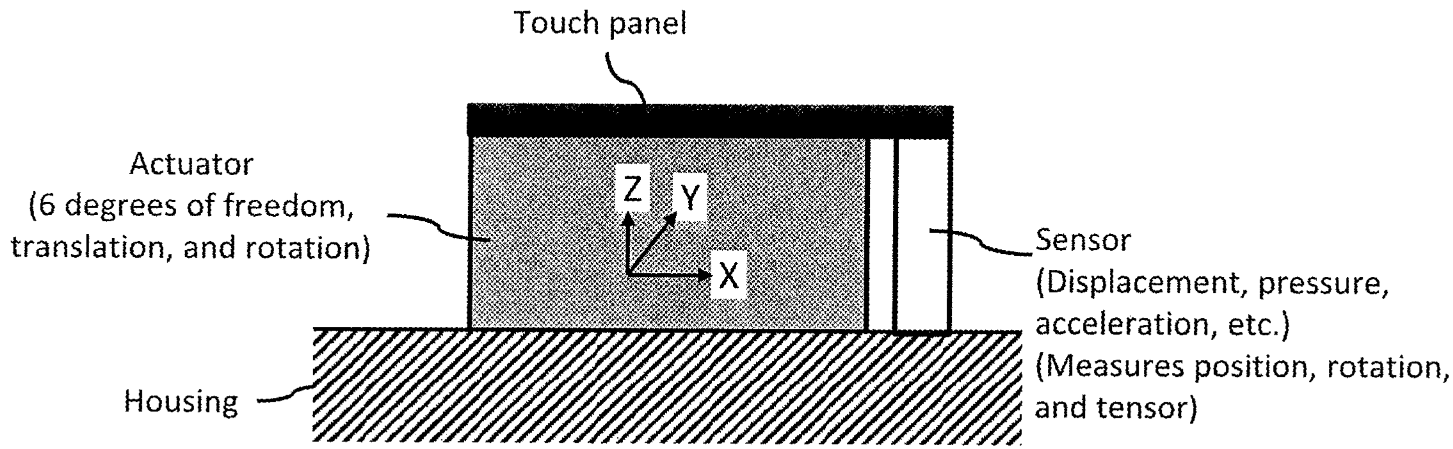

- Object: To digitize/digitally represent a sense of button touch, a sense of friction, and a sense of touching an uneven surface.
- Means: A haptic sense and an illusionary haptic sense are presented on the basis of the physical quantity and stimulus of a displacement, rotation, deformation, vibration, and the like in accordance with a contact and movement of a finger, body, and the like. A displacement, rotation velocity, acceleration, pressure, and force of a contact, movement, and the like are measured with a sensor that uses a photo device, distortion, warp, resistance, electrical conductance, electrostatic capacity, acoustic waves, laser, and the like.
- Advantageous effects: A haptic sense such as a sense of button touch, a sense of friction, and a sense of touching an uneven surface; a sense of pain; and a sense of the presence and a touch of a virtual object are represented.

- Object: To be compatible with a free-form flat plane and shape.
- Means: A touch panel, a liquid crystal panel, and an actuator with free-form curved surfaces are used.
- Advantageous effects: Design flexibility is provided.

FIG.109

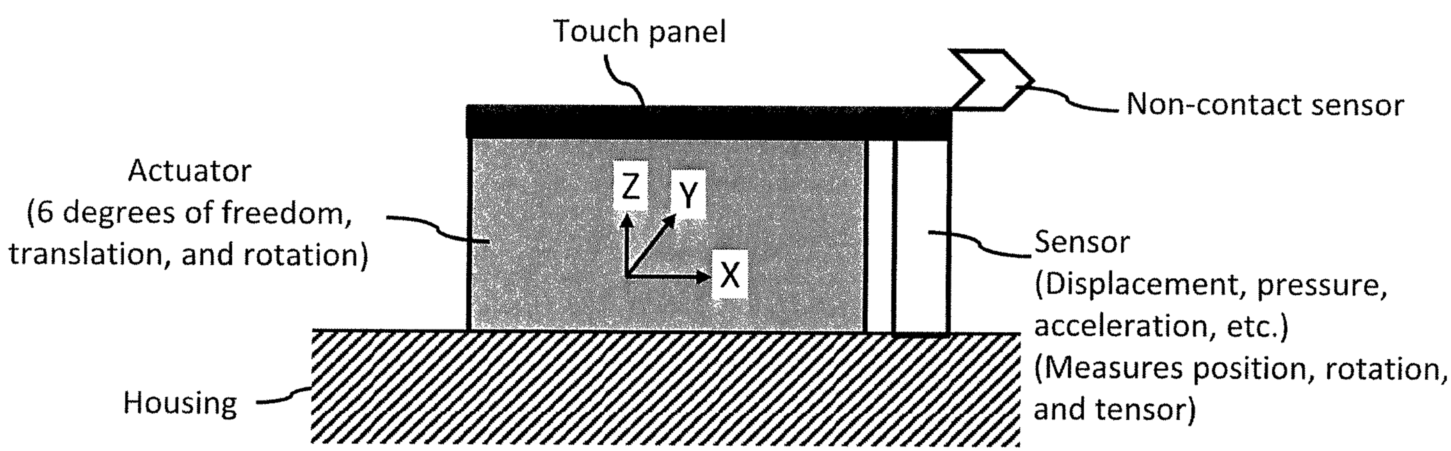

- Object: To digitally represent instantaneous changes regarding a haptic sense.
- Means: Operation around a touch panel before it is touched is monitored to improve the real-time response characteristics when the touch panel is touched. A displacement, rotation, velocity, acceleration, pressure, and force of a movement and the like are measured with a non-contact sensor and the like.
- Advantageous effects: A sense of collision and a sense of impact are represented.

- Object: To digitally represent a contact state regarding a haptic sense.
- Means: A contact state such as a contact angle of a finger, a contacted area, the humidity of the finger, and the like are monitored to perform control while reflecting the monitored state.
- Advantageous effects: A sense of tracing is improved.

FIG.111

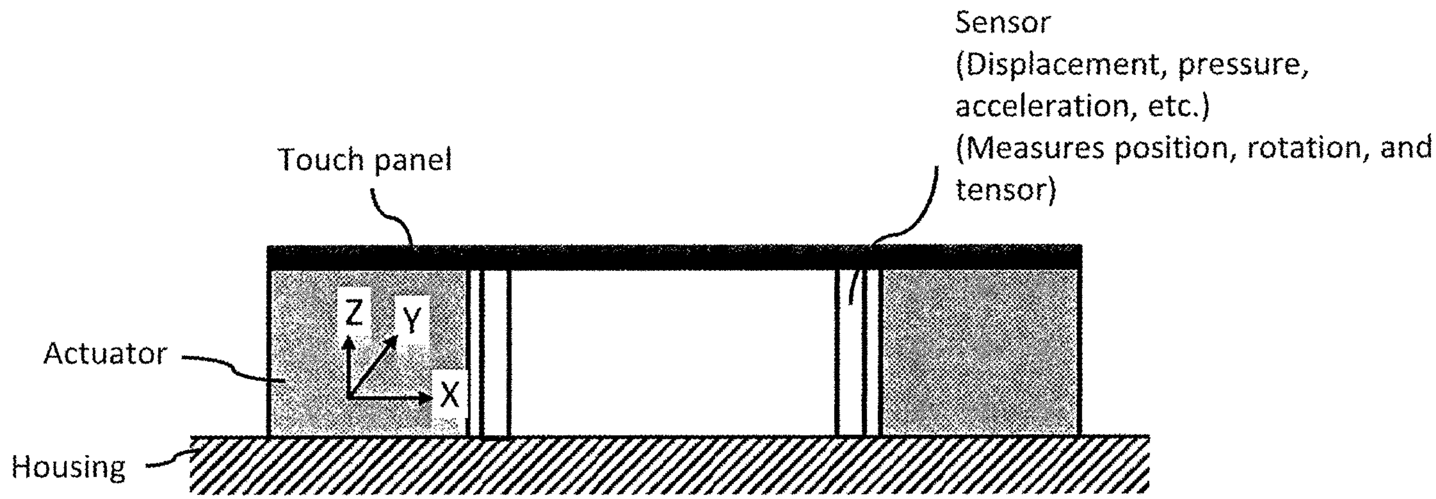

- Object: To digitize/digitally represent a sense of button touch, a sense of friction, and a sense of touching an uneven surface.
- Means: A haptic sense and an illusionary haptic sense are presented on the basis of the physical quantity and stimulus of a displacement, rotation, deformation, vibration, and the like in accordance with a contact, contact position, and movement of a finger, body, and the like, and also on the basis of the spatial balance, intensity distribution, and changes with time of the stimulus on the touch panel. Contact, movement, and the like conform to the "haptic sense touch panel unit."
- Advantageous effects: Senses (Phantom sensations) of movement, propagation, and changes in the shape of a force, object, and a sense of the presence thereof are presented on the basis of the spatial balance, intensity distribution, and changes with time of the stimulus.
- An object and a sense of the presence thereof are presented on a hard panel.

FIG.112

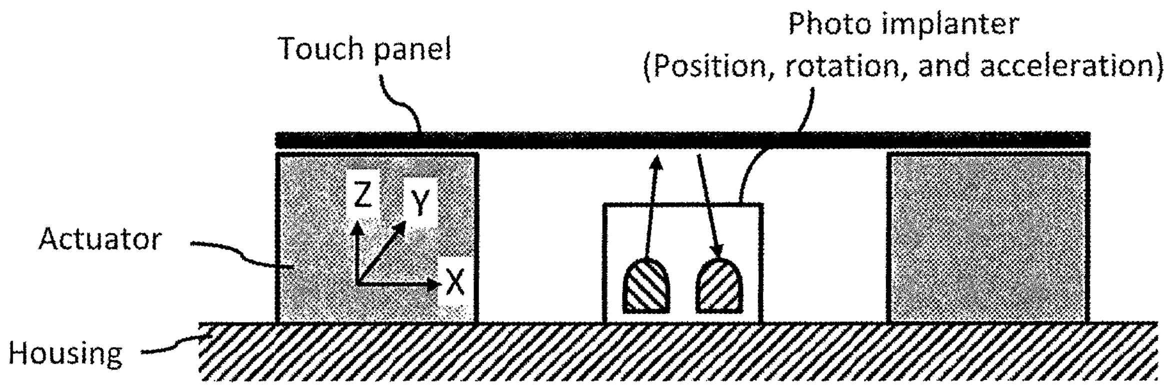

- Object: To digitize/digitally represent a sense of button touch.
- Means: Distance and changes are detected using a photo implanter as a sensor.
- Advantageous effects: A sense of depressing a button (depression pitch and depth) is perceived.
- A sense of button touch is presented on a hard panel.
- Digitally representing a sense of button touch can instantaneously change representation of a texture and a touch in an adaptive manner in accordance with applications or one's preferences.

FIG.113

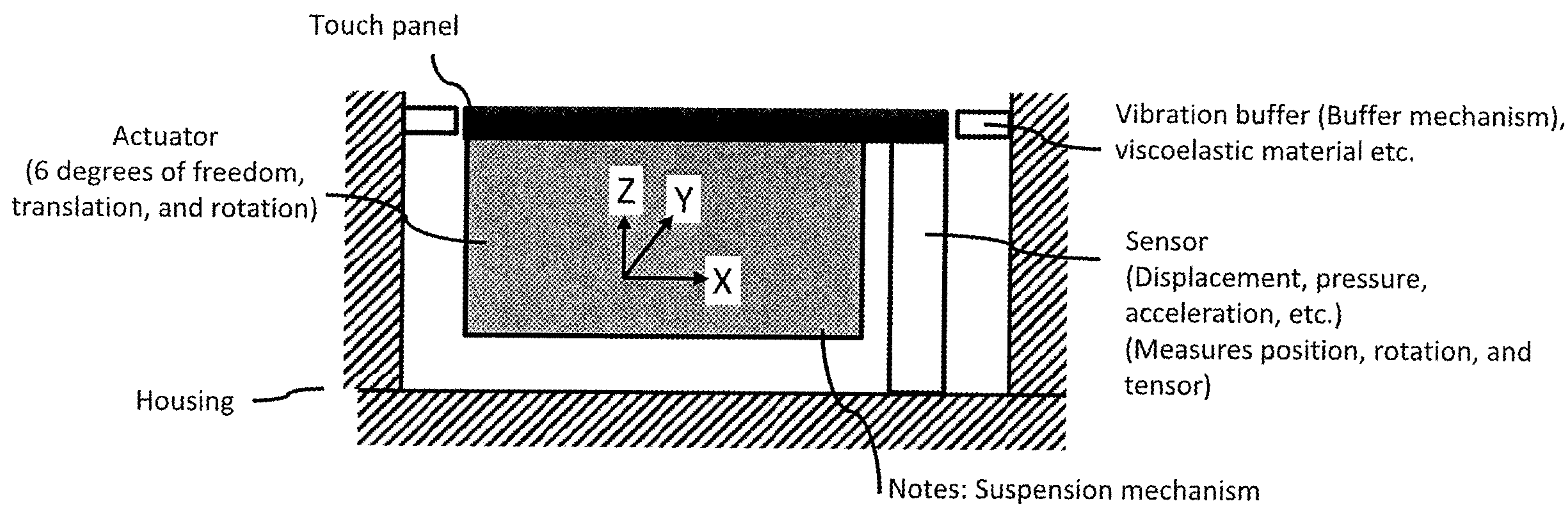

- Object: To increase the sensory intensity and effects of a haptic sense.
- Means: The physical quantity and the stimulus quantity that propagate to a finger or a body are increased through a touch panel using a 3D speaker mechanism that has a floated touch panel and actuator portion and provides vibrations with 6 degrees of freedom.
- Advantageous effects: The sensory quantity of a haptic sense is increased with an increase in the physical quantity and the stimulus quantity. The quantity of a sense of depression as well as the depression pitch and a sense of depth are increased.
- A device for IoT.
- Installable at any place. The sensory quantity and efficiency can be increased.

FIG.114

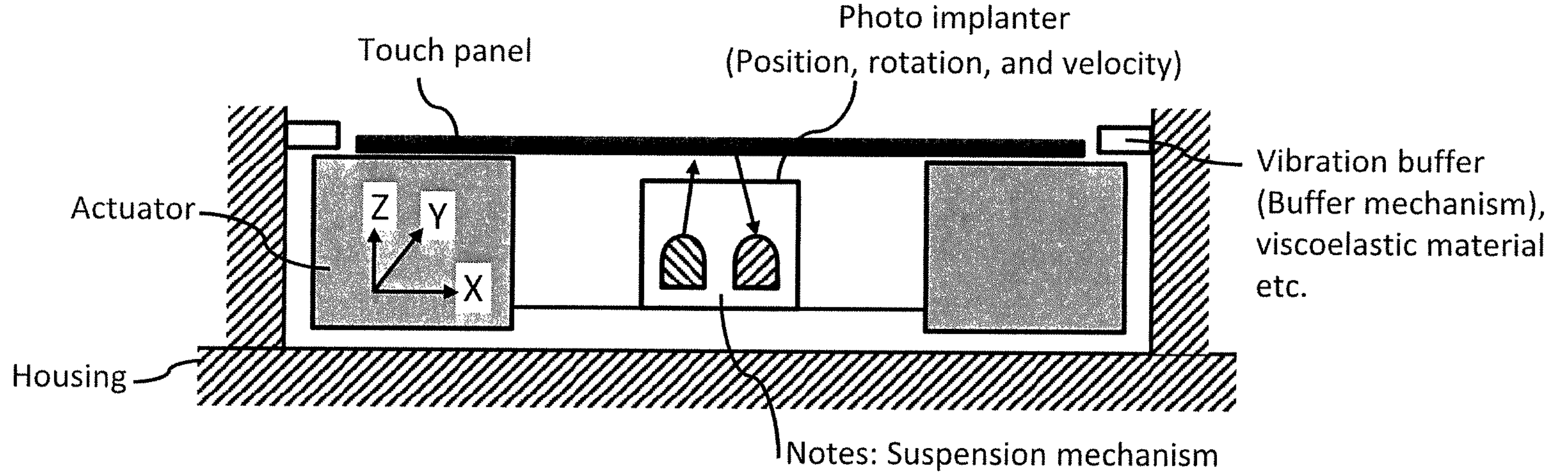

- Object: To increase the sensory intensity and effects of a haptic sense.
- Means: The physical quantity and the stimulus quantity that propagate to a finger or a body are increased through a touch panel by floating the touch panel and the actuator portion.
- Advantageous effects: The sensory quantity of a haptic sense is increased with an increase in the physical quantity and the stimulus quantity. The quantity of a sense of depression as well as the depression pitch and a sense of depth are increased.
- A device for IoT.
- Installable at any place. The sensory quantity and efficiency can be increased.

FIG.115

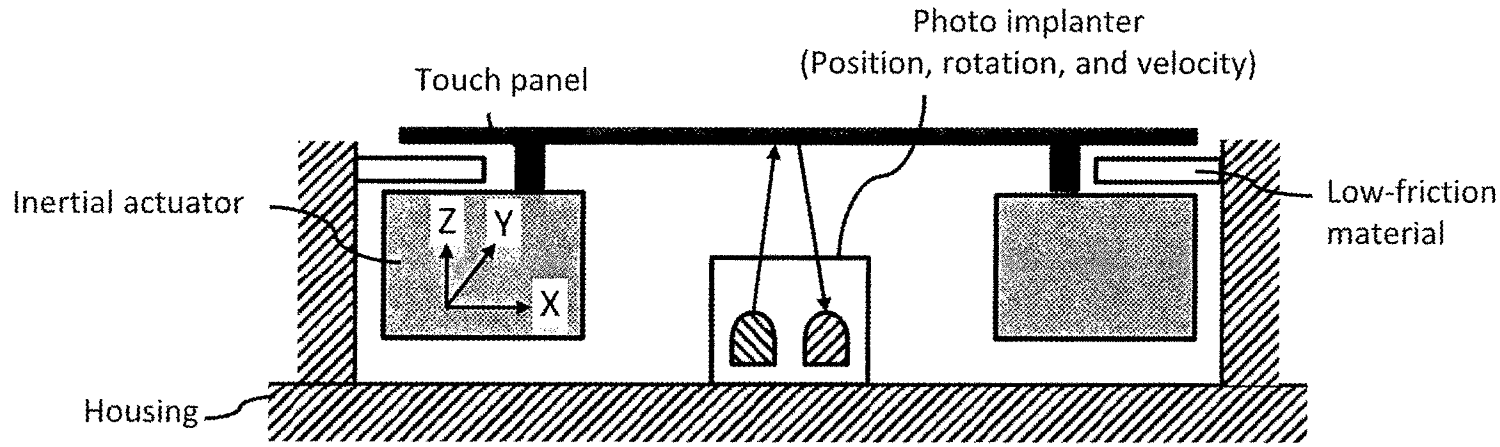

Notes: Suspension mechanism

- Object To increase the sensory intensity and effects of a haptic sense.
- Means: The physical quantity and the stimulus quantity that propagate to a finger or a body are increased through a touch panel by floating the touch panel and the inertial actuator portion.
- Advantageous effects: The sensory quantity of a haptic sense is increased with an increase in the physical quantity and the stimulus quantity. The quantity of a sense of depression as well as the depression pitch and a sense of depth are increased.
- A device for IoT.
- Installable at any place. The sensory quantity and efficiency can be increased.

FIG.116

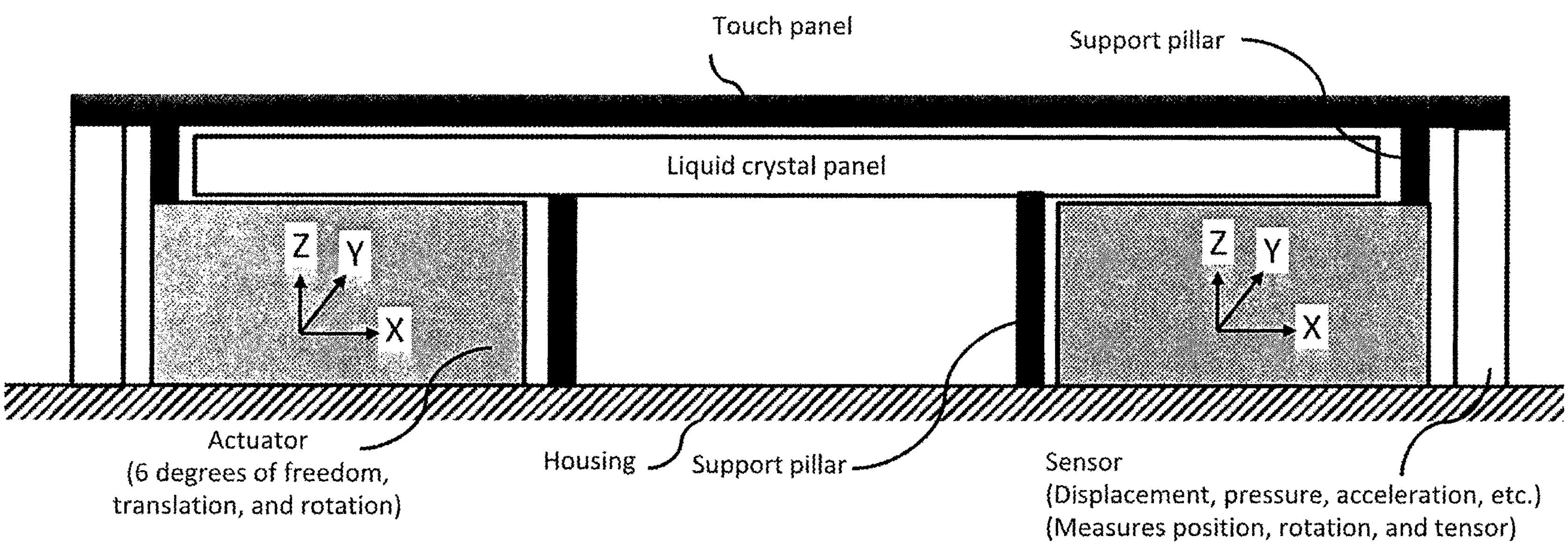

- Object: To install a haptic sense panel unit on a liquid crystal panel.
- Means: A liquid crystal panel is installed in the gap between a touch panel and an actuator portion. As the actuator and the liquid crystal panel are isolated, a video displayed on the liquid crystal panel does not blur or vibrate.
- Advantageous effects: A tactile sense and a touch of an object displayed on the liquid crystal display panel are presented, and a sense of the presence of the object is presented.
- A tactile sensation and a touch of a 3D object are represented in a simulated manner on a 2D panel.

- Object: To reduce the thickness of a haptic sense touch panel.
- Means: Arrangement and configuration are devised.
- Advantageous effects: Compatible with smartphones.
- Installable on a thin device such as a smartphone.

- Object: To reduce the thickness of a haptic sense touch panel.
- Means: Arrangement and configuration are devised.
- Advantageous effects: Compatible with smartphones.
- Installable on a thin device such as a smartphone.

- Object: To implement a digital haptic sense function for videos.
- Means: Video projection and a haptic sense touch panel are controlled with a projector.
- Advantageous effects: A large haptic sense display is realized.

FIG.120

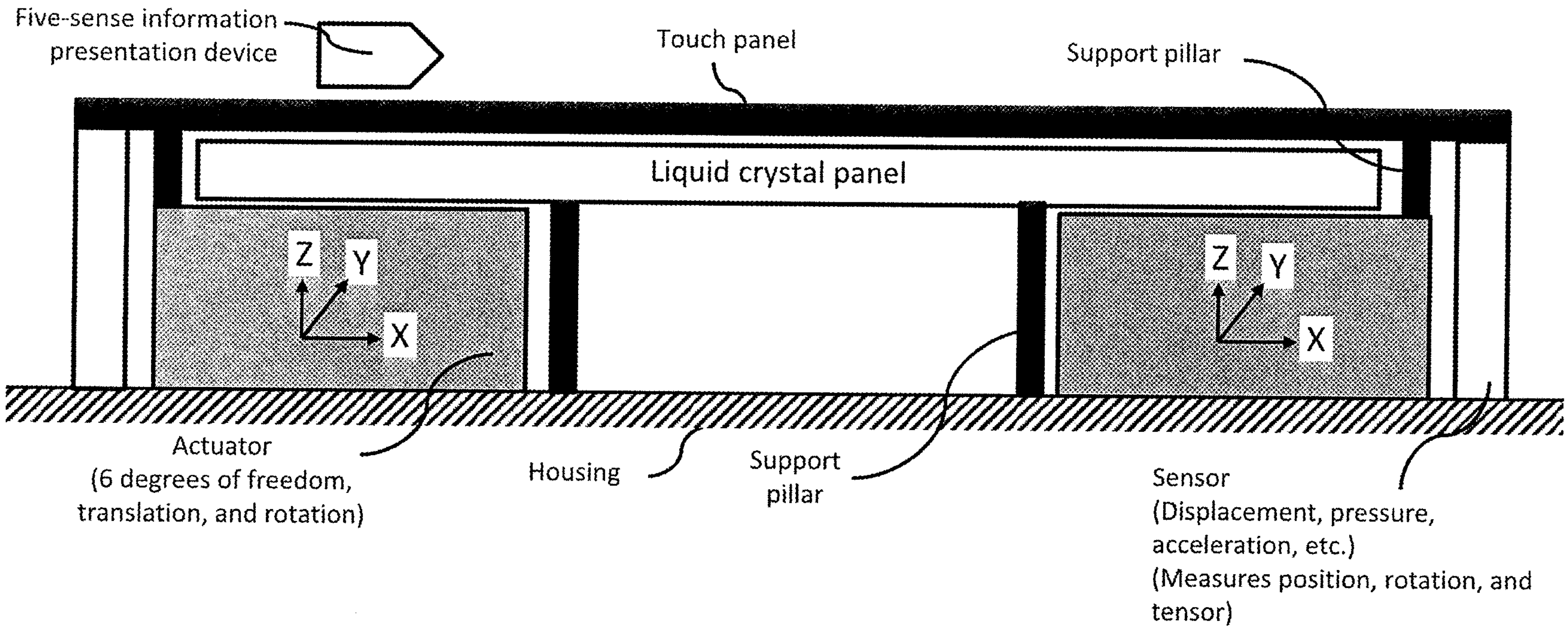

- Object: To improve a sense of reality by utilizing five senses such as a sense of sight, a sense of hearing, and a tactile sense.
- Means: Fives sense, such as a sense of seeing videos, a sense of hearing sound, a sense of touch, a sense of smell, and a sense of taste, are utilized.
- Advantageous effects: illusions, enhancement or promotion of senses as well as expansion of senses that do not exist in reality is achieved due to the synergistic effect with five sense information that matches or does not match (mismatches) the haptic information as an object.

- Object: To present a basic sense of movement/sense of motion.
- Means: Phase in the vibration direction is controlled for each panel.
- Advantageous effects: A sense of movement/motion other than a mere vibration that occurs in response to a vibration stimulus is represented.
- A sense of rotation is presented by a fixed panel.

FIG.122

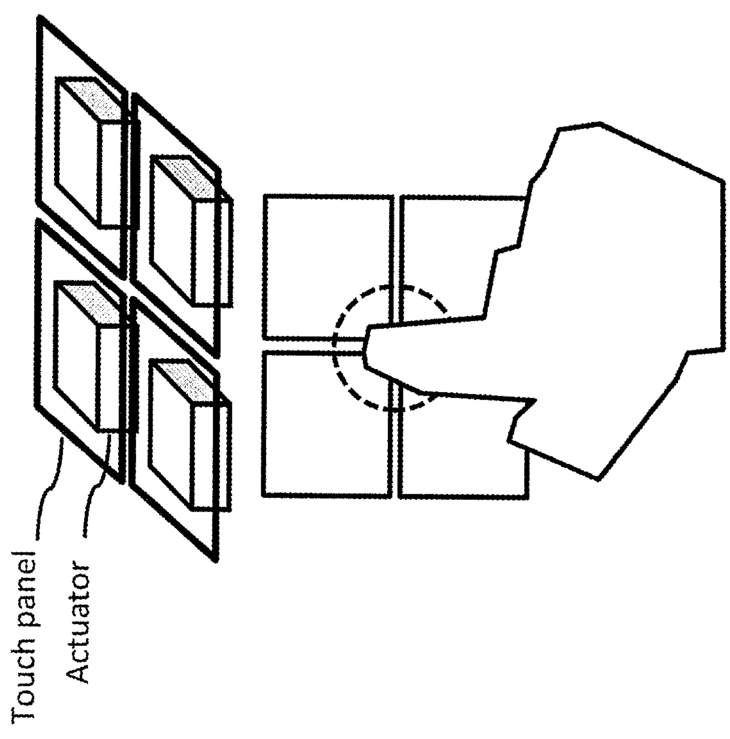

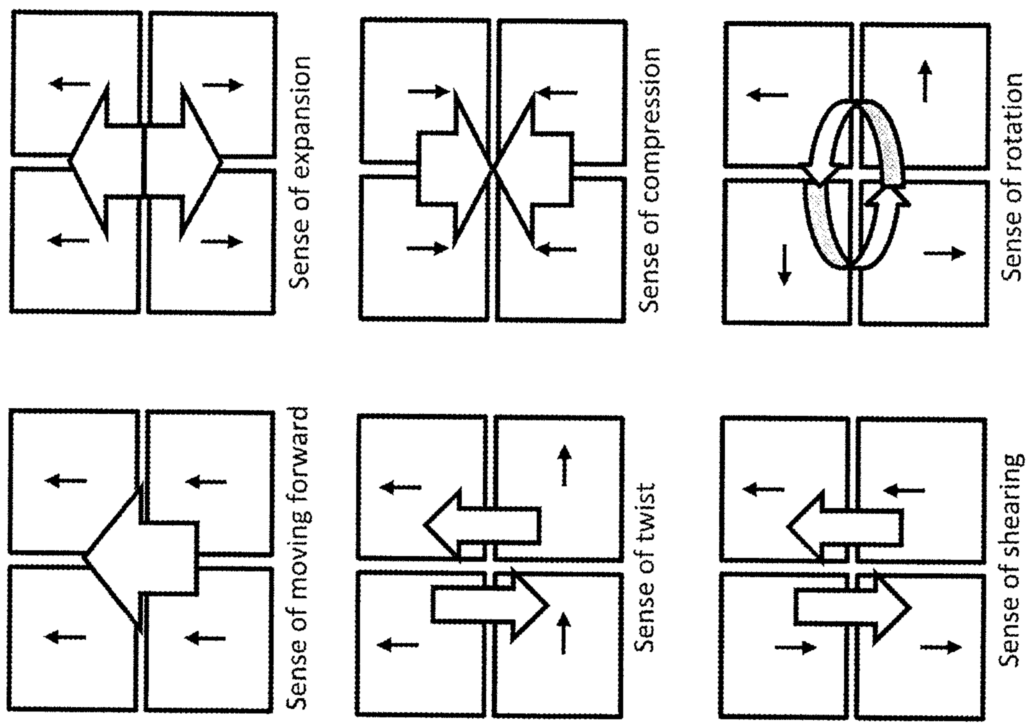

- Object: To present a sense of complex movement
- Means: Phase in the vibration direction is controlled for each panel and senses are combined at a fingertip.
- Advantageous effects: A sense of expansion, a sense of compression, and a sense of twist are presented.
- A sense of expansion and a sense of compression are presented.
- A sense of deformation is presented by a fixed panel.

FIG.123

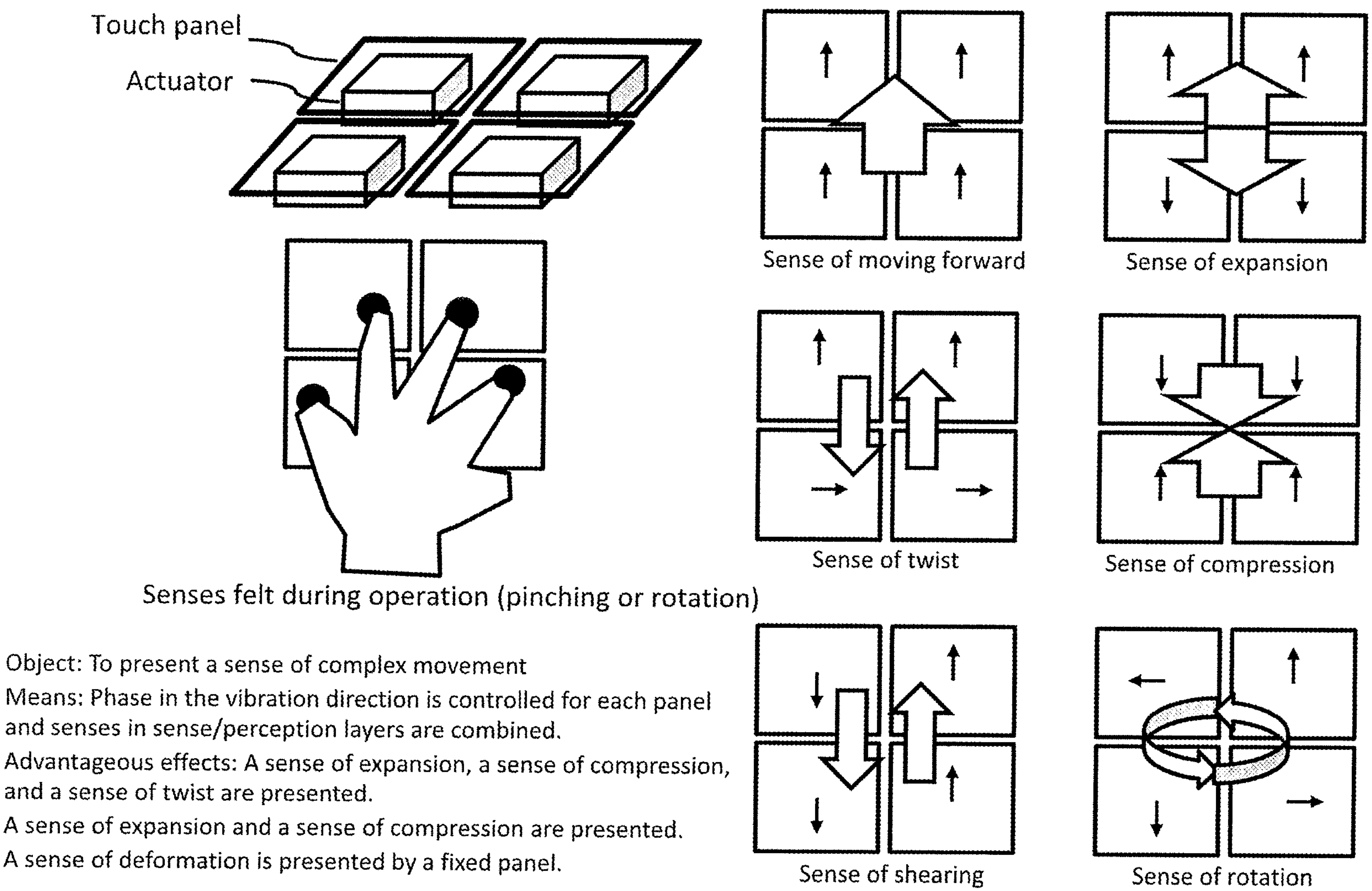

- Object: To present a sense of complex movement
- Means: Phase in the vibration direction is controlled for each panel and senses in sense/perception layers are combined.
- Advantageous effects: A sense of expansion, a sense of compression, and a sense of twist are presented.
- A sense of expansion and a sense of compression are presented.
- A sense of deformation is presented by a fixed panel.

FIG.124

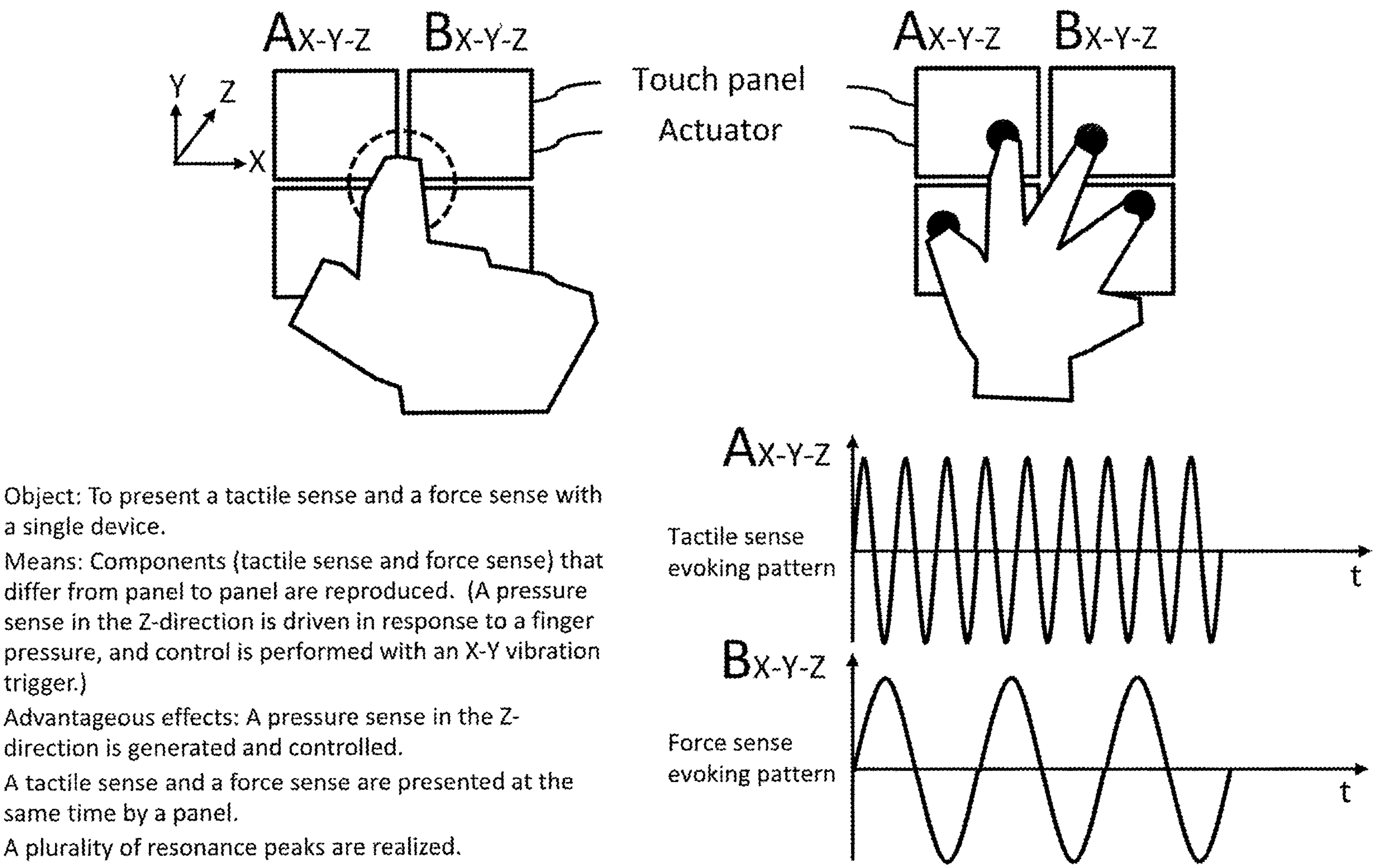

- Object: To present a tactile sense and a force sense with a single device.
- Means: Components (tactile sense and force sense) that differ from panel to panel are reproduced. (A pressure sense in the Z-direction is driven in response to a finger pressure, and control is performed with an X-Y vibration trigger.)
- Advantageous effects: A pressure sense in the Z-direction is generated and controlled.
- A tactile sense and a force sense are presented at the same time by a panel.
- A plurality of resonance peaks are realized.

Notes: See the separate sheets for the details of the evoking patterns.

FIG.125

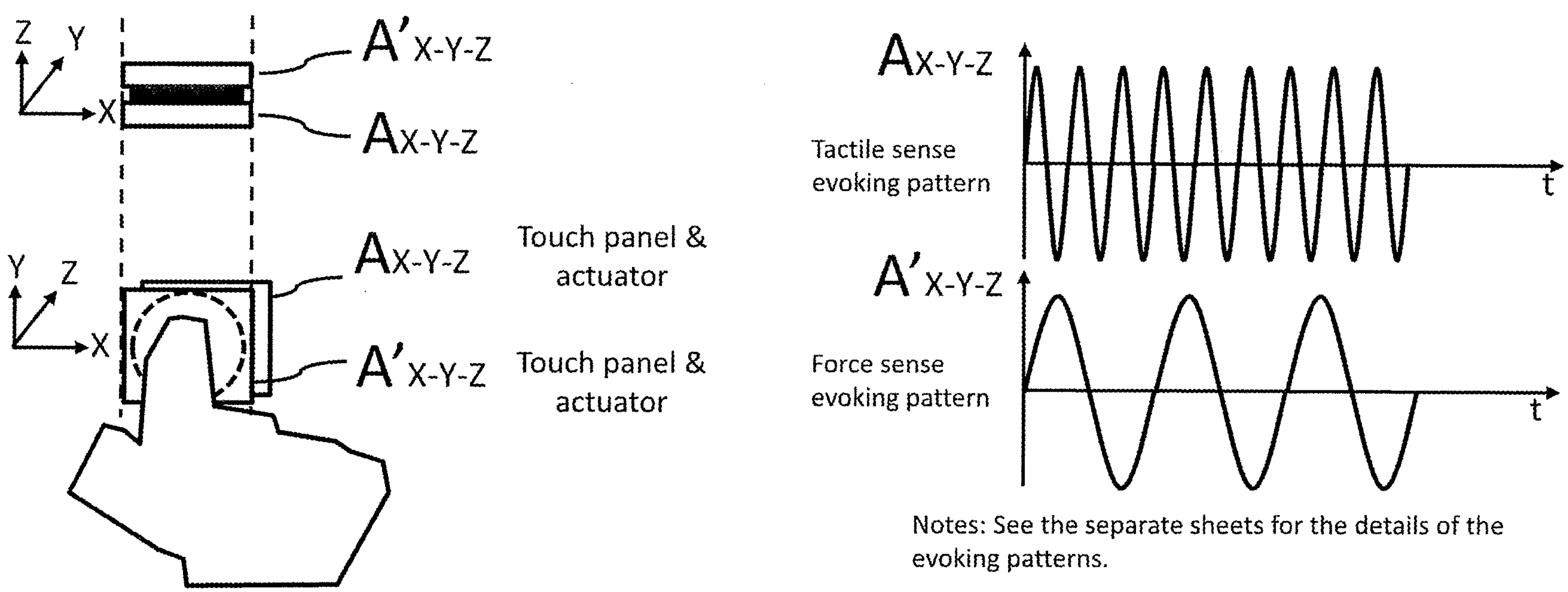

Notes: See the separate sheets for the details of the evoking patterns.

- Object: To present a tactile sense and a force sense with a single device.
- Means: Components (tactile sense and force sense) that differ from panel to panel are reproduced. (A pressure sense in the Z-direction is driven in response to a finger pressure, and control is performed with an X-Y vibration trigger.)
- Advantageous effects: A pressure sense in the Z-direction is generated and controlled.
- A tactile sense and a force sense are presented at the same time by a panel.
- A plurality of resonance peaks are realized.

FIG.126

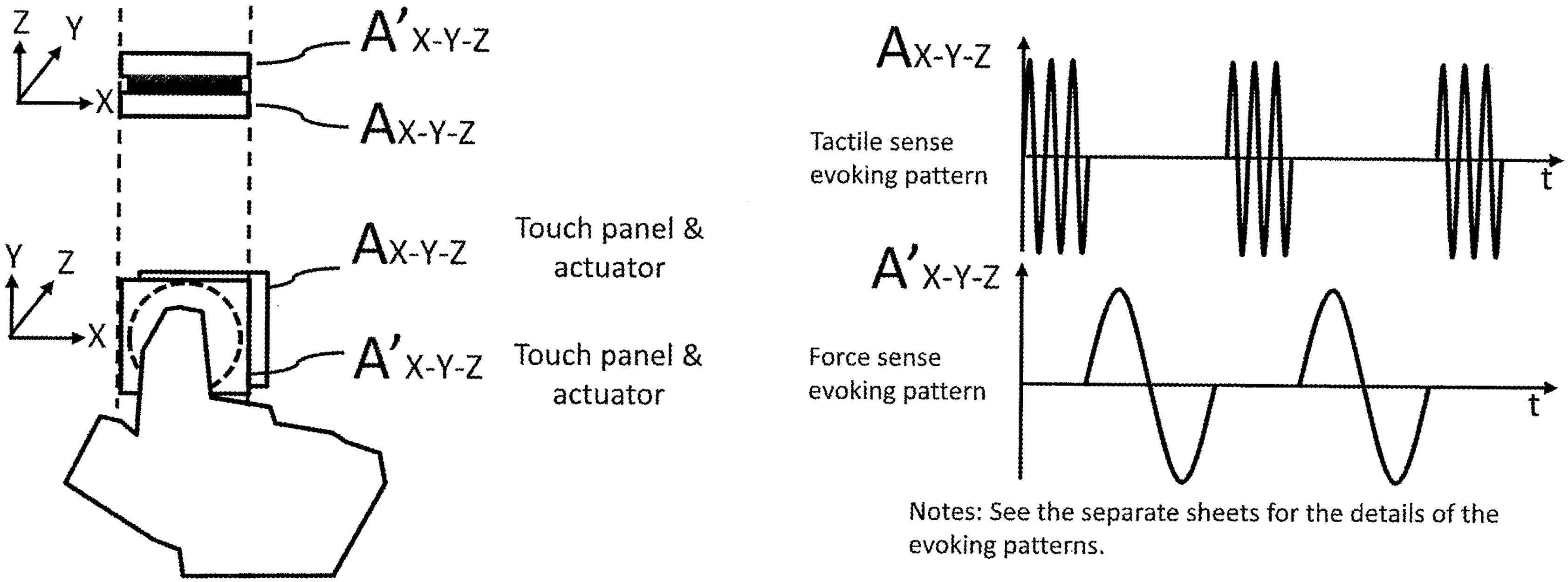

- Object: To present a tactile sense and a force sense with a single device.
- Means: Components (tactile sense and force sense) that differ from panel to panel are reproduced at different timings. The way to combine the components is not limited thereto.
- Advantageous effects: Mutual influence such as mutual masking of a tactile sense and a force sense is avoided.
- (consonant and vowel)

FIG.128

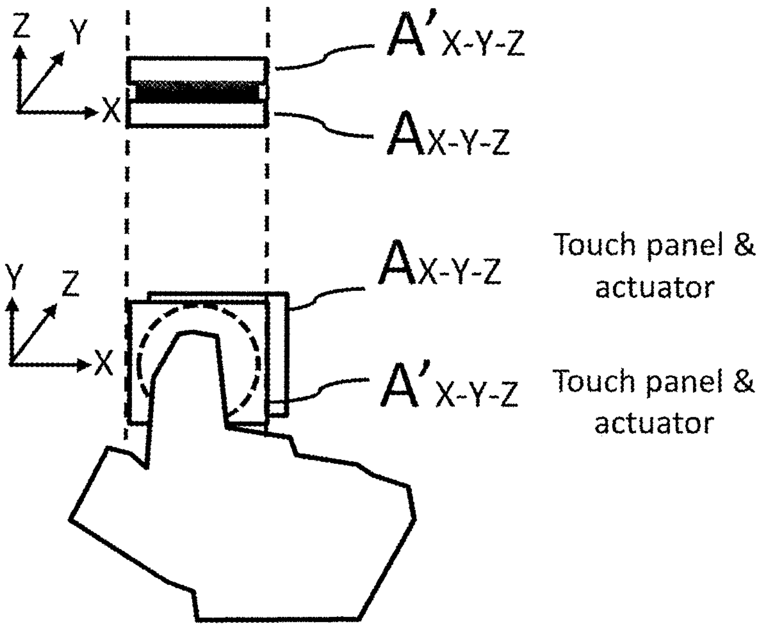

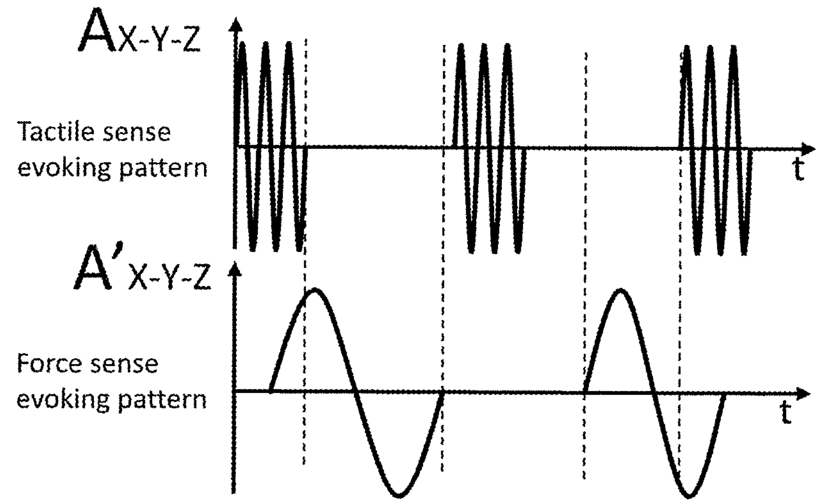

Notes: See the separate sheets for the details of the evoking patterns.

- Object: To present a tactile sense and a force sense with a single device.
- Means: Components (tactile sense and force sense) that differ from panel to panel are reproduced at different timings. There are cases where overlapping portions are present and cases where non-overlapping portions are present. The way to combine the components is not limited thereto.
- Advantageous effects: Mutual influence such as mutual masking of a tactile sense and a force sense is avoided.
- (Consonant and vowel)

FIG.129

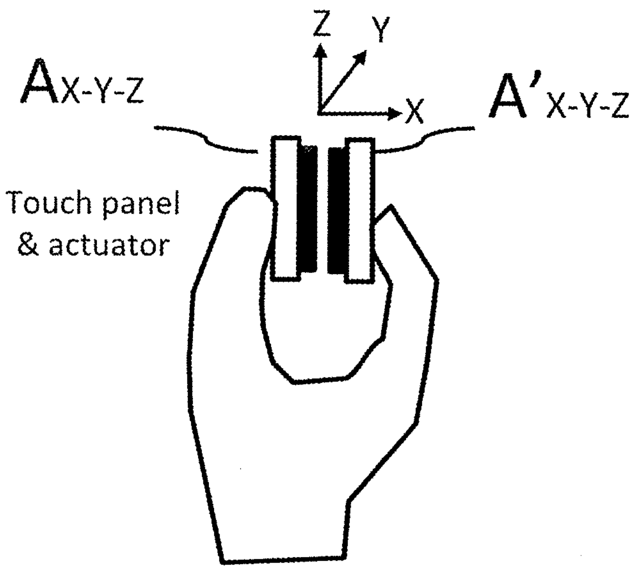

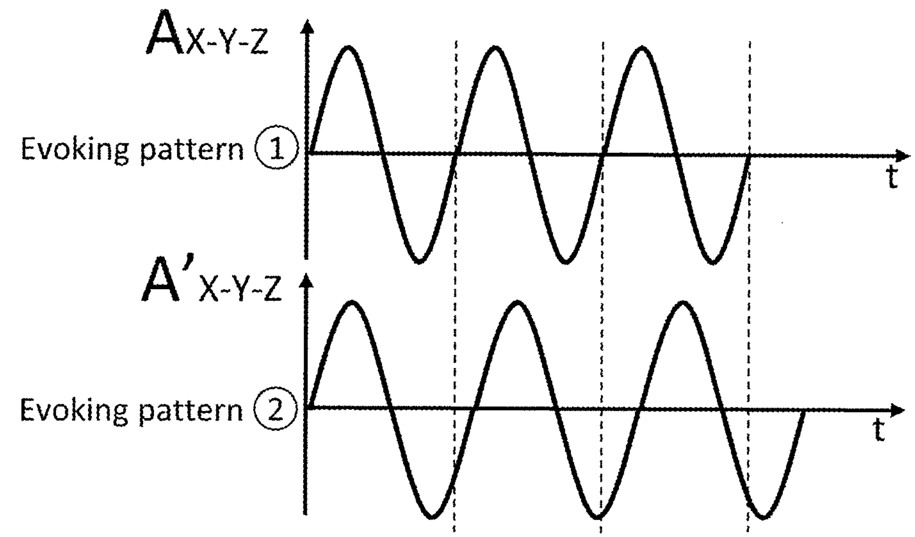

Notes: Different components (Intensity/amplitude, frequency, waveform, and phase)

Notes: Different vibration patterns

- Object: To present a tactile sense and a force sense with a single device.
- Means: Components (Intensity/amplitude, frequency, waveform, and phase) that differ from panel to panel are presented.
- Advantageous effects: a sense that is different from the components is generated by the waveform comparison, difference, phase difference, and synergistic effect.

FIG.130

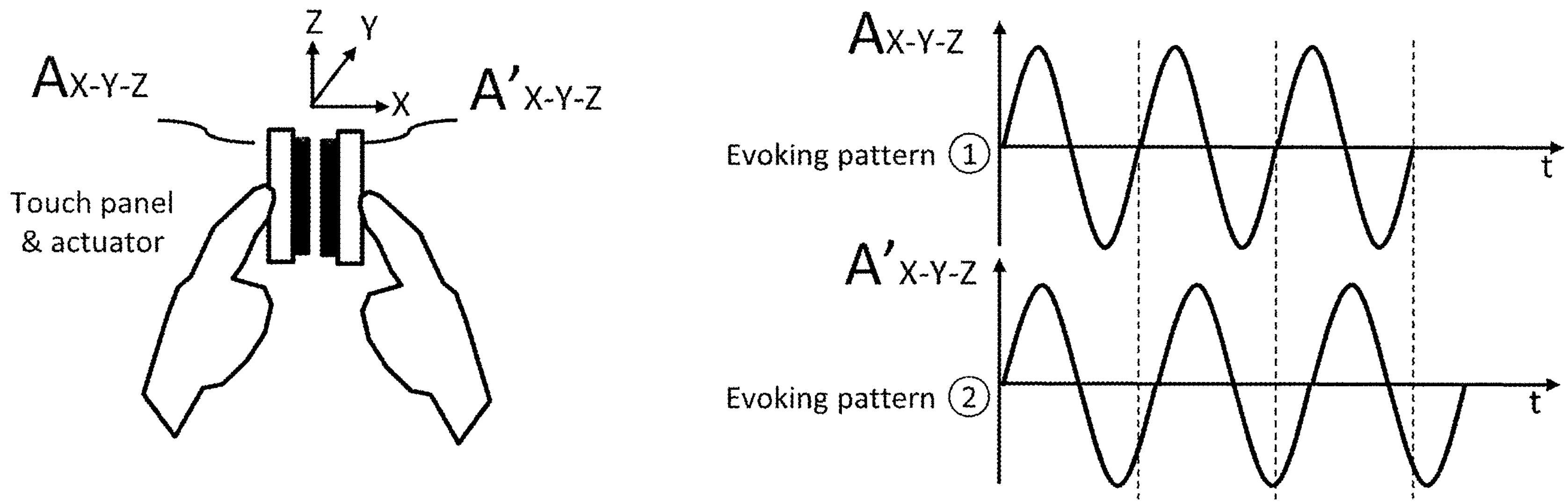

Notes: Different components (Intensity/amplitude, frequency, waveform, and phase)

Notes: Different vibration patterns

- Object: To present a tactile sense and a force sense with a single device.
- Means: Components (Intensity/amplitude, frequency, waveform, and phase) that differ from panel to panel are presented.
- Advantageous effects: a sense that is different from the components is generated by the waveform comparison, difference, phase difference, and synergistic effect.

FIG.131

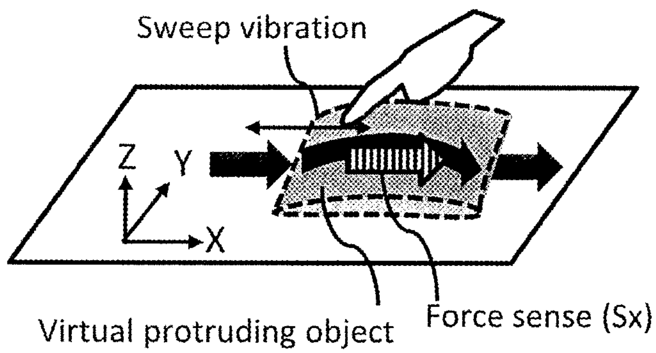

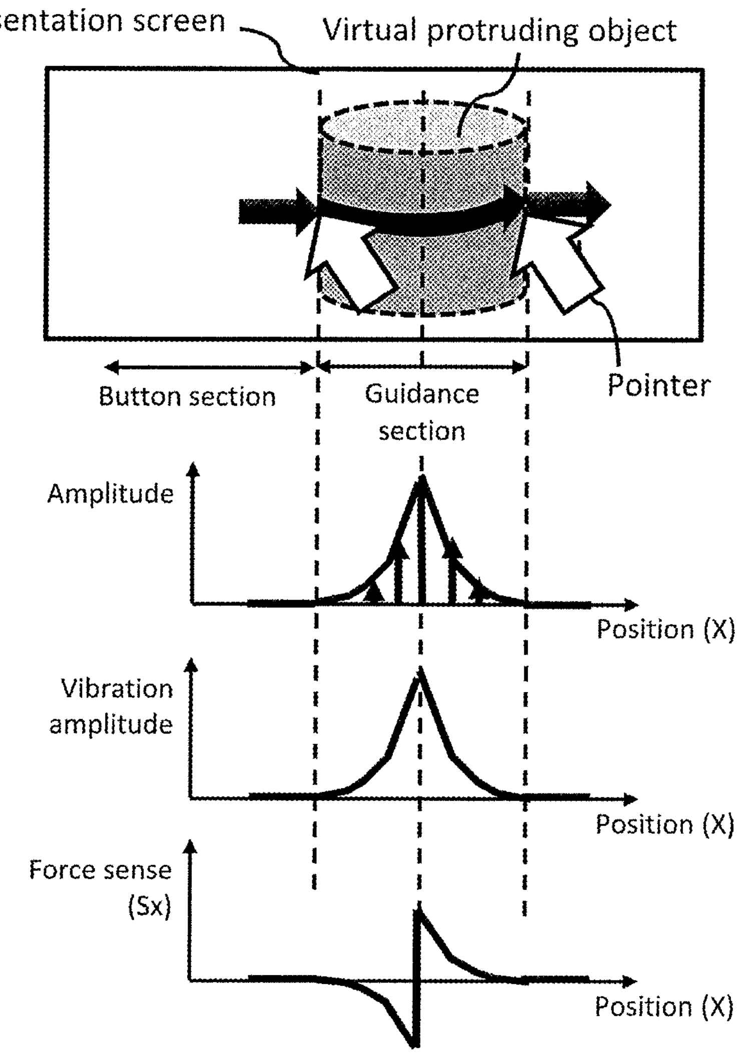

- Object: To present a sense of touching a pointed projection at the top of a mountain as a haptic sense.
- Means: The panel amplitude becomes larger at positions closer to the center (and becomes smaller at positions farther from the center).
- Advantageous effects: A sense of being at the top of a mountain (a sense of pulling back from the mountain or a sense of passing over the mountain) is presented.
- A sense of touching a pointed sloping projection is presented by a panel.

FIG.132
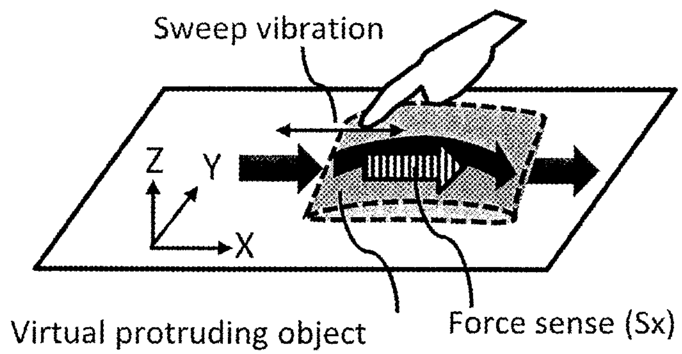
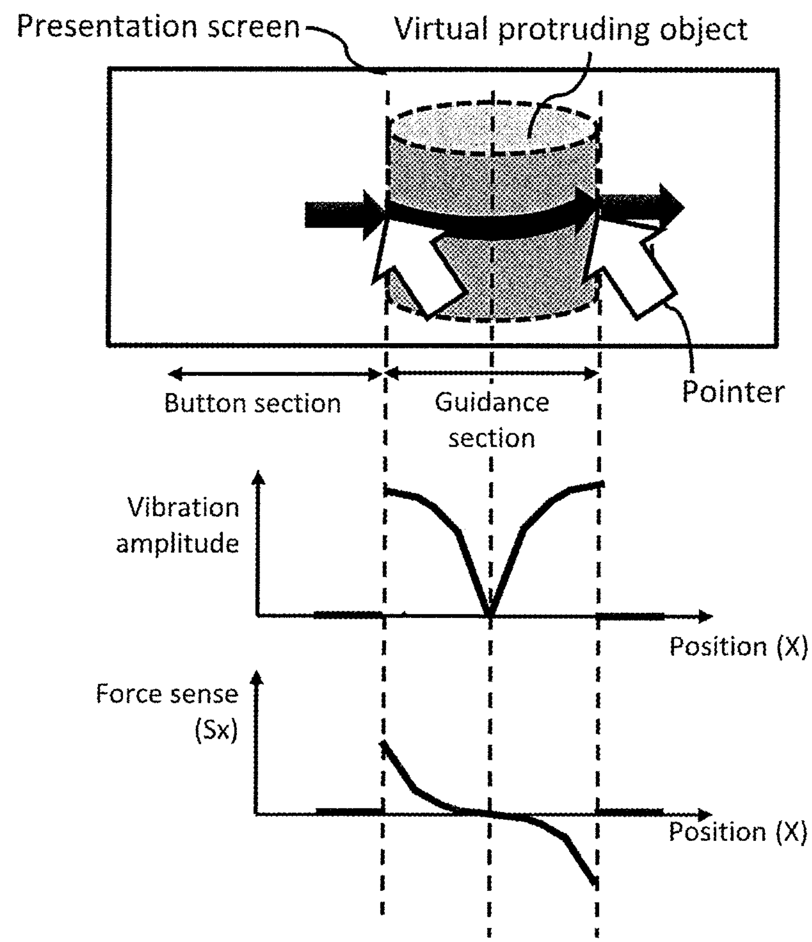
- Object: To present a sense of touching a projection as a haptic sense.
- Means: The intensity/amplitude of a stimulus/vibration is controlled.
- Advantageous effects: A sense of crossing over a mountain (a sense of pulling back from the mountain or a sense of passing over the mountain) is presented.
- A sense of touching a projection is presented by a panel.

FIG.133
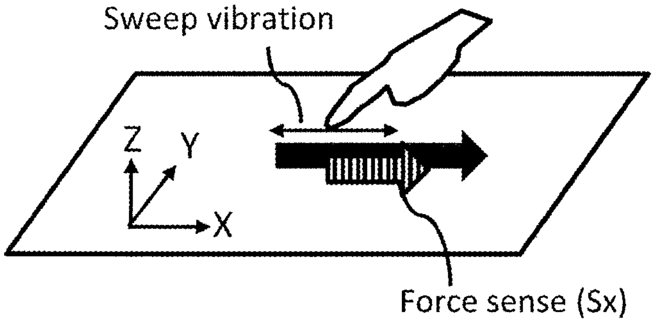
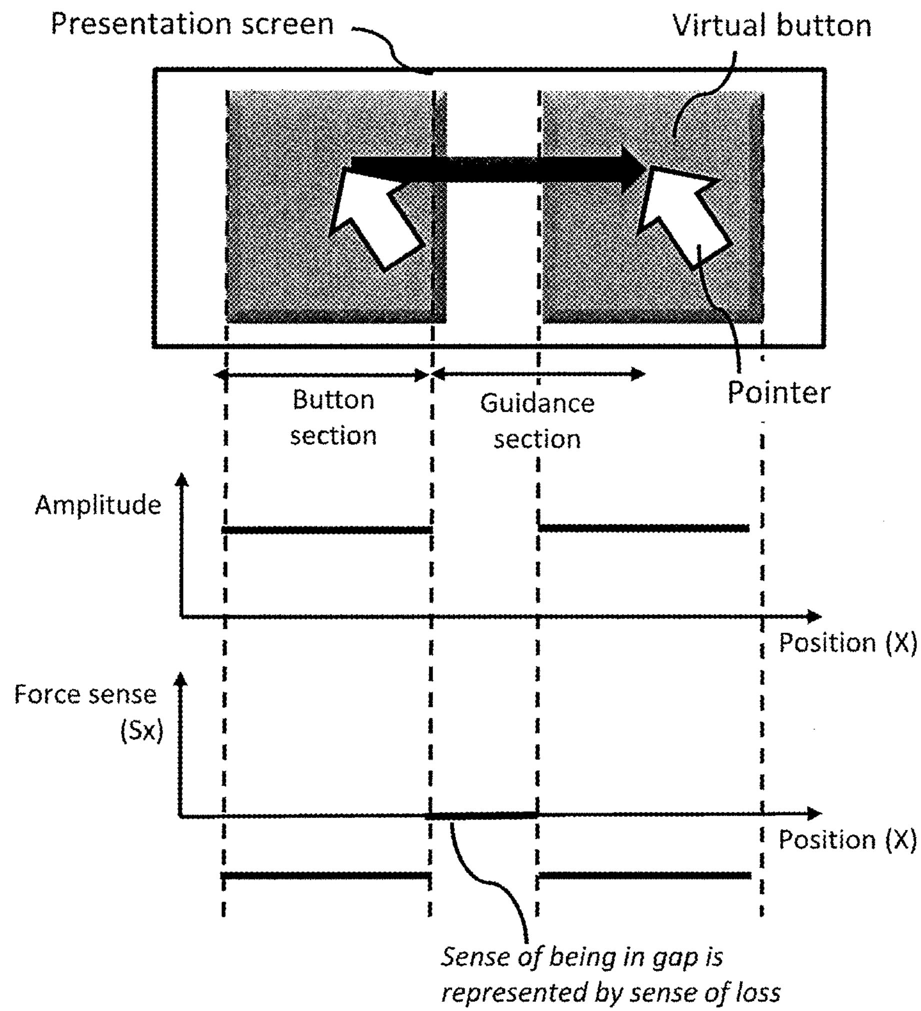
- Object: To present a sense of being in a recessed gap as a haptic sense.
- Means: A sense of resistance is eliminated for a moment.
- Advantageous effects: A sense of being in a gap is presented.
- A sense of being in a recessed gap is presented by a panel.

FIG.134

[Control method]

- A pointer is operated on a panel to move between buttons.
- Once the pointer has come out of the button region, it is guided to a next button.
- The panel amplitude becomes larger at positions closer to the center of the guidance section (and becomes smaller at positions farther from the center).
- The direction of a force sense is switched in the center of the guidance section.

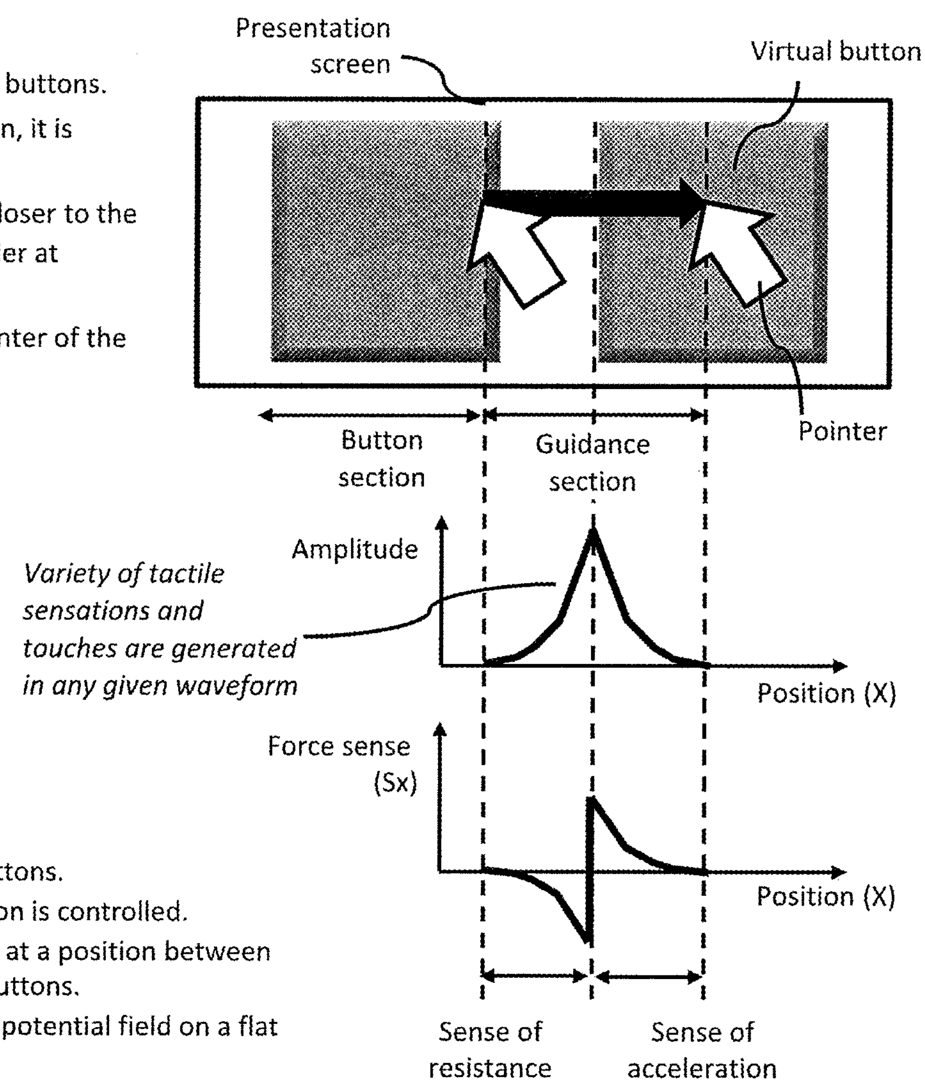

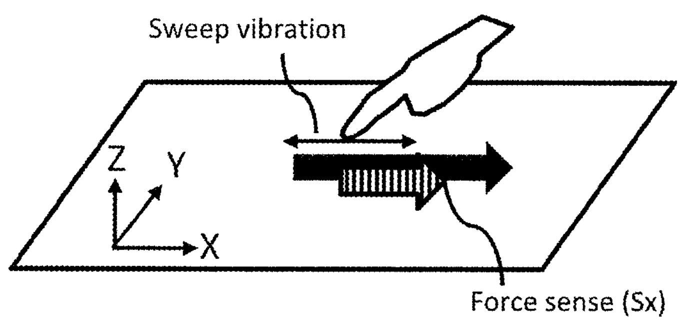

- Object: To guide a movement of a finger between buttons.
- Means: The intensity/amplitude of a stimulus/vibration is controlled.
- Advantageous effects: It is difficult for a finger to stay at a position between buttons, and the finger is thus guided to one of the buttons.
- A finger is guided as if it is guided by an attractor in a potential field on a flat panel.

FIG.135

[Control method]

- A pointer is operated on a panel to move between buttons.
- Once the pointer has come out of the button region, it is guided to a next button.
- The panel amplitude becomes larger at positions closer to the center of the guidance section (and becomes smaller at positions farther from the center).
- The direction of a force sense is switched in the center of the guidance section.

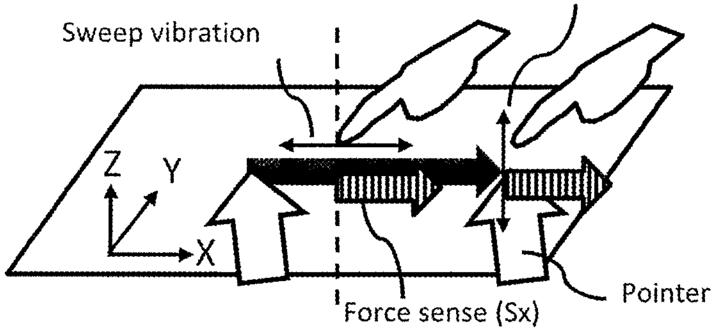

- Object: To present a sense of touching an edge of a button.
- Means: A click vibration is generated at the end of the guidance section.
- Advantageous effects: A sense of the presence of an edge is presented.
- A sense of floating of a button is presented.

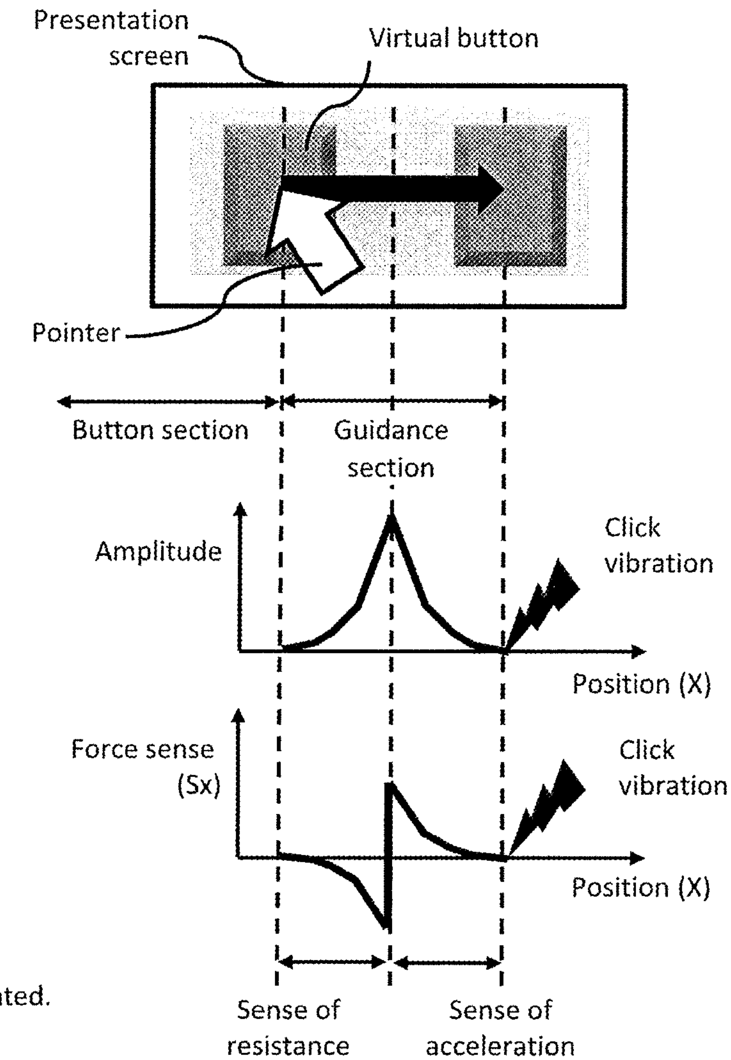

FIG.136

[Control method]

- A pointer is operated on a panel to move between buttons.
- Once the pointer has come out of the button region, it is guided to a next button.
- The panel amplitude becomes larger at positions closer to the center of the guidance section (and becomes smaller at positions farther from the center).
- The direction of a force sense is switched in the center of the guidance section.

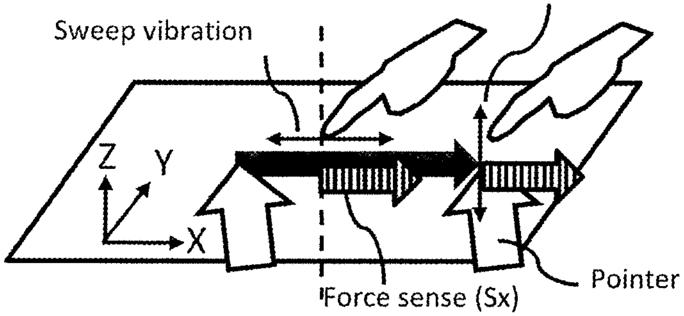

- Object: To present a sense of touching an edge of a button.
- Means: A masking vibration is generated at an edge portion.
- Advantageous effects: A sense of the presence of an edge is presented.
- A sense of touching a step of a button or a recess is presented on a flat panel.

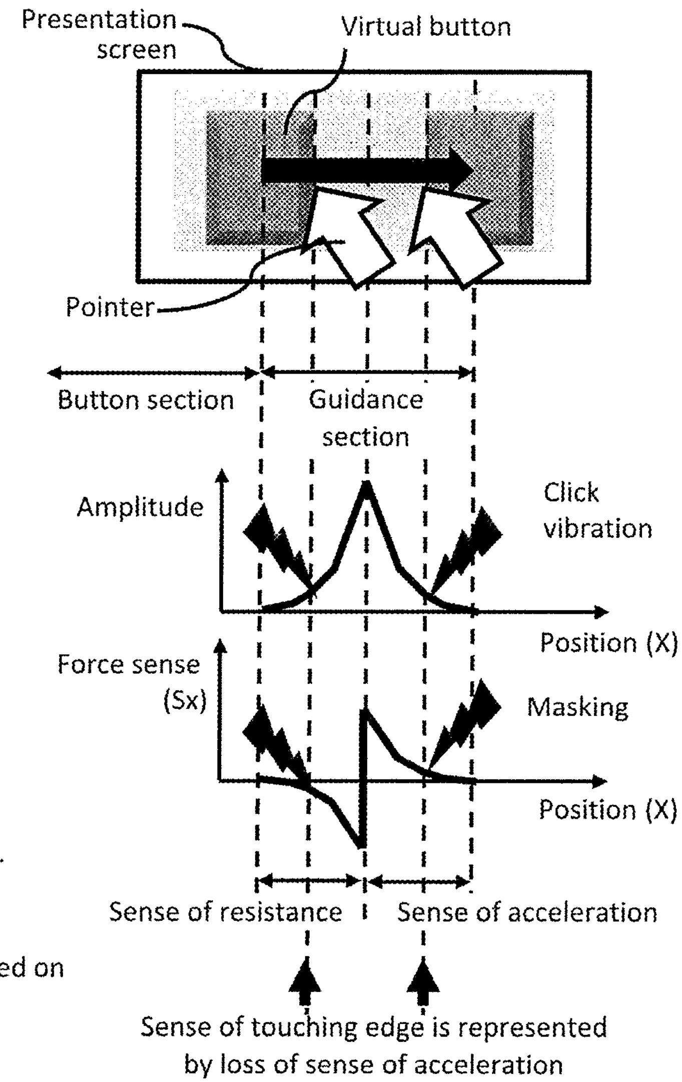

FIG.137

- Object: To stably present a haptic sense as a sense of operating a slider.
- Means:
  - A pointer is operated on a panel to move between buttons.
  - Once the pointer has come out of the button region, it is guided to a next button.
  - The panel amplitude becomes larger at positions closer to the center of the guidance section (and becomes smaller at positions farther from the center).
  - The direction of a force sense is switched in the center of the guidance section.
- Advantageous effects: A sense of operating a slider is presented.

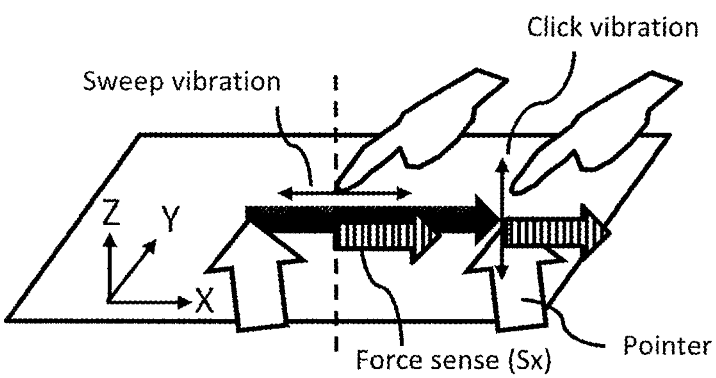

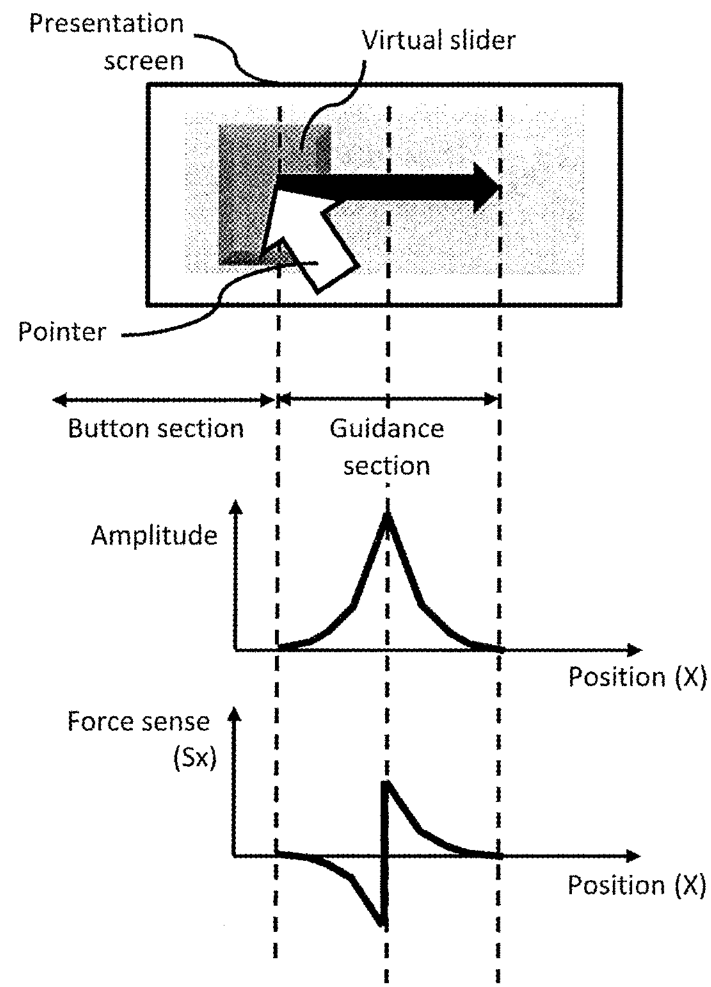

FIG.138
- Object: To stably present a haptic sense as a sense of operating a slider.
- Means: A click vibration is generated at an end point of a slider.
- Advantageous effects: A sense of operating a slider is presented.
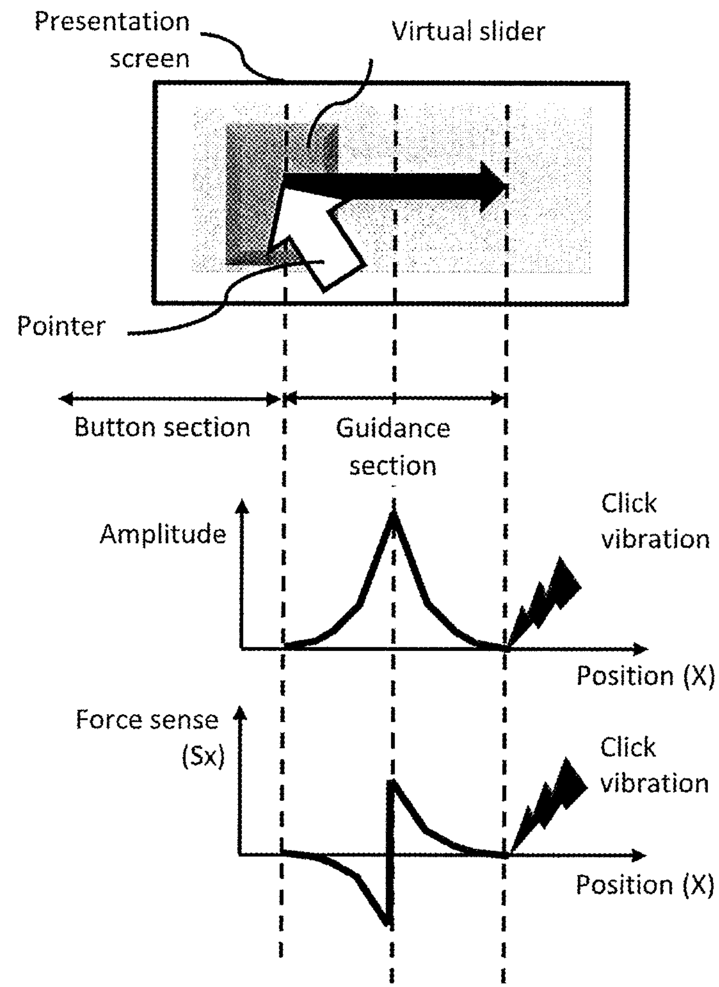
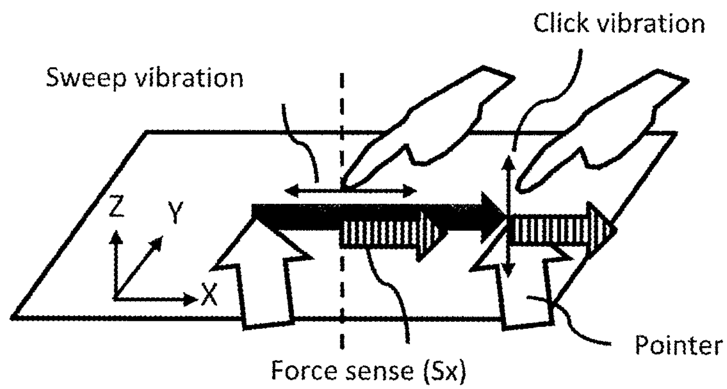

- Object: To stably present a haptic sense during sweeping.
- Means: Static friction and dynamic friction are separately controlled.
- Advantageous effects: A haptic sense is stably presented.
- Stable presentation is performed in different control modes.

FIG.141
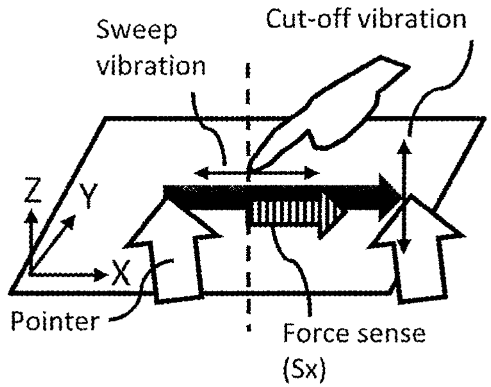
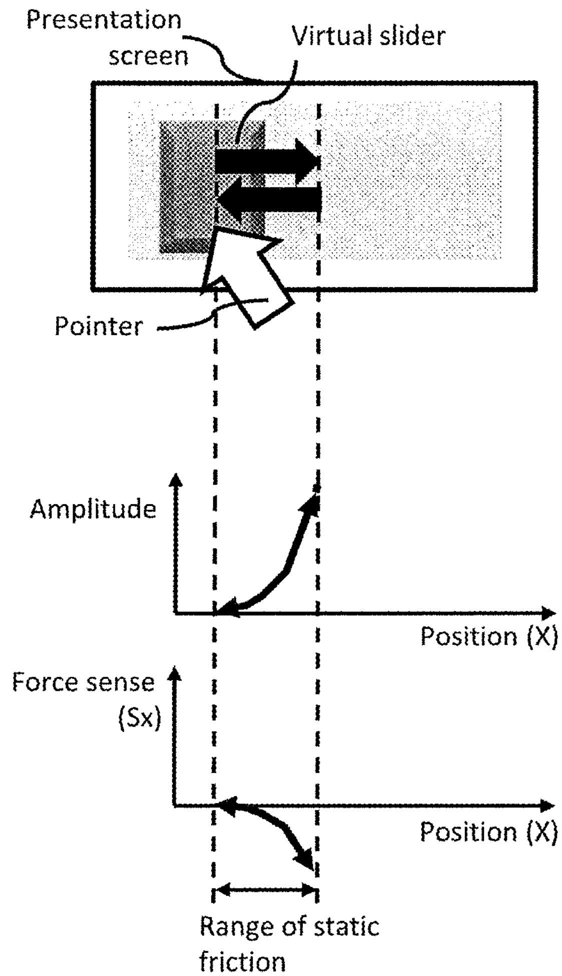
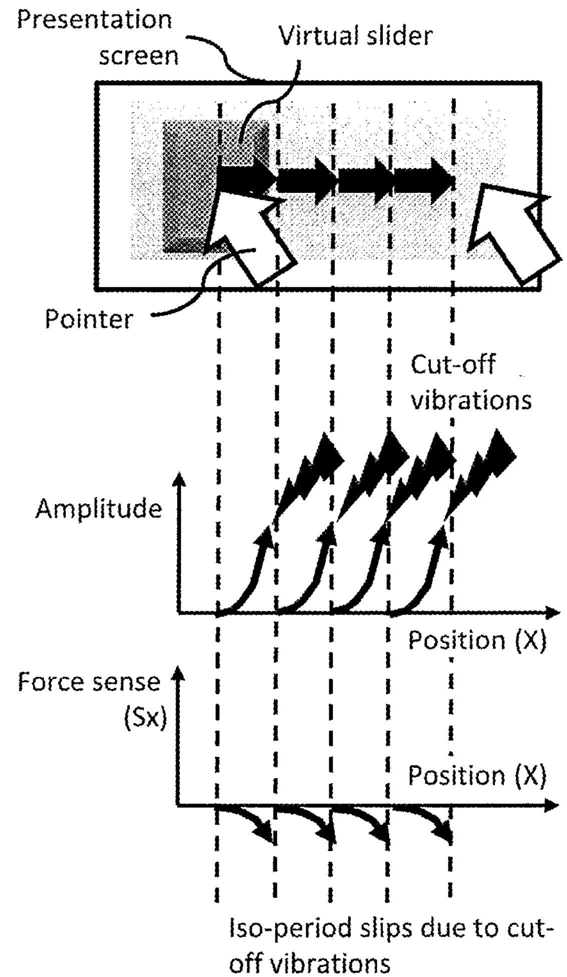
- Object: To stably present a haptic sense during sweeping.
- Means: Vibration phase is coherently controlled by cut-off vibrations.
- Advantageous effects: A haptic sense is stably presented.
- Stable presentation is performed in different control modes.

FIG.142
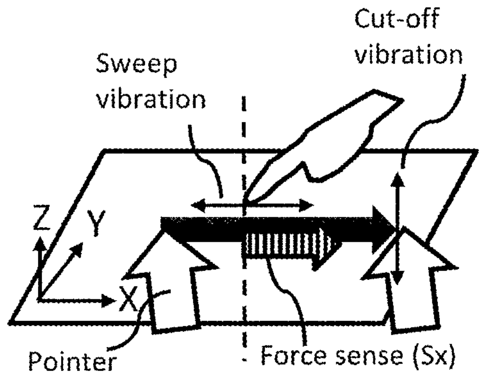
- Object: To stably present a haptic sense during sweeping.
- Means: A finger (body) is fixed to move a virtual slider. Then, the virtual slider is fixed to slide the finger, and such motions are reciprocated.
- Advantageous effects: A sense of operating a slider is presented.
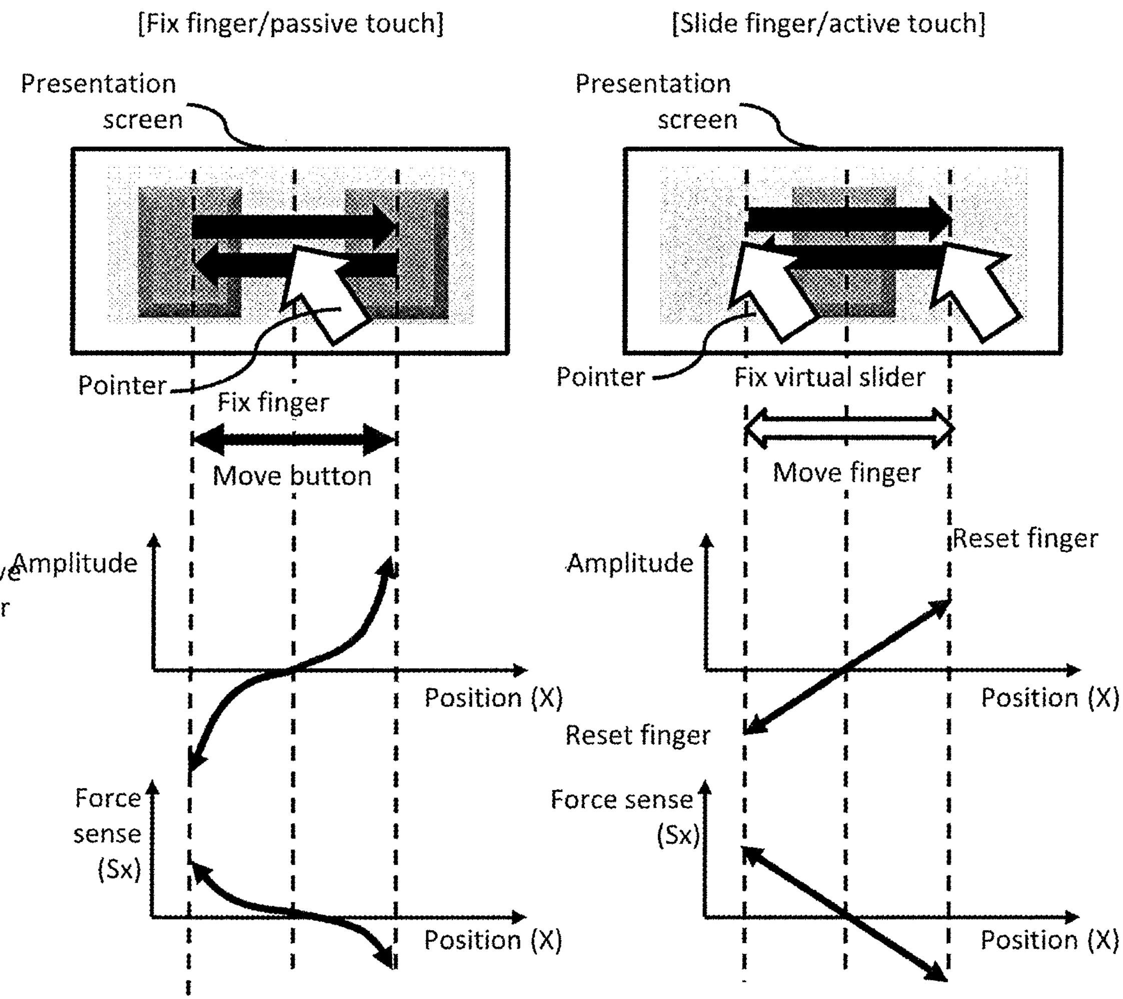

FIG.143
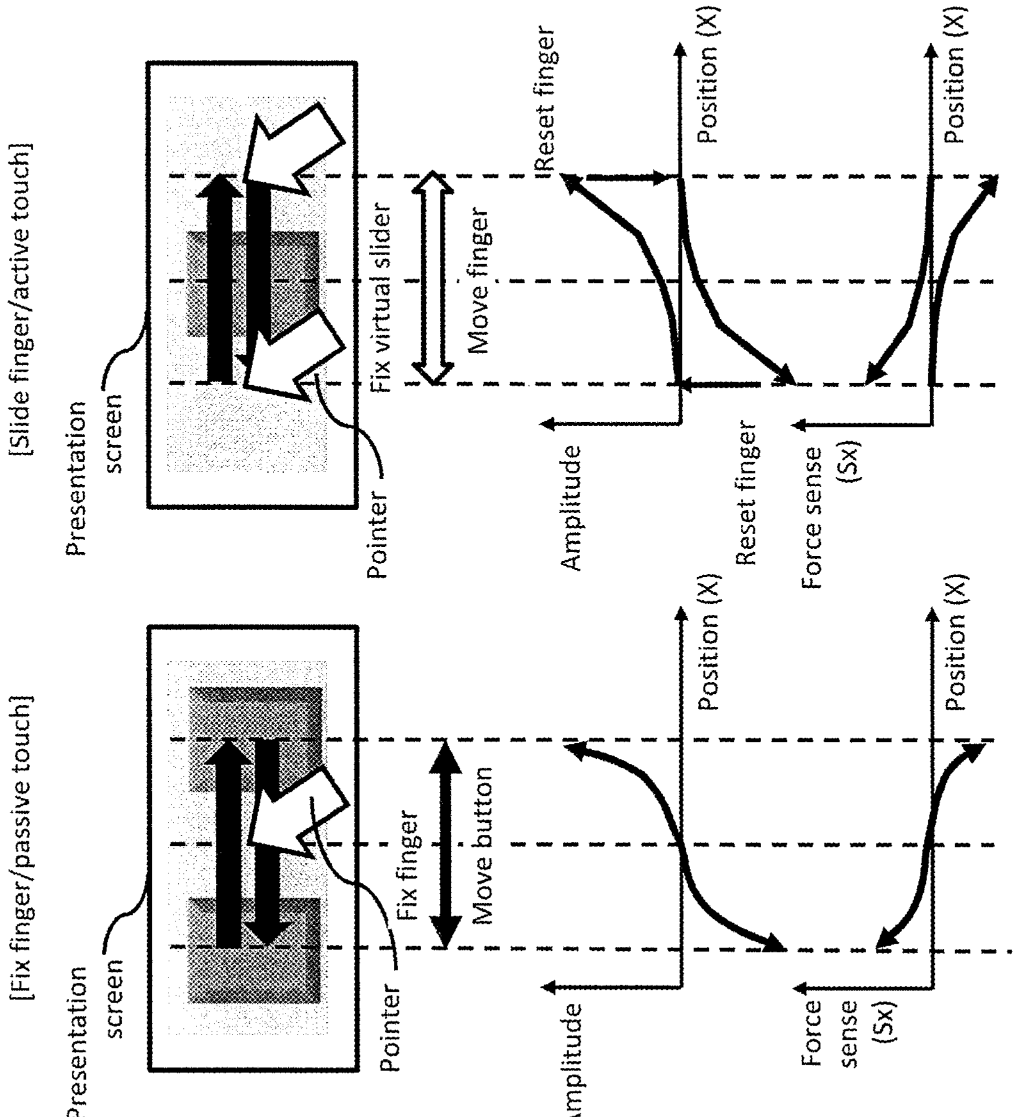
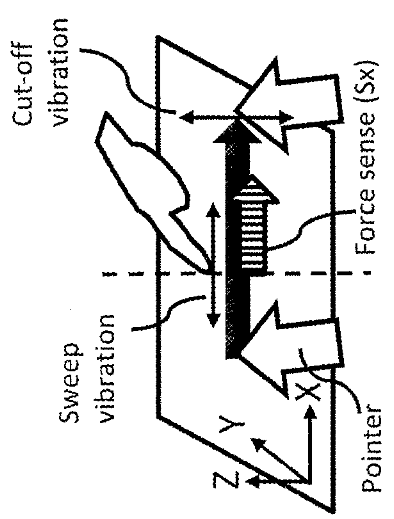
- Object: To stably present a haptic sense during sweeping.
- Means: A finger (body) is fixed to move a virtual slider. Then, the virtual slider is fixed to slide the finger, and when the finger reaches an end, the finger is reset (the finger is lifted off the panel).
- Advantageous effects: A sense of operating a slider is presented.

FIG.144
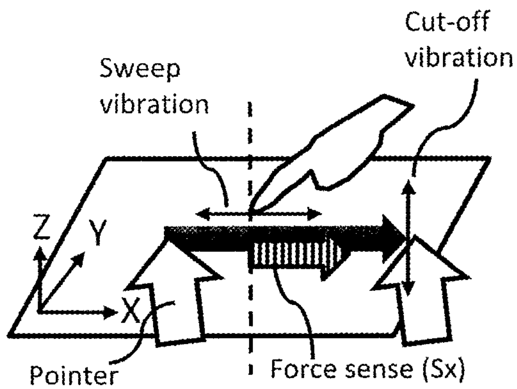
- Object: To stably present a haptic sense during sweeping.
- Means: A finger (body) is fixed to move a virtual slider. Then, the virtual slider is fixed to slide the finger, and when the finger reaches an end, the finger is reset (cut-off vibration).
- Advantageous effects: A sense of operating a slider is presented.
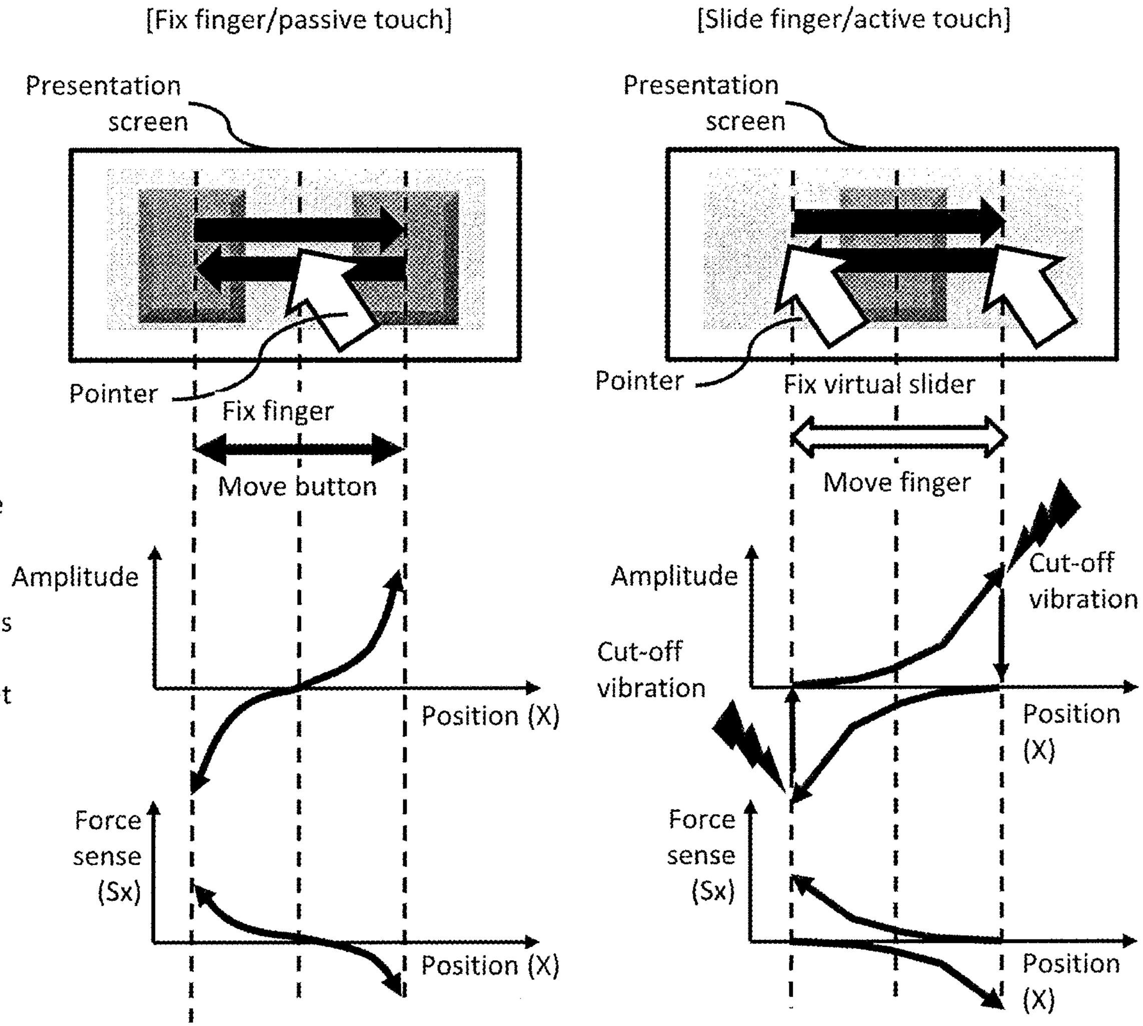

FIG.145
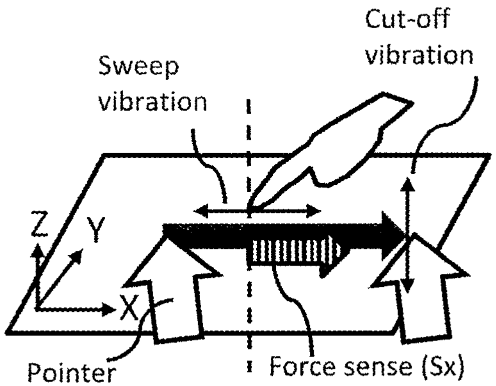
- Object: To stably present a haptic sense during sweeping.
- Means: A finger (body) is fixed to move the virtual slider. Then, the virtual slider is fixed to slide the finger. When the friction exceeds the tension limit, the fixed contact is released.
- Advantageous effects: A sense of operating a slider is presented.
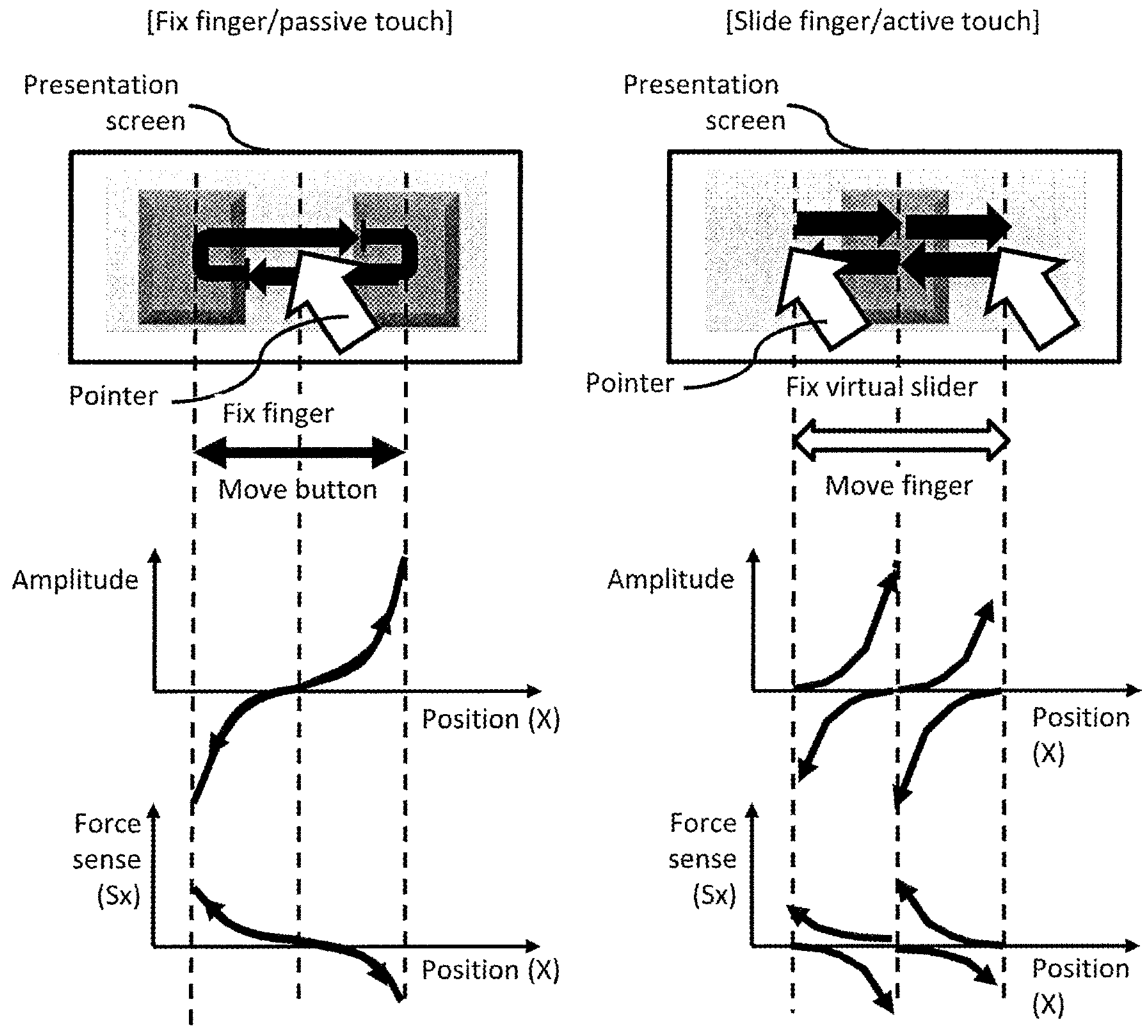

FIG.146

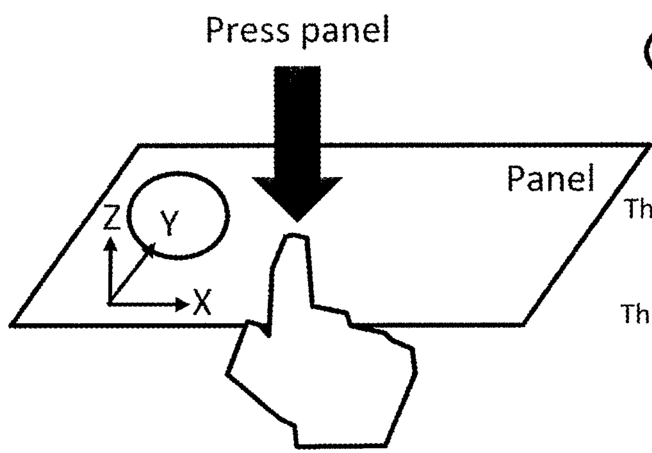

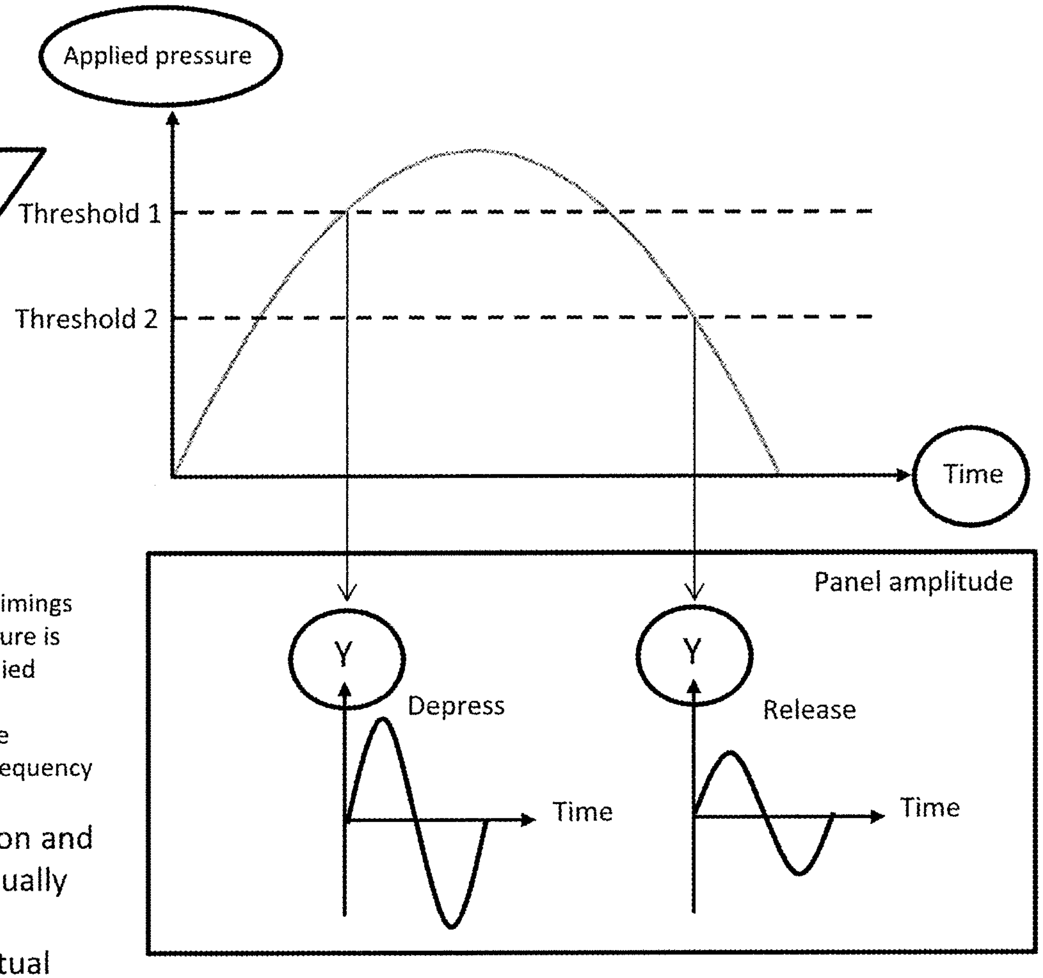

Notes: Pulse stimulus is generated by trigger.

- Object: To present a sense of depressing a button.
- Means:
  - Amplitude (vibration) is applied to a panel at timings when the threshold 1 (while the applied pressure is increased) and the threshold 2 (while the applied pressure is decreased) are exceeded.
  - The hardness of a button is represented by the threshold values and the amplitude and the frequency of the panel.
- Advantageous effects: A sense of depression and depth can be felt on a panel that is not actually depressed.
- A sense of depression is felt without an actual physical depression.

FIG.147

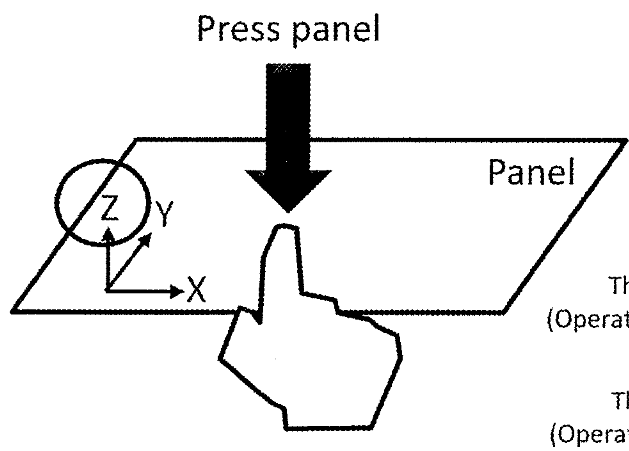

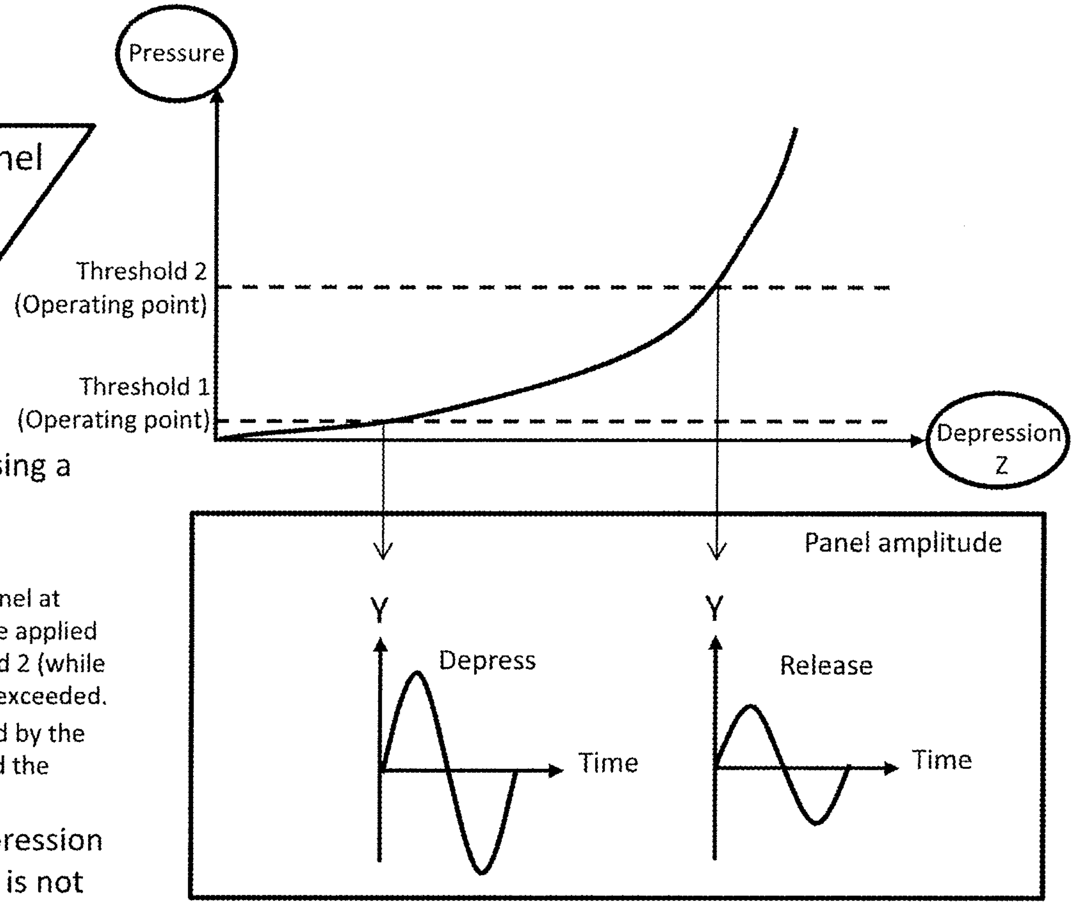

Notes: Pulse stimulus is generated by trigger.

- Object: To present a sense of depressing a button.
- Means:
  - Amplitude (vibration) is applied to a panel at timings when the threshold 1 (while the applied pressure is increased) and the threshold 2 (while the applied pressure is decreased) are exceeded.
  - The hardness of a button is represented by the threshold values and the amplitude and the frequency of the panel.
- Advantageous effects: A sense of depression and depth can be felt on a panel that is not actually depressed.
- A sense of depression is felt without an actual physical depression.

- Object: To present a sense of depressing a button.
- Means: A plurality of thresholds are preset to represent a sense of pressing a button halfway, etc.
- Advantageous effects: A sense of pressing a shutter button of a camera halfway, for example, is presented.
- A sense of keeping a shutter focus is presented.

- Object: To present a sense of depressing a button.
- Means: A plurality of thresholds are preset to represent a sense of pressing a button halfway, etc.
- Advantageous effects: A sense of pressing a shutter button of a camera halfway, for example, is presented.
- A sense of keeping a shutter focus is presented.

- Object: To present a sense of depressing a button.
- Means: Depression and Release are separately performed (without release at the first time and with release at the second time).

FIG.151
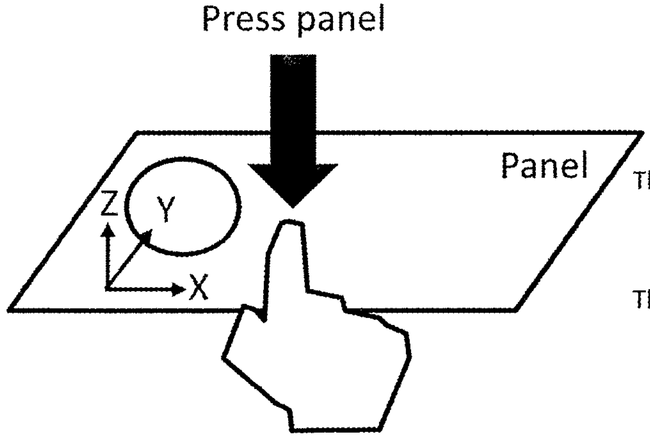
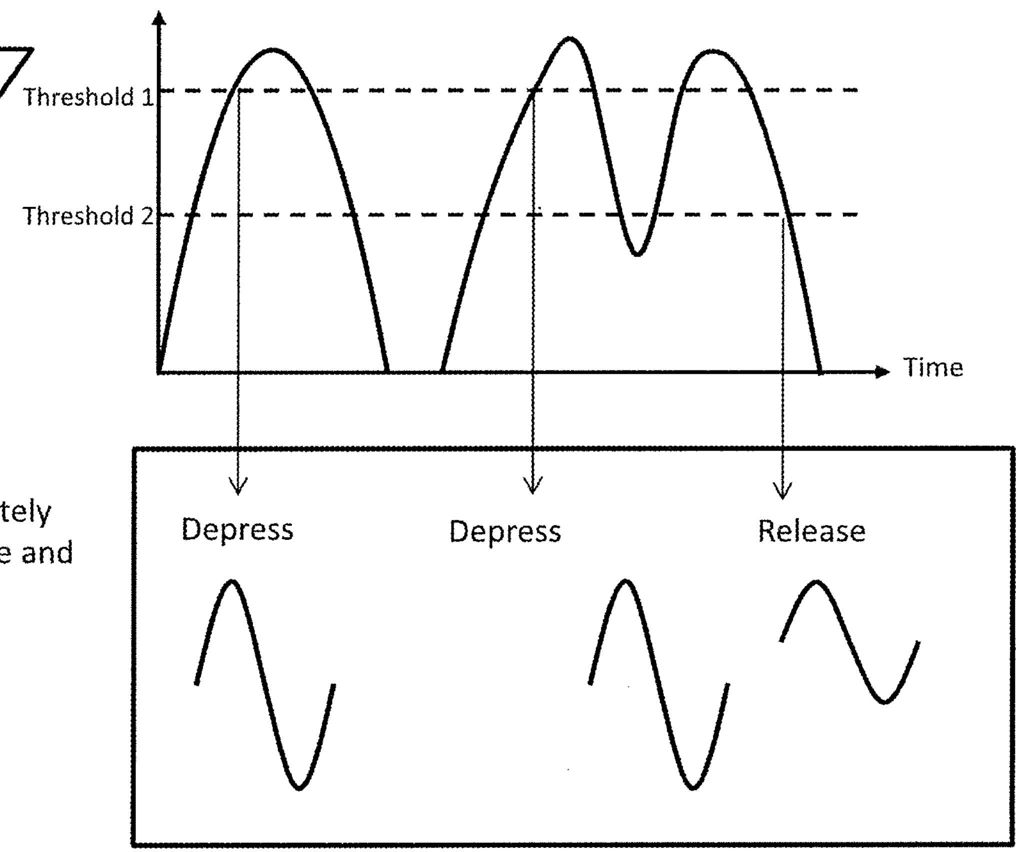
- Object: To present a sense of depressing a button.
- Means: Depression and Release are separately performed (without release at the first time and with release at the second time).

FIG.152
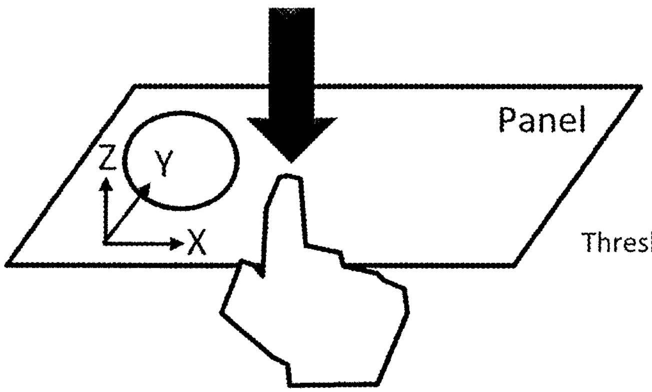
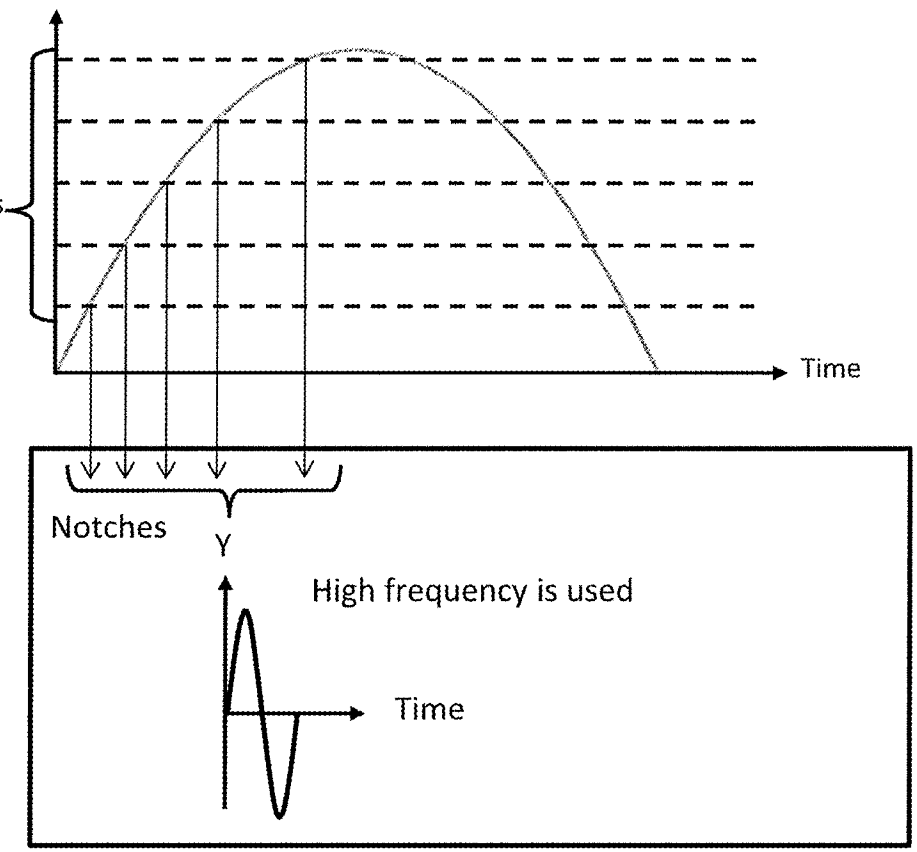
- Means: Pulse thresholds for notches are generated at regular intervals.
- Advantageous effects: A sense of pressing a knife into mille-feuille or chocolate-coated ice cream is presented.
Notes: Notch = click-clack

- Means: Pulse thresholds for notches are generated at regular intervals.
- Advantageous effects: A sense of pressing a knife into mille-feuille or chocolate-coated ice cream is presented.

- Means: Pulse thresholds for notches are generated at regular intervals.
- Advantageous effects: A sense of pressing a knife into mille-feuille or chocolate-coated ice cream is presented.

- Means: Pulse thresholds for notches are generated at regular intervals.
- Advantageous effects: A sense of pressing a knife into mille-feuille or chocolate-coated ice cream is presented.

Y is the depth direction of the panel seen from a user.

FIG.157
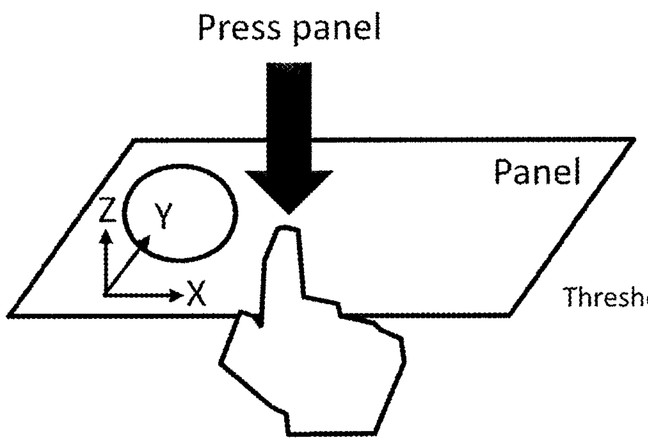
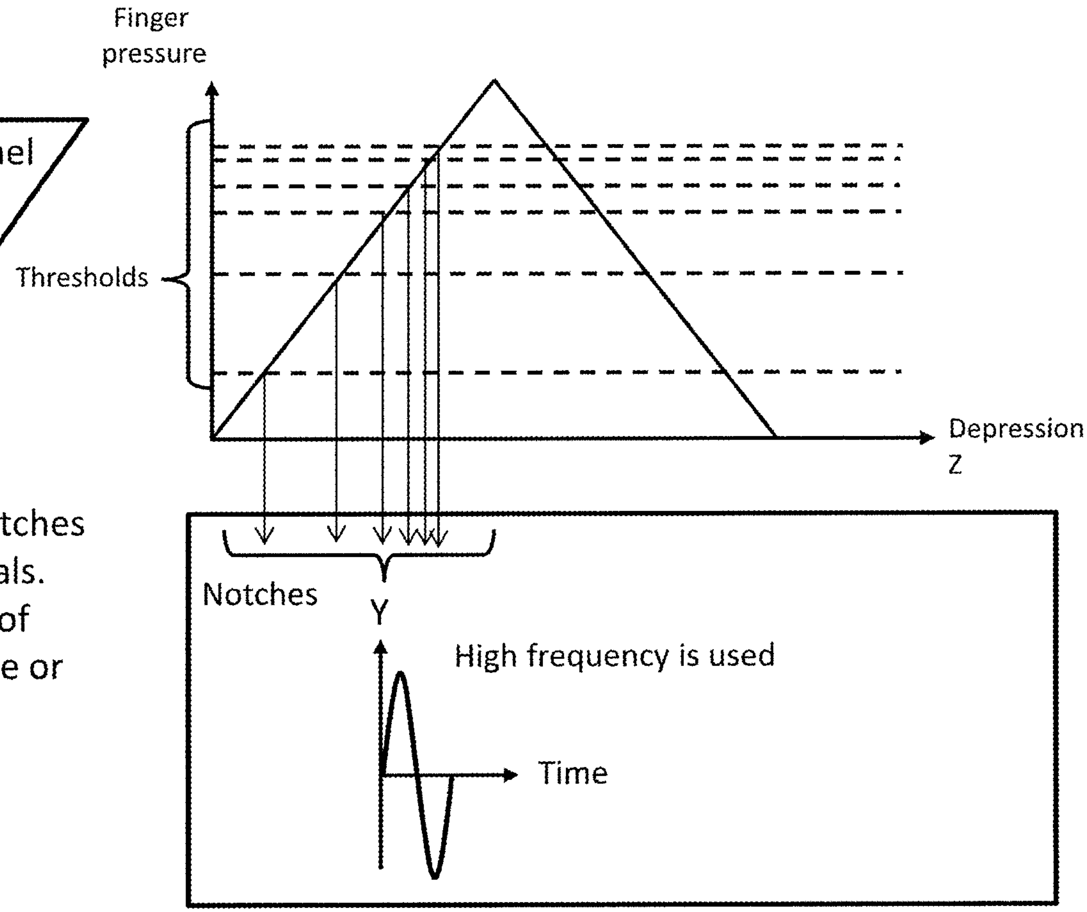
- Means: Pulse thresholds for notches are generated at regular intervals.
- Advantageous effects: A sense of pressing a knife into mille-feuille or chocolate-coated ice cream is presented.

FIG.159
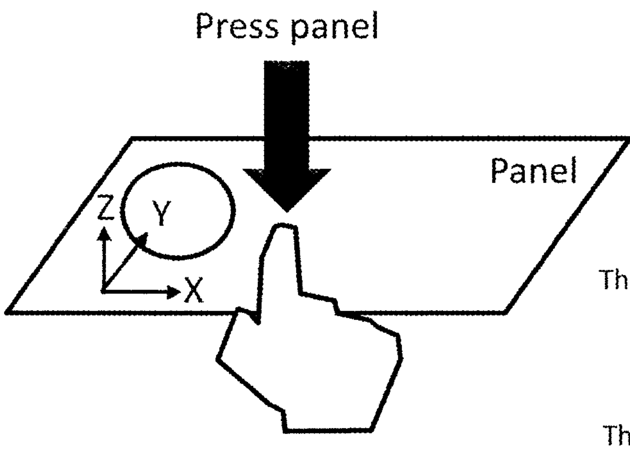
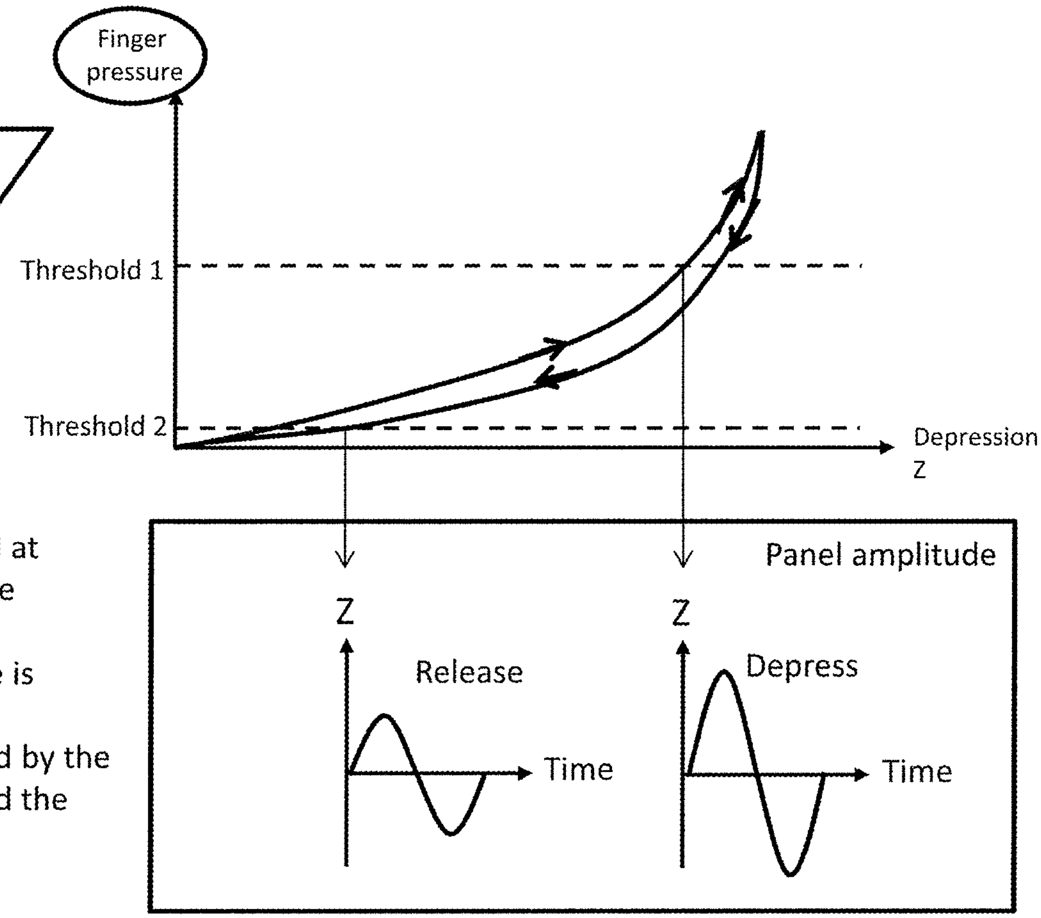
- Means: Amplitude is applied to a panel at timings when the threshold 1 (while the applied pressure is increased) and the threshold 2 (while the applied pressure is decreased) are exceeded.
- The hardness of a button is represented by the threshold values and the amplitude and the frequency of the panel.
Notes: Pulse stimulus is generated by trigger.

FIG.160

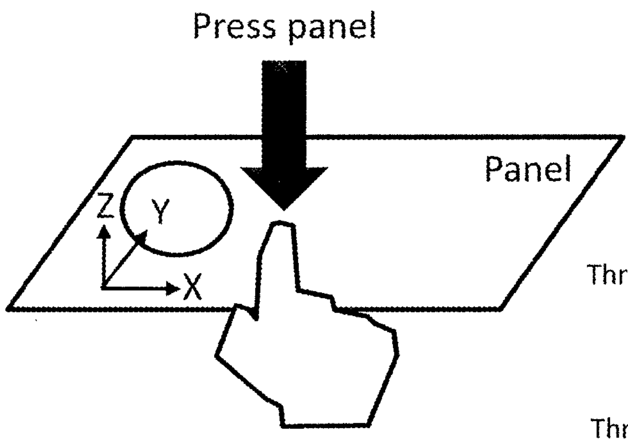

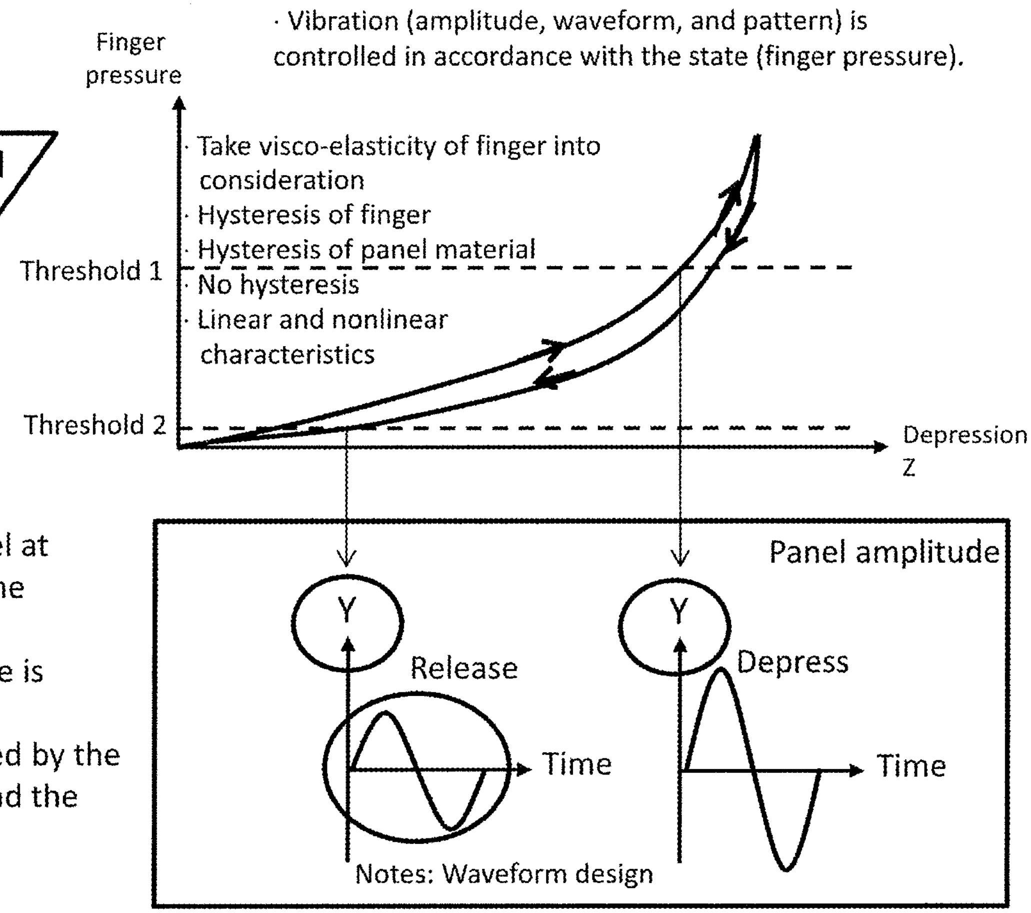

Notes: Not vibration in the Z-direction but vibration in the Y-direction.

- Means: Amplitude is applied to a panel at timings when the threshold 1 (while the applied pressure is increased) and the threshold 2 (while the applied pressure is decreased) are exceeded.
- The hardness of a button is represented by the threshold values and the amplitude and the frequency of the panel.

FIG.163
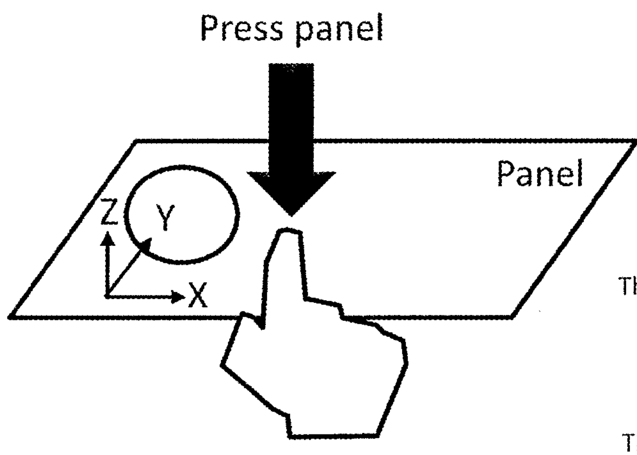
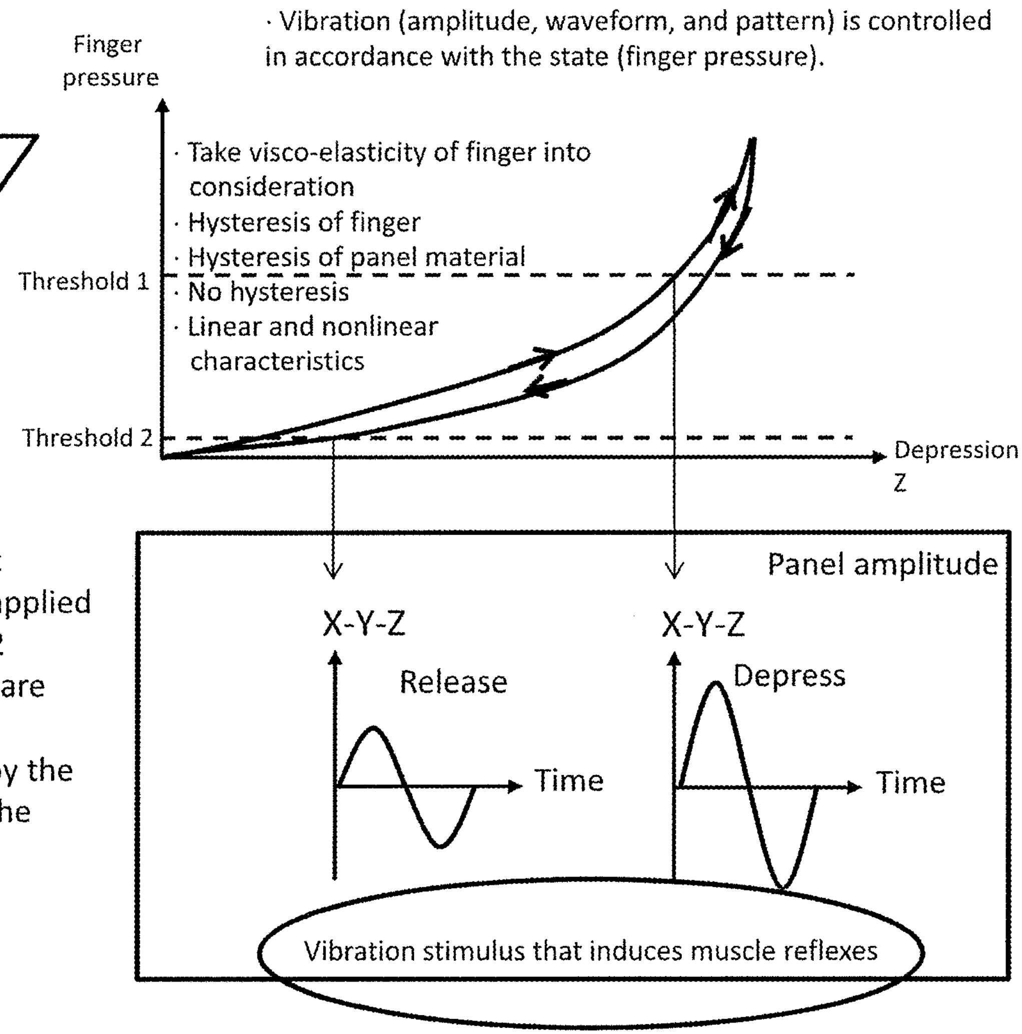
- Means: Amplitude is applied to a panel at timings when the threshold 1 (while the applied pressure is increased) and the threshold 2 (while the applied pressure is decreased) are exceeded.
- The hardness of a button is represented by the threshold values and the amplitude and the frequency of the panel.

FIG.169

- Amplitude is applied to a panel at timings when the threshold 1 (while the applied pressure is increased) and the threshold 2 (while the applied pressure is decreased) are exceeded.
- The hardness of a button is represented by the threshold values and the amplitude and the frequency of the panel.

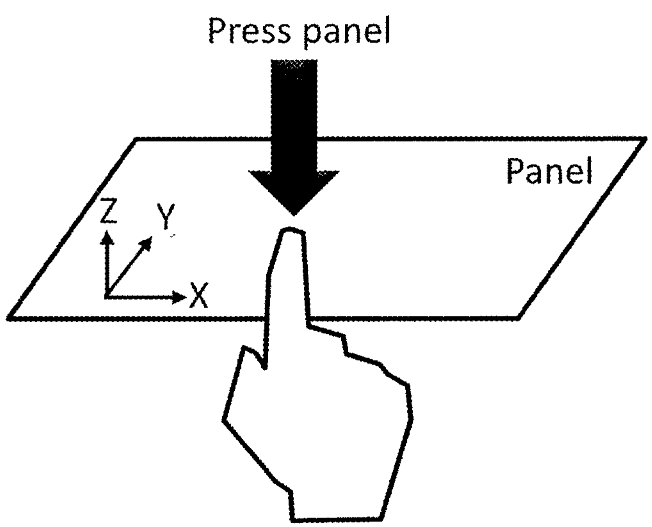

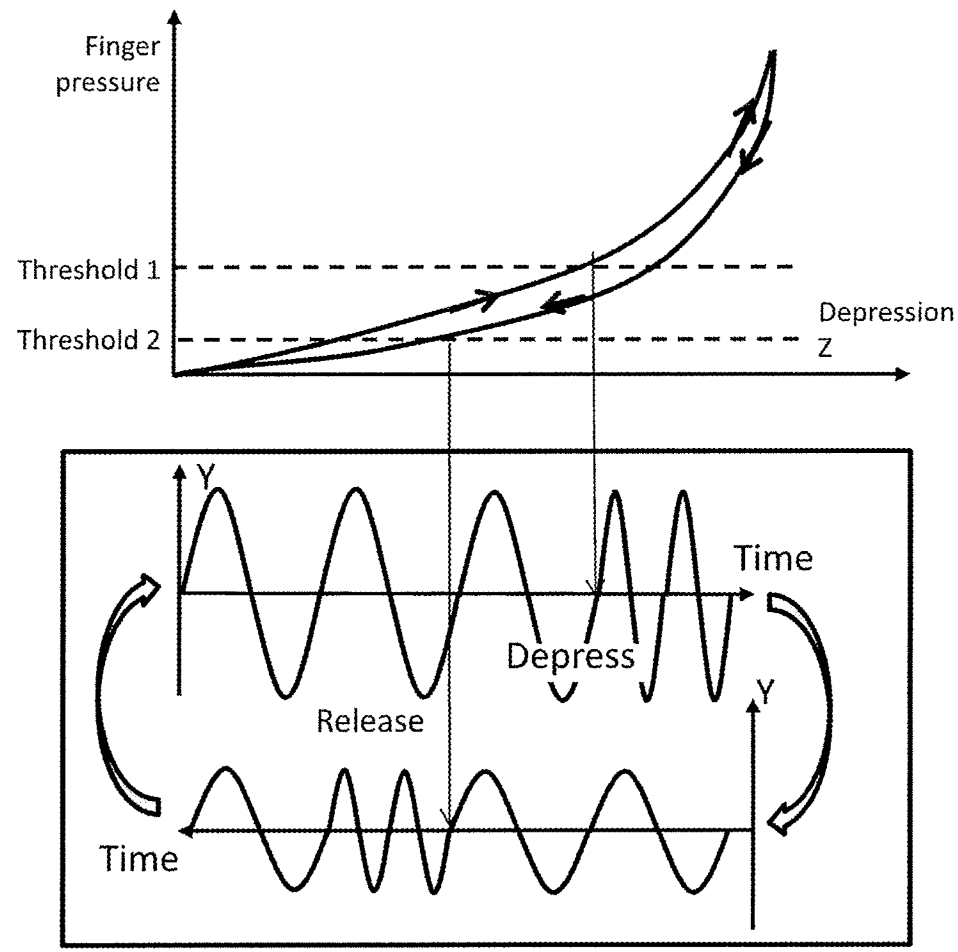

Notes: Vibration is always generated, but is weak except during depression and release.

FIG.170

- Amplitude is applied to a panel at timings when the threshold 1 (while the applied pressure is increased) and the threshold 2 (while the applied pressure is decreased) are exceeded.
- The hardness of a button is represented by the threshold values and the amplitude and the frequency of the panel.

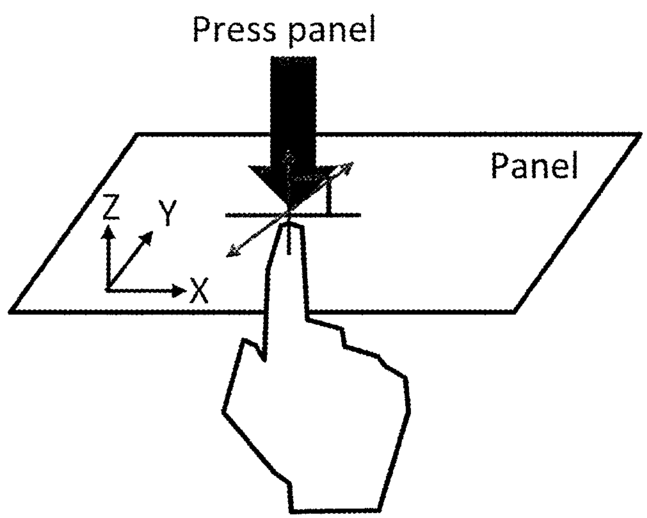

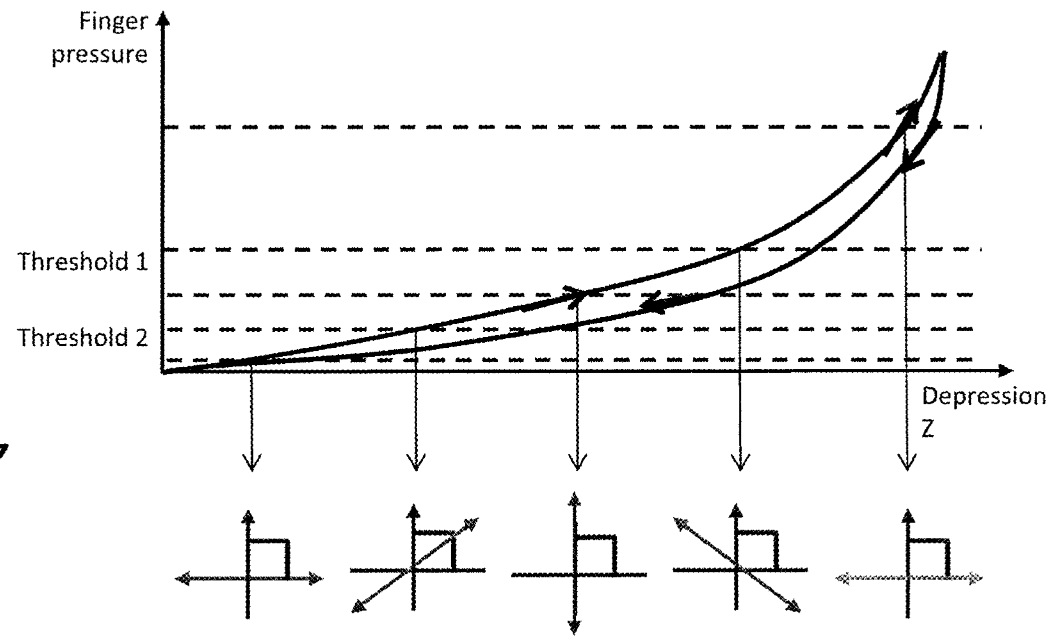

Notes: Vibration phase is controlled in accordance with pressing/finger pressure.

Notes: Phase control → performed from the tensor viewpoint (Perpendicular, parallel, oblique, or twisted position)

FIG.174

- Object: To implement a haptic sense dial
- Means: Vibration direction is controlled for each position phase. Vibration can be controlled in the 3D direction.
- Advantageous effects: A variety of touches of a dial are implemented.
- A real touch of a dial is implemented on a flat panel.
- A physical or analog dial mechanism is not needed.

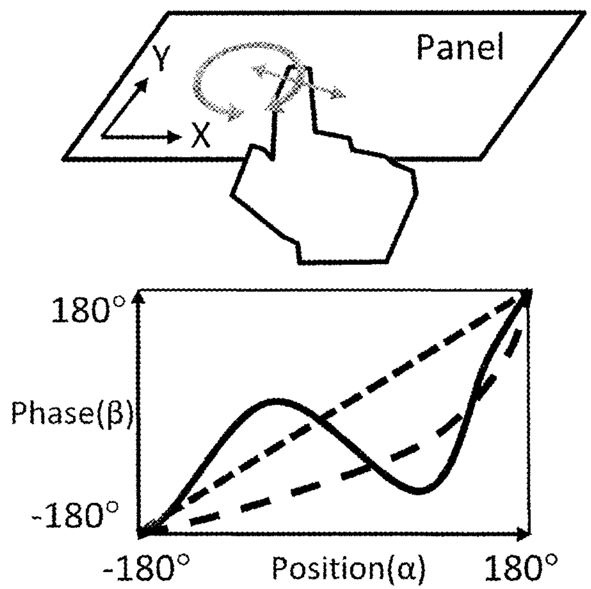

Notes: Other control functions:
Phase, amplitude, frequency, and acceleration or deceleration

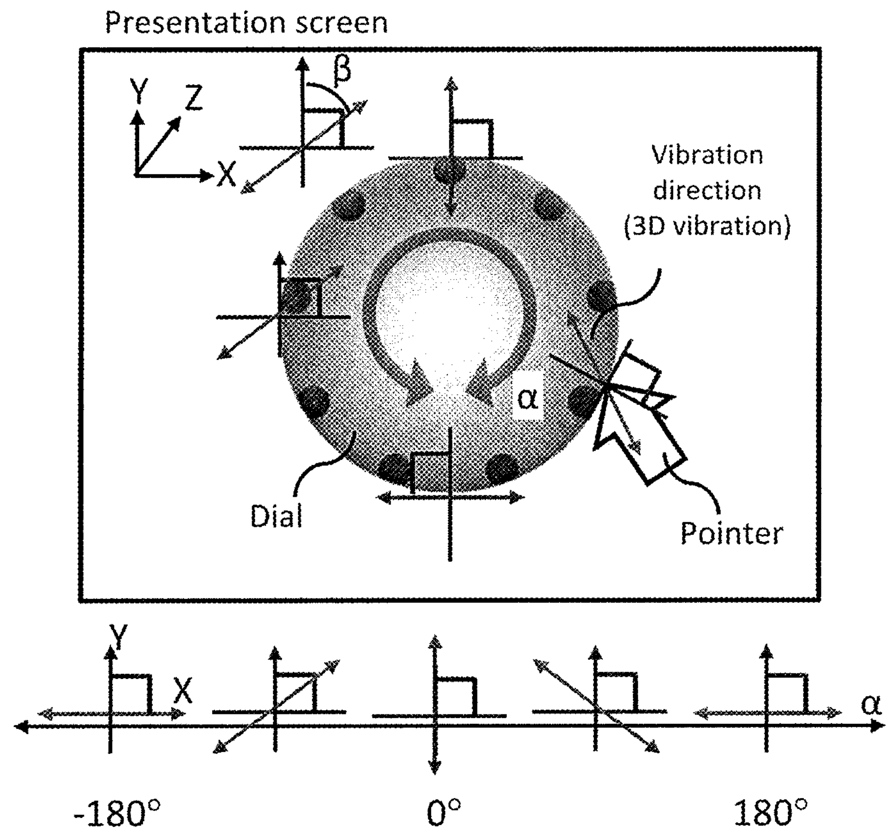

- A pointer is operated on a panel to turn a dial.
- Amplitude is applied to the panel in the direction parallel with the tangent to the dial.
- To represent sliding, control is further performed so that a force sense is presented in the direction in which the dial is turned.

FIG.176
- A pointer is operated on a panel to turn a dial.
- Amplitude is applied to the panel in the direction perpendicular to the tangent to the dial.
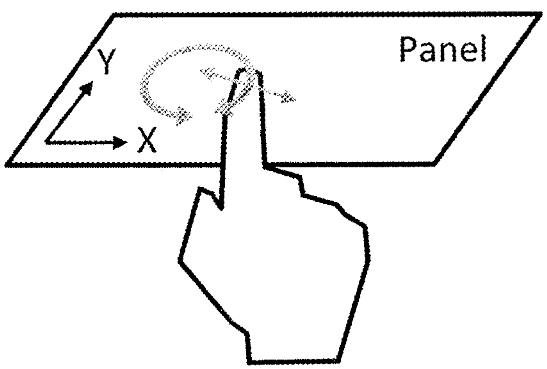
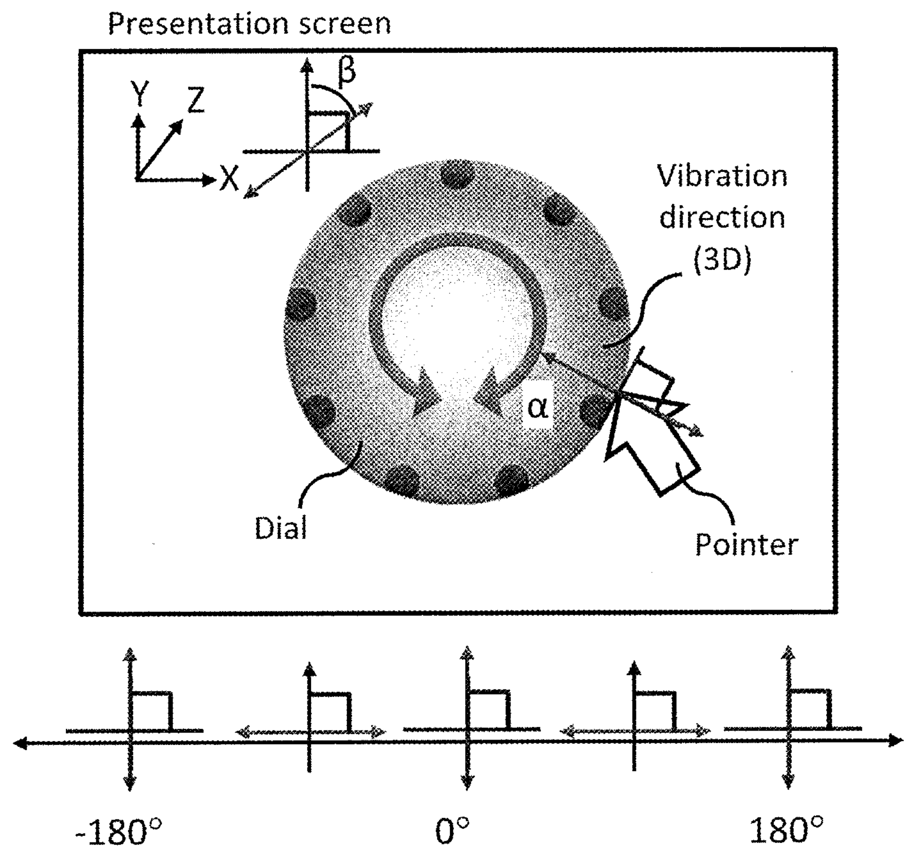

FIG.177
- A pointer is operated on a panel to turn a dial.
- Amplitude is applied to the panel in the direction perpendicular to the tangent to the dial.
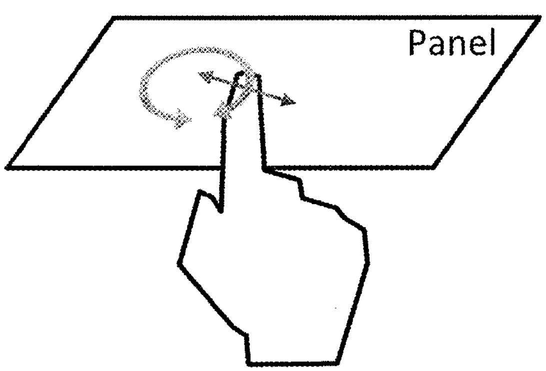
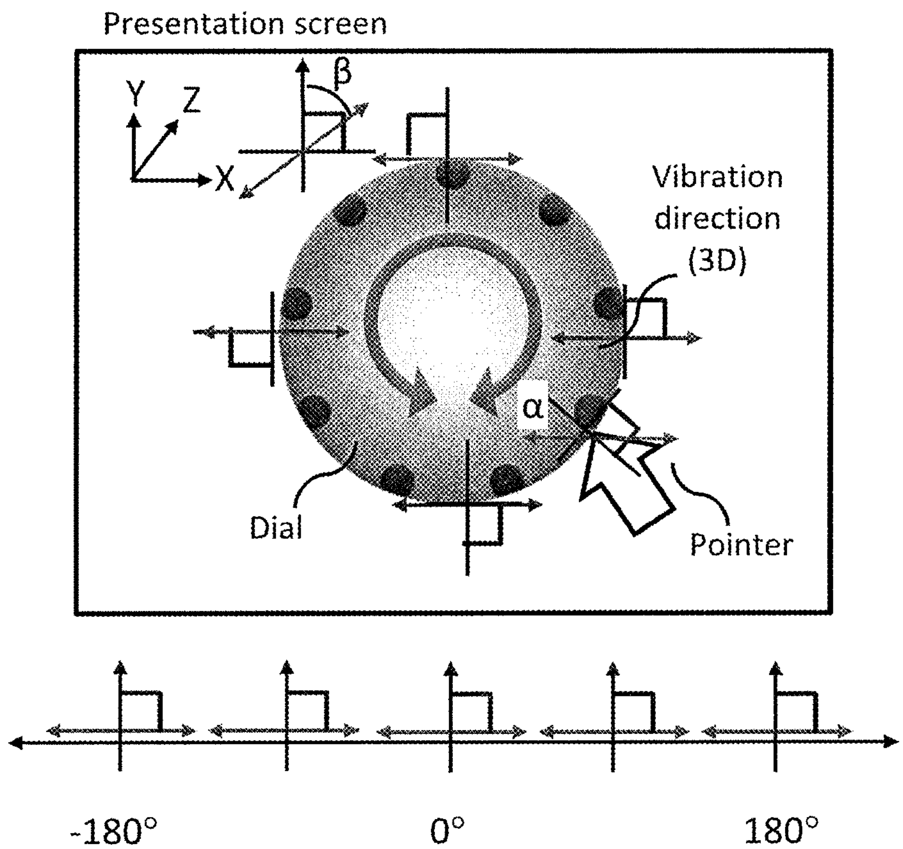

FIG.178
- A pointer is operated on a panel to turn a dial.
- Amplitude is applied to the panel in the direction perpendicular to the tangent to the dial.
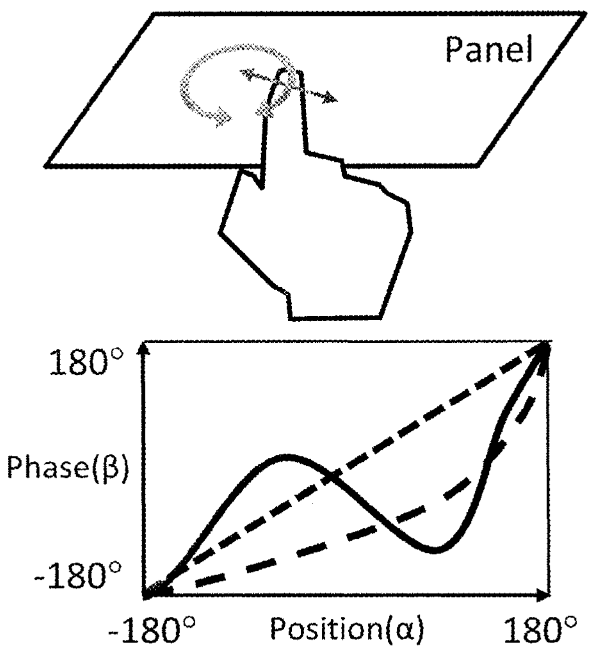
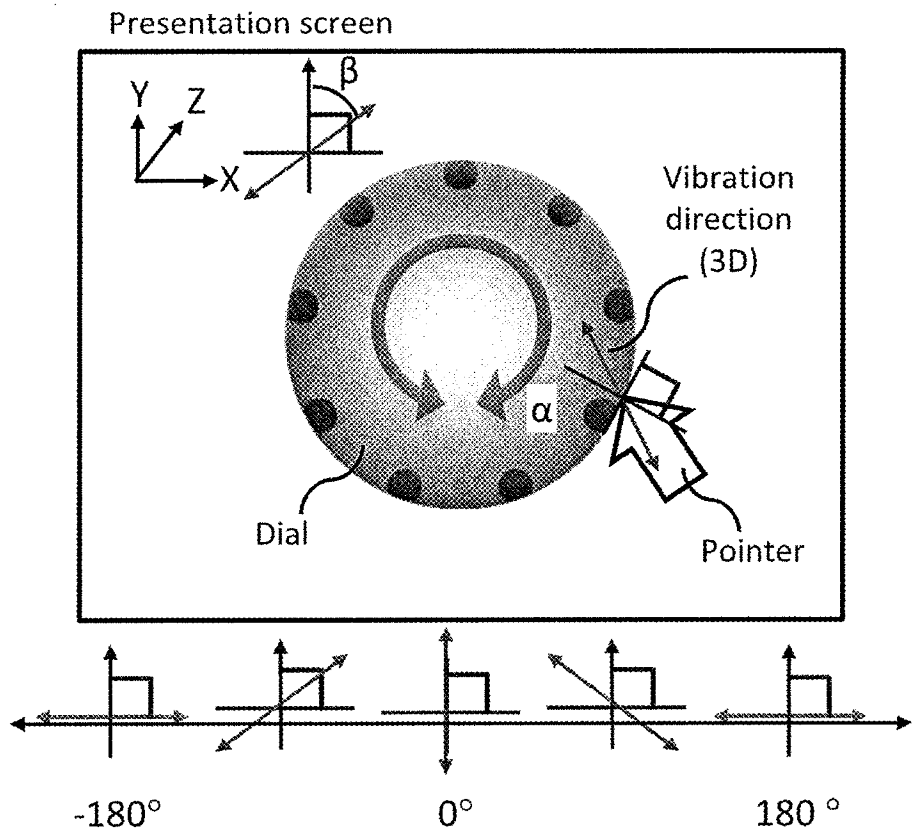
- Method: Phase (Vibration plane) is changed for each position.
- Results: a variety of ... touches are generated.

FIG.179
- A pointer is operated on a panel to turn a dial.
- Amplitude is applied to the panel in the direction perpendicular to the tangent to the dial.
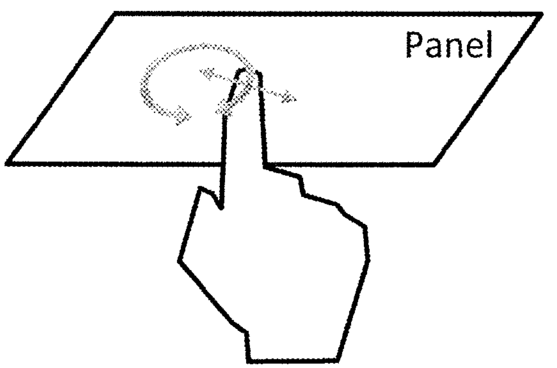
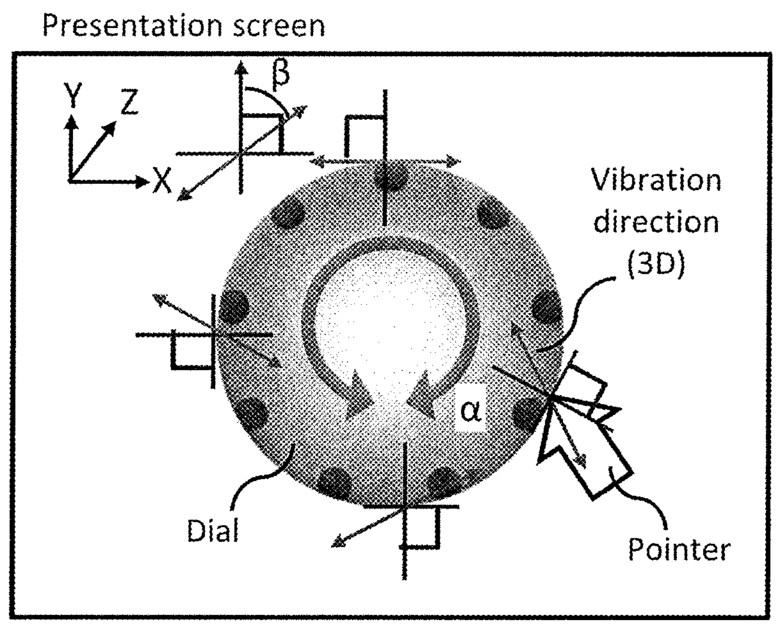

FIG.180
- Object: To present a touch of a rotary encoder.
- Means: Click vibration is generated at regular intervals of the position phase.
- Advantageous effects: A sense of touching a digital dial is presented. A sense of operating a volume knob is presented.
- A sense of controlling a digital volume is presented on a flat panel is presented.
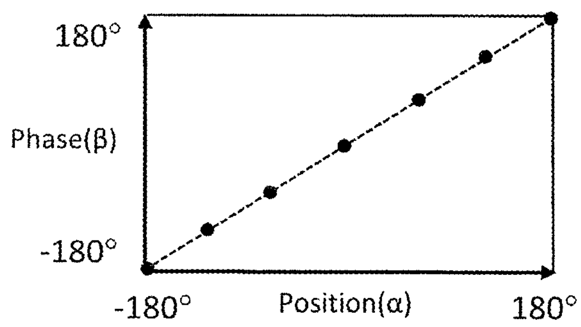
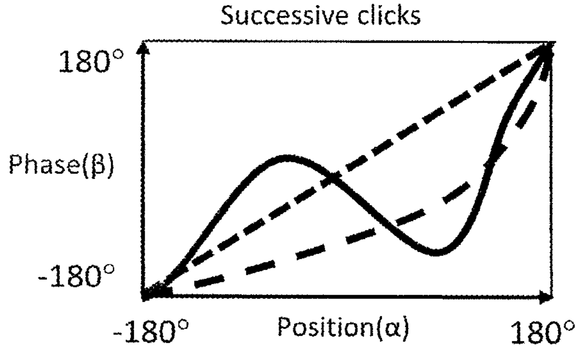
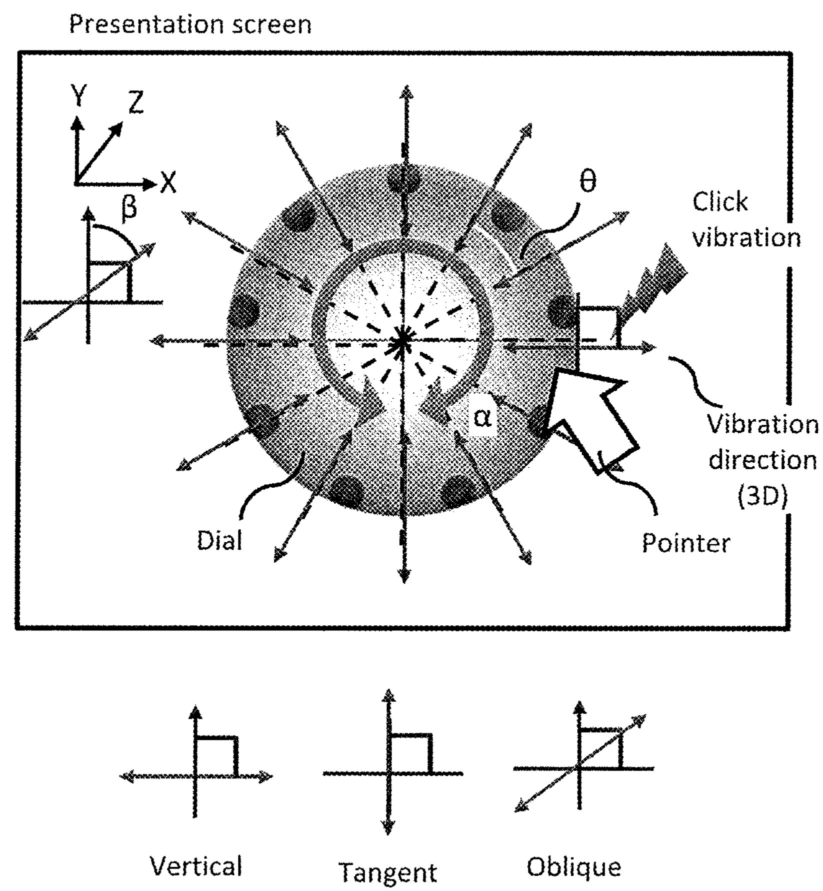

FIG.181

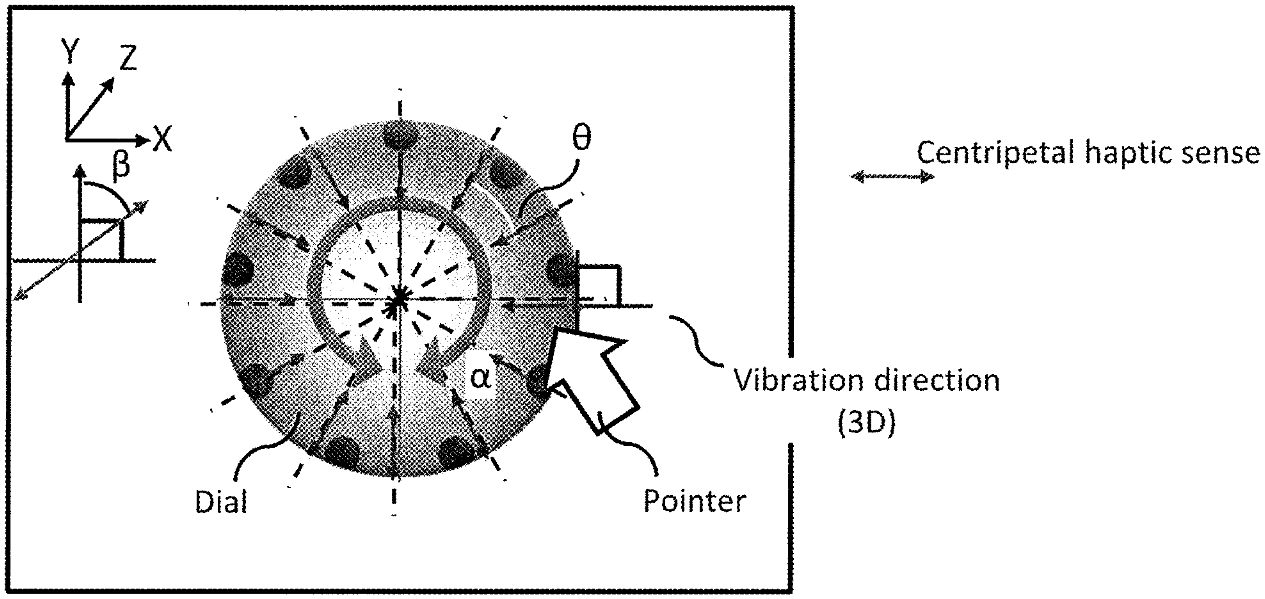

- Object: To present a sense of operating a volume on the circumference of a circle.
- Means: A centripetal haptic sense is represented at regular intervals of the position phase.
- Advantageous effects: A sense of stopping a finger within the circumference or moving a finger on the circumference is presented.
- A sense of operating an actual rotary volume on the circumference is presented.

FIG.182

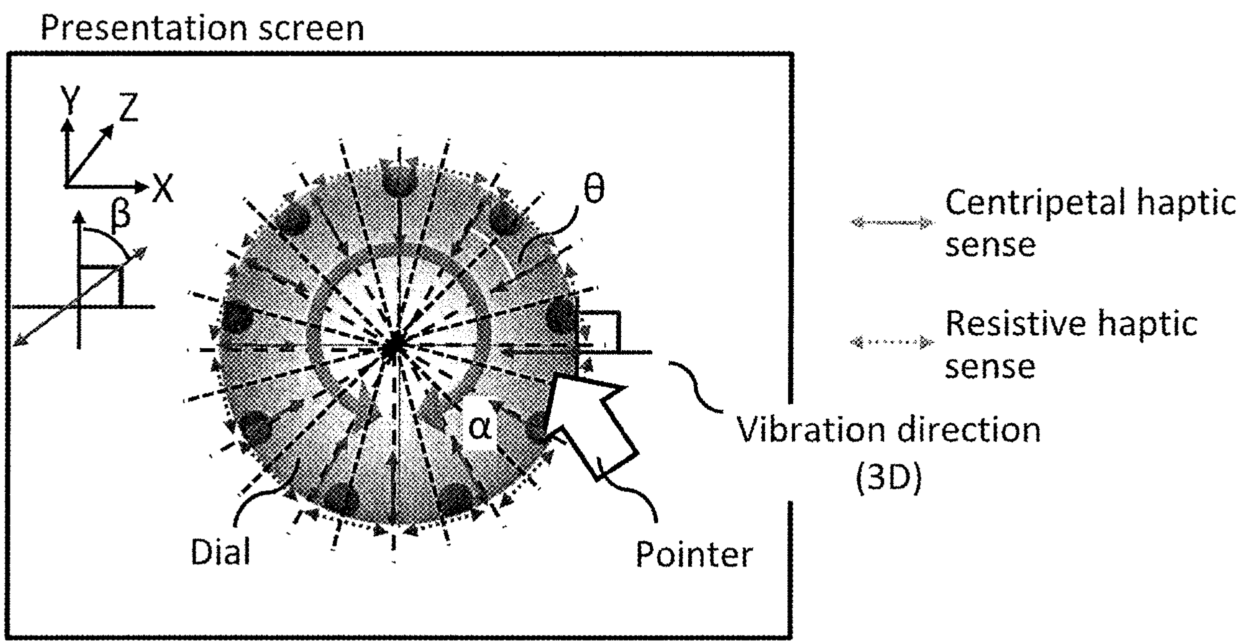

- Object: To present a sense of operating a volume on the circumference of a circle.
- Means: A centripetal haptic sense and a resistive haptic sense are presented at regular intervals of the position phase, either alternately or time exclusively.
- Advantageous effects: A sense of stopping a finger within the circumference or moving a finger on the circumference is presented, and a sense of resistance when a volume is rotated is perceived at the same time.
- A sense of operating an actual rotary volume on the circumference is presented.

FIG.183

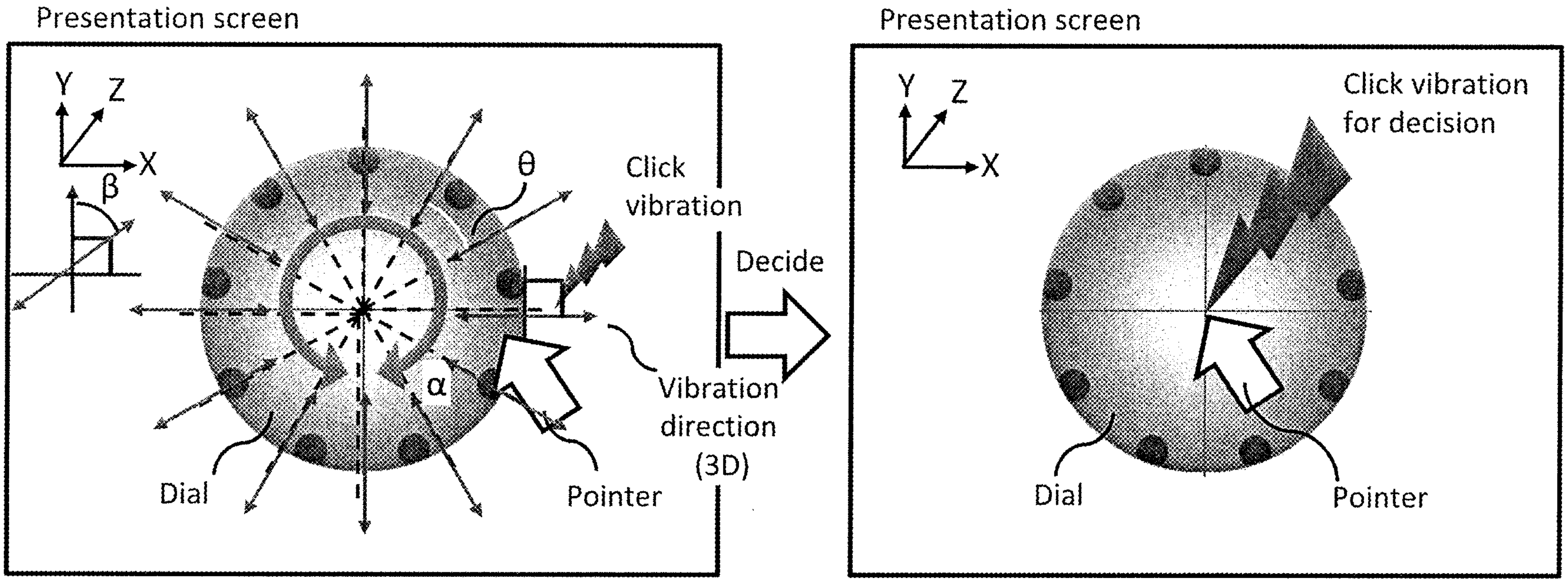

- Object: To present haptic senses for adjusting a volume and performing a decision operation.
- Means: Click vibrations are generated at regular intervals of the position phase.
- Advantageous effects: A sense of operating a rotary volume is represented by a click vibration, and additionally, a sense of depressing a button is represented by a click vibration for decision.
- Senses of operating a volume, performing a decision operation, and operating a switch are presented on a flat panel.

FIG.184

- Object: To increase variations of a touch of a haptic sense dial.
- Means: The vibration direction and the way of vibration are controlled for each position phase. Vibration can be controlled in the 3D direction.
- Advantageous effects: A variety of touches of a dial and feedback are implemented. Presentation of warnings or cautions and presentation of directions are selectively used.
- A variety of touches of a dial and feedback are appropriately presented on a flat panel at an appropriate time and place.
- Touches and feedback are controlled in a time-varying manner in accordance with circumstances.

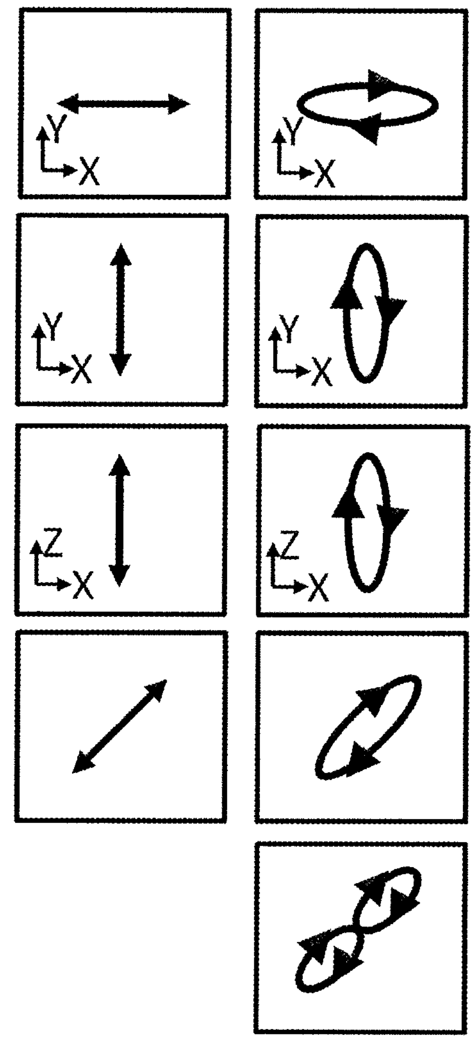

FIG.185
A haptic sense changes nonlinearly by weight (noise).
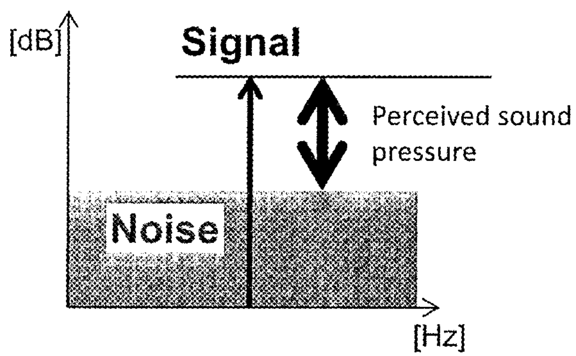
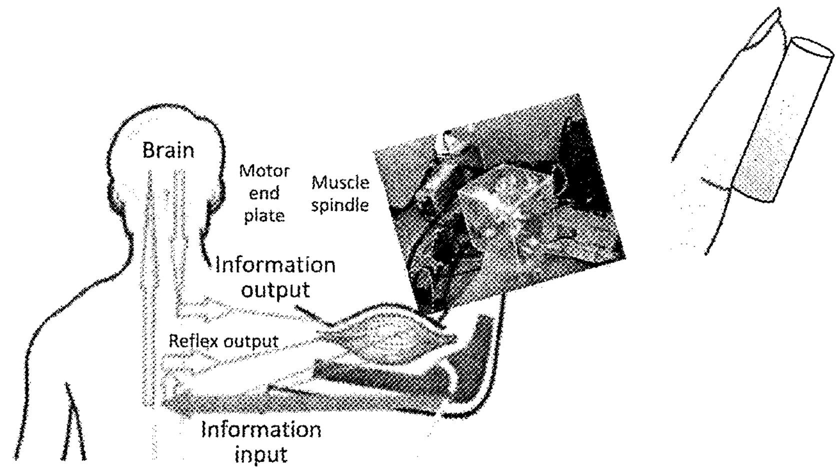
- Perceived sound pressure[dB] = Signal - Noise
- Perceived torque strength [dB] ≈ torque – weight.

FIG.186
Thresholds and the perceived quantity of a haptic sense change depending on the device size.
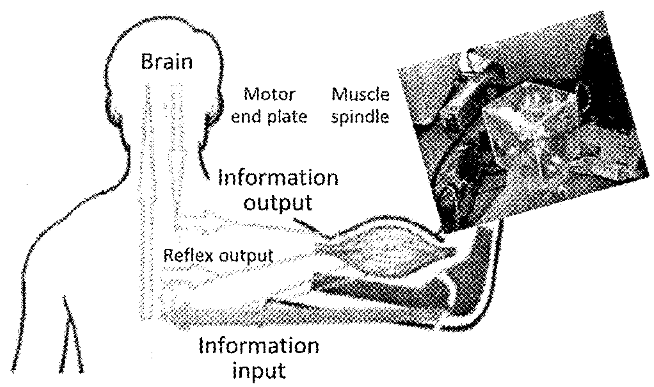
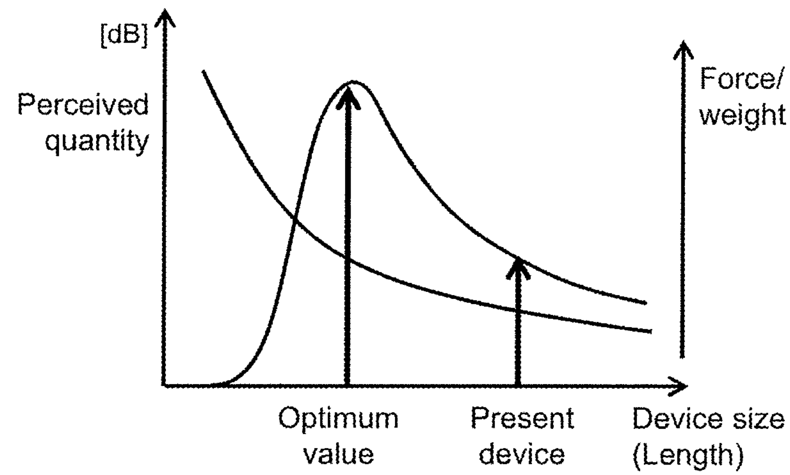
- Perceived torque strength [dB] ≈ torque – weight.
- Force/weight $\propto$ 1/length
  $\therefore$ force $\propto$ length$^2$, weight $\propto$ length$^3$
- A perceived quantity has its own optimal device size.

Texture is formed by the three primary sensory structures.

- Pressure sense (Sense of contact)
  - Pressure (DC), warm/cold
- Tactile sense
  - Microscopic time structure
- Force sense
  - Macroscopic time structure
- Vibration sense
  - Frequency (AC)

Texture is represented by a variety of macroscopic and microscopic time structures.

FIG.190
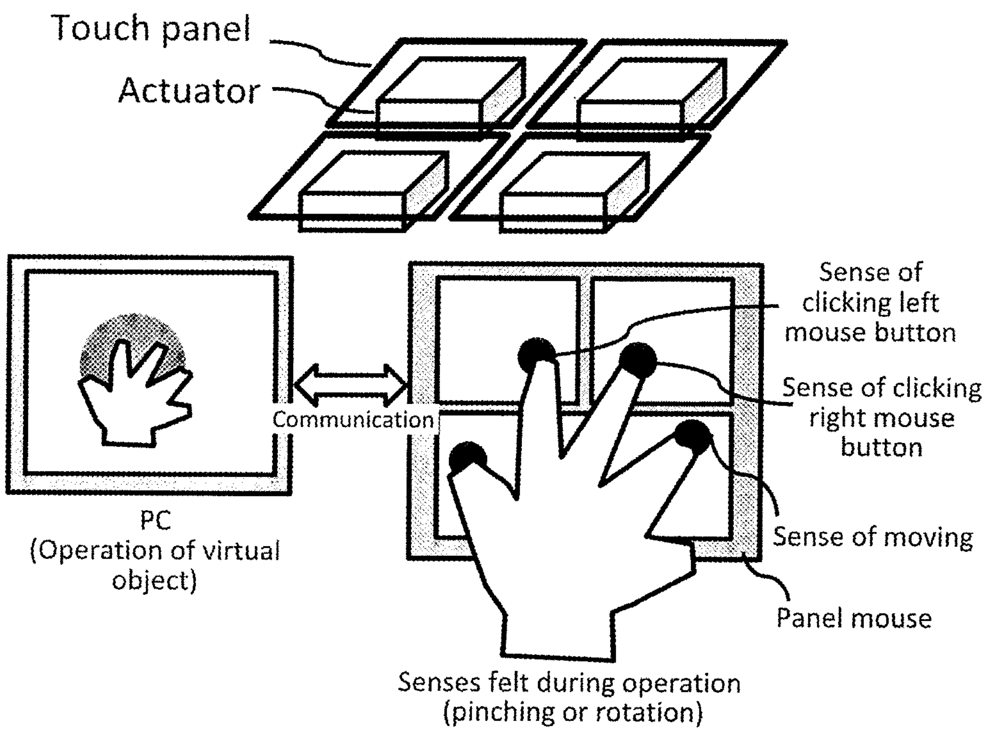
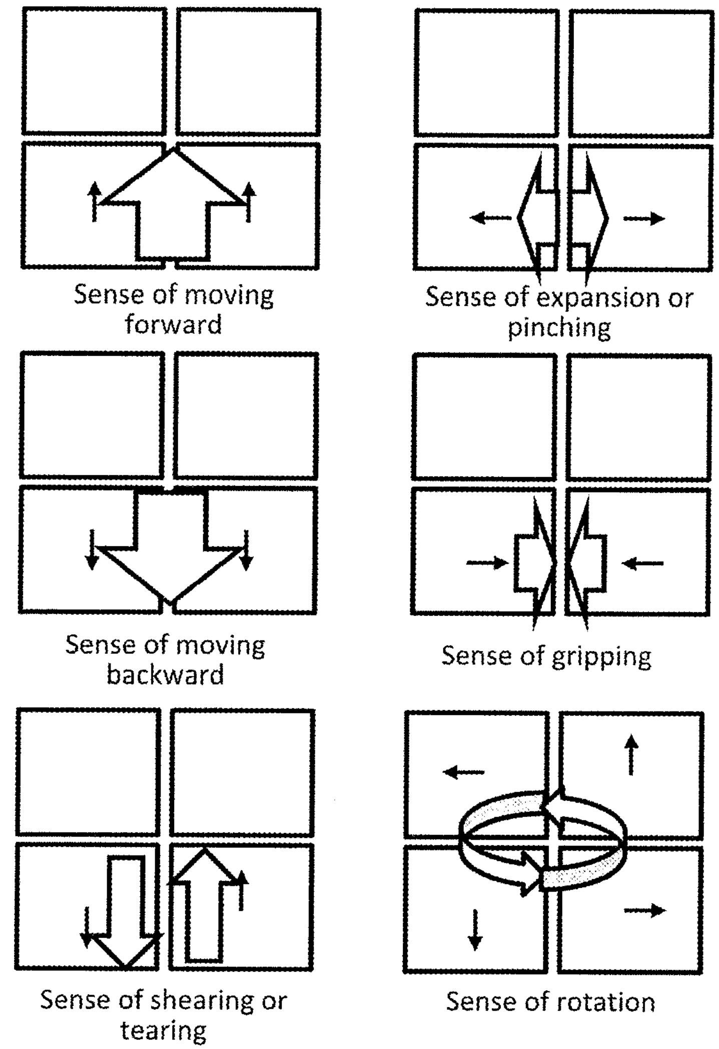
- Object: To intuitively present subtle adjustment of mouse operations.
- Means: Phase in the vibration direction is controlled for each panel.
- Advantageous effects: A sense of pinching, a sense of gripping, a sense of tearing, and a sense of rotation are presented.
- A sense of operating or processing digital materials is presented.
- Applicable to digital mockup.

FIG.193

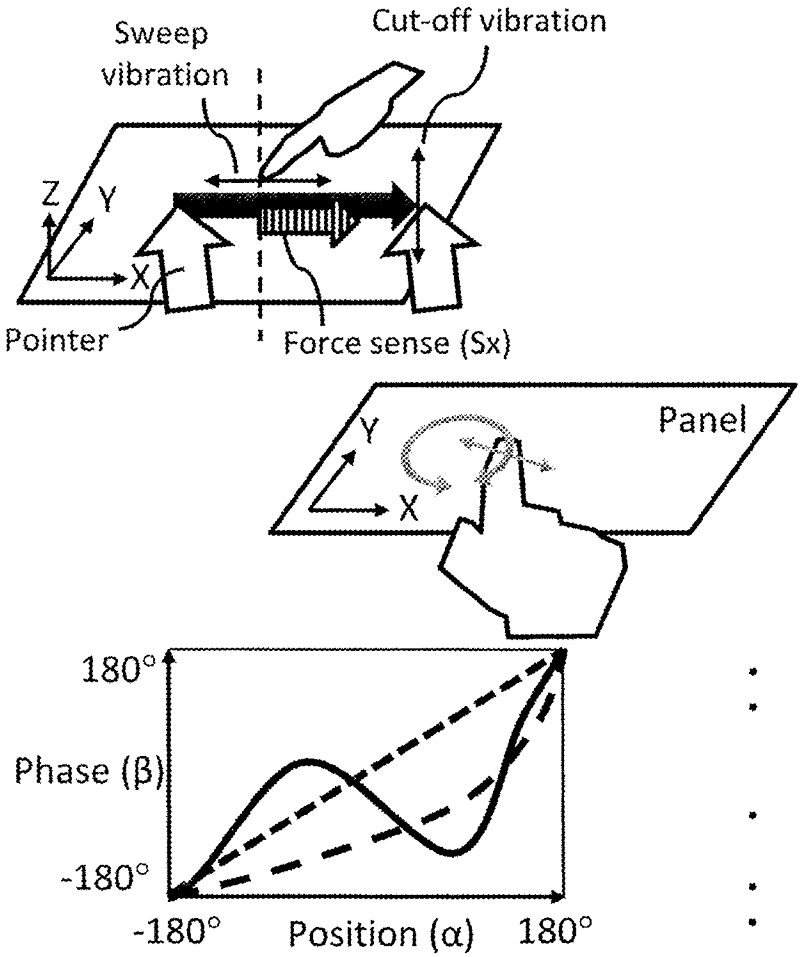

Notes: Other control functions:
Phase, amplitude, frequency, and acceleration or deceleration

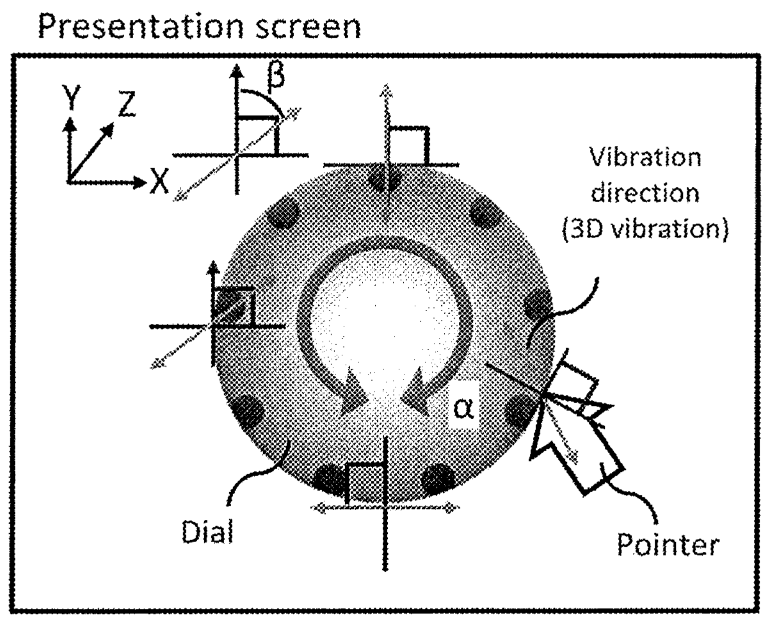

- Object: To perform personal profiling.
- Means: Operation profiling is performed like handwriting analysis. Analysis is performed on the basis of physiological information.
- Advantageous effects: Personal ID, mental condition, health condition, and the degree of fatigue can be estimated.
- Applicable to big data business.
- Passive sensing and active sensing are performed.

- Object: To implement a palpation simulator.
- Means: Palpation training is conducted by presenting the condition of a body such as an organ (e.g., hardness, softness, and shape) in accordance with video, the way of moving a fingertip, and the way of putting muscle into the fingertip.
- Advantageous effects: An organ or skin is represented.

FIG. 196 System configuration of haptic sense display
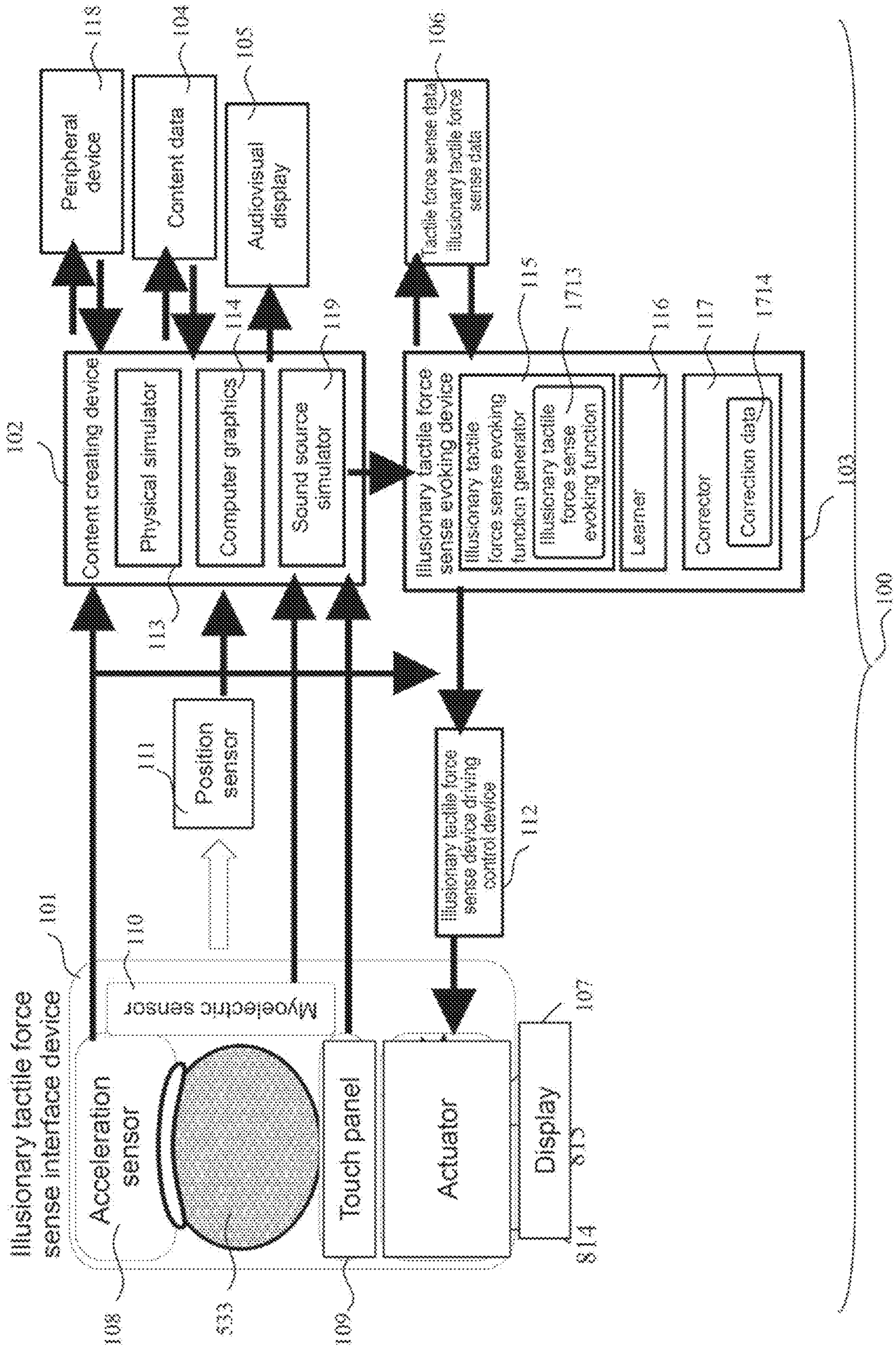

FIG. 197 System configuration of haptic sense display
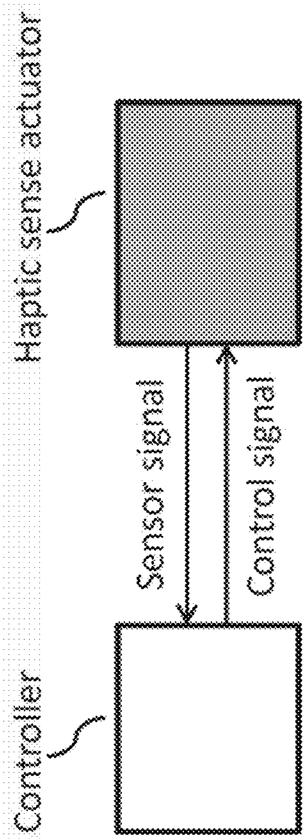

FIG. 198 Displacement control of haptic sense actuator
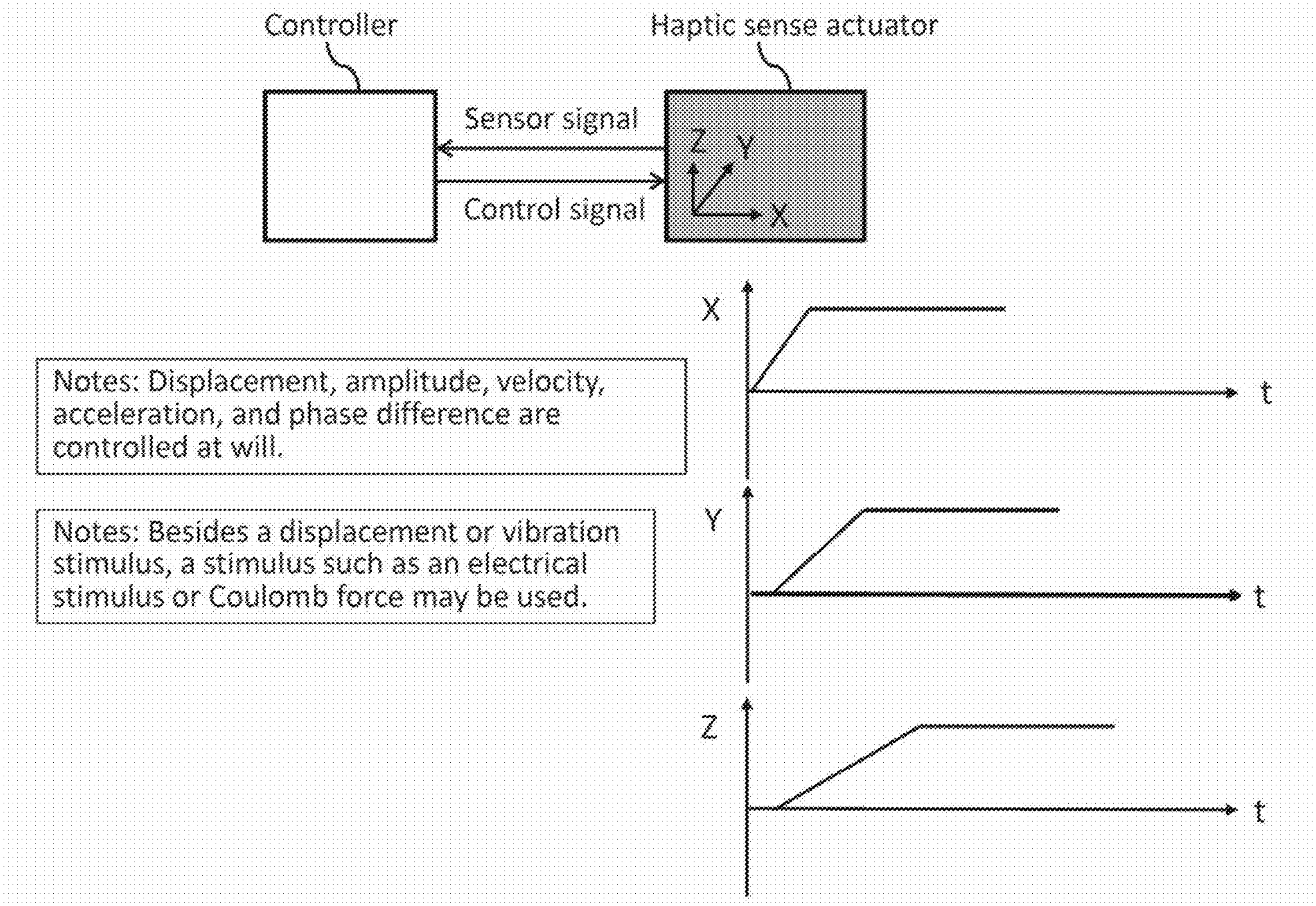

FIG. 199 Points of illusion phenomena (Common)
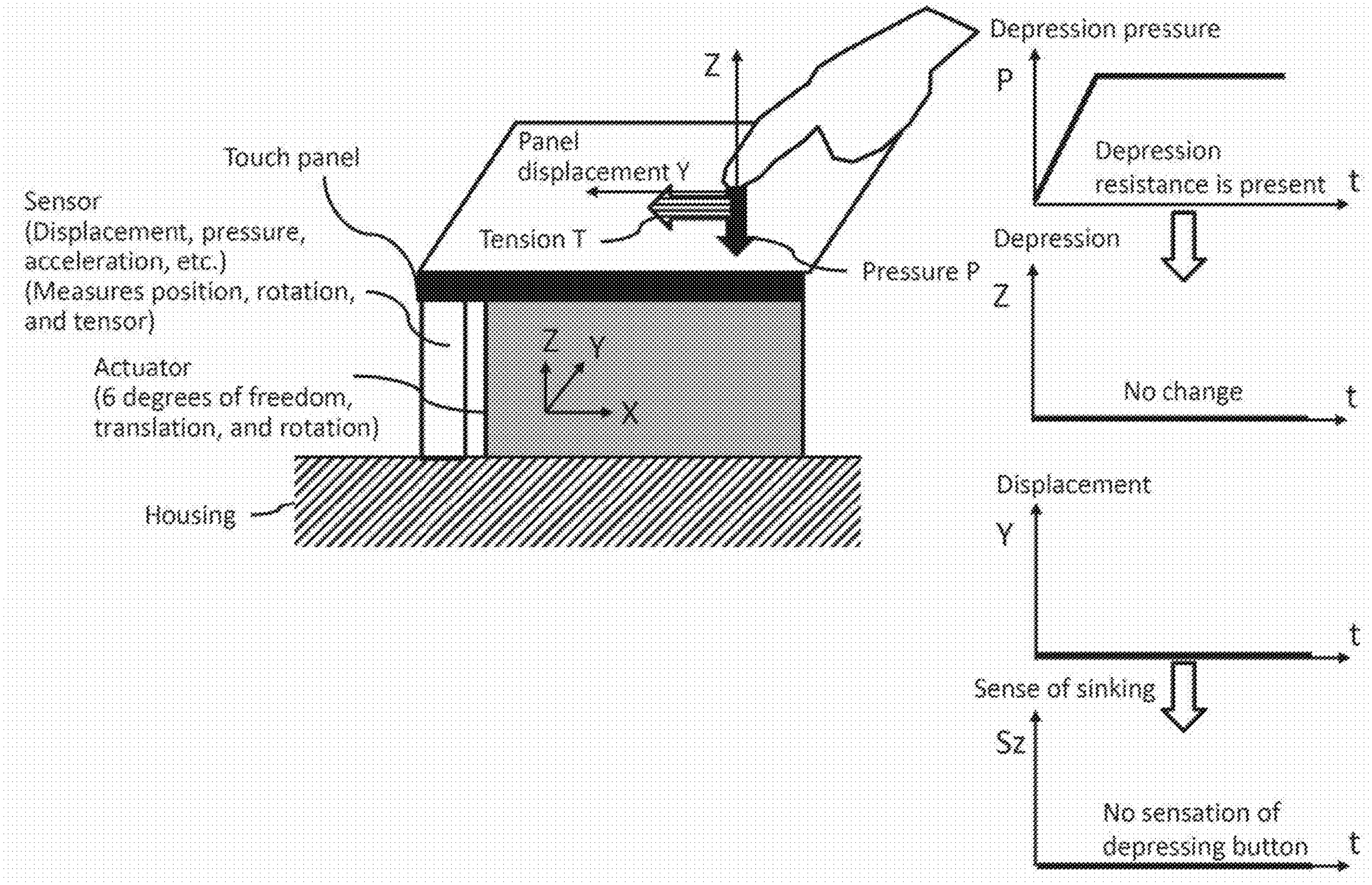

FIG. 200 Points of illusion phenomena (Illusion)
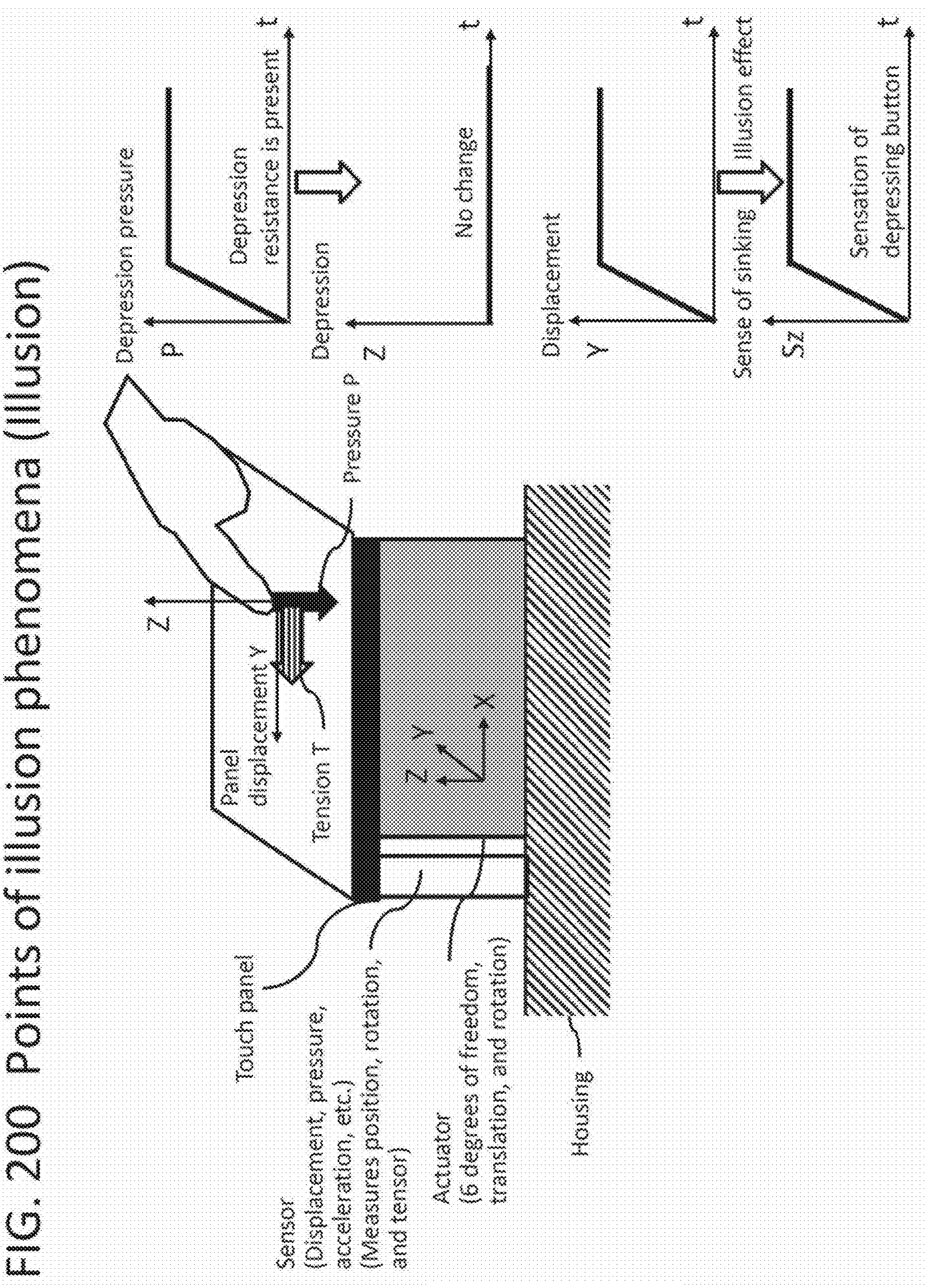

FIG. 201 Points of illusion phenomena (Continuous illusion)
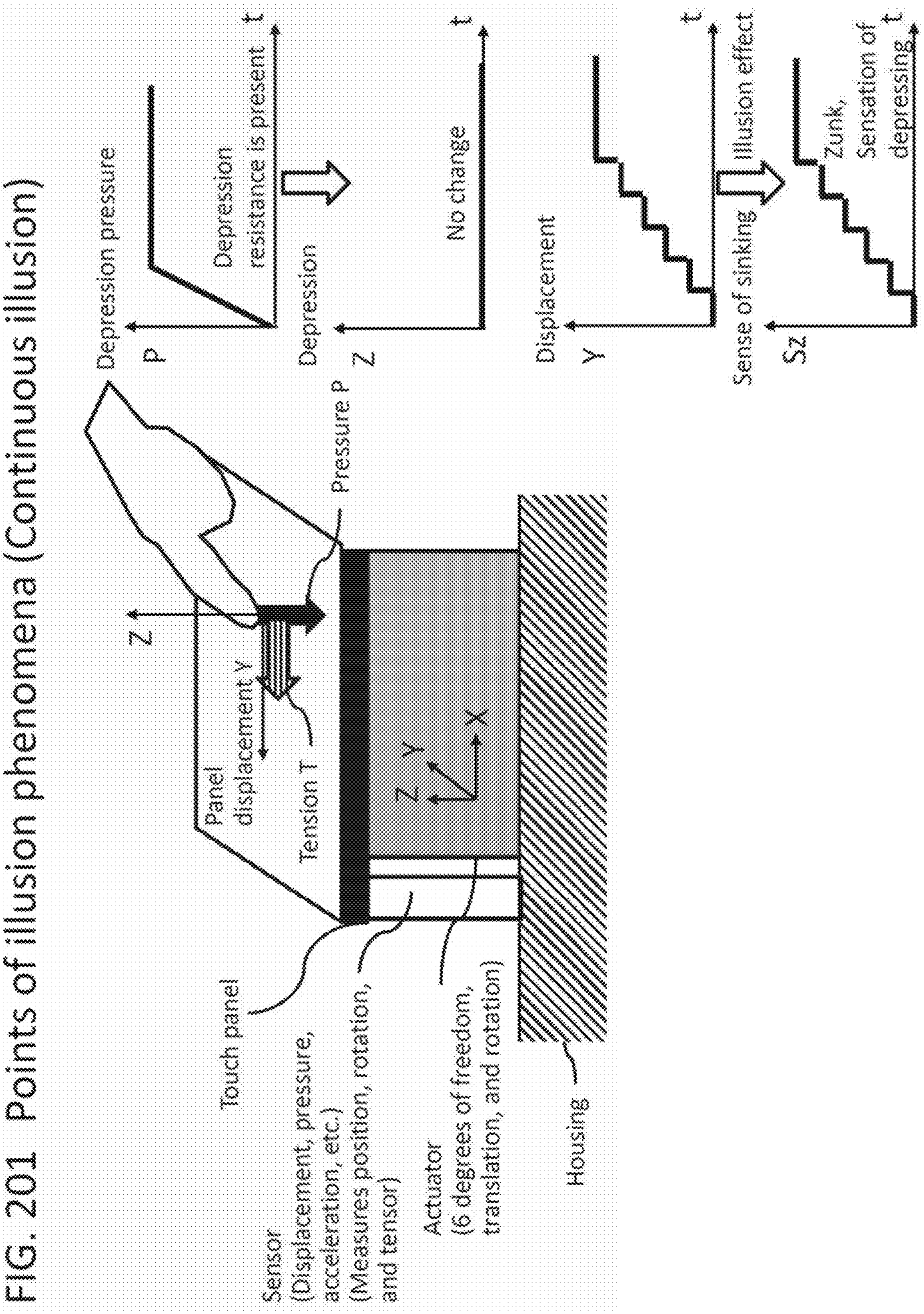

FIG. 202 Points of illusion phenomena (Continuous illusion)
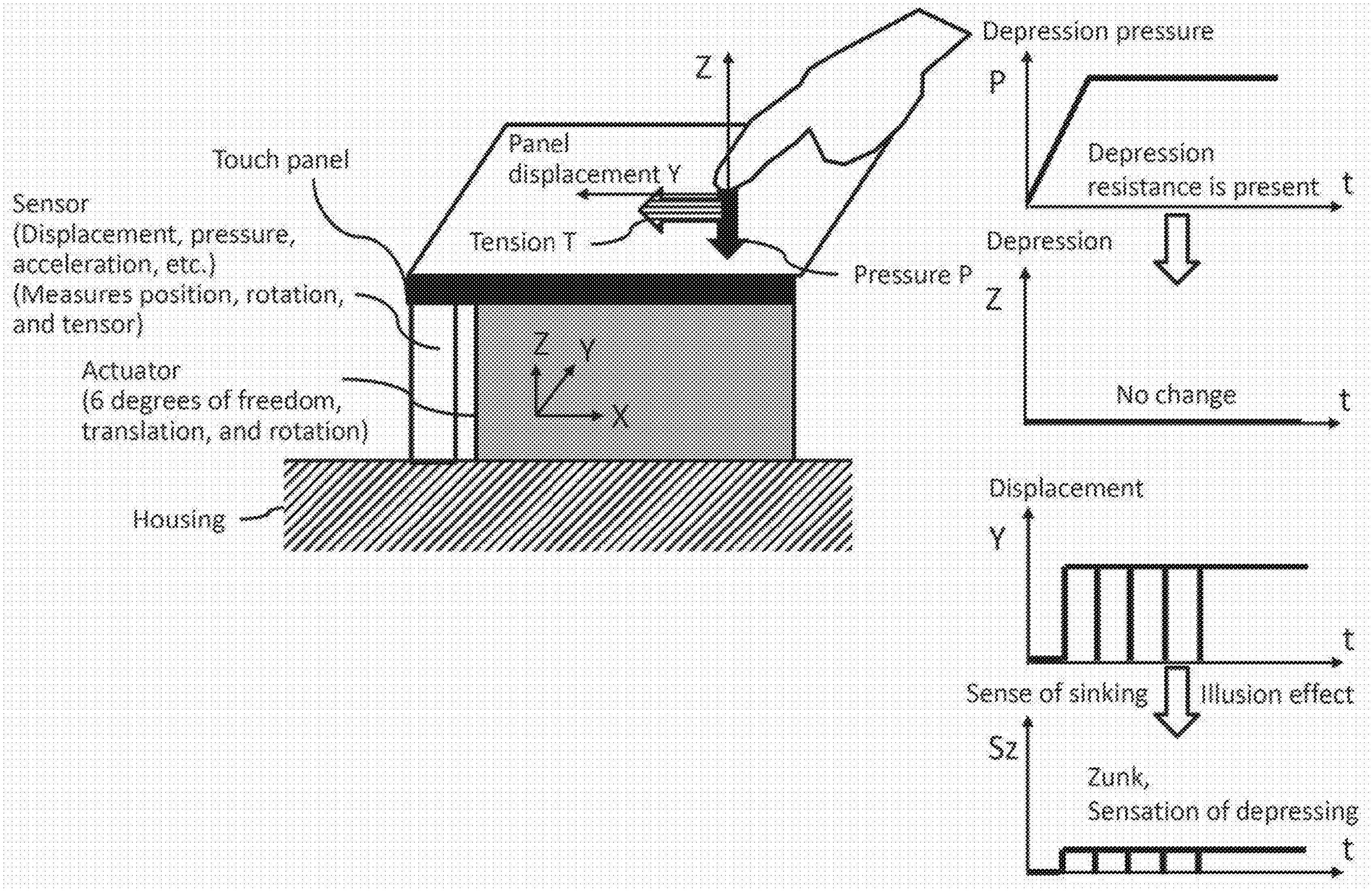

FIG. 203 Points of illusion phenomena (Phase delay)
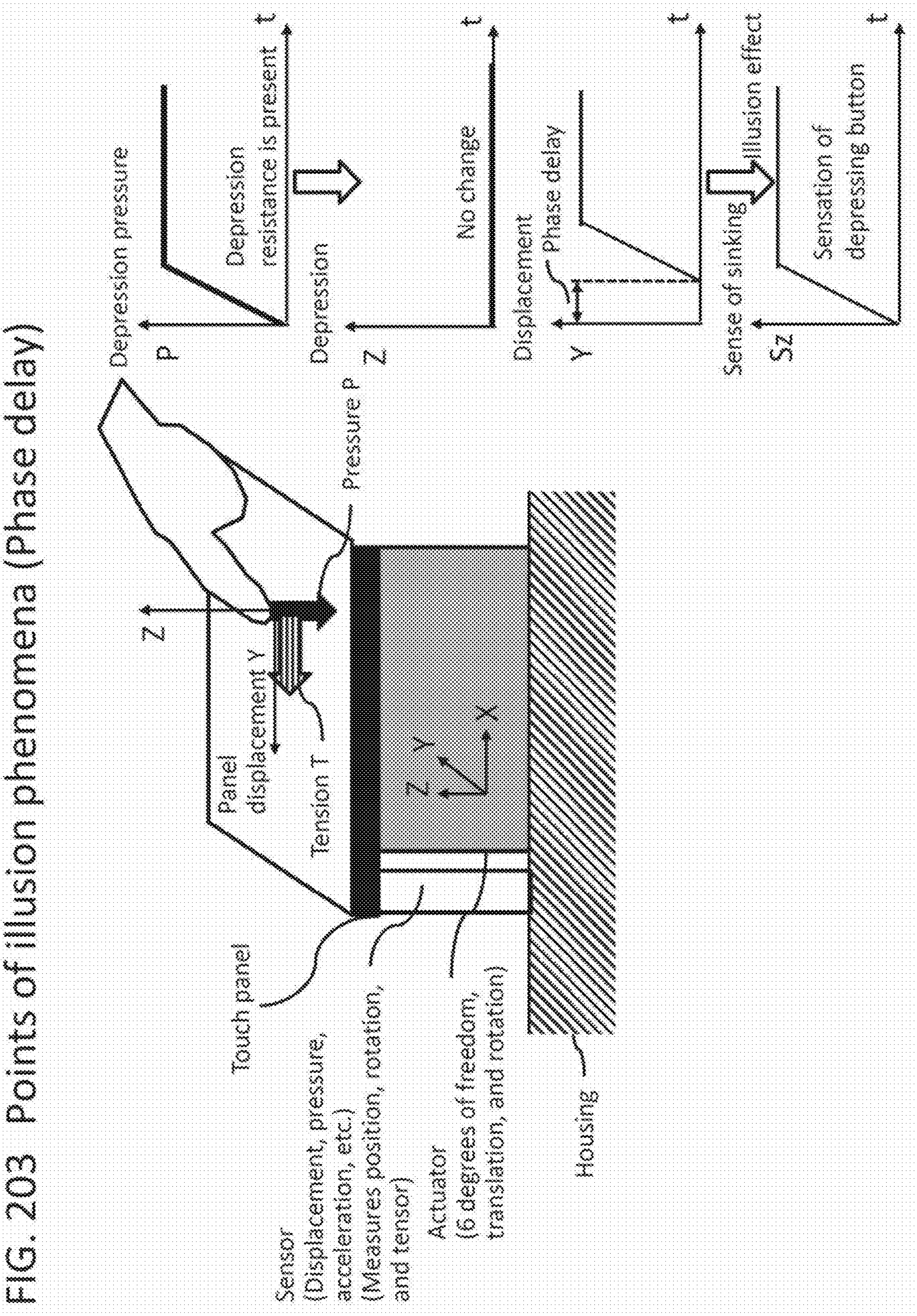

FIG. 204 Points of illusion phenomena (Illusion)
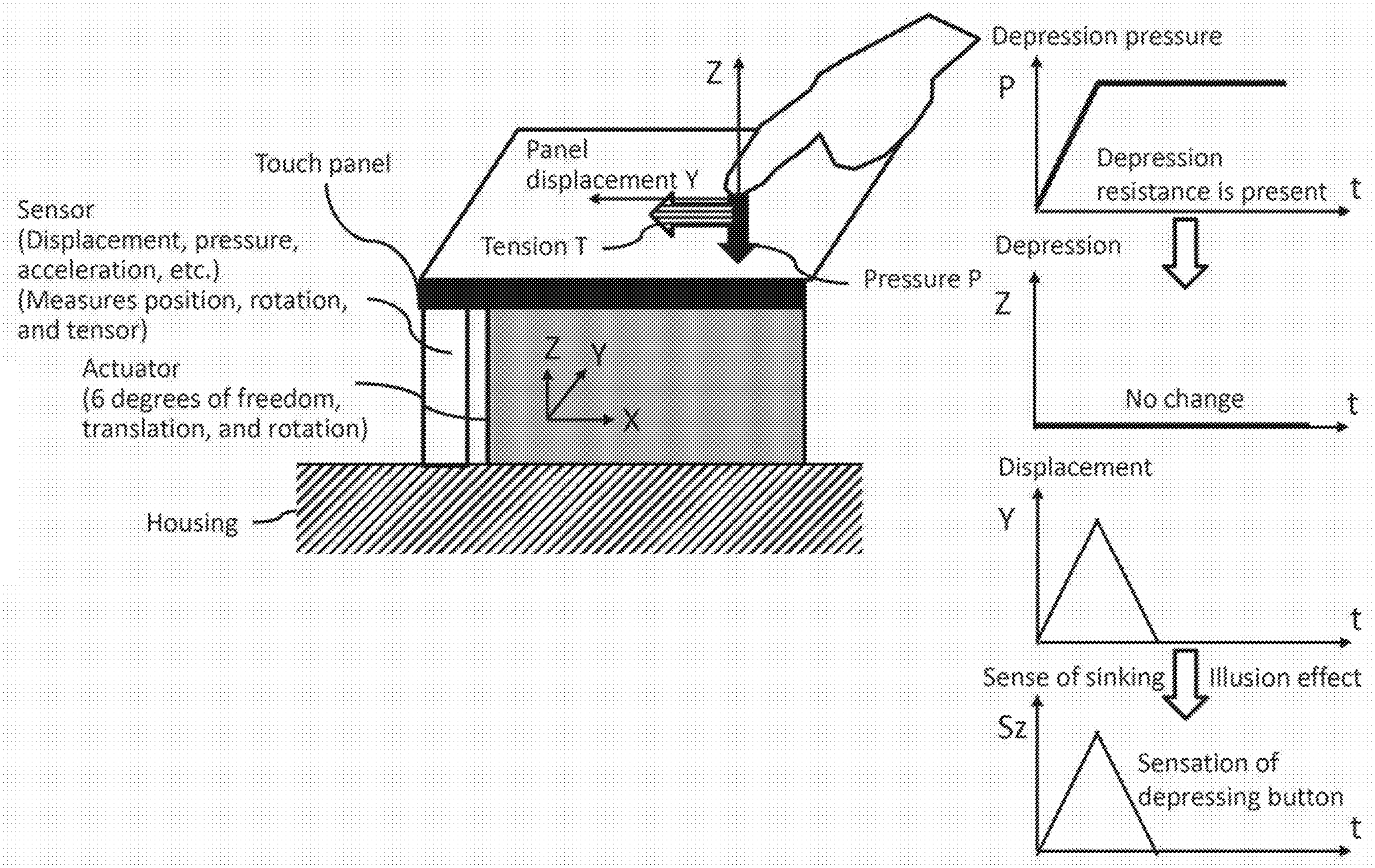

FIG. 205 Points of illusion phenomena (illusion)
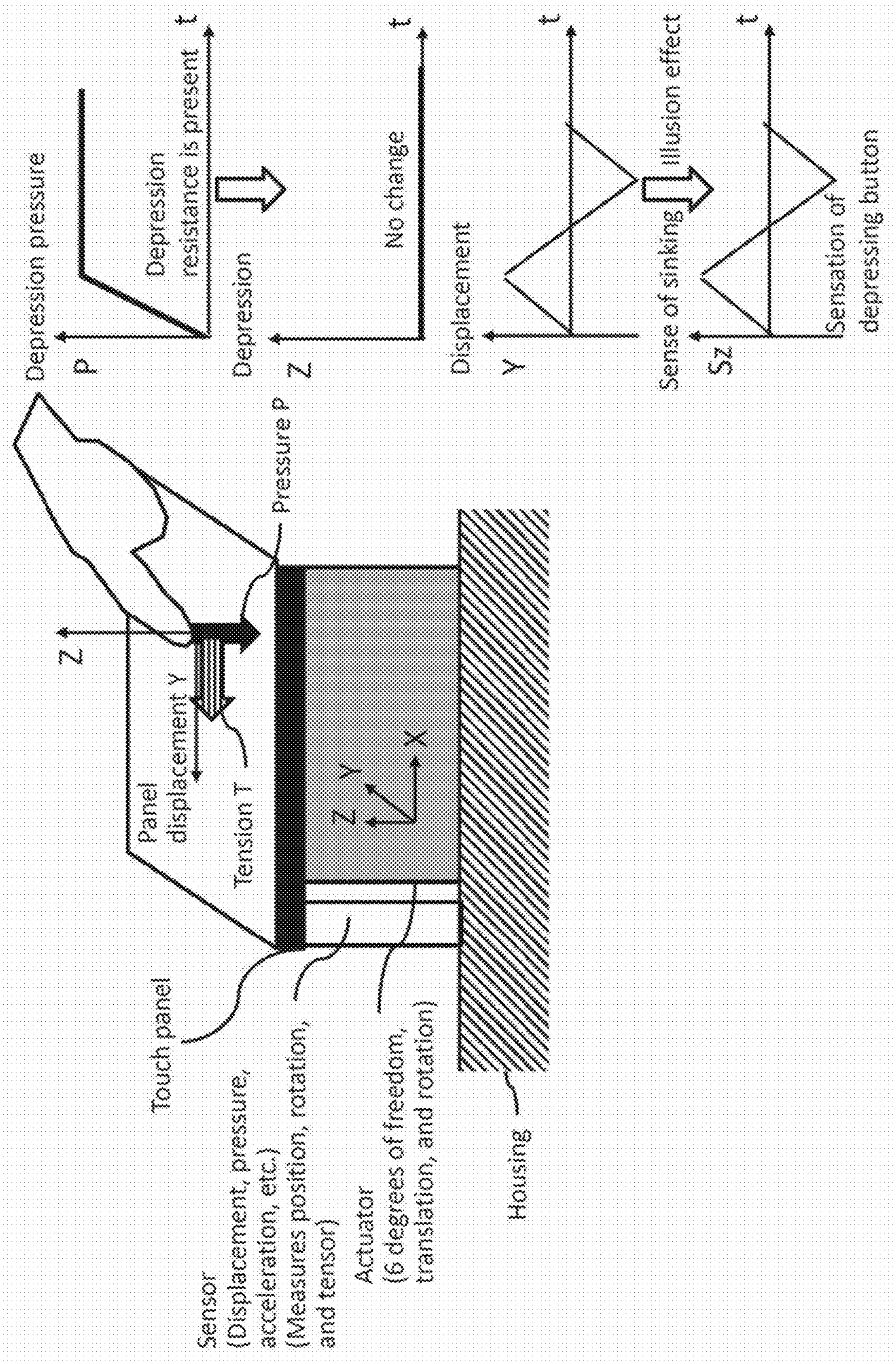

FIG. 206 Way to depress panel with finger: stepwise depression (Common)
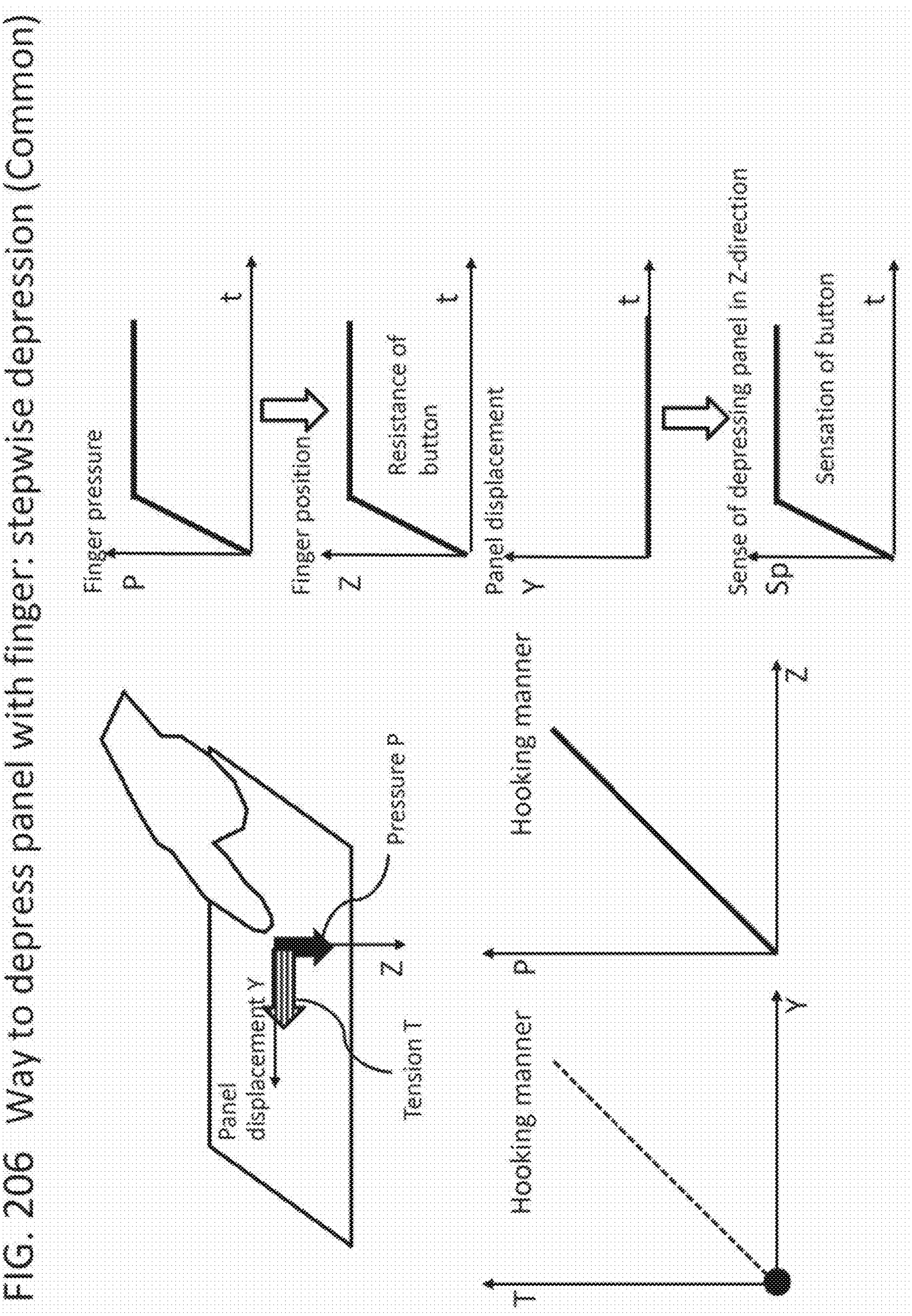

FIG. 207 Way to depress panel with finger: stepwise depression (week)
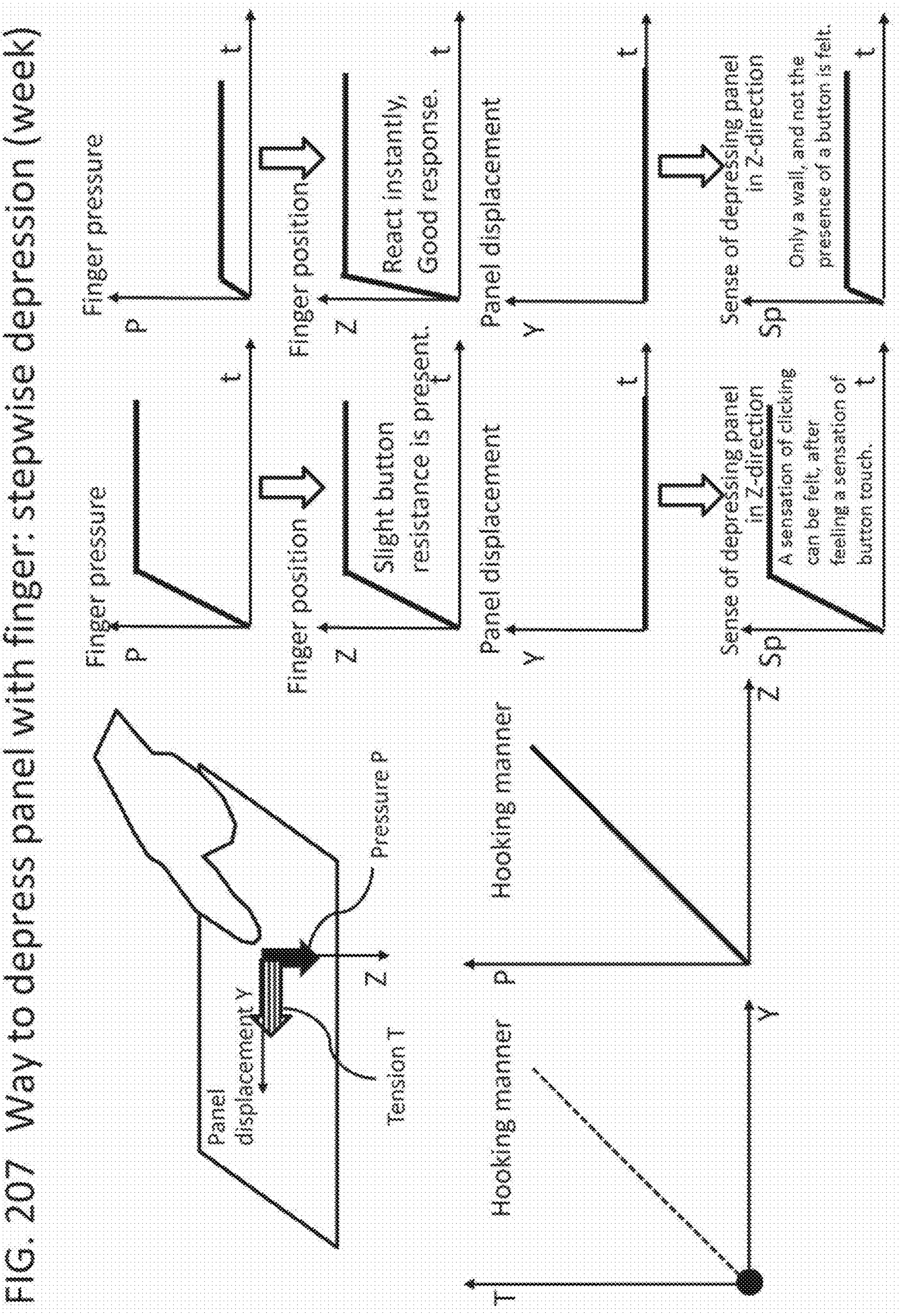

FIG. 208 Way to depress panel with finger: stepwise depression (None)
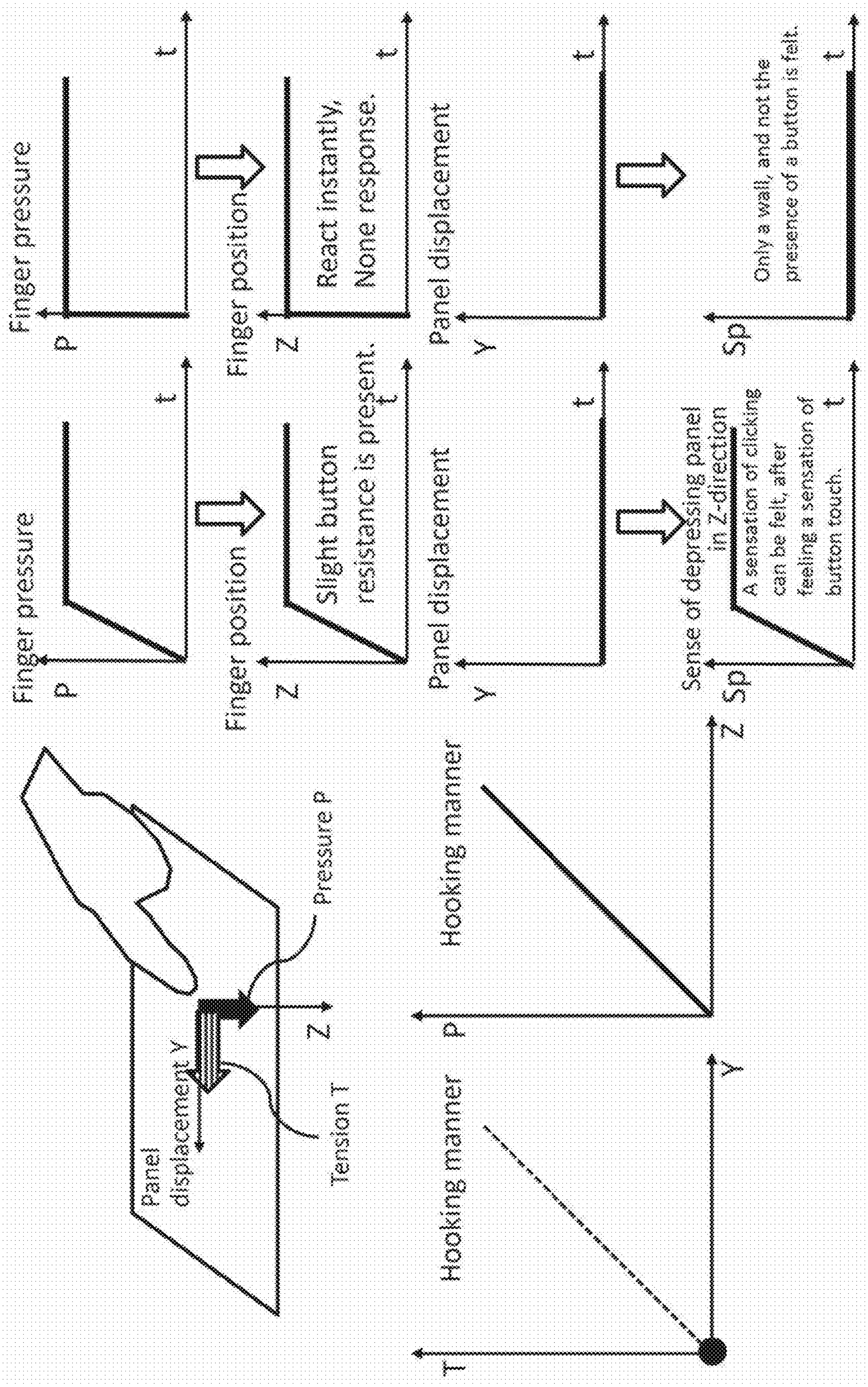

FIG. 209 Way to depress panel with finger: stepwise depression (Illusion)
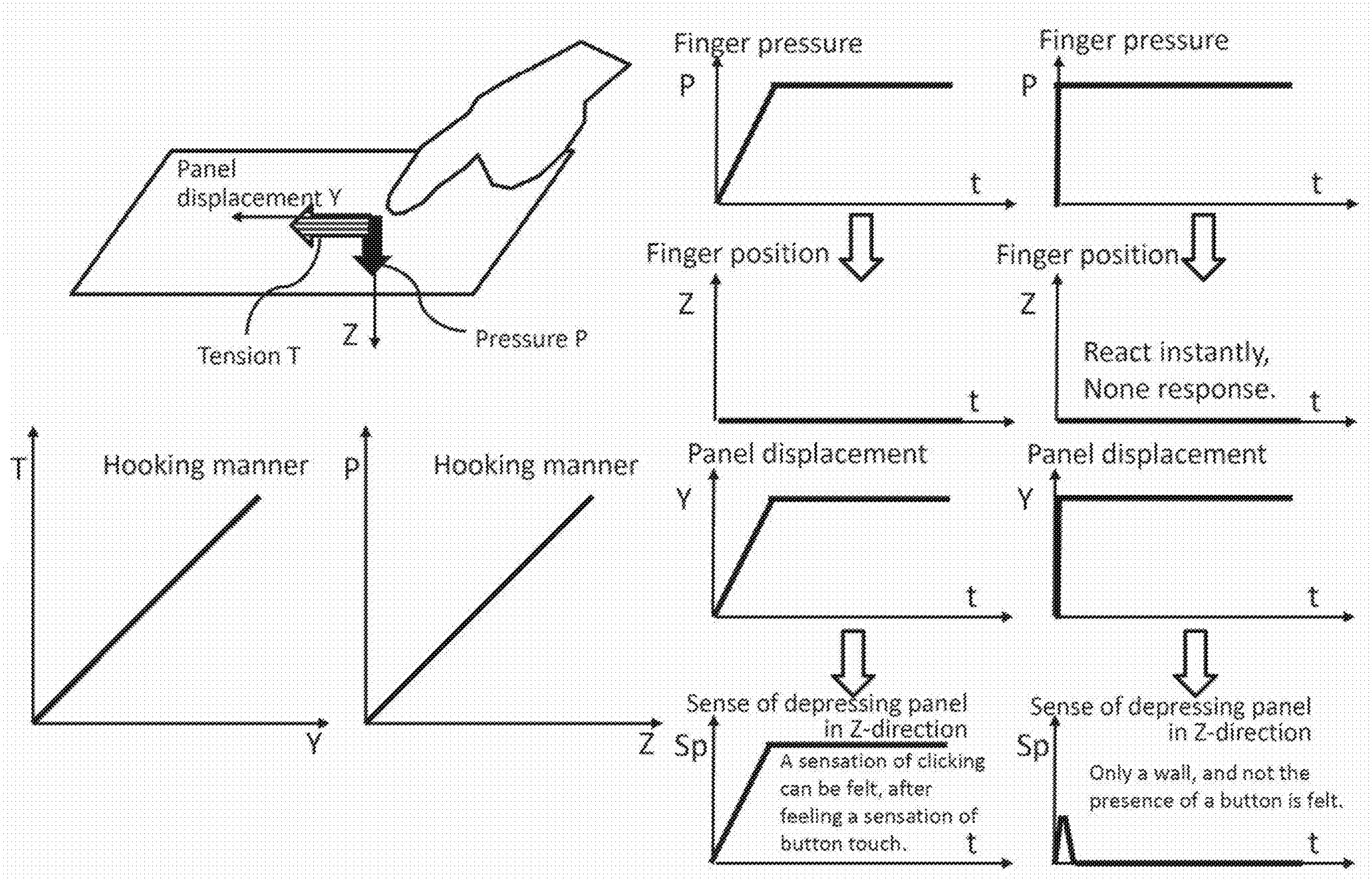

FIG. 210 Way to depress panel with finger: stepwise depression (Common)
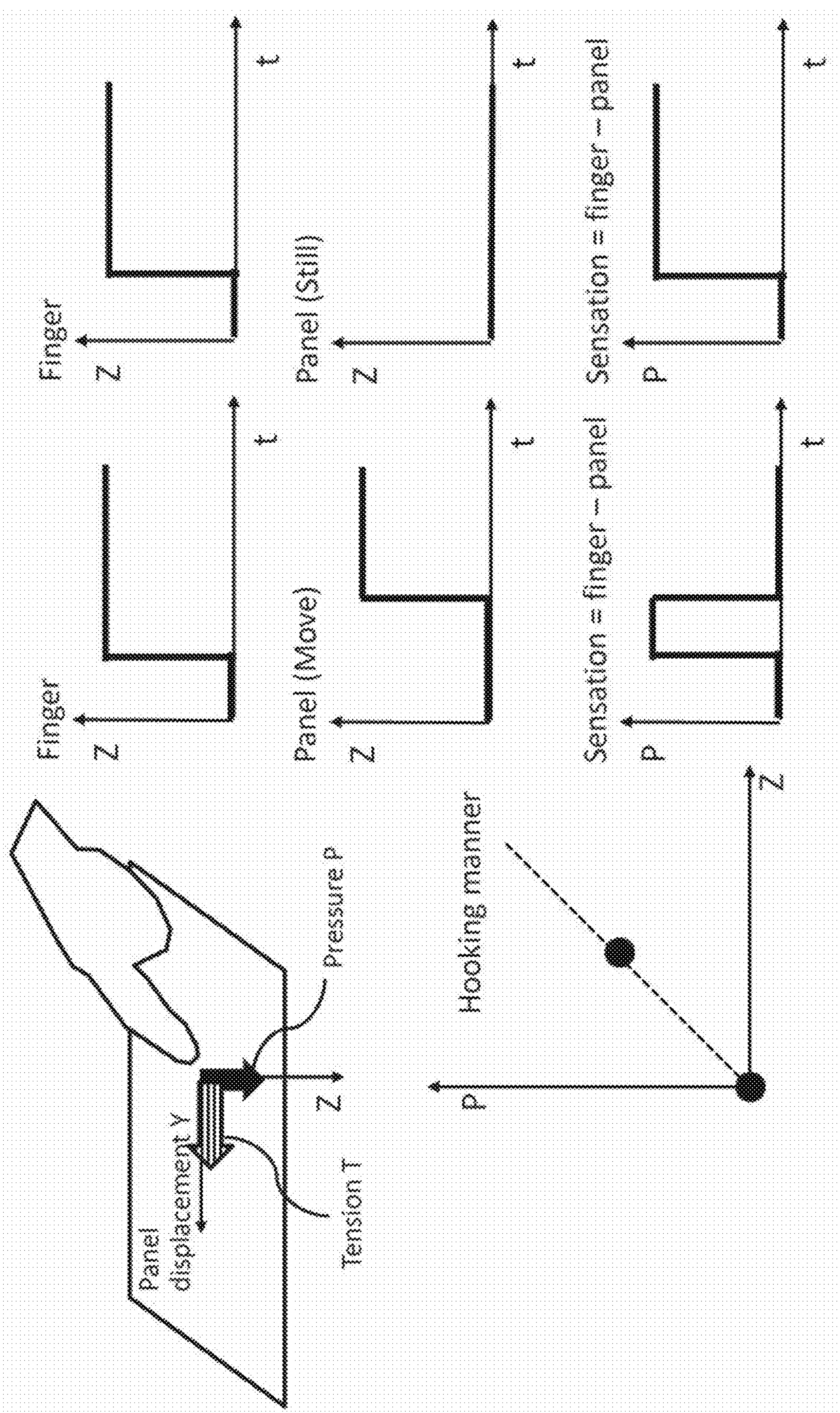

FIG. 211 Way to depress panel with finger: stepwise depression (Common)
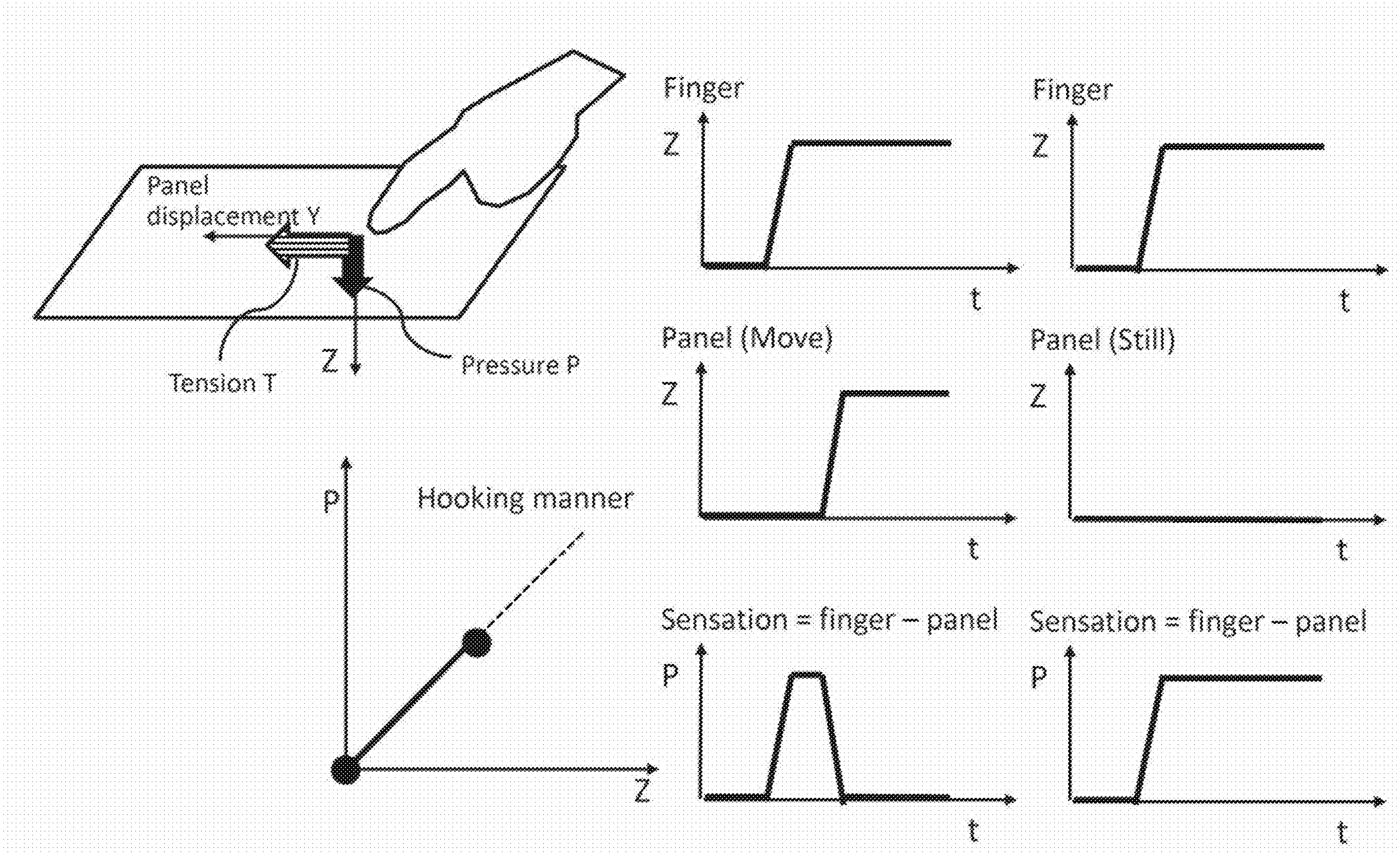

FIG. 212 Way to depress panel with finger: triangular wave and sine wave
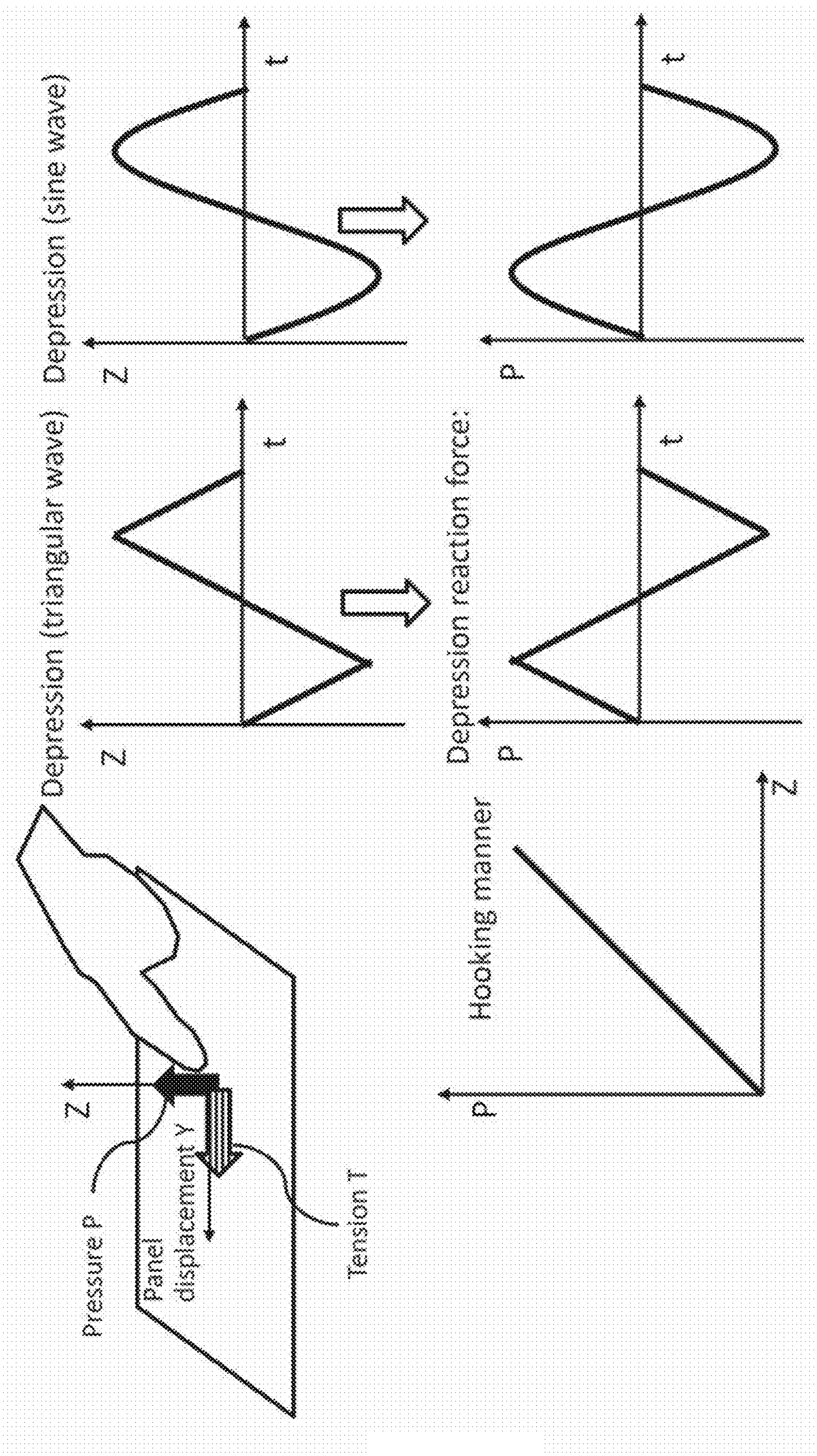

FIG. 213 Displacement and amplitude control: triangular wave and sine wave
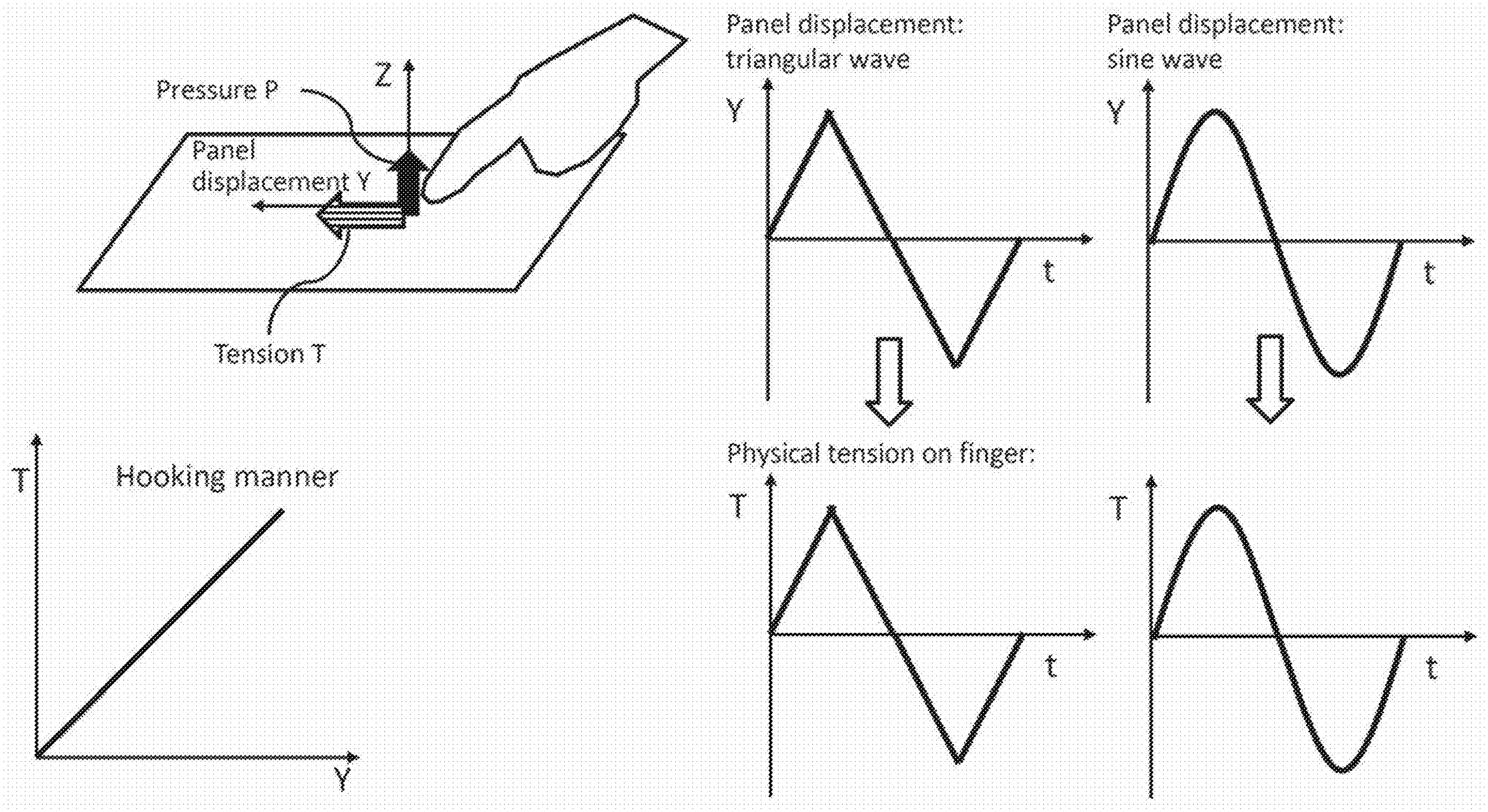

FIG. 214 Displacement and amplitude control: Pressing (downward)
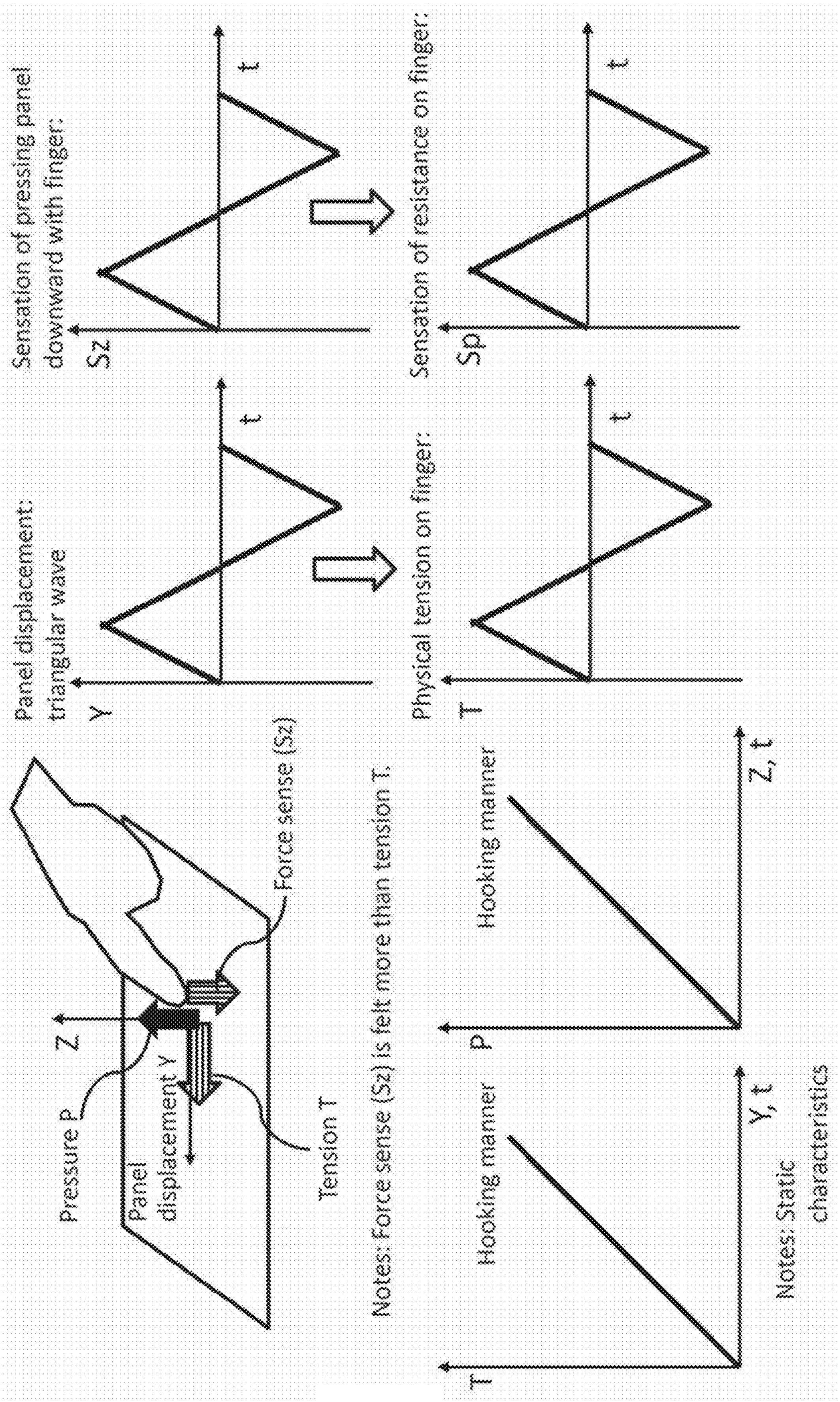

FIG. 215 Displacement and amplitude control: sense of pressing panel (Unconscious sliding)
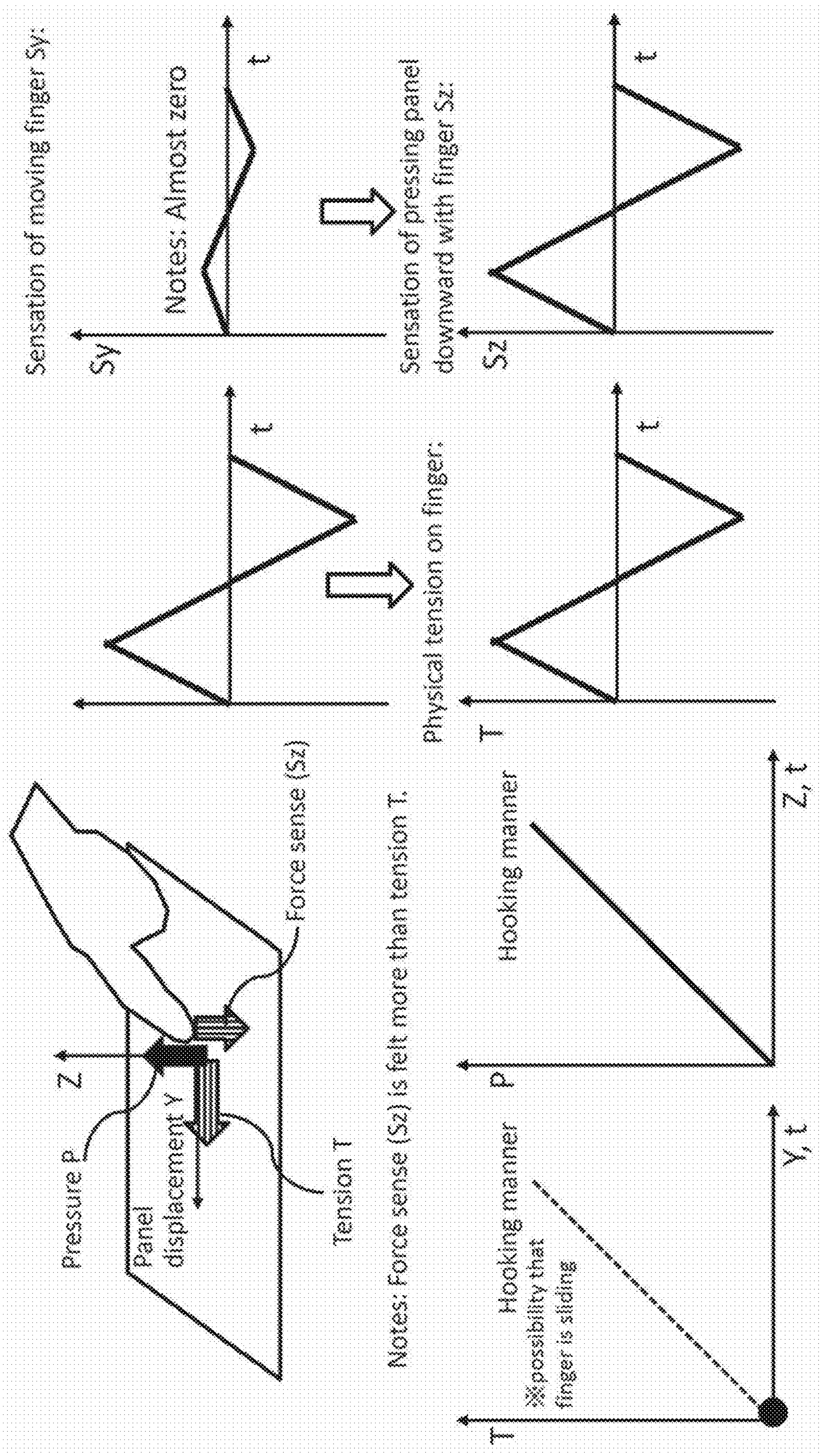

FIG. 216 Displacement and amplitude control: viscoelastic property (Button characteristics)
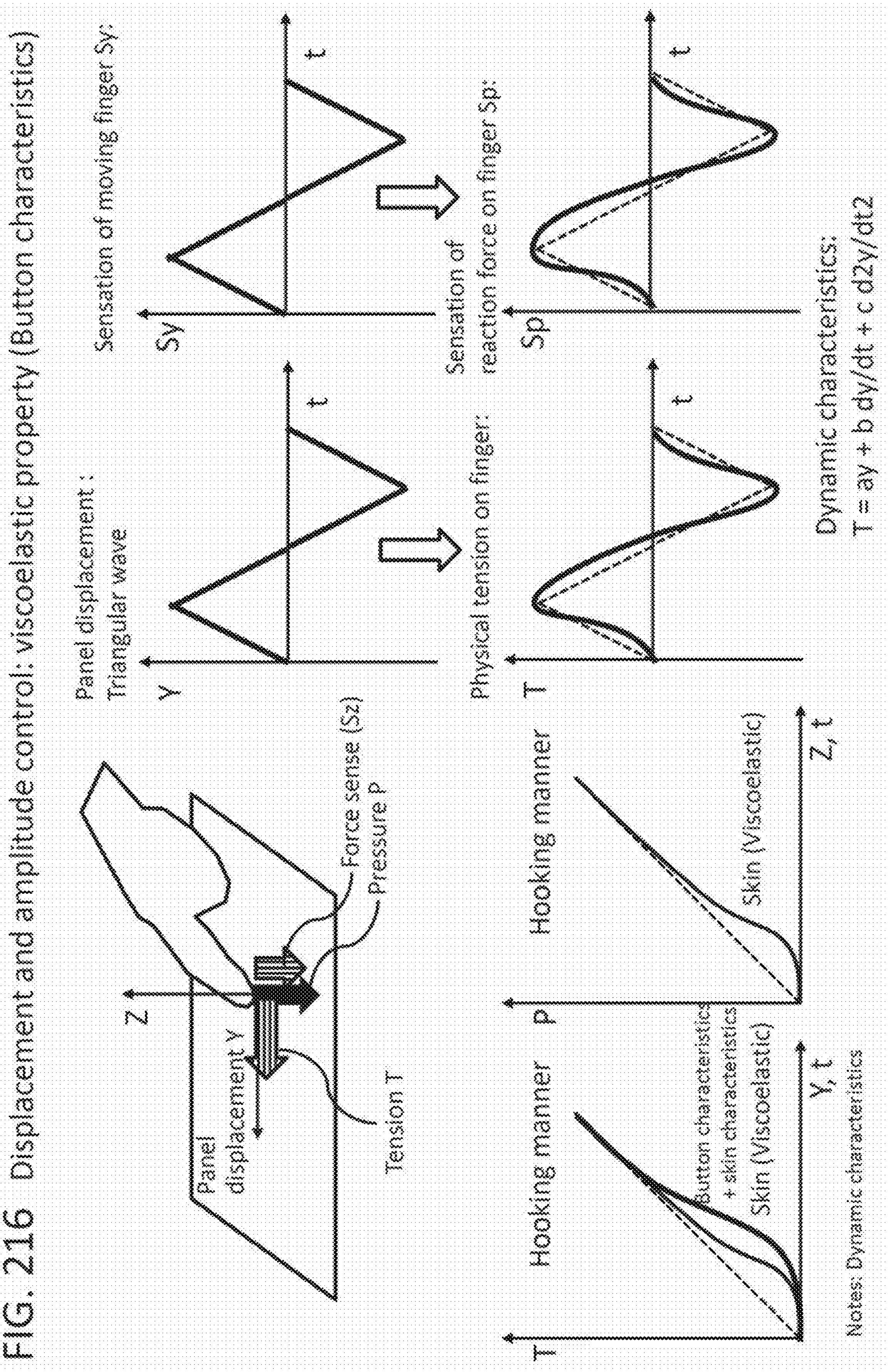

FIG. 217 Displacement and amplitude control: viscoelastic property (Artificial skin sense)
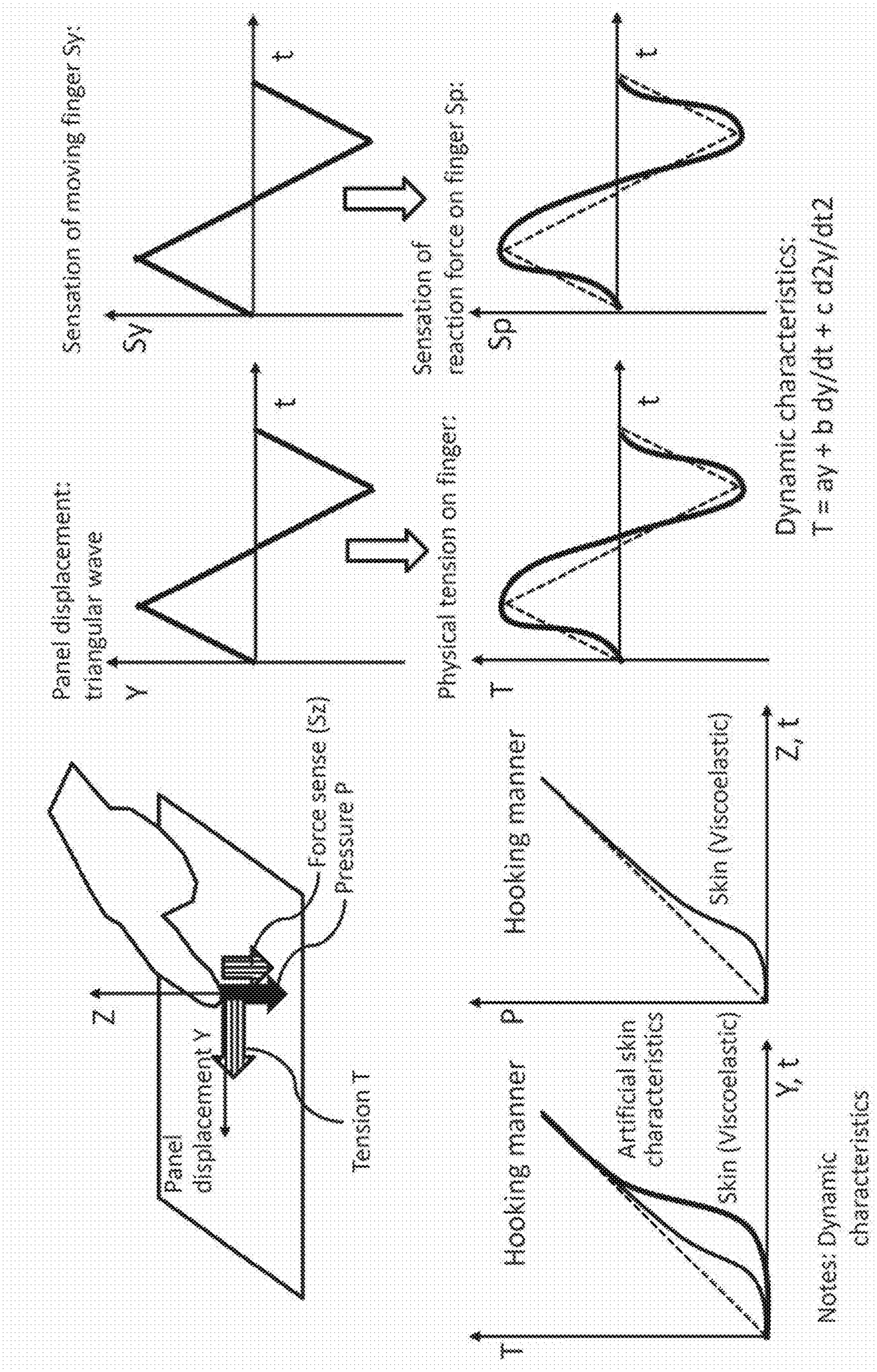

FIG. 218 Displacement and amplitude control: triangular wave
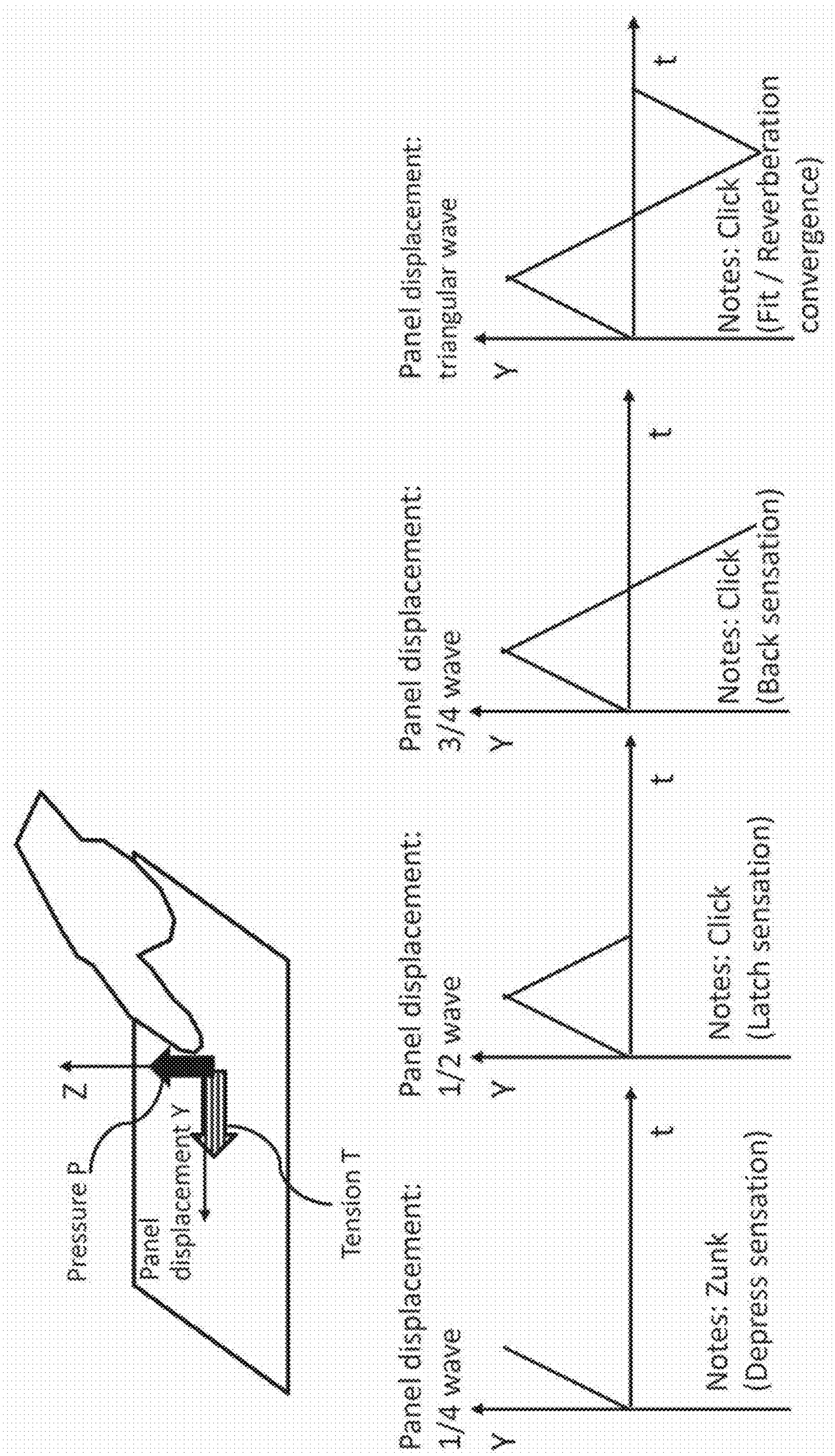

FIG. 219 Displacement and amplitude control: sine wave
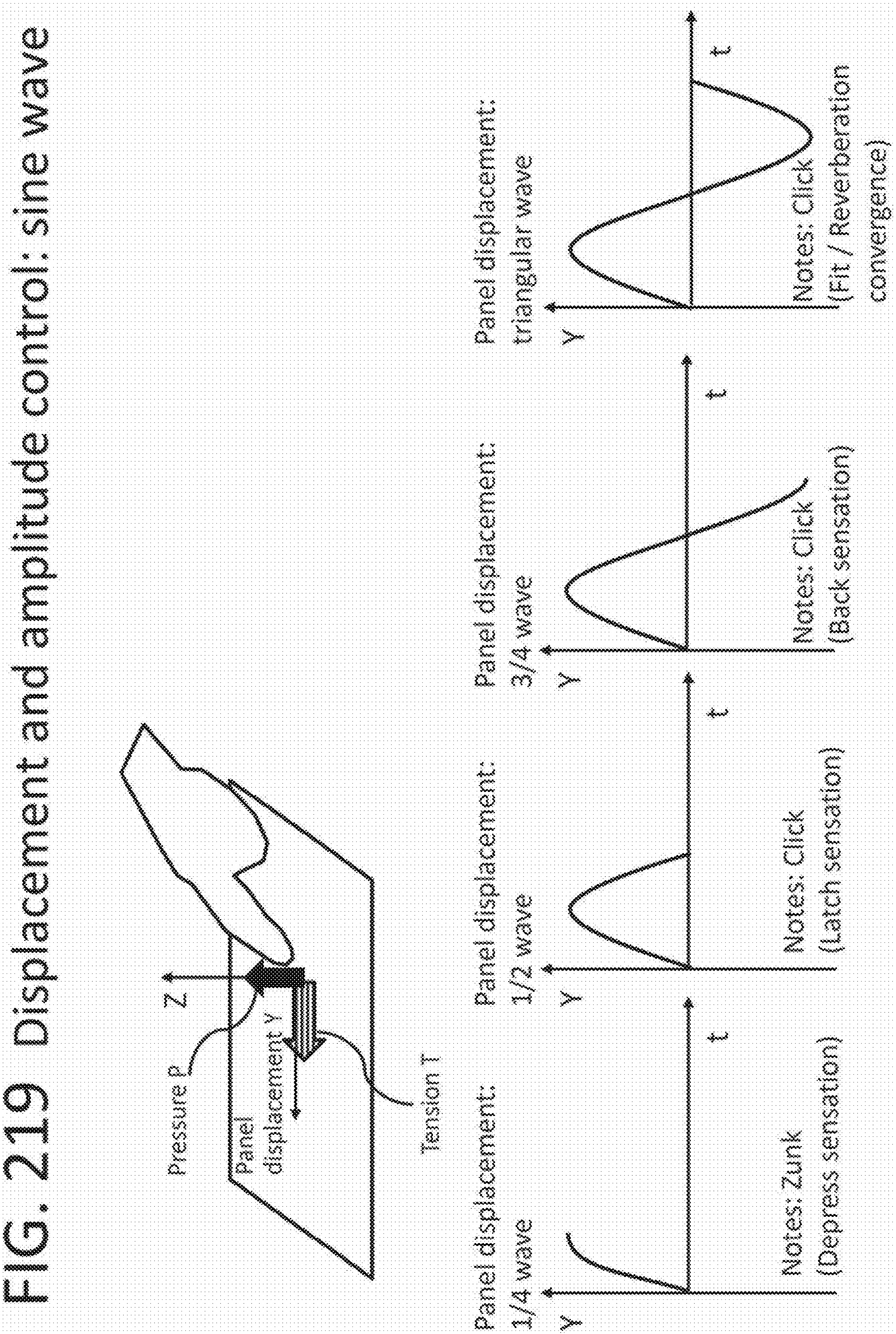

FIG. 220 Vibration control of haptic sense actuator
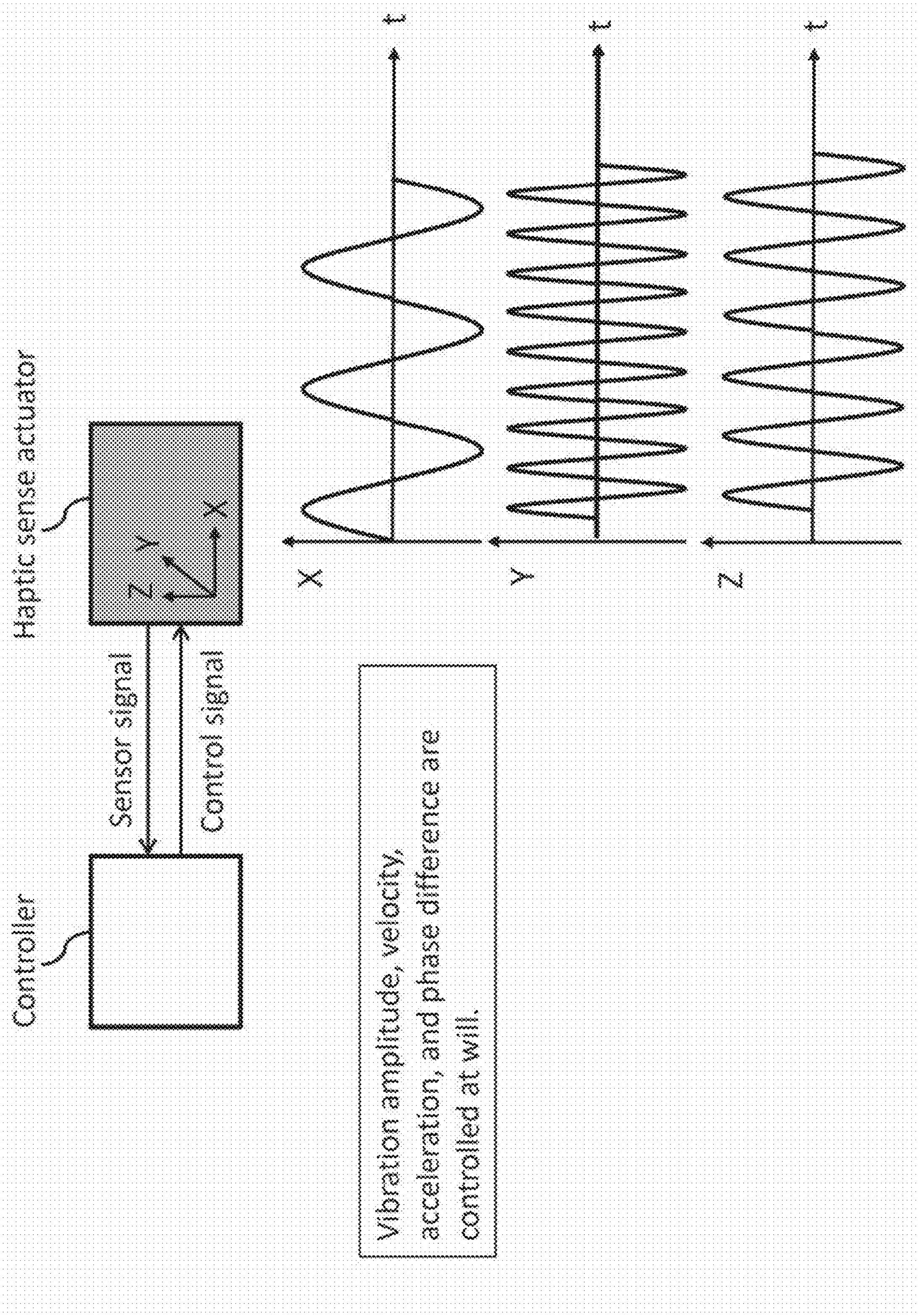

FIG. 221 Waveform control: displaced waveform
A force sense is generated by asymmetrically accelerating and decelerating a waveform.
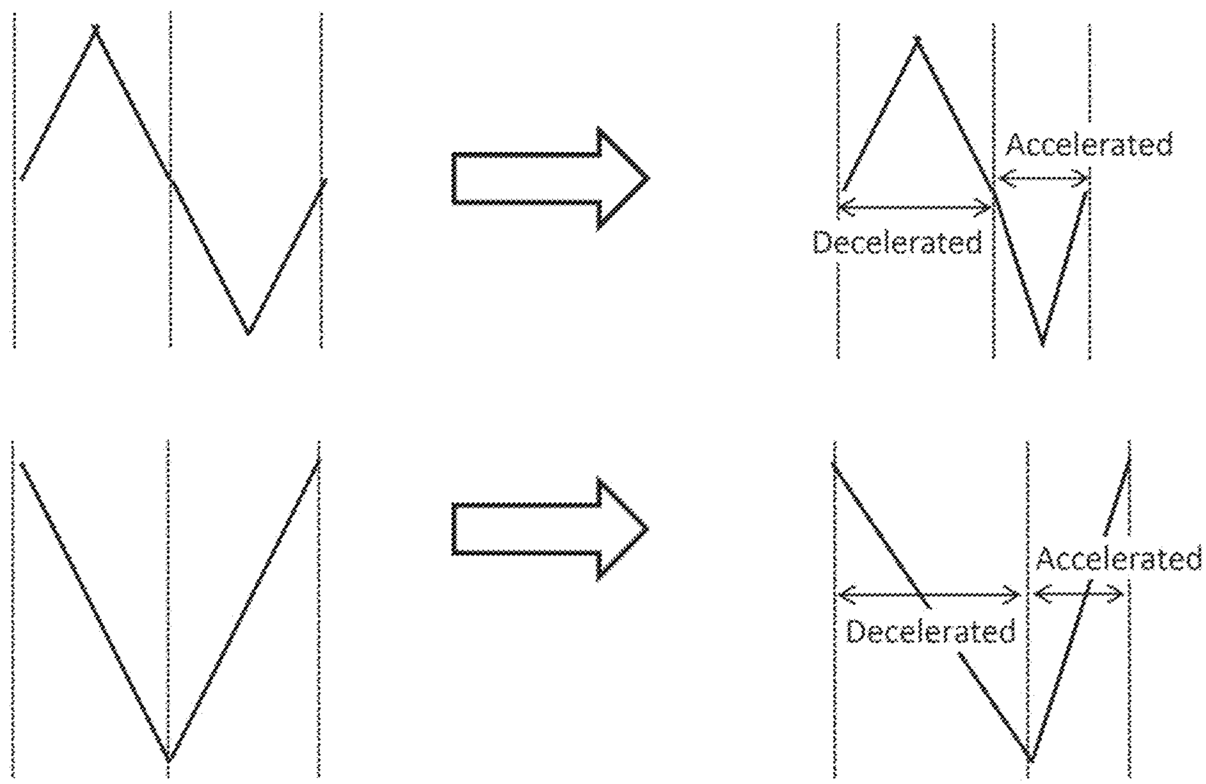

FIG. 222 Waveform control: accelerated and decelerated waveform
A force sense is generated by asymmetrically accelerating and decelerating a waveform.
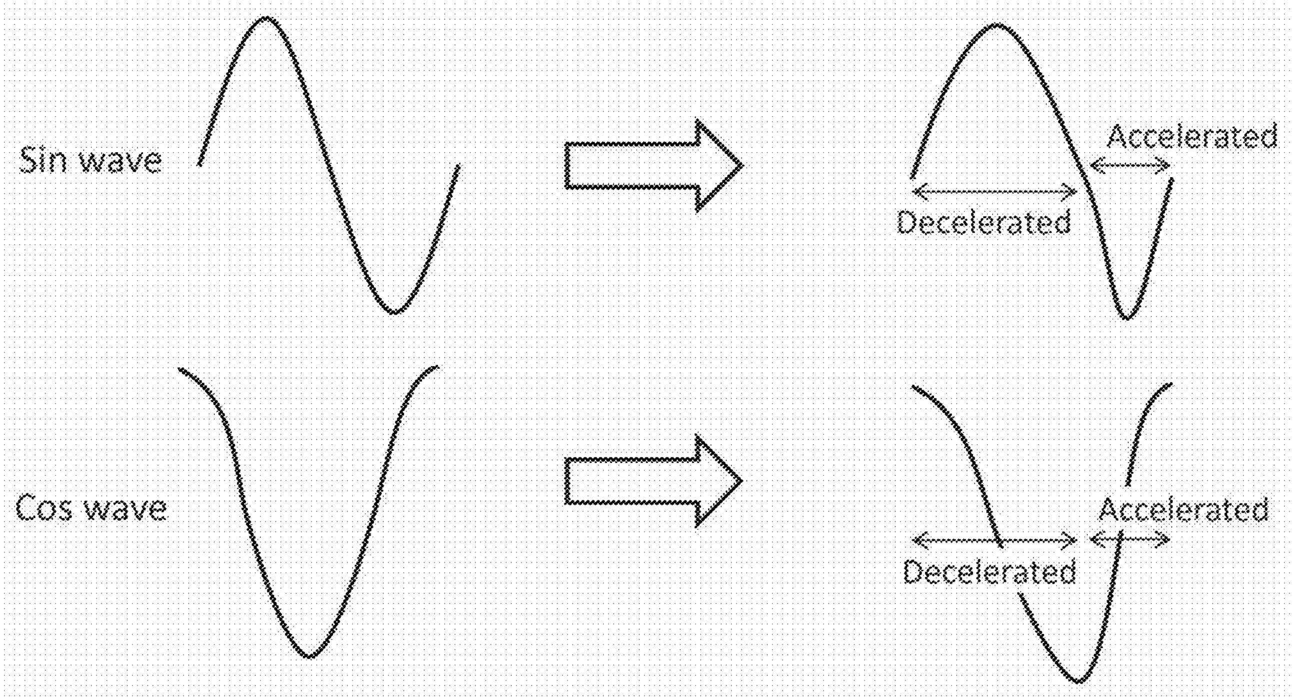

FIG. 223 Waveform control: accelerated sweep (Sense of click)
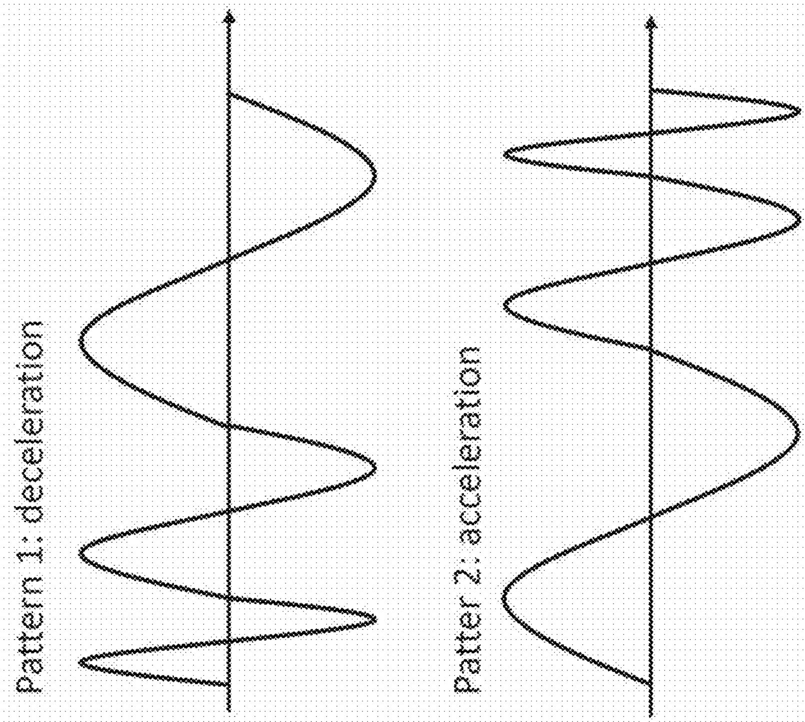

FIG. 224 Waveform control: acceleration/shift control
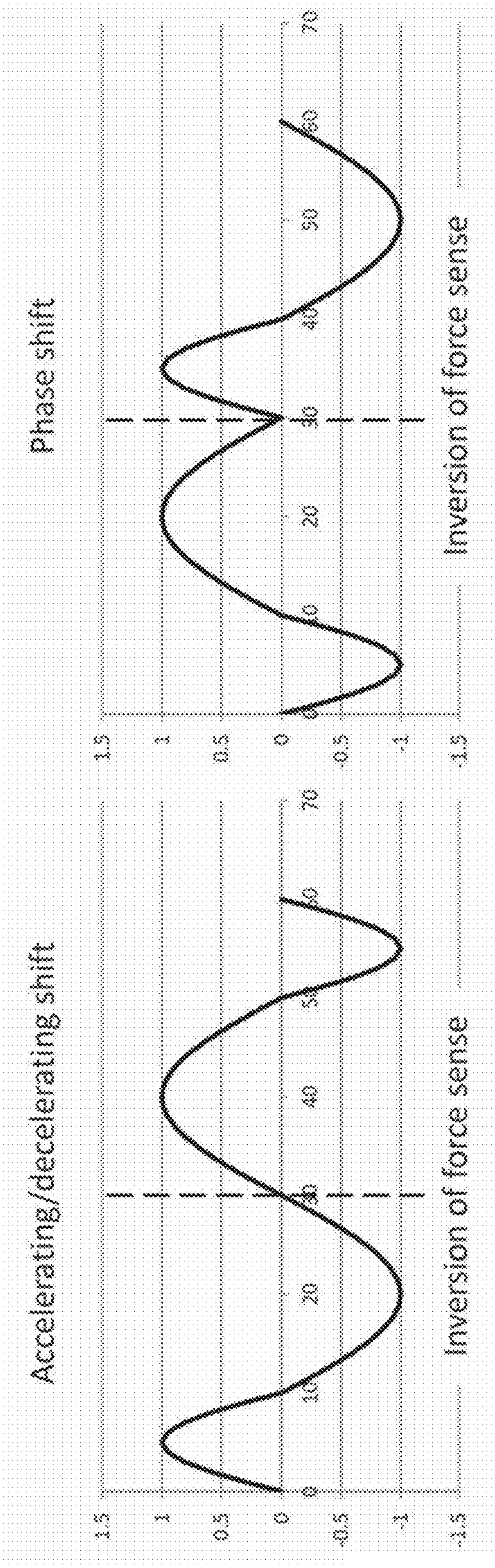
The acceleration/deceleration positions are switched with the phase of the waveform fixed.
The Phase of the waveform is switched with the acceleration/deceleration positions fixed.

FIG. 225 Example of actuator (Eccentric motor)
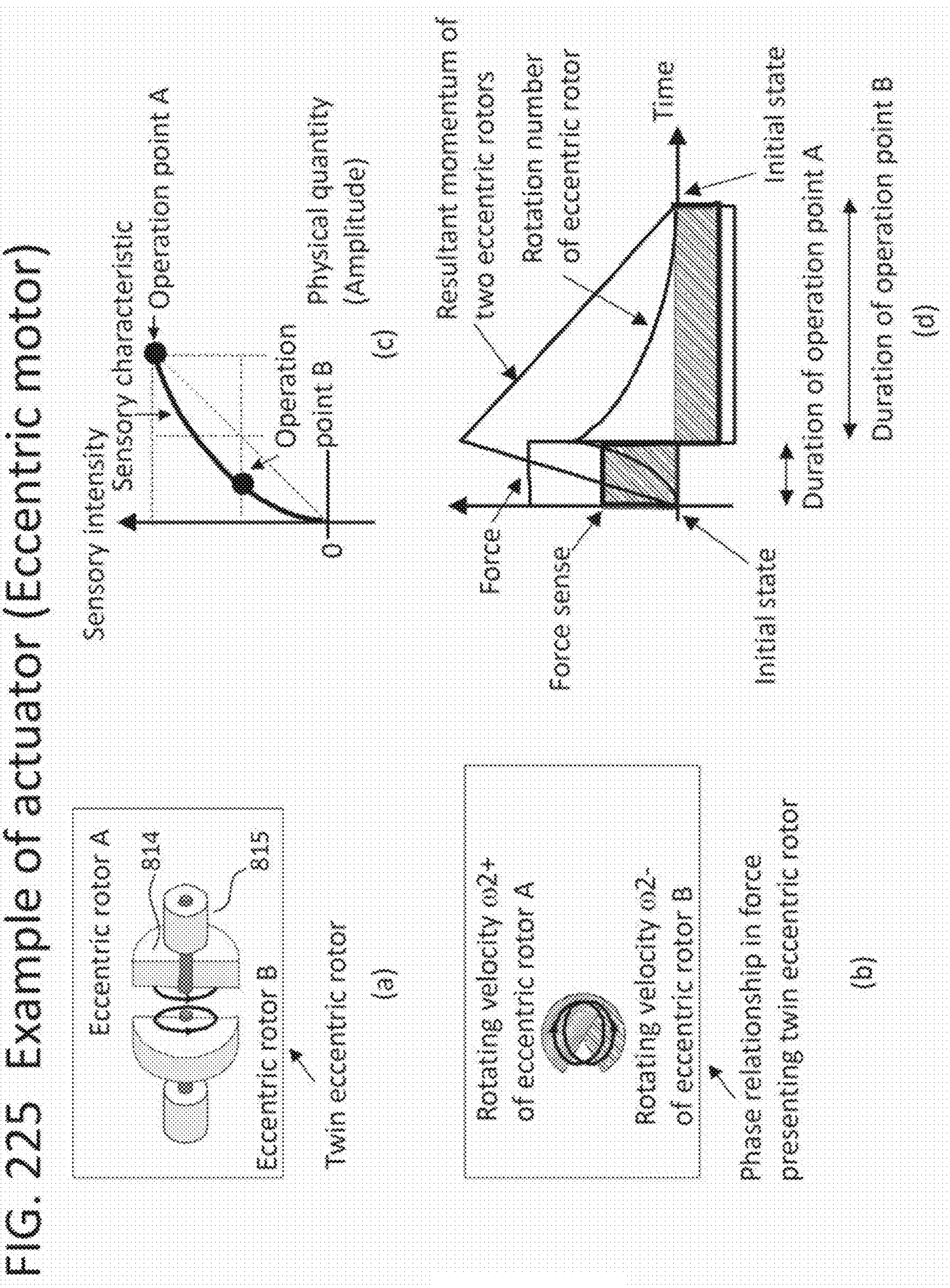

FIG. 226 Example of actuator (Eccentric motor)
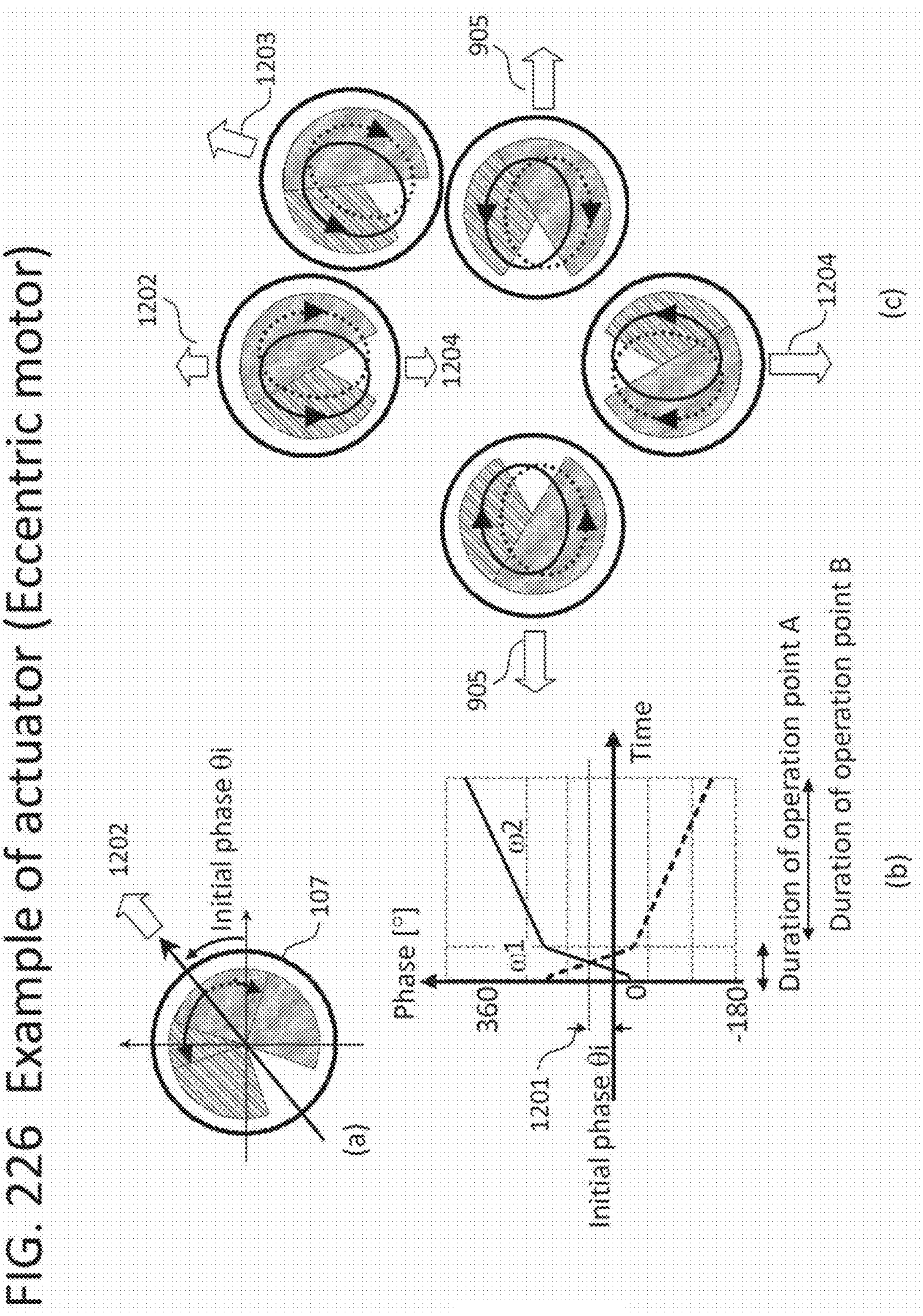

FIG. 227 Example of actuator (Eccentric motor)
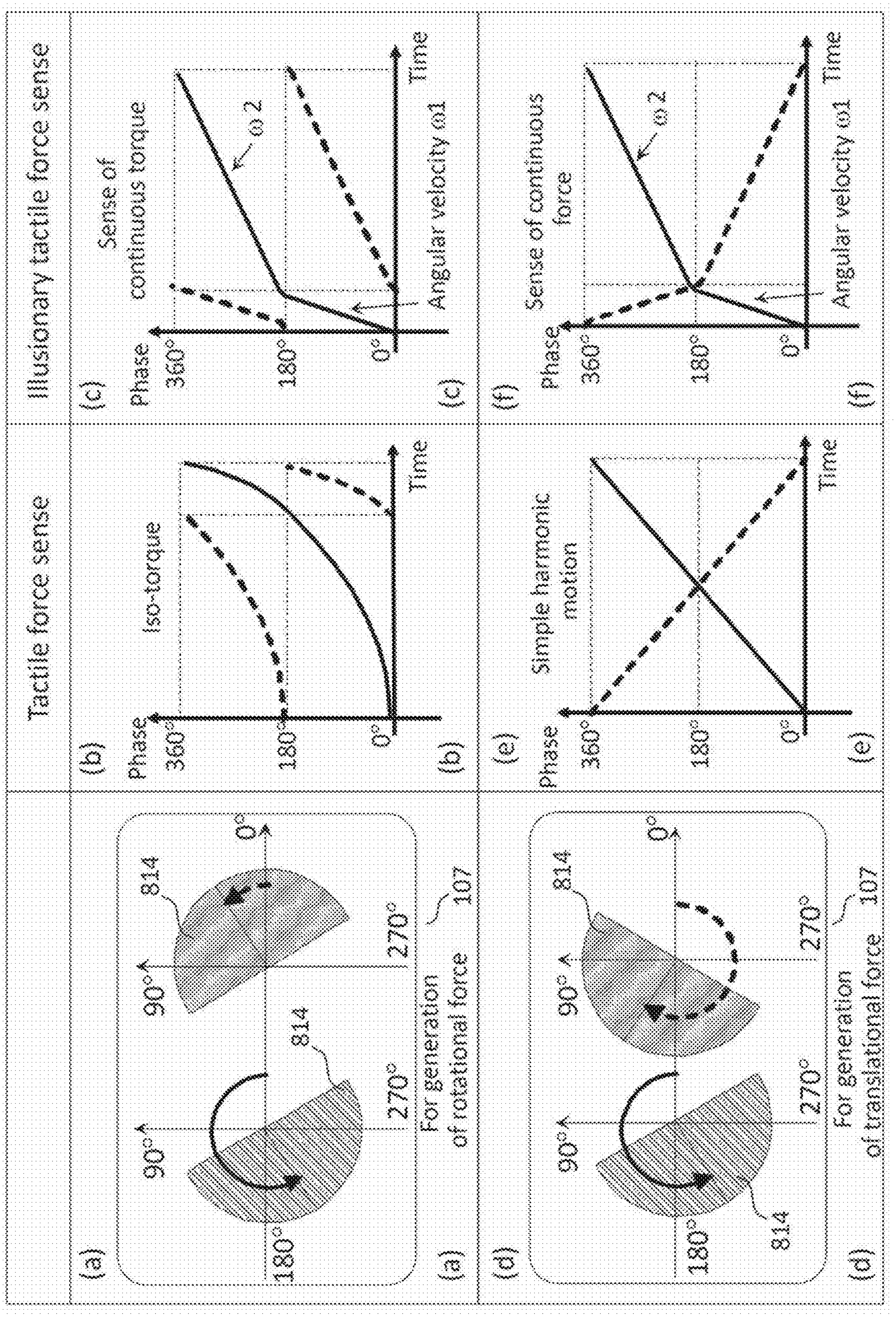

FIG. 228 Generation of illusionary tactile force sense
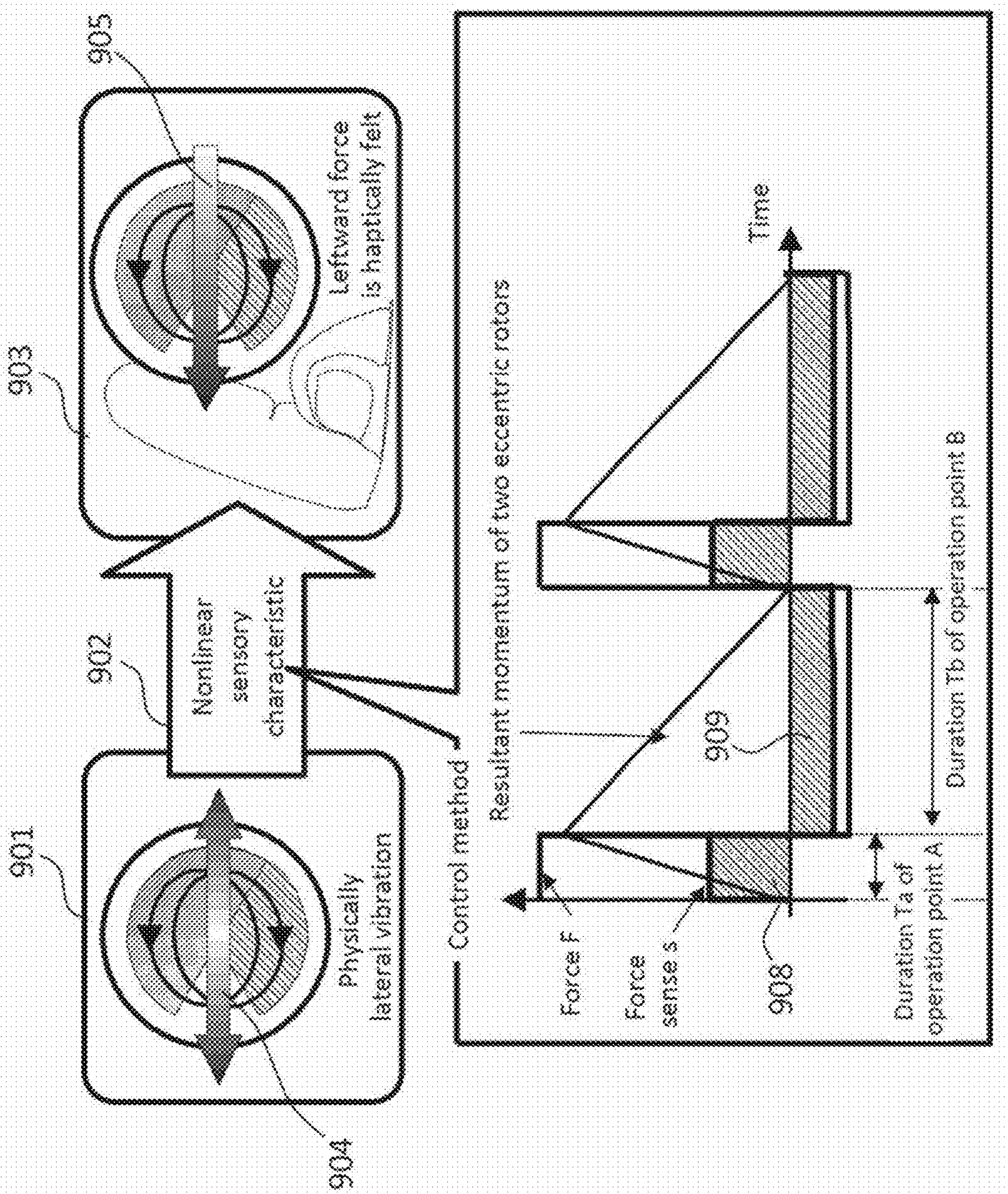

FIG. 229 Sensory characteristic, physical property, and hysteresis
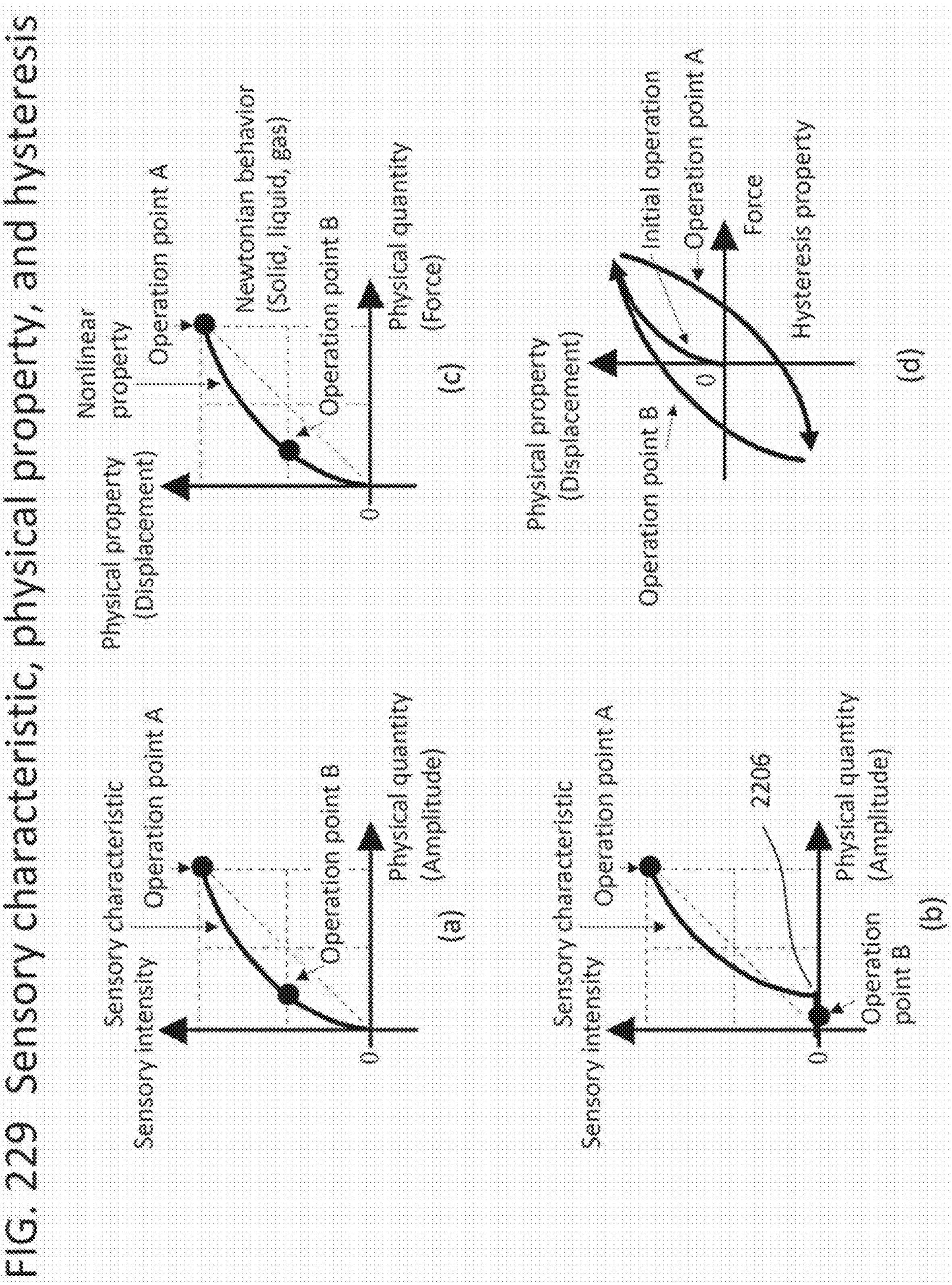

FIG. 230 sensory characteristic and masking method
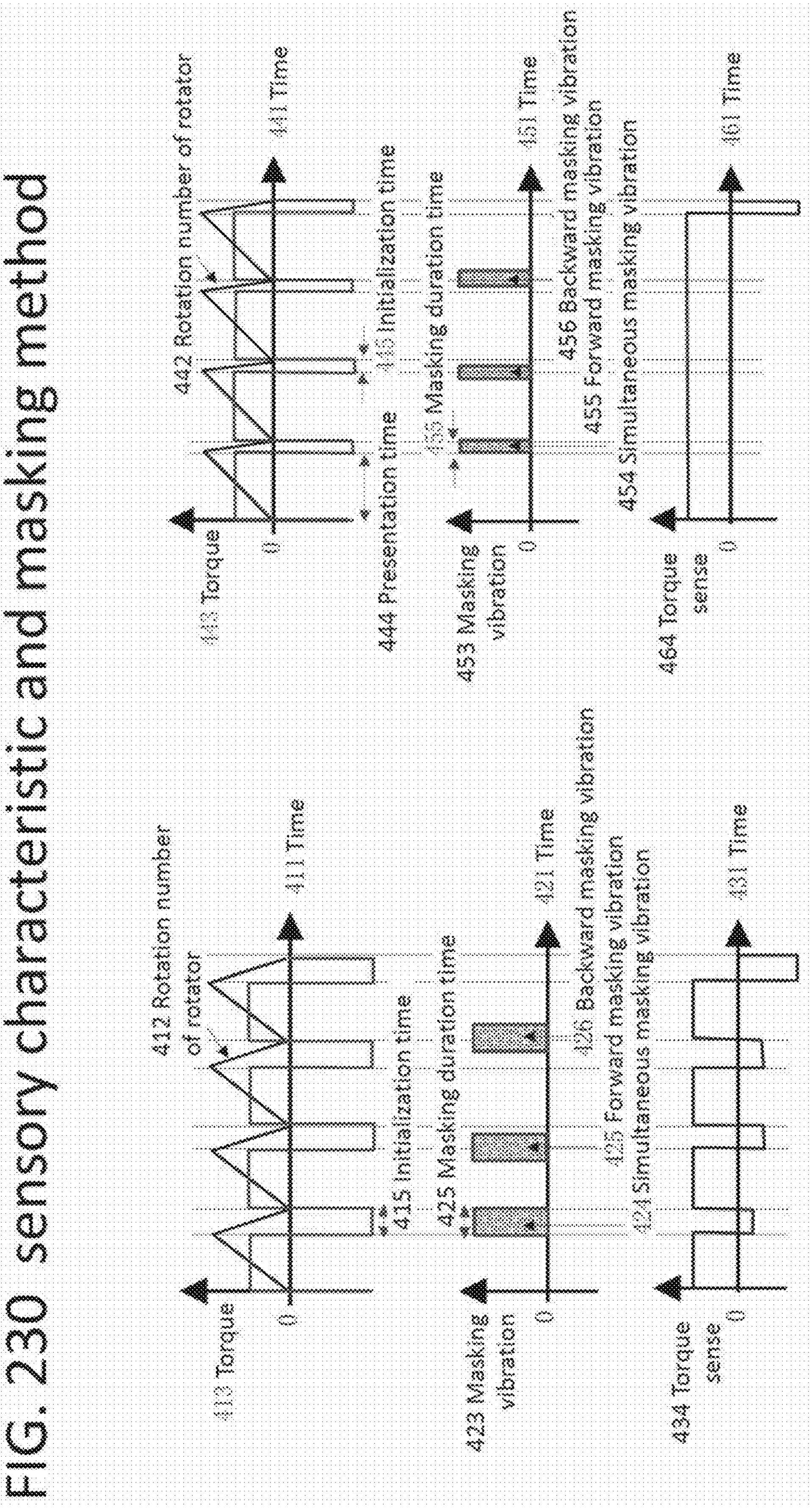

FIG. 231 sensory characteristic and masking method
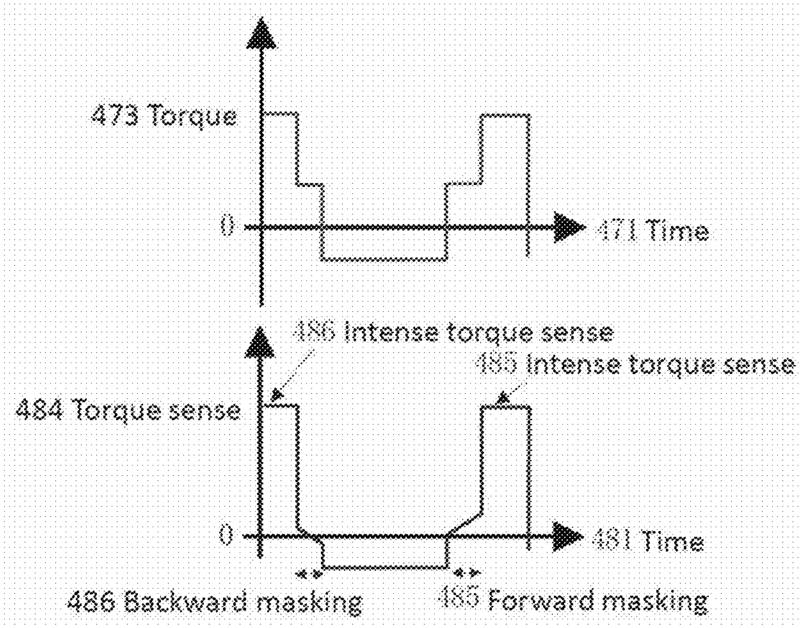

Fig. 232 sensory characteristic and masking method
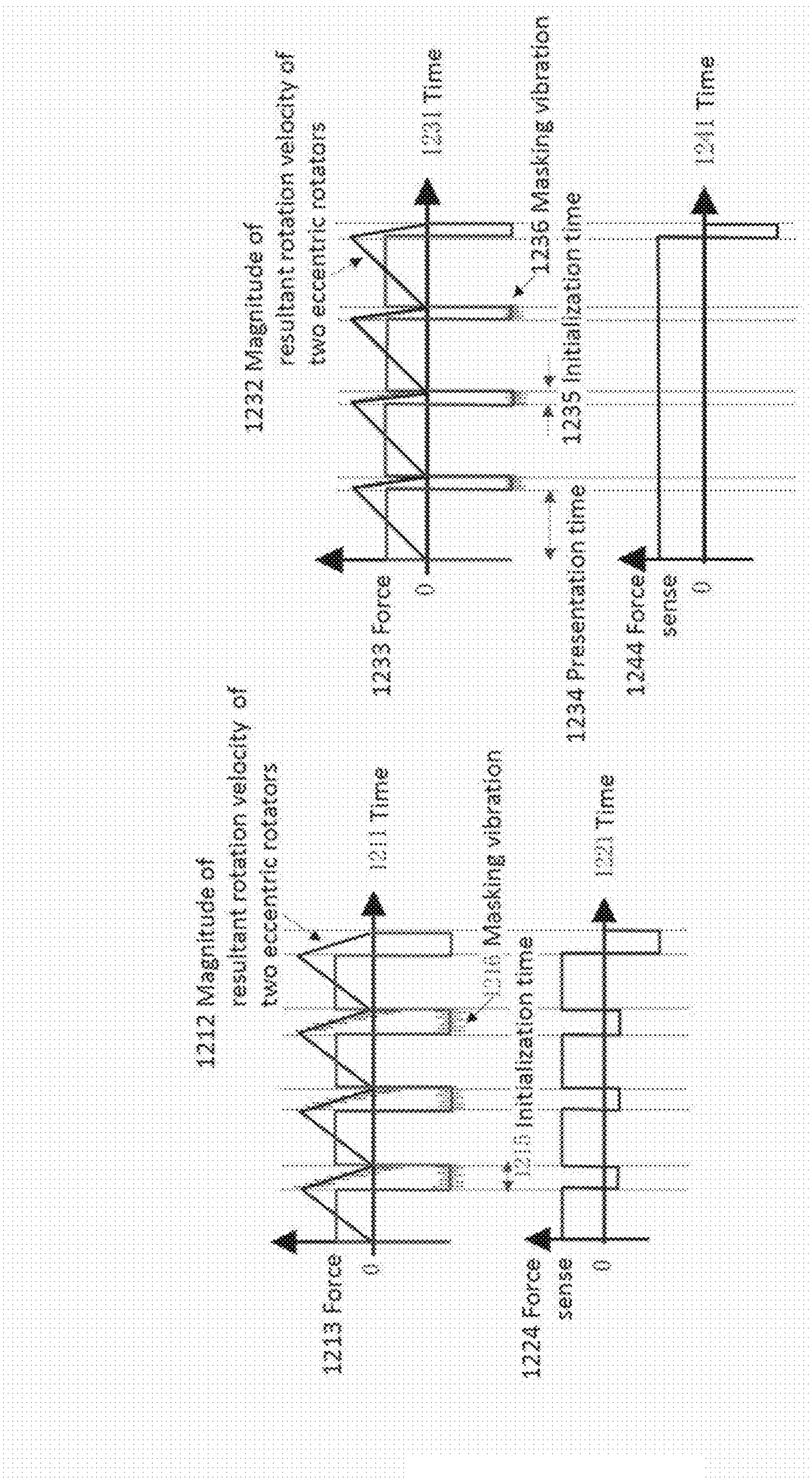

FIG. 233 Individual difference of sensory characteristic
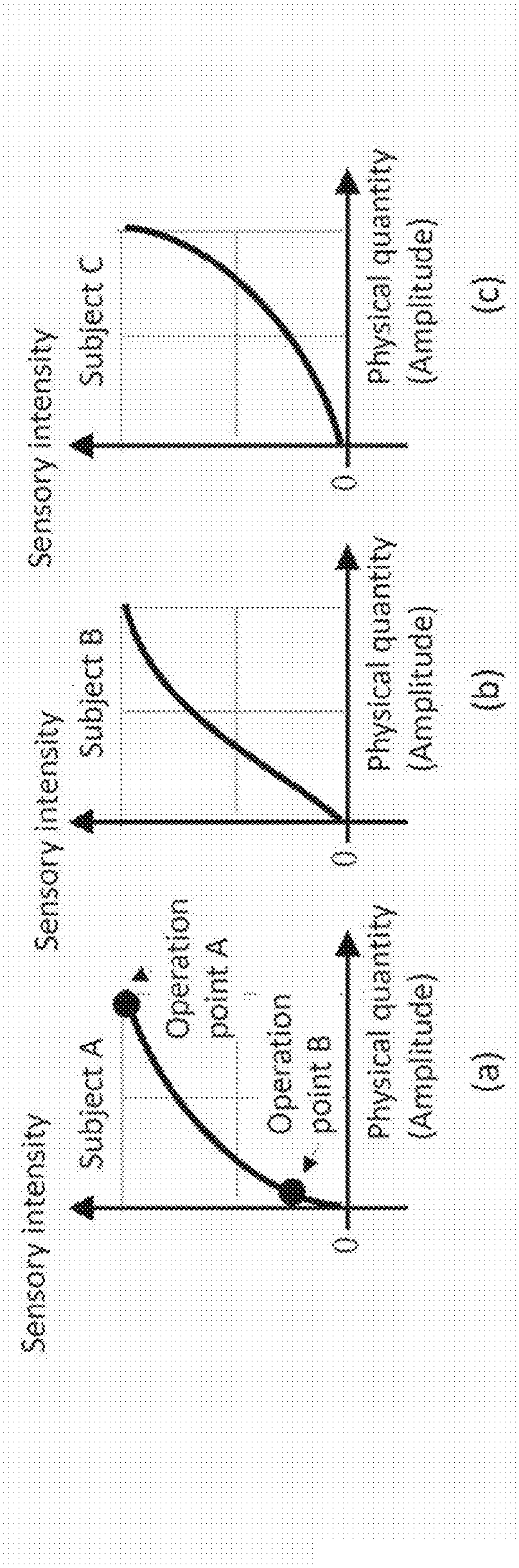

FIG. 234 Control method
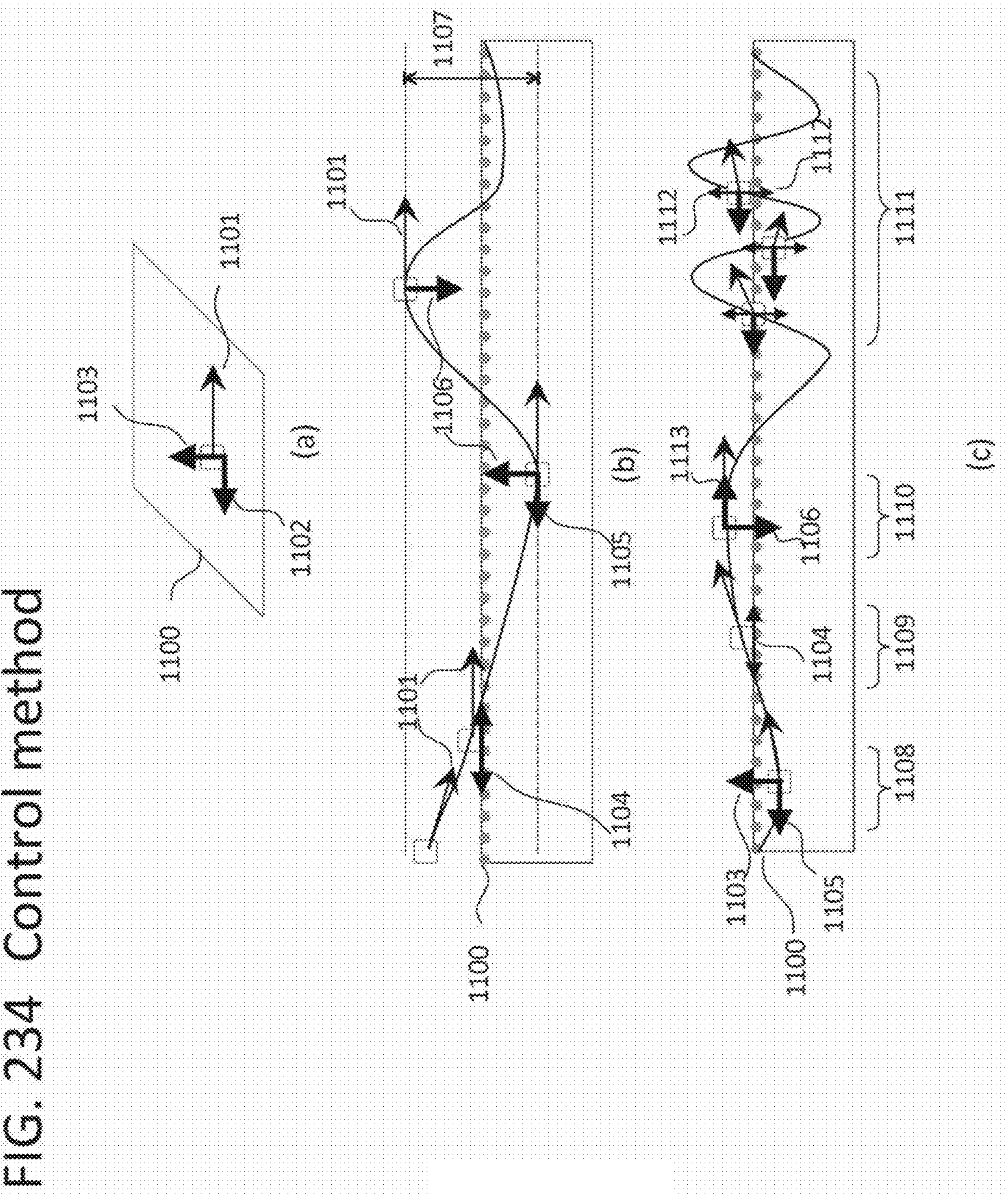

FIG. 235 Nonlinear control of physical property
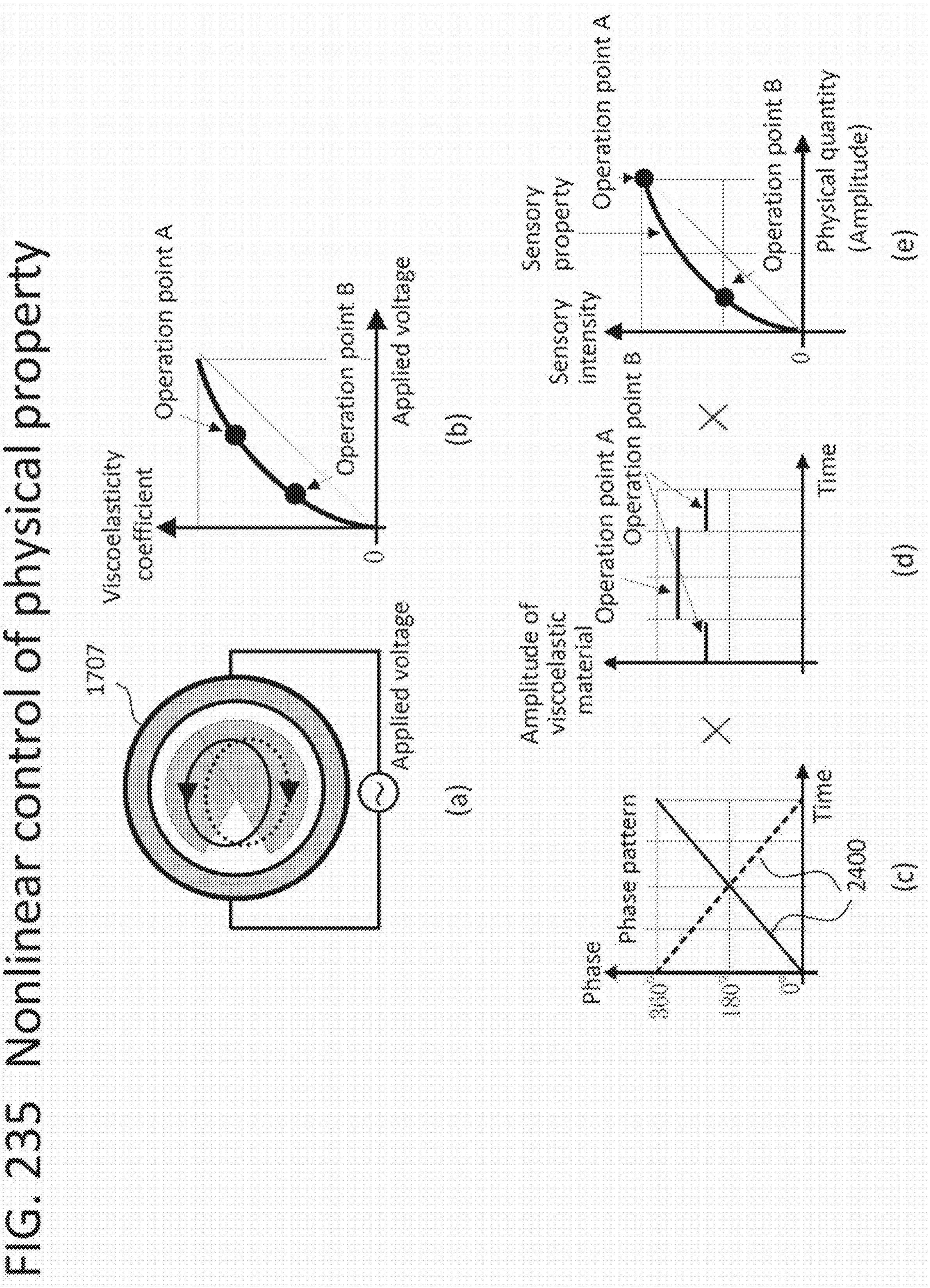

FIG. 236 Example of an actuator (Eccentric motor)
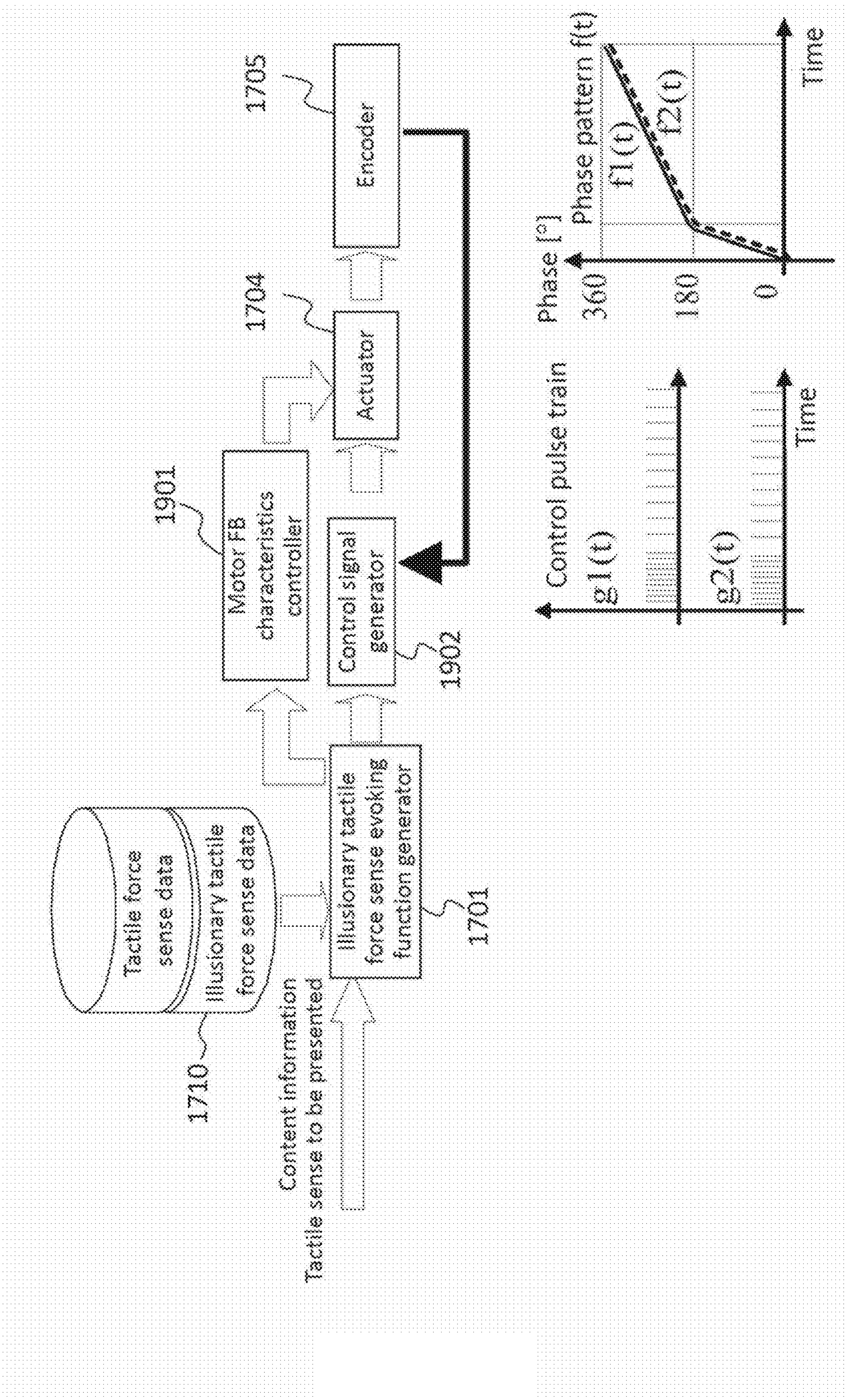

FIG. 237 Examples of installation method (for installing Panel on fingertip)
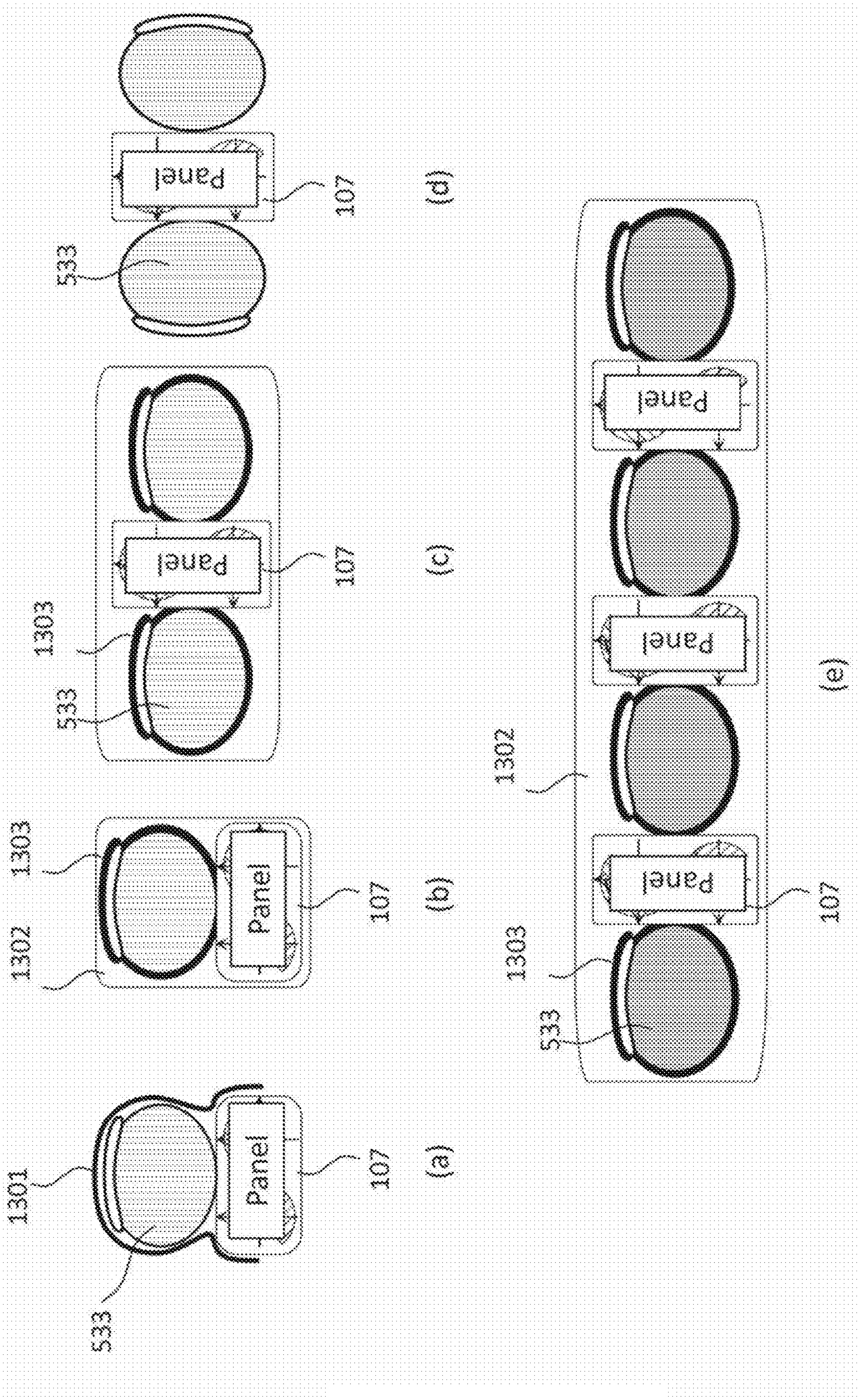

FIG. 238 Configurations and examples of installation method
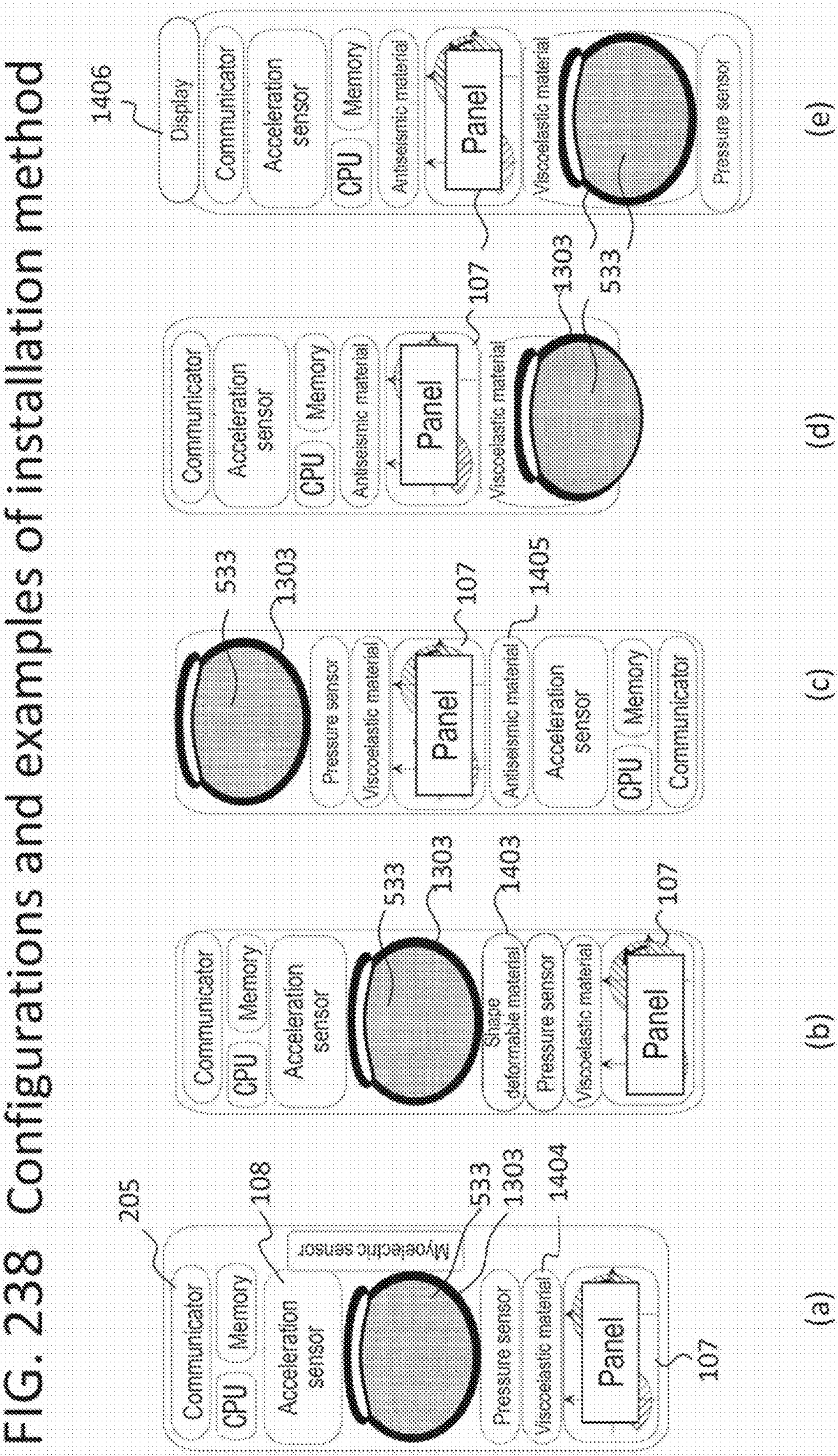

FIG. 239 Installation method (Grip type and variation)
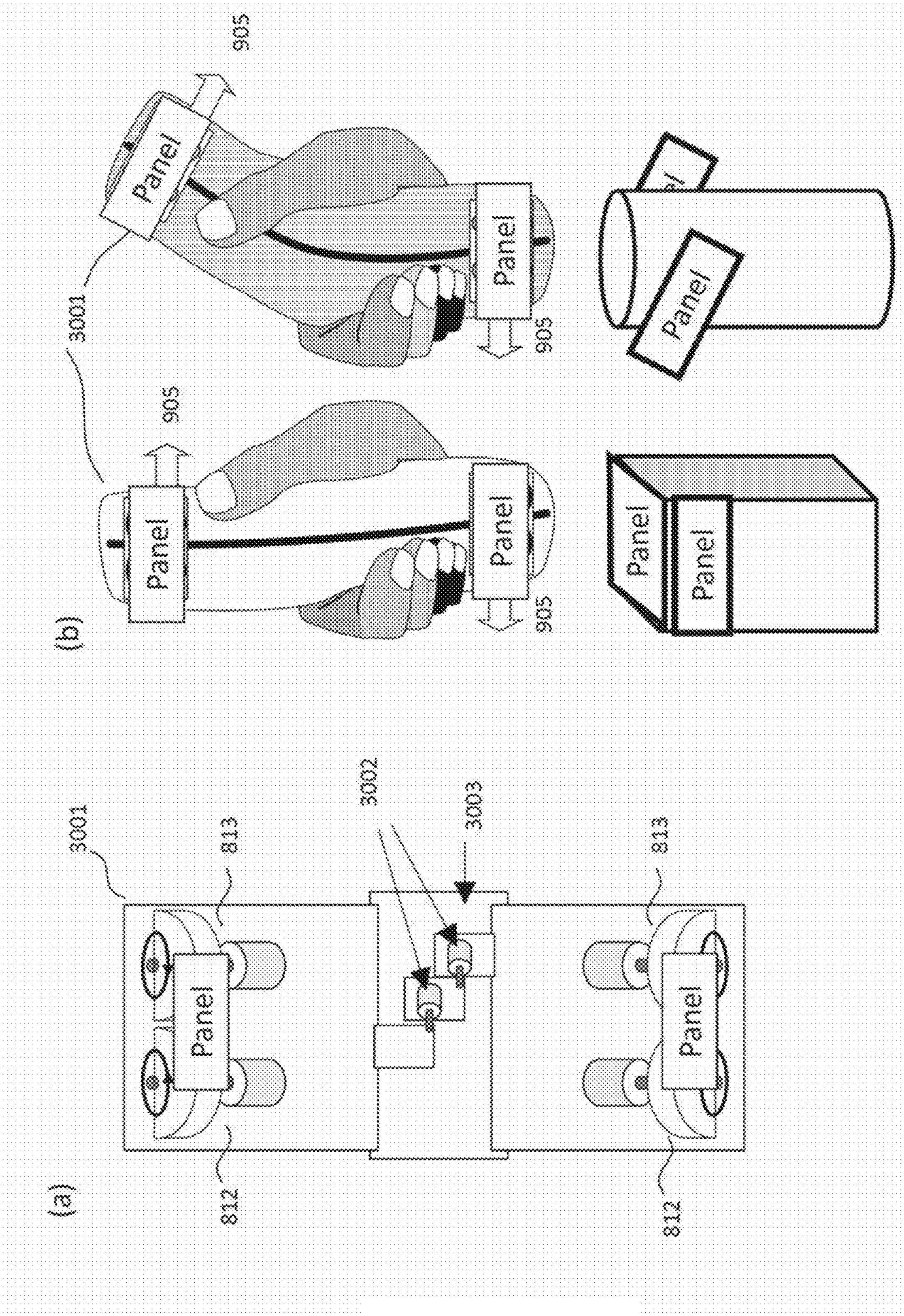

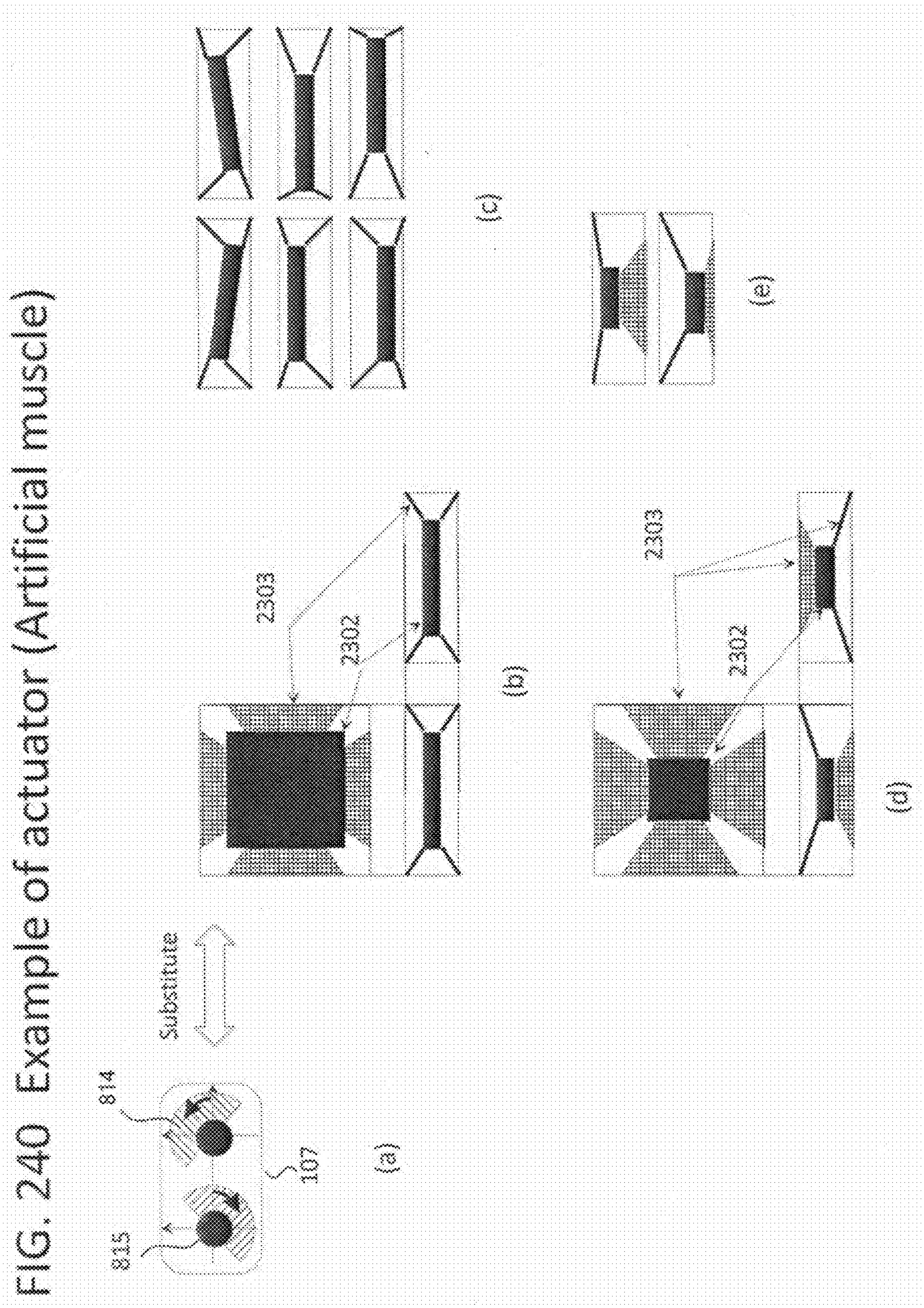
FIG. 240 Example of actuator (Artificial muscle)

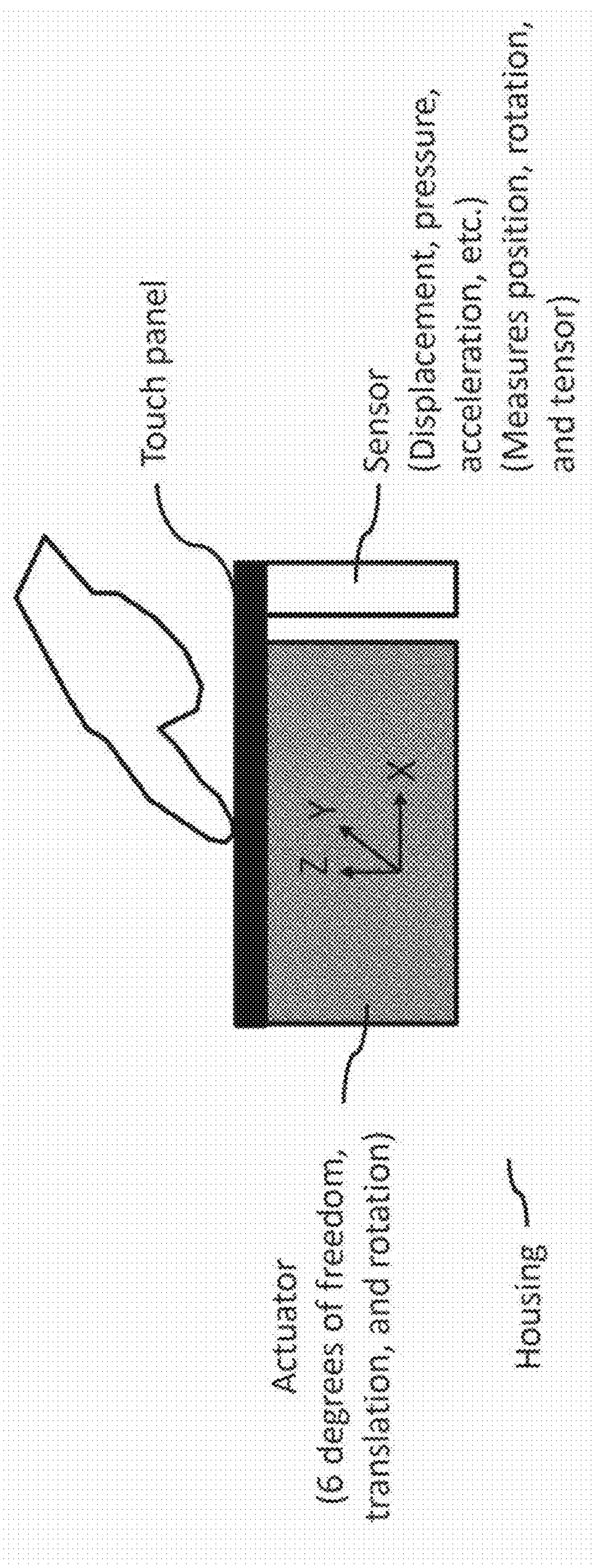
FIG. 241 Haptic Actuator Element Unit

FIG. 242 Table type
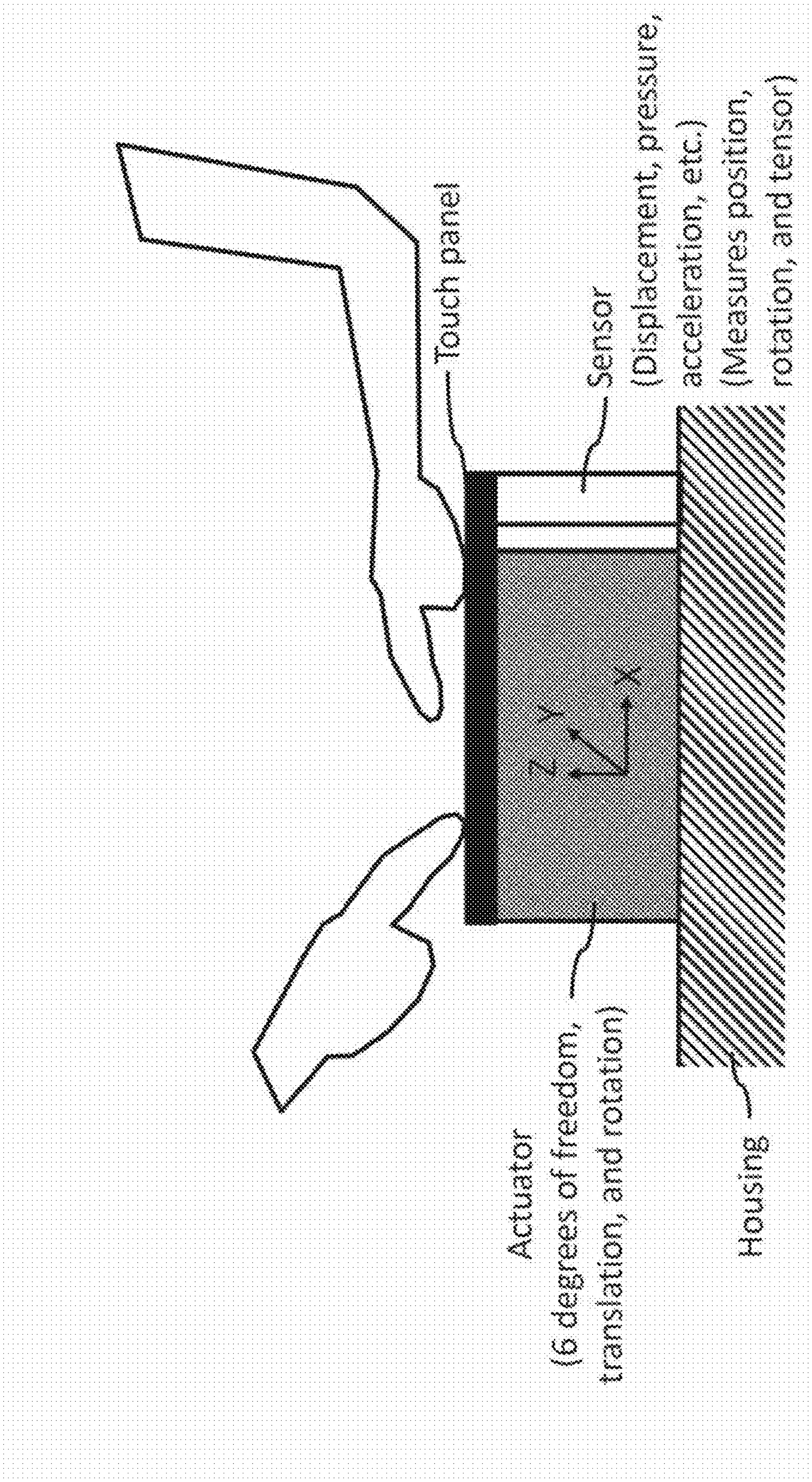

FIG. 243 Table type
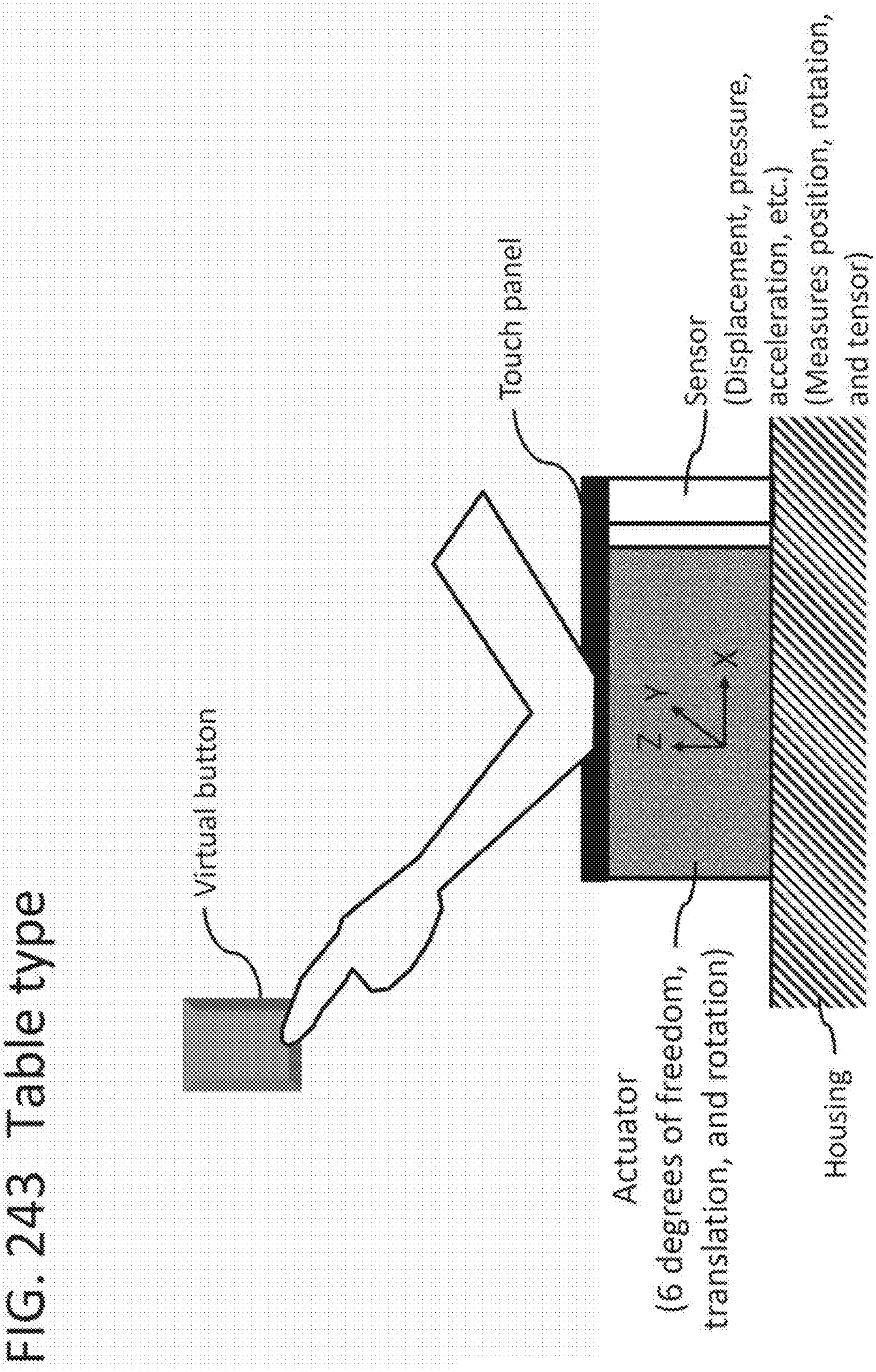

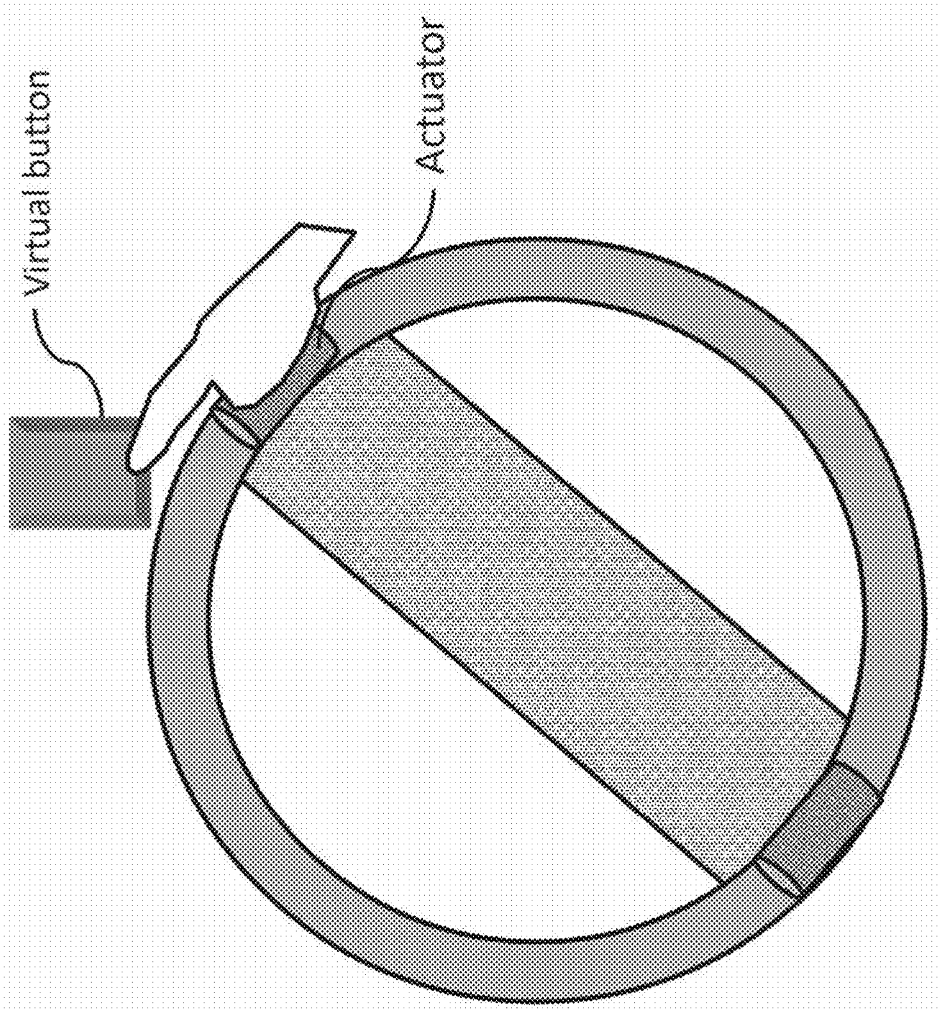
FIG. 244 Handle type

FIG. 245 Handle type
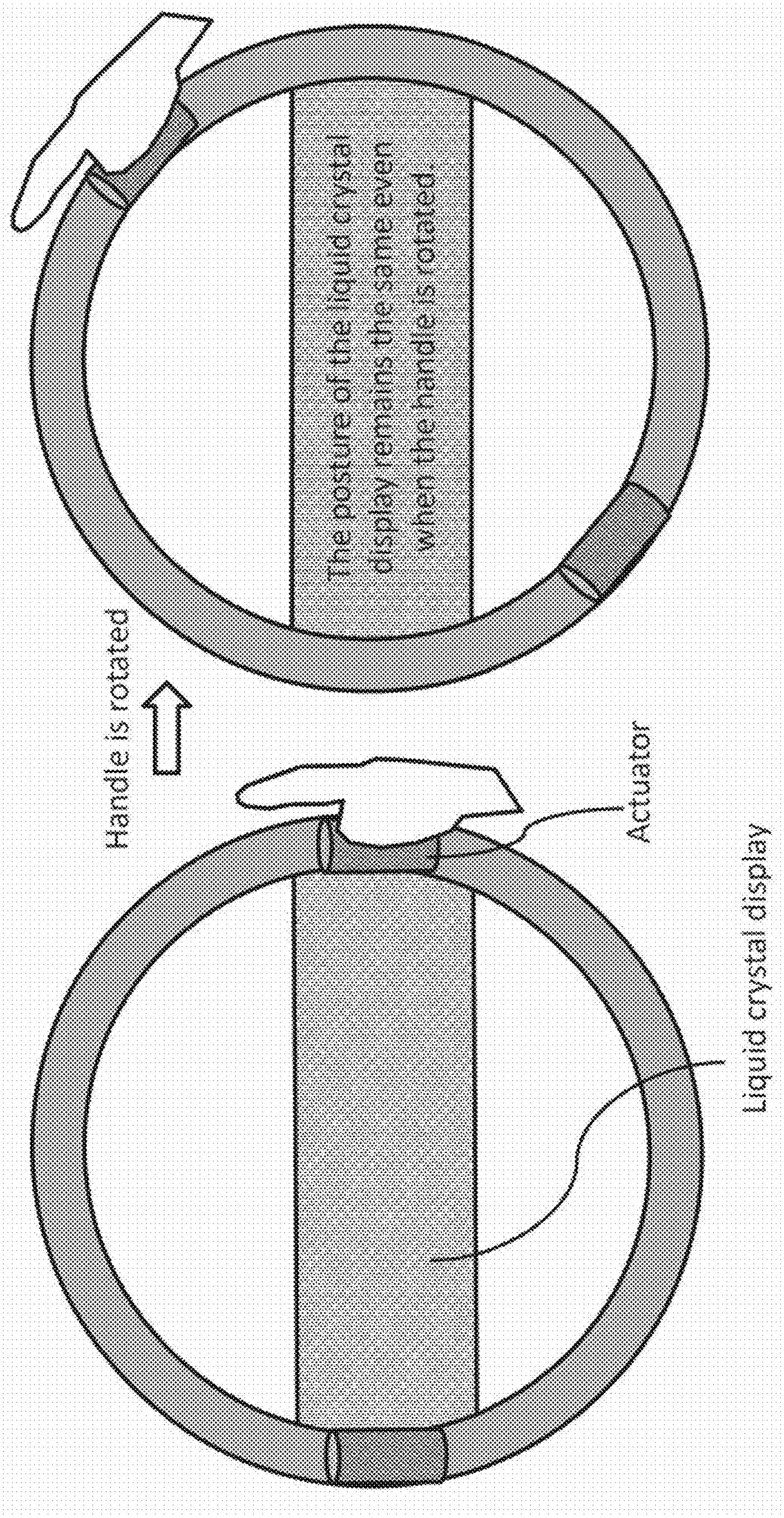

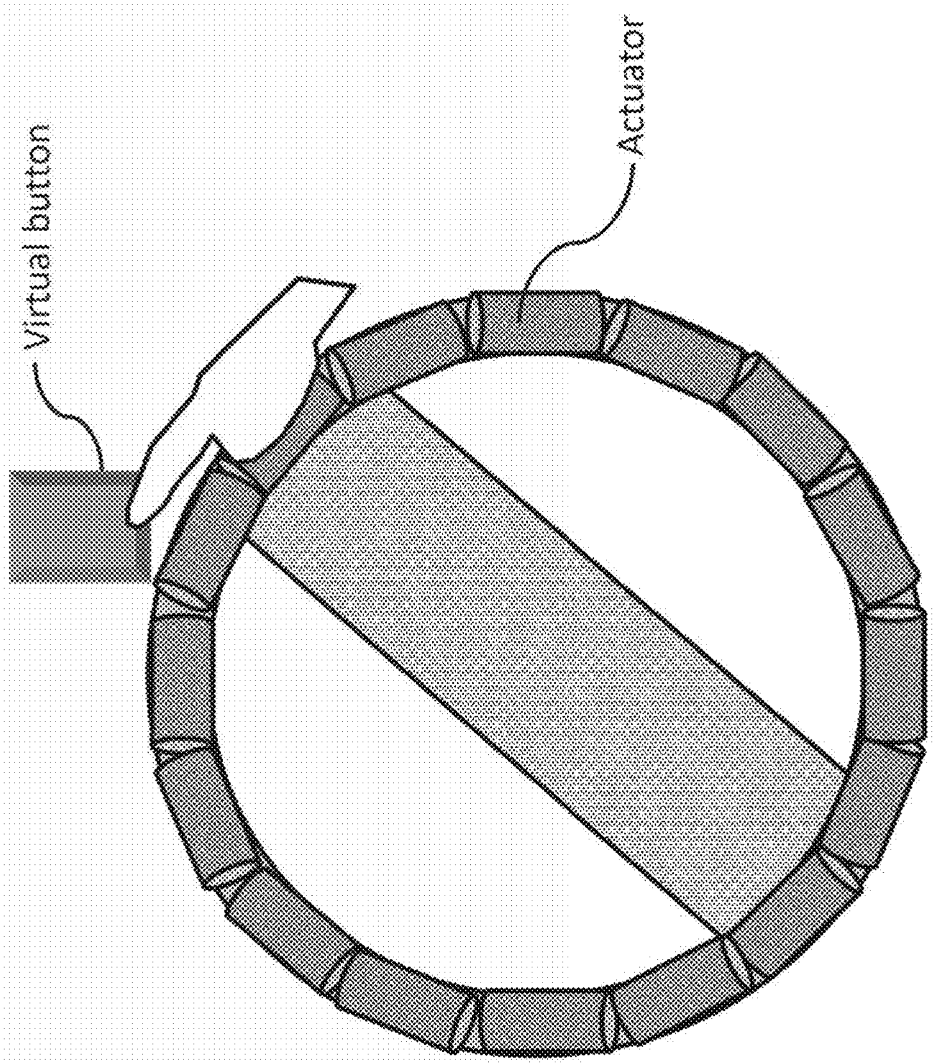
FIG. 246 Handle type

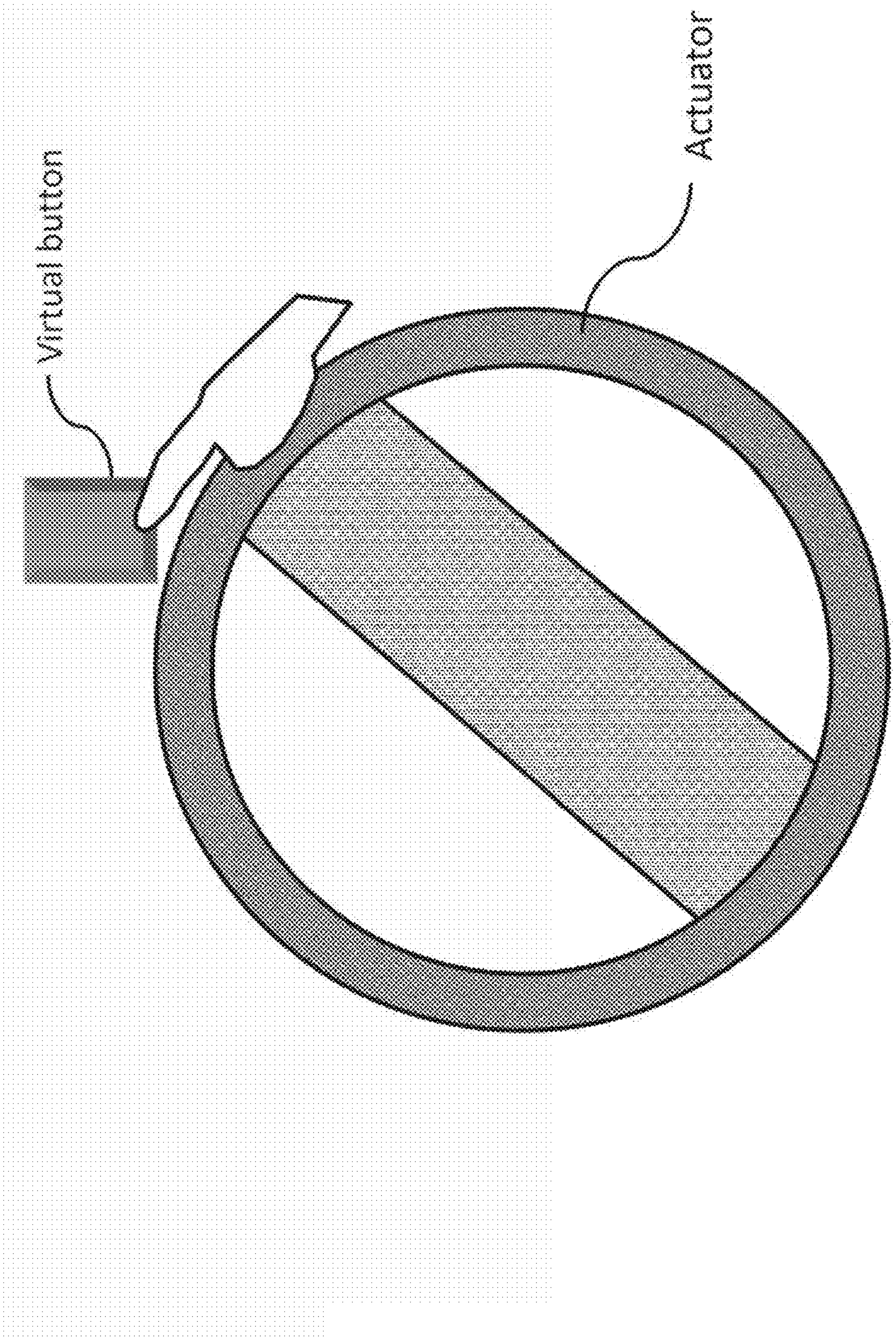
FIG. 247 Handle type

FIG. 248 Surface layer type
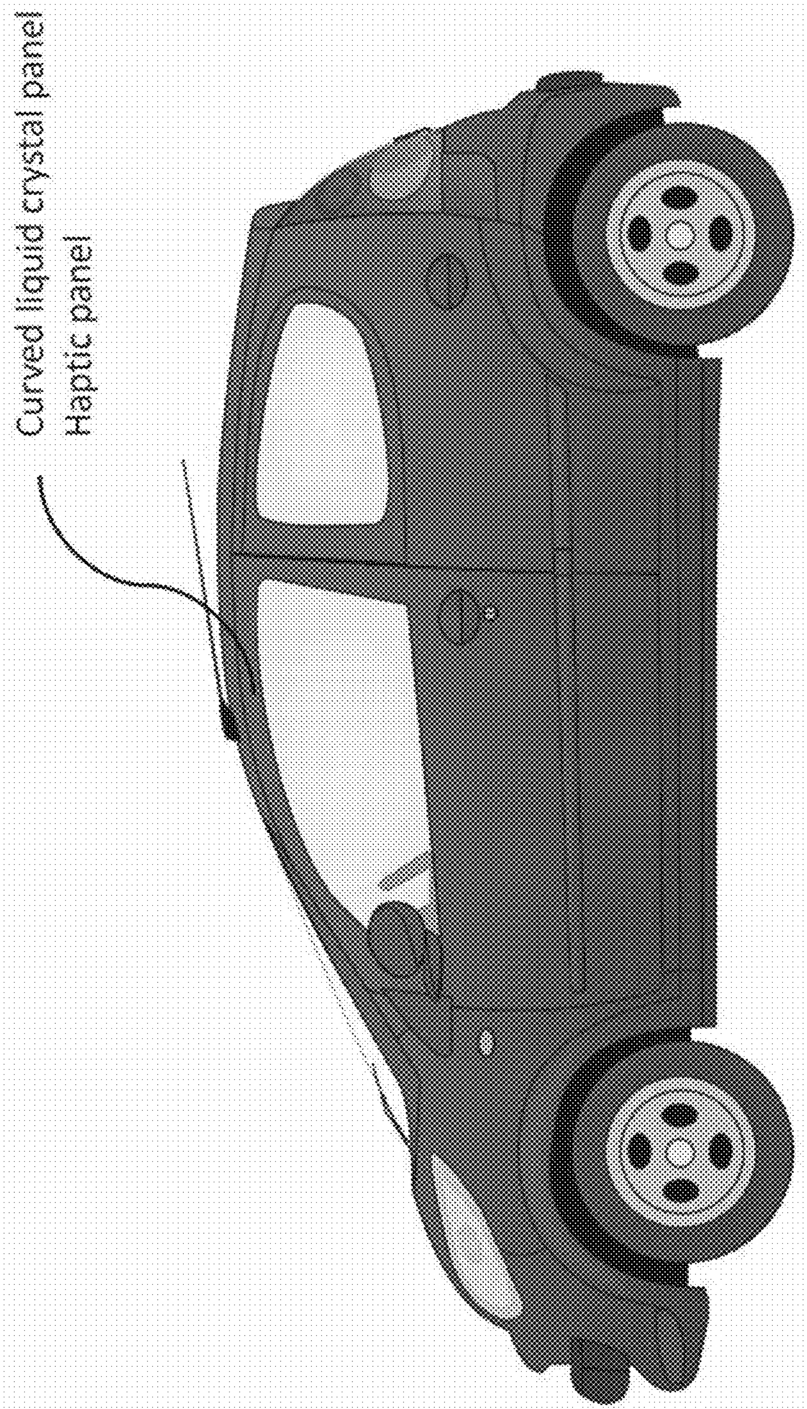

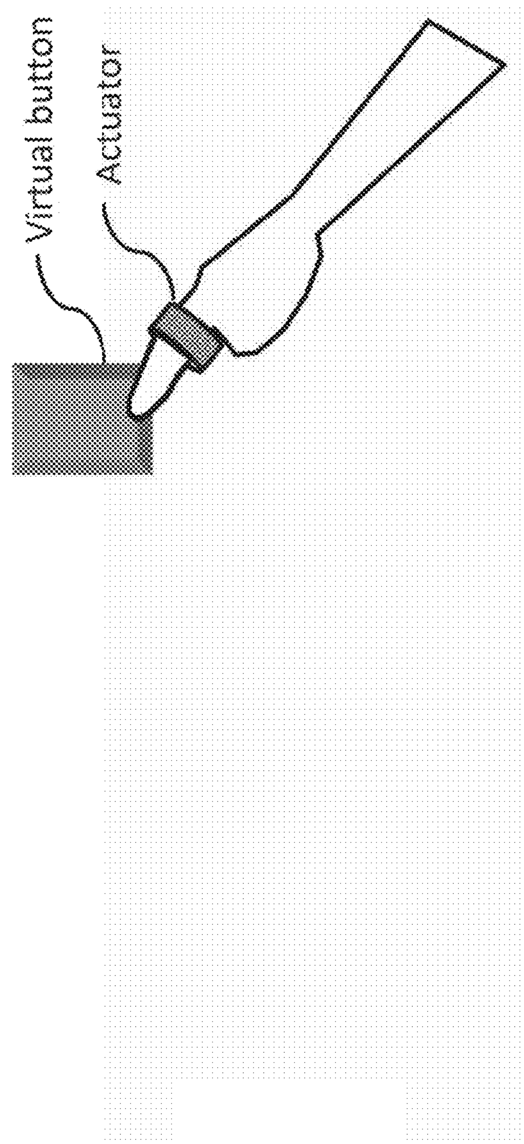
FIG. 249 Ring type

FIG. 250 Wrist band type
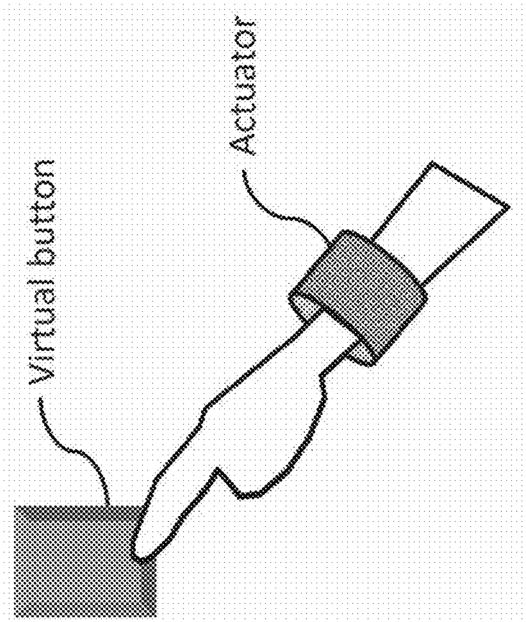

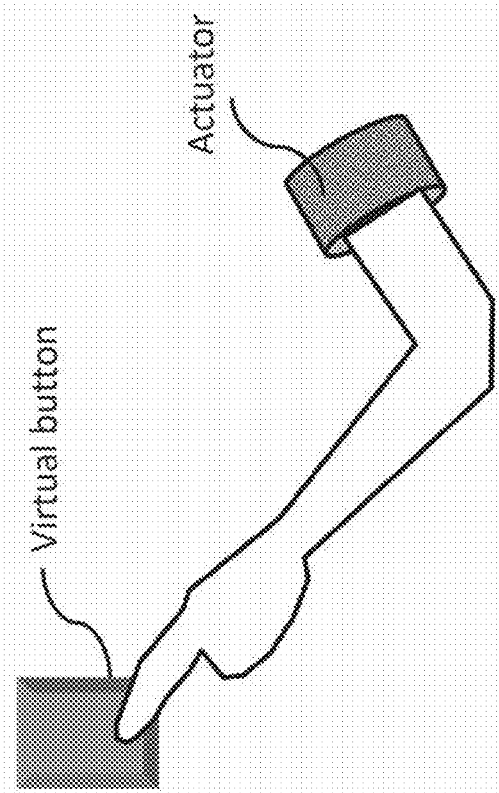
FIG. 251 Arm ring type

FIG. 252 Installation portions
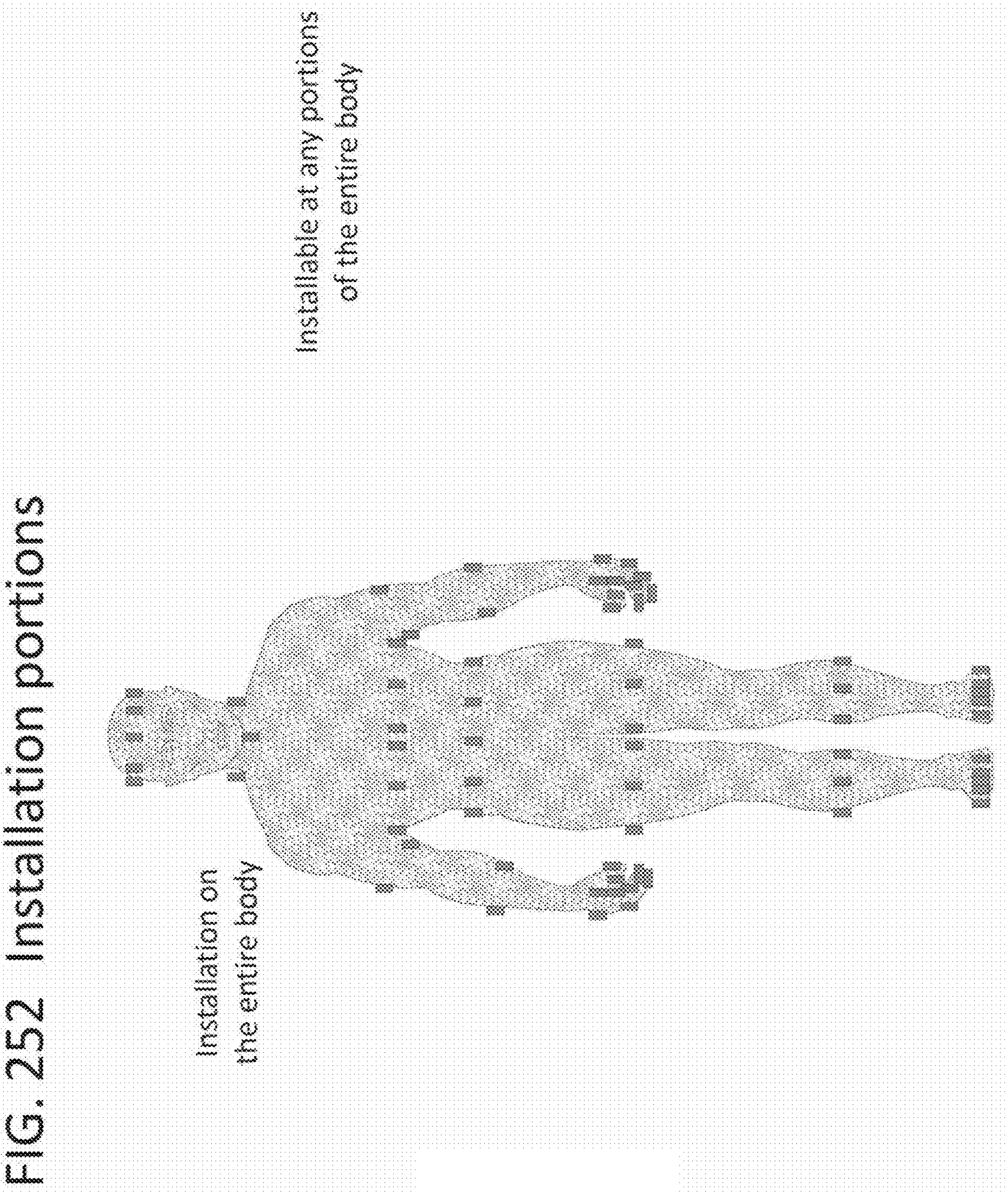

FIG. 253 Variation of control wires (Parallel arrangement)
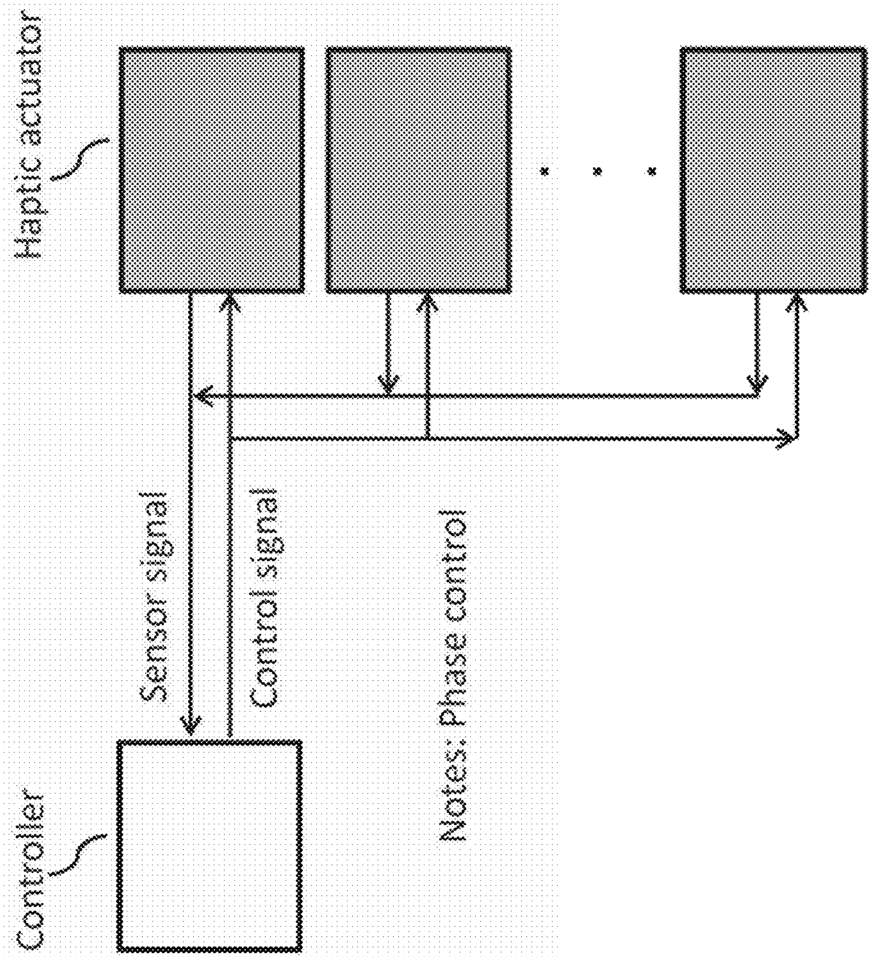

FIG. 254 Variation of control wires (Crossed arrangement)
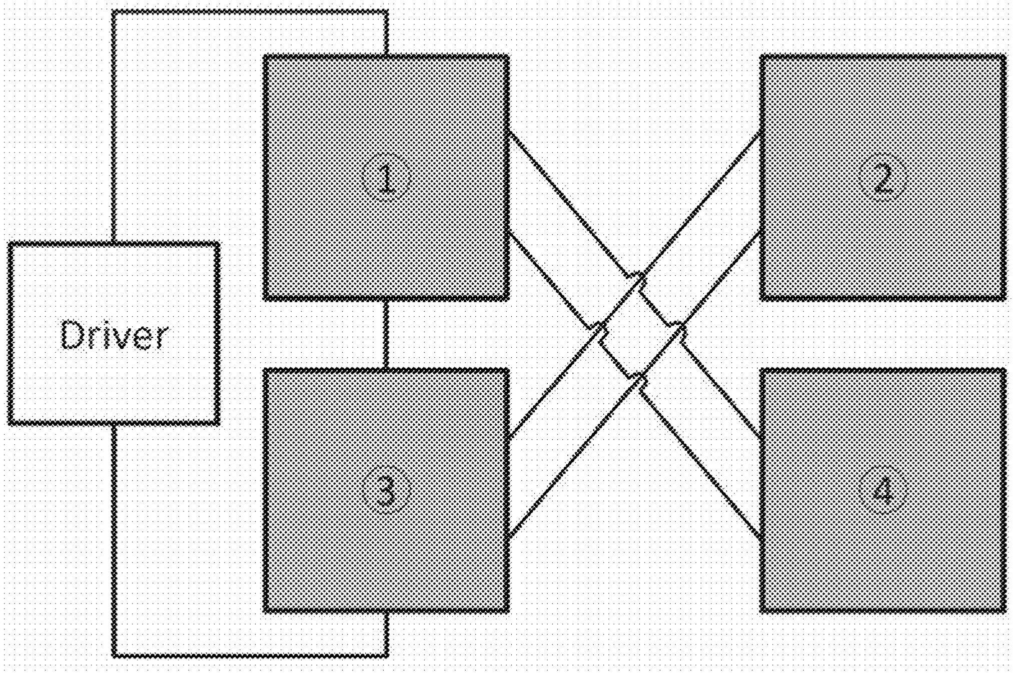
- ① and ④ are connected in parallel.
- ② and ③ are connected in parallel.
- ①-④ and ②-③ are connected in series.

FIG. 255 System and parts
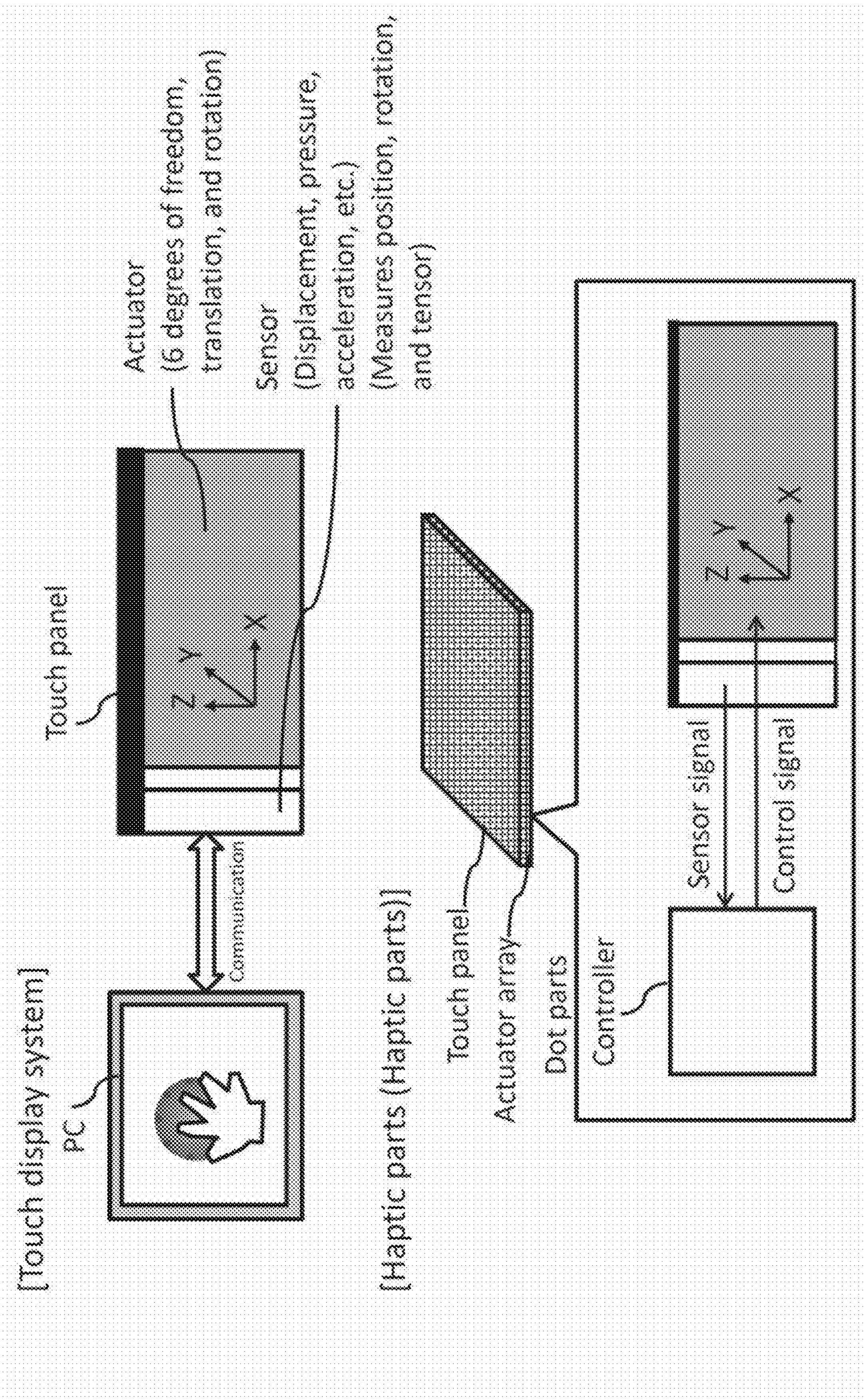

FIG. 256 Variation of module integration
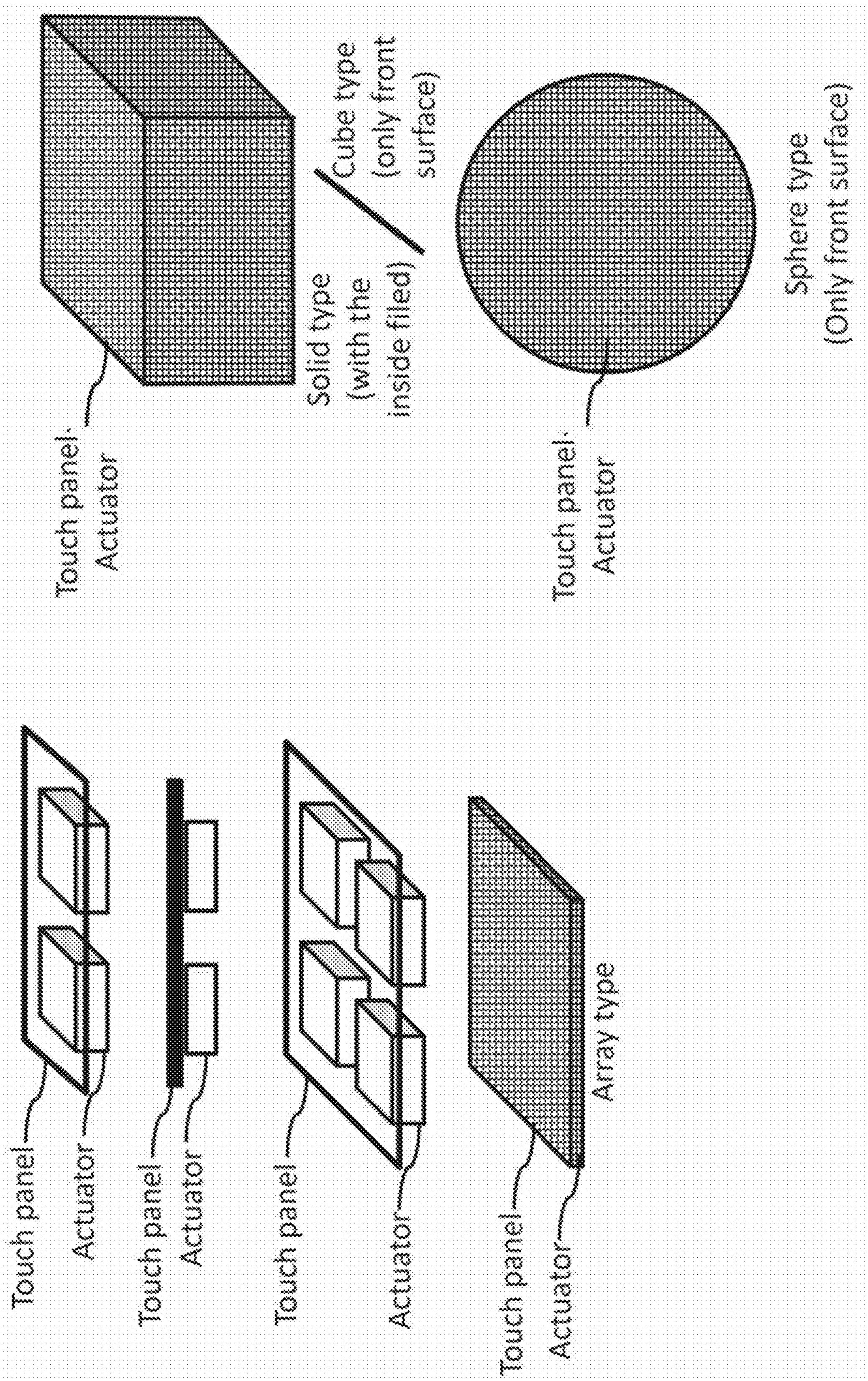

FIG. 257 Array type and module (Flat plane, free-form curved surface)
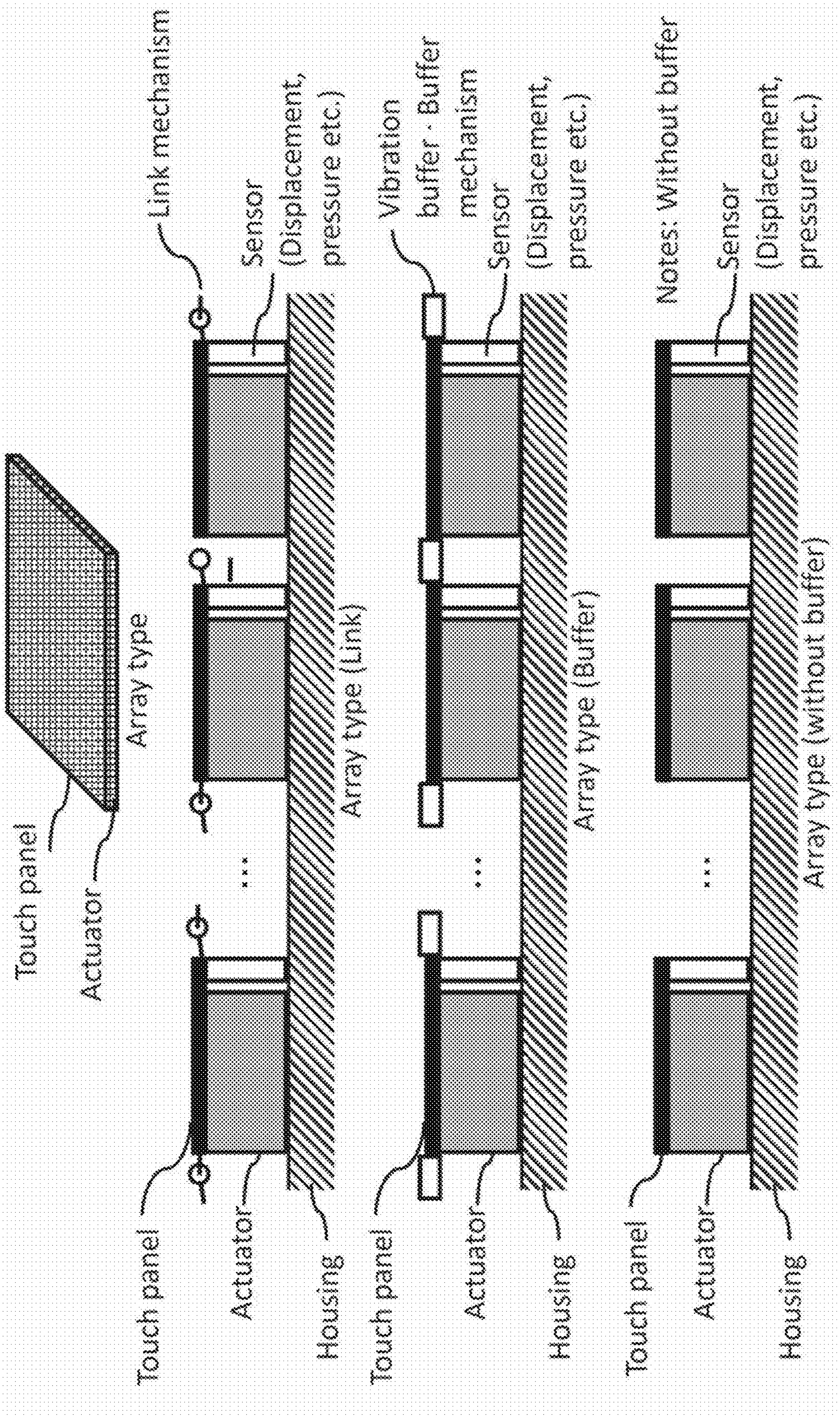

FIG. 258 Points of illusion phenomenon
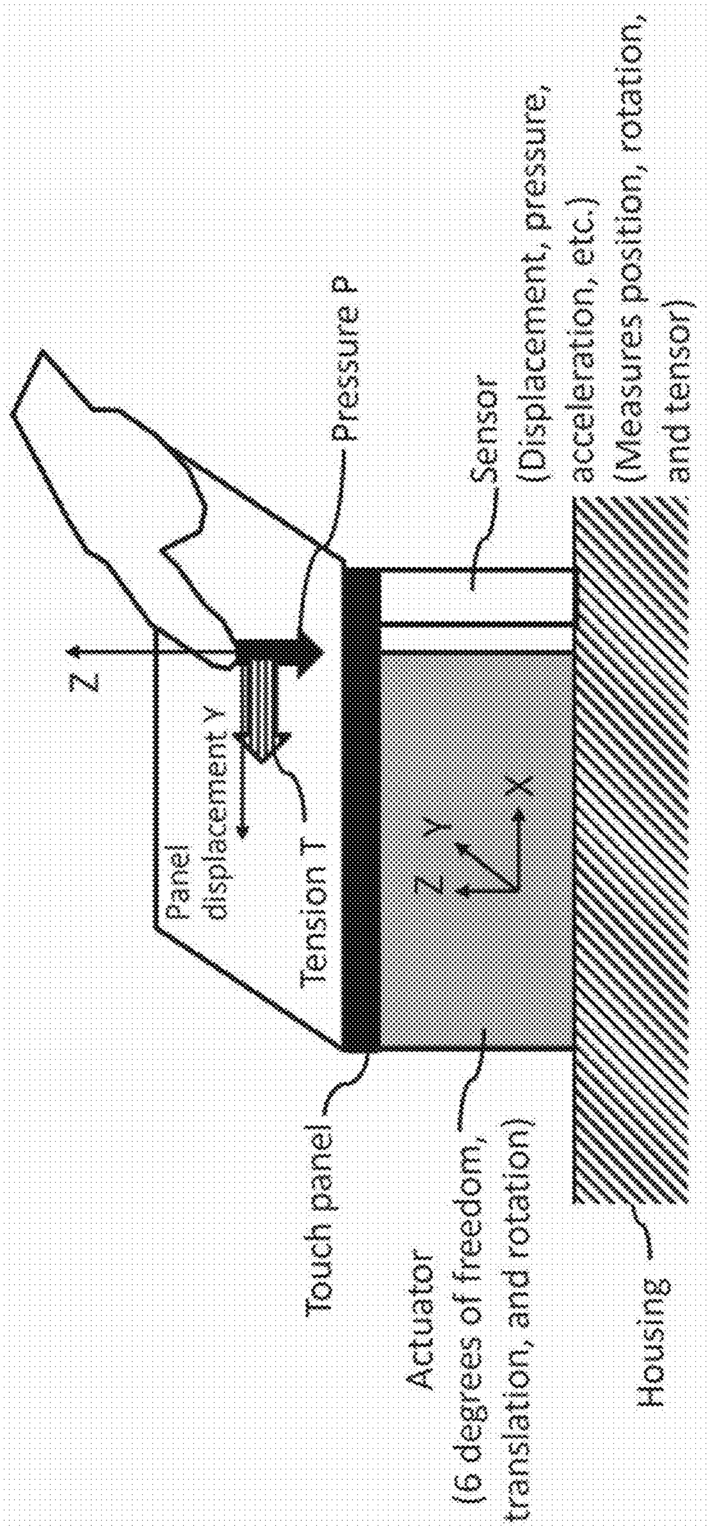

FIG. 259 Basic module of haptic device
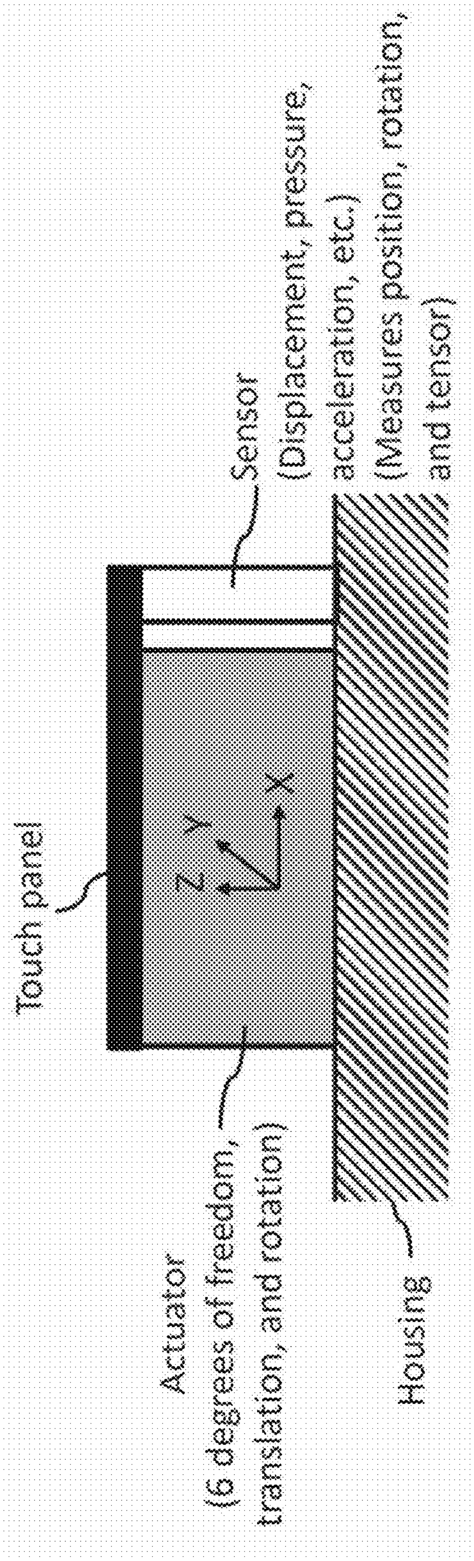

FIG. 260 Basic module of haptic device
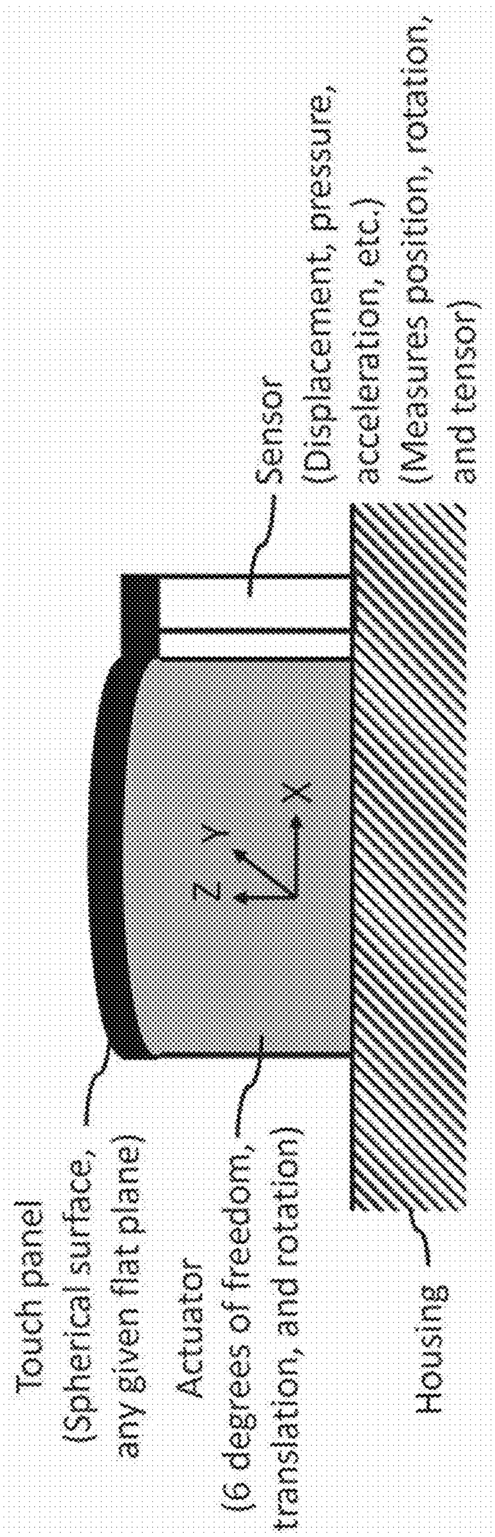

FIG. 261 Haptic device (Compatible with real time)
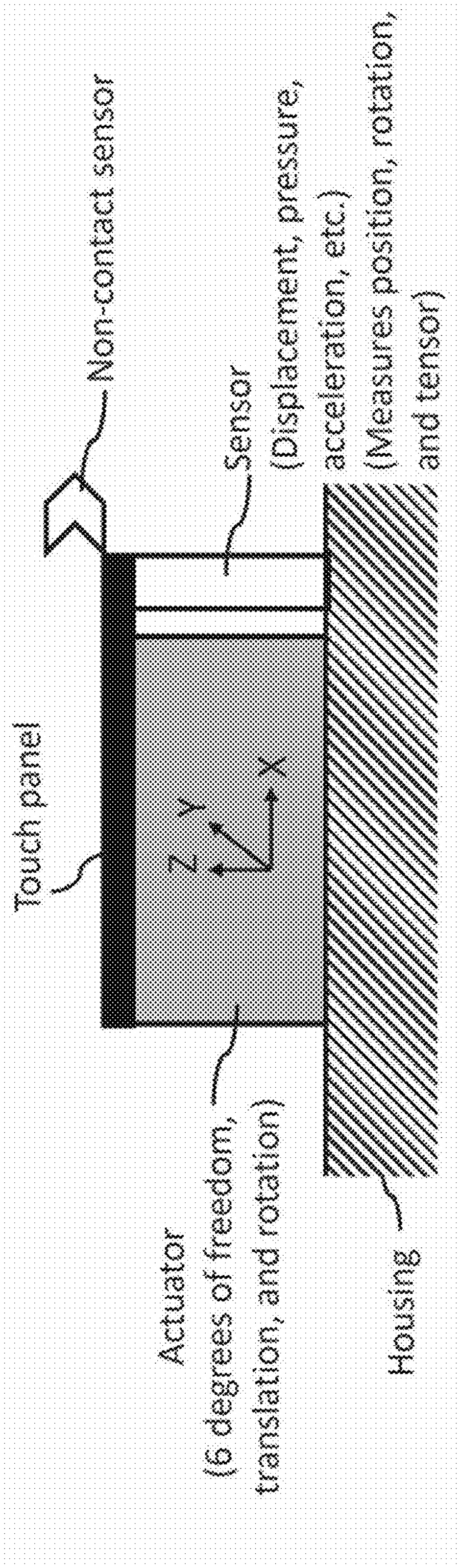

FIG. 262 Haptic device (Reflection of contact state)
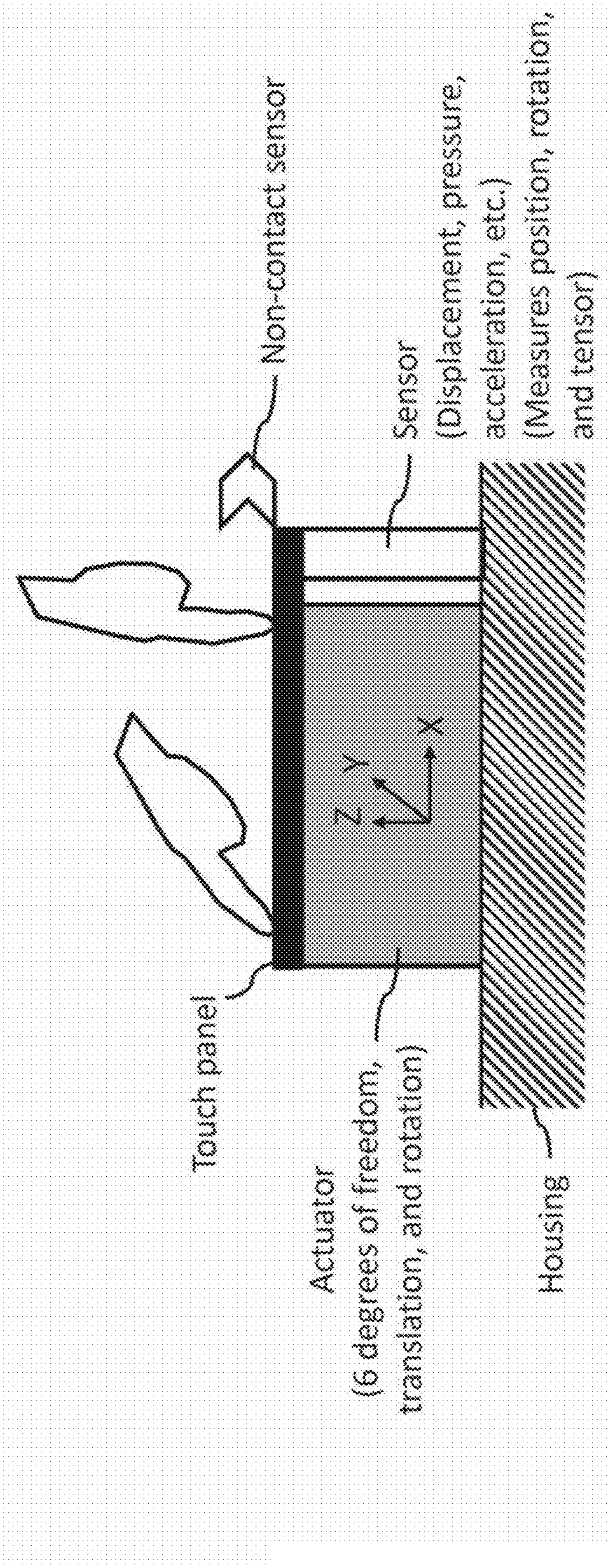

FIG. 263 Panel-type module
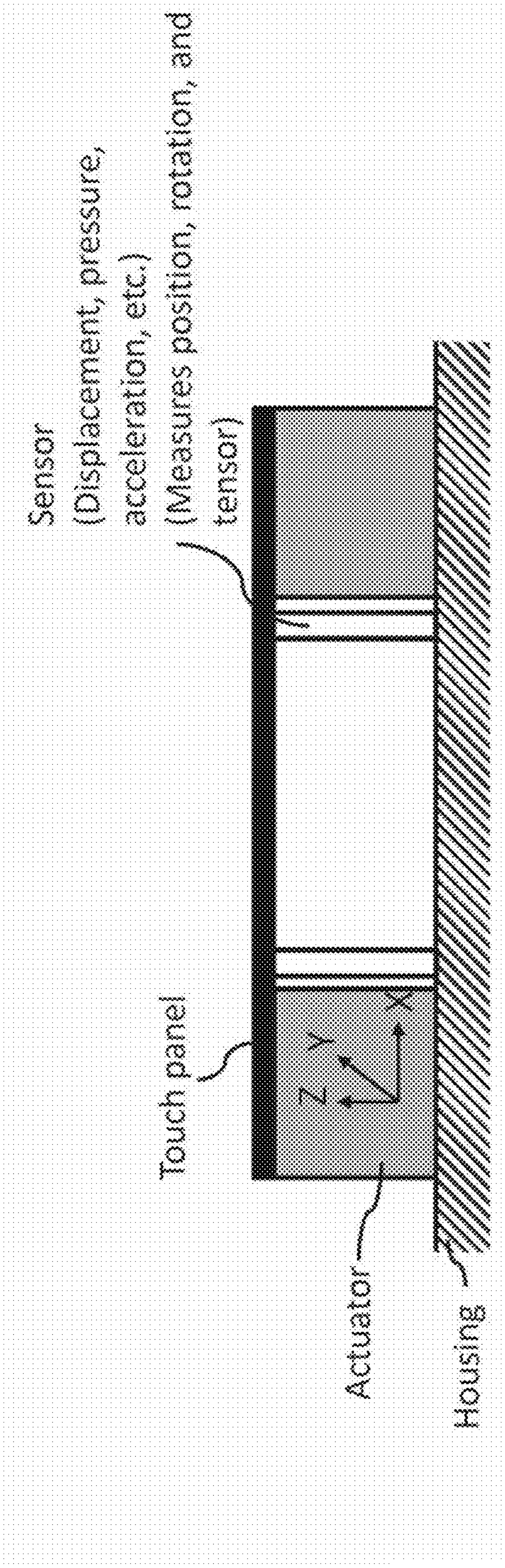

FIG. 264 Panel-type module (Photo interrupter)
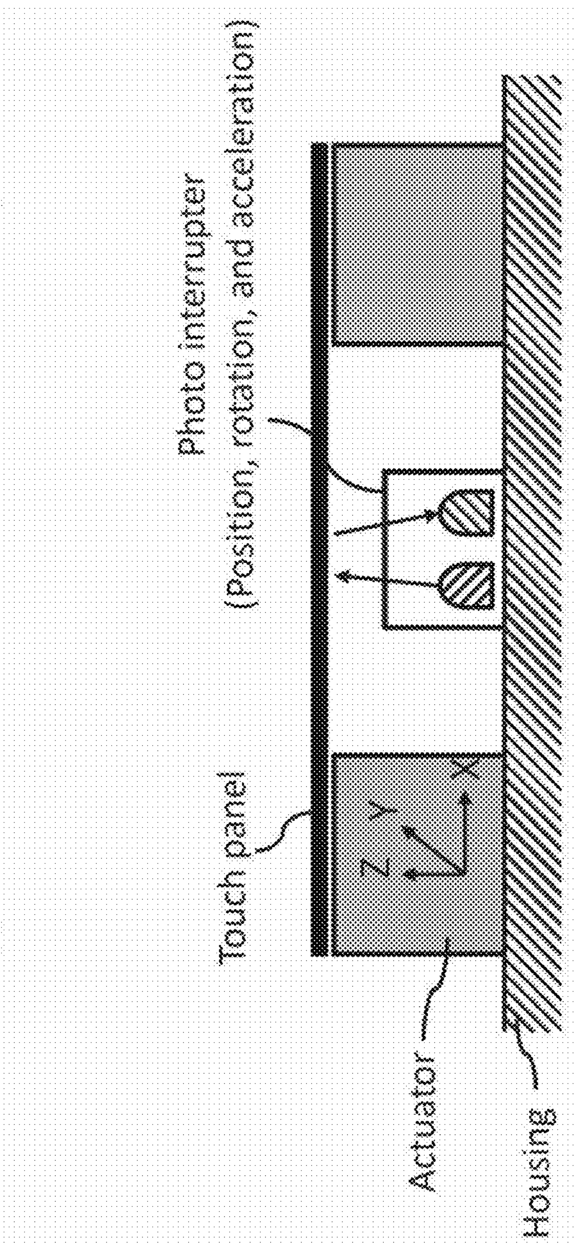

FIG. 265 Panel-type module (Suspended and isolated)
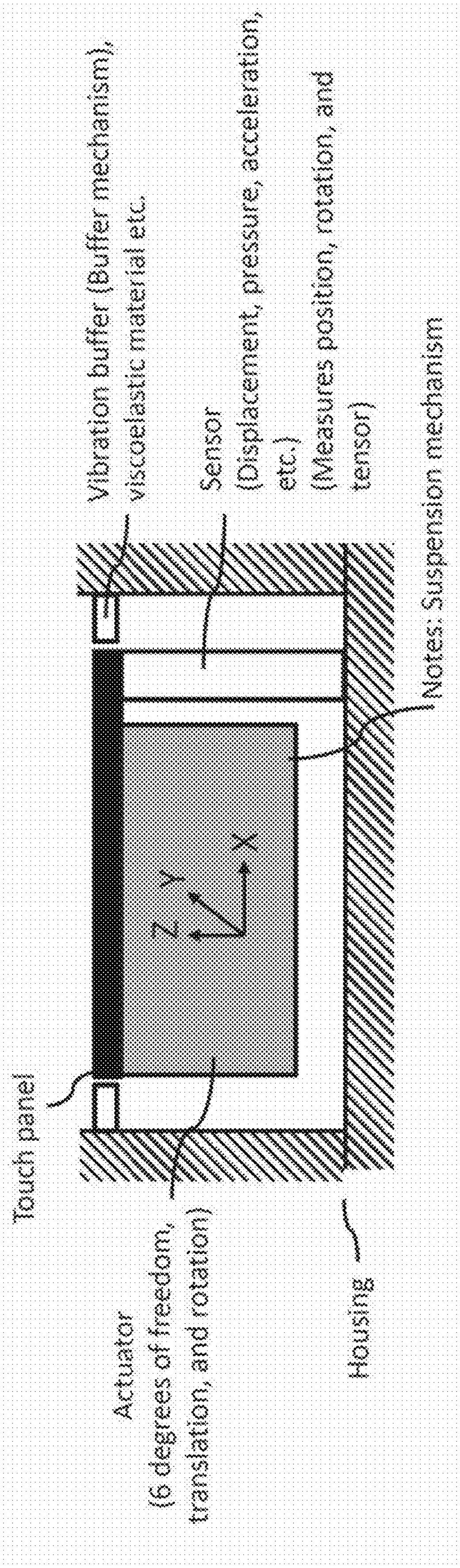

FIG. 266 Panel-type module (Suspended/isolated)
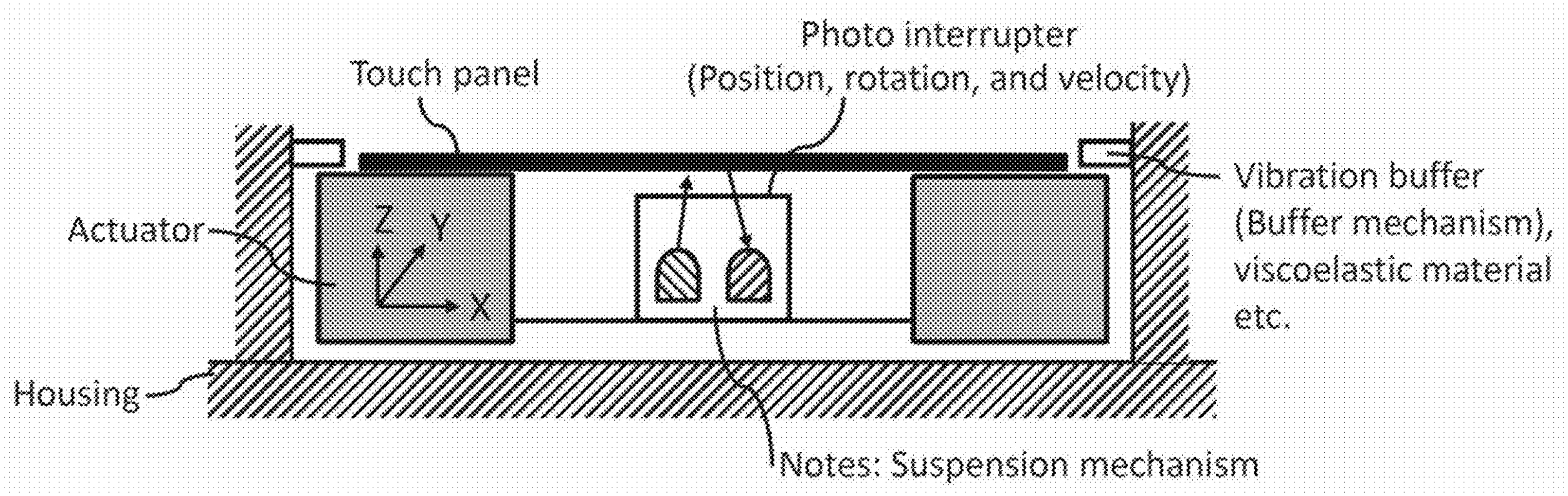

FIG. 267 Panel (Floating inertial actuator)
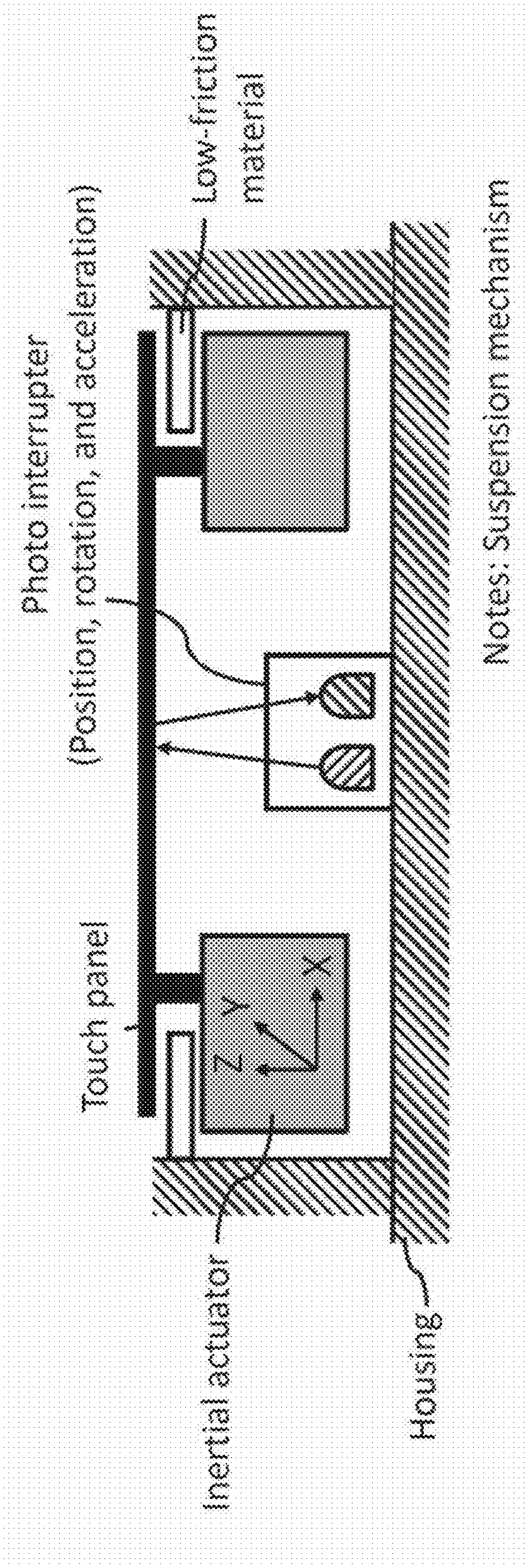

FIG. 268 Liquid crystal touch panel-type module
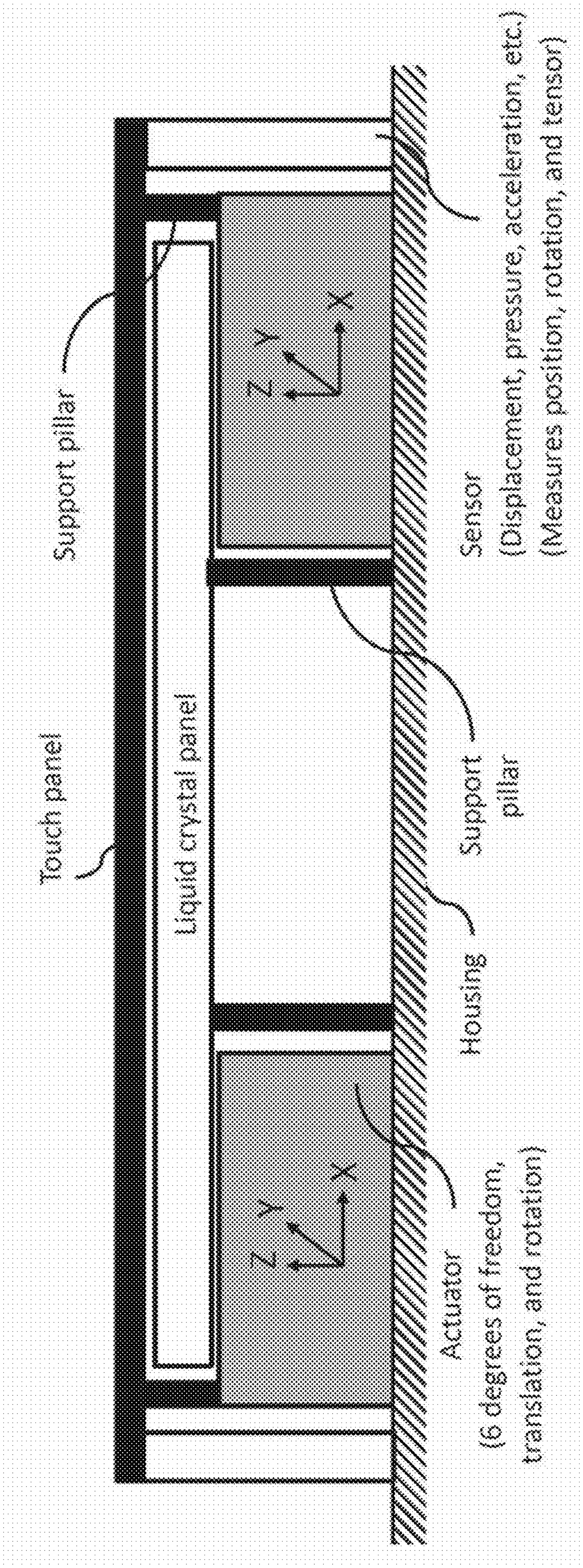

FIG. 269 Liquid crystal touch panel-type module (Thin type)
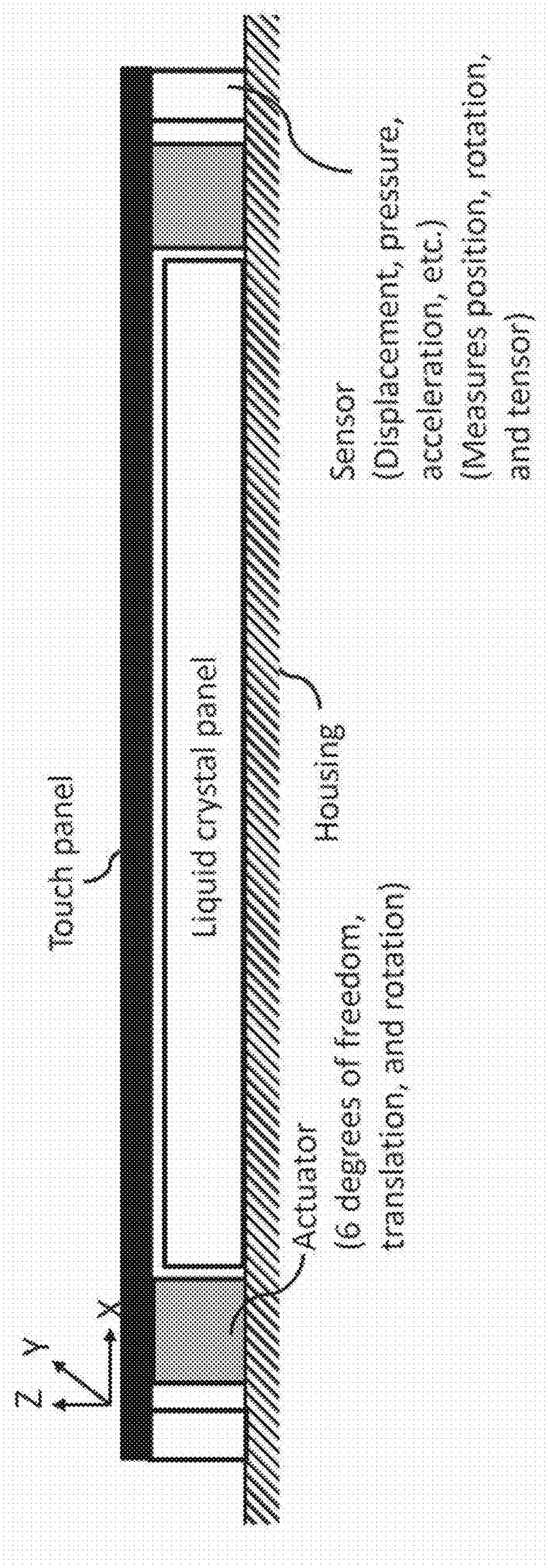

FIG. 270 Liquid crystal touch panel-type module (Thin type)
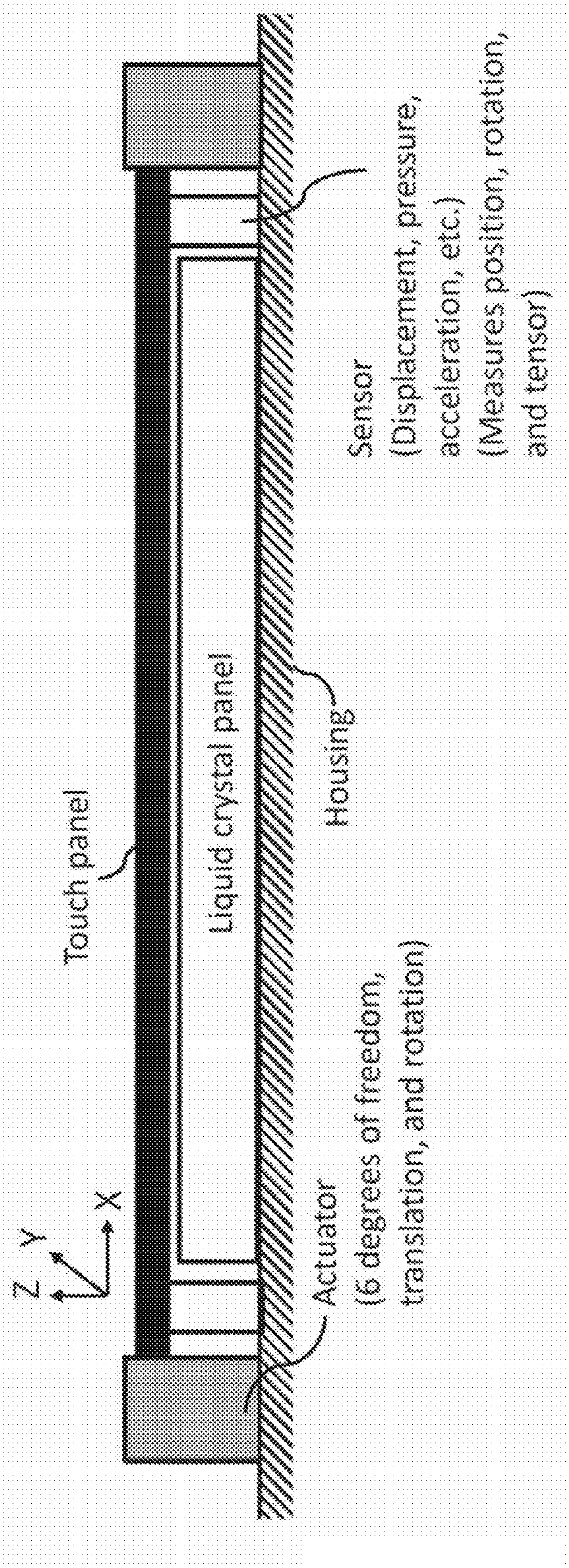

FIG. 271 Touch panel-type module (Projection)
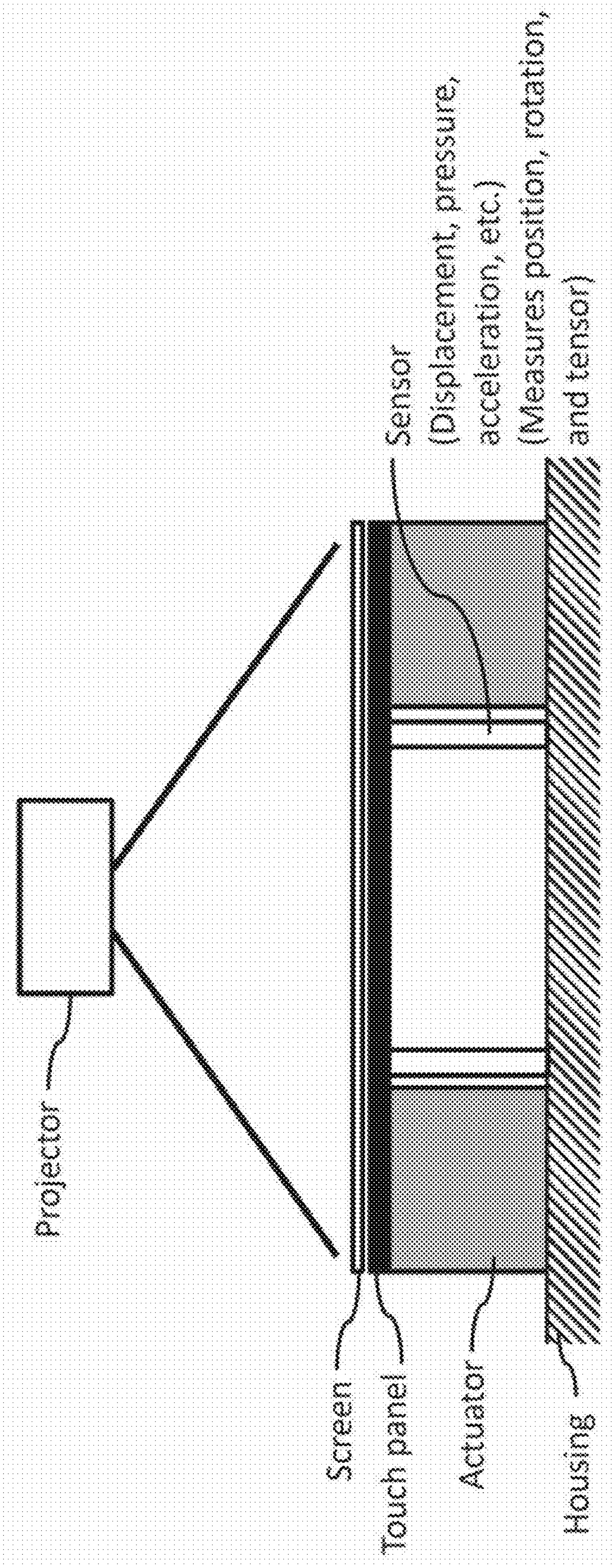

FIG. 272 Multi-modal effect
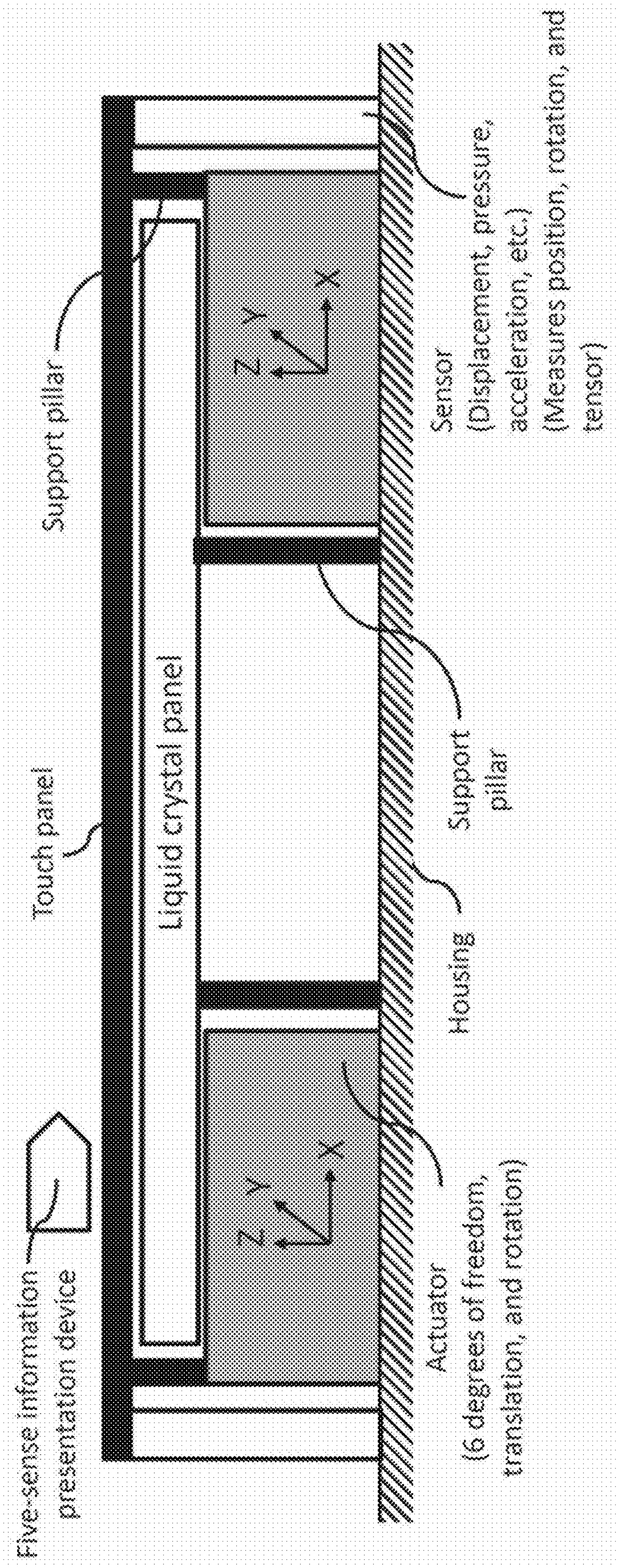

FIG. 273 Multi-touch array unit
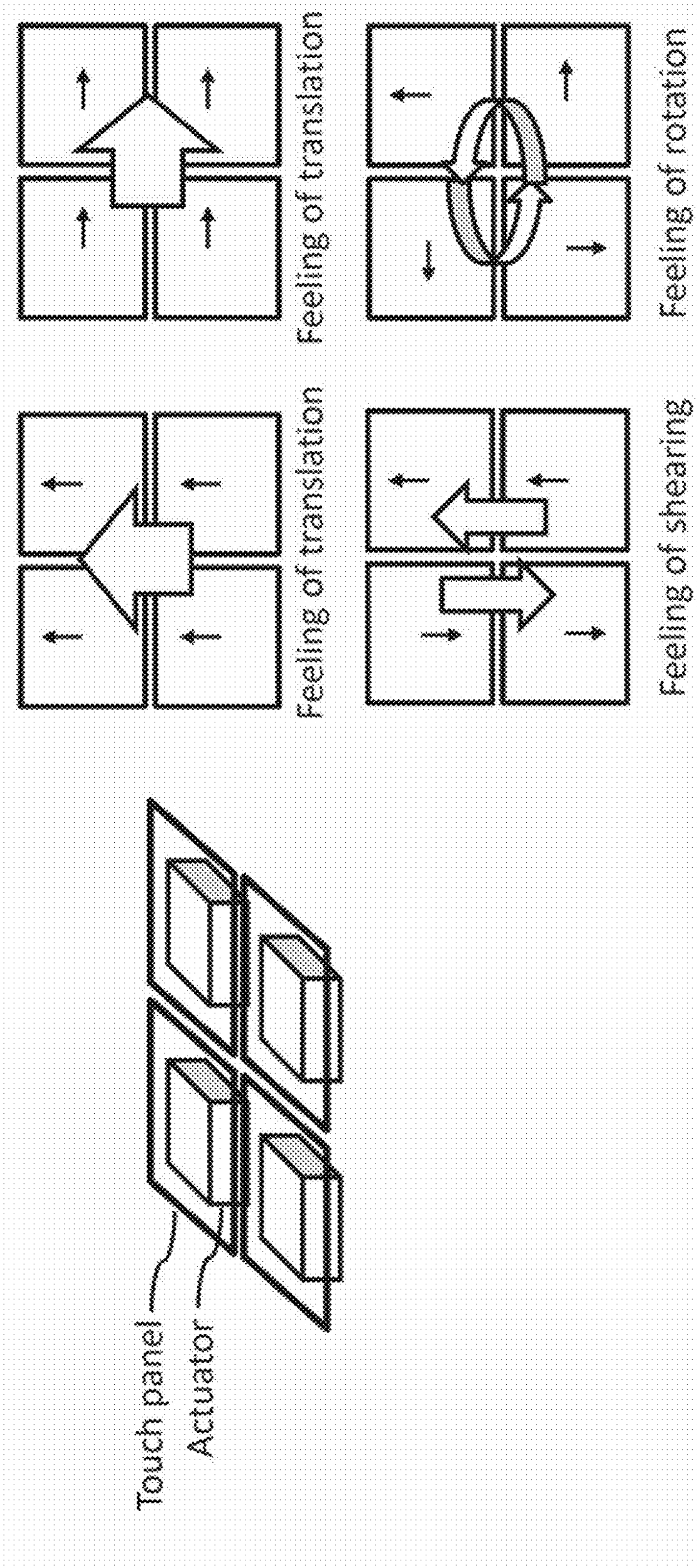

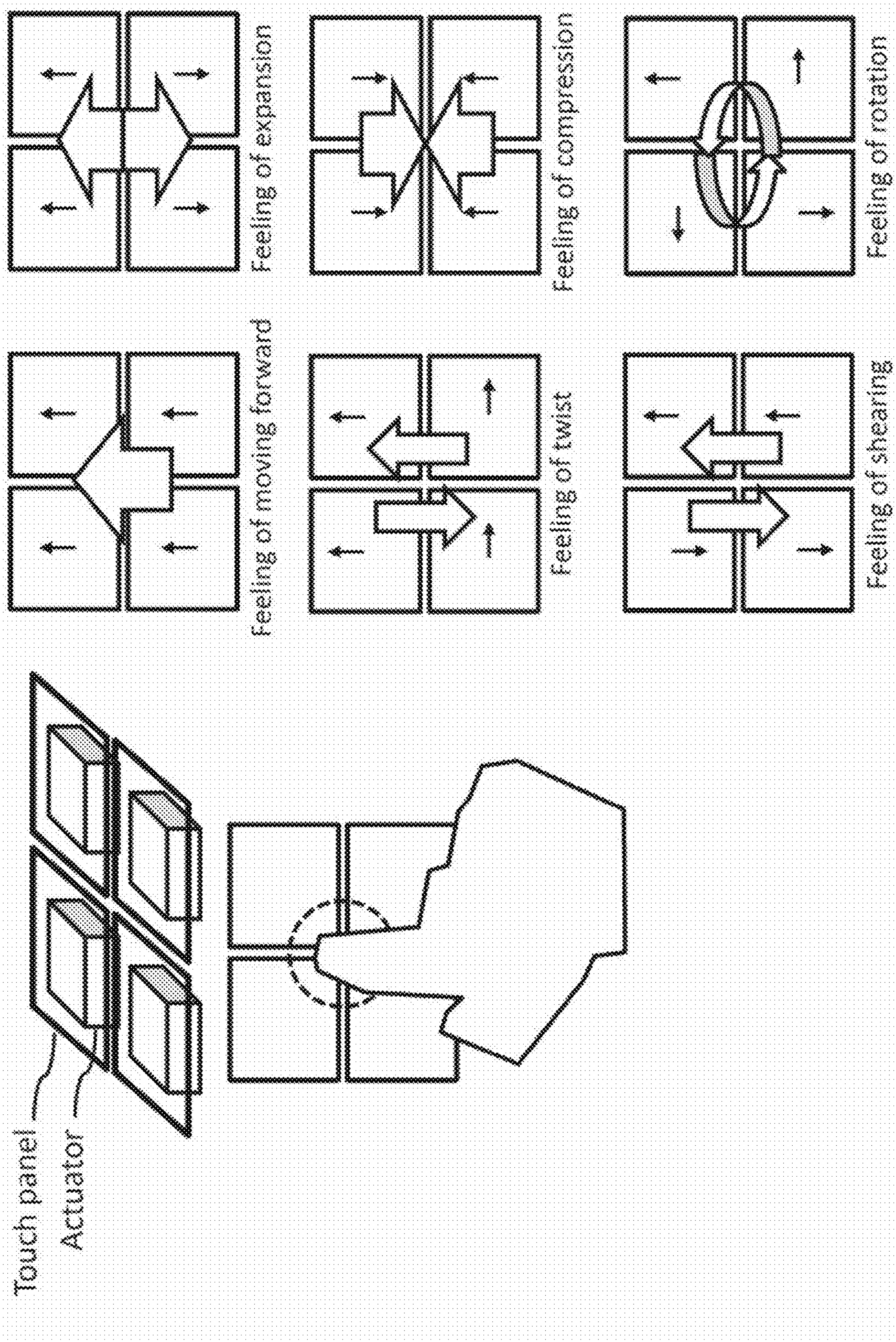
FIG. 274 Sense-combining control (Physical and between organs)

FIG. 275 Multi-touch sense-combining control (Sense and perception)
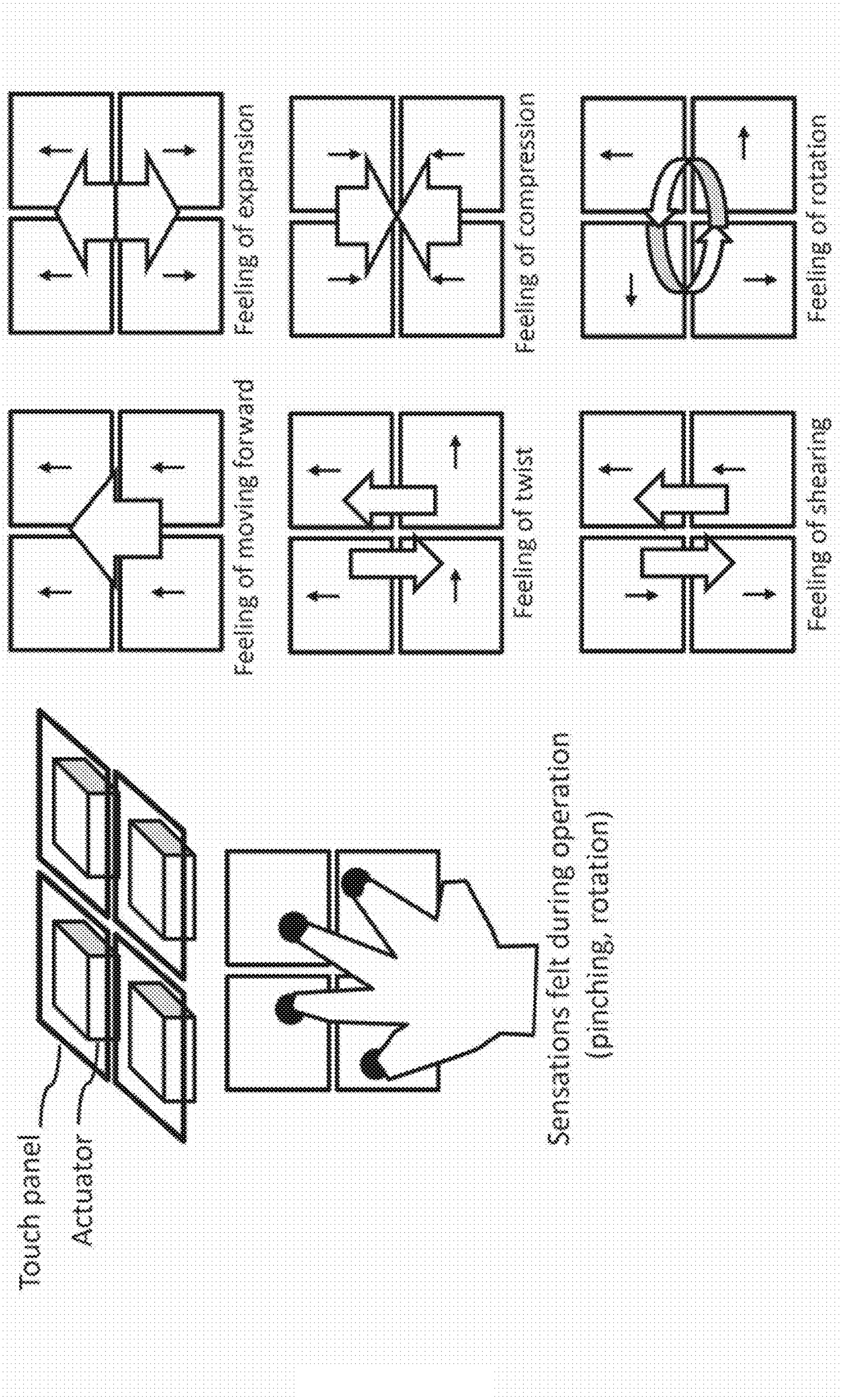

FIG. 276 Sense-combining control (Tactile sense and force ense)
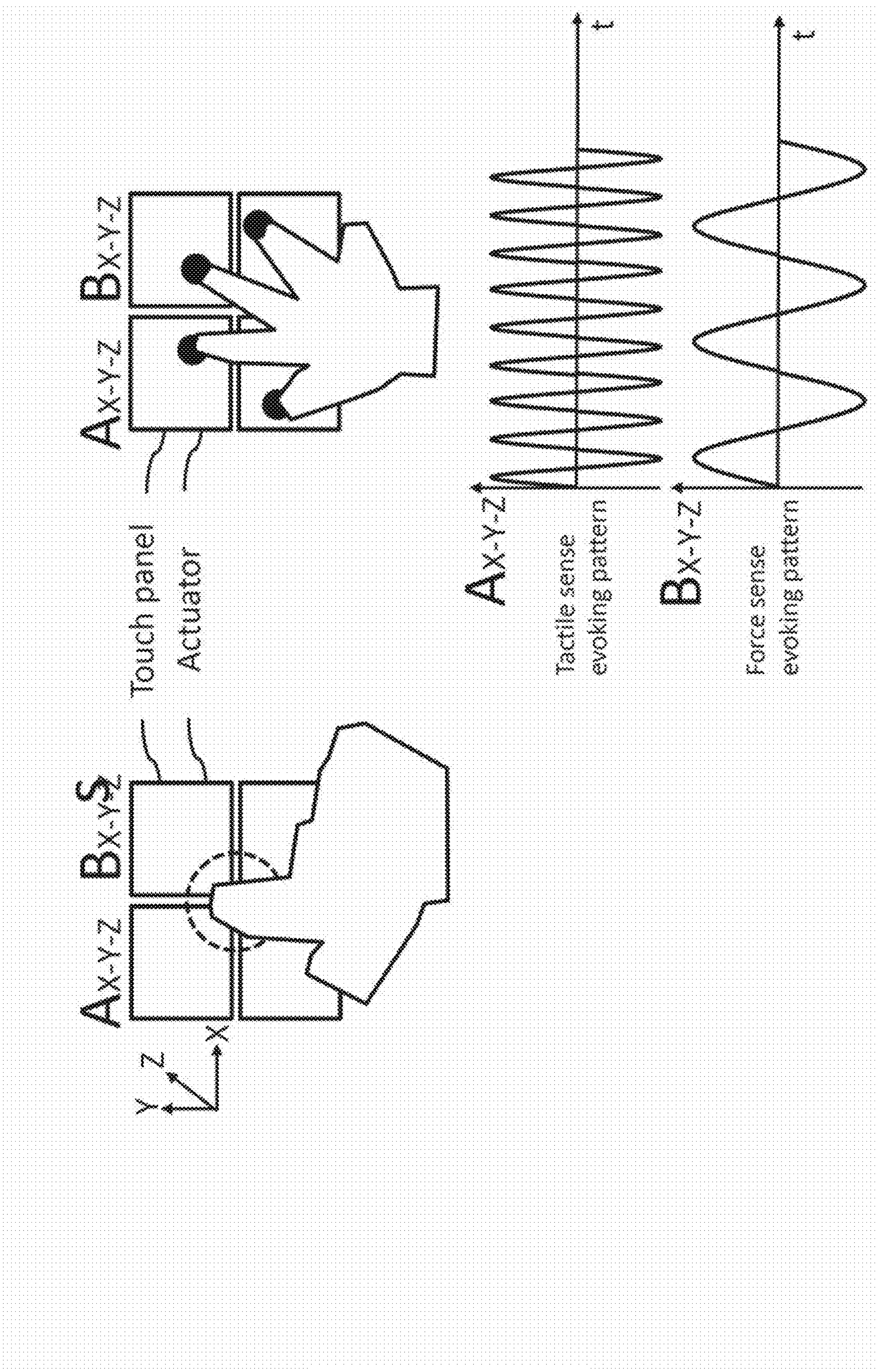

FIG. 277 Sense-combining control (Tactile sense and force sense)
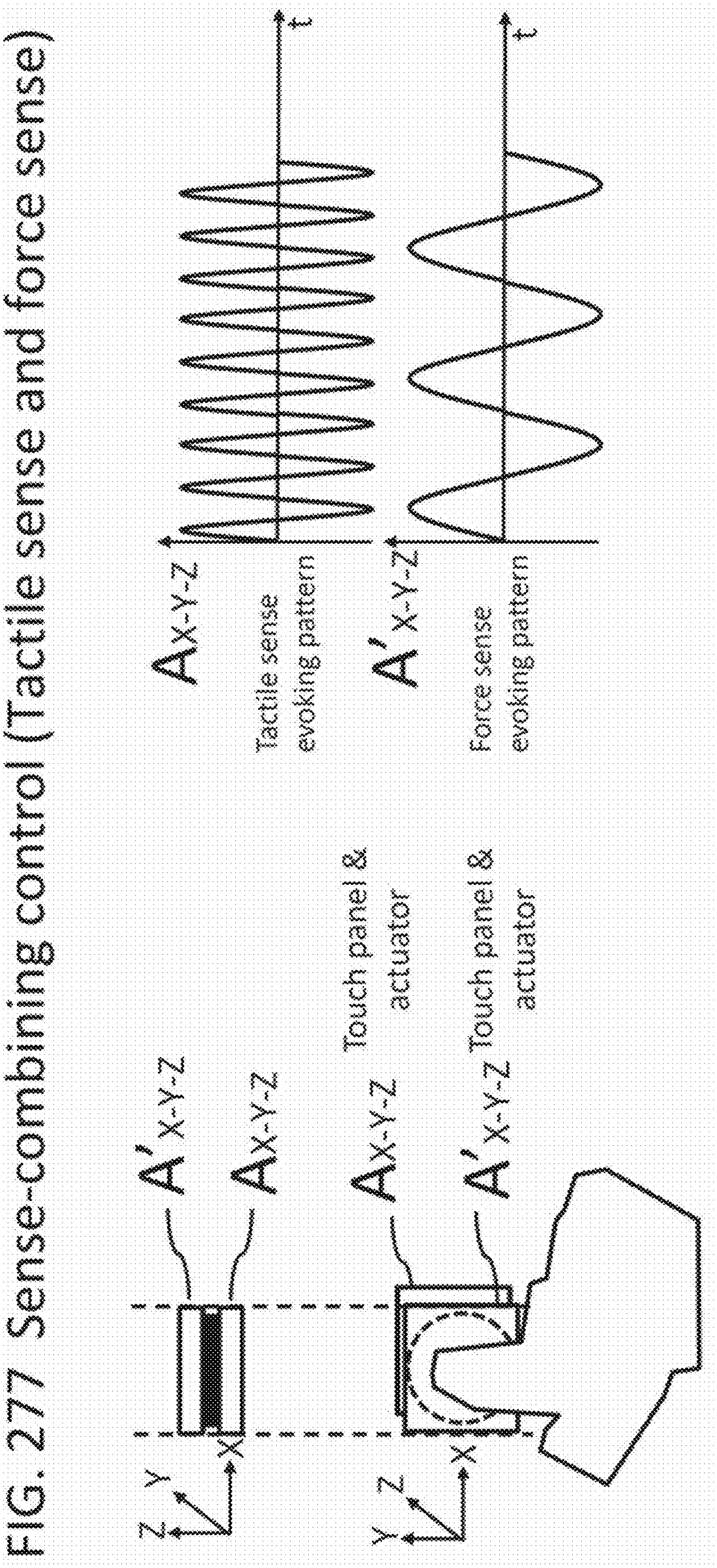

FIG. 278 Sense-combining control (Tactile sense and force sense)
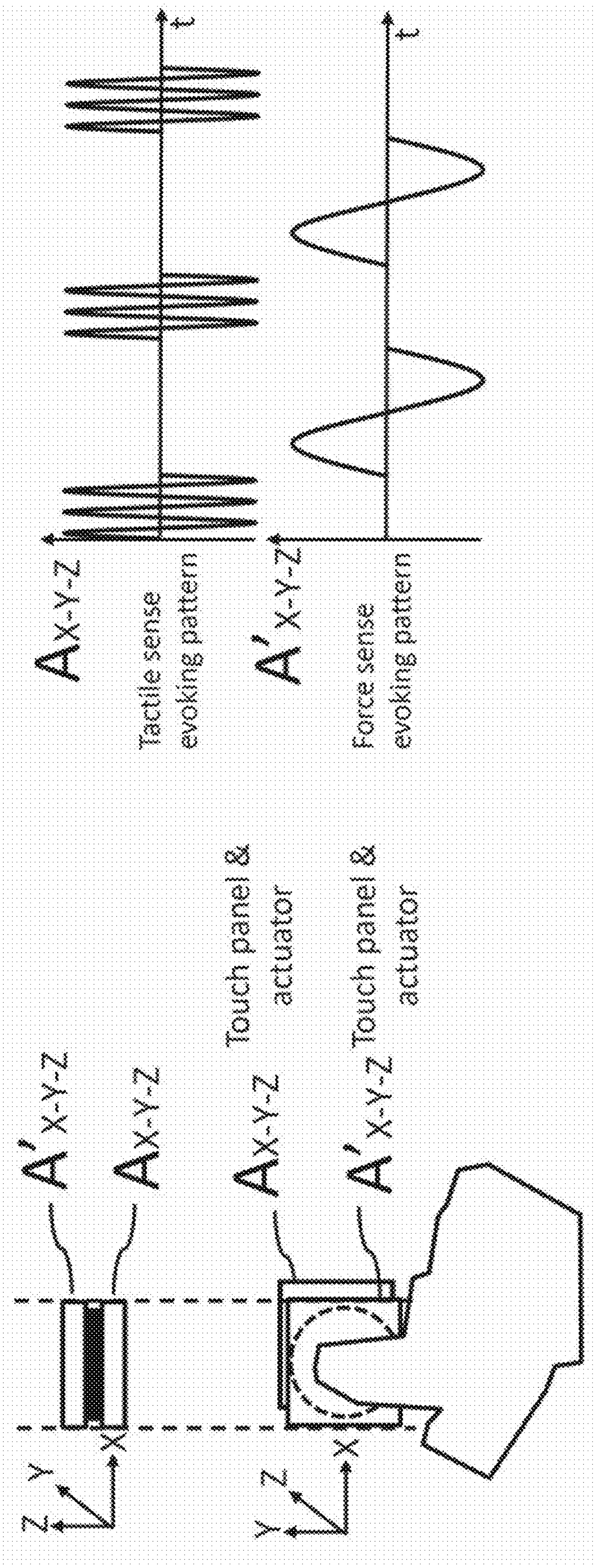

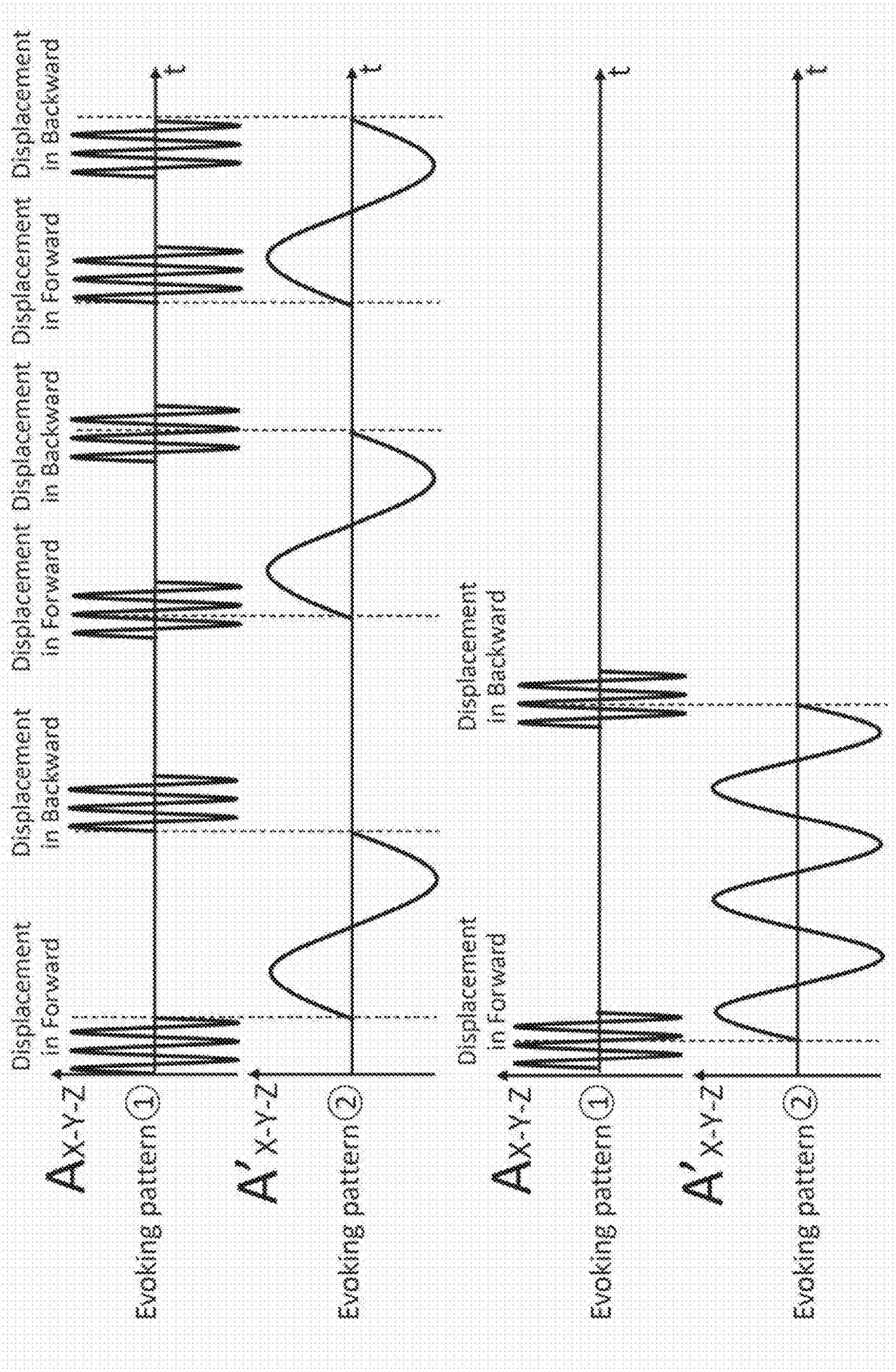
FIG. 279 Sense-combining control (Forward and backward effects)

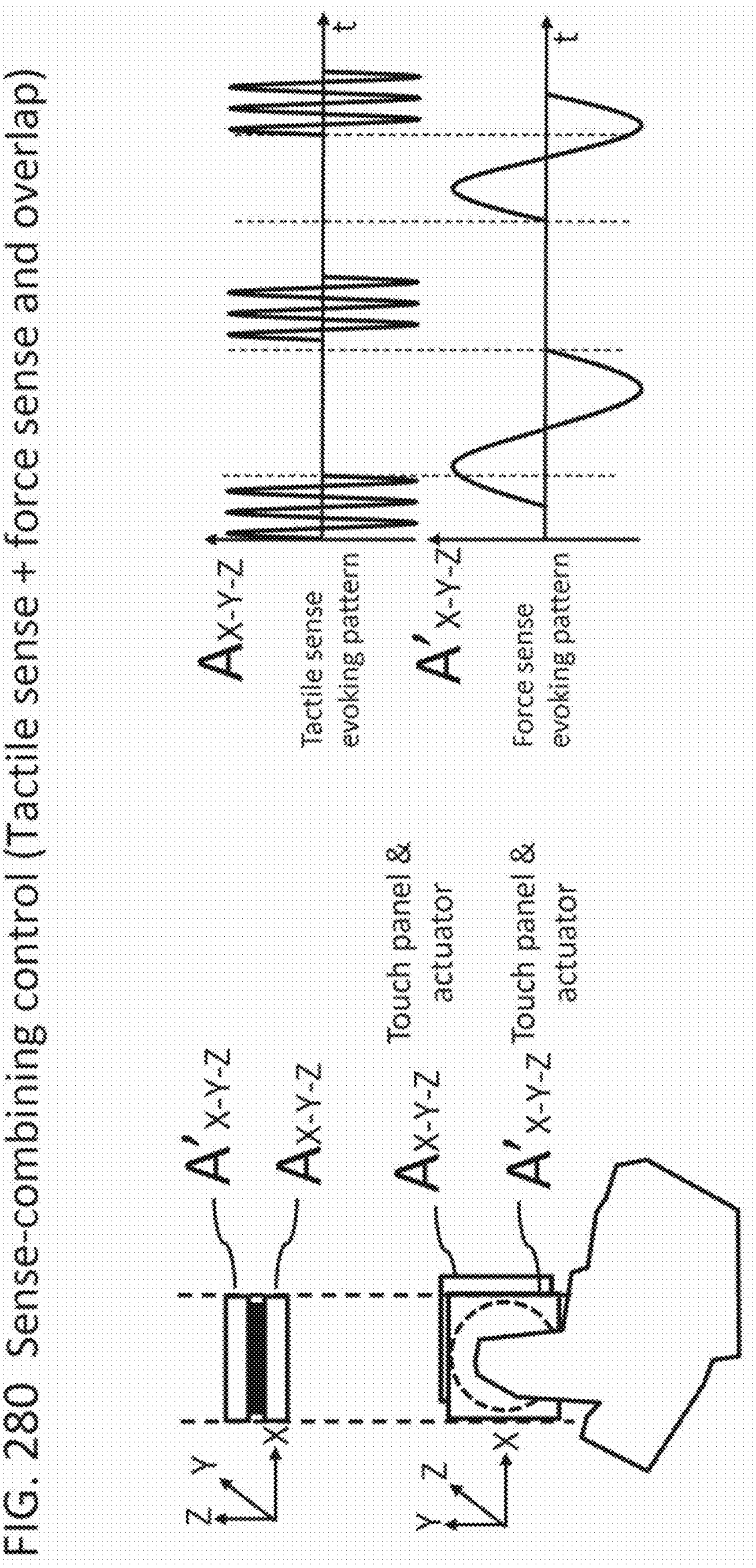
FIG. 280 Sense-combining control (Tactile sense + force sense and overlap)

FIG. 281 Sense-combining control (Difference/comparison)
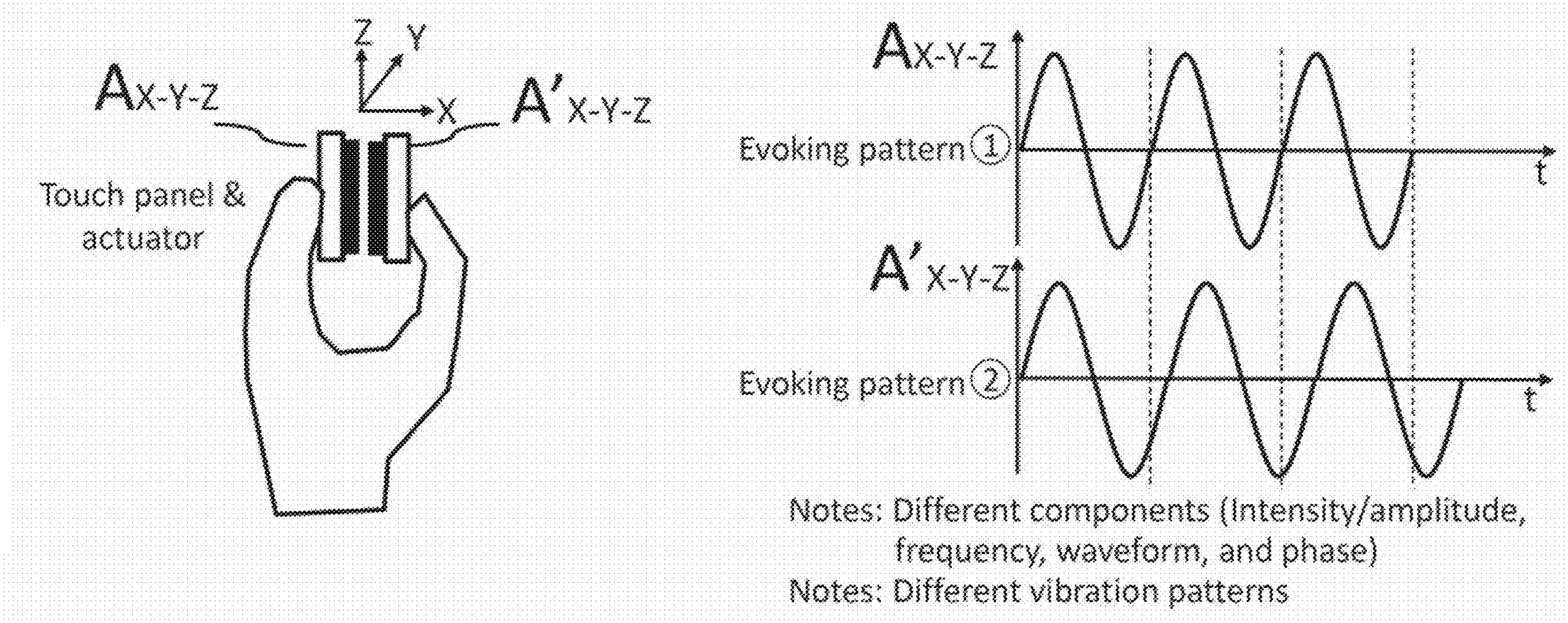

FIG. 282 Sense-combining control (Difference/comparison)
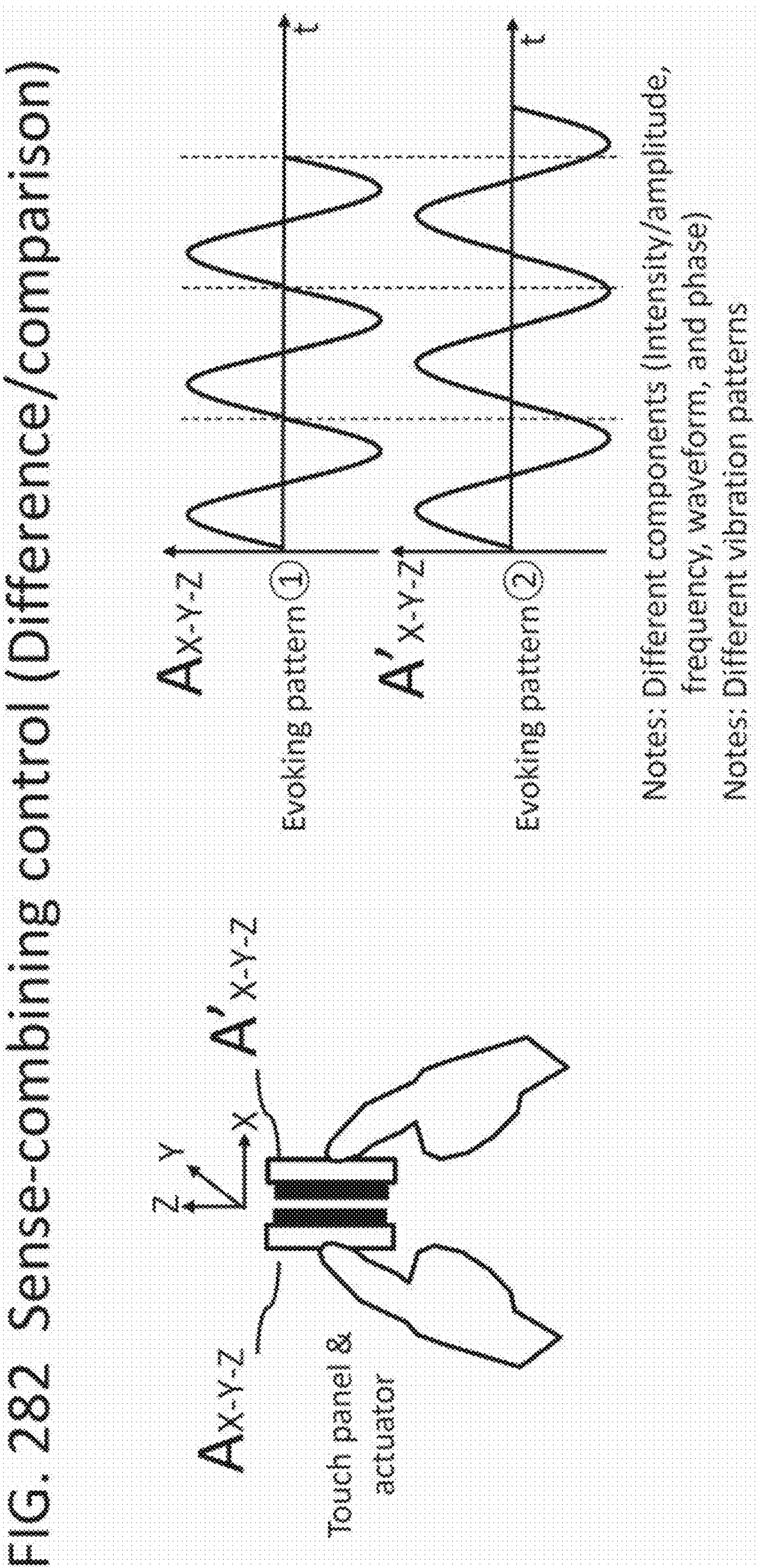

FIG. 283 Generation of sense of button shape
(Sense of touching mountain-like protrusion)
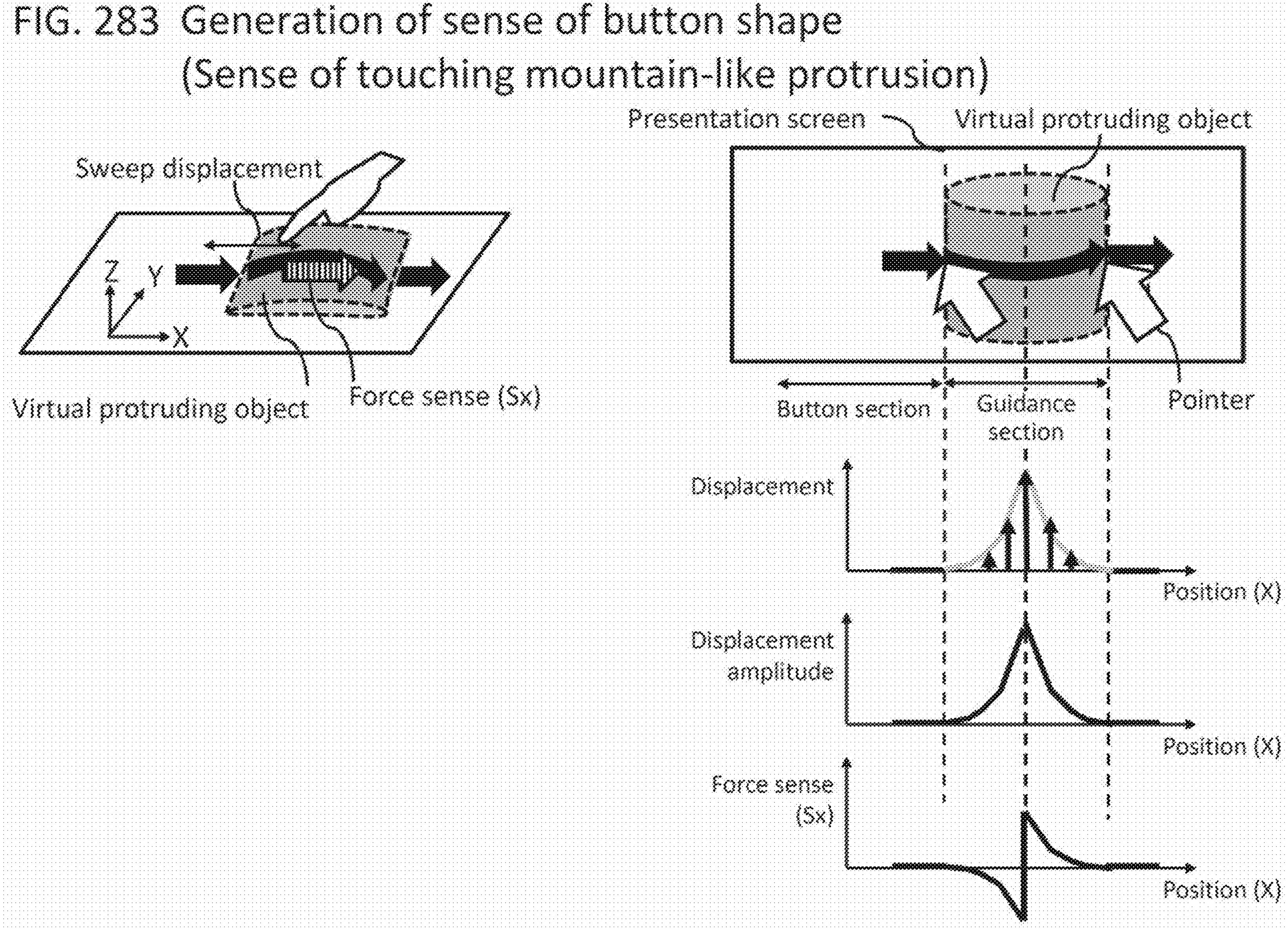

FIG. 284 Generation of sense of button shape
(Sense of touching semi-cylindrical protrusion)
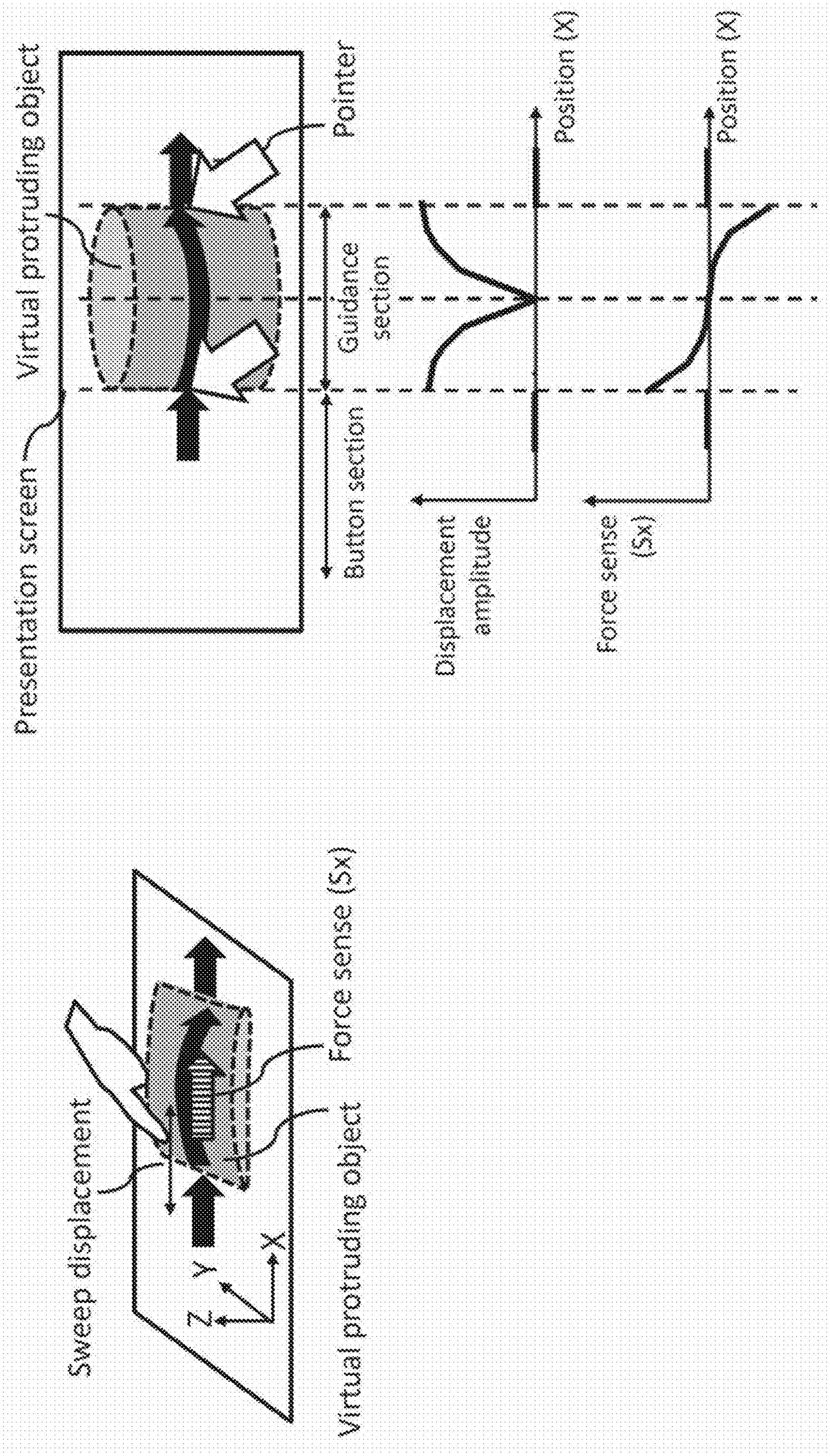

FIG. 285 Generation of sense of button touch (Sense of being in recessed gap)
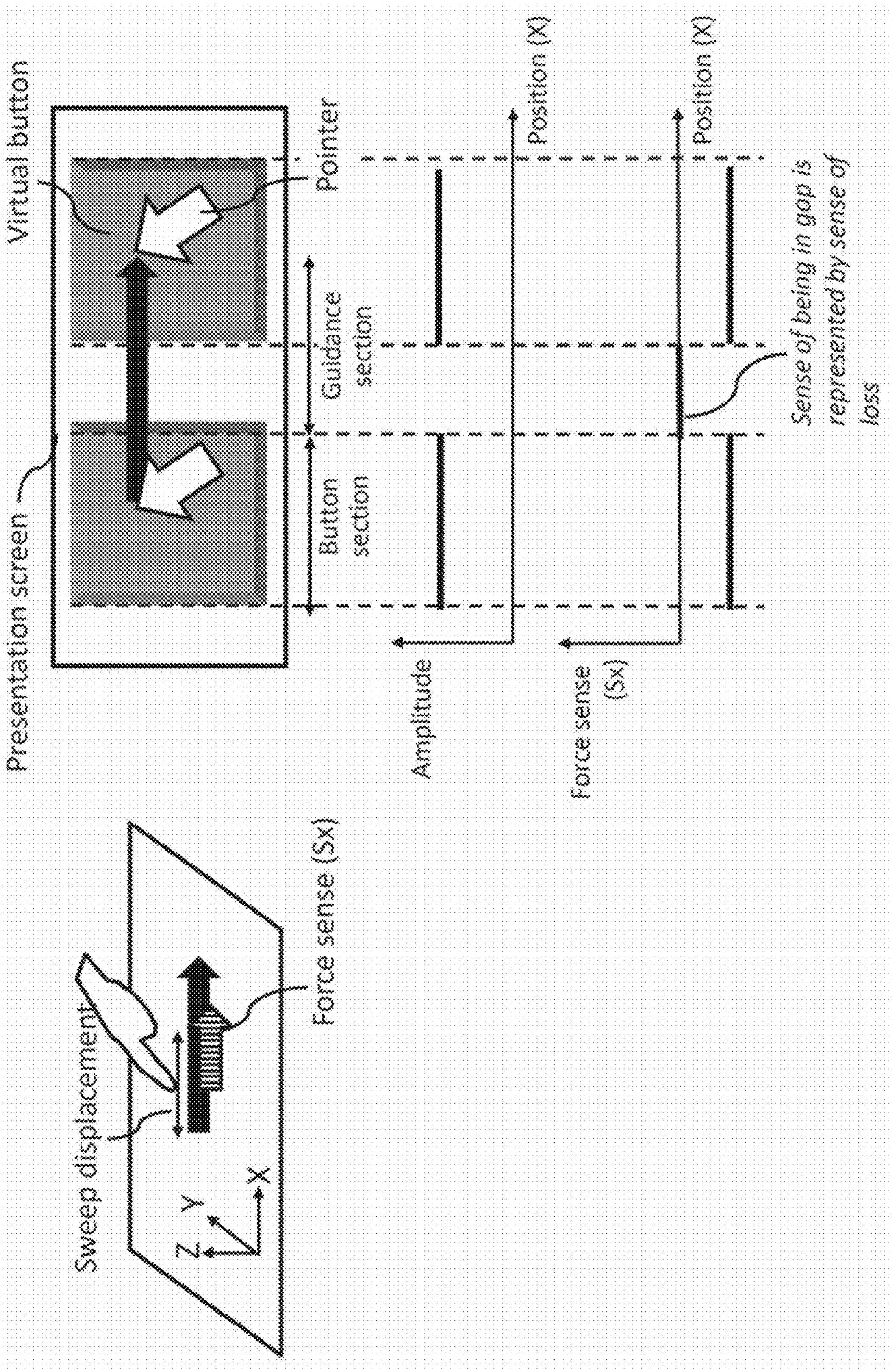

FIG. 286 Control of sense of guidance at position between buttons (Sense of crossing)
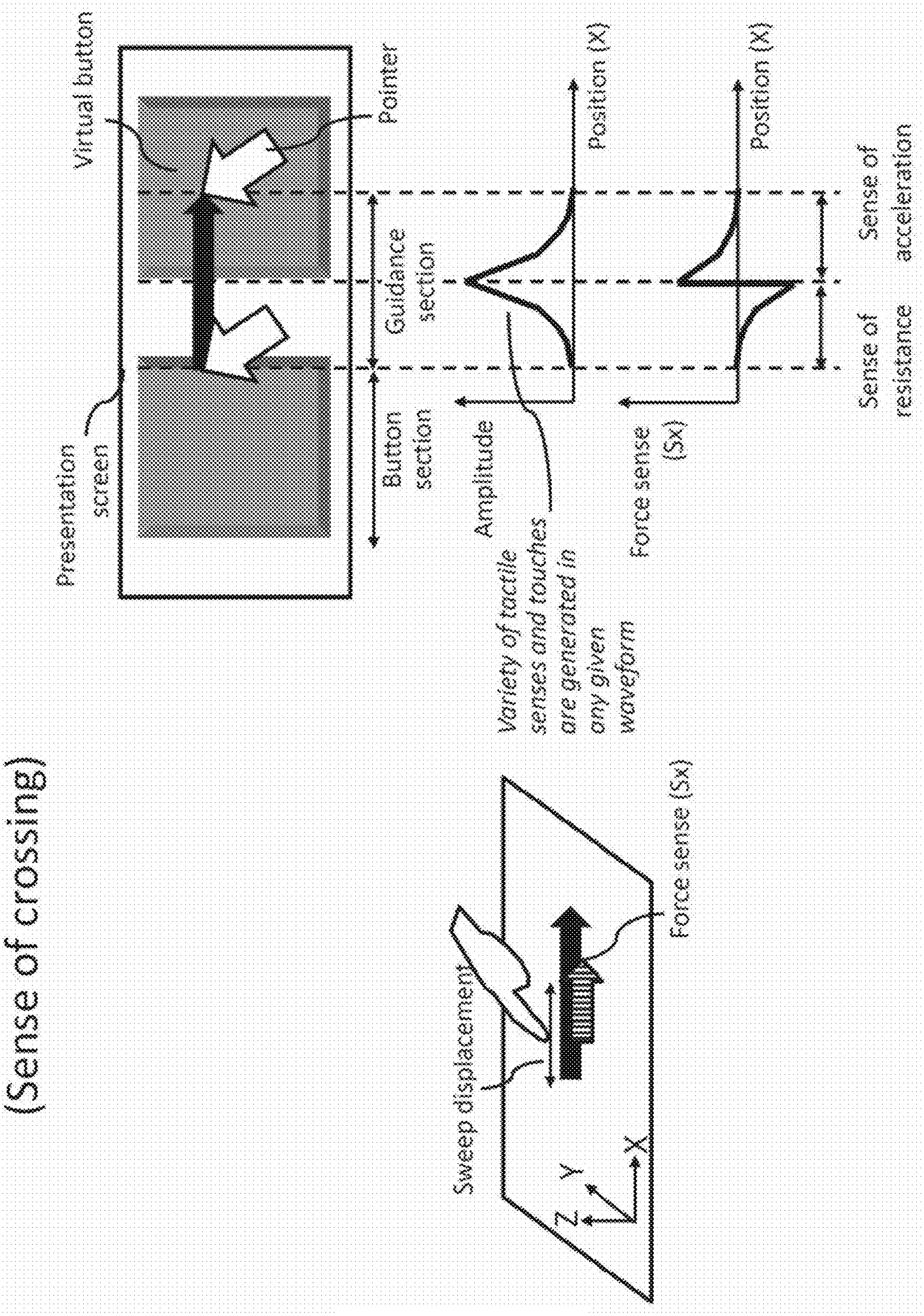

FIG. 287 Control of sense of guidance at position between buttons (Sense of being at edge point)
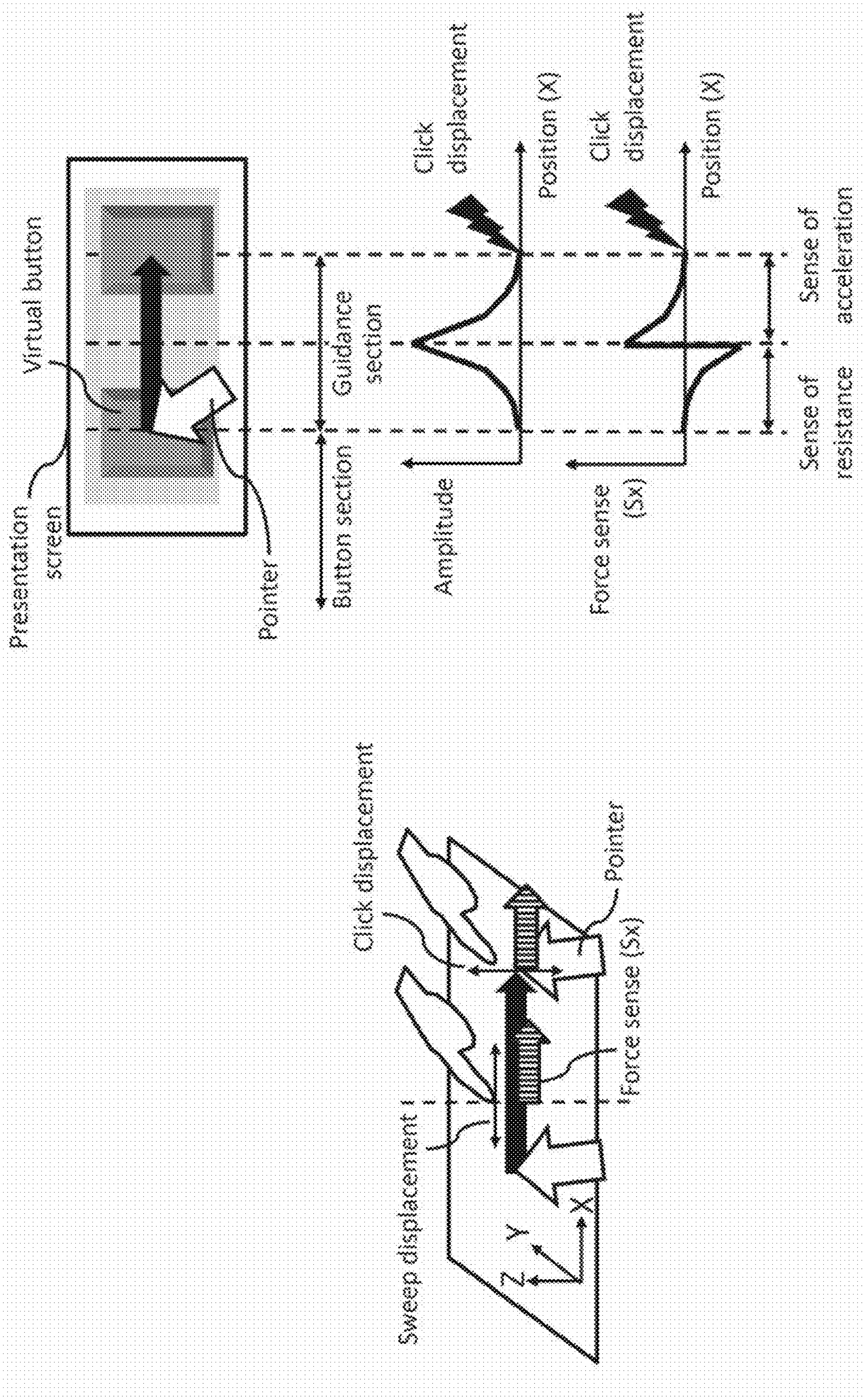

FIG. 288 Control of sense of guidance at position between buttons (Sense of touching edge)
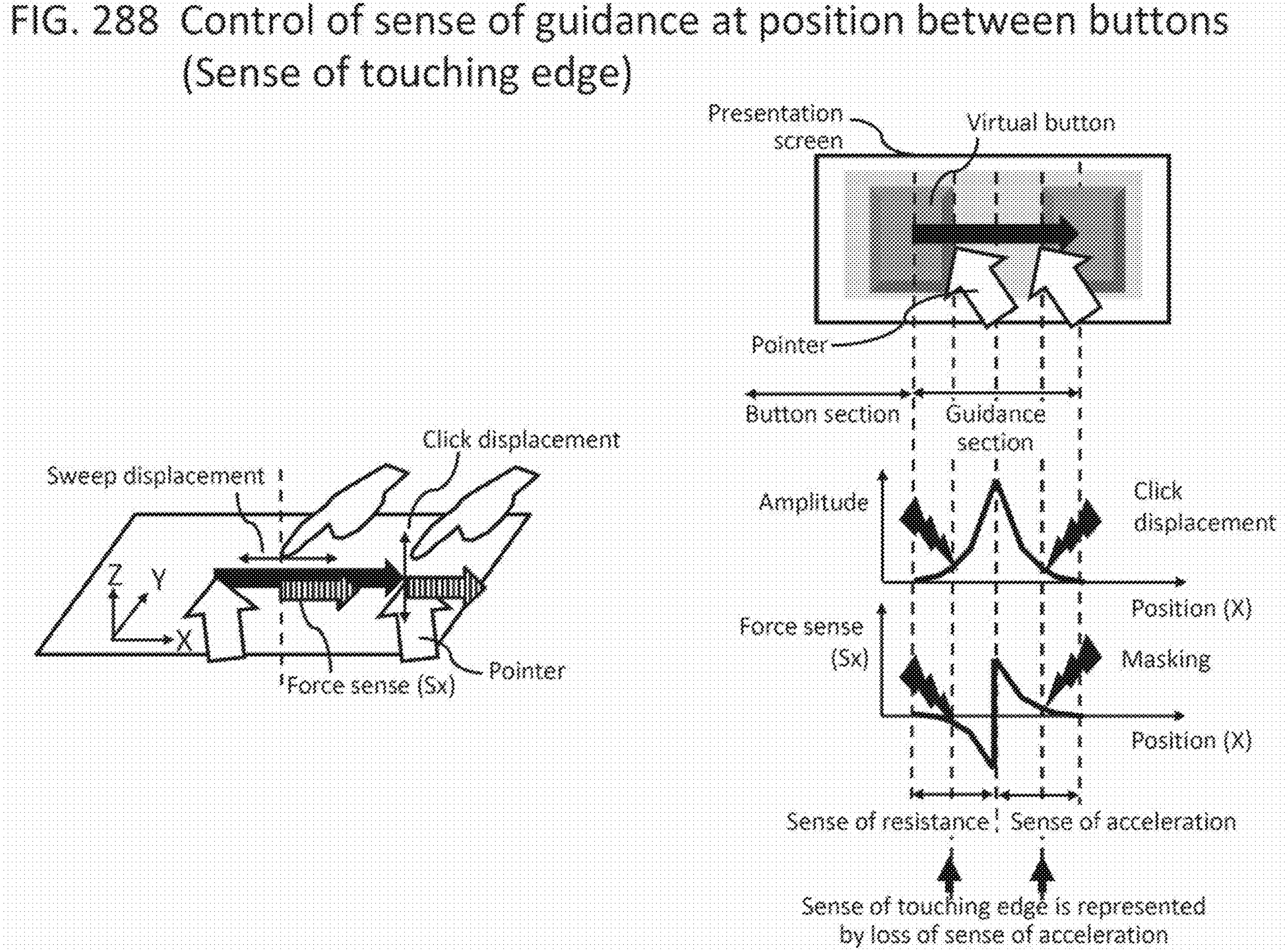

FIG. 289 Slider (Control of haptics)
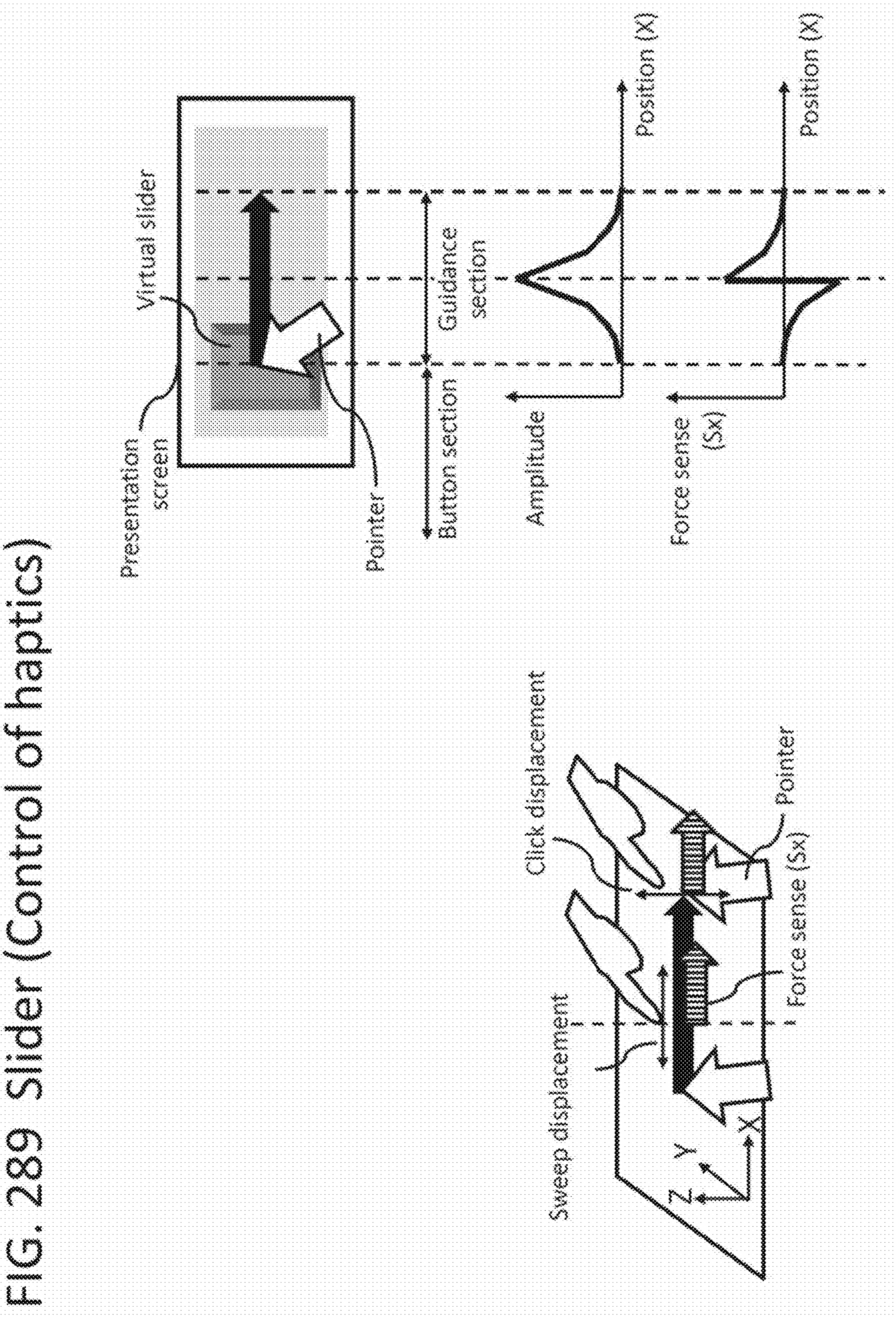

FIG. 290 Slider (Control of haptics)
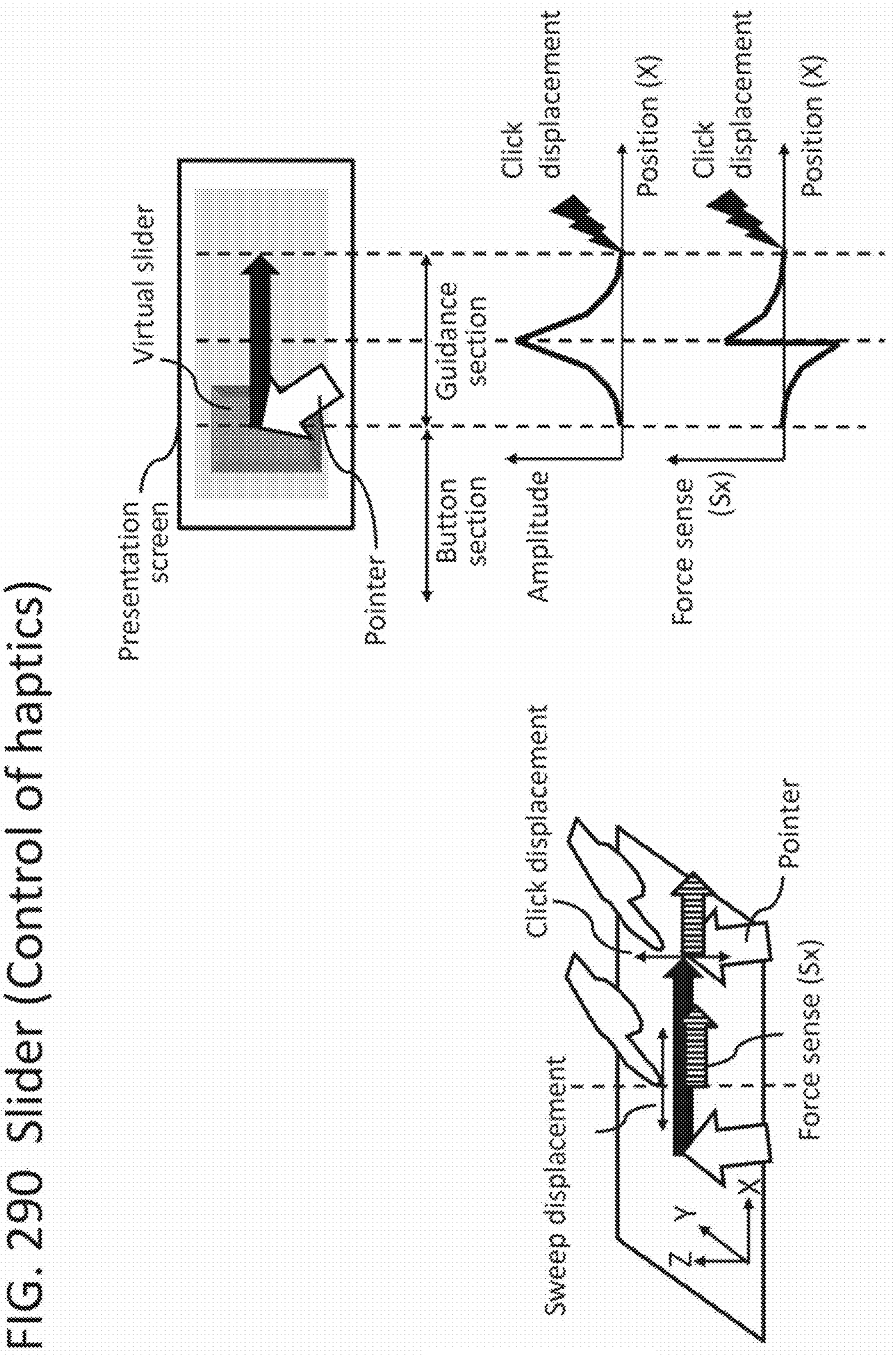

FIG. 291 Slider (Control of sensation)
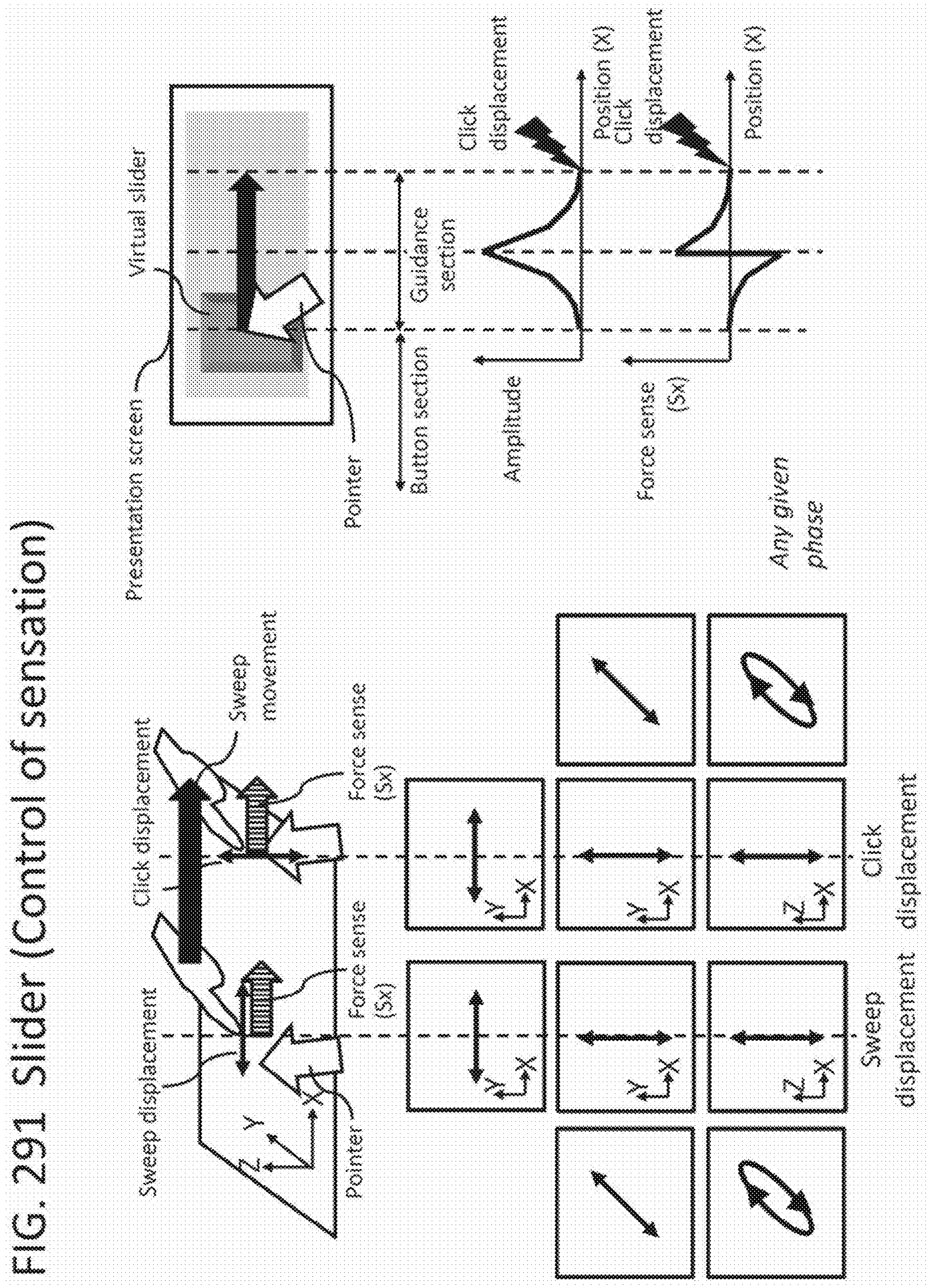

FIG. 292 Control of static friction and dynamic friction
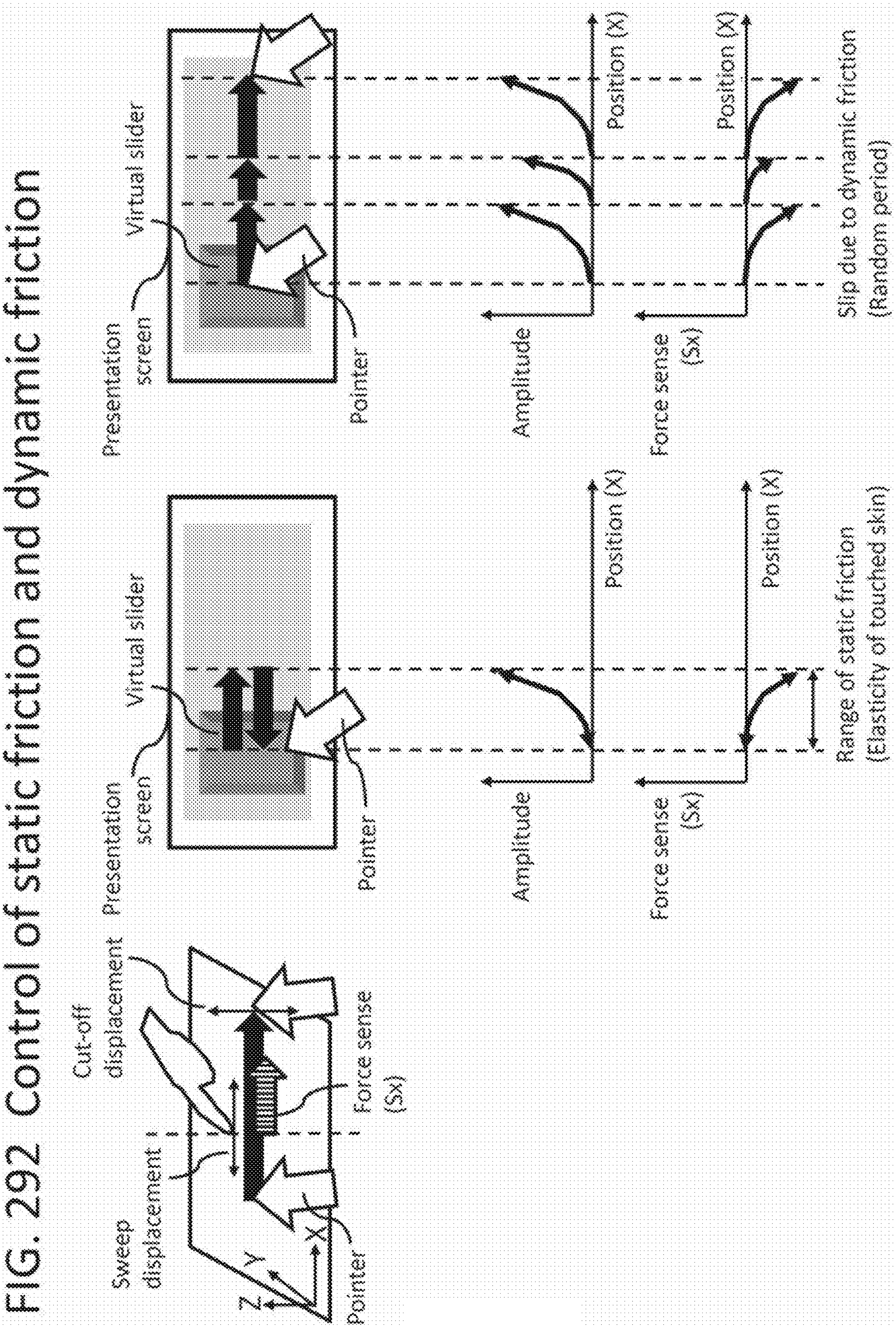

FIG. 293 Control of dynamic friction (to achieve iso-period)
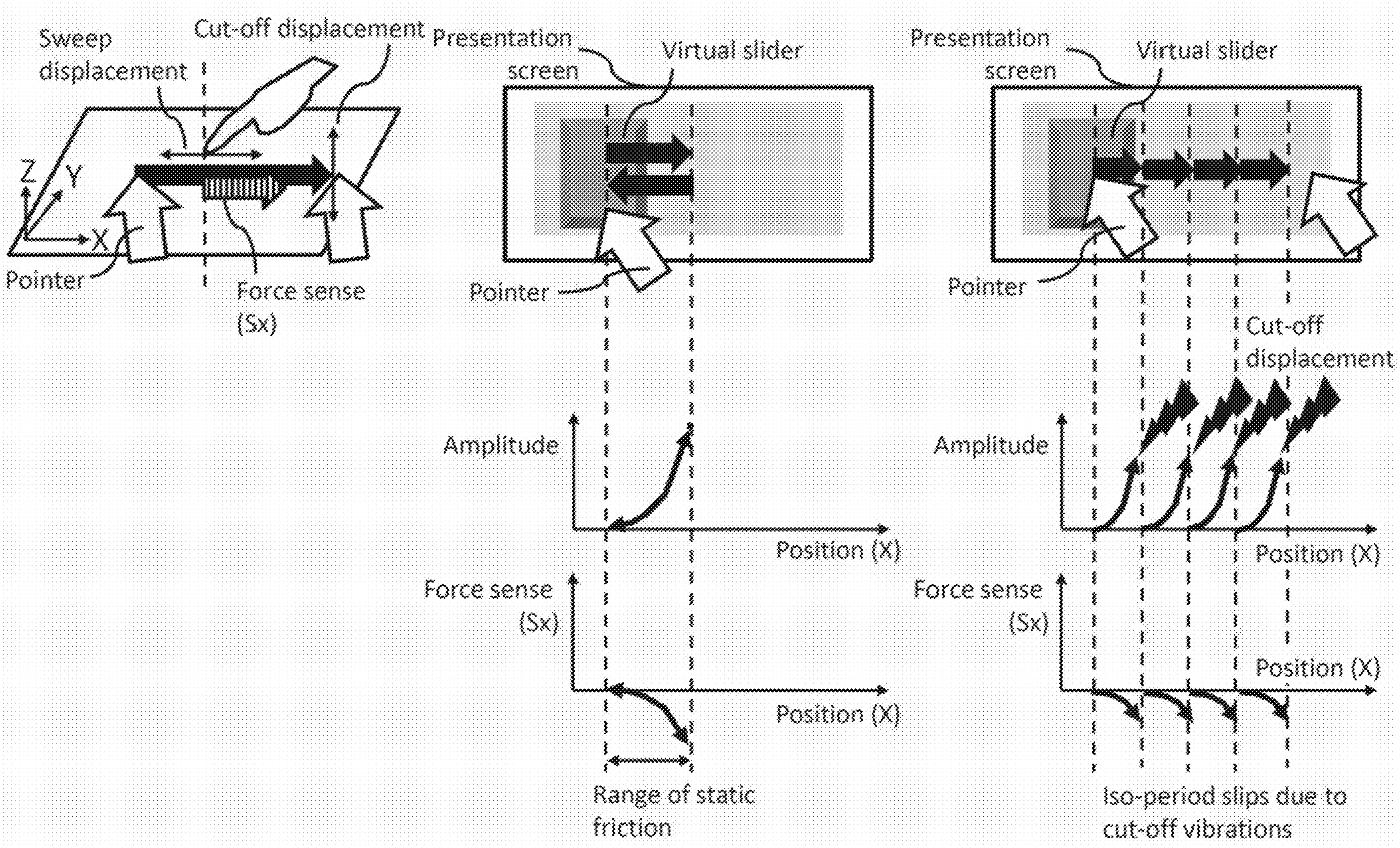

FIG. 294 Control of static friction
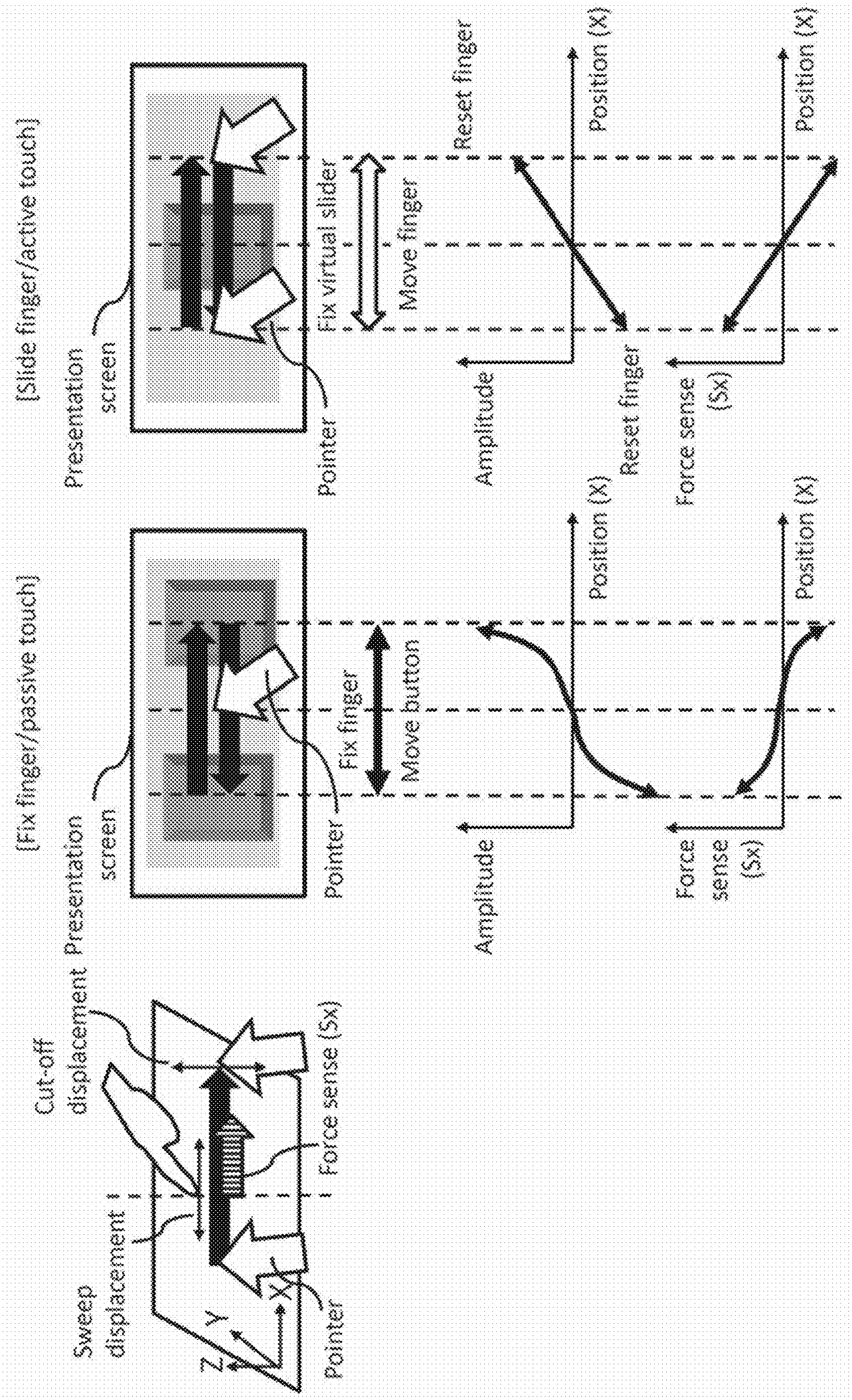

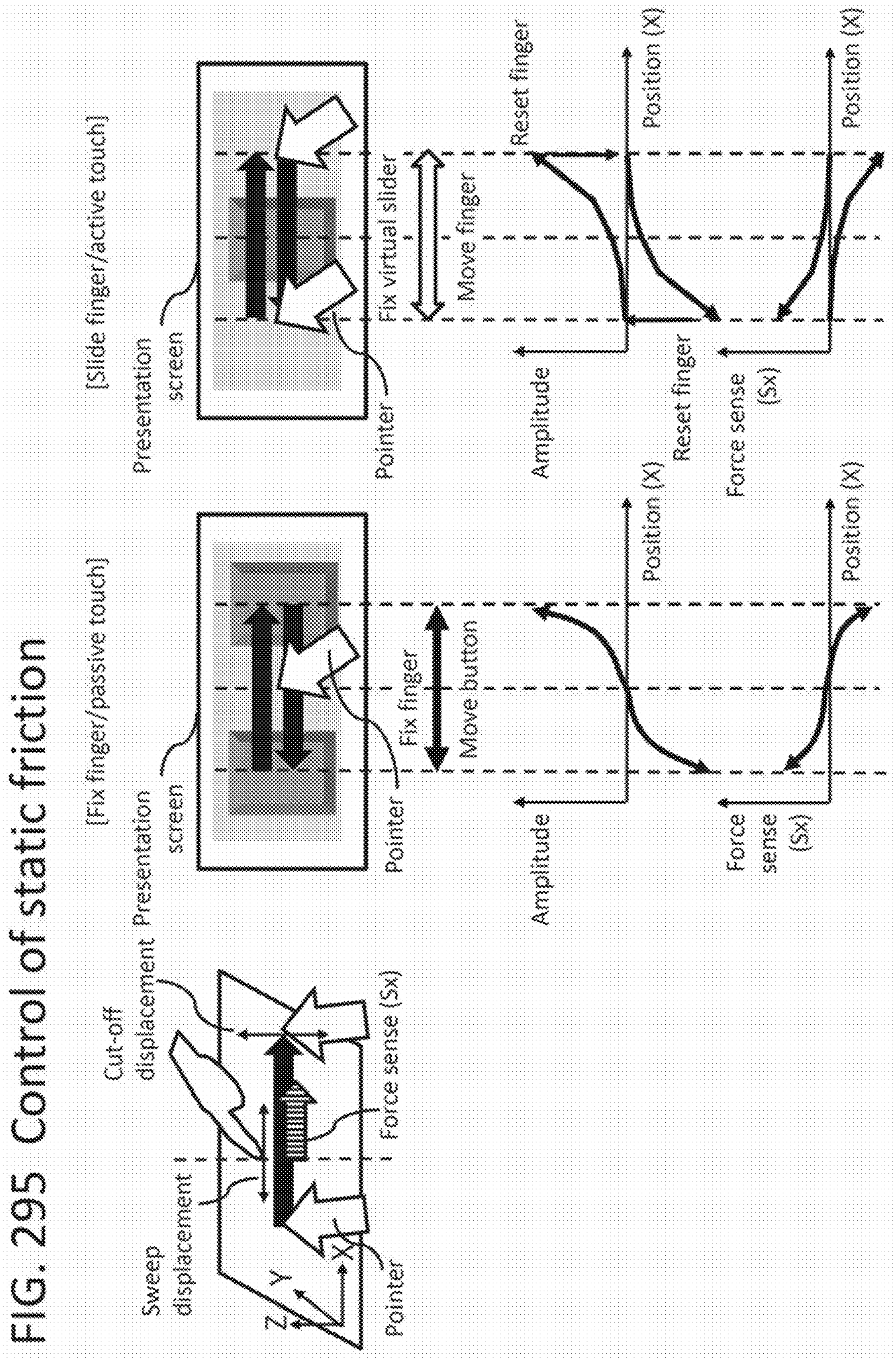

FIG. 295 Control of static friction
Sweep displacement
Cut-off displacement
Force sense (Sx)
Pointer
Z
Y
X
[Fix finger/passive touch]
Presentation screen
Pointer
Fix finger
Move button
Amplitude
Position (X)
Force sense (Sx)
Position (X)
[Slide finger/active touch]
Presentation screen
Pointer
Fix virtual slider
Move finger
Reset finger
Reset finger
Amplitude
Position (X)
Force sense (Sx)
Position (X)

FIG. 296 Control of static friction
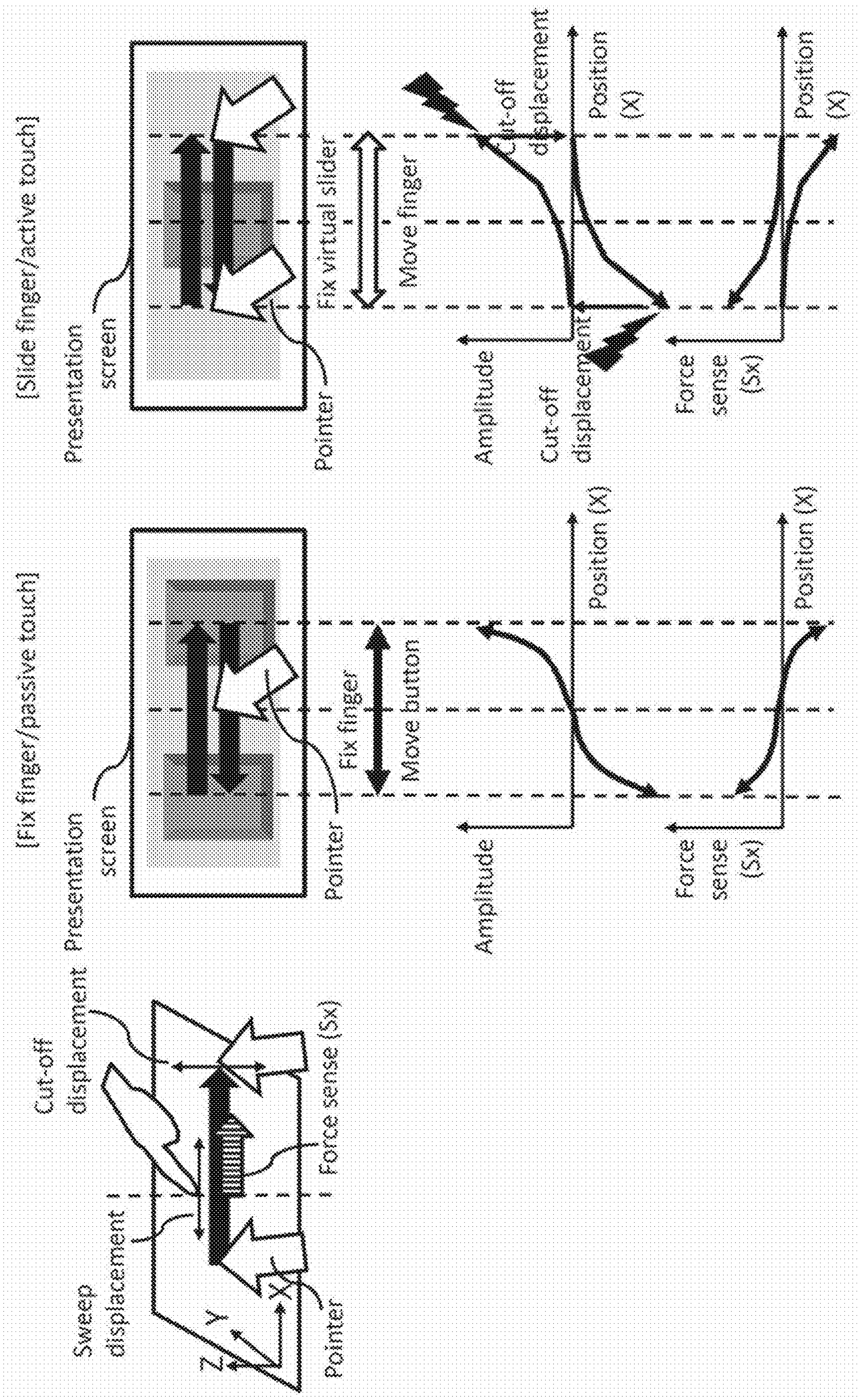

FIG. 297 Control of dynamic friction
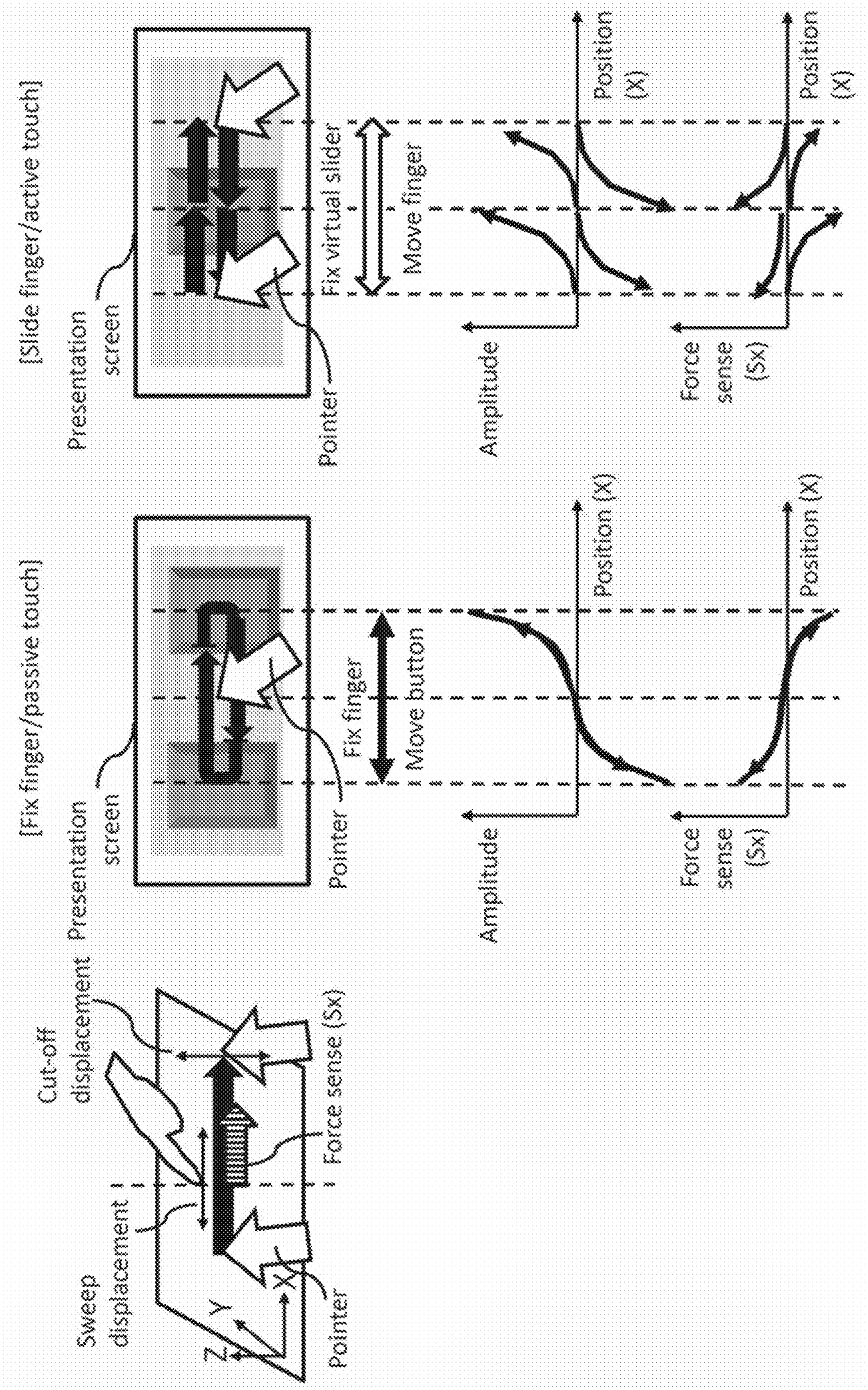

FIG. 298 Control of sense of depressing button
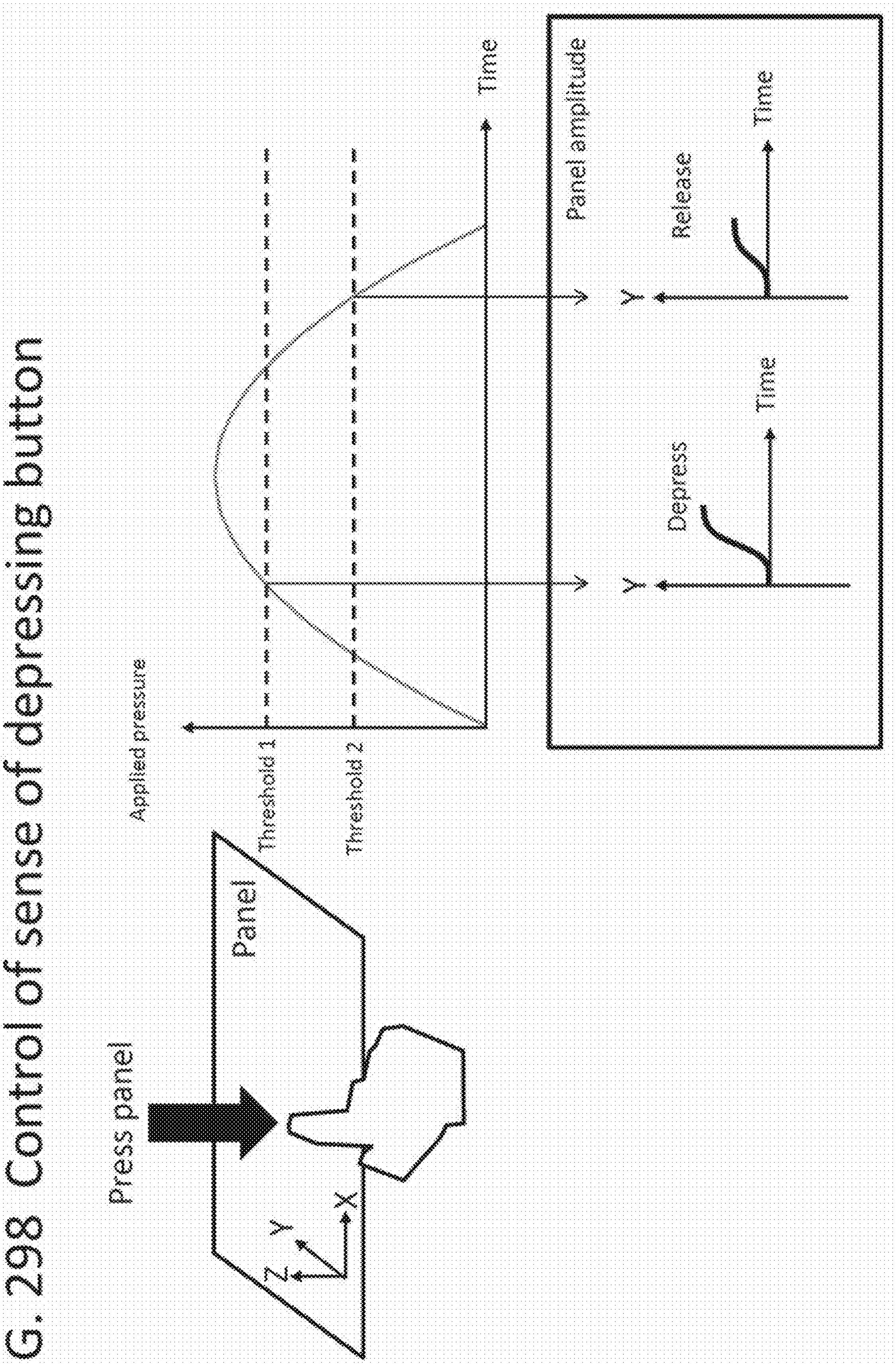

FIG. 299 Control of sense of depressing button (Double trigger)
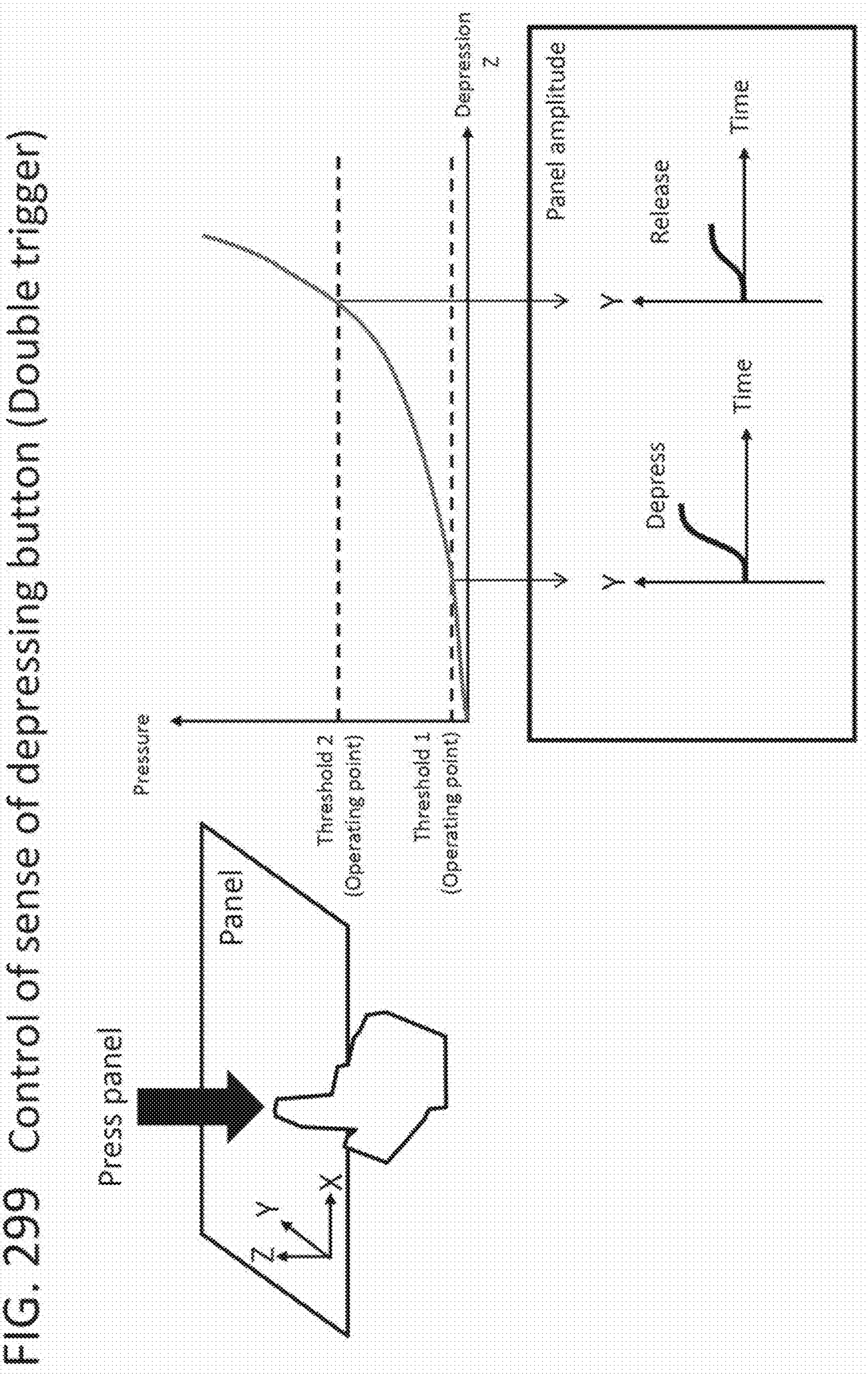

FIG. 300 Control of sense of depressing button
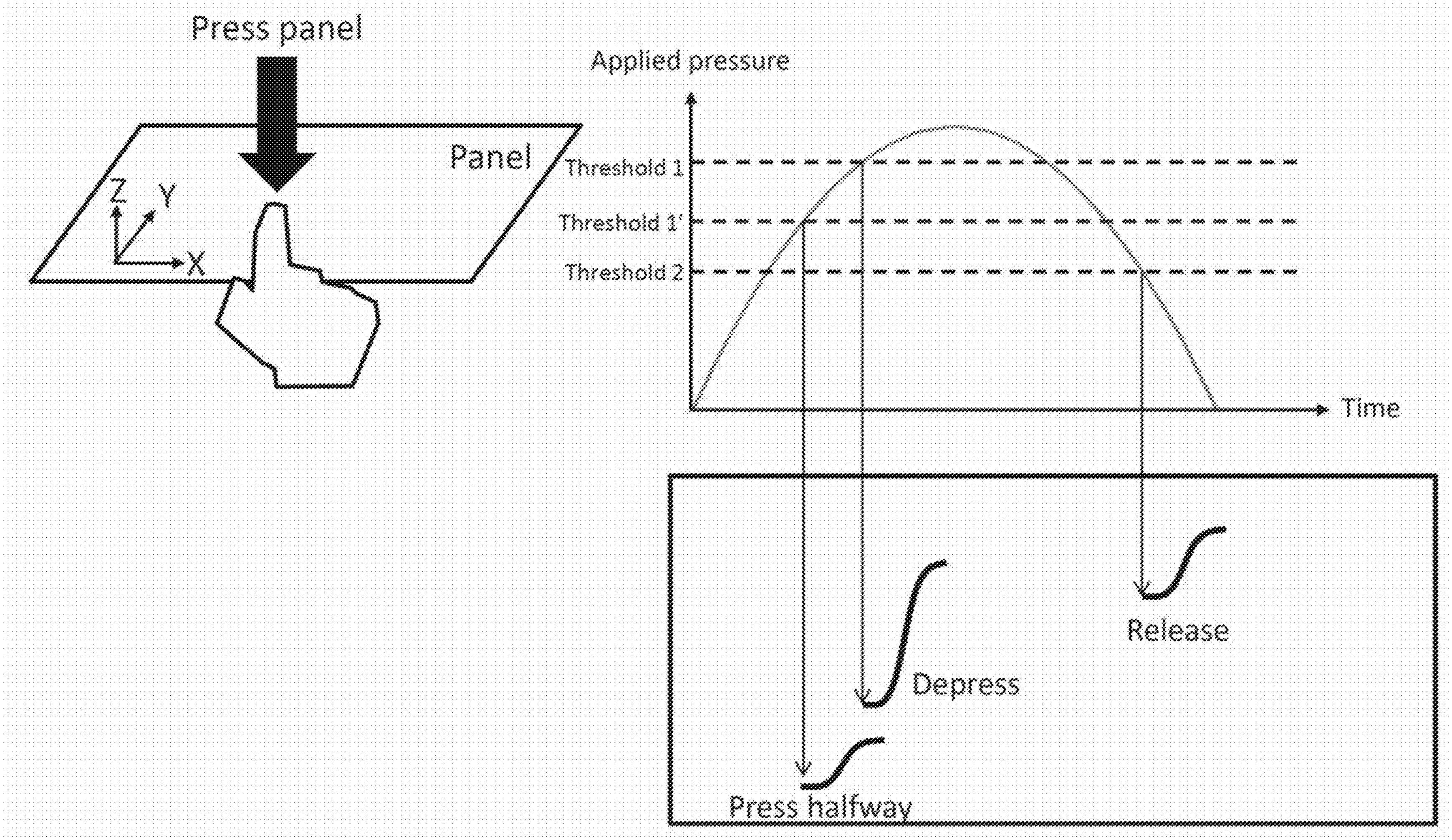

FIG. 301 Control of sense of depressing button (Shutter button)
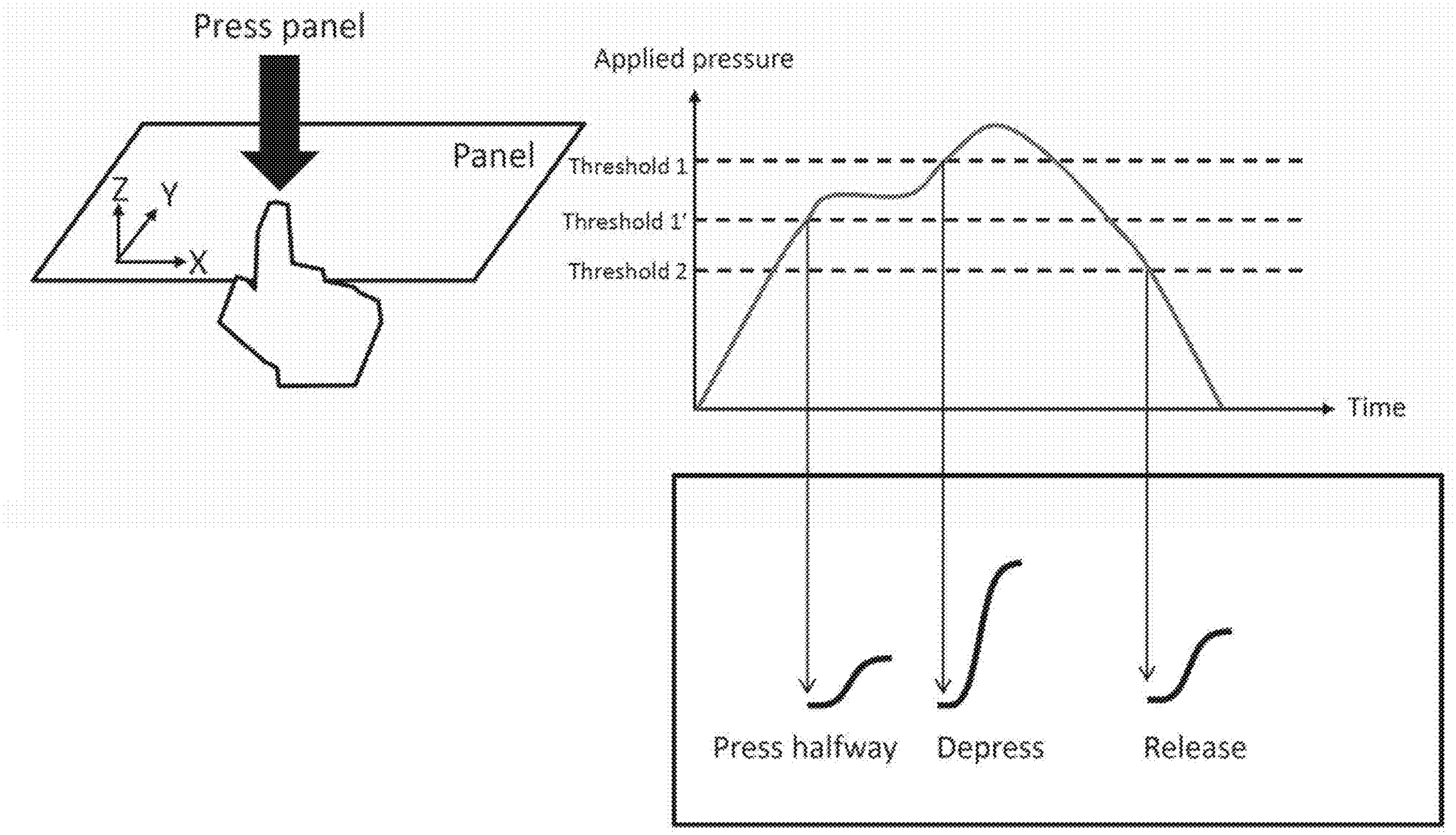

FIG. 302 Control of sense of depressing button
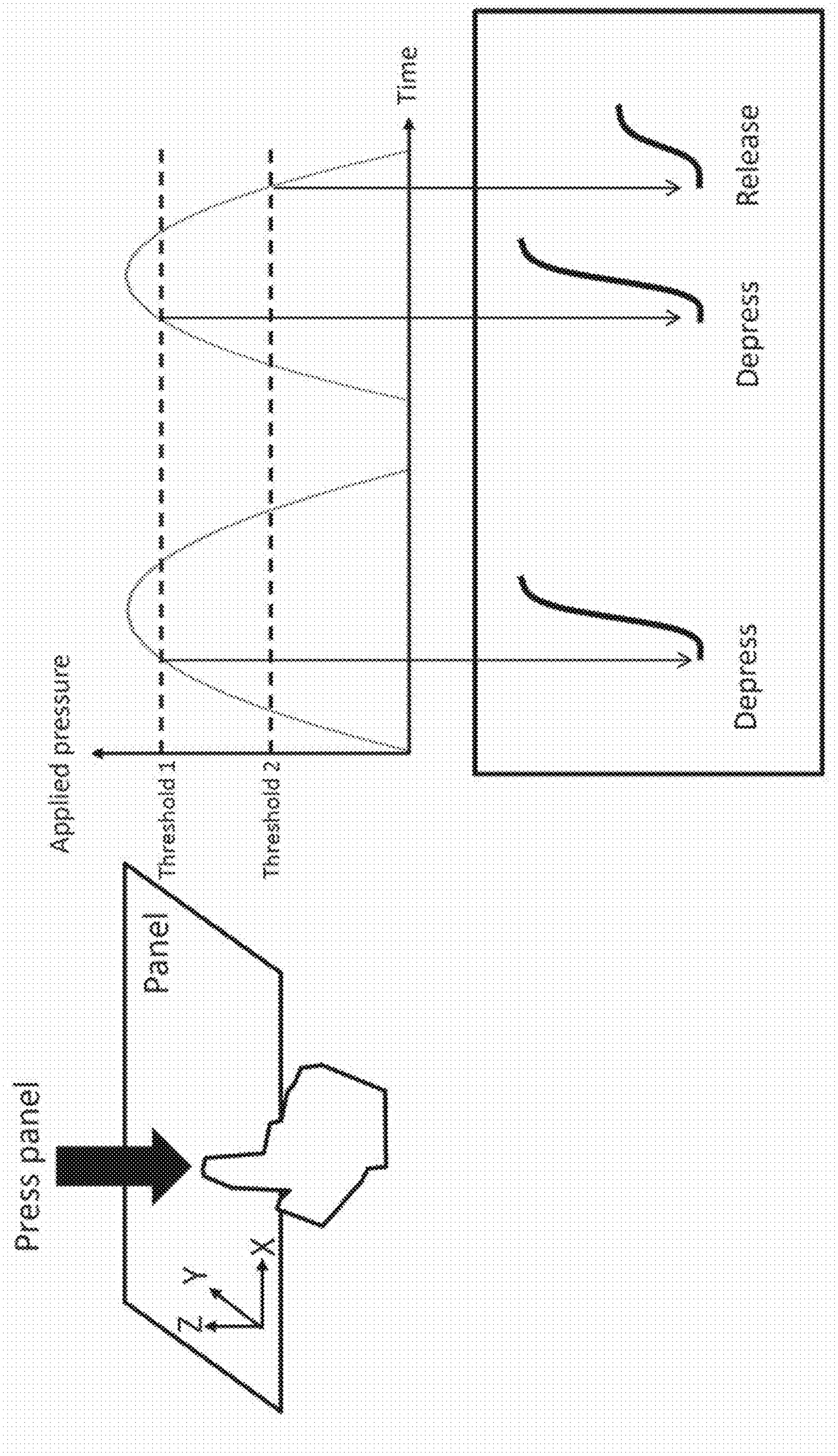

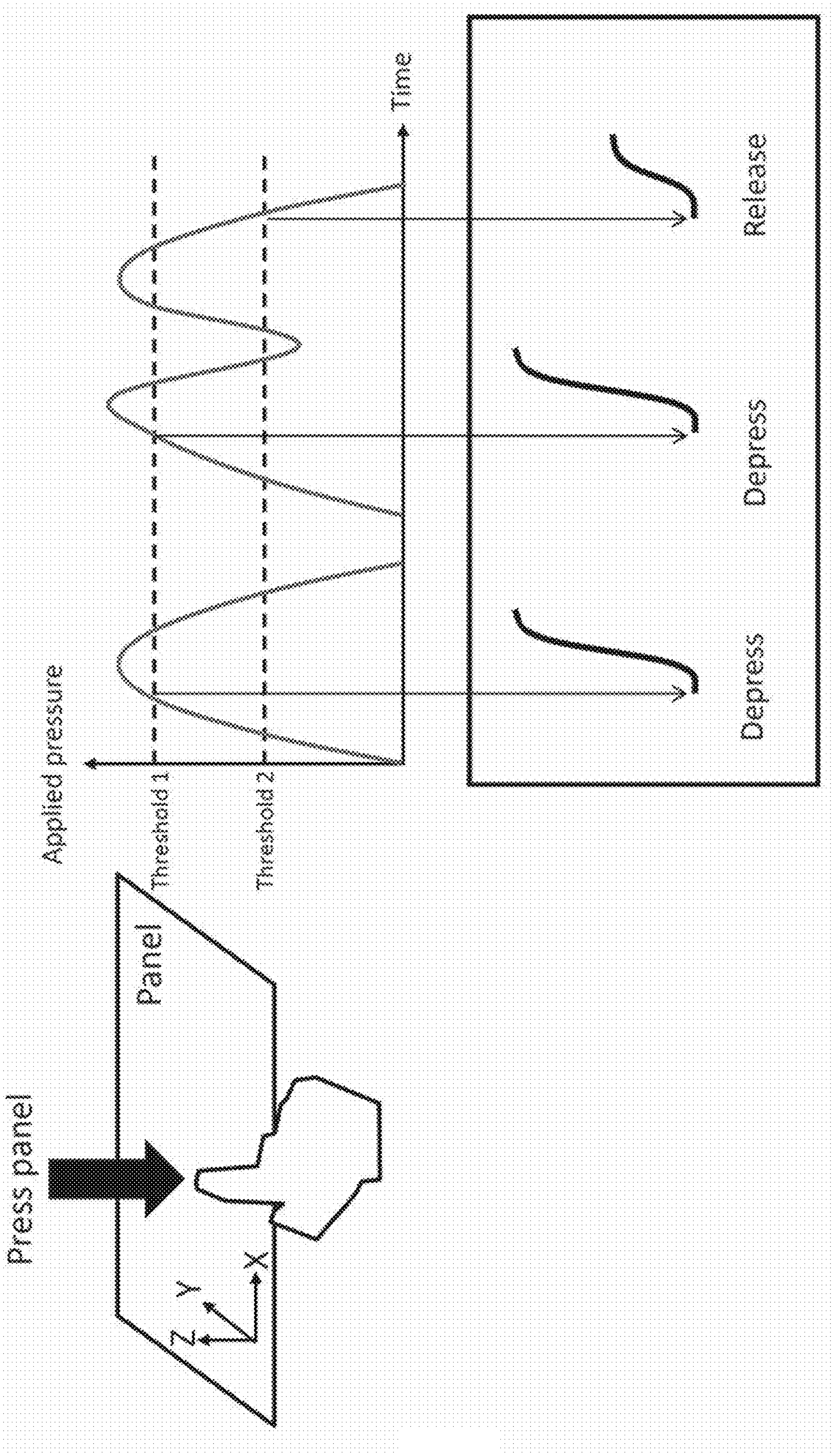
FIG. 303 Control of sense of depressing button (Latch)

FIG. 304 Control of sense of depressing button (Equally spaced thresholds)
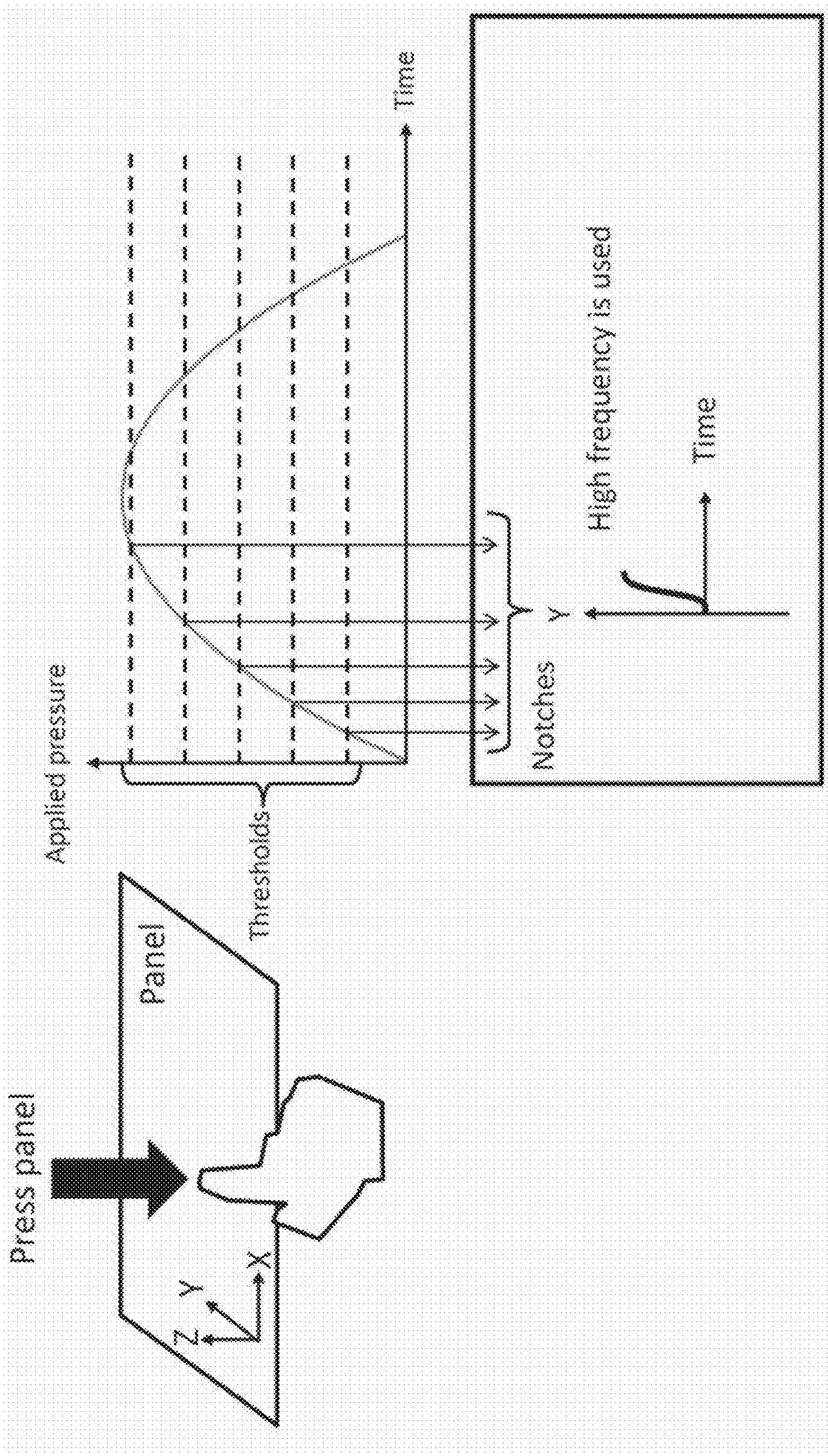
Notes: Notch = click-clack FIG. 305 Control of sense of depressing button (Unequally spaced thresholds)
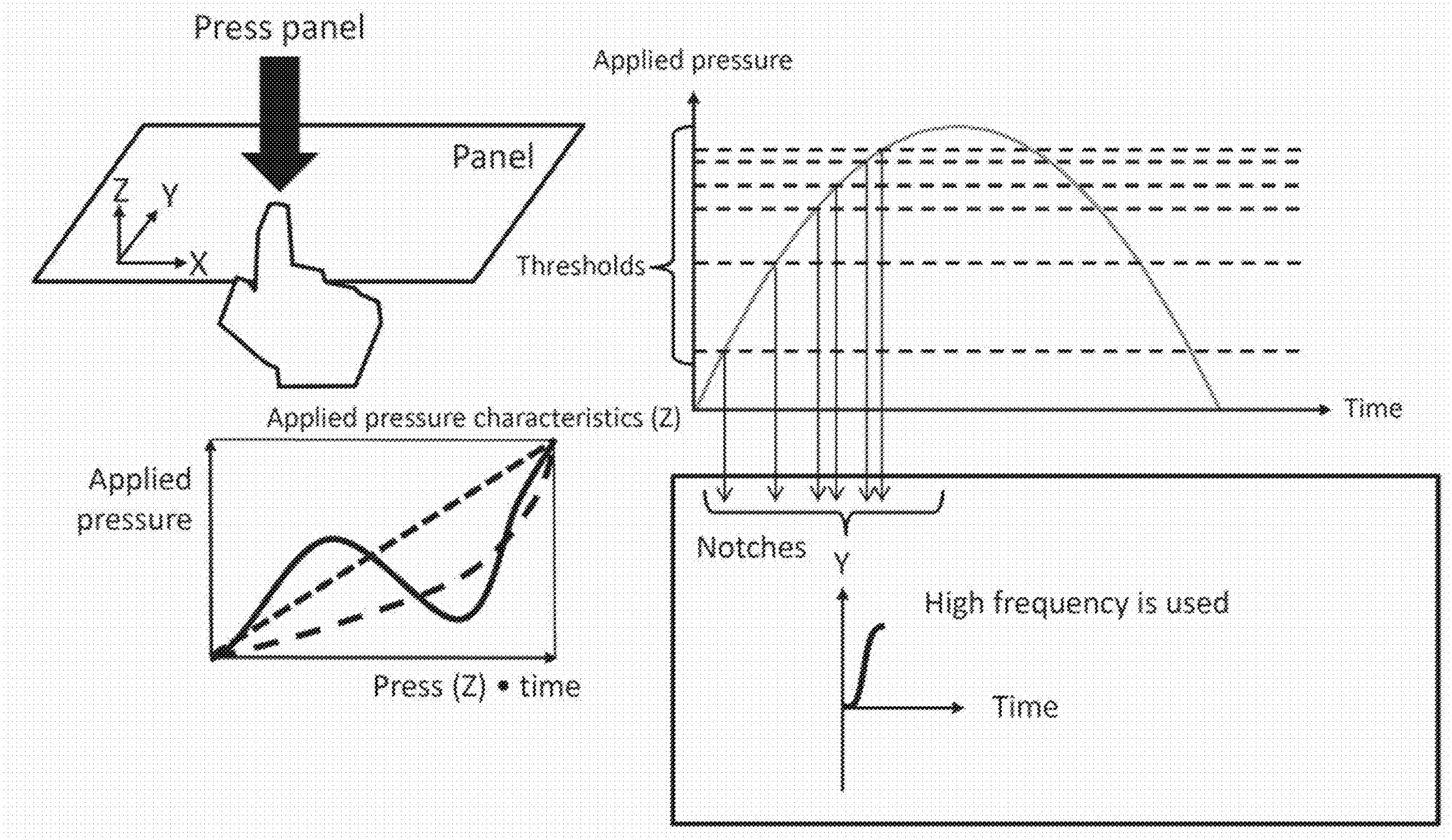

FIG. 306 Control of sense of depressing button (Equally spaced thresholds)
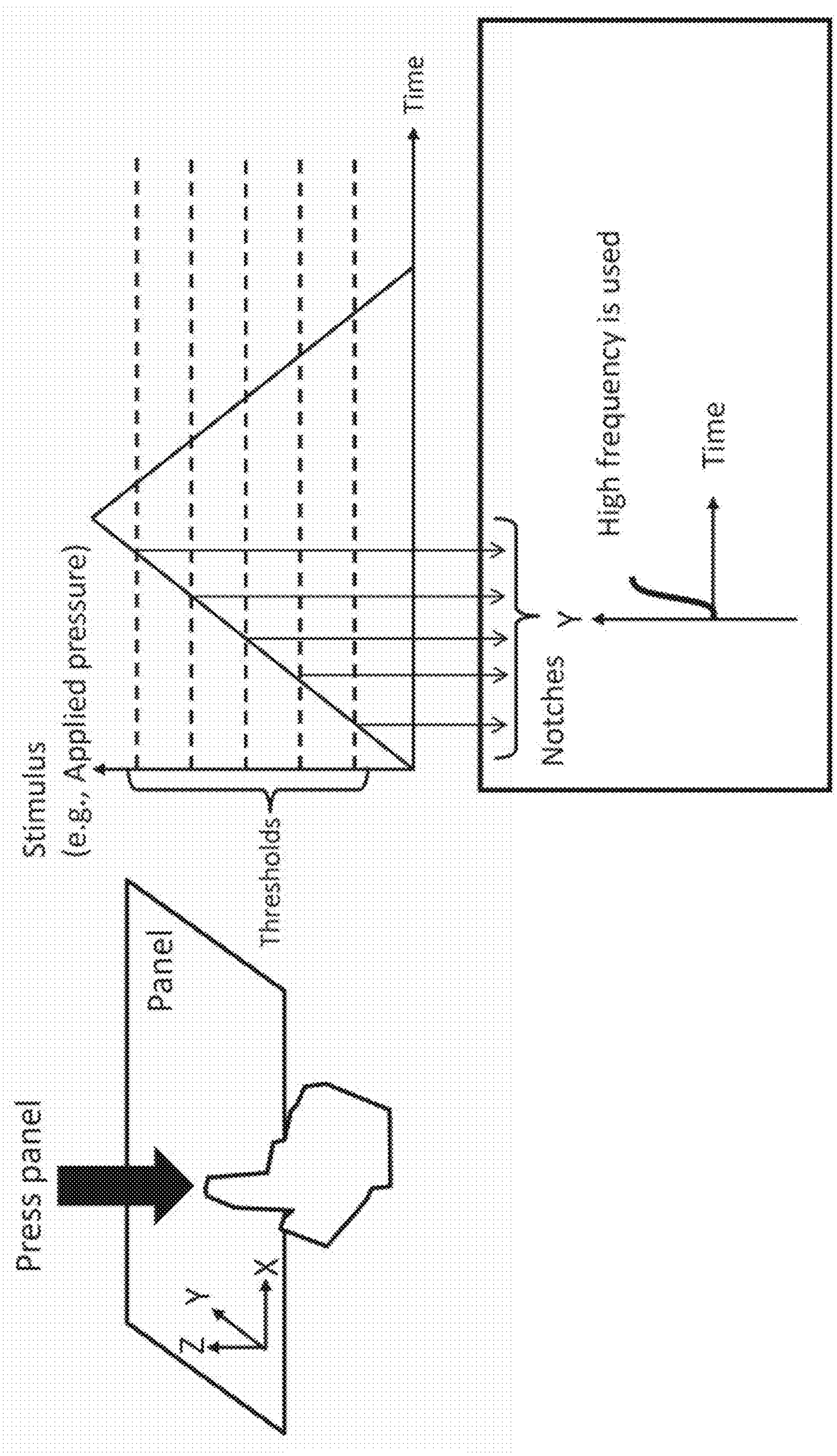

FIG. 307 Control of sense of depressing button (Unequally spaced thresholds)
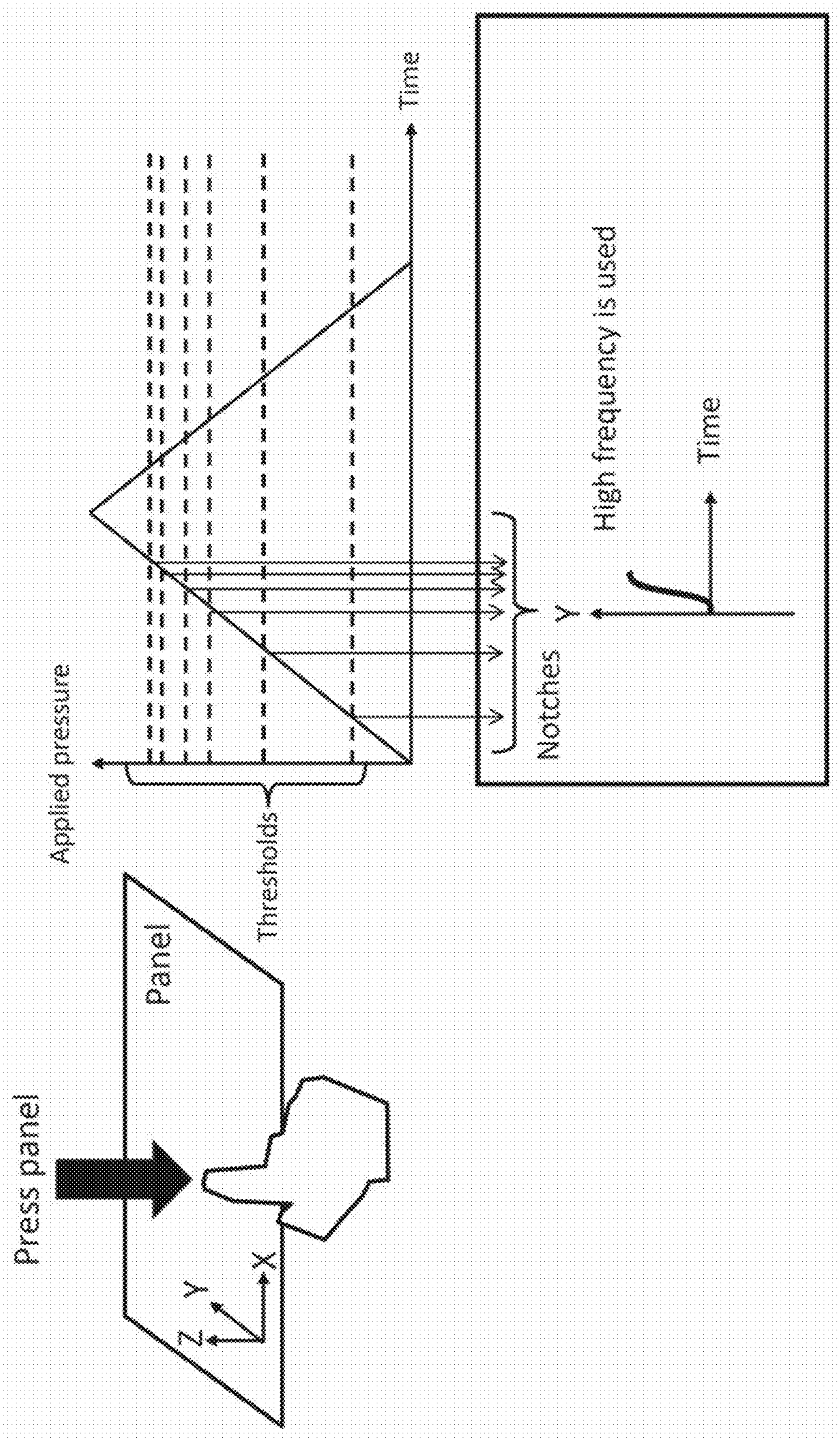

FIG. 308 Control of sense of depressing button (Equally spaced thresholds)
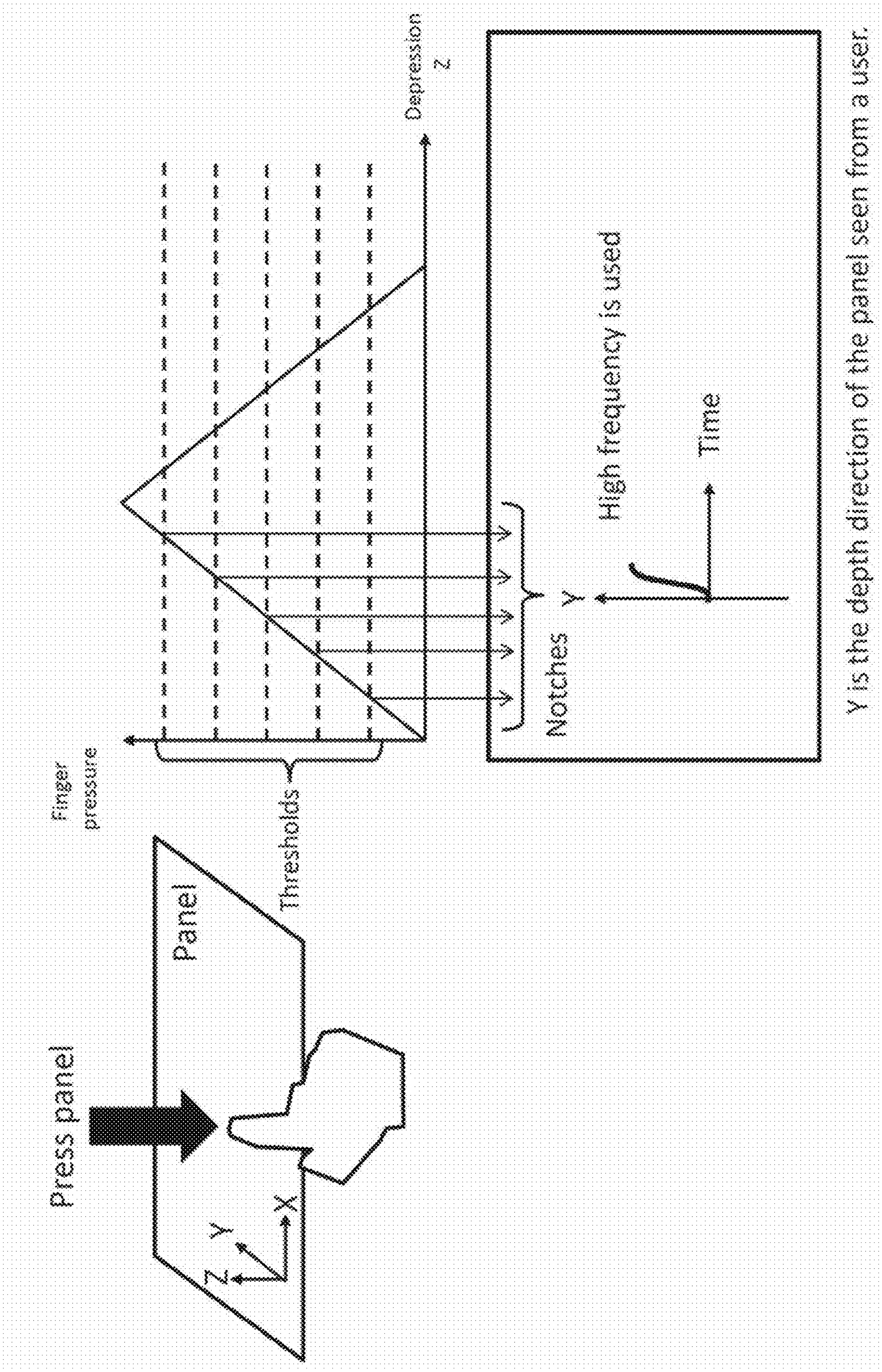

FIG. 309 Control of sense of depressing button (Unequally spaced thresholds)
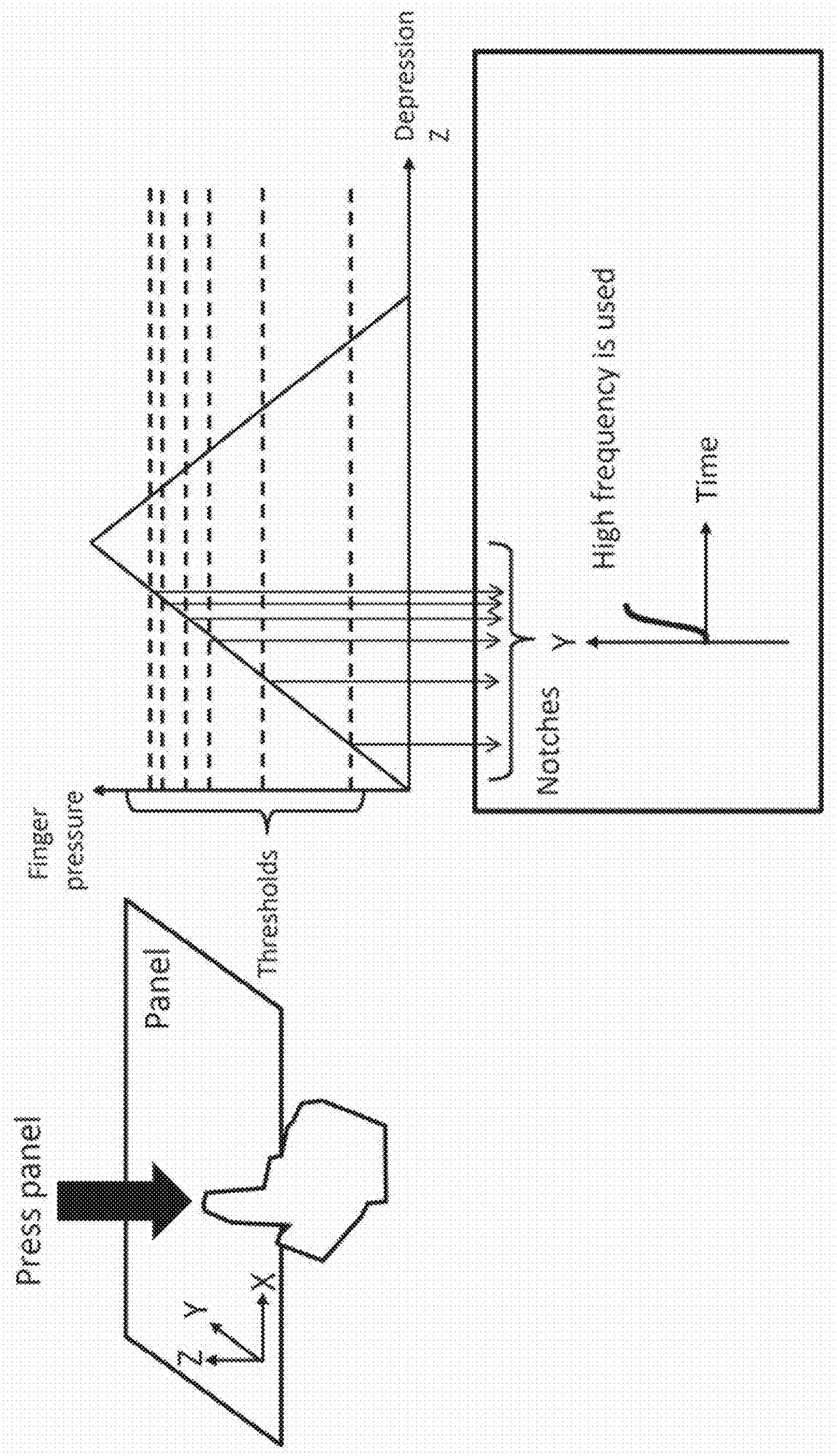

FIG. 310 Control of sense of depressing button (Hysteresis)
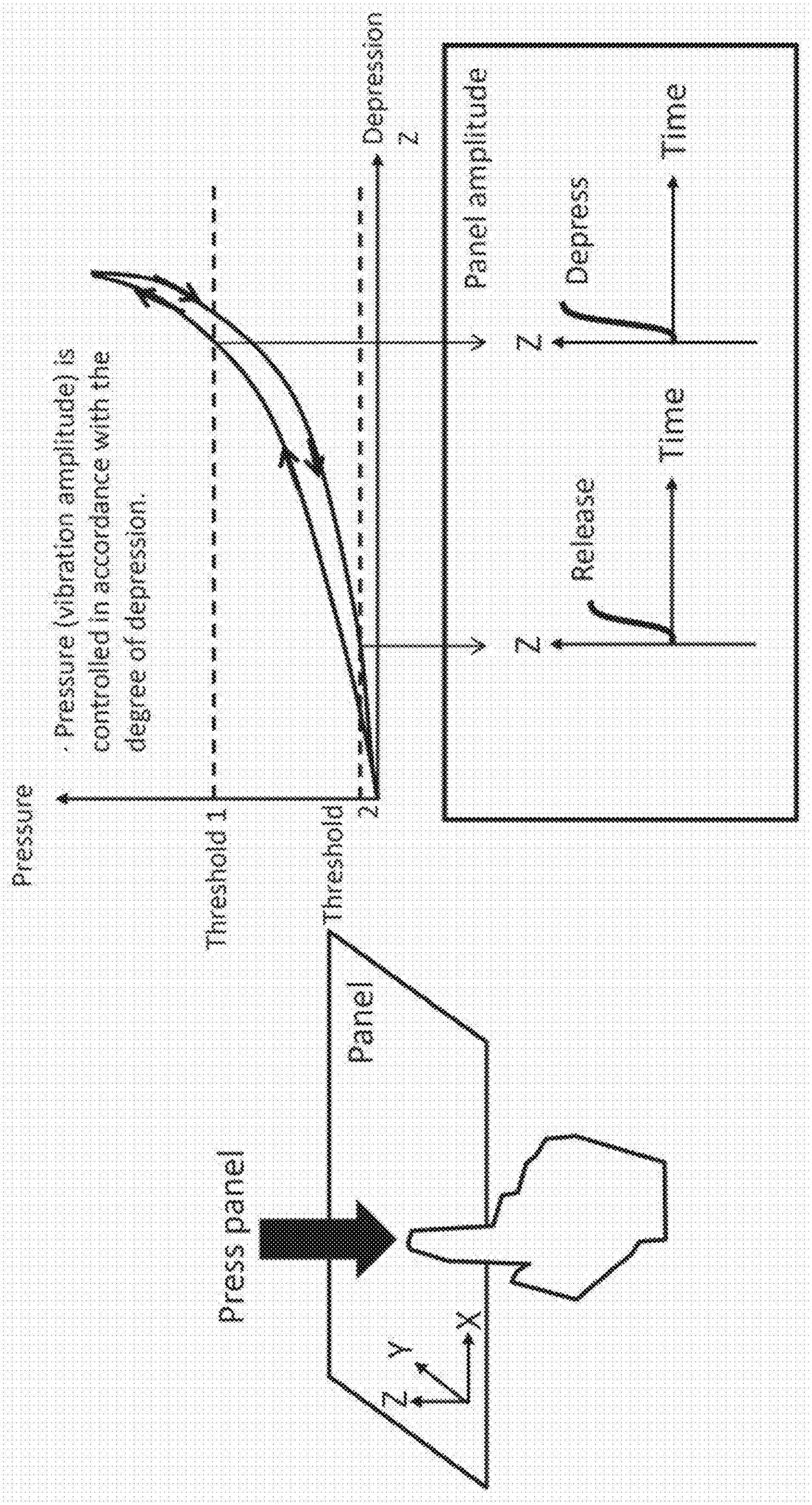

FIG. 311 Control of sense of depressing button (Control of finger pressure function)
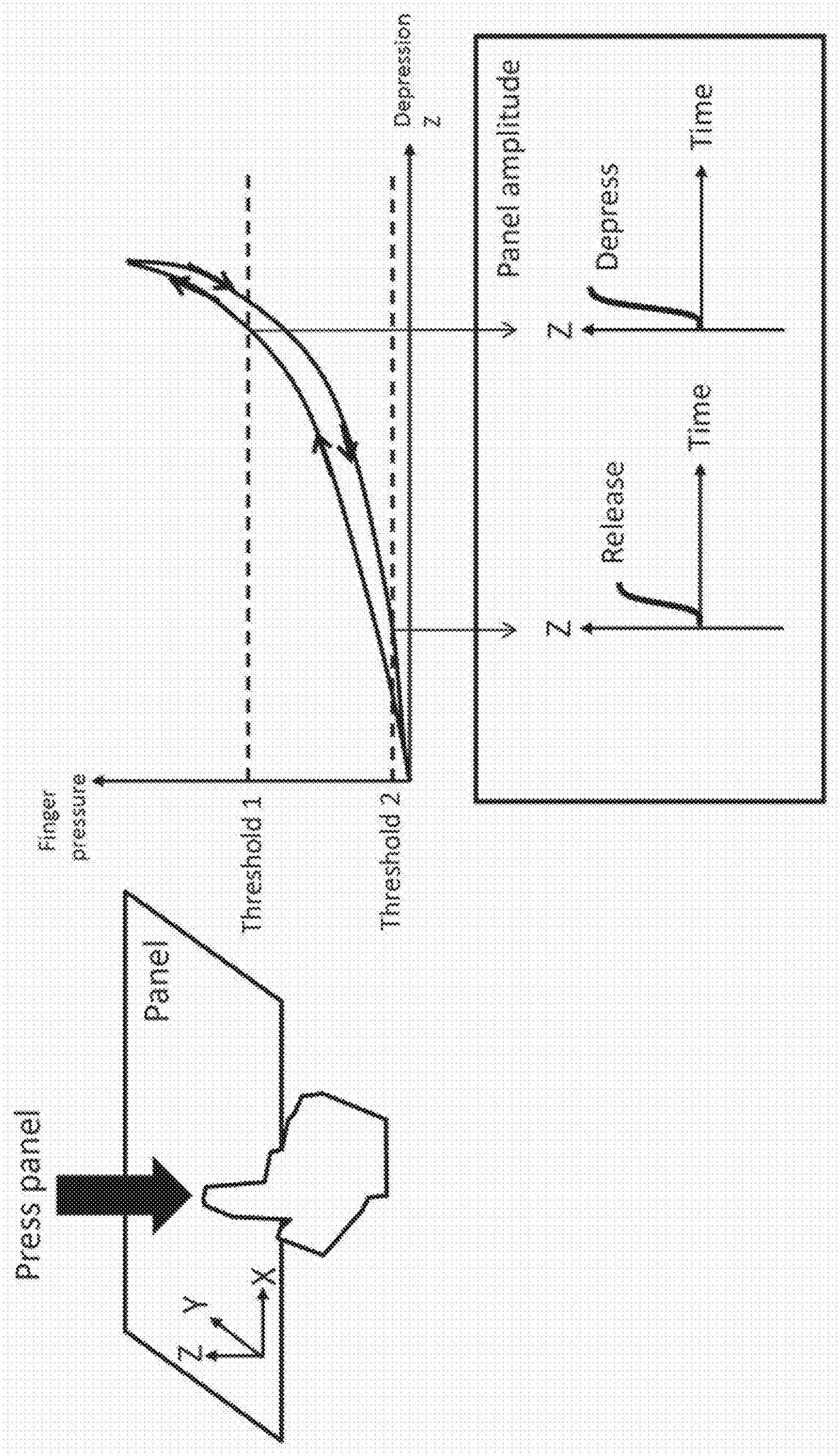

FIG. 312 Control of sense of depressing button (Adaptive control of waveform)
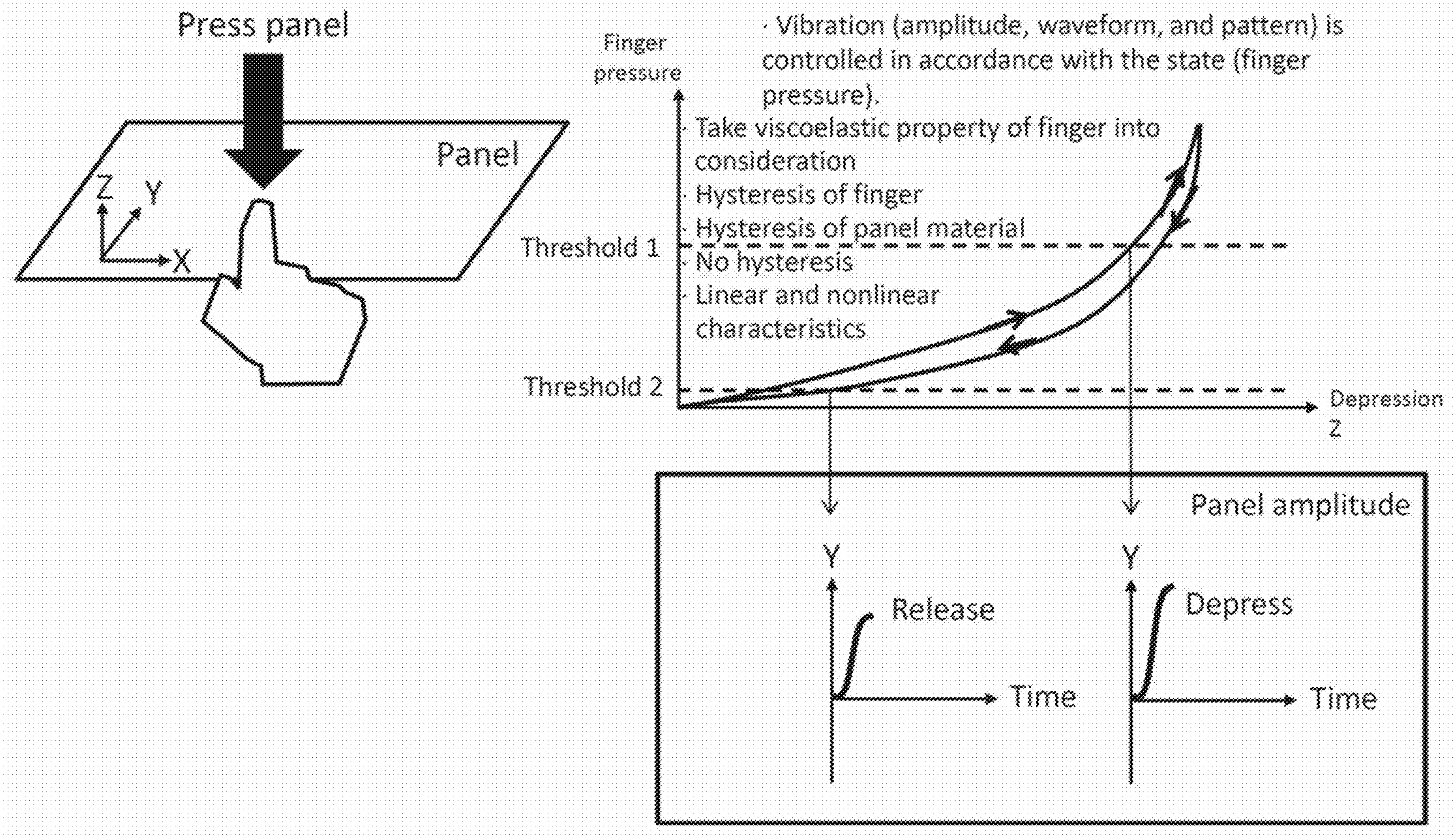

FIG. 313 Control of sense of depressing button (3D vibration control)
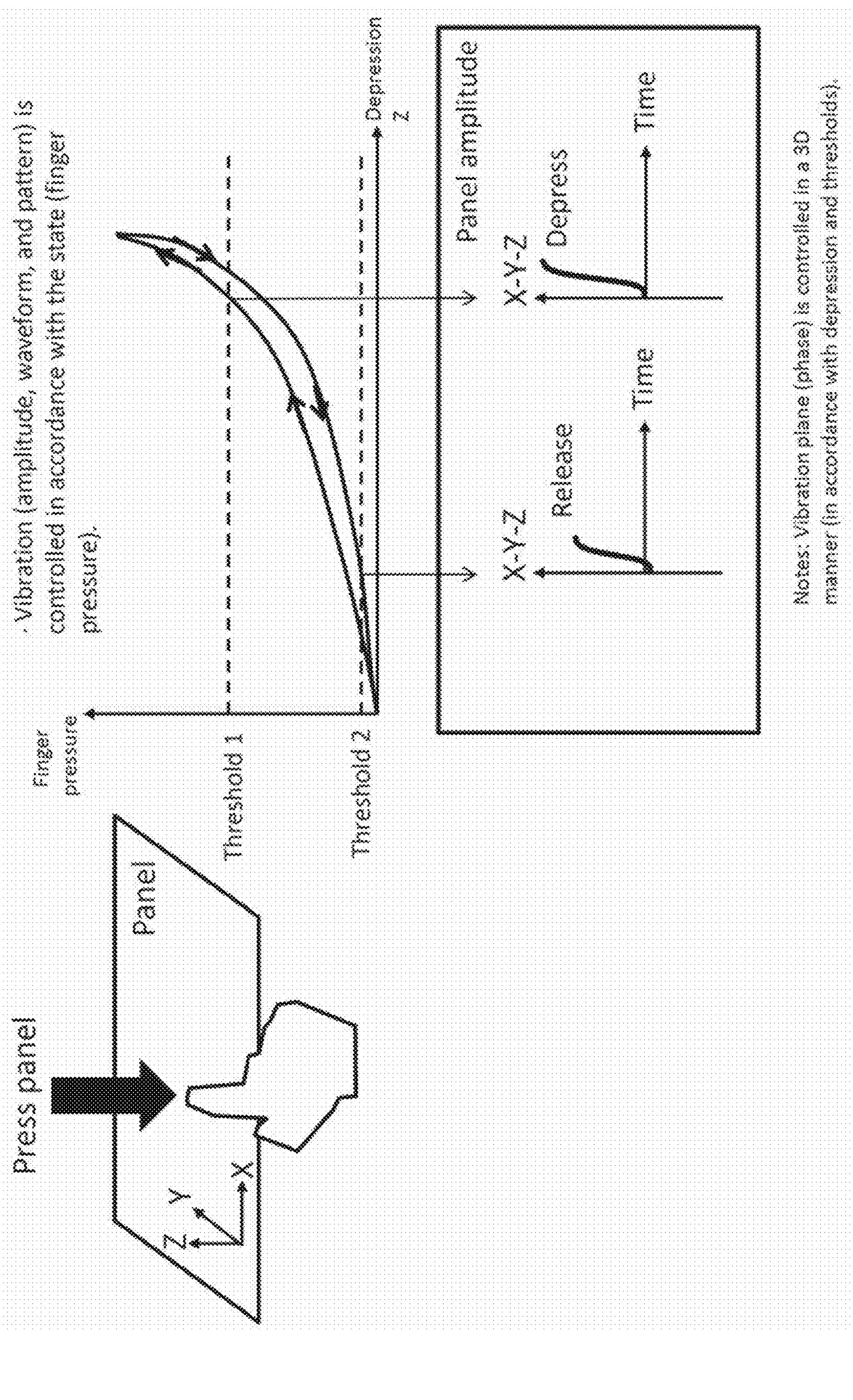

FIG. 314 Control of sense of depressing button (in accordance with state)
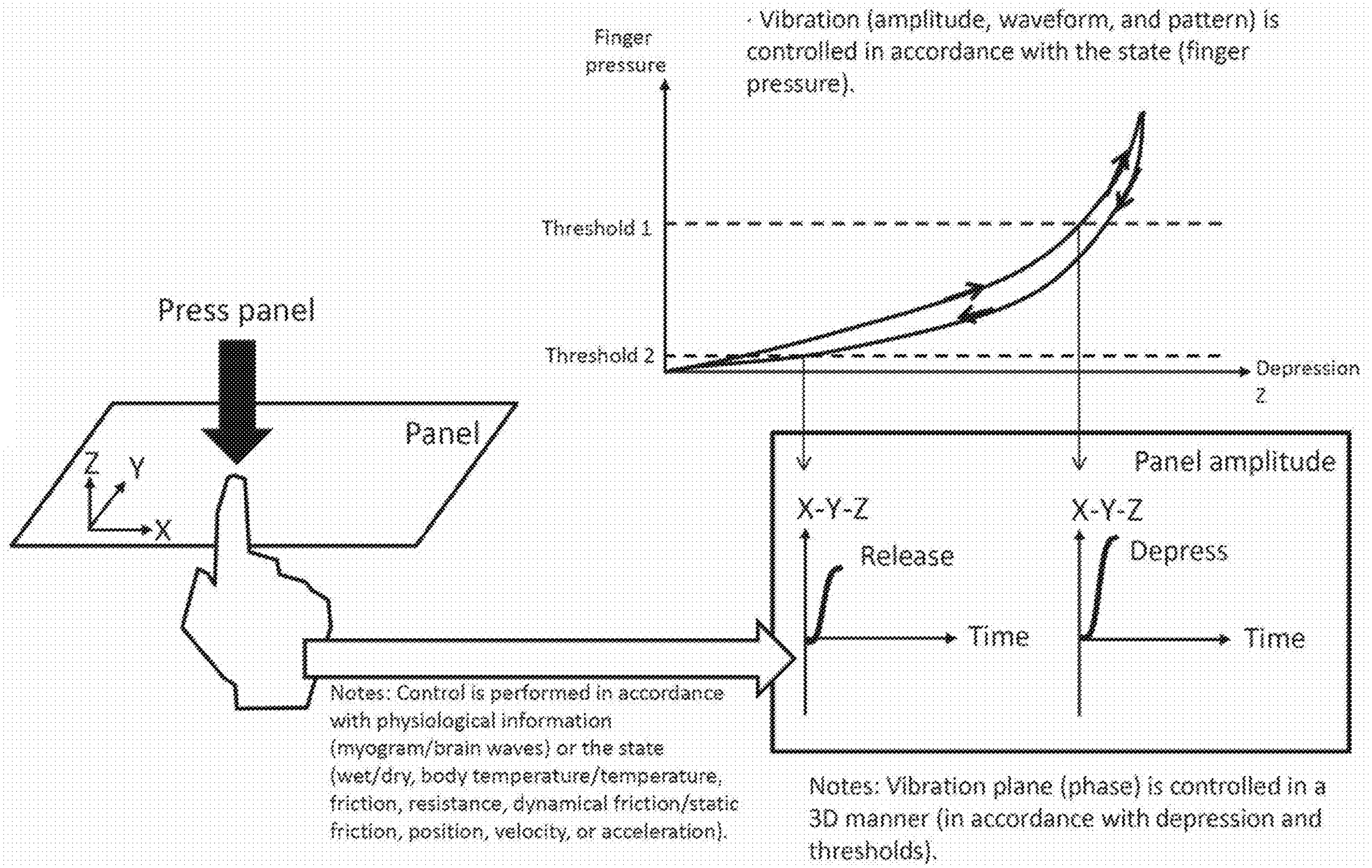

FIG. 315 Control of sense of depressing button (induction of muscle reflexes)
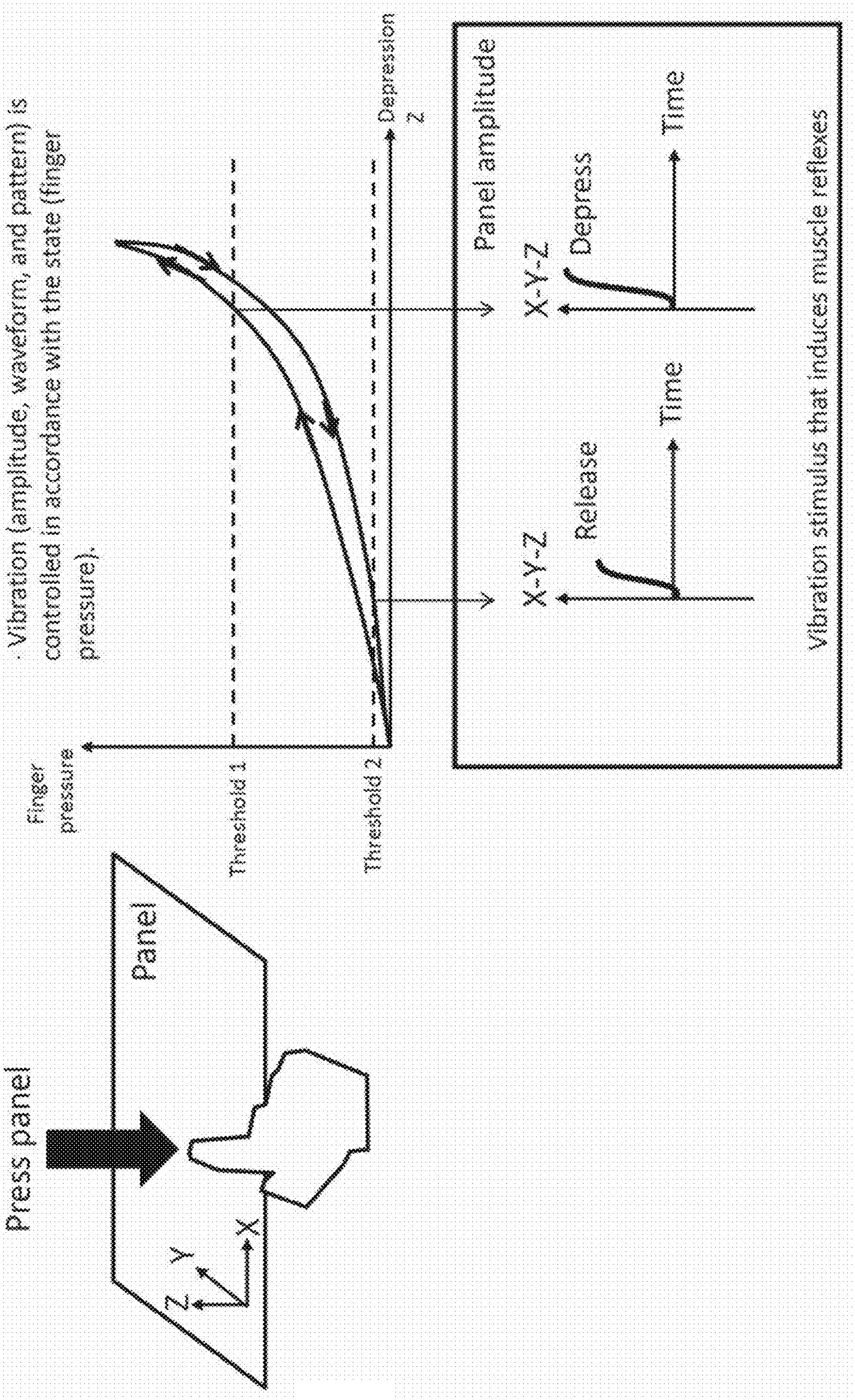

FIG. 316 Control of sense of depressing button (temporal pattern control)
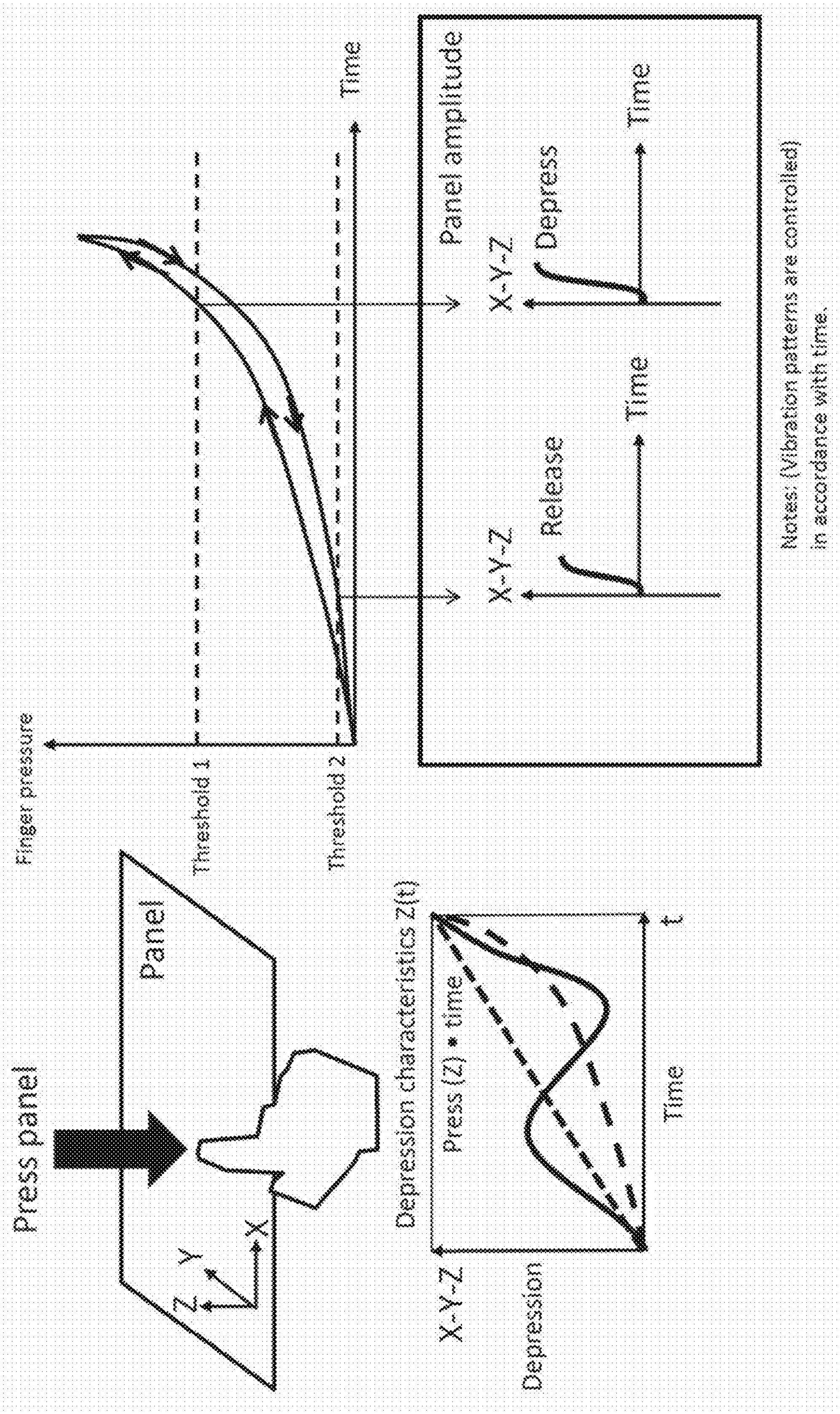

FIG. 317 Control of sense of depressing button (threshold control)
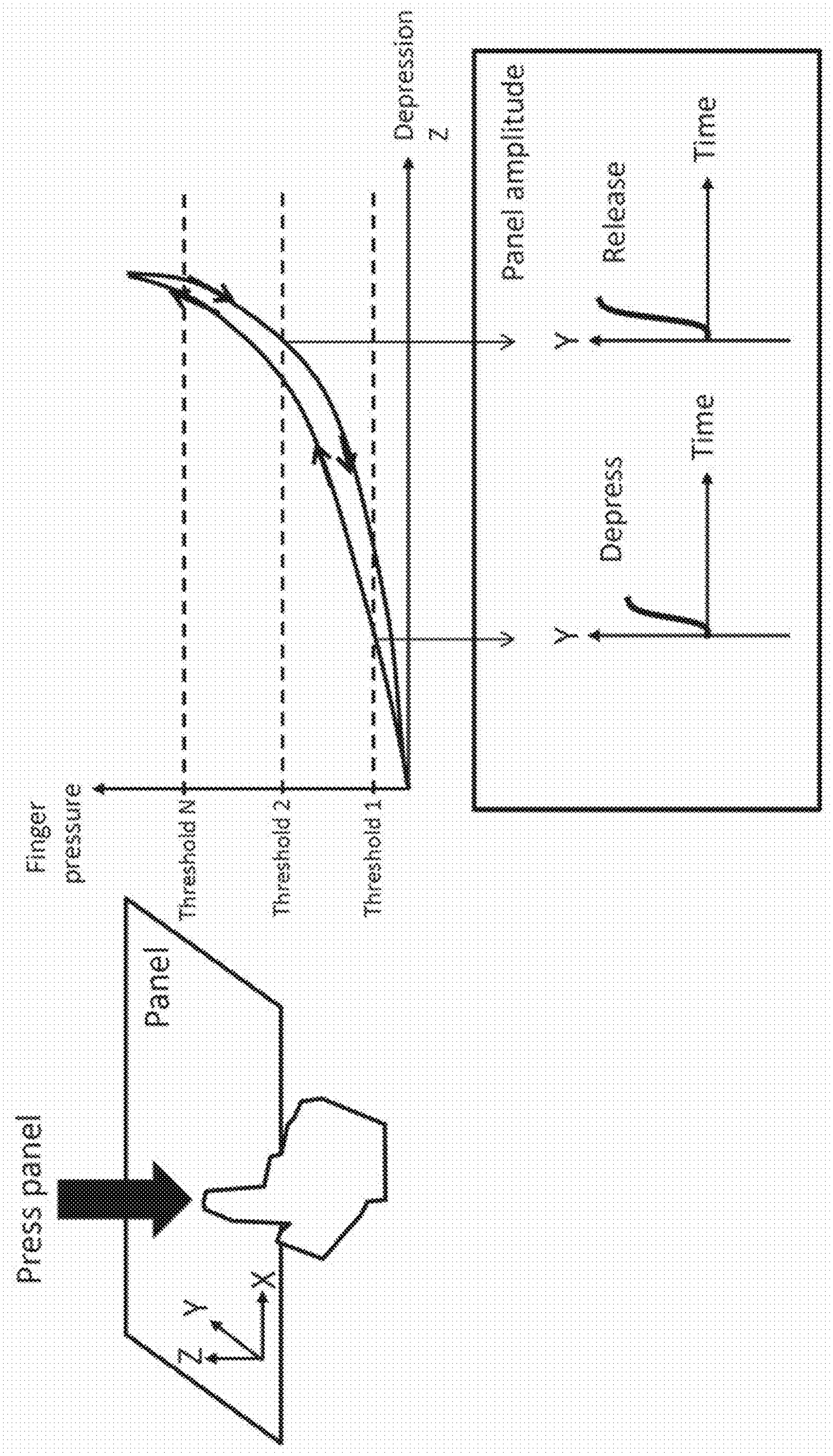

FIG. 318 Control of sense of depressing button (Pulse amplitude control)
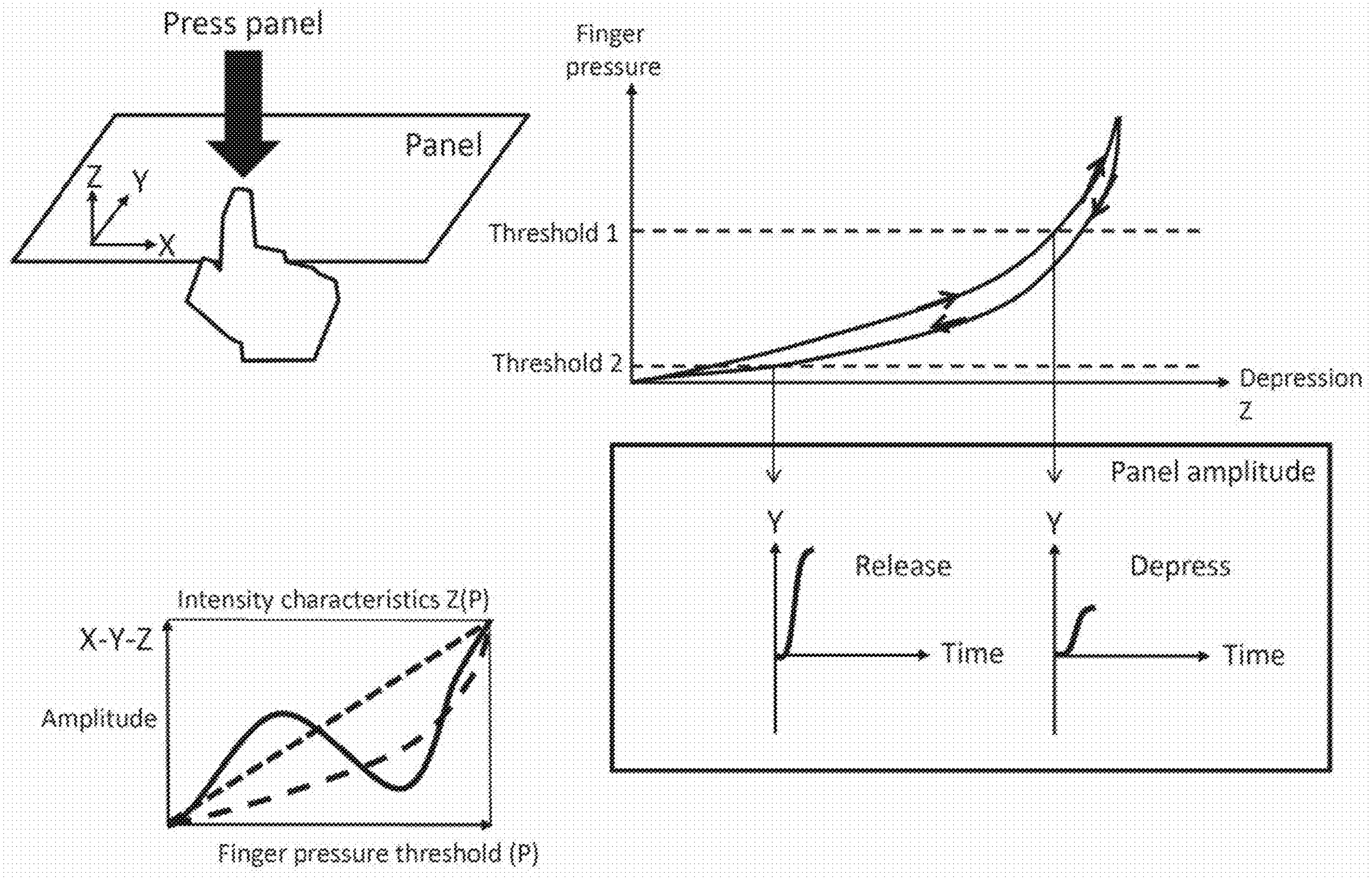

FIG. 319 Control of sense of depressing button (Waveform control)
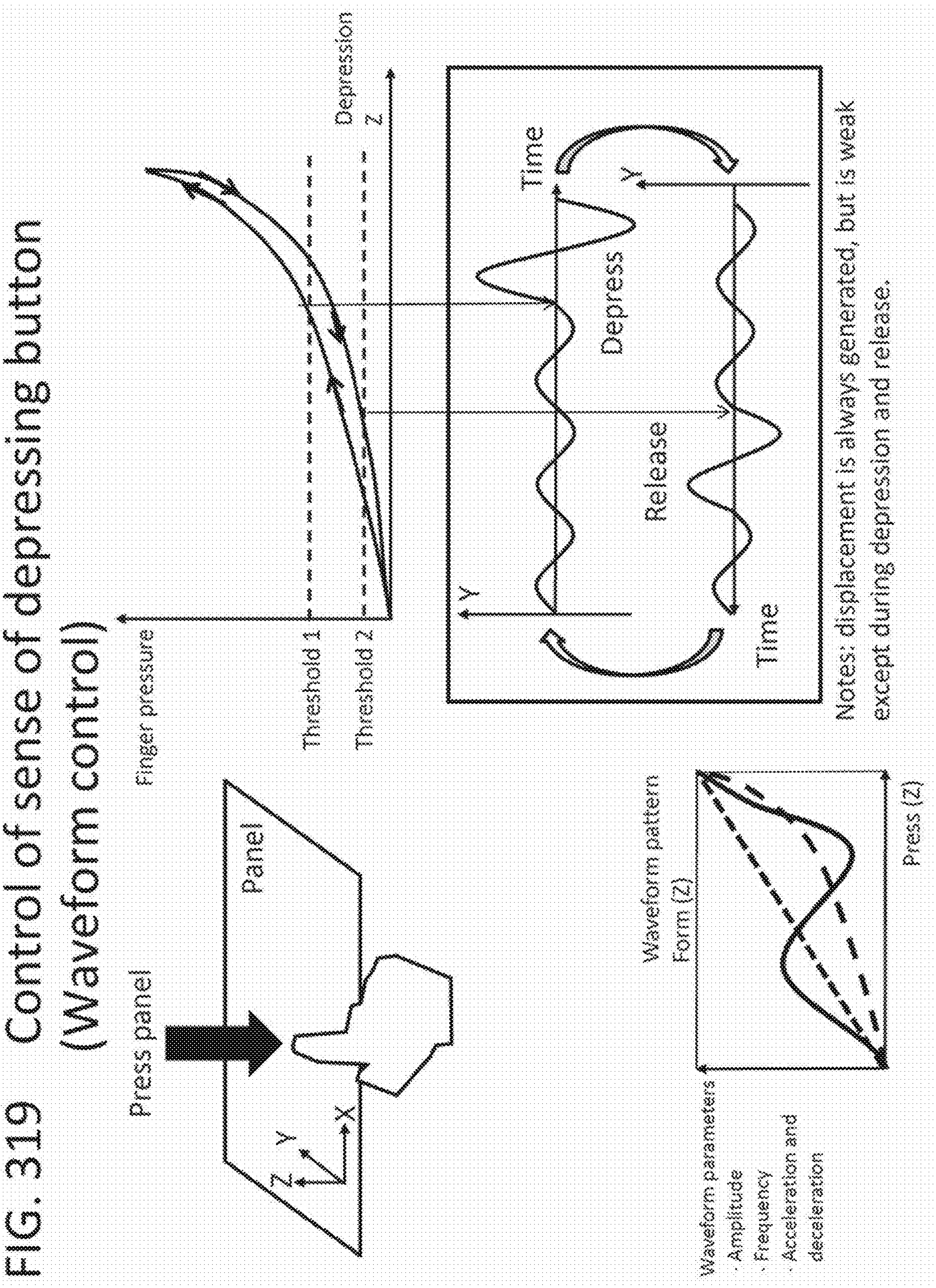

FIG. 320 Control of sense of depressing button (Masking control)
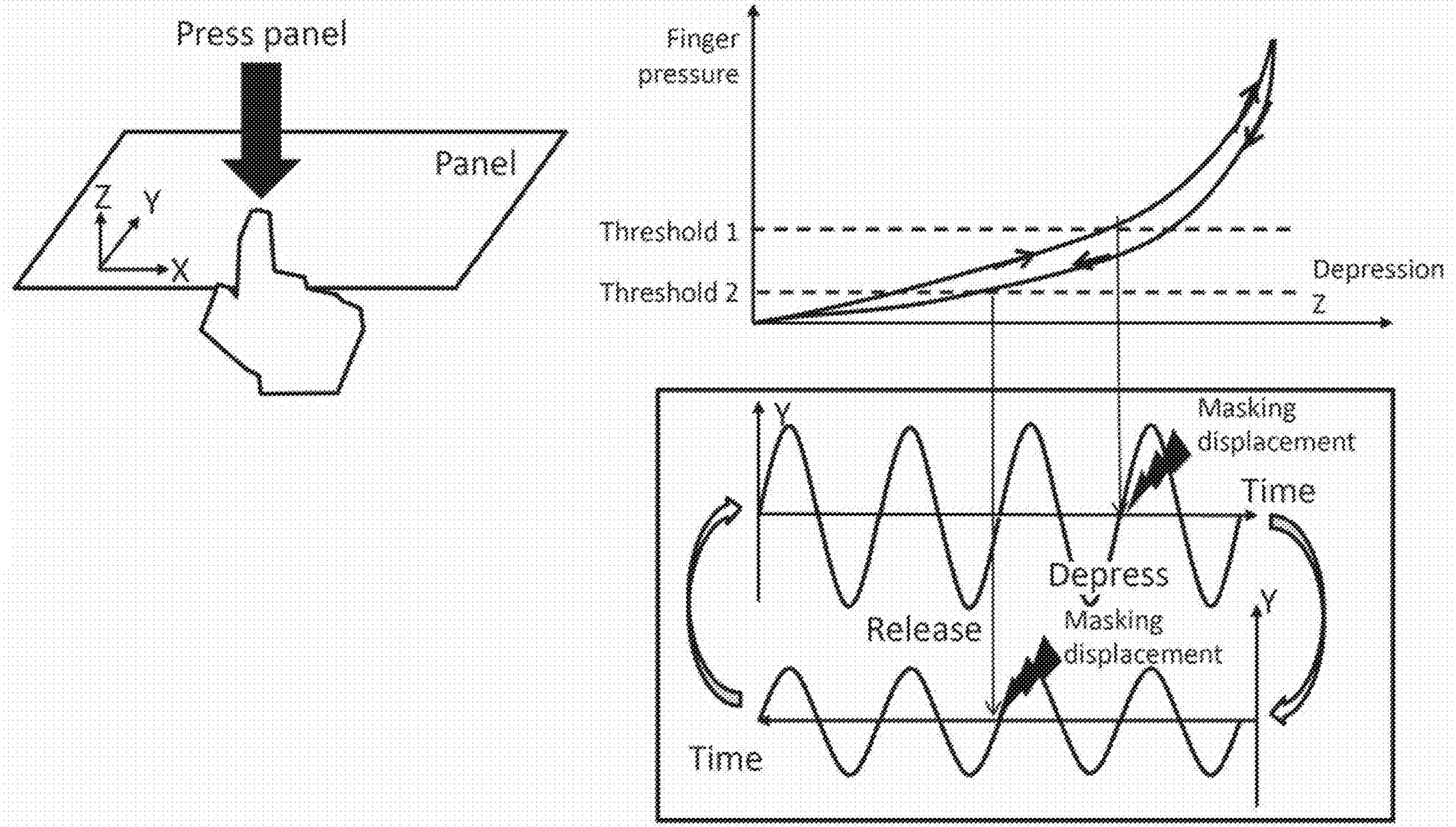
Notes: displacement is always generated, but is weak except during depression and release.

FIG. 321 Control of sense of depressing button (Dynamic and static friction)
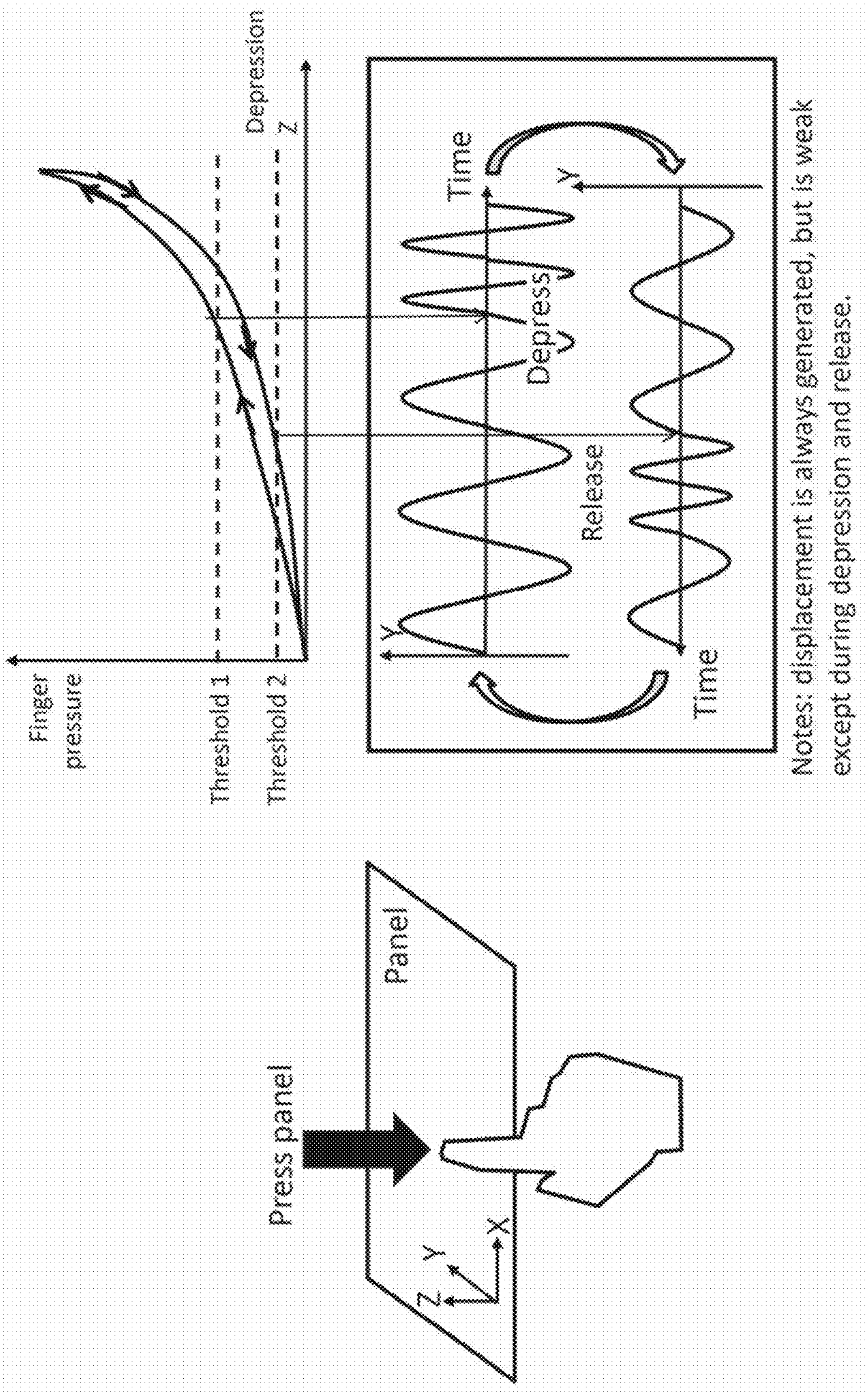

FIG. 322 Control of sense of depressing button (Phase control)
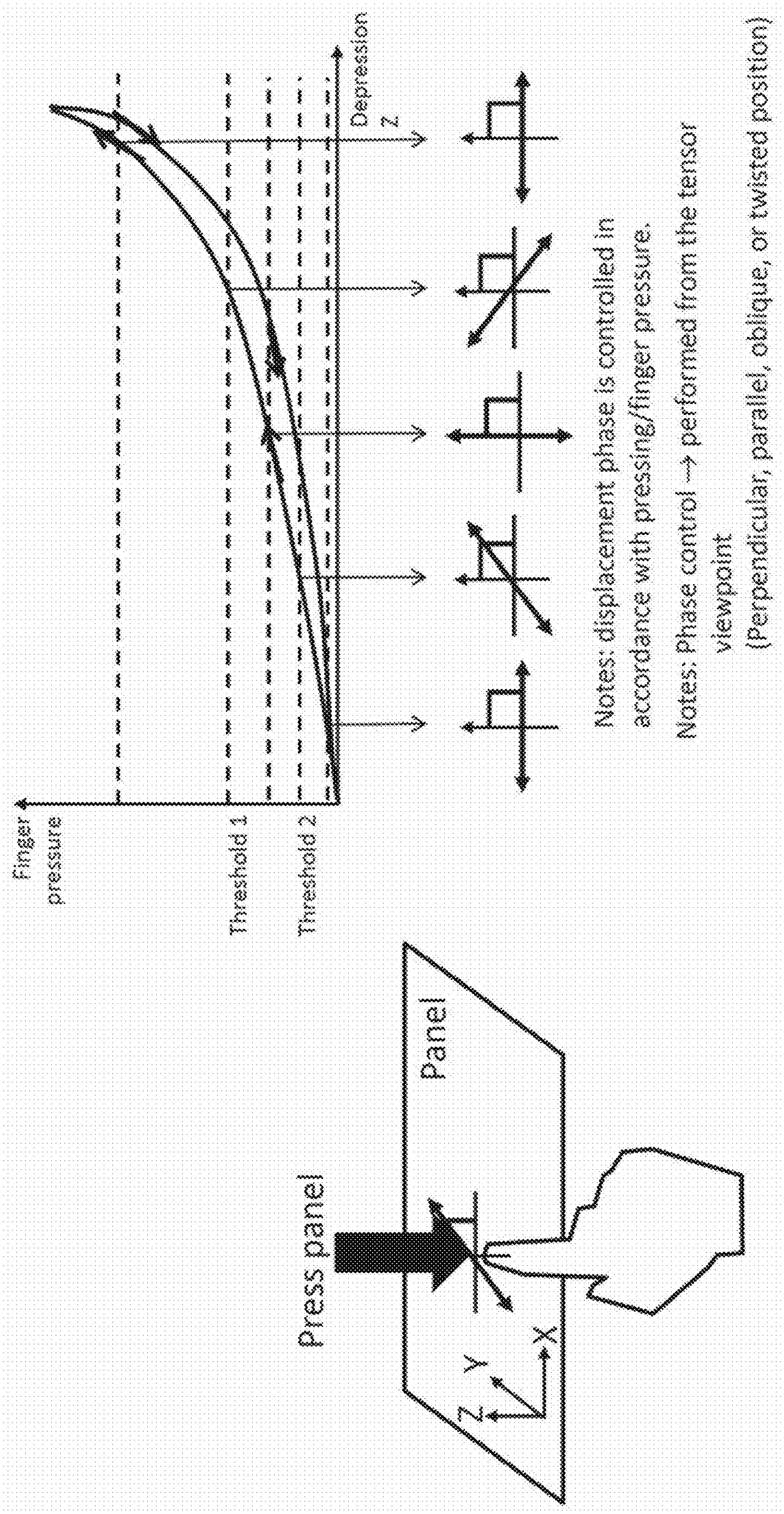

FIG. 323 Control of sense of depressing button (Depression at regular intervals)
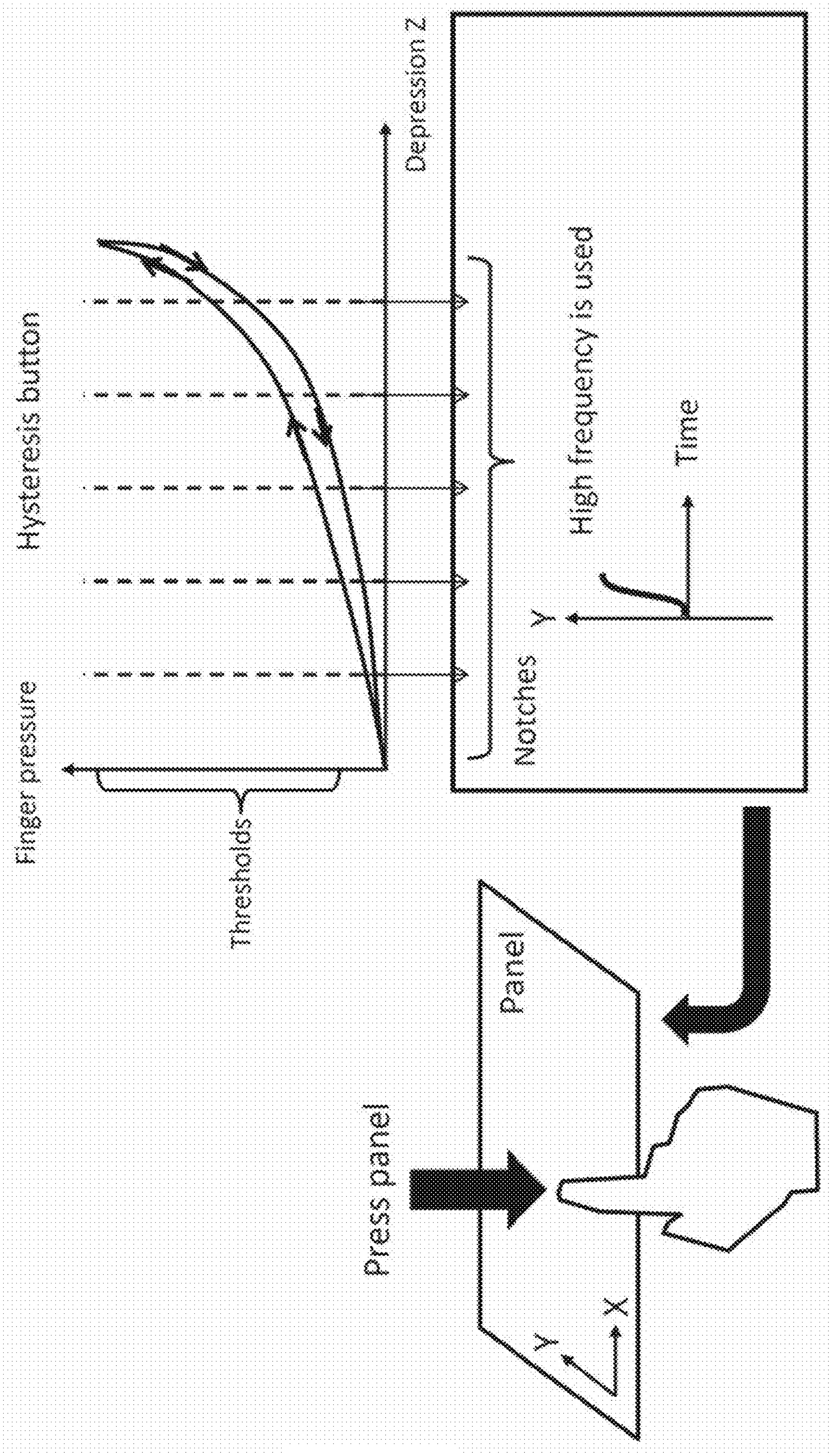

FIG. 324 Control of sense of depressing button (Depression at irregular intervals)
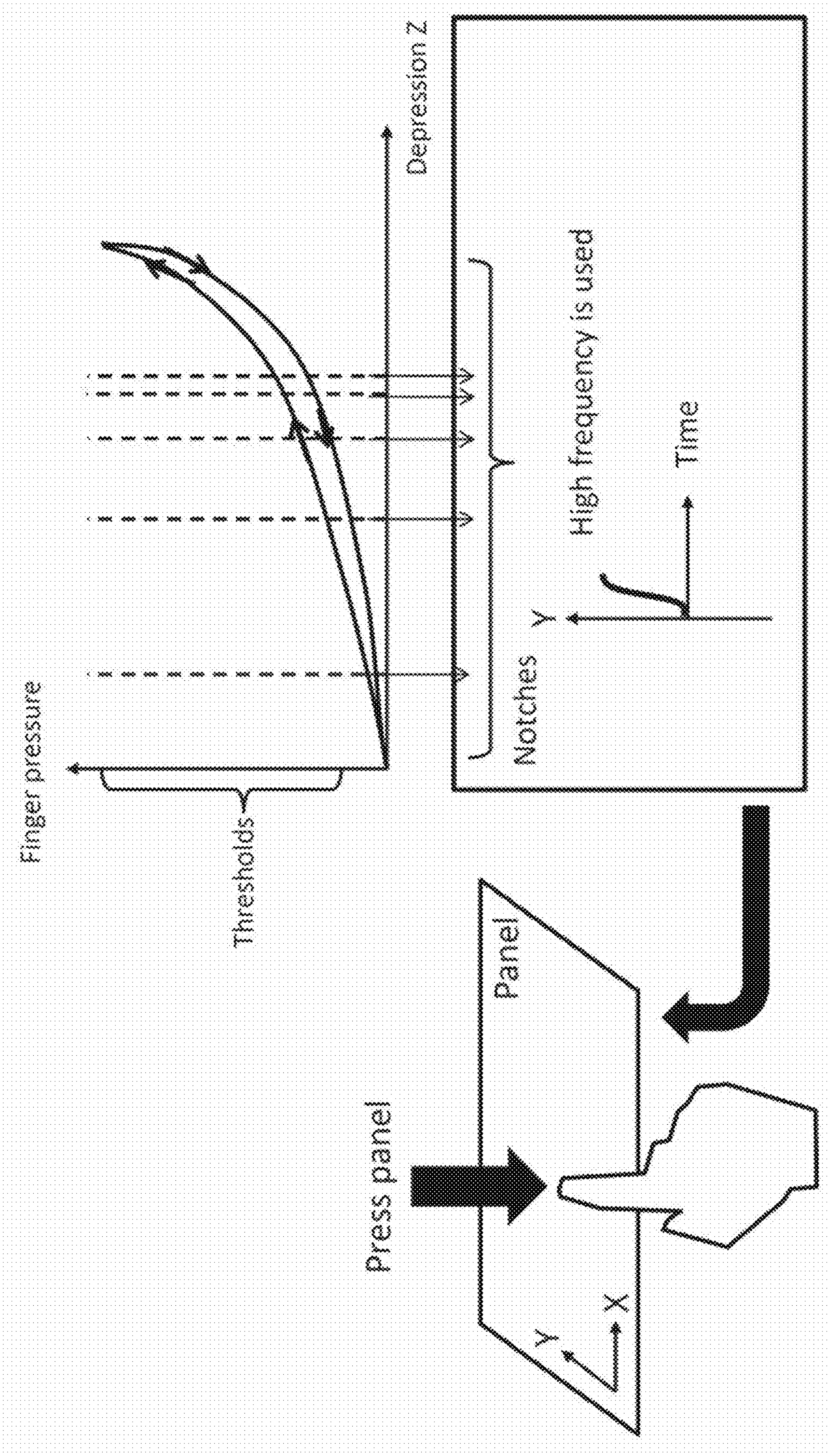

FIG. 325 Control of sense of depressing button (Equally spaced thresholds)
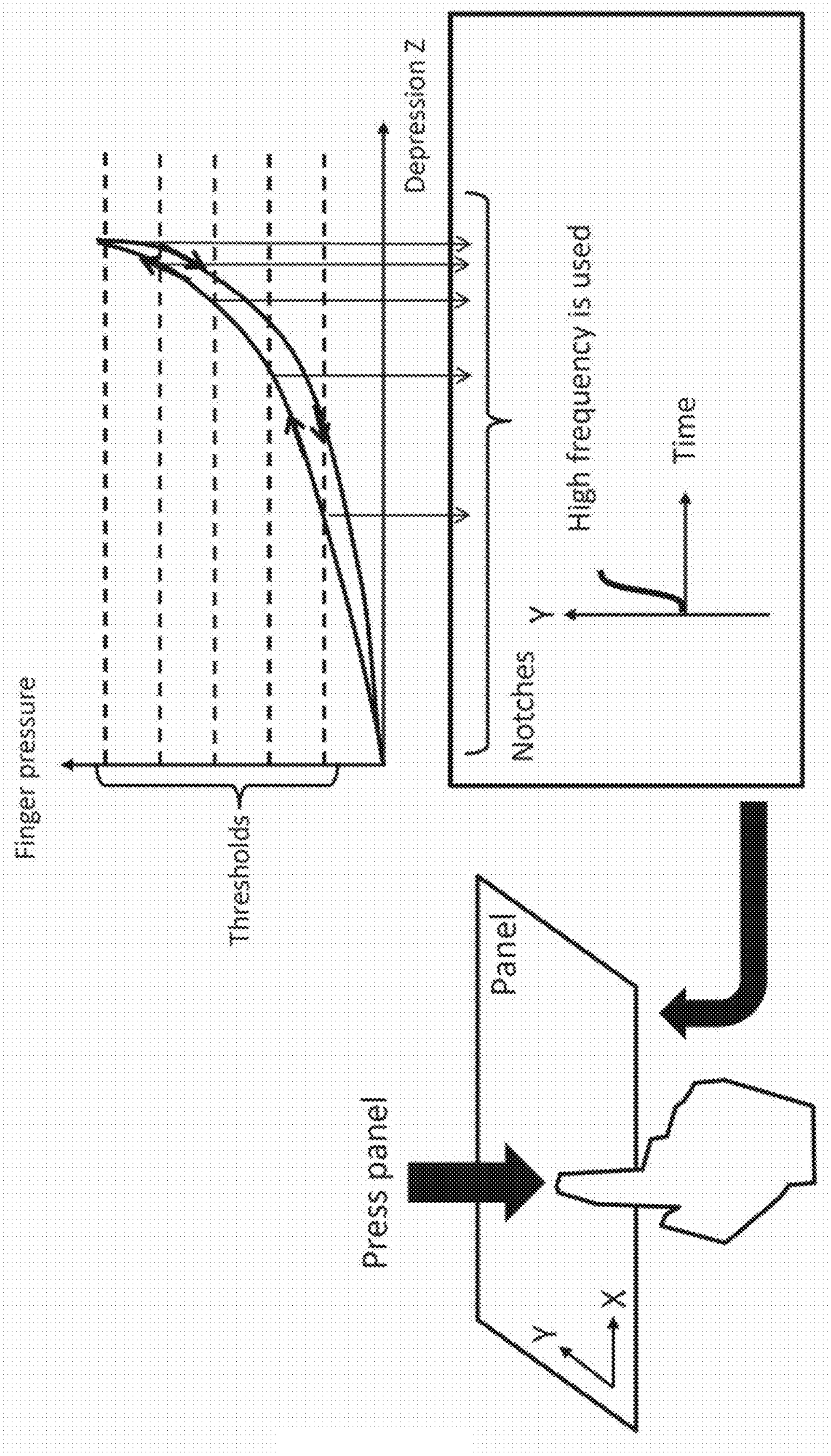

FIG. 326 Haptic sense dial
(Basic representation and control functions)
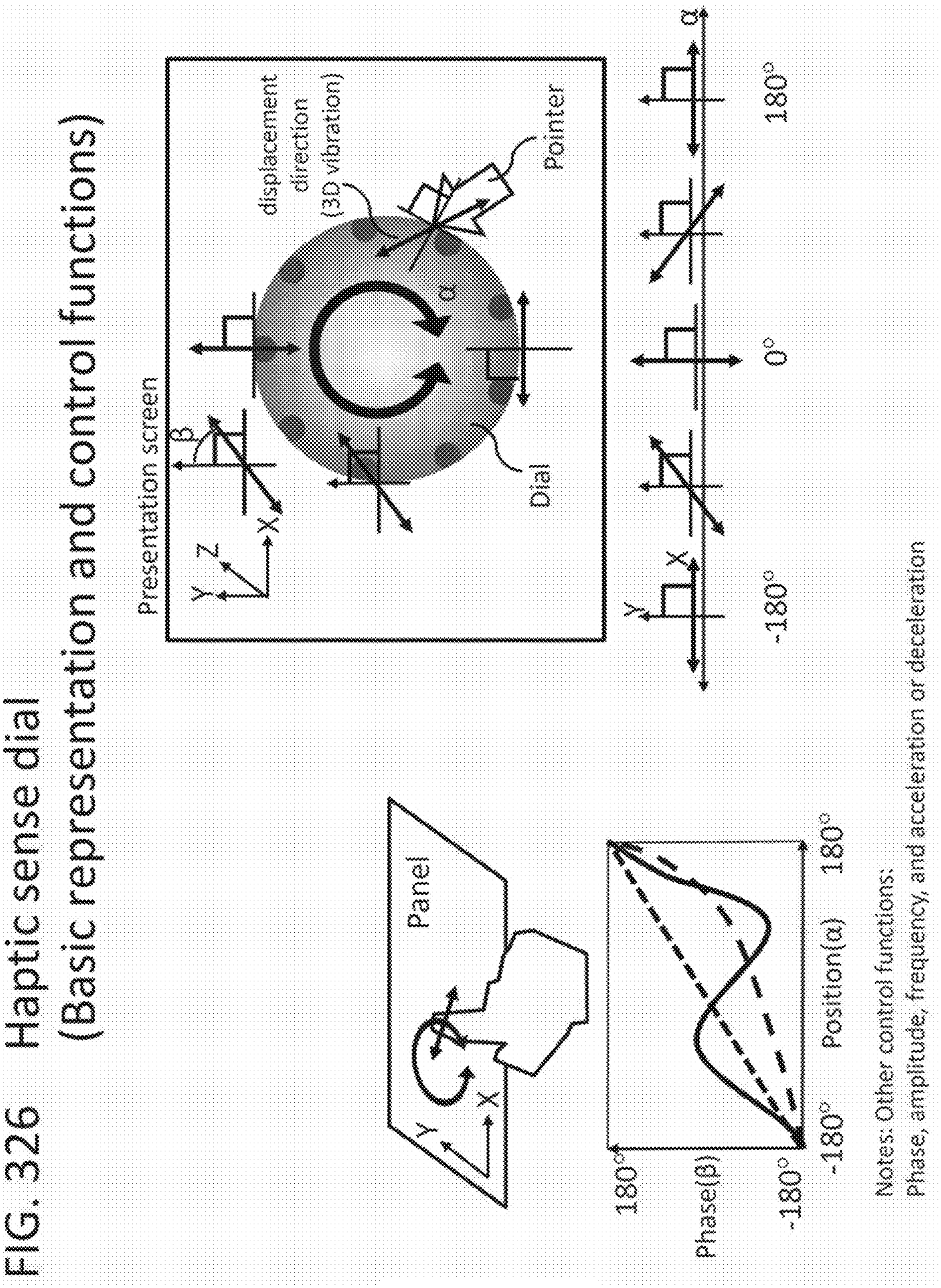

FIG. 327 Dial (Sense of acceleration)
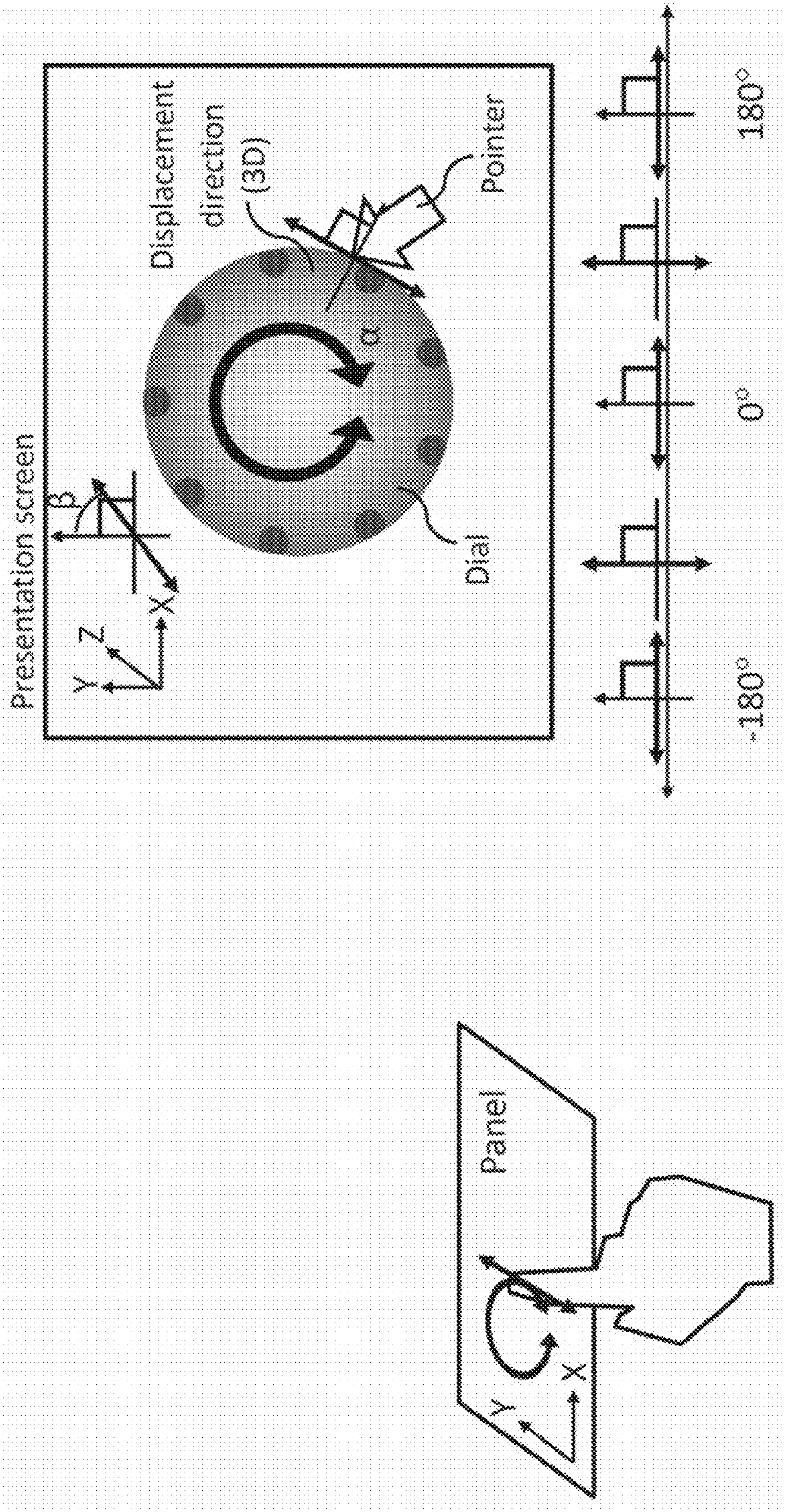

FIG. 328 Dial (Sense of resistance)
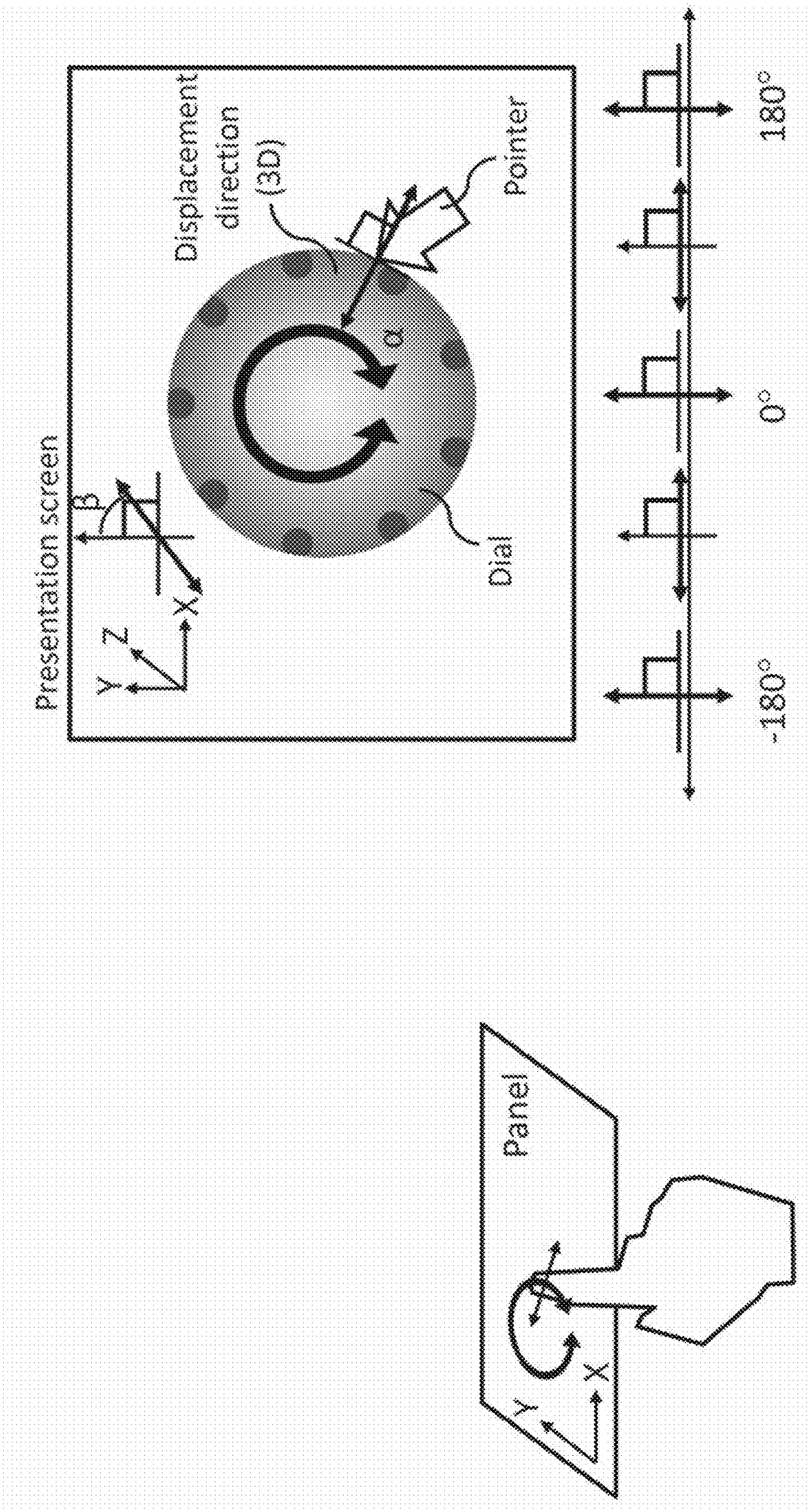

FIG. 329 Dial (Sense of horizontal acceleration)
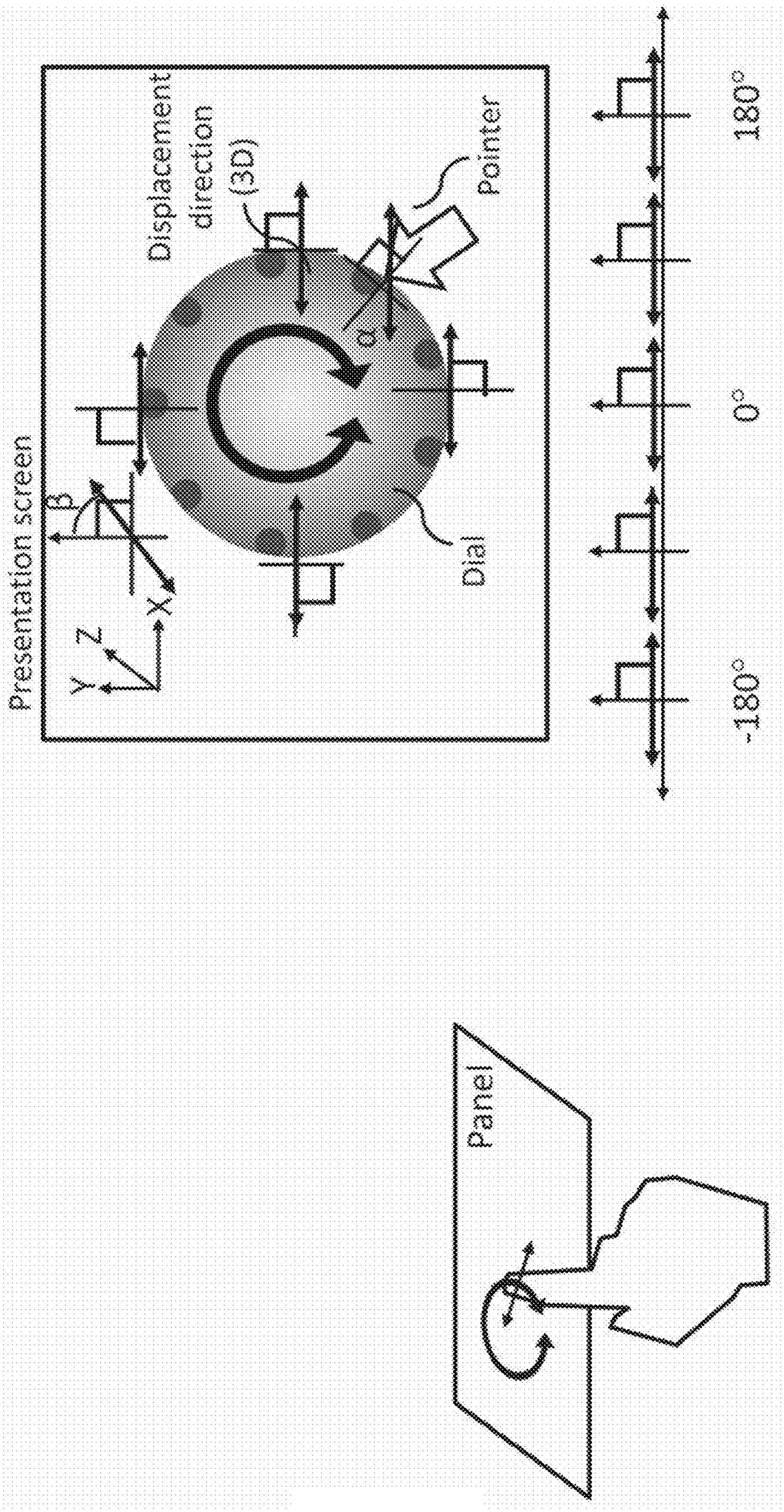

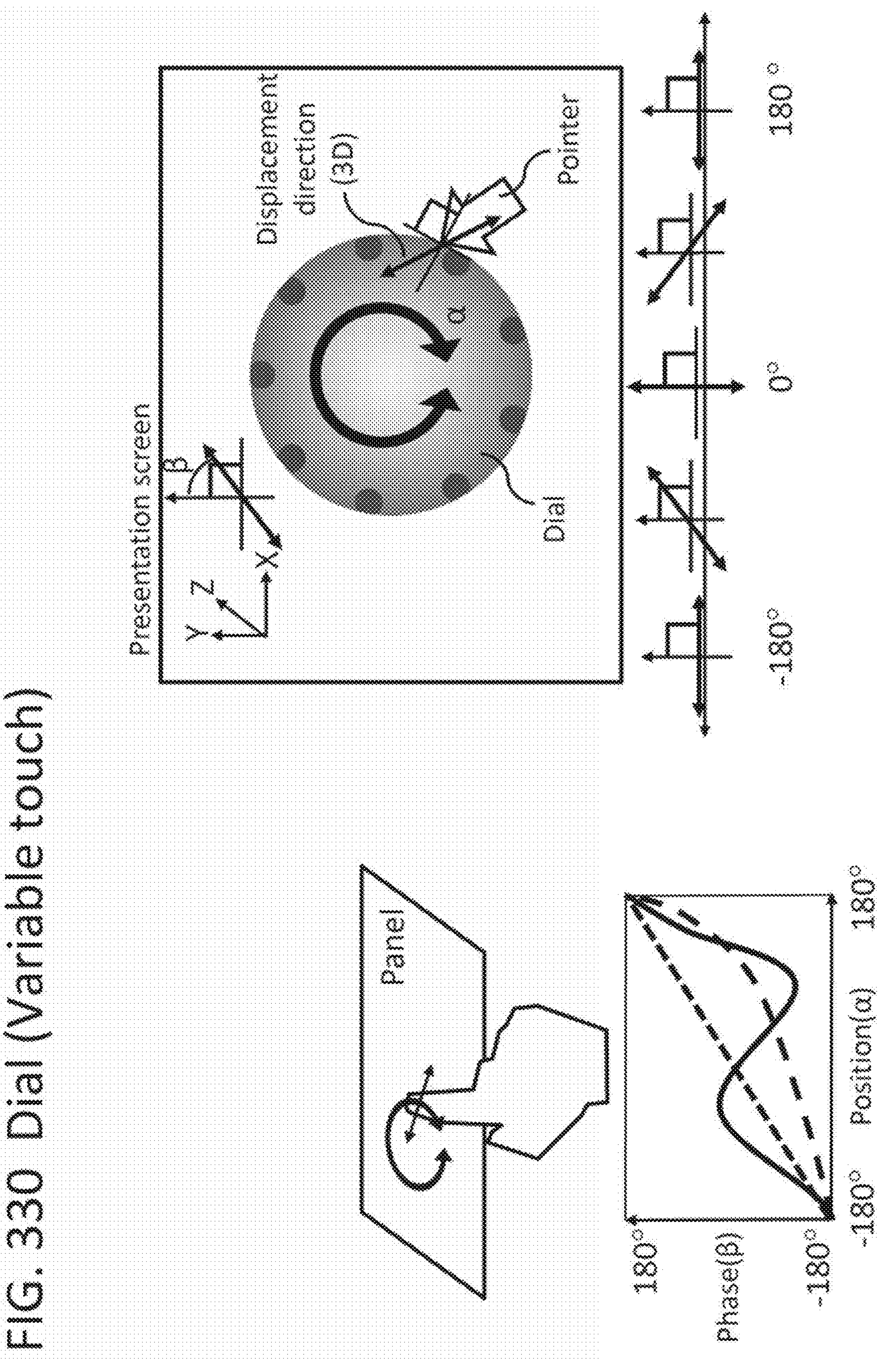
FIG. 330 Dial (Variable touch)

FIG. 331 Dial (Sense of randomness)
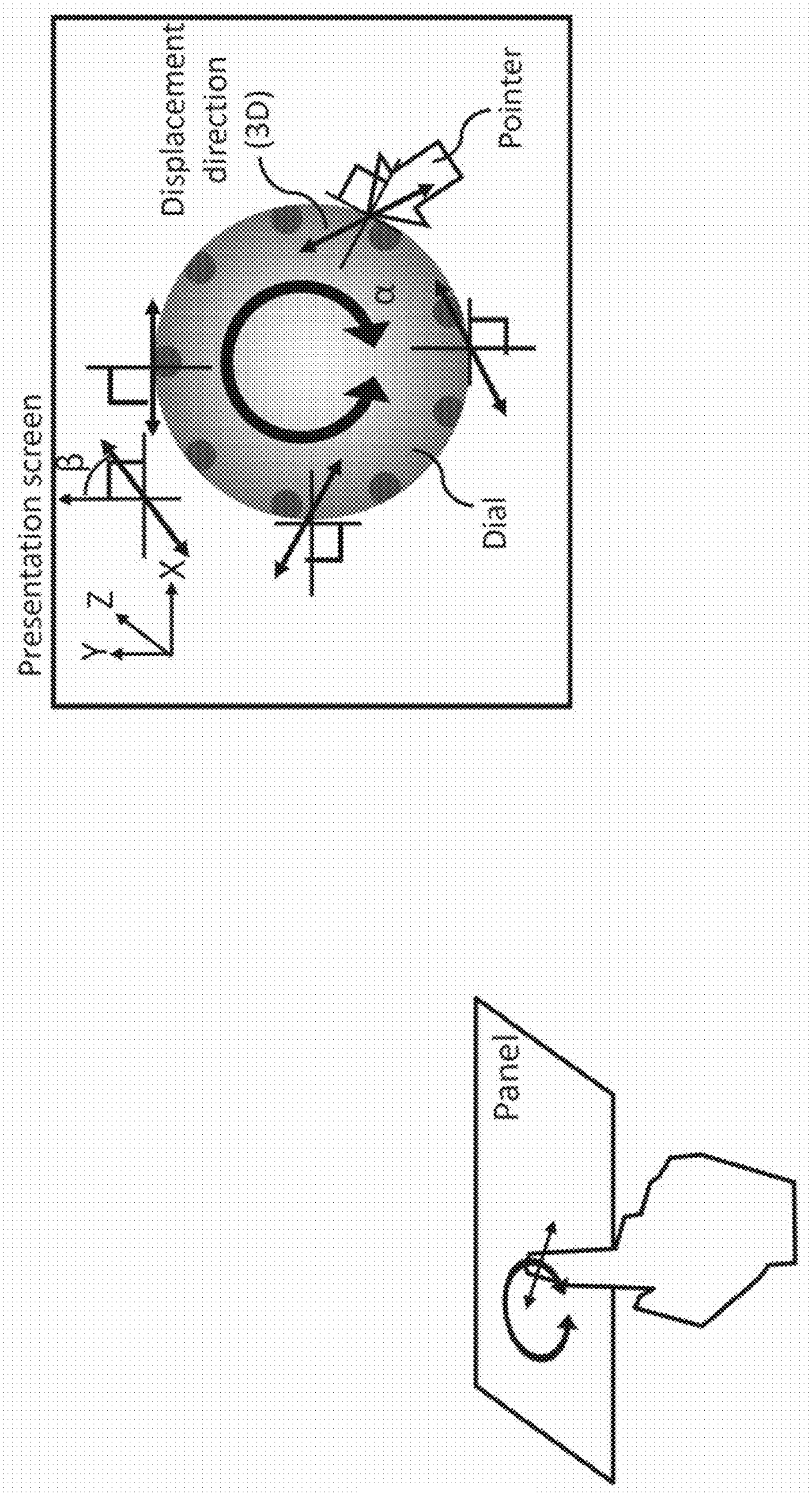

FIG. 332 Volume dial (Sense of click-clack)
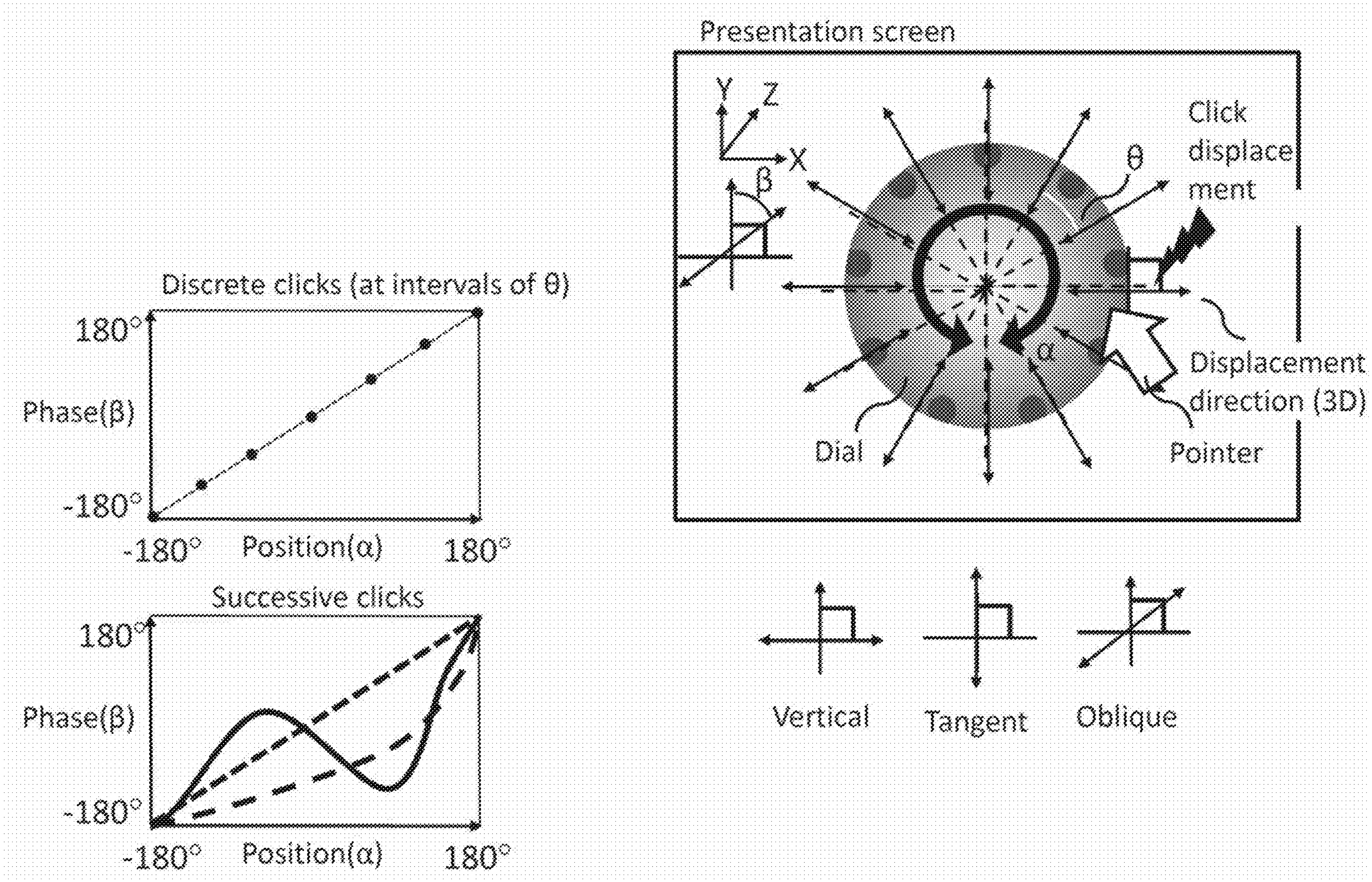

FIG. 333 Volume (Sense of receiving guidance on circumference of circle)
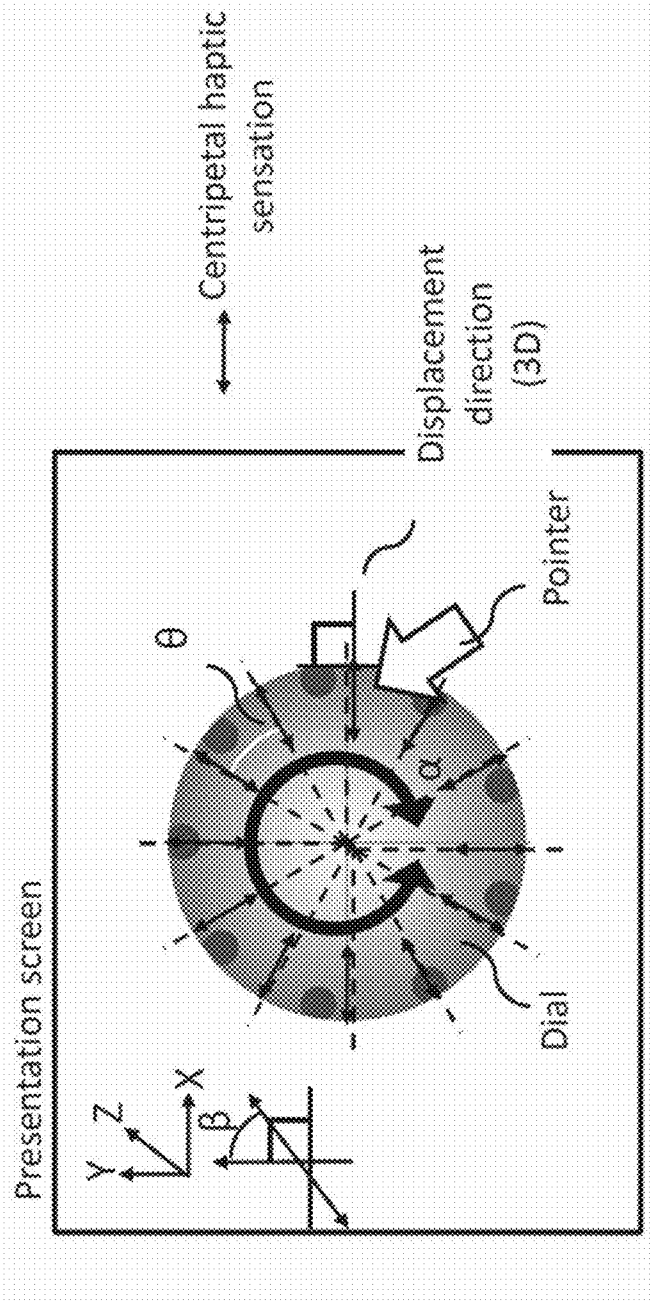

FIG. 334 Volume (Sense of receiving guidance on circumference of circle and sense of resistance)
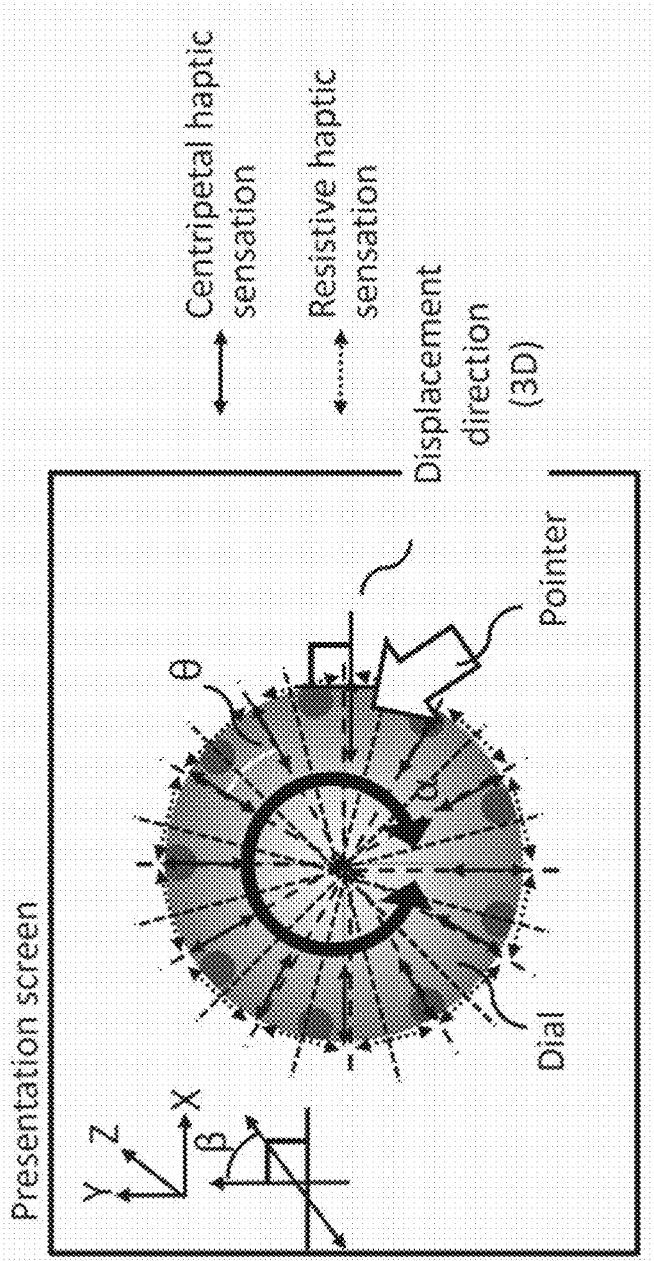

FIG. 335 Volume switch (Sense of decision)
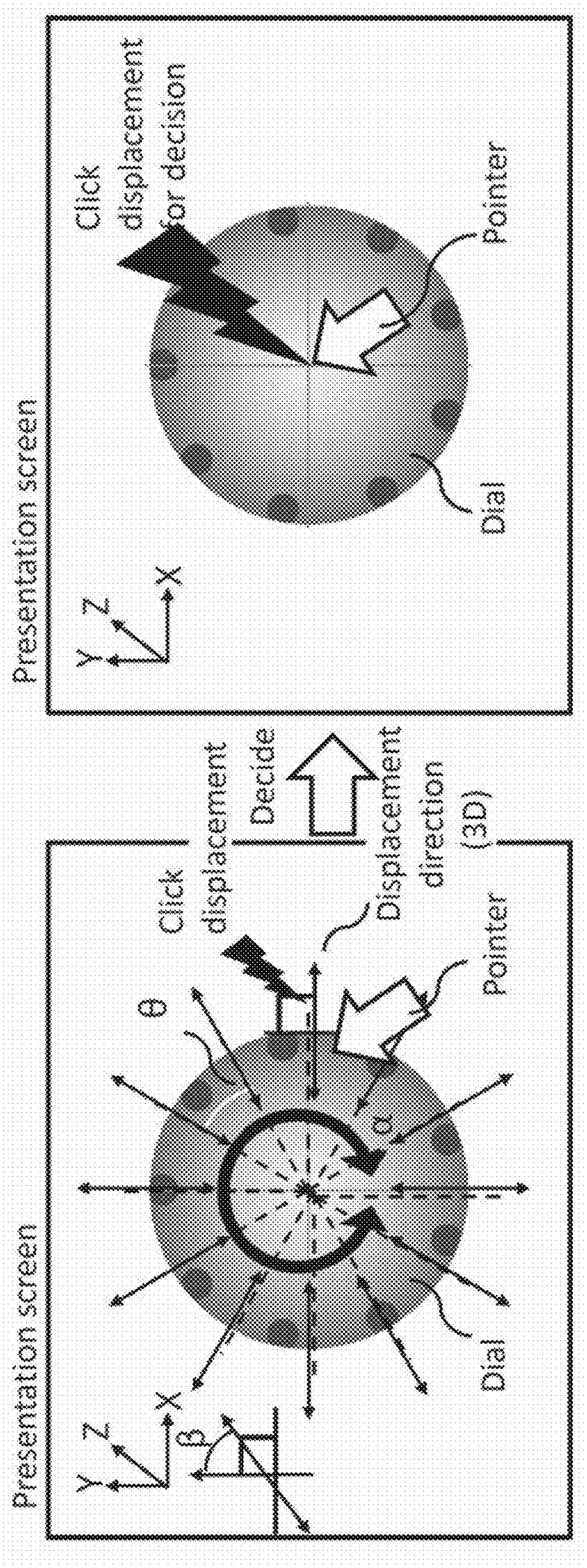

FIG. 336 Waveform control: variations of displacement direction
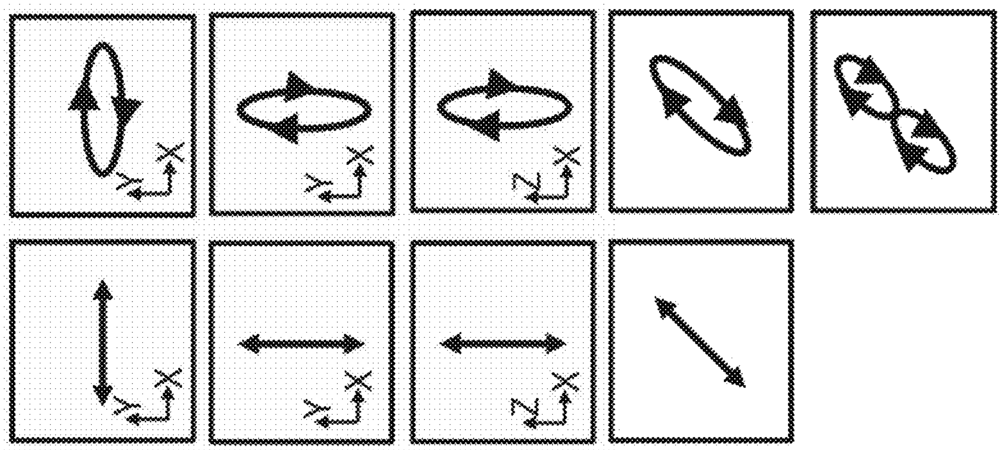

FIG. 337 Device size and shape characteristics
A haptic sense changes nonlinearly by weight (noise).
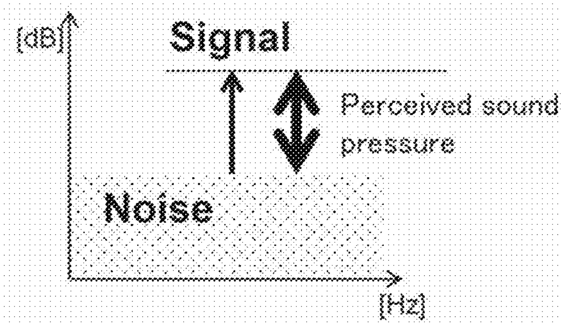
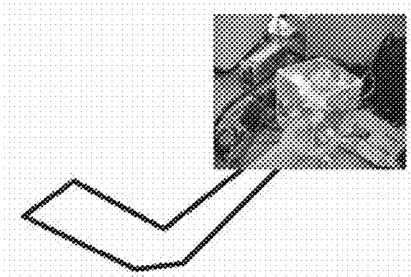
- Perceived sound pressure[dB] = Signal - Noise
- Perceived torque intensity[dB] ≈ torque - weight.

FIG. 338 Device size and shape characteristics
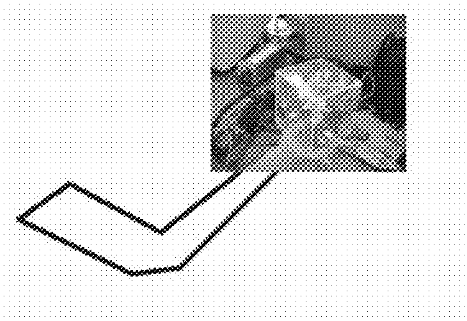
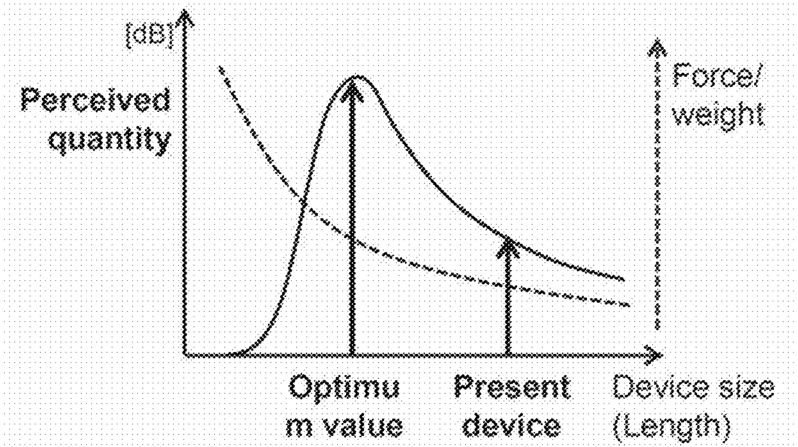
- Perceived torque Intensity[dB] ≈ torque − weight.
- Force/weight ∝ 1/length ∴ force ∝ length$^2$, weight ∝ length$^3$
- A perceived quantity has its own optimal device size.

FIG. 339 Structure of texture
Haptic quality is formed by the three primary sensory structures.
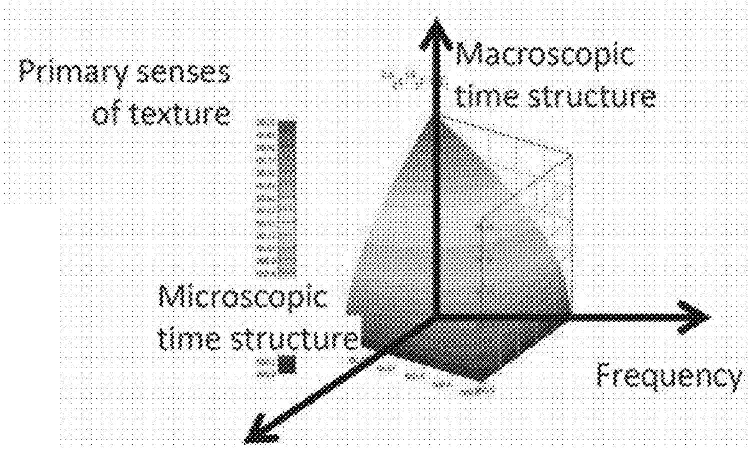
- Pressure sense (Sense of contact)
  - Pressure (DC), warm/cold
- Tactile sense
  - Microscopic time structure
- Force sense
  - Macroscopic time structure
- Vibration sense
  - Frequency (AC)

FIG. 340 Database of texture structure
Quality is represented by a variety of macroscopic and microscopic time structures.
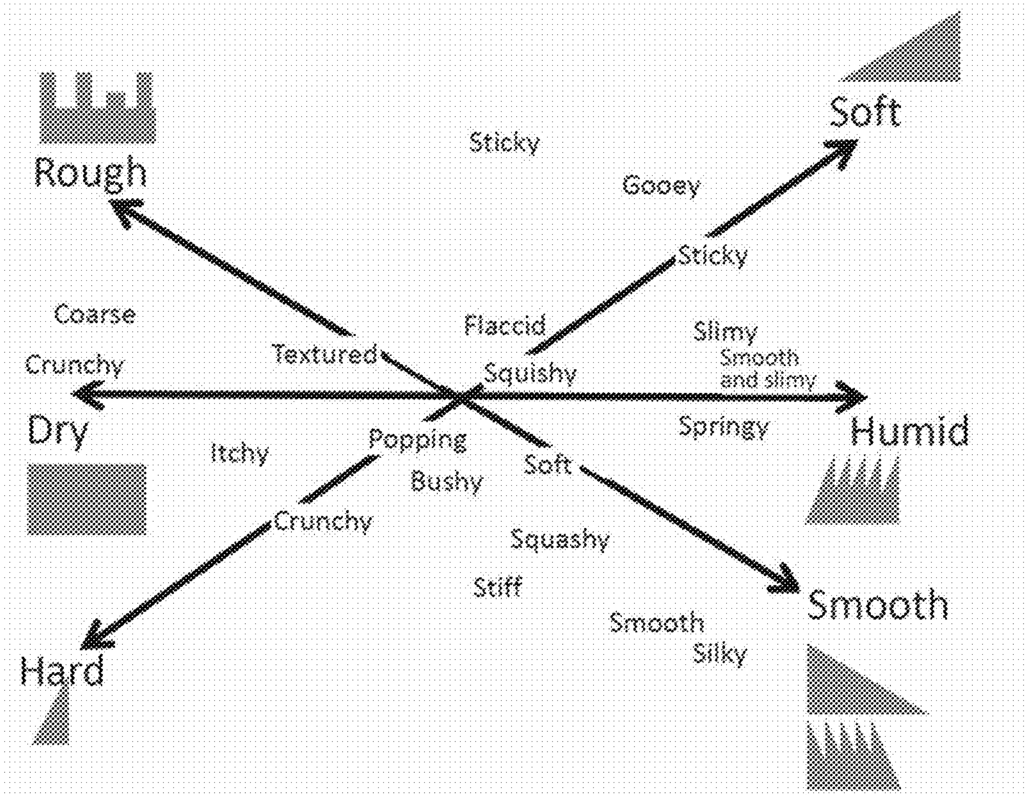

FIG. 341 Wavelength control: 2D amplitude direction control
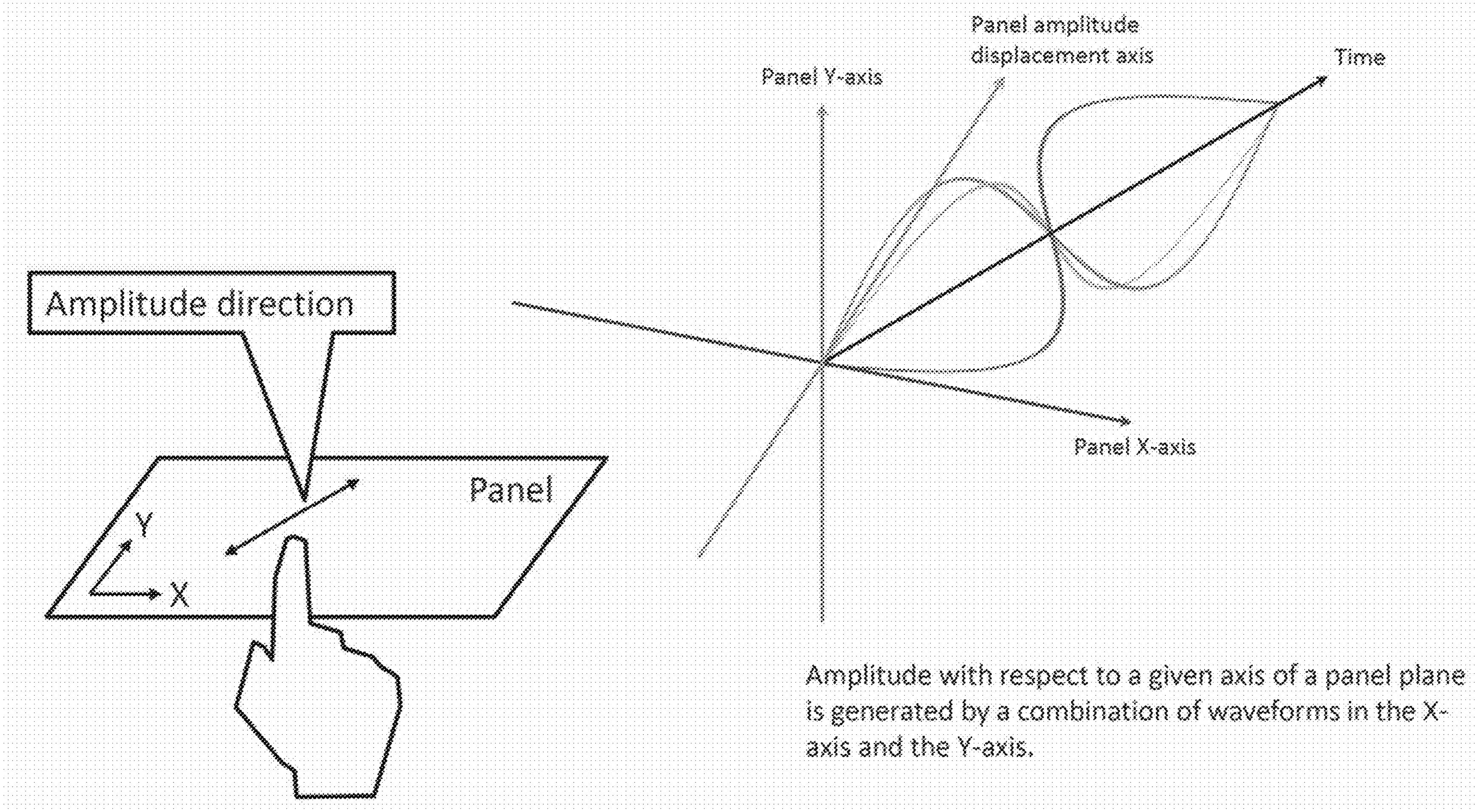
Amplitude with respect to a given axis of a panel plane is generated by a combination of waveforms in the X-axis and the Y-axis.

FIG. 342 Use example: digital mouse (Panel mouse)
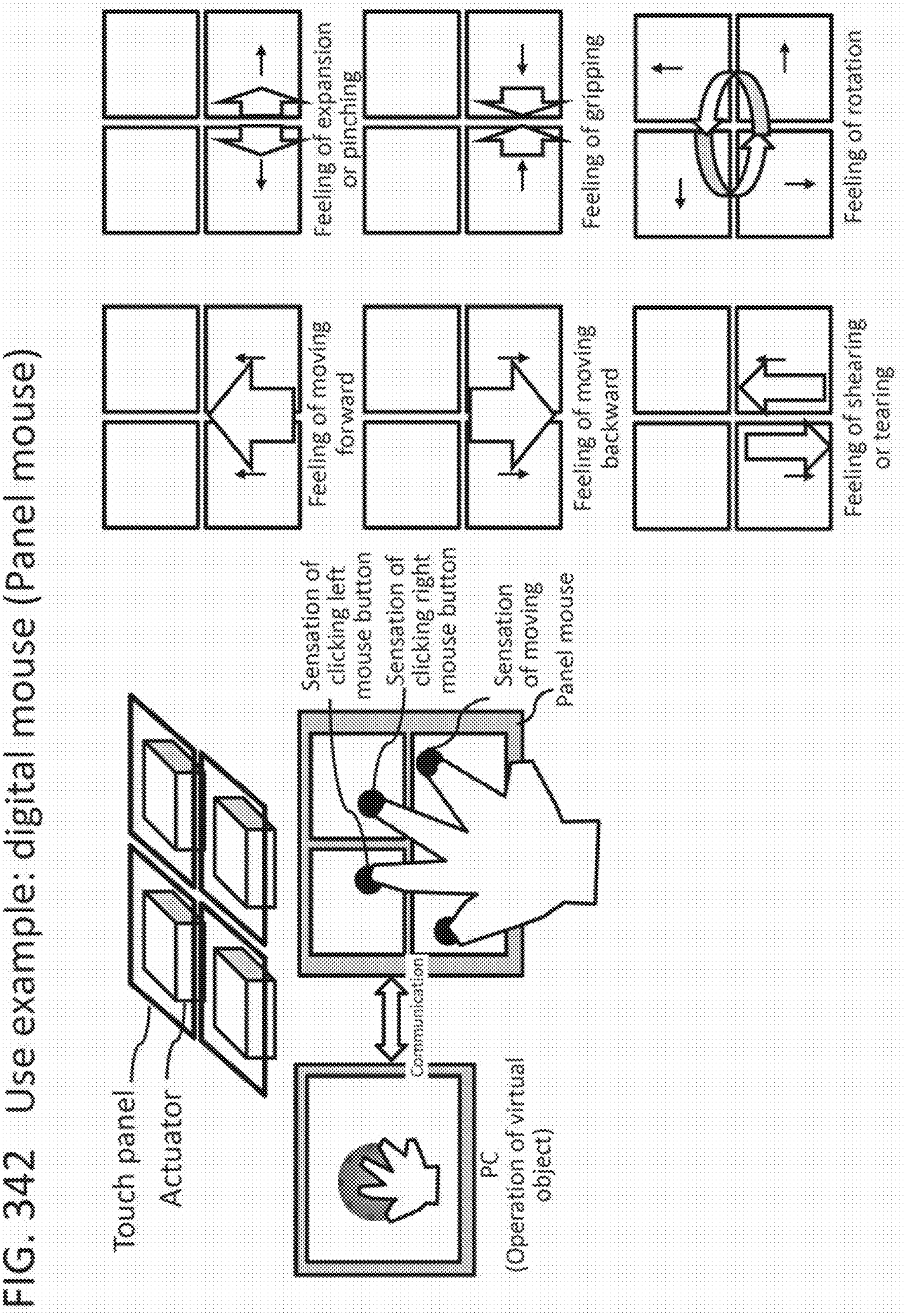

FIG.343 Measurement of individual properties
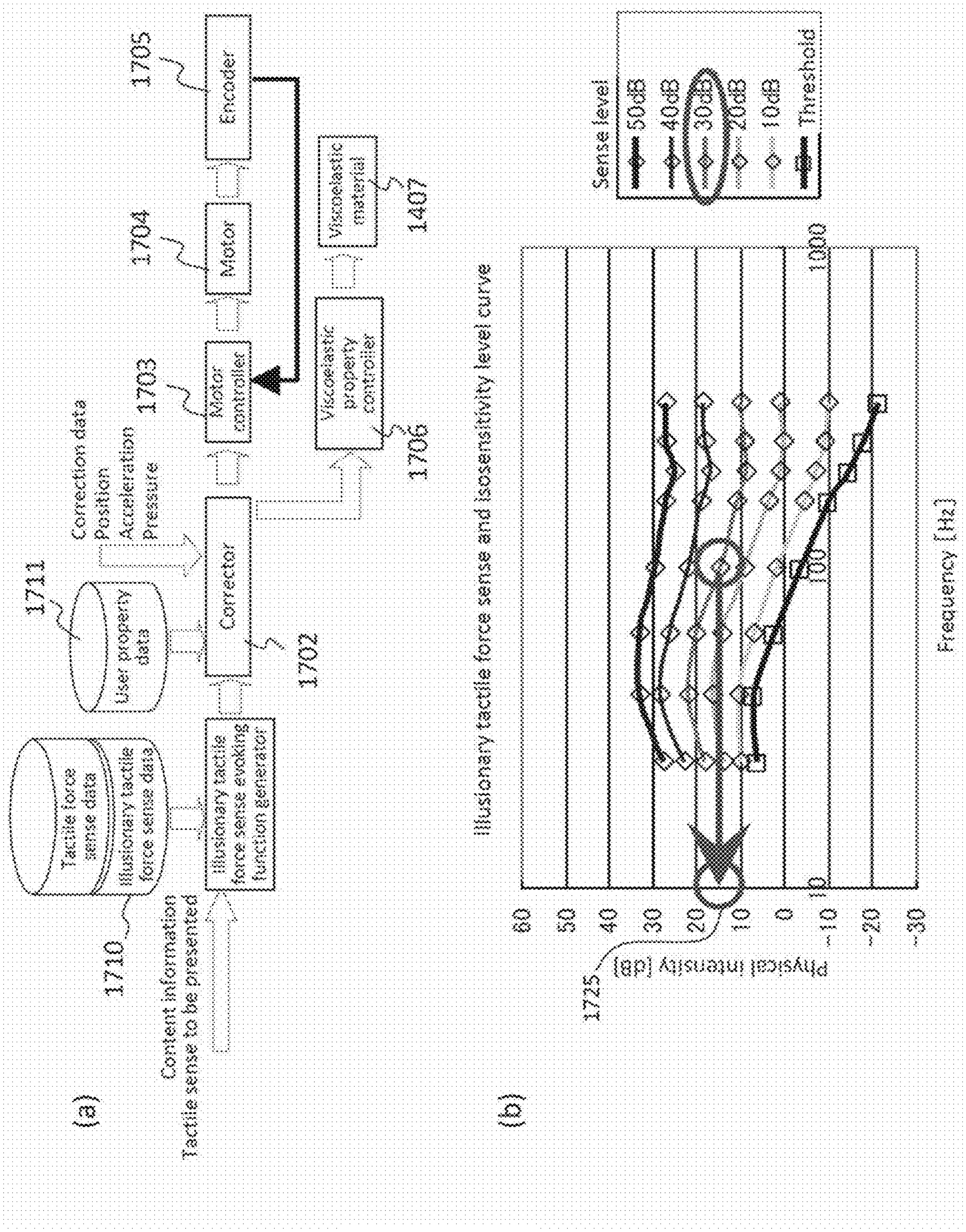

FIG. 344 Actuator control
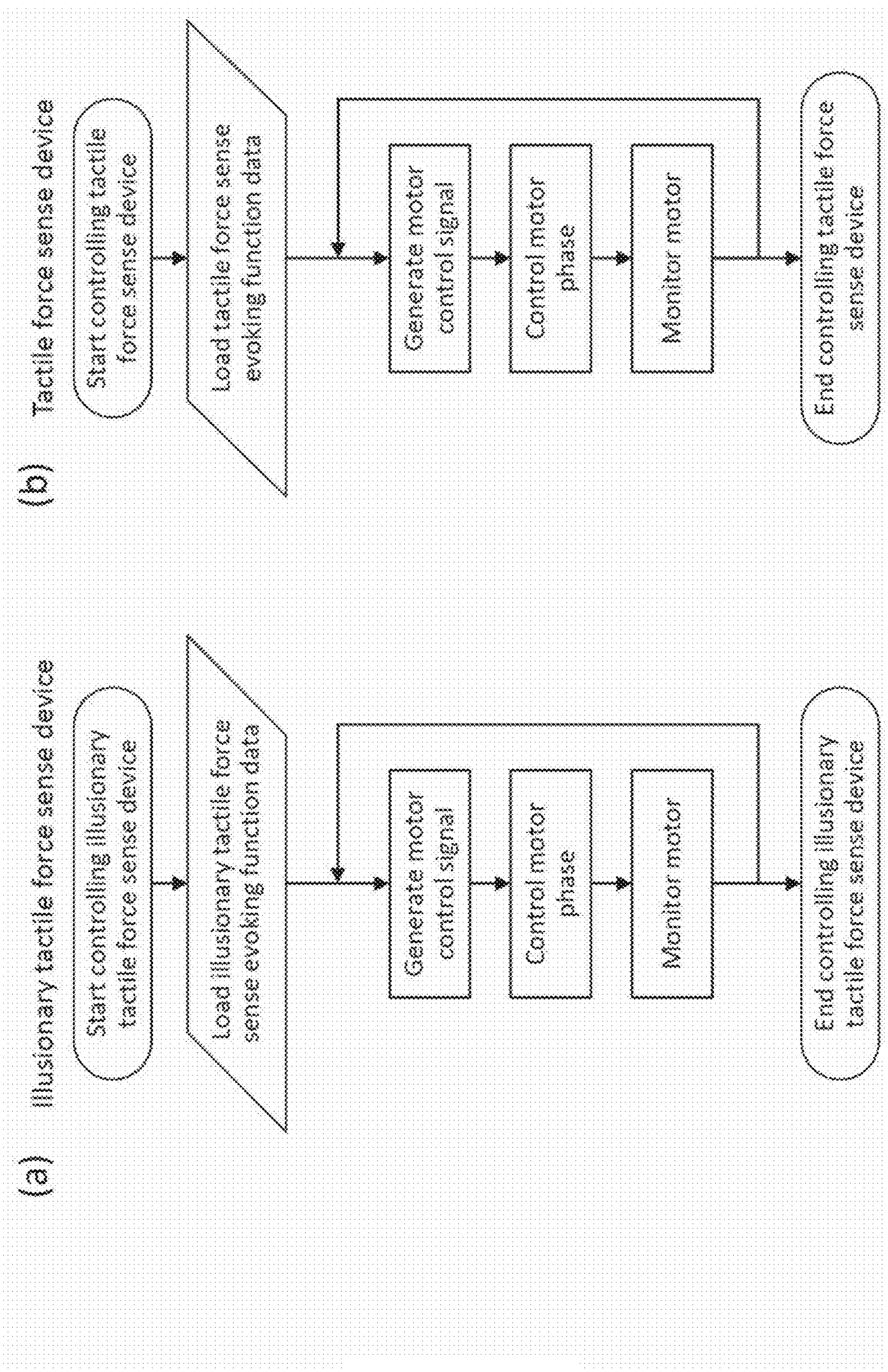

FIG. 345 Profiling
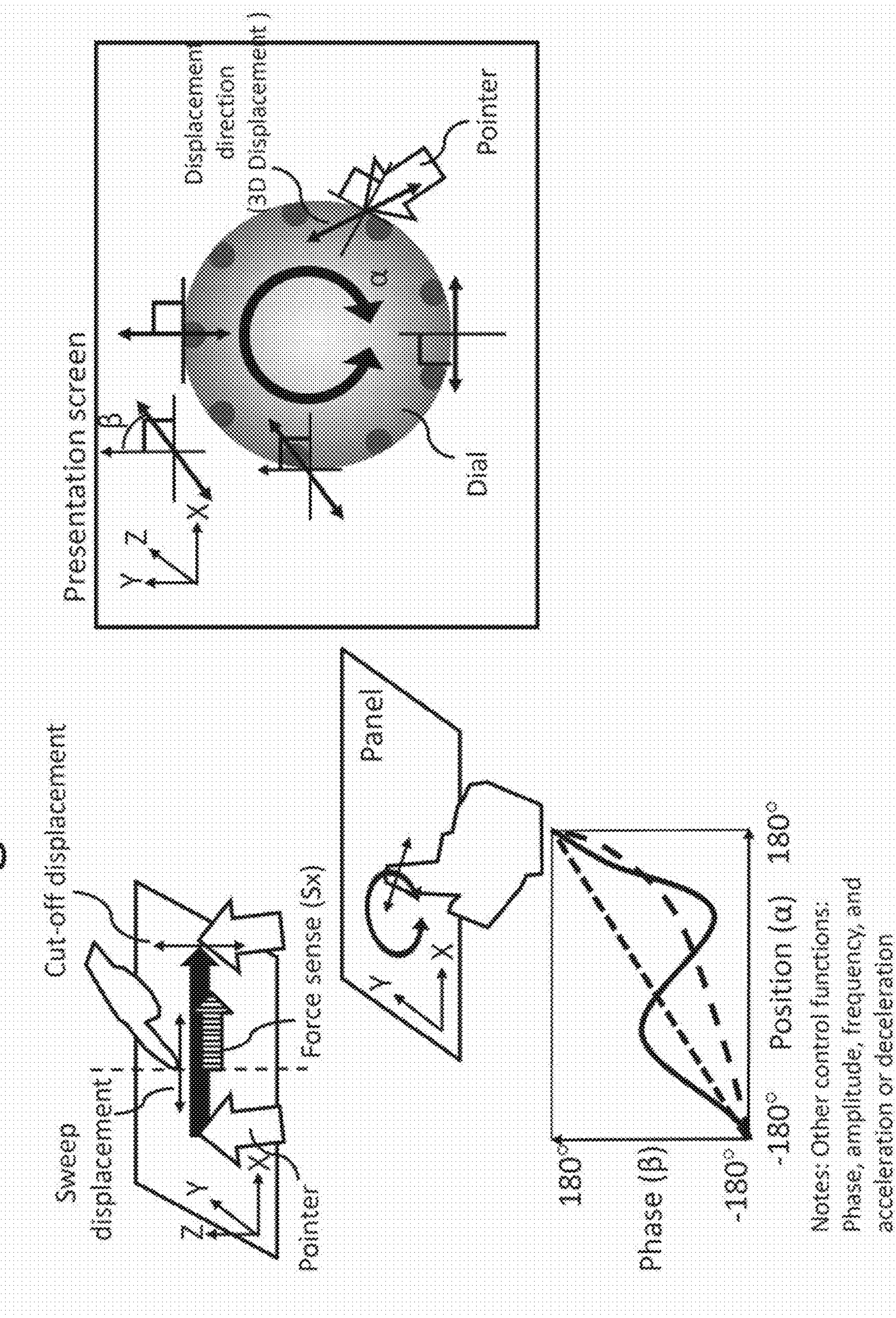

FIG. 346 Palpation simulator
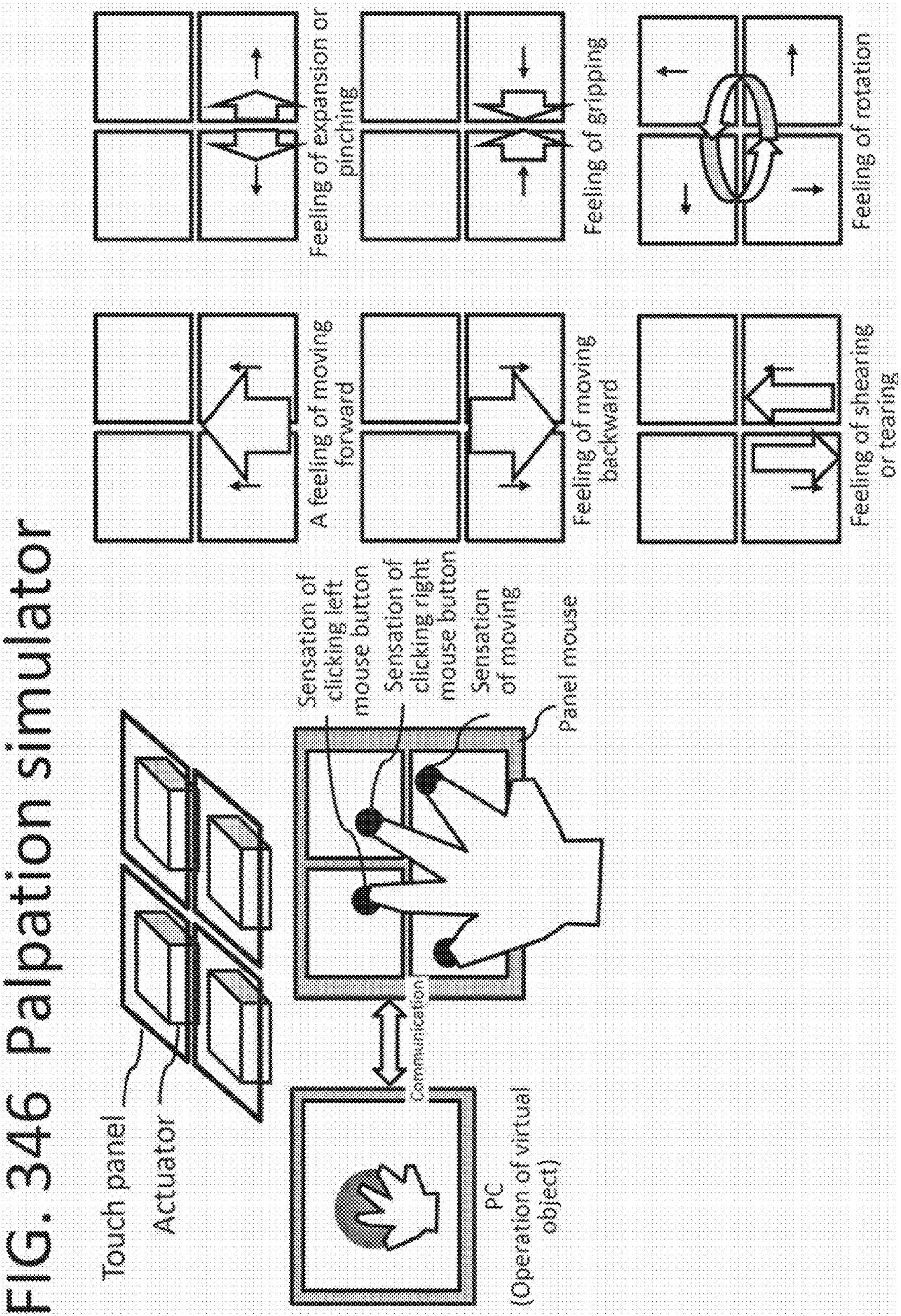

FIG. 347 Example of application (Remote synchronization)
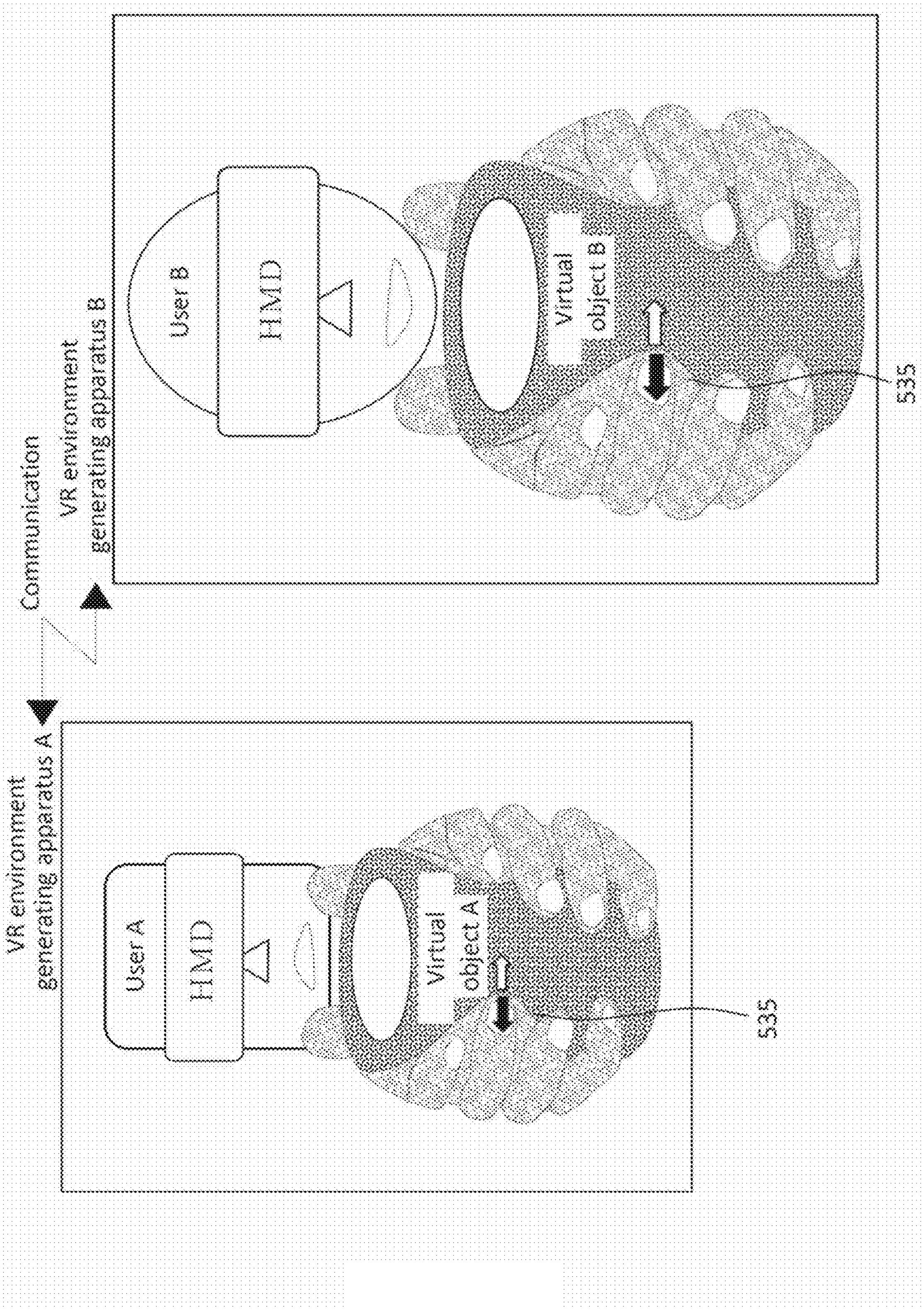

HAPTIC INFORMATION PRESENTATION SYSTEM AND METHOD

FIELD OF THE INVENTION

The present invention relates to a haptic information presentation system and method, which uses sensory characteristics.

More particularly, the invention relates to a haptic information presentation system, a haptic information presentation method, a haptic presentation device of a haptic information presentation system, and a control device of a haptic information presentation system, which is for providing a man-machine interface mounted on an equipment used in the field of VR (Virtual Reality), an equipment used in the field of game, a cellular phone, a portable navigation equipment, a PDA (Personal Digital Assistant) or the like.

BACKGROUND

With respect to a conventional haptic device in the VR, in the haptic presentation of a tensile force or reaction force, a haptic presentation part in contact with a human sense organ and a haptic presentation system main body are connected to each other by a wire or an arm, and there has been a disadvantage that the existence of the wire, arm or the like restricts the human motion. Besides, since use is limited to an effective space in which the haptic presentation system main body and the haptic presentation part are connected to each other by the wire or the arm, there has been a limitation in the expanse of the space which can be used.

On the other hand, a man-machine interface which is of a non-grounding type and has no reaction base on the human body has been proposed. However, in this type of presentation device, the rotation velocity (angular velocity) of a motor is controlled so that a torque is presented by a temporal change of an angular momentum vector, and it has been difficult to continuously present haptic information of torque, force or the like in the same direction.

As a non-grounding type haptic information presentation device, a torque presentation apparatus using a gyro moment and a gimbal structure has been developed (non-patent document 1). However, in the gimbal structure, there are problems that the direction of a torque which can be presented is limited, the structure becomes complicated, and the control becomes troublesome.

On the other hand, a non-grounding mobile haptic information presentation device (non-patent document 2) has been proposed in which a torque in an arbitrary direction or with an arbitrary magnitude can be presented by independently controlling the rotations of three gyro motors arranged in three-axis orthogonal coordinates. In this haptic information presentation device, since the torque is generated by controlling a resultant angular momentum vector generated by the three gyro motors, the structure is relatively simple and the control is also easy. However, there are such problems to be solved that haptic information is made to be capable of being continuously presented, and a force sensation other than the torque is made to be capable of being presented.

[Non-patent document 1] Masayuki Yoshie, Hiroaki Yano, Hiroo Iwata "Development of Non-grounded Force Display Using Gyro Moment", Research Report Collection (Kenkyu Hokokusho) of Human Interface Society, vol. 3, No. 5, pp. 25-30 (2000)

[Non-patent document 2] Yokichi Tanaka, Masataka Sakai, Yuka Kohno, Yukio Fukui, Juli Yamashita, Norio Nakamura, "Mobil Torque Display and Haptic Characteristics of Human Palm", INTERNATIONAL CONFERENCE ON ARTIFICIAL REALITY AND TELEXISTENCE, pp. 115-120 (2001/12)

SUMMARY

Various deficiencies in the prior art are addressed by embodiments for haptic information presentation.

A haptic communication apparatus according to one embodiment is adapted to perform transmission and/or reception of information. The haptic communication apparatus comprises a haptic presentation device. The haptic presentation device is adapted to control a physical quantity utilizing a haptic sensory characteristic representing a relationship between the physical quantity to be applied to a human body and a sensory quantity to be perceived by the human body, and thereby to present haptic information.

BRIEF DESCRIPTION OF THE DRAWINGS

The teachings herein can be readily understood by considering the following detailed description in conjunction with the accompanying drawings, in which:

FIG. 50 is an explanatory system configuration for haptic sense display.

FIG. 106 is an explanatory view showing points of illusion phenomenon.

FIG. 107 is an explanatory view showing a basic module of a haptic sense device.

FIG. 109 is an explanatory view showing a haptic sense device (compatible with real time).

FIG. 111 is an example of a panel-type module.

FIG. 112 is an example of a panel-type module (photo implanter).

FIG. 113 is an example of a panel-type module (suspended and isolated).

FIG. 114 is an example of a panel type module (suspended/isolated).

FIG. 115 is an example of a panel (floating inertial actuator).

FIG. 116 is an example of a liquid crystal touch panel-type module.

FIG. 120 is an explanatory view showing multi-modal effect.

FIG. 121 is an example of a multi-touch array unit.

FIG. 122 is an explanatory view showing sense-combining control (physical and between organs).

FIG. 123 is an explanatory view showing multi-touch sense-combining control (sense and perception).

FIG. 124 is an explanatory view showing sense-combining control (a tactile sense and a force sense).

FIG. 125 is an explanatory view showing sense-combining control (a tactile sense and a force sense).

FIG. 126 is an explanatory view showing sense-combining control (a tactile sense and a force sense).

FIG. 127 is an explanatory view showing sense-combining control (forward and backward effects).

FIG. 128 is an explanatory view showing sense-combining control (a tactile sense and a force sense, and overlapping).

FIG. 129 is an explanatory view showing sense-combining control (difference/comparison).

FIG. 130 is an explanatory view showing sense-combining control (difference/comparison).

FIG. 131 is an explanatory view showing generation of a sense of button shape (sense of touching mountain-like protrusion).

FIG. 132 is an explanatory view showing generation of a sense of button shape (sense of touching semi-cylindrical protrusion).

FIG. 133 is an explanatory view showing generation of a sense of button touch (sense of being in recessed gap).

FIG. 134 is an explanatory view showing control of a sense of receiving guidance at a position between buttons (sense of crossing).

FIG. 135 is an explanatory view showing control of a sense of receiving guidance at a position between buttons (sense of being at an edge point).

FIG. 136 is an explanatory view showing control of a sense of receiving guidance at a position between buttons (Sense of touching an edge).

FIG. 137 is an example of a slider (control of a haptic sense).

FIG. 138 is an example of a slider (control of a haptic sense).

Figure 139:
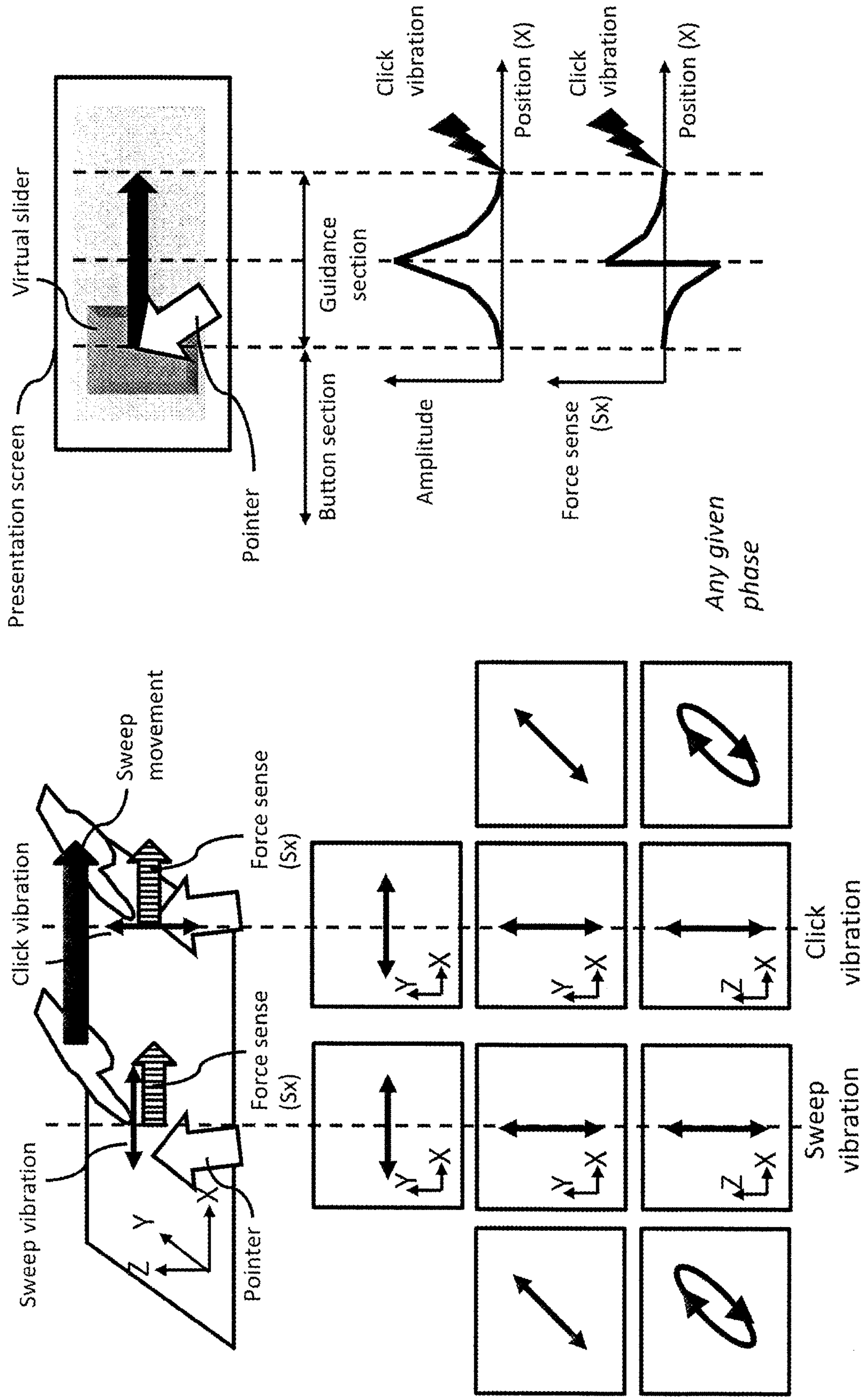

FIG. 139 is an example of a slider (control of a sense).

Figure 140:
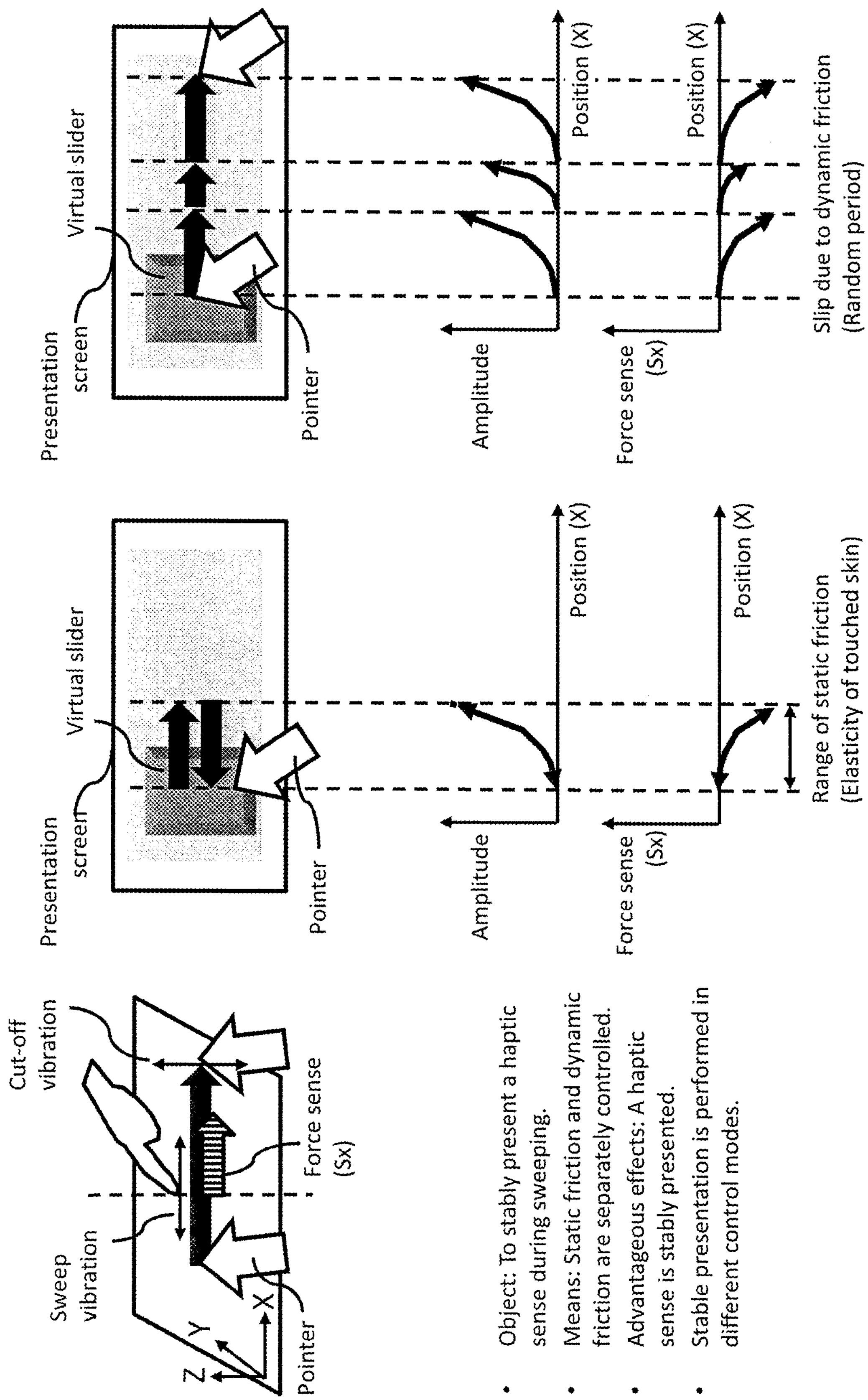

FIG. 140 is an explanatory view showing control of static friction and dynamic friction.

FIG. 141 is an explanatory view showing control of dynamic friction (to achieve iso-period).

FIG. 142 is an explanatory view showing control of static friction.

FIG. 143 is an explanatory view showing control of static friction.

FIG. 144 is an explanatory view showing control of static friction.

FIG. 145 is an explanatory view showing control of dynamic friction.

FIG. 146 is an explanatory view showing control of a sense of depressing a button.

FIG. 147 is an explanatory view showing control of a sense of depressing a button (double trigger).

Figure 148:
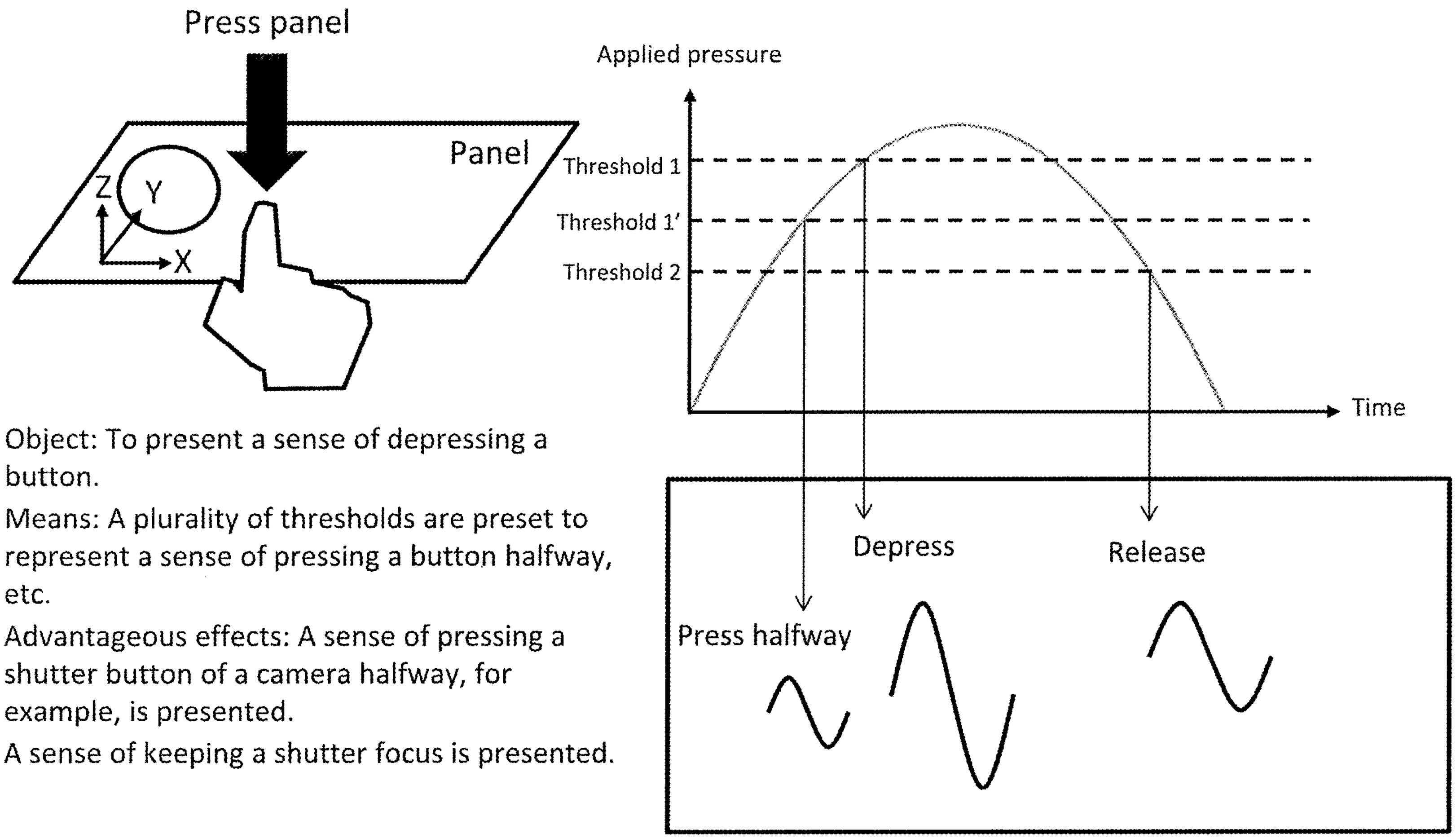

FIG. 148 is an explanatory view showing control of a sense of depressing a button.

Figure 149:
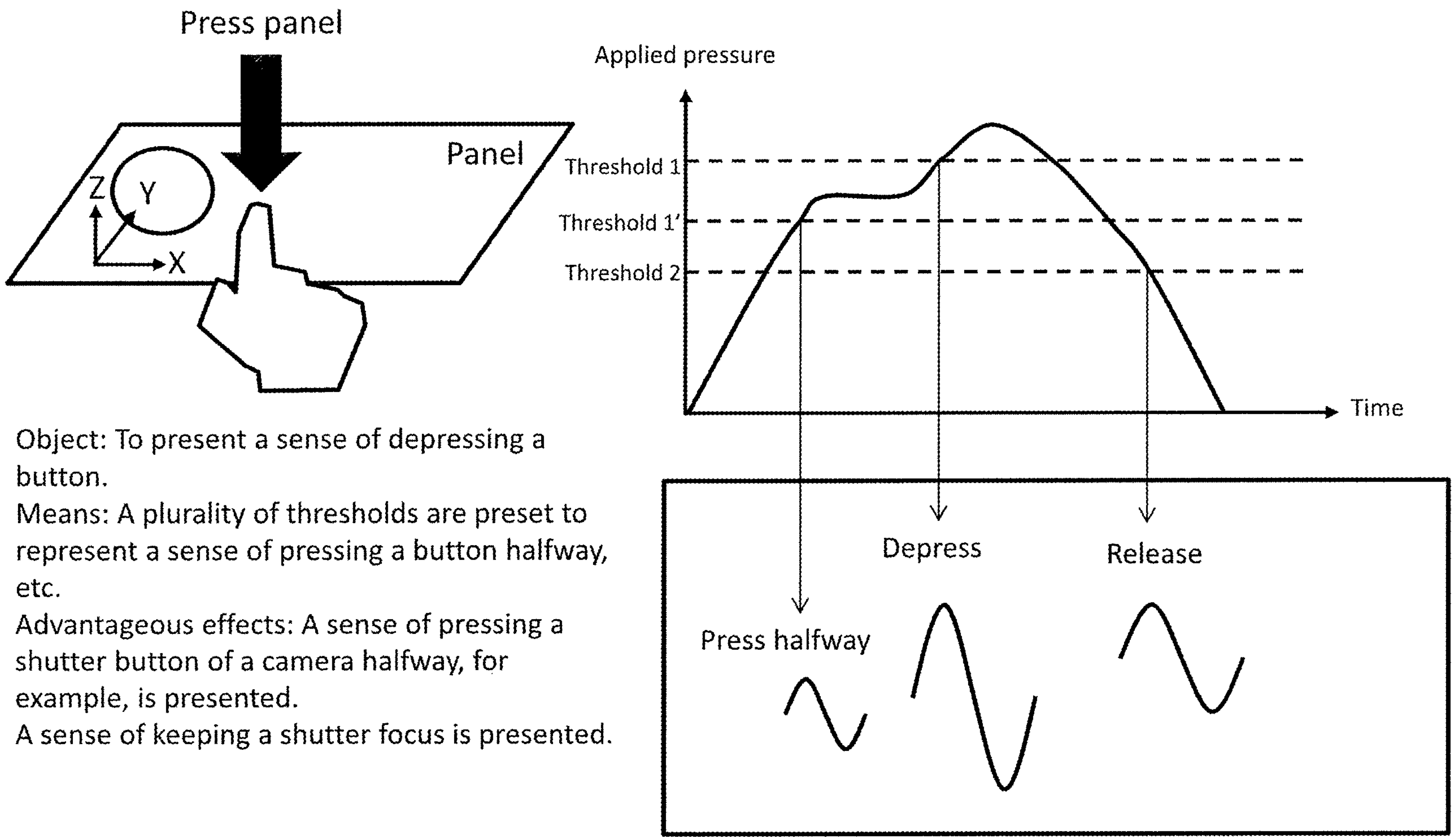

FIG. 149 is an explanatory view showing control of a sense of depressing a button (shutter button).

Figure 150:
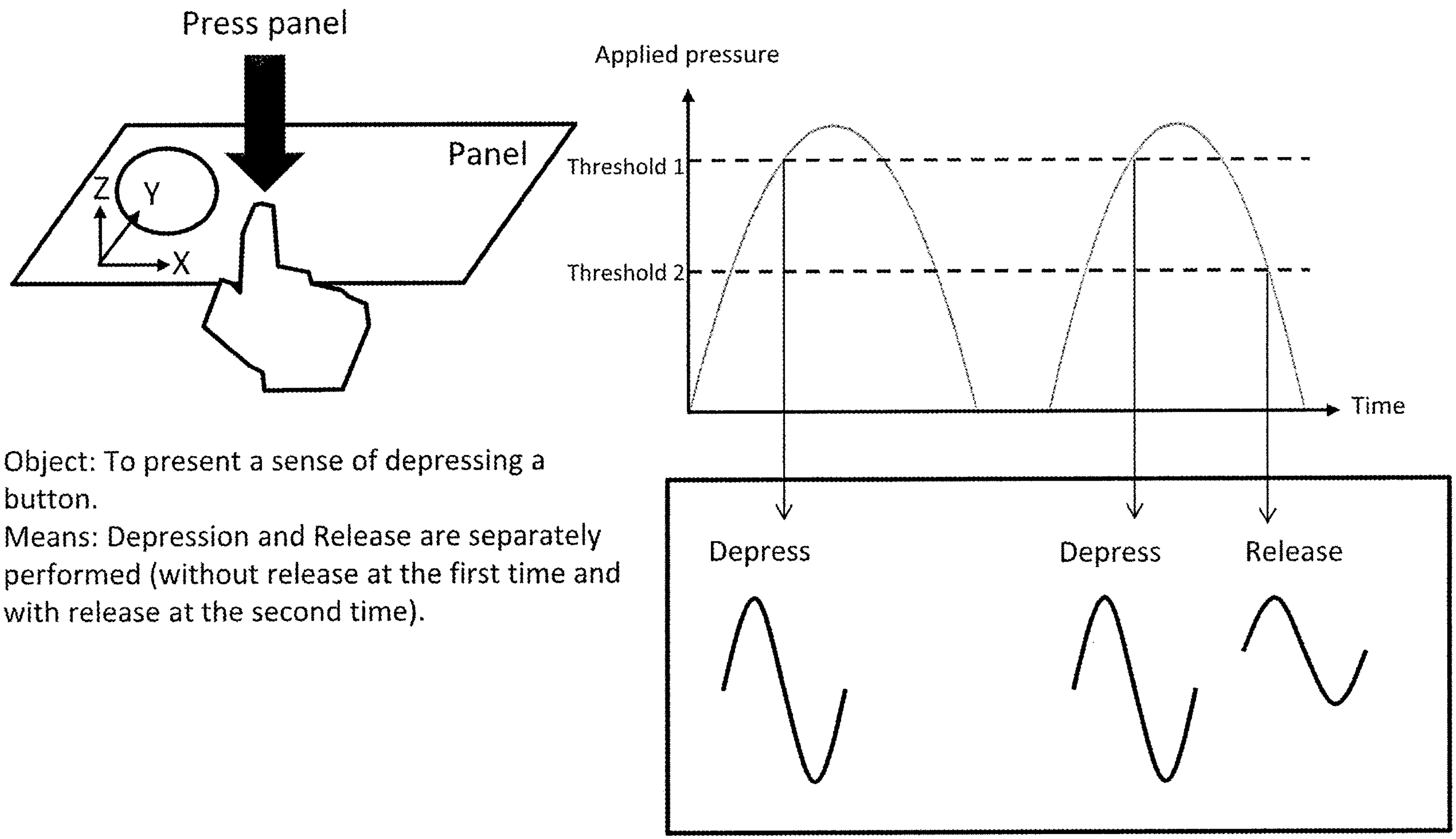

FIG. 150 is an explanatory view showing control of a sense of depressing a button.

FIG. 151 is an explanatory view showing control of a sense of depressing a button (latch).

FIG. 152 is an explanatory view showing control of a sense of depressing a button (equally spaced thresholds).

Figure 153:
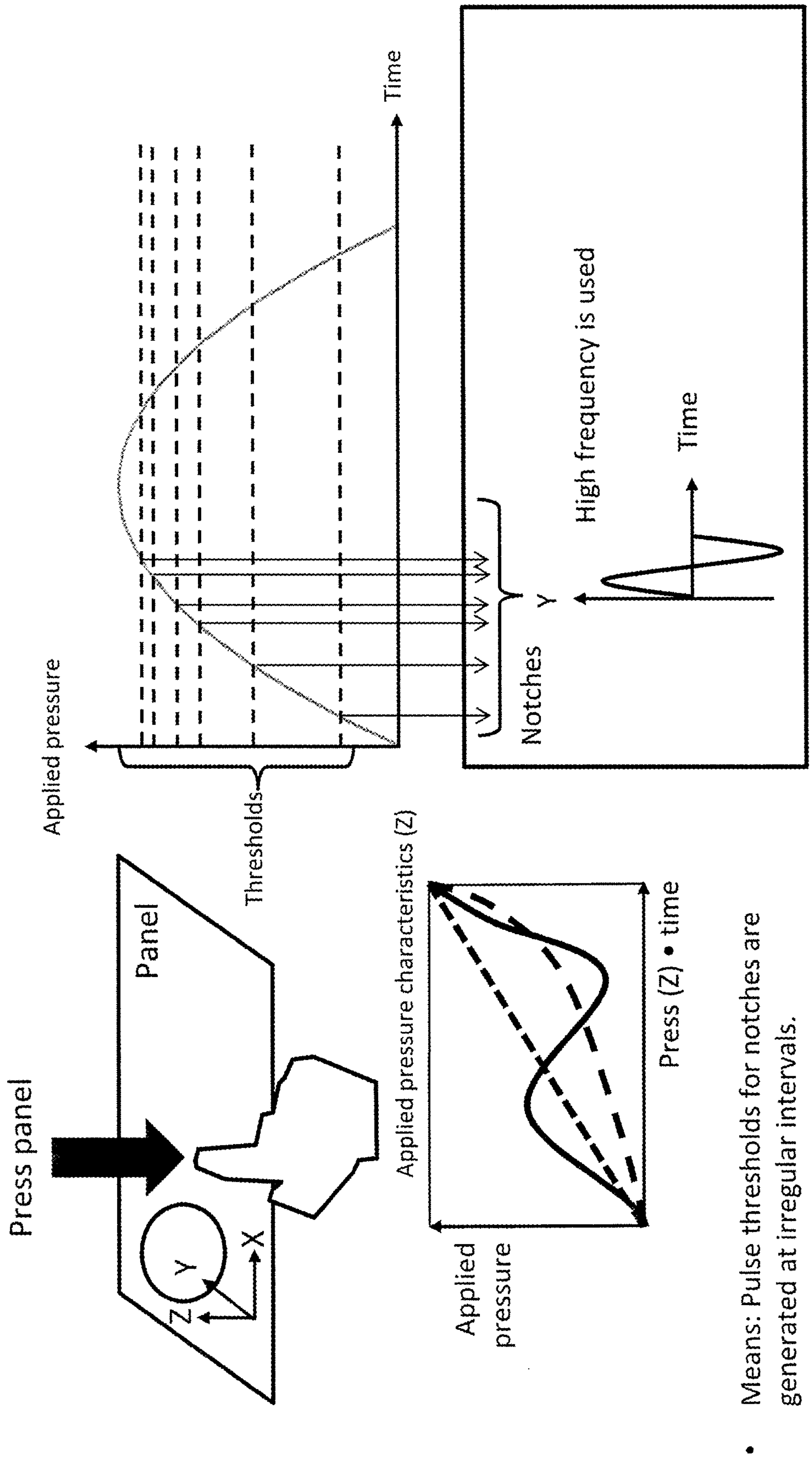

FIG. 153 is an explanatory view showing control of a sense of depressing a button (unequally spaced thresholds).

Figure 154:
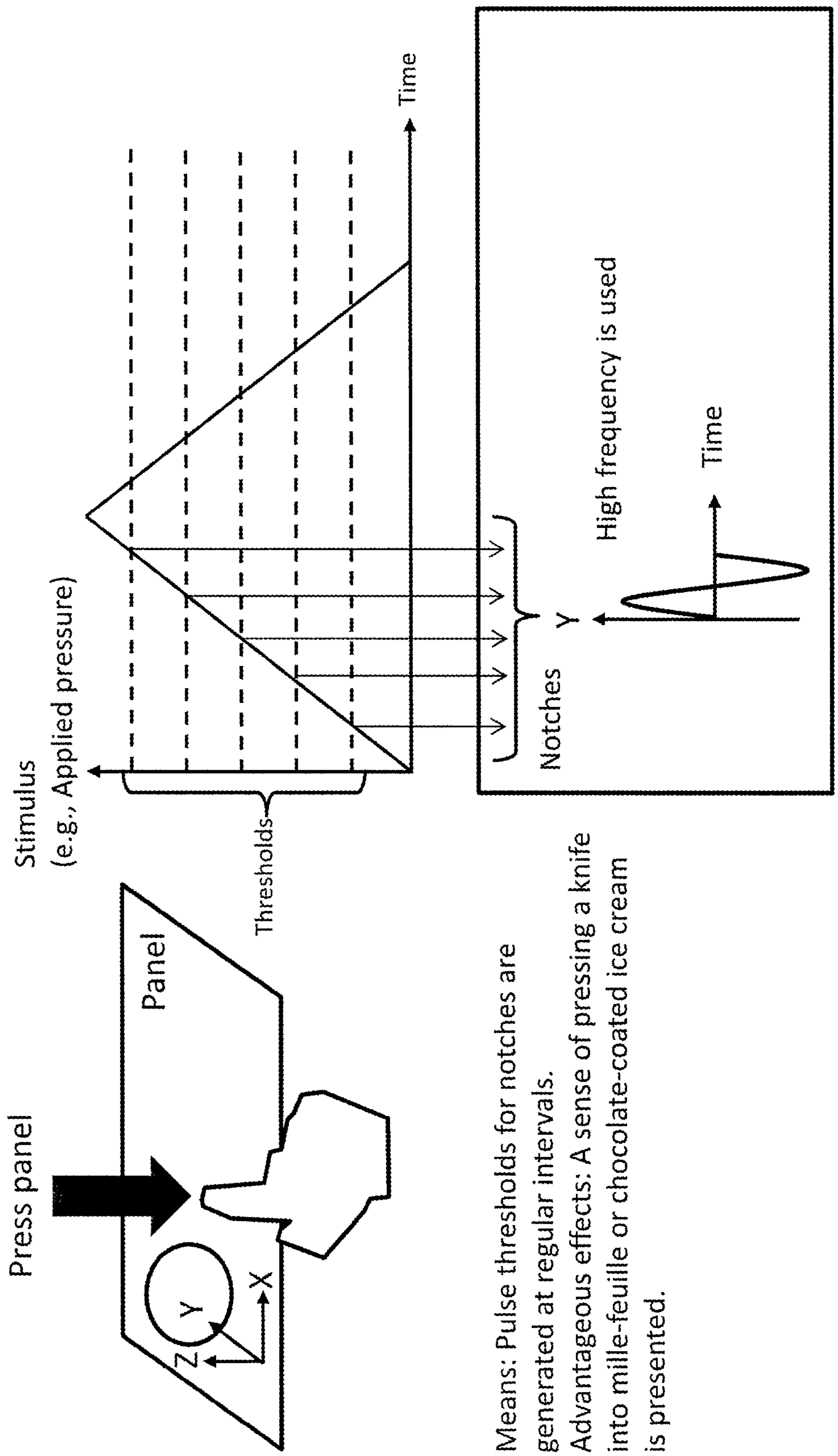

FIG. 154 is an explanatory view showing control of a sense of depressing a button (unequally spaced thresholds).

Figure 155:
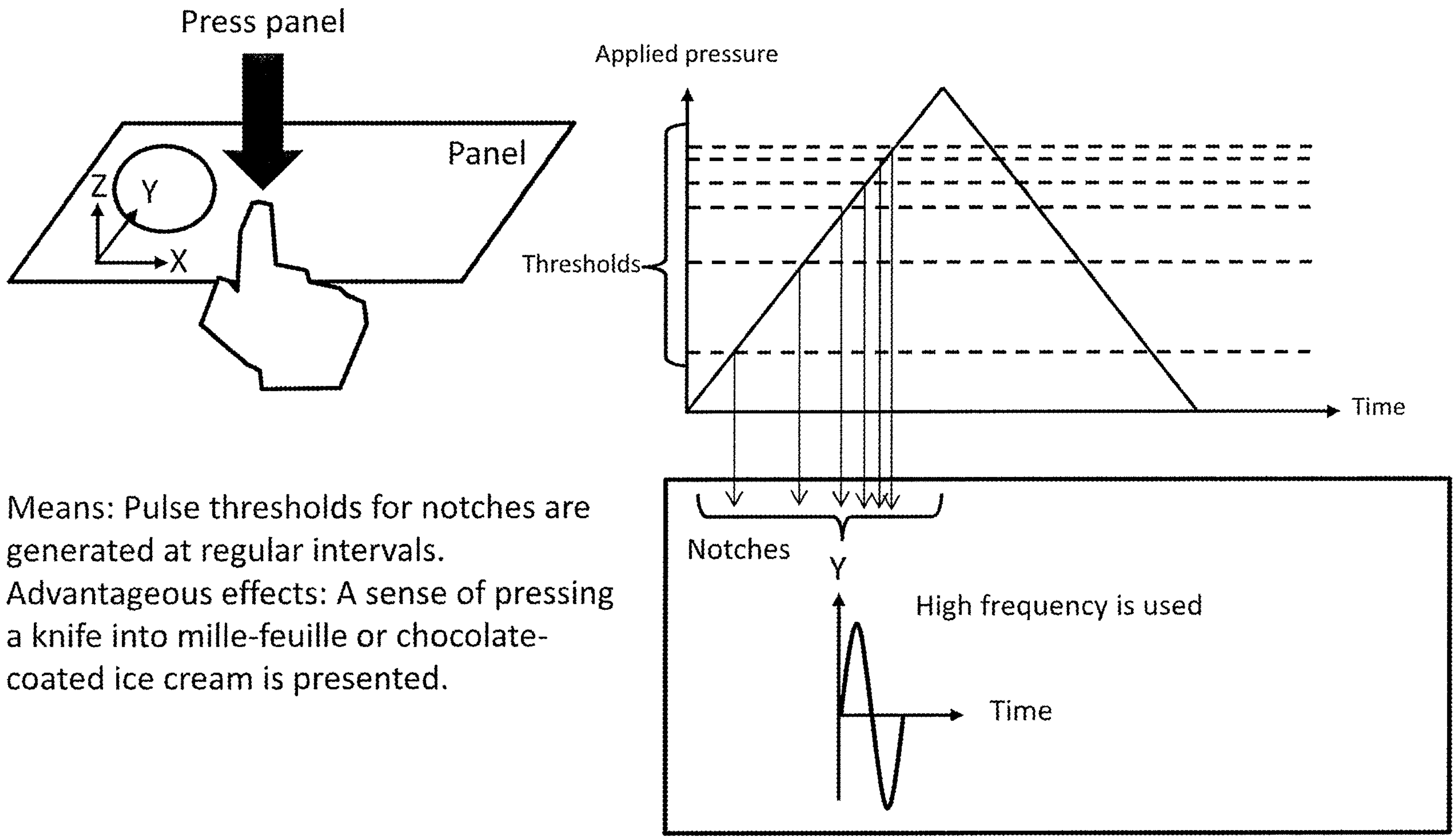

FIG. 155 is an explanatory view showing control of a sense of depressing a button (unequally spaced thresholds).

Figure 156:
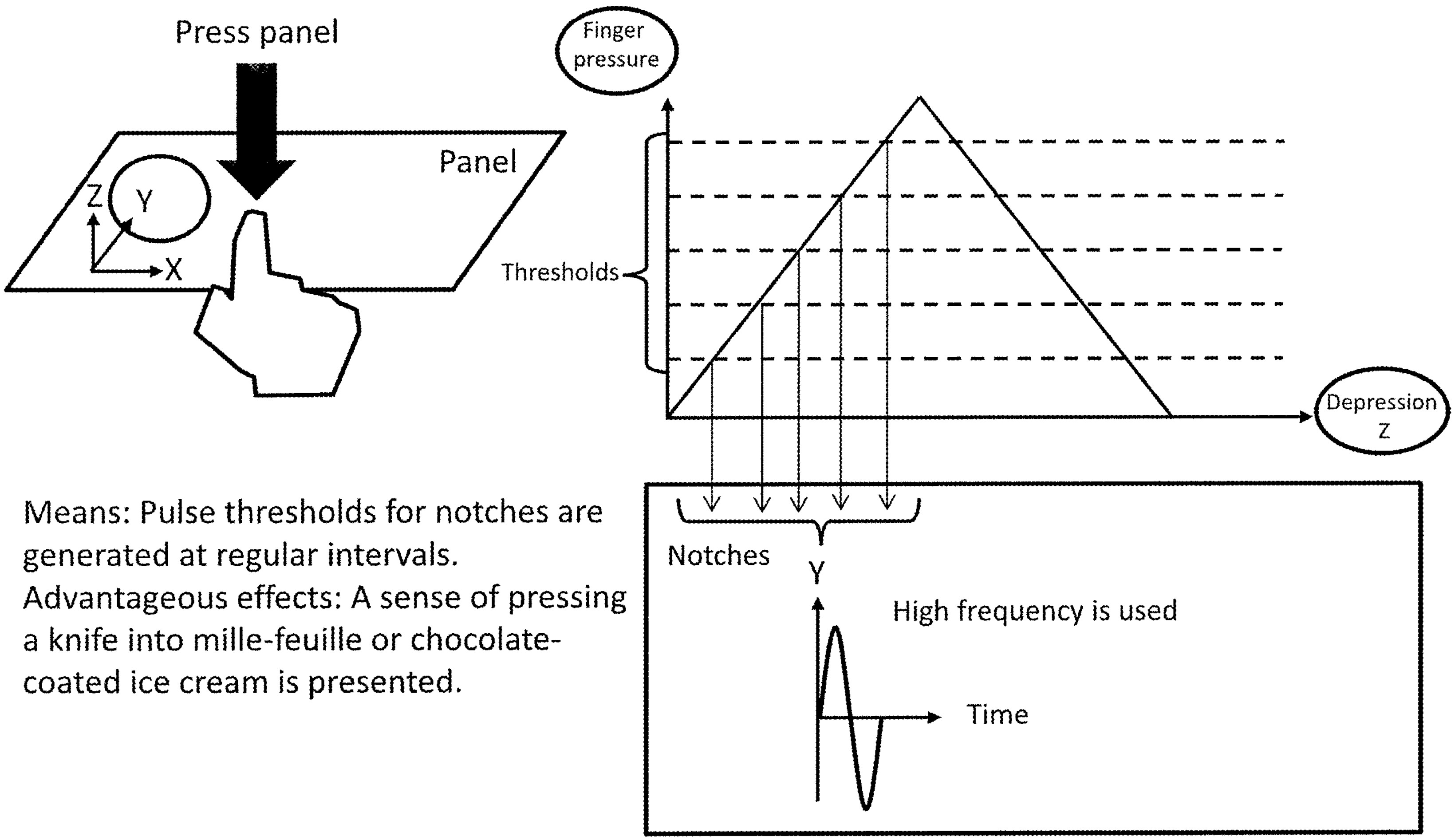

FIG. 156 is an explanatory view showing control of a sense of depressing a button (equally spaced thresholds).

FIG. 157 is an explanatory view showing control of a sense of depressing a button (unequally spaced thresholds).

Figure 158:
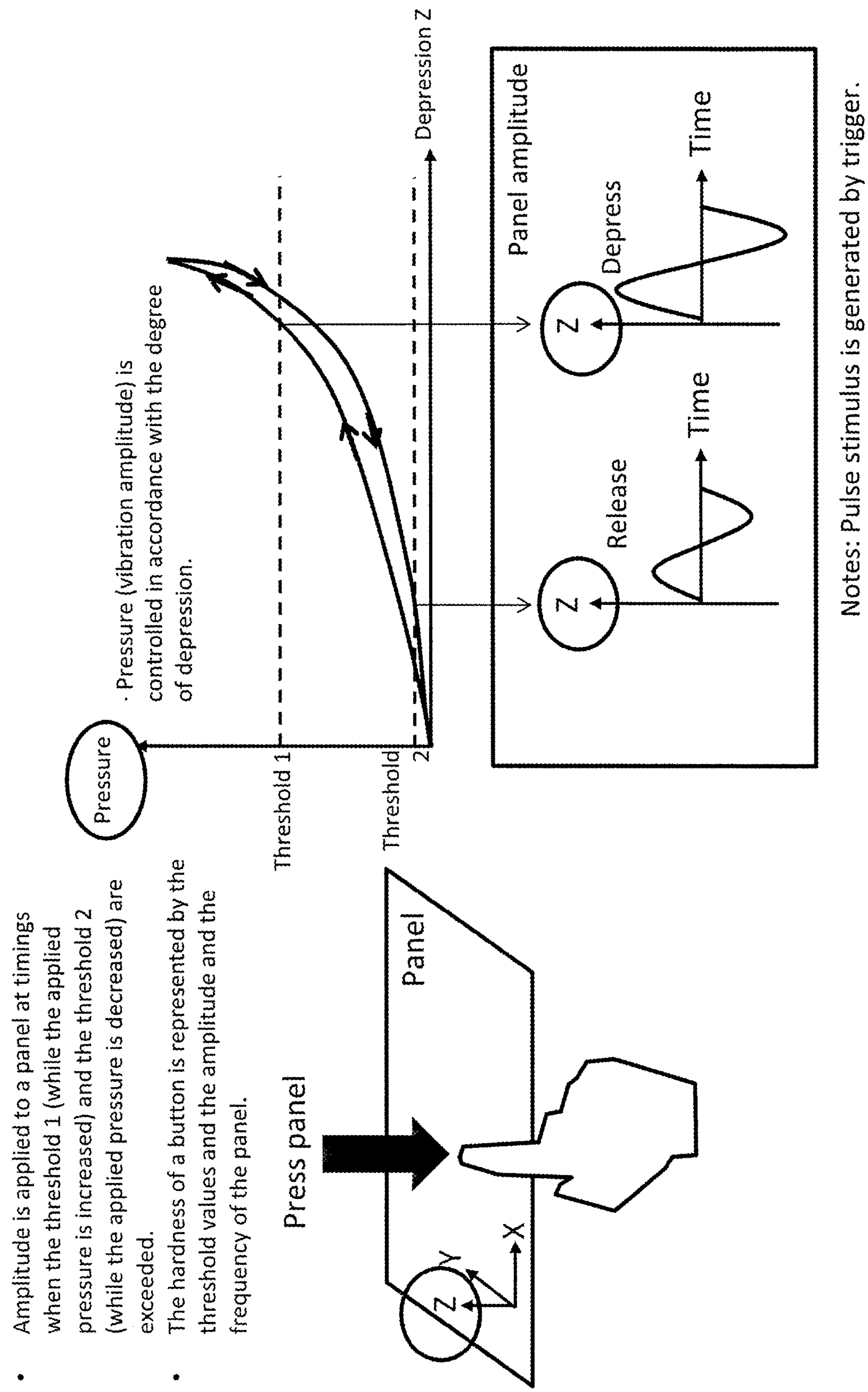

FIG. 158 is an explanatory view showing control of a sense of depressing a button (hysteresis).

FIG. 159 is an explanatory view showing control of a sense of depressing a button (control of a finger pressure function).

FIG. 160 is an explanatory view showing control of a sense of depressing a button (adaptive control of a waveform).

Figure 161:
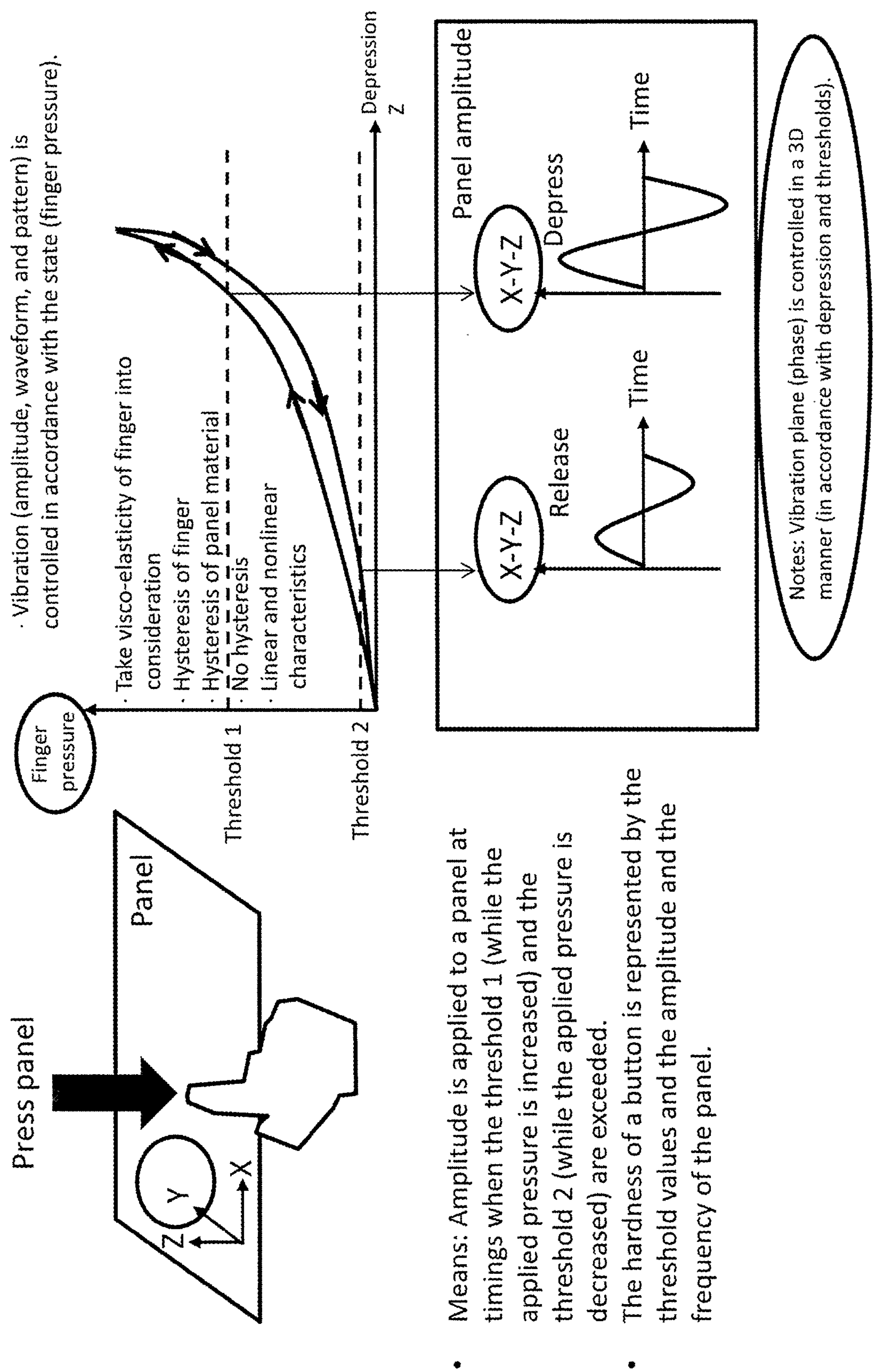

FIG. 161 is an explanatory view showing control of a sense of depressing a button (3D vibration control).

Figure 162:
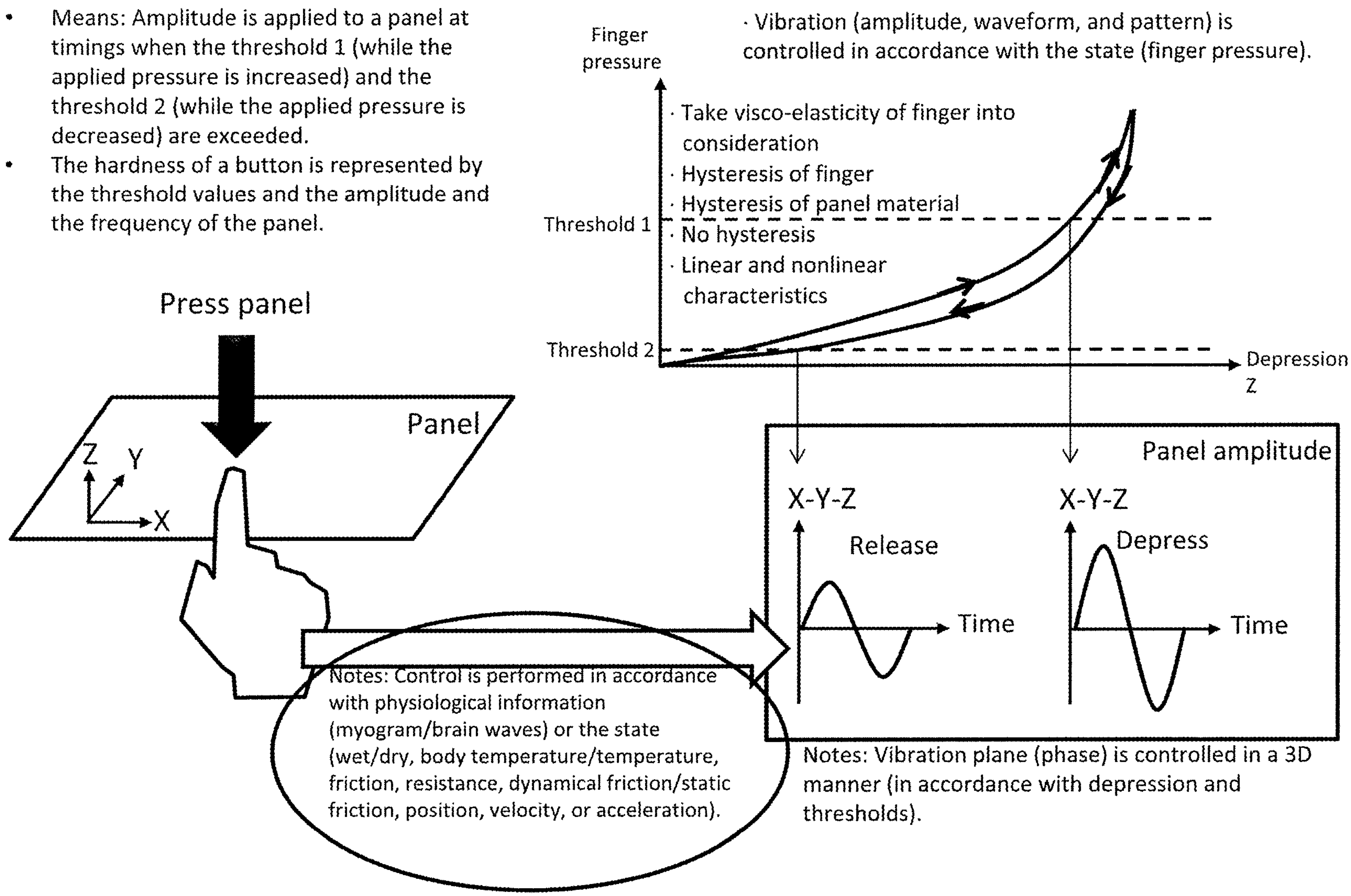

FIG. 162 is an explanatory view showing control of a sense of depressing a button (in accordance with a state).

FIG. 163 is an explanatory view showing control of a sense of depressing a button (induction of muscle reflexes).

Figure 164:
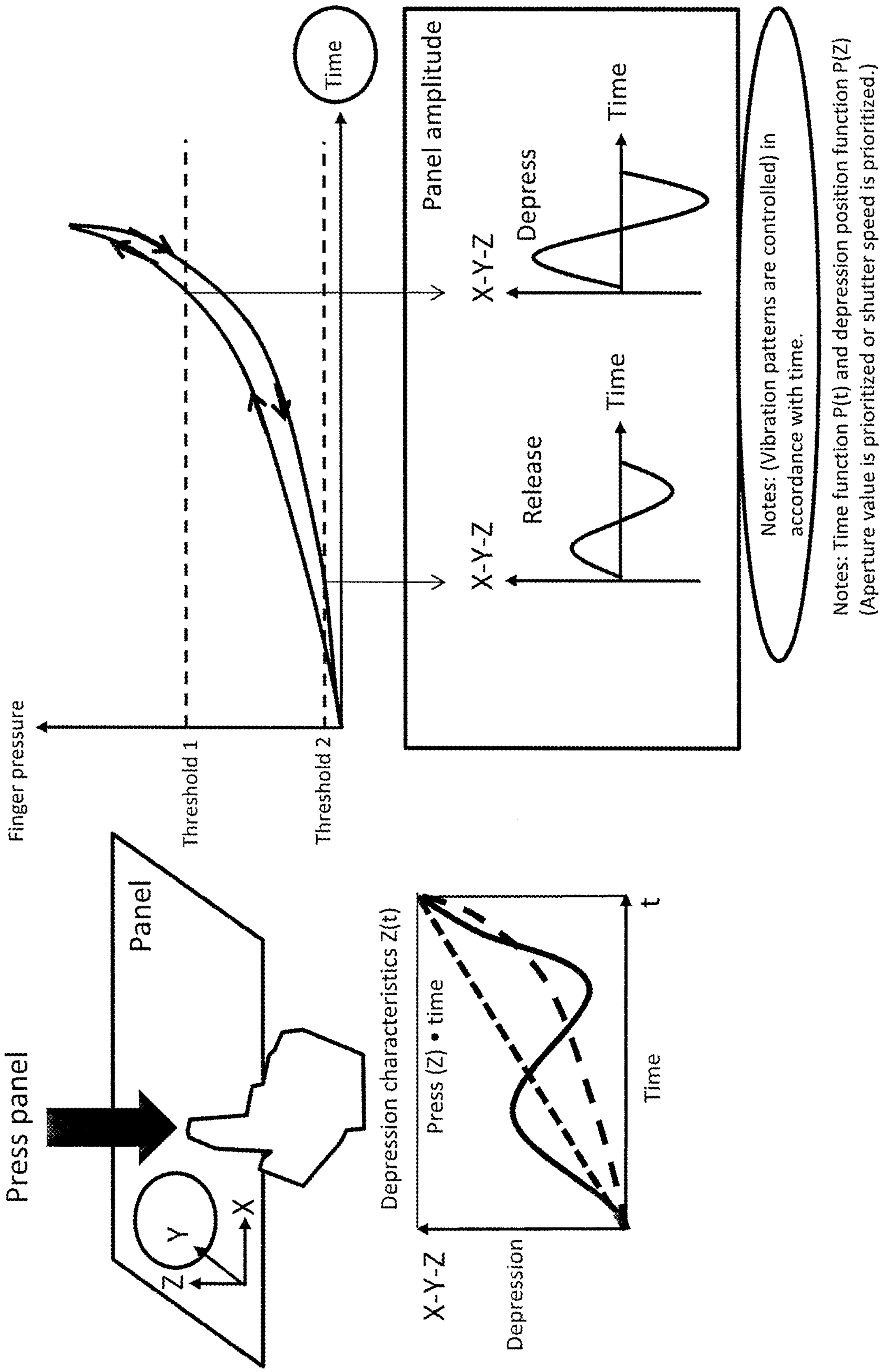

FIG. 164 is an explanatory view showing control of a sense of depressing a button (temporal pattern control).

Figure 165:
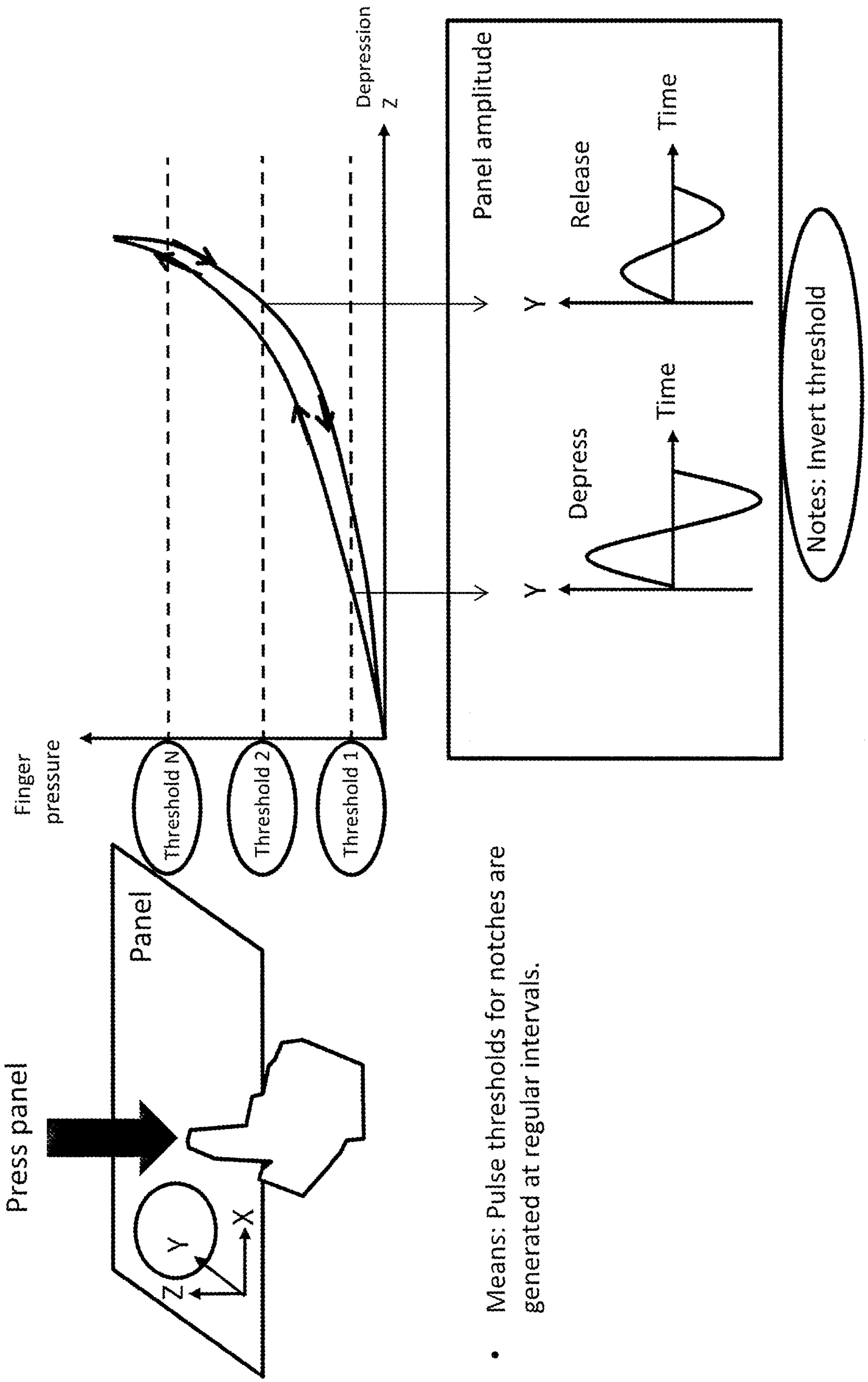

FIG. 165 is an explanatory view showing control of a sense of depressing a button (threshold control).

Figure 166:
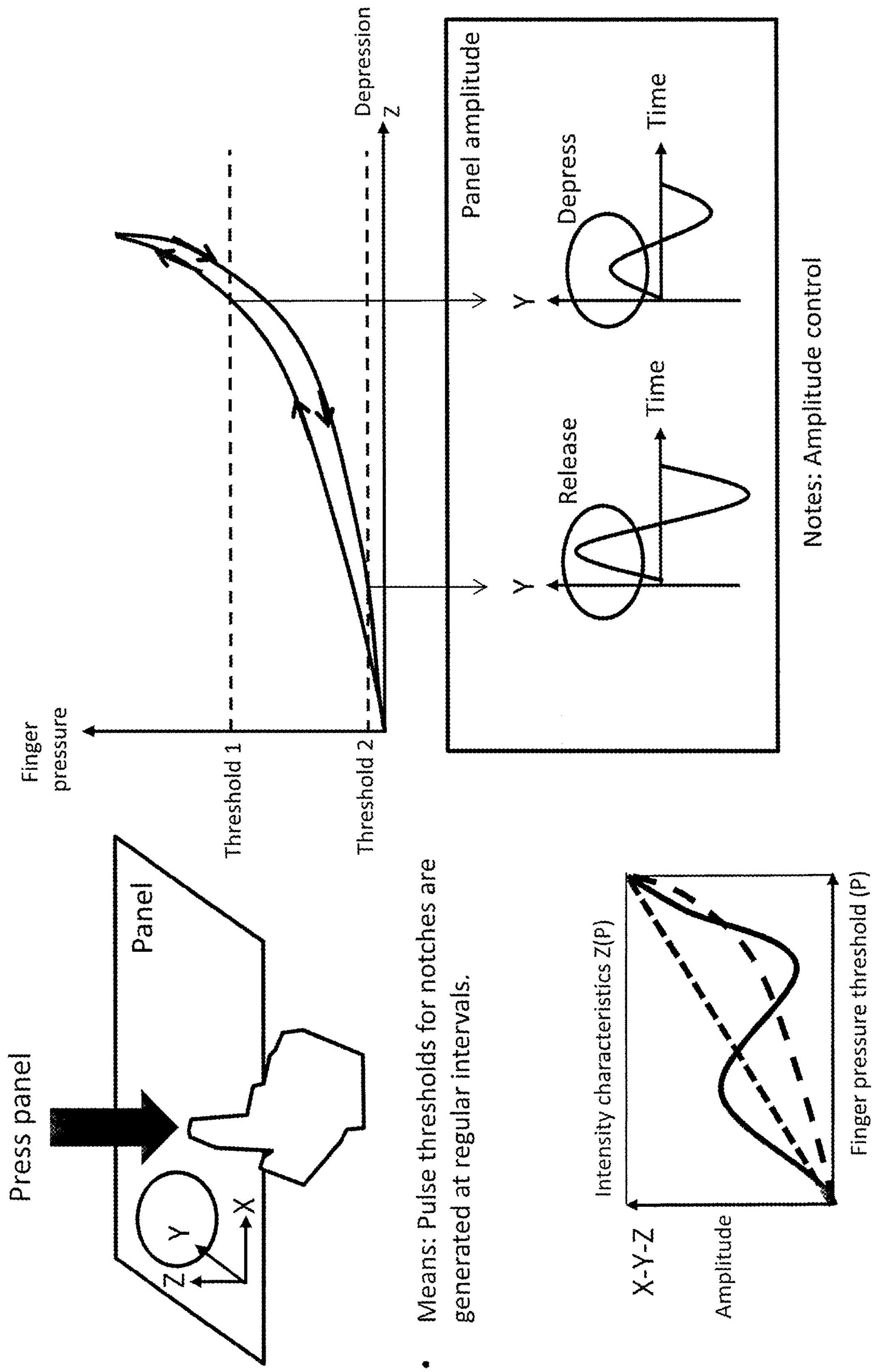

FIG. 166 is an explanatory view showing control of a sense of depressing a button (pulse amplitude control).

Figure 167:
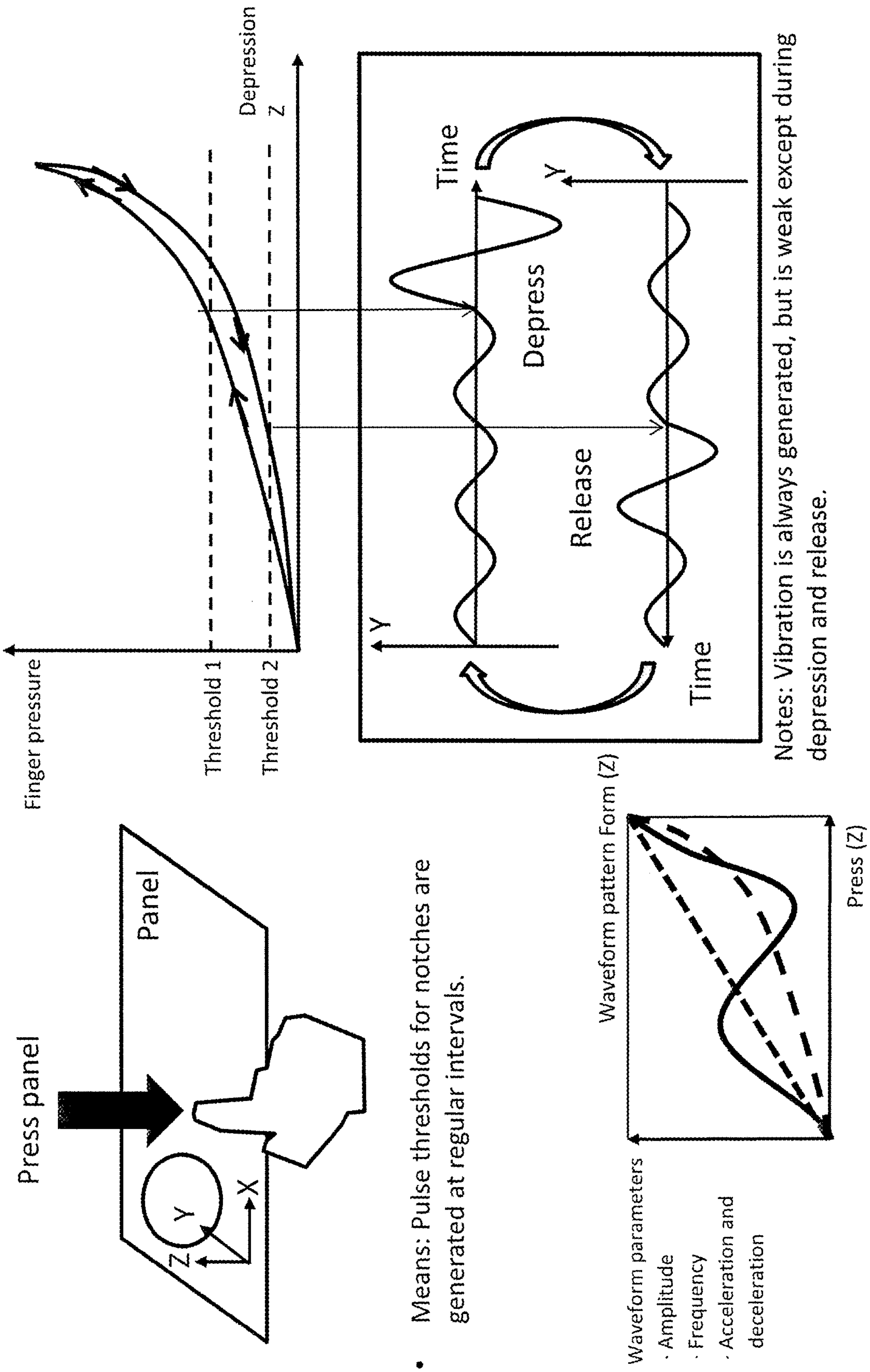

FIG. 167 is an explanatory view showing control of a sense of depressing a button (waveform control).

Figure 168:
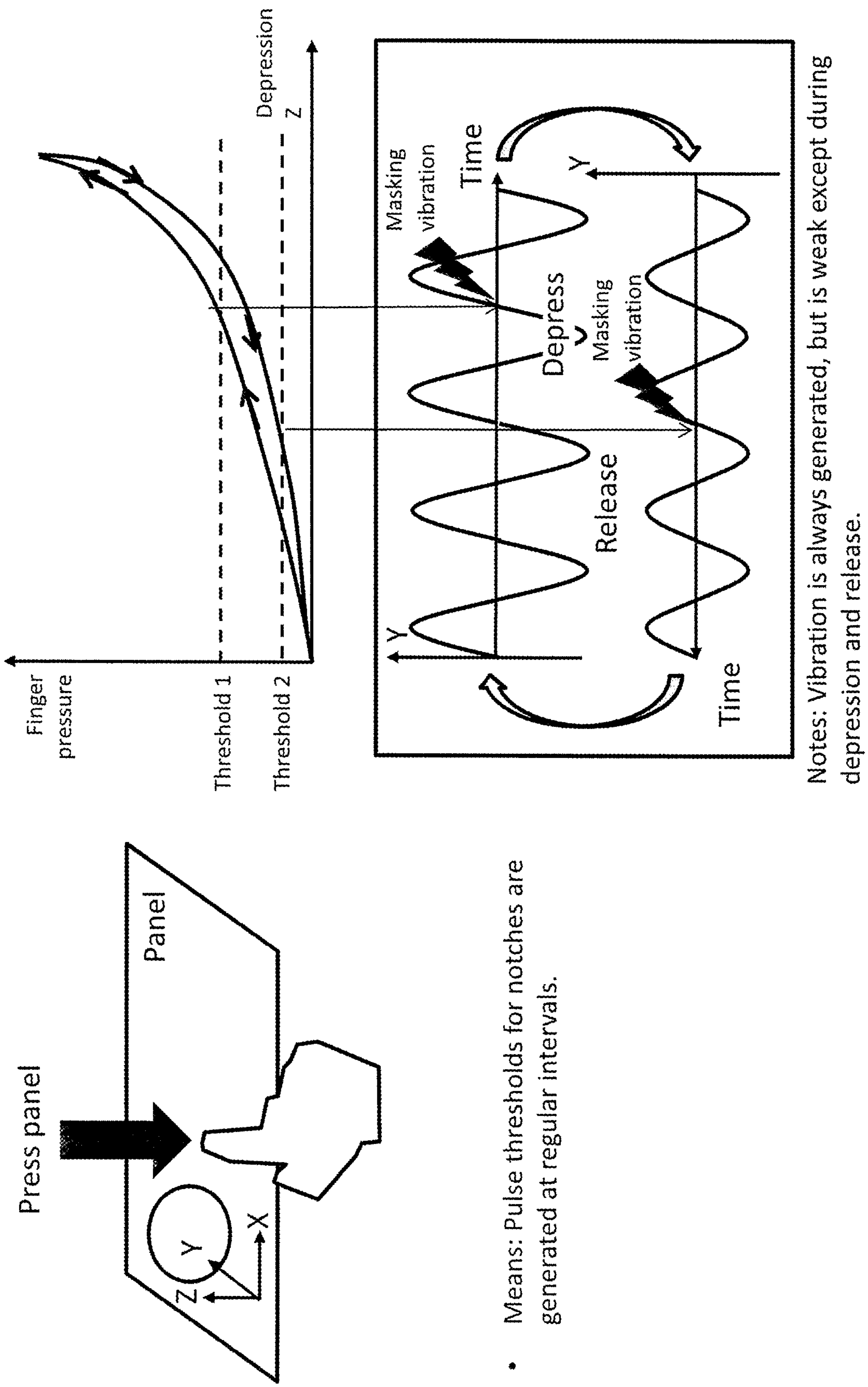

FIG. 168 is an explanatory view showing control of a sense of depressing a button (masking control).

FIG. 169 is an explanatory view showing control of a sense of depressing a button (dynamic and static friction).

FIG. 170 is an explanatory view showing control of a sense of depressing a button (phase control).

Figure 171:
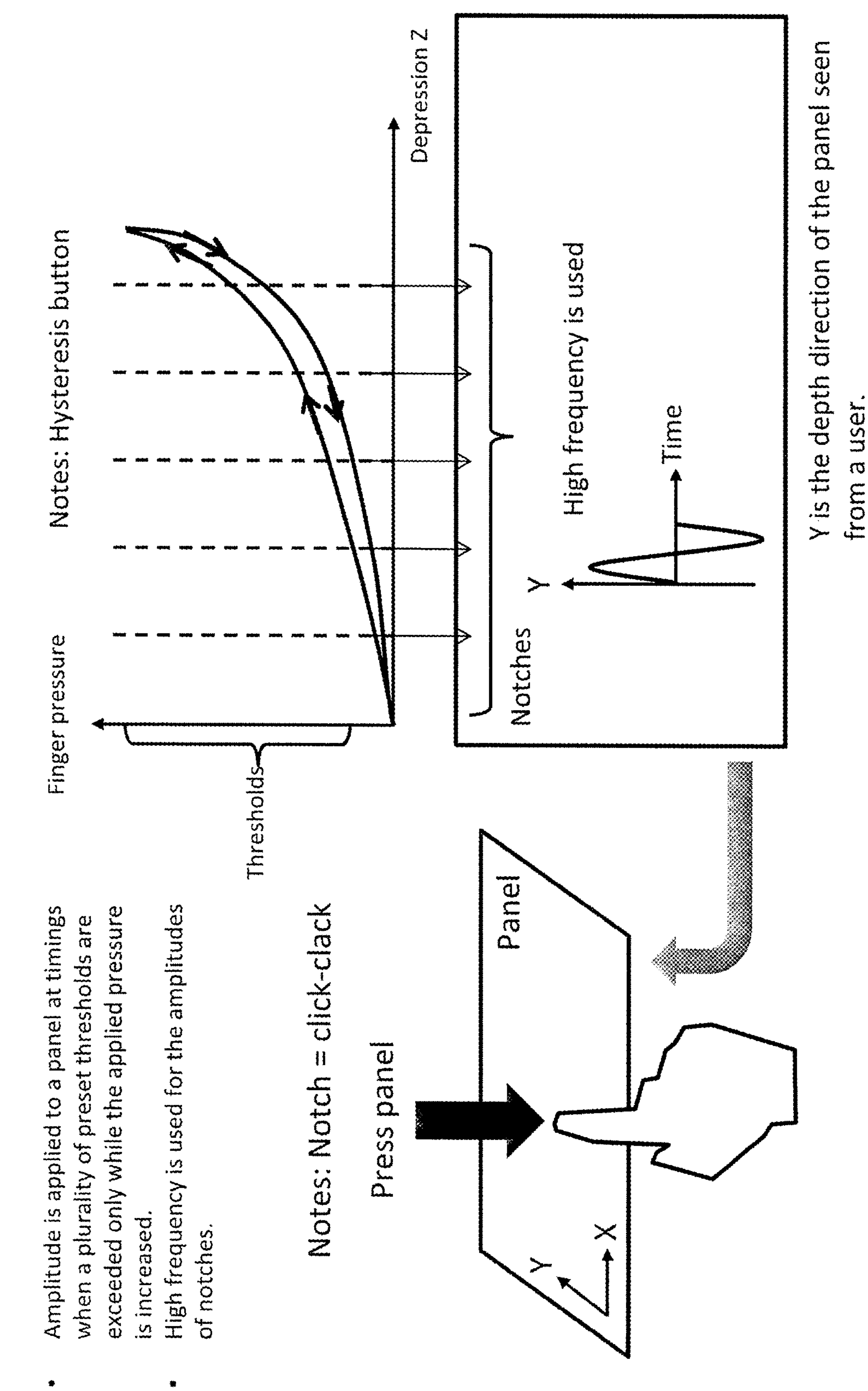

FIG. 171 is an explanatory view showing control of a sense of depressing a button (depression at regular intervals).

Figure 172:
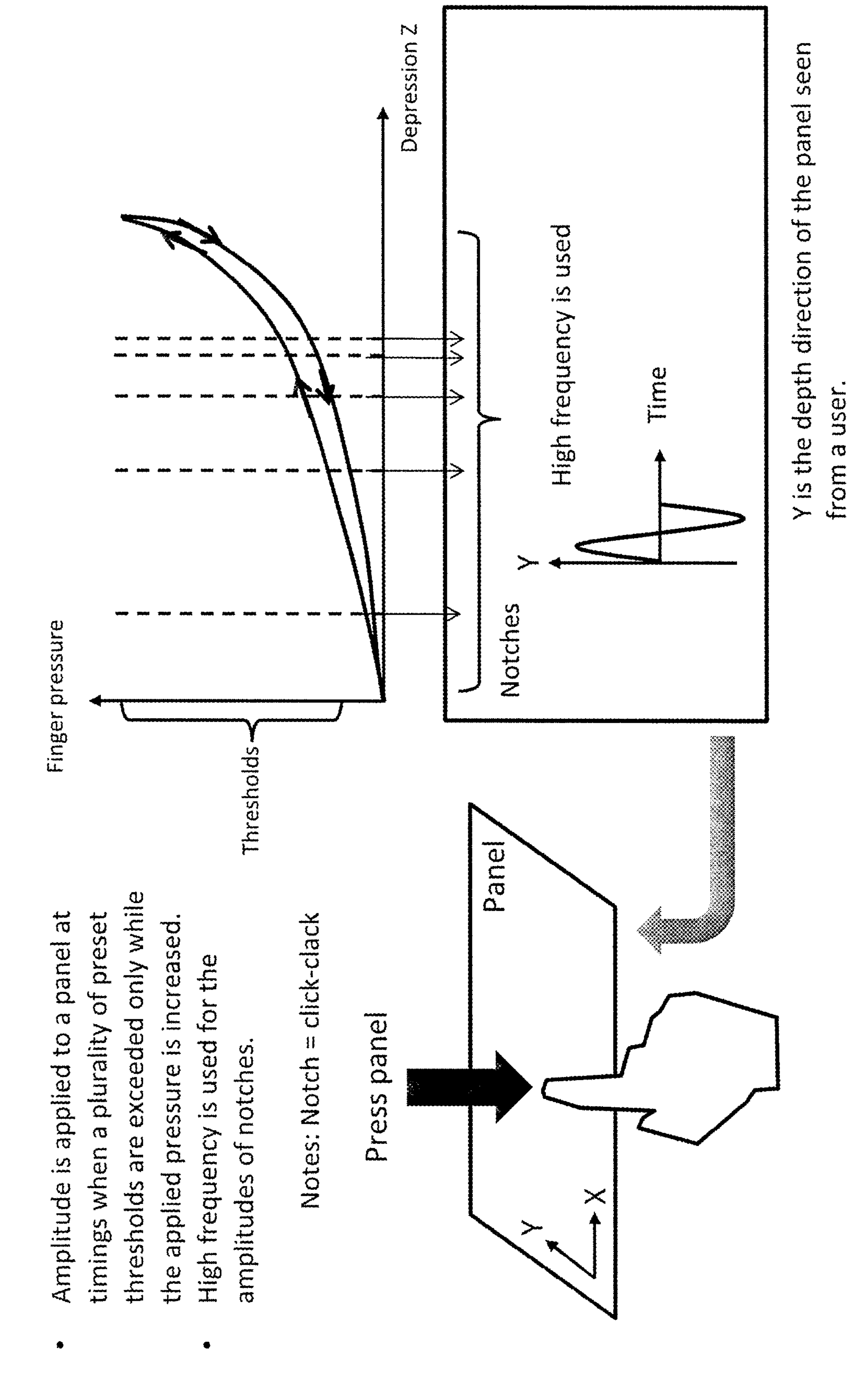

FIG. 172 is an explanatory view showing control of a sense of depressing a button (depression at irregular intervals).

Figure 173:
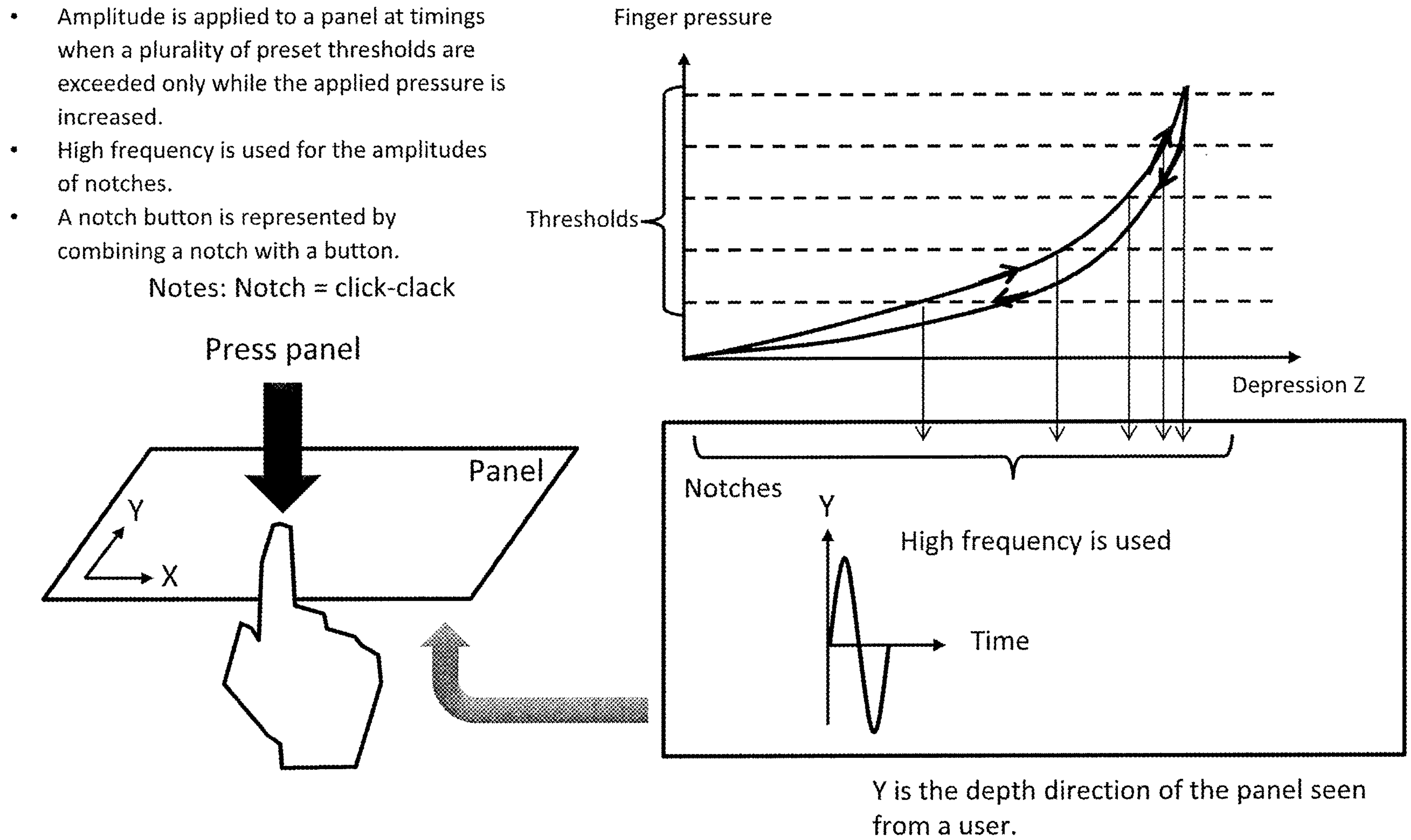

FIG. 173 is an explanatory view showing control of a sense of depressing a button (equally spaced thresholds).

FIG. 174 is an explanatory view showing a haptic sense dial (basic representation and control functions).

Figure 175:
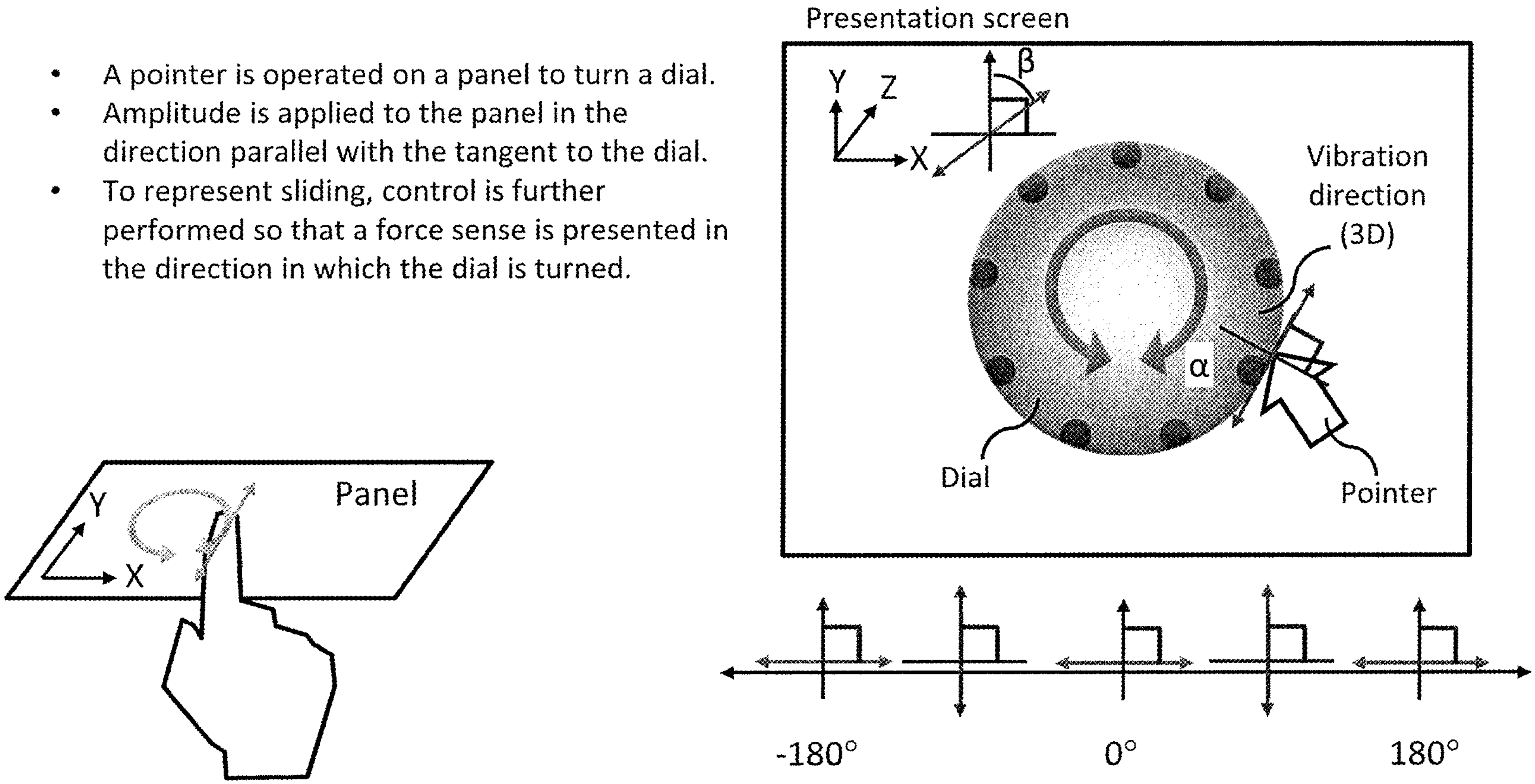

FIG. 175 is an explanatory view showing a dial (a sense of acceleration).

FIG. 176 is an explanatory view showing a dial (a sense of resistance).

FIG. 177 is an explanatory view showing a dial (a sense of horizontal acceleration).

FIG. 178 is an explanatory view showing a dial (variable touch).

FIG. 179 is an explanatory view showing a dial (a sense of randomness).

FIG. 180 is an explanatory view showing a volume dial (a sense of click-clack).

FIG. 181 is an explanatory view showing a volume (a sense of receiving guidance on the circumference of a circle).

FIG. 182 is an explanatory view showing a volume (a sense of receiving guidance on the circumference of a circle and a sense of resistance).

FIG. 183 is an explanatory view showing a volume switch (a sense of decision).

FIG. 184 is an explanatory view showing waveform control (variations of vibration phase).

FIG. 185 is an explanatory view showing a device size and shape characteristics.

FIG. 186 is an explanatory view showing a device size and shape characteristics.

Figure 187:
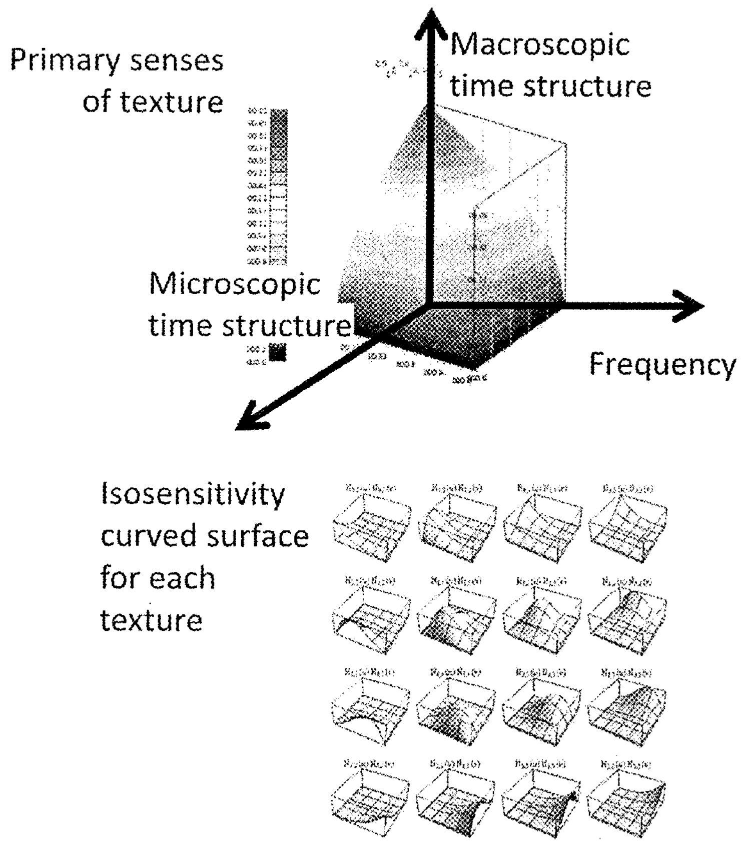

FIG. 187 is an explanatory view showing a structure of texture.

Figure 188:
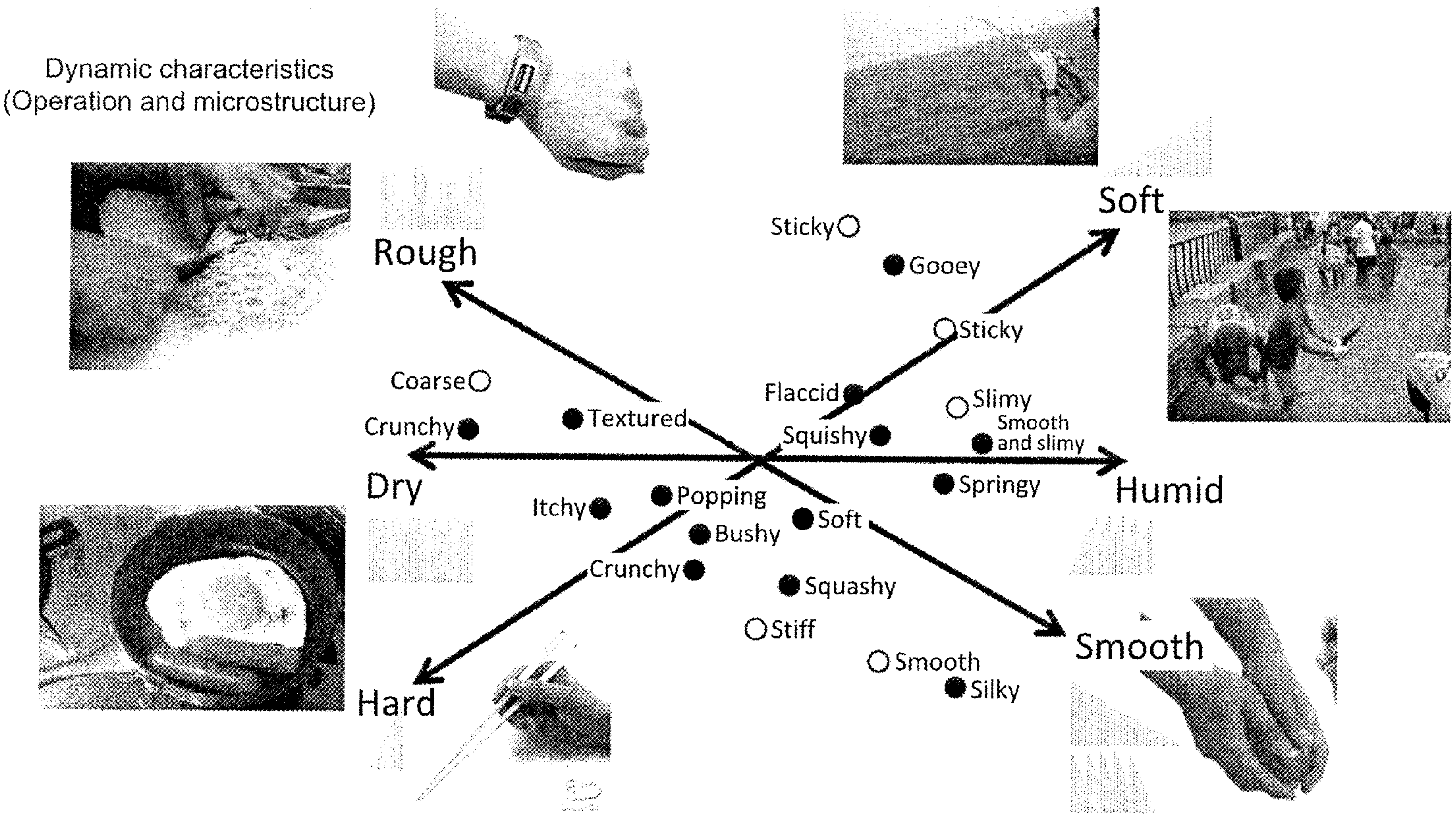

FIG. 188 is an explanatory view showing a database of a texture structure.

Figure 189:
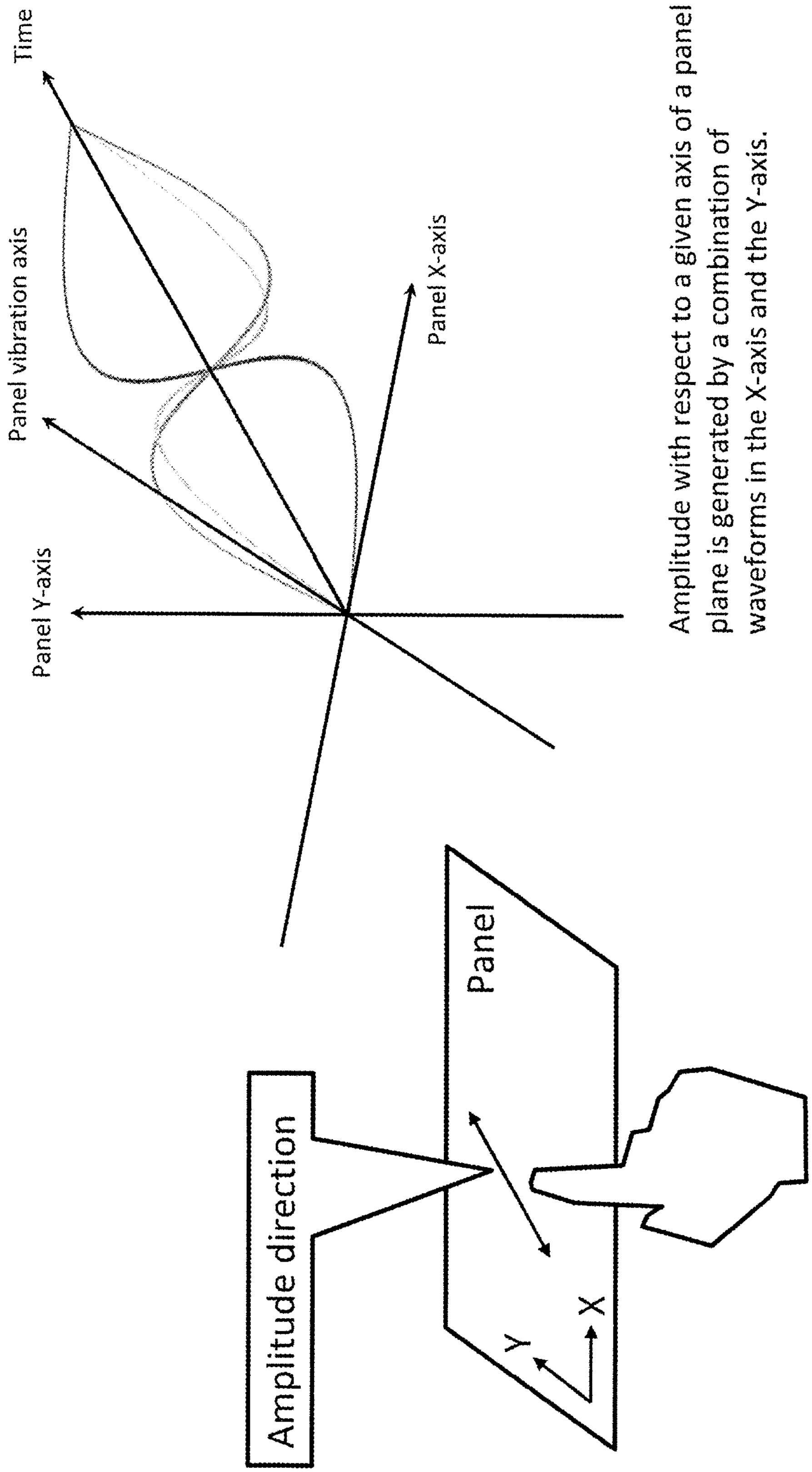

FIG. 189 is an explanatory view showing wavelength control (2D amplitude direction control).

Figure 191:
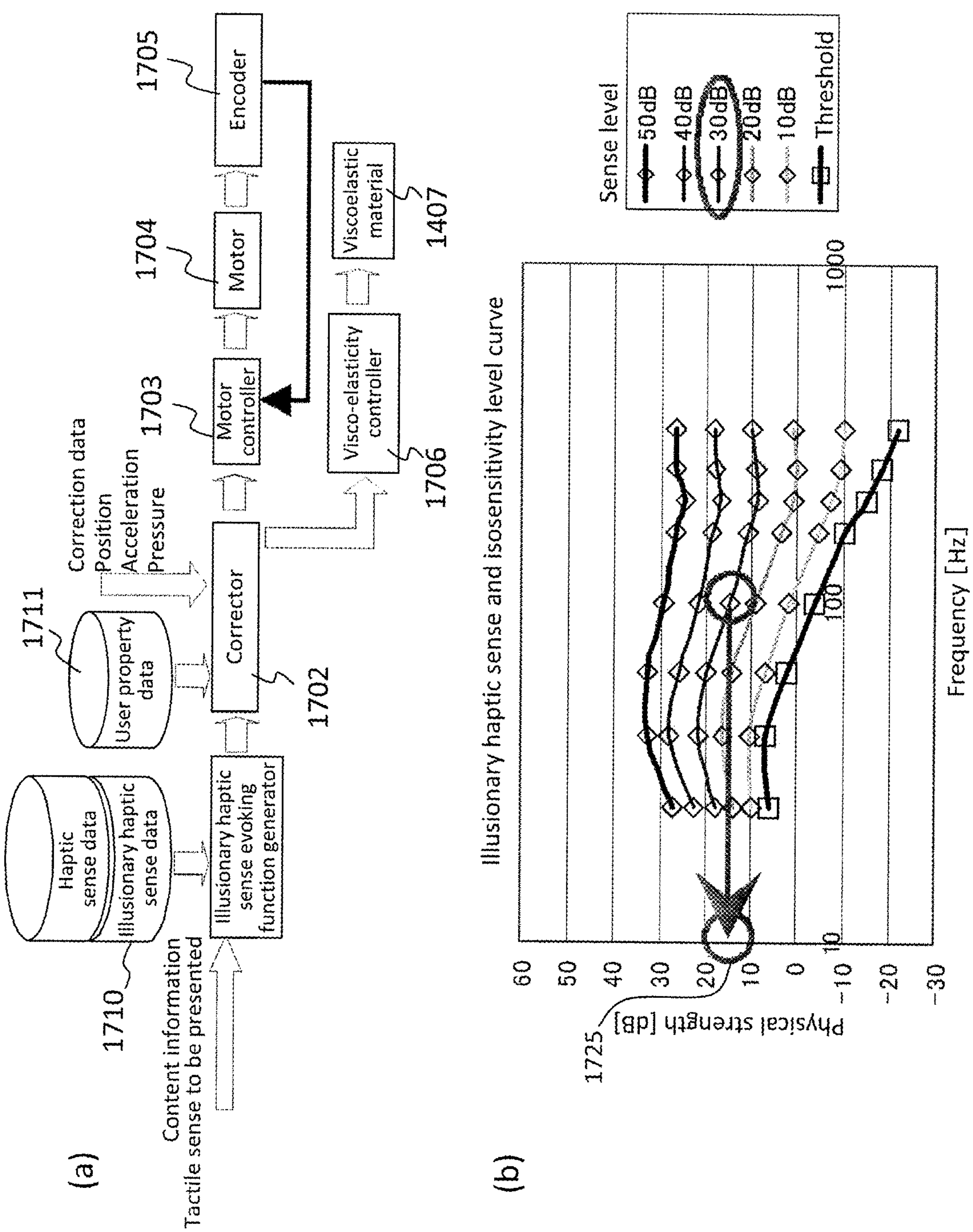

FIG. 190 is a use example (a digital mouse (panel mouse))
FIG. 191 is an explanatory view showing measurement of individual properties.

Figure 192:
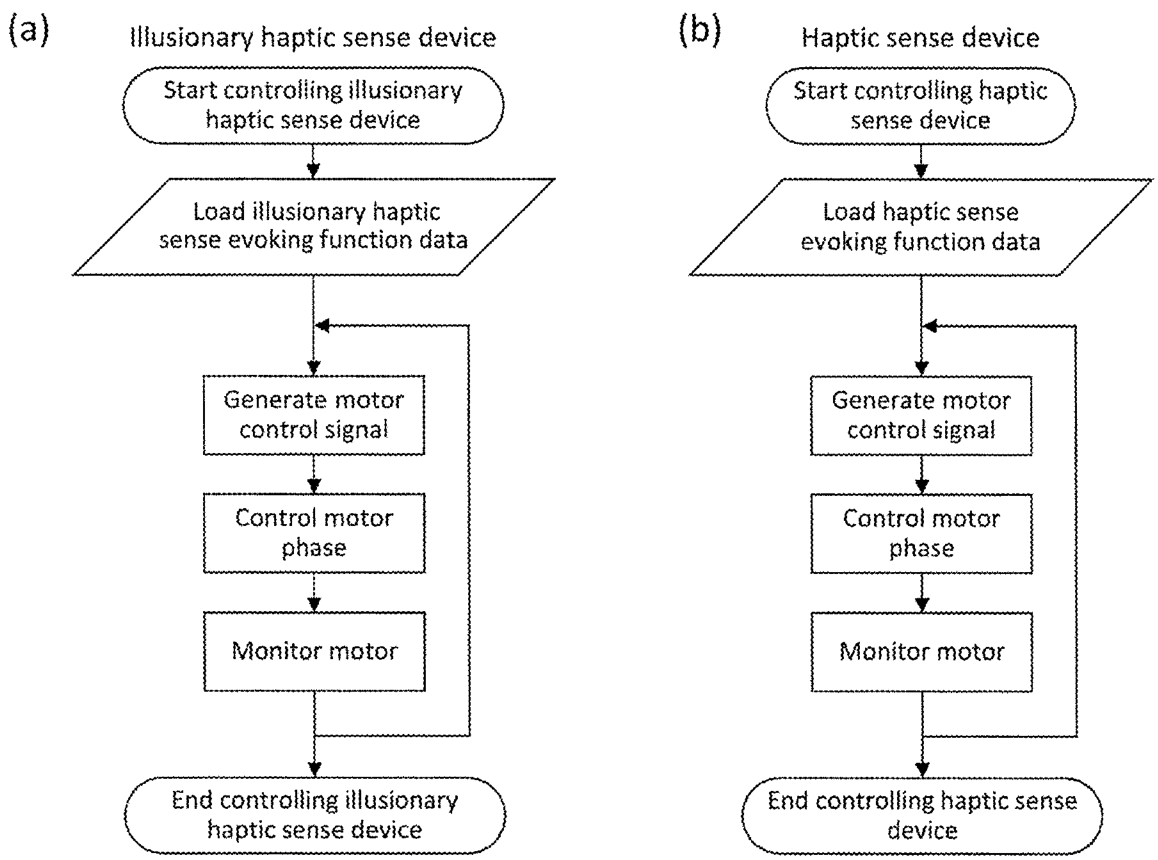

FIG. 192 is an explanatory view showing actuator control.

FIG. 193 is an explanatory view showing a profiling.

Figure 194:
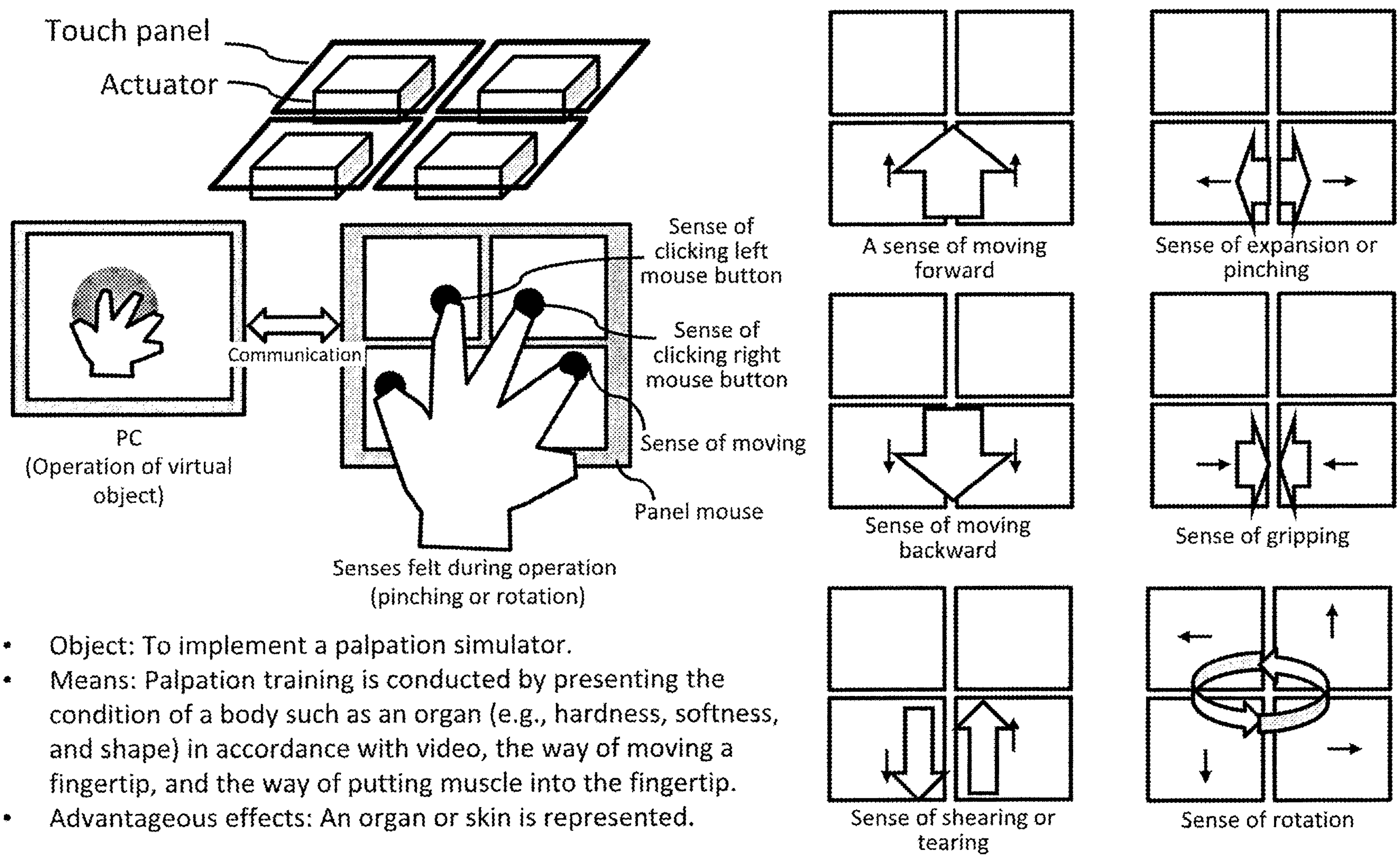

FIG. 194 is an explanatory view showing a palpation simulator.

Figure 195:
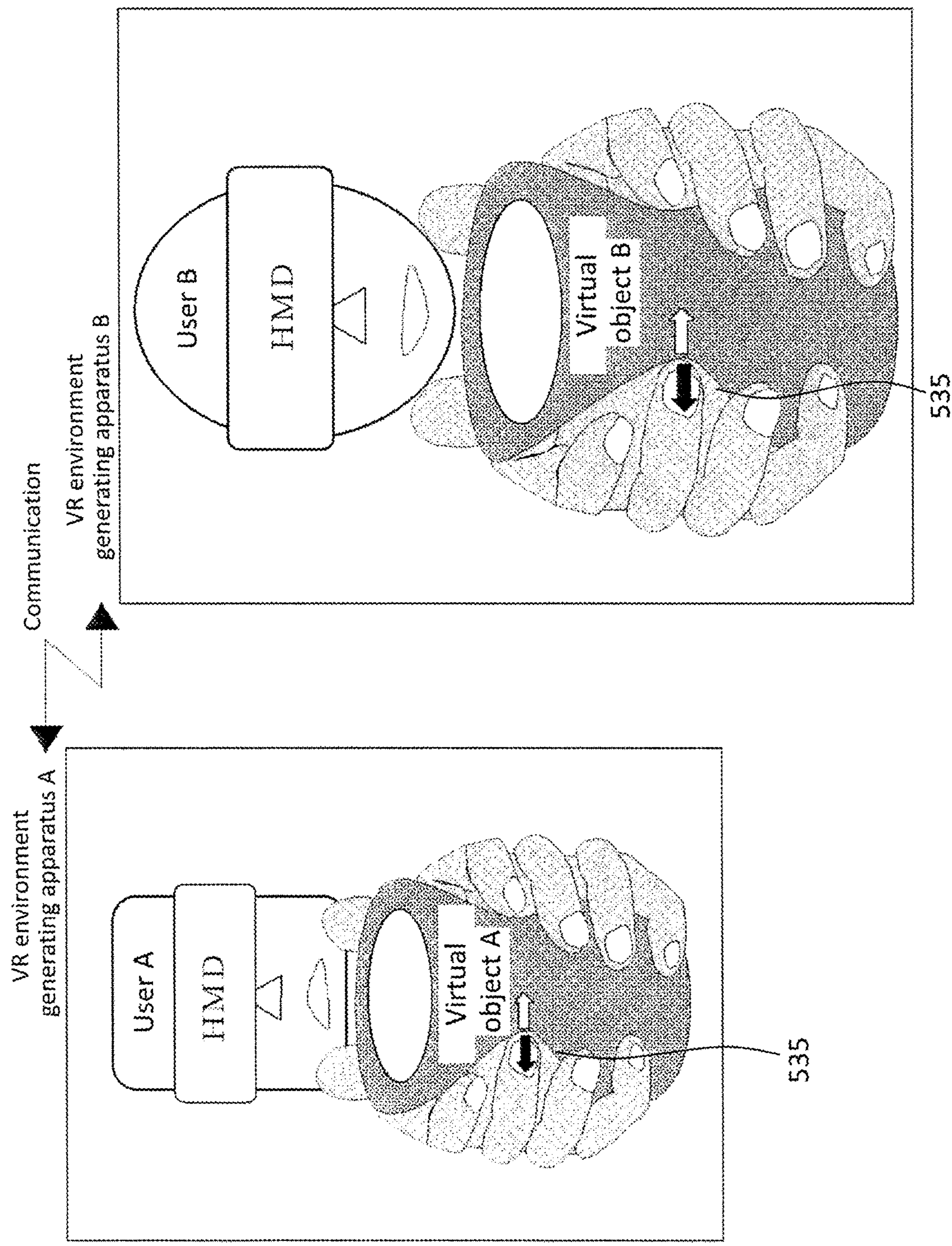

FIG. 195 is an example of application (remote synchronization).

FIG. 196 is a view showing a rough structure of a system configuration of haptic sense display.

FIG. 197 is an explanatory system configuration for haptic sense display.

FIG. 198 is an explanatory view showing displacement control of a haptic sense actuator.

FIG. 199 is an explanatory view showing points of illusion phenomena.

FIG. 200 is an explanatory view showing points of illusion phenomena.

FIG. 201 is an explanatory view showing points of illusion phenomena.

FIG. 202 is an explanatory view showing points of illusion phenomena.

FIG. 203 is an explanatory view showing points of illusion phenomena (phase delay).

FIG. 204 is an explanatory view showing points of illusion phenomena.

FIG. 205 is an explanatory view showing points of illusion phenomena.

FIG. 206 is an explanatory view showing a way to depress panel with a finger (stepwise depression (common)).

FIG. 207 is an explanatory view showing a way to depress panel with a finger (stepwise depression).

FIG. 208 is an explanatory view showing a way to depress panel with a finger (stepwise depression).

FIG. 209 is an explanatory view showing a way to depress panel with a finger (stepwise depression).

FIG. 210 is an explanatory view showing a way to depress panel with a finger (stepwise depression (common)).

FIG. 211 is an explanatory view showing a way to depress panel with a finger (stepwise depression (common)).

FIG. 212 is an explanatory view showing displacement and amplitude control (a triangular wave and a sine wave).

FIG. 213 is an explanatory view showing displacement and amplitude control (a triangular wave and a sine wave).

FIG. 214 is an explanatory view showing displacement and amplitude control (pressing downward).

FIG. 215 is an explanatory view showing displacement and amplitude control (a sense of pressing panel (unconscious sliding)).

FIG. 216 is an explanatory view showing displacement and amplitude control (a isco-elasticity (button characteristics)).

FIG. 217 is an explanatory view showing displacement and amplitude control (visco-elasticity (an artificial skin sense)).

FIG. 218 is an explanatory view showing displacement and amplitude control (a triangular wave).

FIG. 219 is an explanatory view showing displacement and amplitude control (a sine wave).

FIG. 220 is an explanatory view showing vibration control of a haptic sense actuator.

FIG. 221 is an explanatory view showing waveform control (displaced waveforms).

FIG. 222 is an explanatory view showing waveform control (accelerated and decelerated waveforms).

FIG. 223 is an explanatory view showing waveform control (accelerated sweep (a sense of click)).

FIG. 224 is an explanatory view showing waveform control (acceleration/shift control).

FIG. 225 is an example of an actuator (eccentric motor).

FIG. 226 is an example of an actuator (eccentric motor).

FIG. 227 is an example of an actuator (eccentric motor).

FIG. 228 is an explanatory view showing generation of an illusionary haptic sense.

FIG. 229 is an explanatory view showing a sensory characteristic, a physical property, and a hysteresis.

FIG. 230 is an explanatory view showing a sensory characteristic and a masking method.

FIG. 231 is an explanatory view showing a sensory characteristic and a masking method.

FIG. 232 is an explanatory view showing a sensory characteristic and a masking method.

FIG. 233 is an explanatory view showing an individual difference of sensory characteristics.

FIG. 234 is an example of a control method.

FIG. 235 is an explanatory view showing nonlinear control of a physical property.

FIG. 236 is an example of an actuator (eccentric motor).

FIG. 237 is an explanatory view showing installation methods (for installing a panel on fingertips).

FIG. 238 is an explanatory view showing configurations and examples of an installation method.

FIG. 239 is an explanatory view showing an installation method (grip type and variation).

FIG. 240 is an example of an actuator (artificial muscle).

FIG. 241 is a table type example.

FIG. 242 is a table type example.

FIG. 243 is a table type example.

FIG. 244 is a handle type example.

FIG. 245 is a handle type example.

FIG. 246 is a handle type example.

FIG. 247 is a handle type example.

FIG. 248 is a surface layer type example.

FIG. 249 is a ring type example.

FIG. 250 is a wrist band type example.

FIG. 251 is an arm ring type example.

FIG. 252 is an explanatory view showing installation portions.

FIG. 253 is an explanatory view showing a variation of control wires (parallel arrangement).

FIG. 254 is an explanatory view showing a variation of control wires (crossed arrangement).

FIG. 255 is an explanatory view showing a system and parts.

FIG. 256 is an explanatory view showing a variation of module integration.

FIG. 257 is an explanatory view showing array type modules (a flat plane, a free-form curved surface).

FIG. 258 is an explanatory view showing points of illusion phenomenon.

FIG. 259 is an explanatory view showing a basic module of a haptic sense device.

FIG. 260 is an explanatory view showing a basic module of a haptic sense device.

FIG. 261 is an explanatory view showing a haptic sense device (compatible with real time).

FIG. 262 is an explanatory view showing a haptic sense device (reflection of contact state).

FIG. 263 is an example of a panel-type module.

FIG. 264 is an example of a panel-type module (photo implanter).

FIG. 265 is an example of a panel-type module (suspended and isolated).

FIG. 266 is an example of a panel type module (suspended/isolated).

FIG. 267 is an example of a panel (floating inertial actuator).

FIG. 268 is an example of a liquid crystal touch panel-type module.

FIG. 269 is an example of a liquid crystal touch panel-type module (thin type).

FIG. 270 is an example of a liquid crystal touch panel-type module (thin type).

FIG. 271 is an example of a touch panel-type module (projection).

FIG. 272 is an explanatory view showing multi-modal effect.

FIG. 273 is an example of a multi-touch array unit.

FIG. 274 is an explanatory view showing sense-combining control (physical and between organs).

FIG. 275 is an explanatory view showing multi-touch sense-combining control (sense and perception).

FIG. 276 is an explanatory view showing sense-combining control (a tactile sense and a force sense).

FIG. 277 is an explanatory view showing sense-combining control (a tactile sense and a force sense).

FIG. 278 is an explanatory view showing sense-combining control (a tactile sense and a force sense).

FIG. 279 is an explanatory view showing sense-combining control (forward and backward effects).

FIG. 280 is an explanatory view showing sense-combining control (a tactile sense and a force sense, and overlapping).

FIG. 281 is an explanatory view showing sense-combining control (difference/comparison).

FIG. 282 is an explanatory view showing sense-combining control (difference/comparison).

FIG. 283 is an explanatory view showing generation of a sense of button shape (sense of touching mountain-like protrusion).

FIG. 284 is an explanatory view showing generation of a sense of button shape (sense of touching semi-cylindrical protrusion).

FIG. 285 is an explanatory view showing generation of a sense of button touch (sense of being in recessed gap).

FIG. 286 is an explanatory view showing control of a sense of receiving guidance at a position between buttons (sense of crossing).

FIG. 287 is an explanatory view showing control of a sense of receiving guidance at a position between buttons (sense of being at an edge point).

FIG. 288 is an explanatory view showing control of a sense of receiving guidance at a position between buttons (Sense of touching an edge).

FIG. 289 is an example of a slider (control of a haptic sense).

FIG. 290 is an example of a slider (control of a haptic sense).

FIG. 291 is an example of a slider (control of a sense).

FIG. 292 is an explanatory view showing control of static friction and dynamic friction.

FIG. 293 is an explanatory view showing control of dynamic friction (to achieve iso-period).

FIG. 294 is an explanatory view showing control of static friction.

FIG. 295 is an explanatory view showing control of static friction.

FIG. 296 is an explanatory view showing control of static friction.

FIG. 297 is an explanatory view showing control of dynamic friction.

FIG. 298 is an explanatory view showing control of a sense of depressing a button.

FIG. 299 is an explanatory view showing control of a sense of depressing a button (double trigger).

FIG. 300 is an explanatory view showing control of a sense of depressing a button.

FIG. 301 is an explanatory view showing control of a sense of depressing a button (shutter button).

FIG. 302 is an explanatory view showing control of a sense of depressing a button.

FIG. 303 is an explanatory view showing control of a sense of depressing a button (latch).

FIG. 304 is an explanatory view showing control of a sense of depressing a button (equally spaced thresholds).

FIG. 305 is an explanatory view showing control of a sense of depressing a button (unequally spaced thresholds).

FIG. 306 is an explanatory view showing control of a sense of depressing a button (equally spaced thresholds).

FIG. 307 is an explanatory view showing control of a sense of depressing a button (unequally spaced thresholds).

FIG. 308 is an explanatory view showing control of a sense of depressing a button (equally spaced thresholds).

FIG. 309 is an explanatory view showing control of a sense of depressing a button (unequally spaced thresholds).

FIG. 310 is an explanatory view showing control of a sense of depressing a button (hysteresis).

FIG. 311 is an explanatory view showing control of a sense of depressing a button (control of a finger pressure function).

FIG. 312 is an explanatory view showing control of a sense of depressing a button (adaptive control of a waveform).

FIG. 313 is an explanatory view showing control of a sense of depressing a button (3D vibration control).

FIG. 314 is an explanatory view showing control of a sense of depressing a button (in accordance with a state).

FIG. 315 is an explanatory view showing control of a sense of depressing a button (induction of muscle reflexes).

FIG. 316 is an explanatory view showing control of a sense of depressing a button (temporal pattern control).

FIG. 317 is an explanatory view showing control of a sense of depressing a button (threshold control).

FIG. 318 is an explanatory view showing control of a sense of depressing a button (pulse amplitude control).

FIG. 319 is an explanatory view showing control of a sense of depressing a button (waveform control).

FIG. 320 is an explanatory view showing control of a sense of depressing a button (masking control).

FIG. 321 is an explanatory view showing control of a sense of depressing a button (dynamic and static friction).

FIG. 322 is an explanatory view showing control of a sense of depressing a button (phase control).

FIG. 323 is an explanatory view showing control of a sense of depressing a button (depression at regular intervals).

FIG. 324 is an explanatory view showing control of a sense of depressing a button (depression at irregular intervals).

FIG. 325 is an explanatory view showing control of a sense of depressing a button (equally spaced thresholds).

FIG. 326 is an explanatory view showing a haptic sense dial (basic representation and control functions).

FIG. 327 is an explanatory view showing a dial (a sense of acceleration).

FIG. 328 is an explanatory view showing a dial (a sense of resistance).

FIG. 329 is an explanatory view showing a dial (a sense of horizontal acceleration).

FIG. 330 is an explanatory view showing a dial (variable touch).

FIG. 331 is an explanatory view showing a dial (a sense of randomness).

FIG. 332 is an explanatory view showing a volume dial (a sense of click-clack).

FIG. 333 is an explanatory view showing a volume (a sense of receiving guidance on the circumference of a circle).

FIG. 334 is an explanatory view showing a volume (a sense of receiving guidance on the circumference of a circle and a sense of resistance).

FIG. 335 is an explanatory view showing a volume switch (a sense of decision).

FIG. 336 is an explanatory view showing waveform control (variations of vibration phase).

FIG. 337 is an explanatory view showing a device size and shape characteristics.

FIG. 338 is an explanatory view showing a device size and shape characteristics.

FIG. 339 is an explanatory view showing a structure of texture.

FIG. 340 is an explanatory view showing a database of a texture structure.

FIG. 341 is an explanatory view showing wavelength control (2D amplitude direction control).

FIG. 342 is a use example (a digital mouse (panel mouse))

FIG. 343 is an explanatory view showing measurement of individual properties.

FIG. 344 is an explanatory view showing actuator control.

FIG. 345 is an explanatory view showing a profiling.

FIG. 346 is an explanatory view showing a palpation simulator.

FIG. 347 is an example of application (remote synchronization).

DETAILED DESCRIPTION OF THE INVENTION

In view of the above, a first object of the invention is to provide a haptic information presentation system and method, in which in a conventional non-grounding man-machine interface having no reaction base on the human body and for giving the existence of a virtual object and the impact force of a collision to a person, a haptic information presentation mechanism using human sensory characteristics is realized, so that haptic information of vibration, torque, force and the like can be continuously presented in the same direction, which can not be presented only by the physical characteristics of a haptic presentation device.

Besides, when a physical quantity continues to be continuously presented in the man-machine interface, in case the performance of the presentation device is sufficiently high, the physical quantity such as the torque or force can continue to be continuously presented in the same direction. However, actually, the performance of the presentation device is not infinite, and in the case where the performance of the presentation device is not sufficient, for example, when the torque continues to be continuously presented, it becomes necessary to return the rotation velocity of the rotator to the initial state in one cycle of the presentation. That is, it is required that the integral value of the angular momentum vector of the rotator is made zero. In this case, the quite opposite torque or force is presented, and there arises a problem that the senses in the positive direction and the negative direction cancel each other out.

Thus, a second object of the invention is to provide a haptic information presentation system and method, in which human sensory characteristics are used, and in an operation of a haptic presentation device, even if a return is made physically to the initial state in one cycle, and a integral value of physical quantity becomes zero, a integral value of a sensory quantity does not become zero, and a sense can continue to be presented freely in an arbitrary direction.

In order to achieve the above object, according to a first aspect of the invention, a haptic information presentation system includes a haptic presentation unit having two eccentric rotators, and a control unit that independently changes a frequency and an intensity of a vibration and/or a vibration sensation by controlling rotation directions, a phase relation and rotation speeds of the two eccentric rotators.

According to a second aspect of the invention, a haptic information presentation system includes a haptic presentation unit having two eccentric rotators, and a control unit that independently changes a frequency and an intensity of a force and/or a force sensation by inverting rotation directions of the two eccentric rotators.

According to a third aspect of the invention, a haptic information presentation system includes a haptic presentation unit having an eccentric rotator array in which plural single eccentric rotators, and/or plural twin eccentric rotators each having two eccentric rotators, and/or plural twin eccentric rotators arranged in a three-dimensional space are arranged two-dimensionally or three-dimensionally, and a control unit to control a rotation state of each of the eccentric rotators included in the haptic presentation unit.

According to a fourth aspect of the invention, a haptic information presentation system includes a haptic presentation unit having plural rotators arranged three-dimensionally, and a control unit to control a temporal change of a resultant angular momentum vector of the haptic presentation unit, in which the control unit generates a torque with a fixed value by abruptly changing the resultant angular momentum vector in the vicinity of zero, and controls a precession torque to be a specified value or less.

According to a fifth aspect of the invention, in a haptic information presentation method, when a haptic presentation unit having two eccentric rotators is controlled, a frequency and an intensity of a vibration and/or a vibration sensation are independently changed by controlling rotation directions, a phase relation and rotation speeds of the two eccentric rotators.

According to a sixth aspect of the invention, in a haptic information presentation method, when a haptic presentation unit having two eccentric rotators is controlled, a frequency and an intensity of a force and/or a force sensation are independently changed by inverting rotation directions of the two eccentric rotators.

According to a seventh aspect of the invention, in a haptic information presentation method, when a control is made on a haptic presentation unit having an eccentric rotator array in which plural single eccentric rotators, and/or plural twin eccentric rotators each having two eccentric rotators arranged on a same rotation axis, and/or plural twin eccentric rotators arranged in a three-dimensional space are arranged two-dimensionally or three-dimensionally, a rotation state of each of the eccentric rotators included in the haptic presentation unit is individually controlled.

According to an eighth aspect of the invention, in a haptic information presentation method, when a haptic presentation unit having plural rotators arranged three-dimensionally is controlled, a temporal change of a resultant angular momentum vector of the haptic presentation unit is controlled, a torque with a fixed value is generated by abruptly changing the resultant angular momentum vector in the vicinity of zero, and a precession torque is controlled to have a specified value or less.

When the haptic information presentation system of the invention and the haptic information presentation method are carried out, special effects listed below can be obtained.

(1) It becomes possible to continuously or intermittently present the haptic information of the torque, force and the like in the same direction, which has been difficult in a conventional man-machine interface which is of a non-grounding type and has no reaction base on the body.

(2) By using human sensory characteristics and illusion, it becomes possible to present the haptic sensory-physical characteristics of the torque, force or the like, which can not exist physically, to a person.

(3) By using the human sensory characteristics, it becomes possible to present the haptic information efficiently while energy is saved, and a miniaturized haptic presentation system can be realized.

(4) In order to present a vibration sensation, a torque sensation, and a force sensation, a device corresponding to each of them is conventionally required. However, according to the invention, it becomes possible to simultaneously present one or more of the vibration sensation, the torque sensation, and the force sensation by one mechanism of the eccentric rotators, various haptic information can be presented, and the presentation system can be miniaturized.

(5) By carrying out the invention, it is possible to realize a useful man-machine interface, an interface between a robot and a machine, an interface between an animal and a machine, and the like, which can be mounted on an equipment used in the field of VR (Virtual Reality), an equipment used in the field of game, a cellular phone, a portable navigation equipment, a PDA (Personal Digital Assistant) and the like. For example, in the field of the VR, the existence of an object in a virtual space or the shock due to a collision can be presented by presenting a force to a person through the man-machine interface or by giving a resisting force or reaction force. Besides, by mounting the interface on the cellular phone, portable navigation equipment, PDA, or the like, various instructions, guides and the like, which have not existed conventionally, can be realized through the skin of an operator.

(6) An eccentric rotator which is conventionally known and is used in a manner mode of a cellular phone or the like, the vibration intensity is increased by increasing the rotation velocity, and the vibration frequency and the vibration intensity have not been capable of being independently controlled. However, in the eccentric rotator to which the invention is applied, the vibration intensity of the eccentric vibration can be changed without changing the rotation velocity. By this, it becomes possible to independently control the vibration frequency and the vibration intensity.

(7) According to the sheet-shaped eccentric rotator array to which the invention is applied, by suitably controlling the rotations of the respective eccentric rotators, the vibration sensation, torque sensation, and force sensation of various patterns in space and time can be presented onto the palm. Besides, the sheet-shaped eccentric rotator array can be applied to a glove, (8) According to the sheet-shaped eccentric rotator array to which the invention is applied, various haptic information relating to an object, such as the existence, shape, elasticity, texture and the like of a virtual object, can be presented by suitably changing a space portion of a force sensation in accordance with the movement of a palm or the like.

(9) In an inertia coordinate system, in the case where the temporal change of the resultant angular momentum vector is controlled, the easiness of the control is a great merit. That is, the resultant angular momentum vector is abruptly changed in the vicinity of zero, so that a large torque is generated, and a precession torque can be suppressed to be low. Besides, in the case where the torque presentation device sways according to the movement of the user and difficulty occurs, the resultant angular momentum vector is temporarily changed in the vicinity of the resultant angular momentum vector with a suitable magnitude, so that a specified torque can be presented while the sway of the torque presentation device is suppressed.

Hereinafter, embodiments of the invention will be described with reference to the drawings.

(Operation Principle 1)

Figure 1:
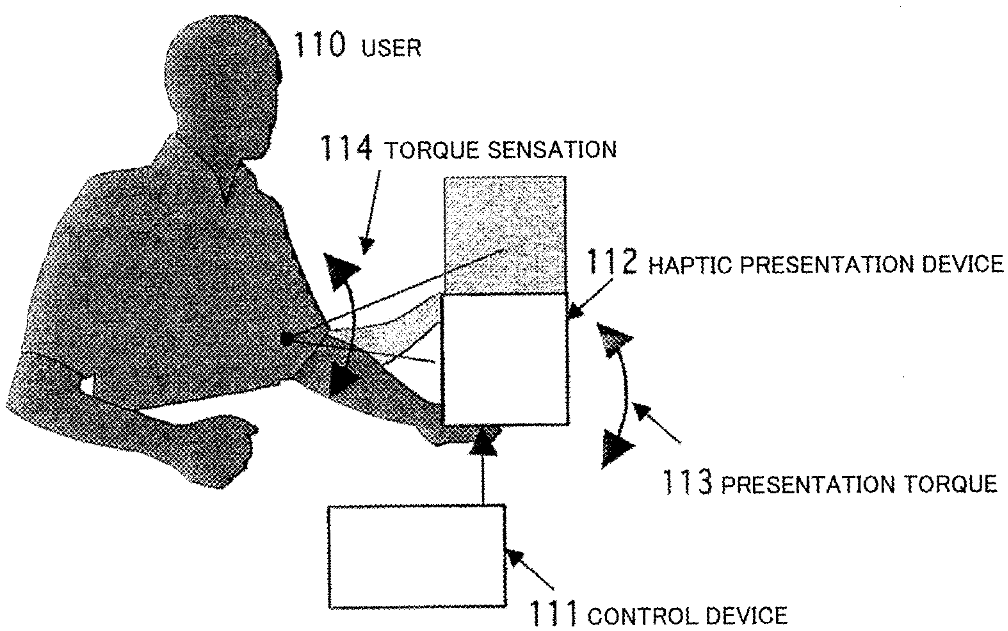
FIG. 1 is a view showing a rough structure of a haptic information presentation system of an embodiment of the invention.

FIG. 1 is a view showing a rough structure of a haptic information presentation system of an embodiment of the invention.

A haptic presentation device 112 is such that the rotation velocity of at least one rotator in the haptic presentation device 112 is controlled by using a control device 111, and a vibration, force or torque as its physical characteristics is controlled, so that a user 110 is made to perceive various haptic information such as the vibration, force or torque.

Hereinafter, although the haptic information presentation system of the embodiment will be described with reference to FIGS. 2A to 40 in addition to FIG. 1, before that, the outline of the block structure of the system will be described with reference to a block diagram of the haptic information presentation system of the embodiment of FIG. 41 attached to the end of the drawings.

Figure 41:
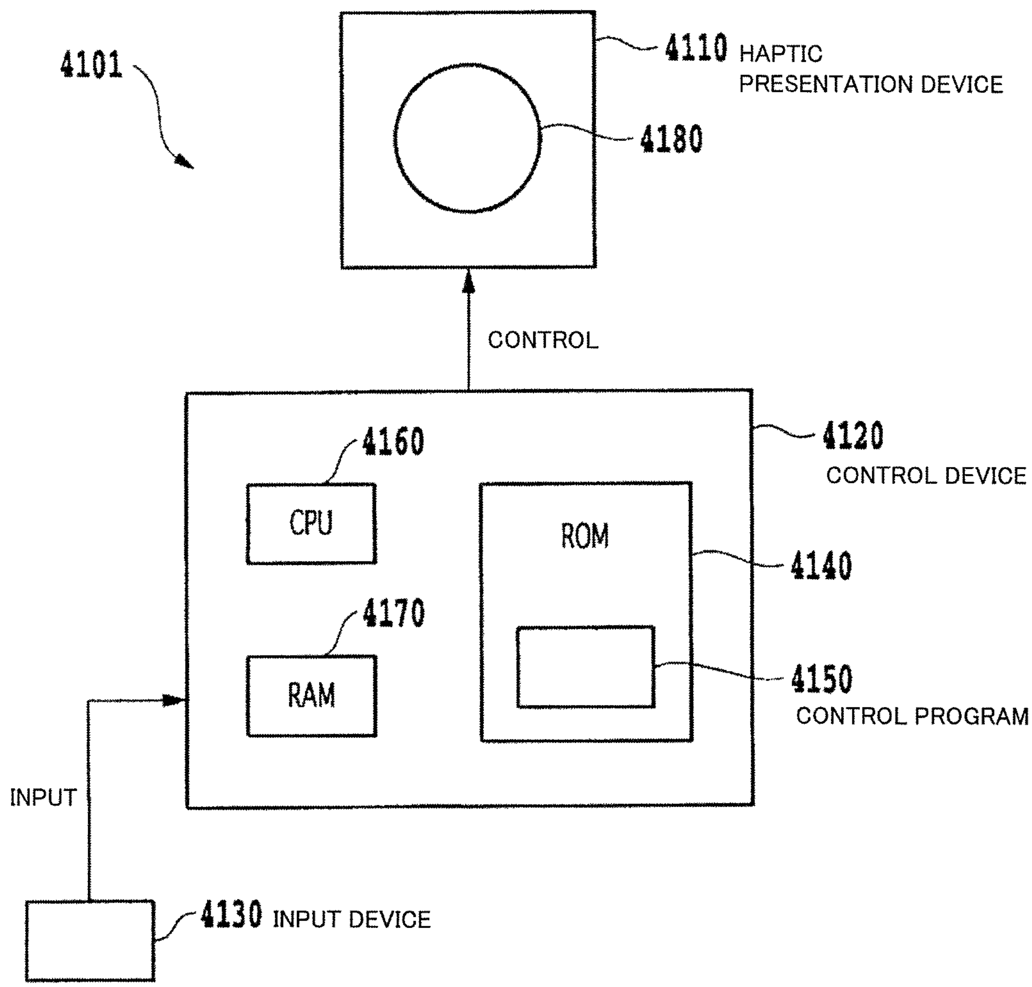
FIG. 41 is a block diagram of a haptic information presentation system of the embodiment.

In FIG. 41, a haptic information presentation system 4101 includes a haptic presentation device 4110, a control device 4120, and an input device 4130. The haptic presentation device 4110 includes therein at least one rotator 4180 rotated by a motor, and it is rotated by the control from the control device 4120. A stepping motor, a servo motor, or the like can be applied to the driving of the rotator 4180. The control device 4120 includes a CPU (central processing unit) 4160, a RAM (random access memory) 4170, a ROM (read only memory) 4140 and the like.

The CPU 4160 controls the whole operation of the control device 4120. The RAM 4170 is used as a work area to temporarily store data of a processing object and the like when the CPU 4160 performs the processing. A control program 4150 is previously stored in the ROM 4140. The control program 4150 is a program to prescribe the control processing of the haptic presentation device 4110 corresponding to the input signal from the input device 4130. The CPU 4160 reads the control program 4150 from the ROM 4140 and executes it, and controls the rotator 4180 of the haptic presentation device 4110 correspondingly to the respective input signals.

The input device 4130 is, for example, a select button of an input menu. The CPU 4160 performs a processing (for example, the haptic presentation device 4110 is controlled so as to generate a torque in a specified rotation direction) corresponding to the input of the select button selected by depression, touch or the like. The input device 4130 as stated above may be united with the control device 4120 and made a part of the control device 4120.

Alternatively, the input device 4130 is a device such as a well-known myoelectric detector to detect myoelectricity described later, or a well-known angular acceleration sensor. When a trigger signal of myoelectricity occurrence from the myoelectric detector, or a signal of angular acceleration from the angular acceleration sensor is inputted to the control device 4120, the CPU 4160 feeds back the input and controls the haptic presentation device 4110. The input device 4130 such as the angular acceleration sensor, together with the haptic presentation machine 4110, may be included in the inside of the haptic presentation device 4110.

Since a general processing method in which the CPU 4160 reads the control program 4150 from the ROM 4140 and executes it so that the control of the rotator 4180 of the haptic presentation device 4110 is performed correspondingly to each input signal, is well known for one skilled in the art through non-patent documents 1 and 2 and the others, the detailed description would be unnecessary. Accordingly, in the following, a description will be given to a processing method of the control device in the haptic information presentation system and the structure of the haptic presentation device, which are features of the embodiment.

FIGS. 2A, 2B, 3A and 3B are views showing the haptic information presentation method in which a sensory characteristic relating to a haptic sense is used and the haptic presentation device is controlled by the control device of the haptic information presentation system.

Figure 2A:
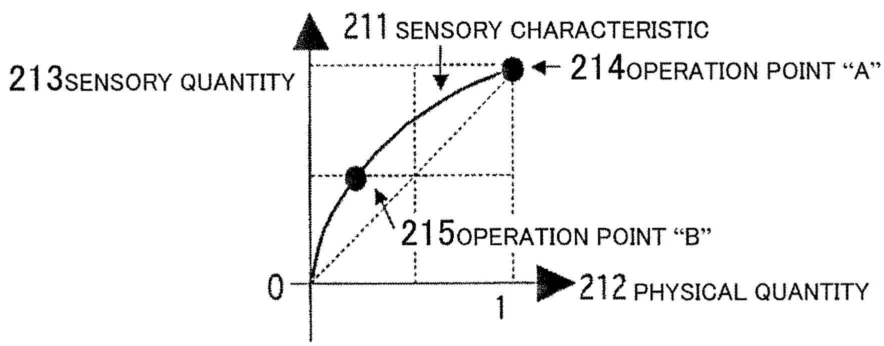
FIGS. 2A and 2B are views showing a haptic information presentation method using a sensory characteristic relating to a haptic sense.
Figure 2B:
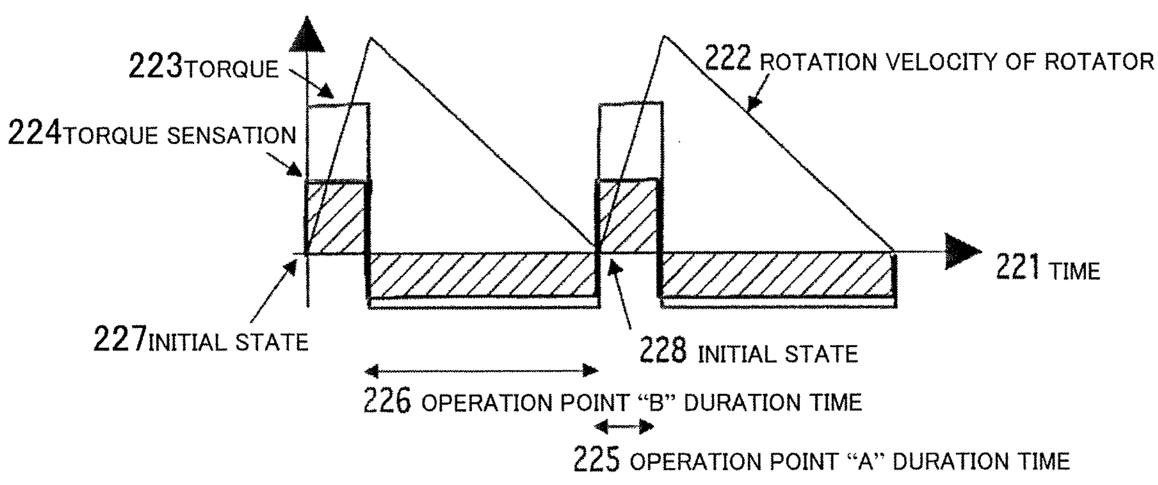

In a sensory characteristic 211, a sensory quantity 213 thereof is often a nonlinear characteristic, such as a logarithm, with respect to a physical quantity 212 which is mainly a stimulus. FIG. 2A schematically shows a case where the sensory characteristic 211 is a logarithmic function characteristic. When consideration is given to a case where a positive torque is generated at an operation point A 214 on the sensory characteristic 211, and a negative torque in the reverse direction is generated at an operation point B 215, a torque sensation 224 is represented as shown in FIG. 2B. A torque 223 is proportional to the time differential of a rotation velocity (angular velocity) 222. When an operation is performed at the operation point A 214 and the operation point B 215, the torque sensation 224 is perceived. The torque 223 is physically returned to an initial state 228 in one cycle, and an integral value thereof is zero. However, a sensory integral value of the torque sensation 224 as the sensory quantity does not necessarily become zero. By suitably selecting the operation point A 214 and the operation point B 215 and by suitably setting an operation point A duration time 225 and an operation point B duration time 226, the torque sensation can freely continue to be presented in an arbitrary direction.

The above is established also when the sensory characteristic 211 exhibits a nonlinear characteristic of an exponential function case or the like.

Figure 3A:
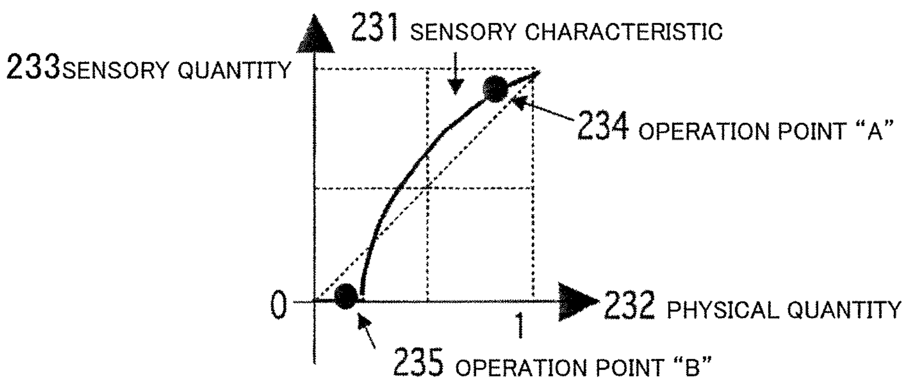
FIGS. 3A and 3B are views showing a haptic information presentation method using a sensory characteristic relating to a haptic sense.
Figure 3B:
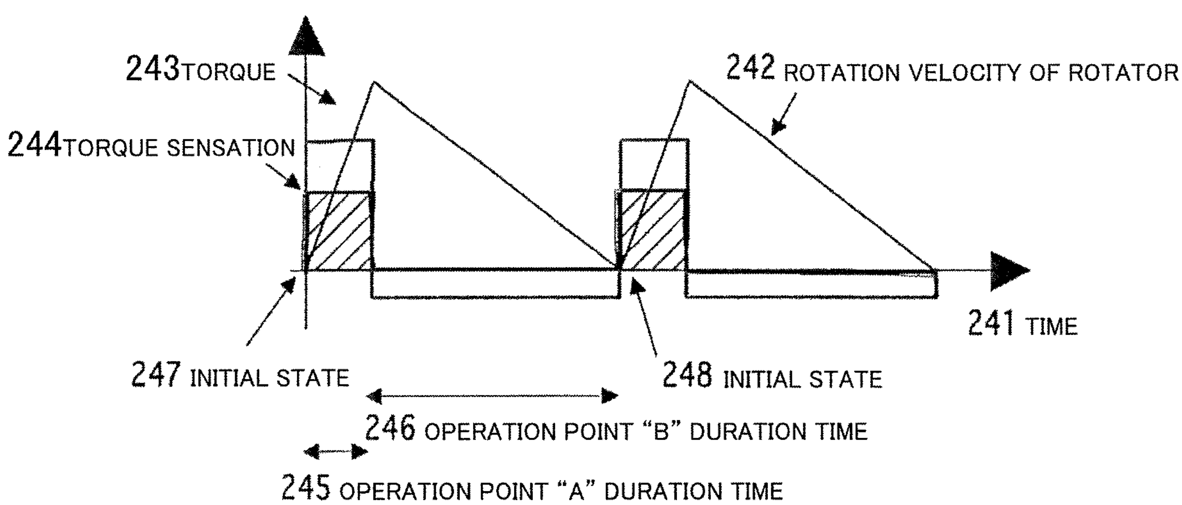

FIG. 3A schematically shows a case where a sensory characteristic 231 has a threshold value. When consideration is given to a case where a positive torque is generated at an operation point A 234 on the sensory characteristic 231, and a negative torque in the reverse direction is generated at an operation point B 235, a torque sensation 244 is represented as in FIG. 3B.

Similarly to the case which is shown in FIG. 2A and FIG. 2B and in which the sensory characteristic is nonlinear, a torque 243 is physically returned to an initial state 248 in one cycle, and an integral value thereof is zero. However, since the torque sensation 244 as the sensory quantity is the sensory threshold value or less in a section of an operation point B duration time 246, it becomes zero. As a result, a torque sensation can continue to be intermittently presented only in one direction.

Figure 4A:
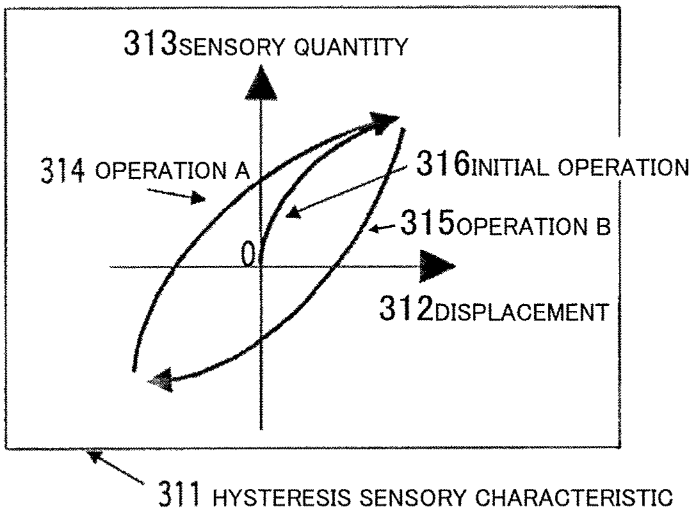
FIGS. 4A to 4C are views showing a haptic information presentation method using a hysteresis sensory characteristic relating to a haptic sense.
Figure 4B:
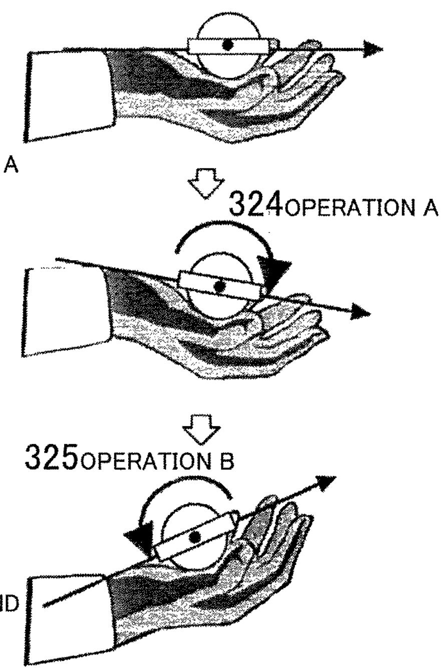
Figure 4C:
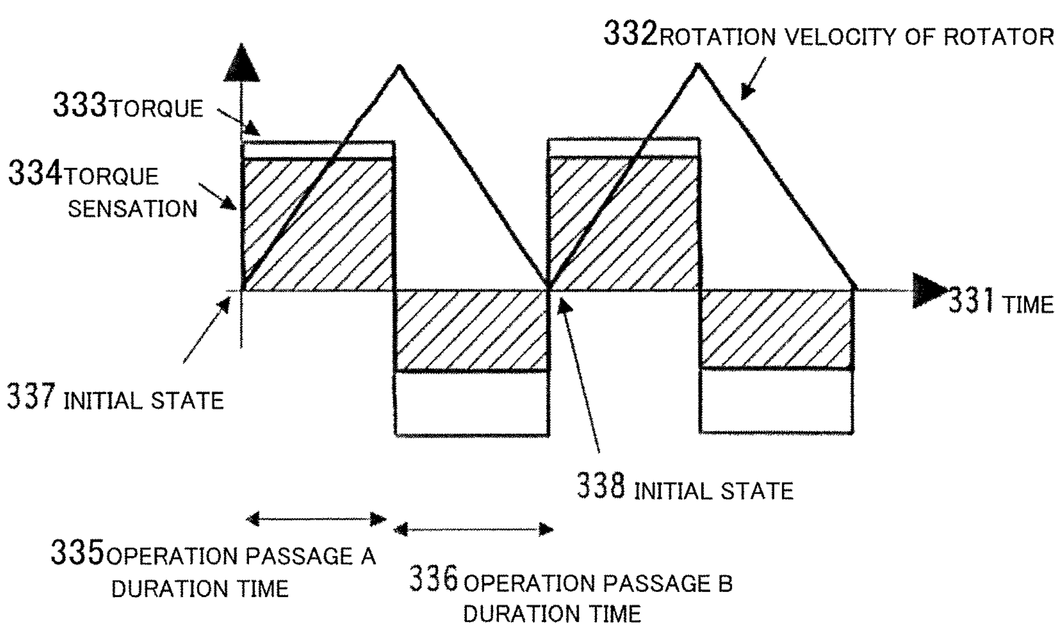

FIGS. 4A to 4C are views showing a haptic information presentation method using a hysteresis sensory characteristic relating to a haptic sense.

The sensory characteristic is not isotropic between a time when a displacement 312 is increased and a time when it is decreased, for example, between a time when a muscle is extended and a time when it is contracted, and often indicates a hysteresis sensory characteristic 311. The hysteresis sensory characteristic 311 of FIG. 4A schematically represents the hysteresis characteristic of the sensory characteristic. When consideration is given to a case where a positive torque is generated in an operation passage A 314 on the hysteresis sensory characteristic 311, and a negative torque in the reverse direction is generated in an operation passage B 315, these behaviors are represented as in FIG. 4B, and a torque sensation 334 is represented as in FIG. 4C. A torque 333 is proportional to the time differential of a rotation velocity 332 of a rotator. When an operation is performed in the operation passage A 314 and the operation passage B 315, the torque sensation 334 is perceived. The torque 333 is physically returned to an initial state 338 in one cycle, and an integral value thereof is zero. However, a sensory integral value of the torque sensation 334 as the sensory quantity does not necessarily become zero. By suitably selecting the operation passage A 314 and the operation passage B 315, and by suitably setting an operation passage A duration time 335 and an operation passage B duration time 336, a high torque sensation in an arbitrary direction can continue to be intermittently and continuously presented.

FIGS. 5A to 5C and FIGS. 6A to 6C are views showing, as an example of a method of changing a sensory characteristic, a haptic information presentation method using a method of changing a sensory characteristic by a masking effect relating to a haptic sensation.

Figure 5A:
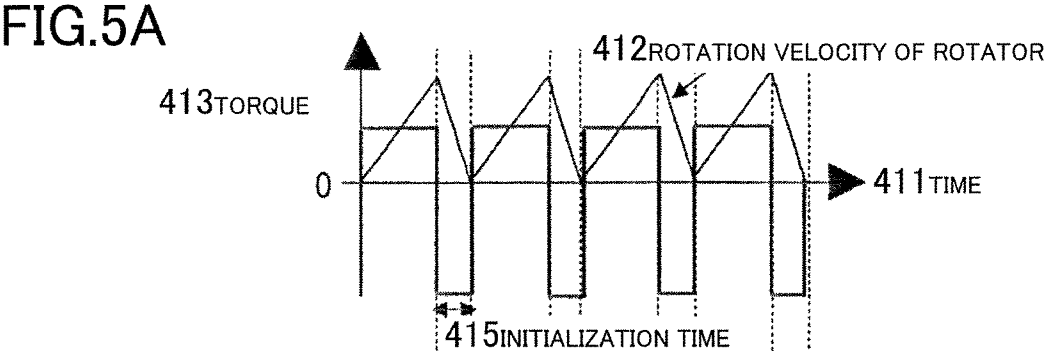
FIGS. 5A to 5C are views showing a haptic information presentation method using a method of changing a sensory characteristic by a masking effect relating to a haptic sense.
Figure 5B:
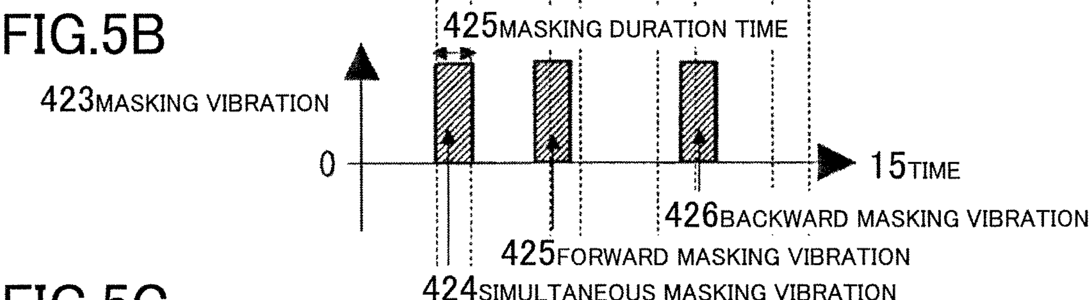
Figure 5C:
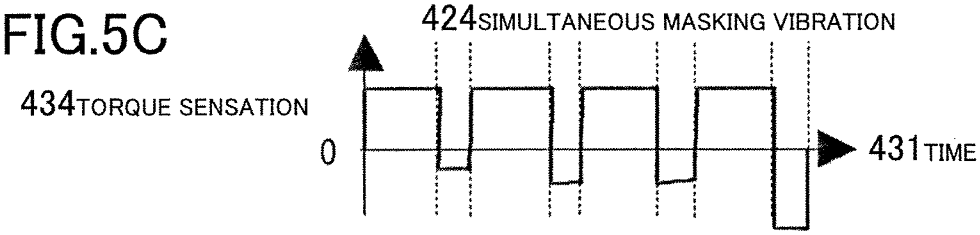

In the sensory characteristic, masking is performed by a masking vibration and a torque sensation 434 is decreased. As this masking method, simultaneous masking 424 (having satisfactory results in masking of the visual sense and hearing sense), forward masking 425, and backward masking 426 are enumerated. FIG. 5A schematically shows a torque 413 as a maskee, and the torque sensation 434 perceived at this time is represented as in FIG. 5C. The torque 413 is proportional to the time differential of a rotation velocity 412 of a rotator.

Figure 6A:
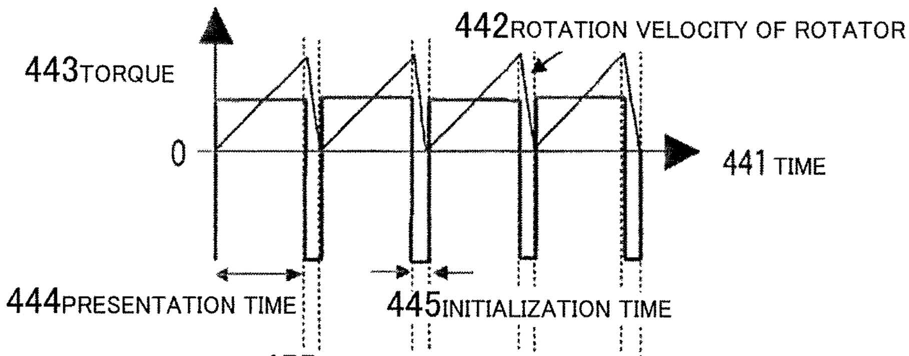
FIGS. 6A to 6C are views showing a haptic information presentation method using a method of changing a sensory characteristic by a masking effect relating to a haptic sense.
Figure 6B:
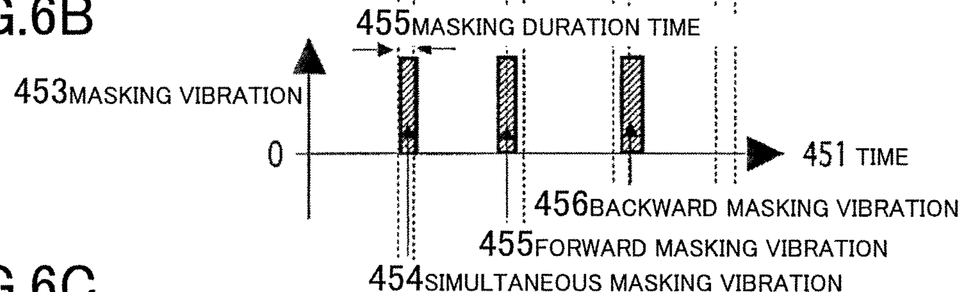
Figure 6C:
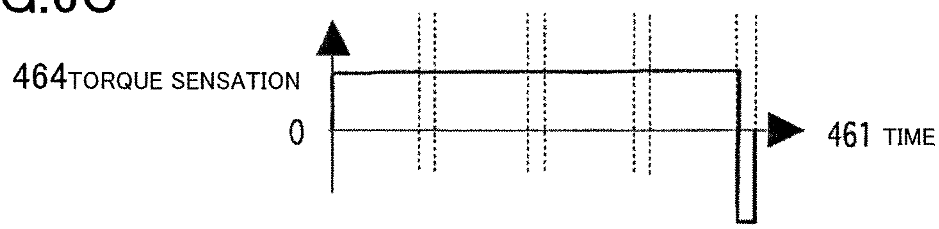

At this time, an initialization time 415 in which the rotation velocity 412 of the rotator is initialized, and a masking duration time 425 corresponding thereto are shortened like an initialization time 445 and a masking duration time 455 shown in FIG. 6A, and when it becomes shorter than a certain specific time, a critical fusion occurs in which although a negative torque due to the initialization physically exists, it is felt as if torque is continuously presented like a torque sensation 464.

Incidentally, a masker to generate a masking vibration may be a rotator different from a rotator as a maskee whose torque is masked by that or the rotator itself as the maskee.

The case where the rotator of the maskee is also the masker means that at the time of masking, the rotator is controlled to generate the masking vibration by the control device. The vibration direction of the masker may be the same as the rotation direction of the rotator as the maskee or may not be the same.

Figure 7A:
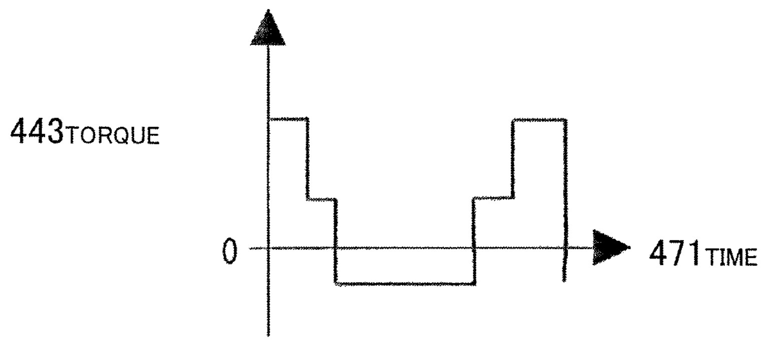
FIGS. 7A and 7B are schematic views showing a method of changing a sensory characteristic by a masking effect relating to a haptic sense.
Figure 7B:
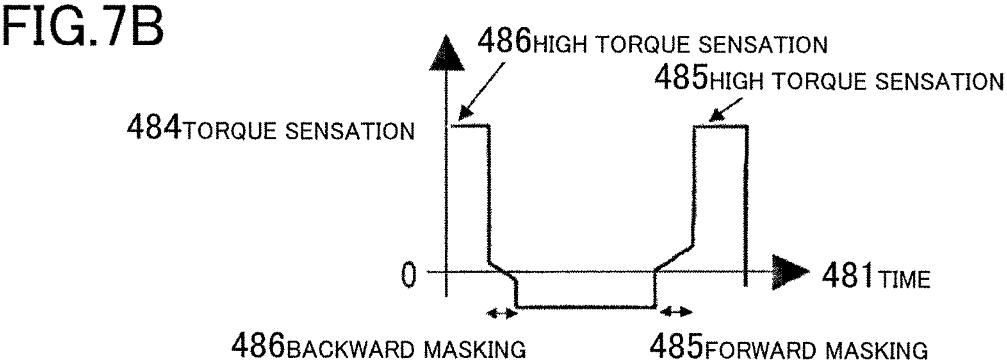

The above can occur also in the case where the maskee and the masker are the same stimulus (in the case where the rotator of the maskee is also the masker). FIGS. 7A and 7B are views schematically showing this case. As shown in FIG. 7B, before and after high torque sensations 485 and 486, a torque sensation 484 is decreased by forward masking 485 and backward masking 486.

Figures 8A, 8B:
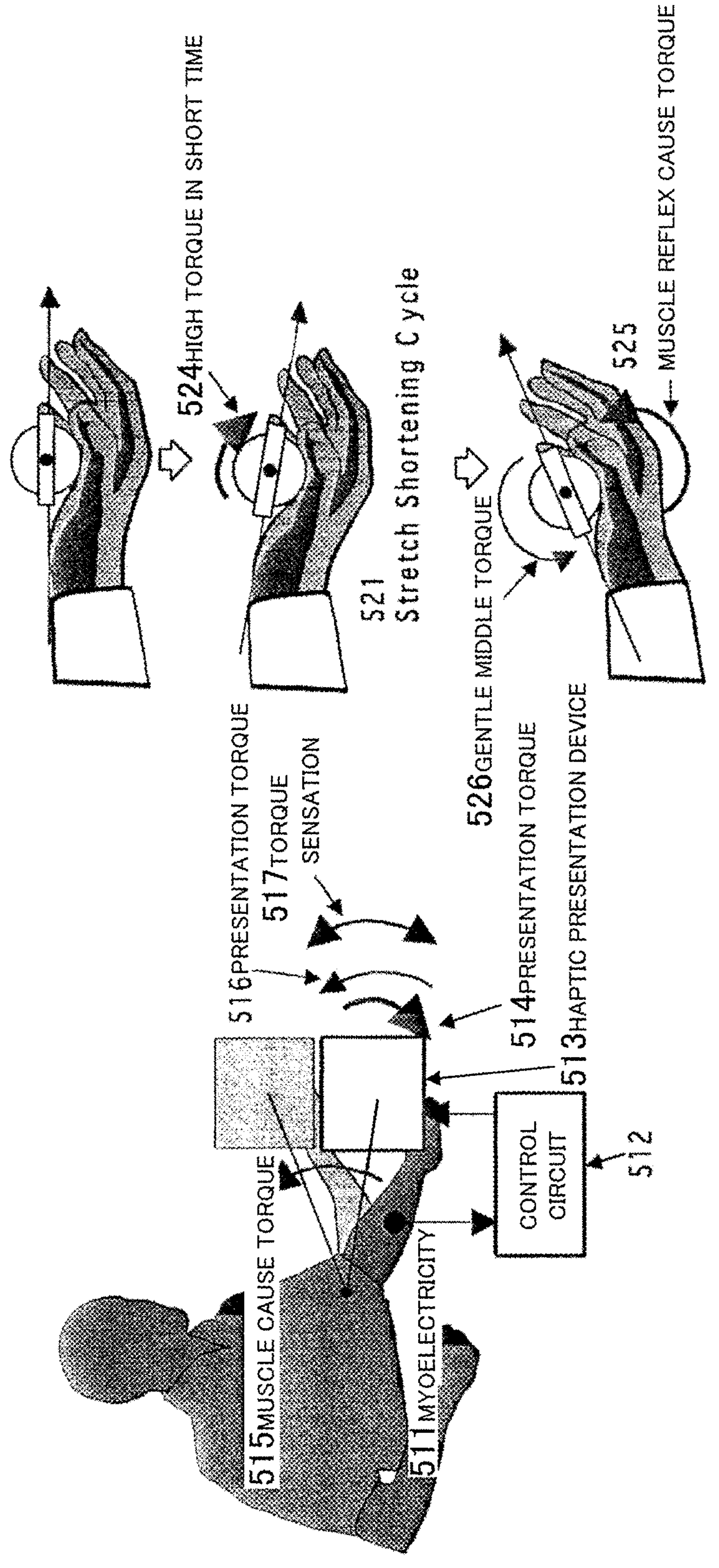
FIGS. 8A and 8B are views showing a haptic information presentation method using a method of controlling haptic information presentation in conformity with a change of a sensory characteristic relating to a haptic sense.

FIGS. 8A and 8B are views showing a haptic information presentation method using a method of controlling haptic information presentation in conformity with changes of sensory characteristics relating to a haptic sense.

With respect to the sensory characteristic, the sensitivity of a torque sensation 517 is changed according to a muscle tensile state or at least one state of physical, physiological and psychological states. For example, when a muscle is instantaneously expanded by a presented torque 514 (high torque 524 in a short time) as an external force, a sensor called a muscle spindle in the muscle senses this, and the muscle is quickly contracted in a conditioned reflex way by a muscle cause torque 515 (muscle reflex cause torque 525) having power not lower than this external force. At this time, myoelectricity 511 is generated. A control circuit 512 having detected it controls a haptic presentation device 513, and changes the sensitivity of the torque sensation 517 by activating a presentation torque 516 (gentle middle torque 526) in synchronization with the contraction of the muscle.

The above is established not only in the muscle tensile state but also in the case of the change of sensory sensitivity due to at least one state of breath, posture and neural firing states.

Figure 9:
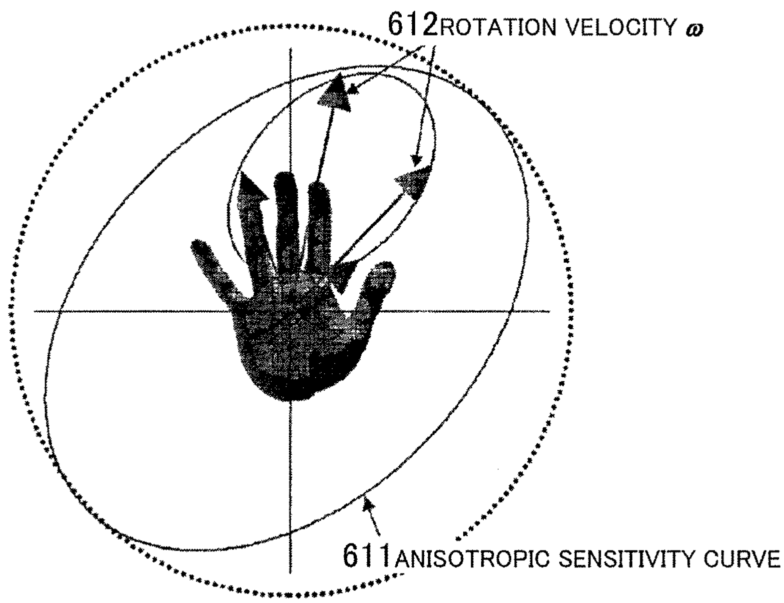
FIG. 9 is a view showing a haptic information presentation method using a method of controlling haptic information presentation in conformity with an anisotropic sensitivity curve change as a sensory characteristic relating to a haptic sense.

FIG. 9 shows a haptic information presentation method using a method of correcting a presentation physical quantity according to a relation between the presentation physical quantity and a sensory quantity with respect to a palm direction and relating to a haptic sense. In the palm, the sensitivity is different according to the palm direction because of the anatomical structure of a skeleton, joint, tendon, muscle and the like. The direction presentation with high precision becomes possible by correcting the intensity (rotation velocity ω 612) of the presentation physical quantity in conformity with the sensitivity (anisotropic sensitivity curve 611) dependent on the palm direction.

Figure 10A:
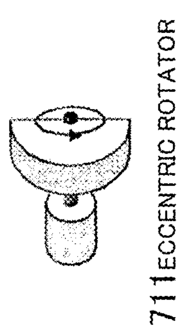
FIGS. 10A to 10D are views showing a haptic information presentation method in which a sensory characteristic relating to a haptic sense is used, and rotation of an eccentric rotator 711 is phase synchronized.
Figure 10C:
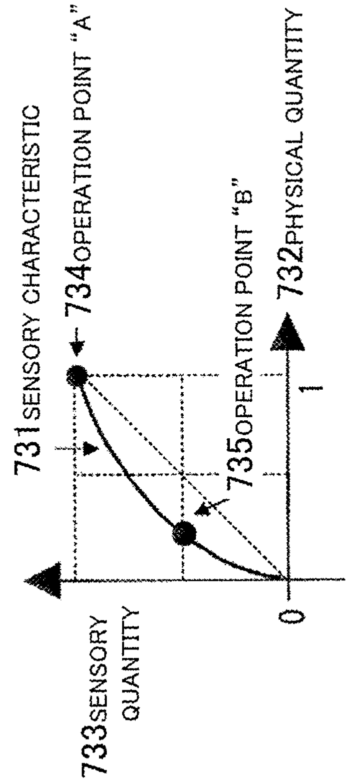
Figure 10B:
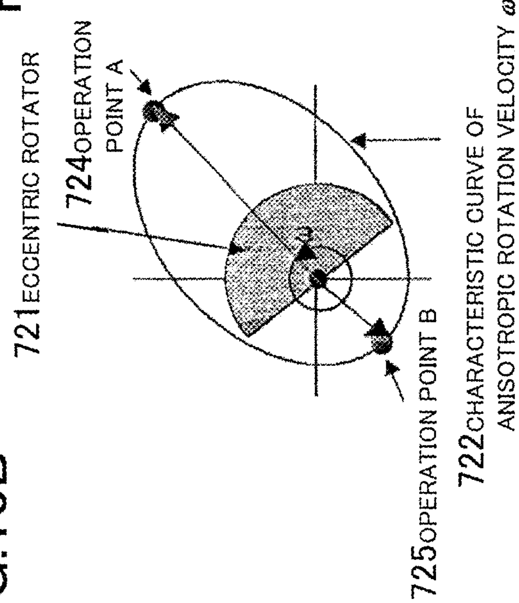
Figure 10D:
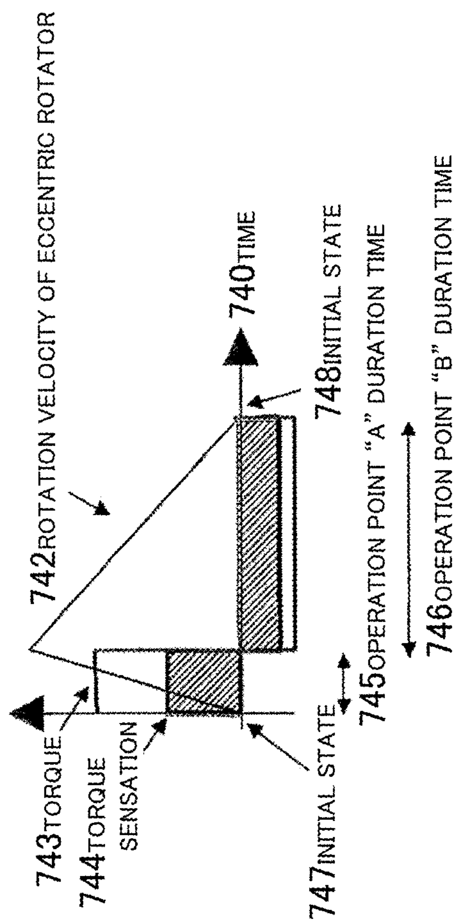

FIGS. 10A to 10D are explanatory views of an eccentric rotator which can be applied to the rotator of the haptic presentation device of the embodiment, and are views showing a haptic information presentation method in which a sensory characteristic relating to a haptic sense is used, and the rotation of an eccentric rotator 711 is phase synchronized as in FIG. 10B.

FIG. 10C schematically shows a case where a sensory characteristic 731 is a logarithmic function characteristic, and the sensory characteristic 731 indicates that similarly to the sensory characteristic 211, a sensory quantity 733 has a nonlinear characteristic of a logarithm or the like with respect to a physical quantity 732 as a stimulus. When consideration is given to a case where a positive torque is generated at an operation point A 734 on the sensory characteristic 731 (vibration is also generated by the eccentricity of the eccentric rotator 711), and a negative torque in the reverse direction is generated at an operation point B 735, a torque sensation 744 is represented as in FIG. 10D. A torque 743 is proportional to the time differential of a rotation velocity 742 of the rotator. When an operation is performed at the operation point A 734 and the operation point B 735, the torque sensation 744 is perceived. The torque 743 is physically returned to an initial state 748 in one cycle, and an integral value thereof is zero. However, the sensory integral value of the torque sensation 744 as the sensory quantity does not necessarily become zero. By suitably selecting the operation point A 734 and the operation point B 735, and by suitably setting an operation point A duration time 745 and an operation point B duration time 746, the torque sensation can continue to be freely presented in an arbitrary direction.

Figure 100:
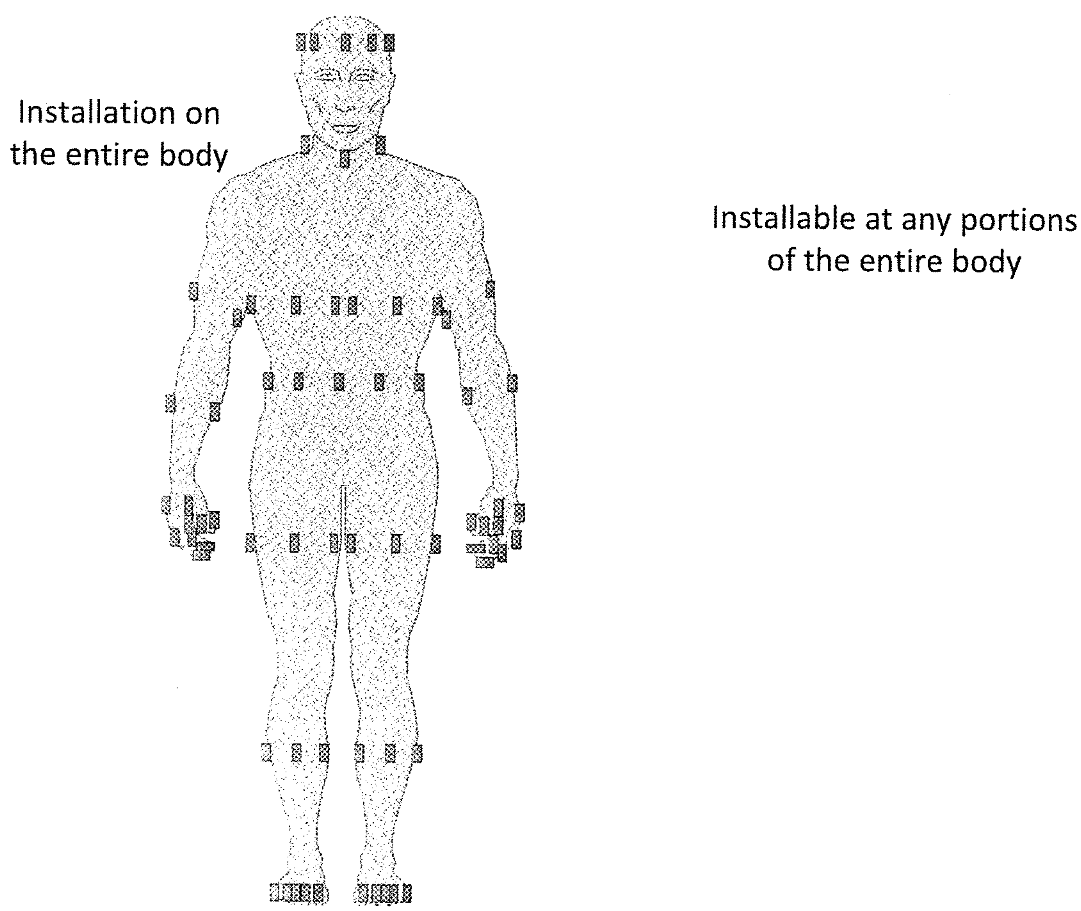
FIG. 100 is an explanatory view showing installation portions.
Figure 101:
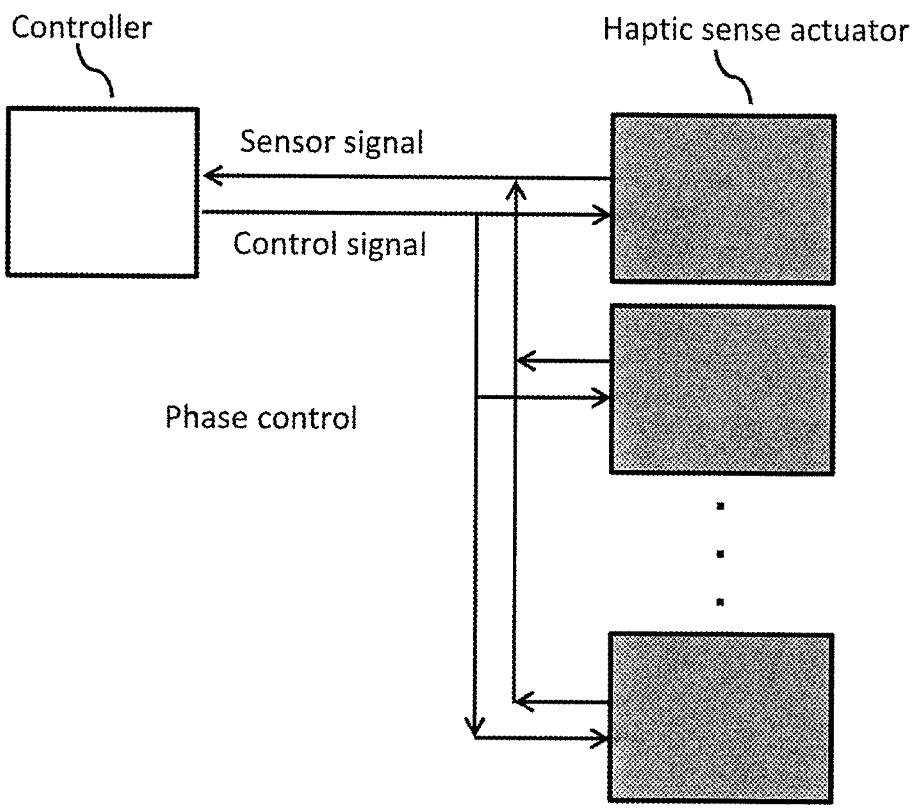
FIG. 101 is an explanatory view showing a variation of control wires (parallel arrangement).
Figure 102:
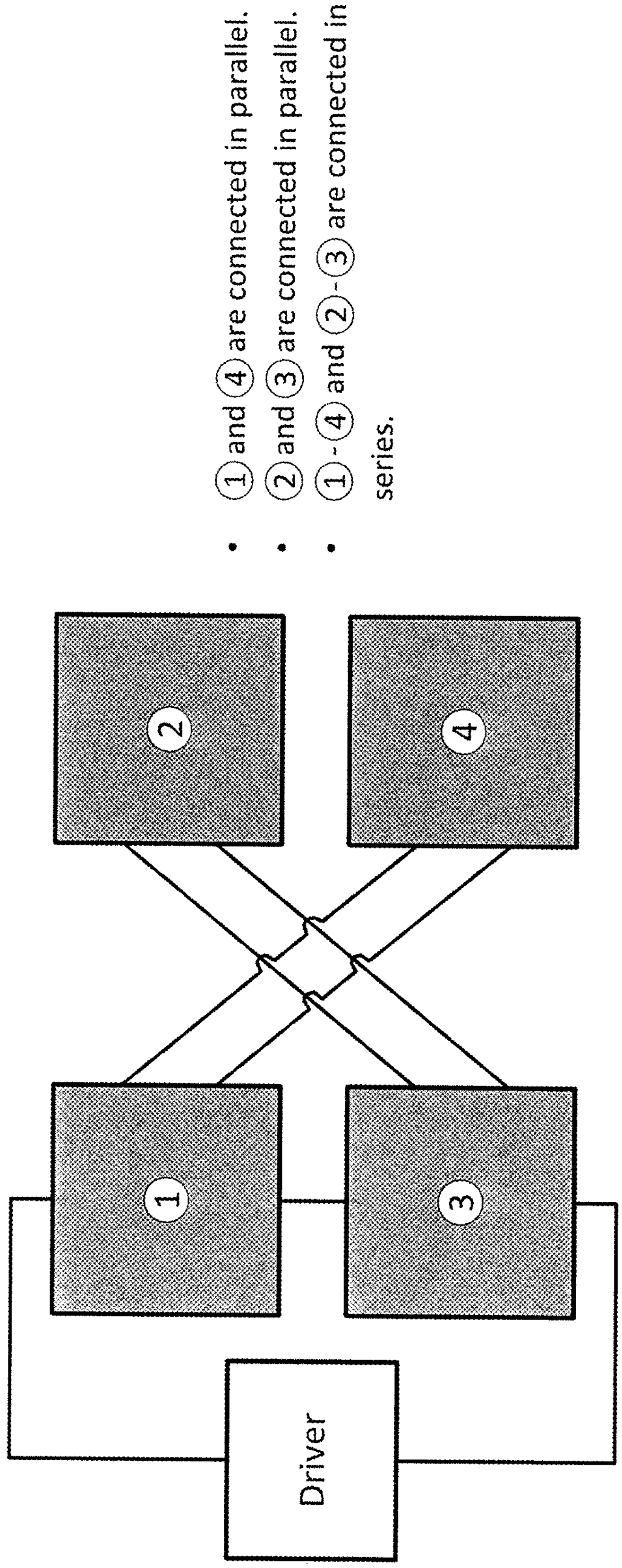
FIG. 102 is an explanatory view showing a variation of control wires (crossed arrangement).
Figure 103:
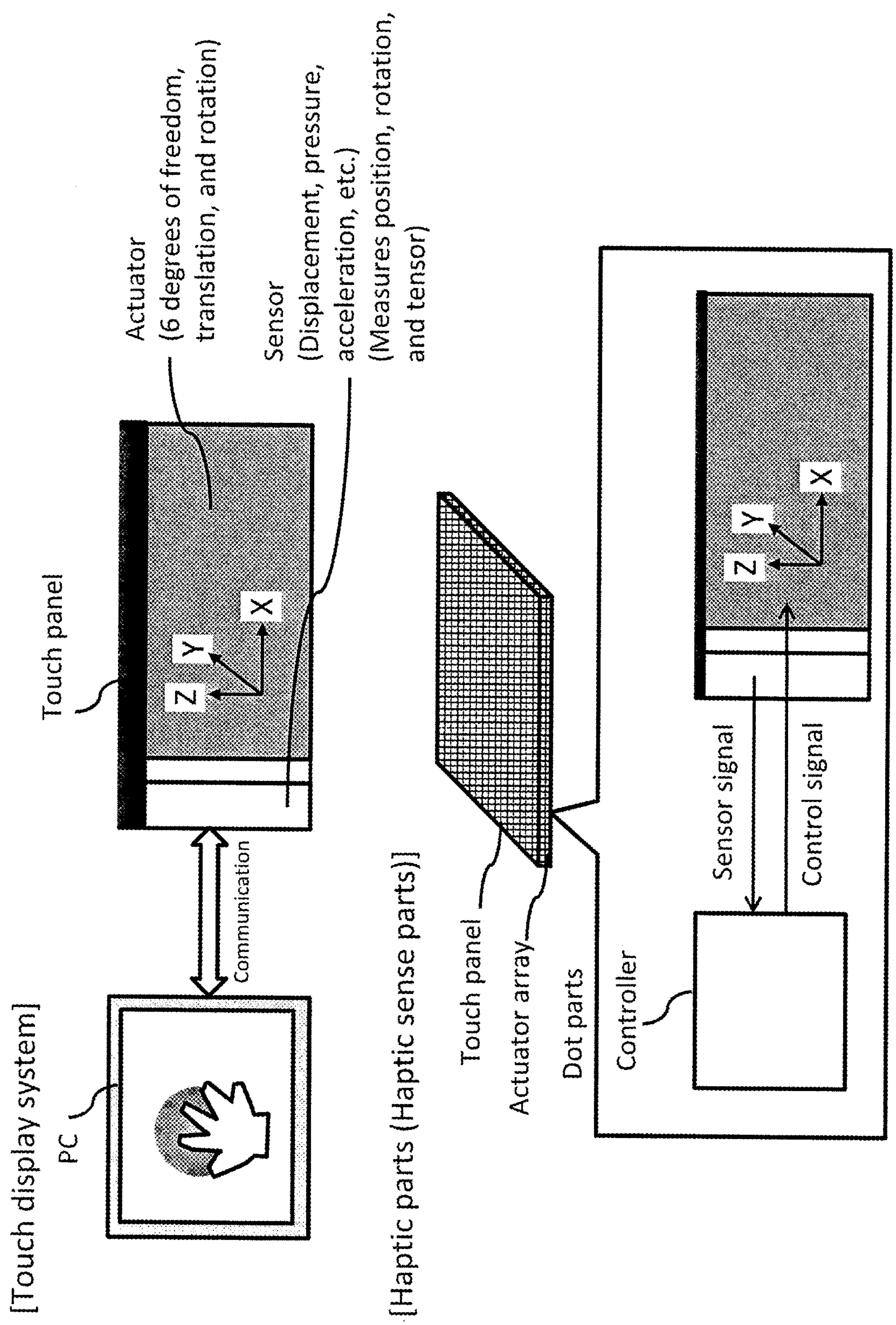
FIG. 103 is an explanatory view showing a system and parts.
Figure 104:
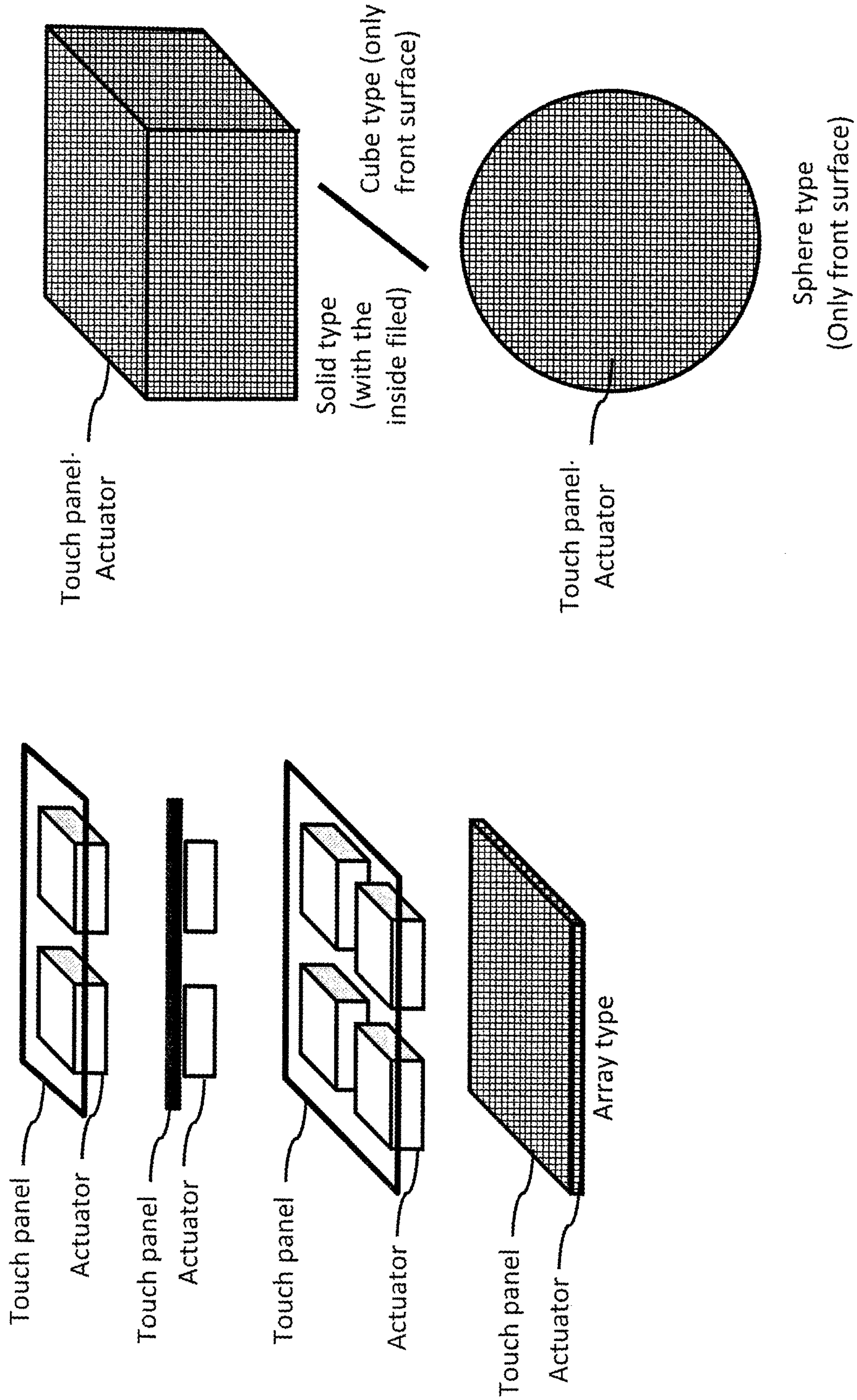
FIG. 104 is an explanatory view showing a variation of module integration.
Figure 105:
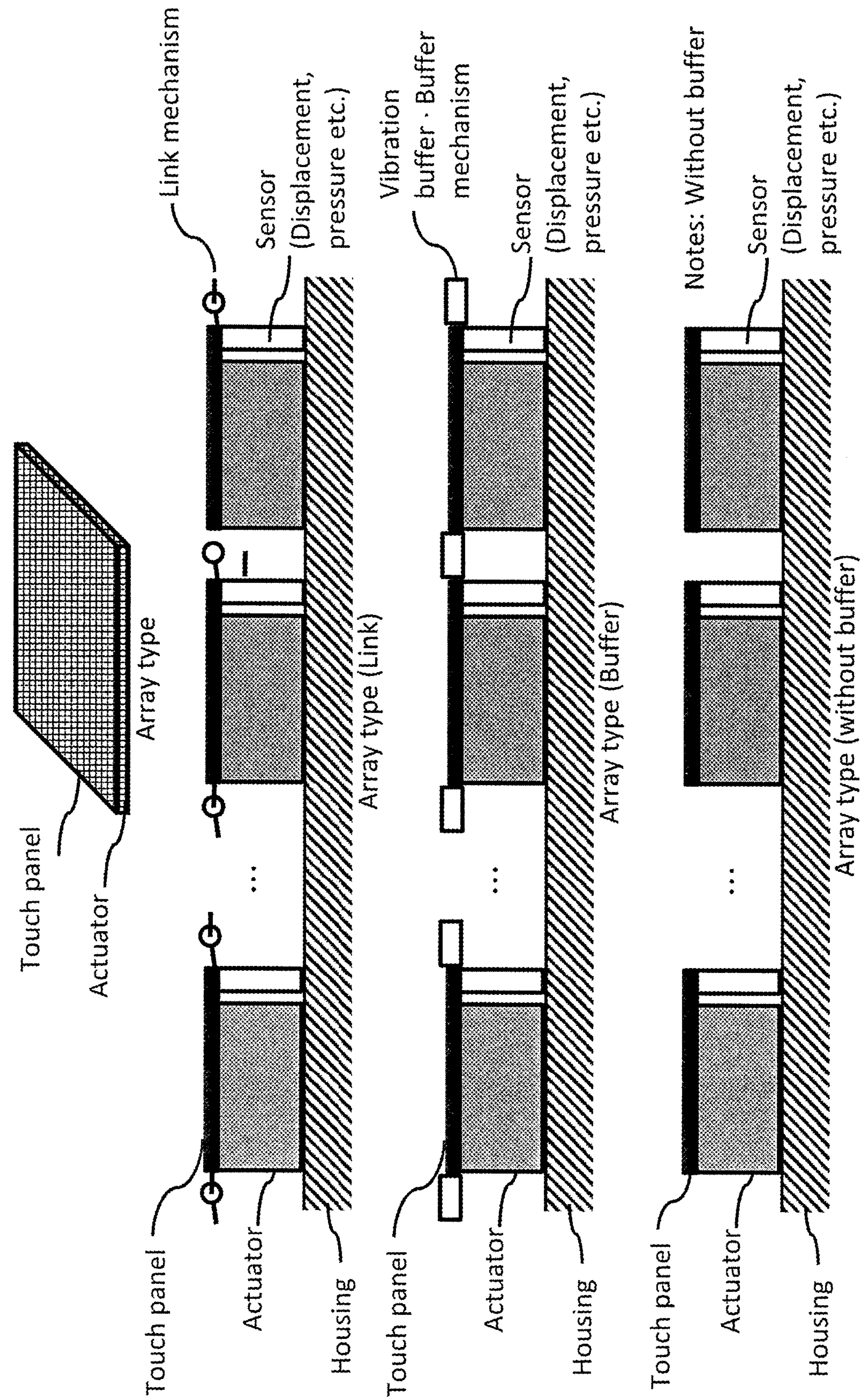
FIG. 105 is an explanatory view showing array type modules (a flat plane, a free-form curved surface).
Figure 108:
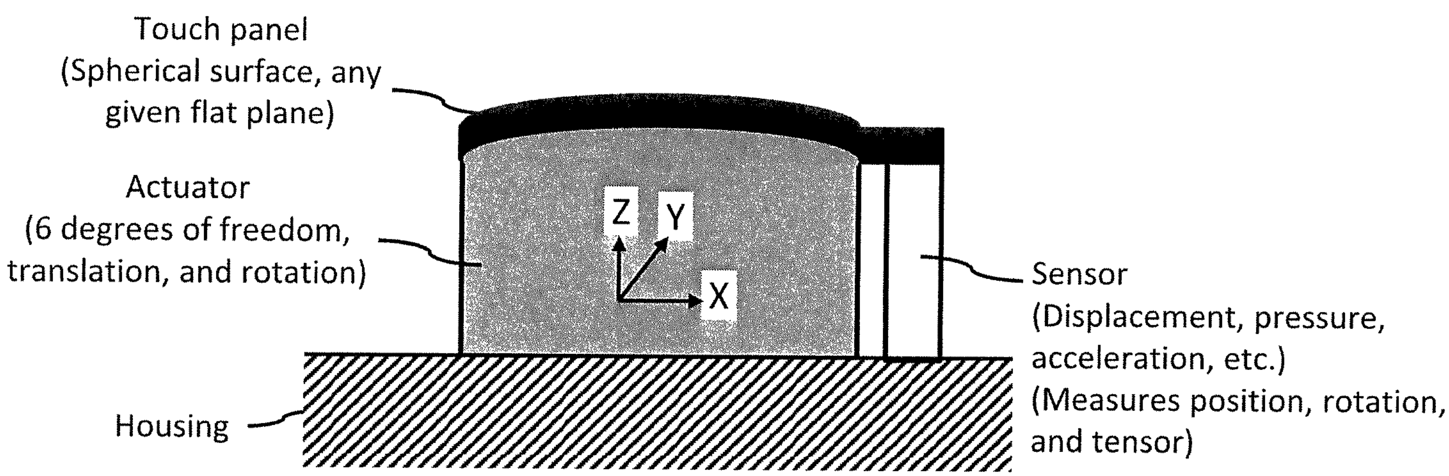
FIG. 108 is an explanatory view showing a basic module of a haptic sense device.
Figure 110:
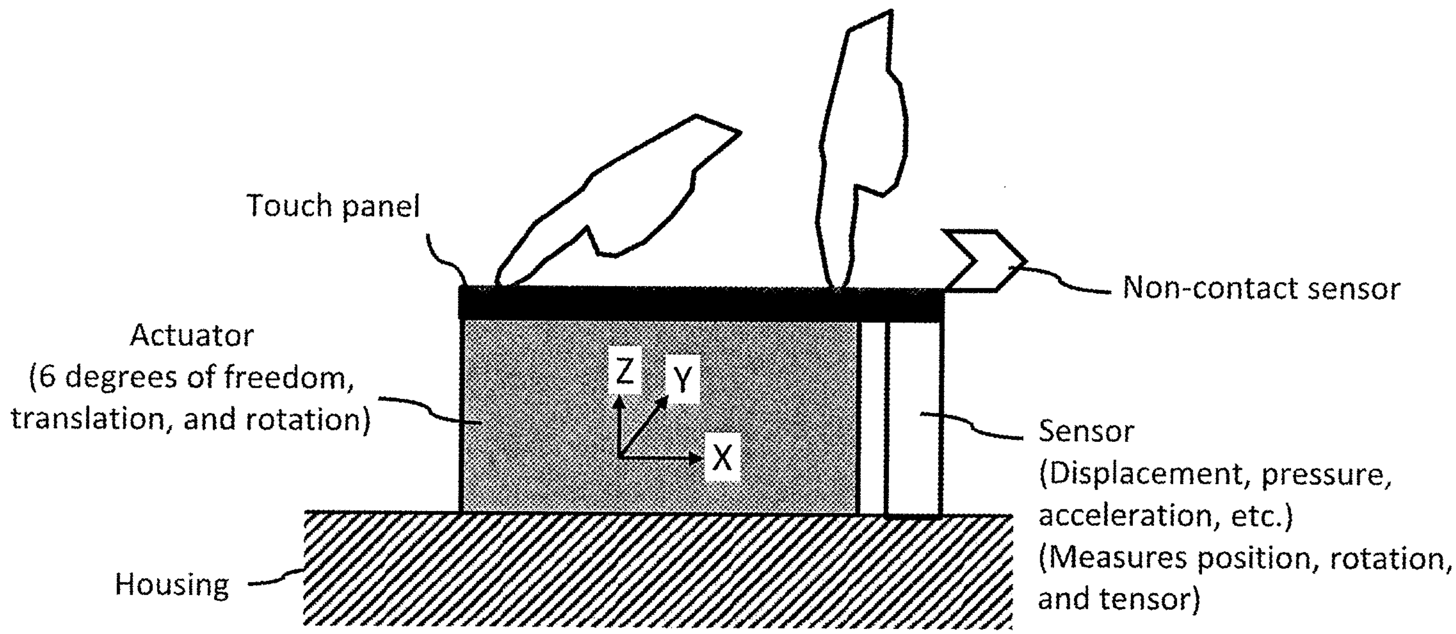
FIG. 110 is an explanatory view showing a haptic sense device (reflection of contact state).
Figure 117:
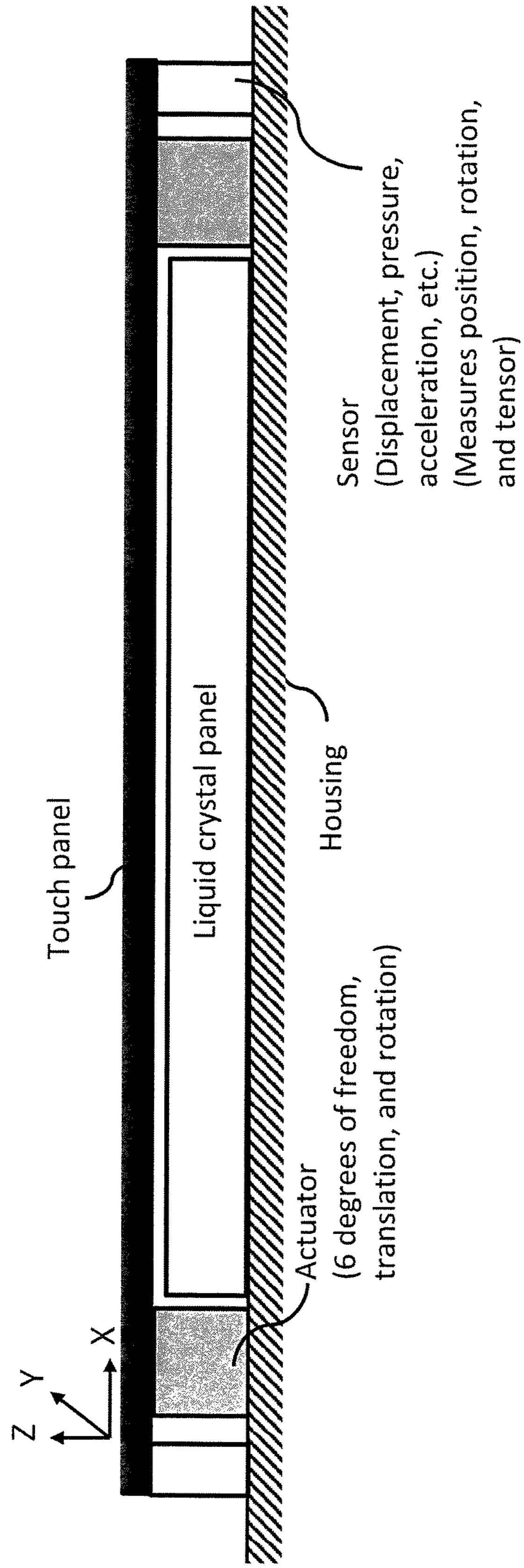
FIG. 117 is an example of a liquid crystal touch panel-type module (thin type).
Figure 118:
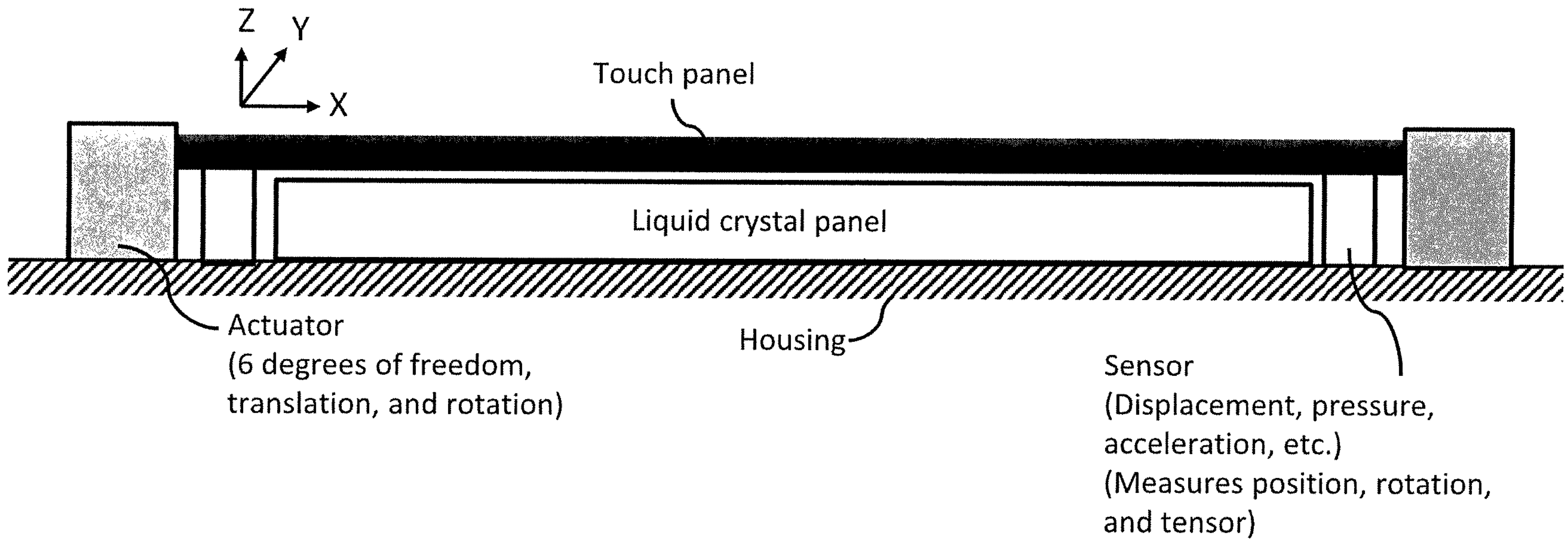
FIG. 118 is an example of a liquid crystal touch panel-type module (thin type).
Figure 119:
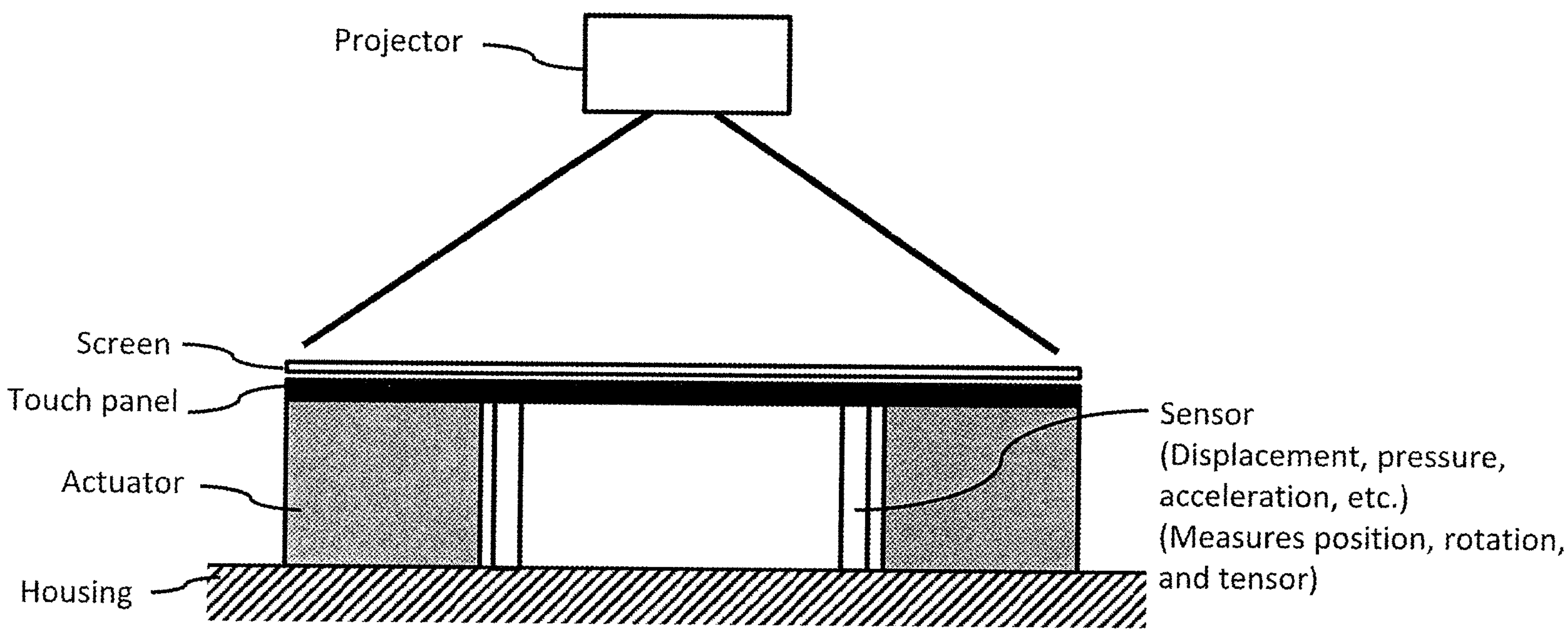
FIG. 119 is an example of a touch panel-type module (projection).
Figure 121:
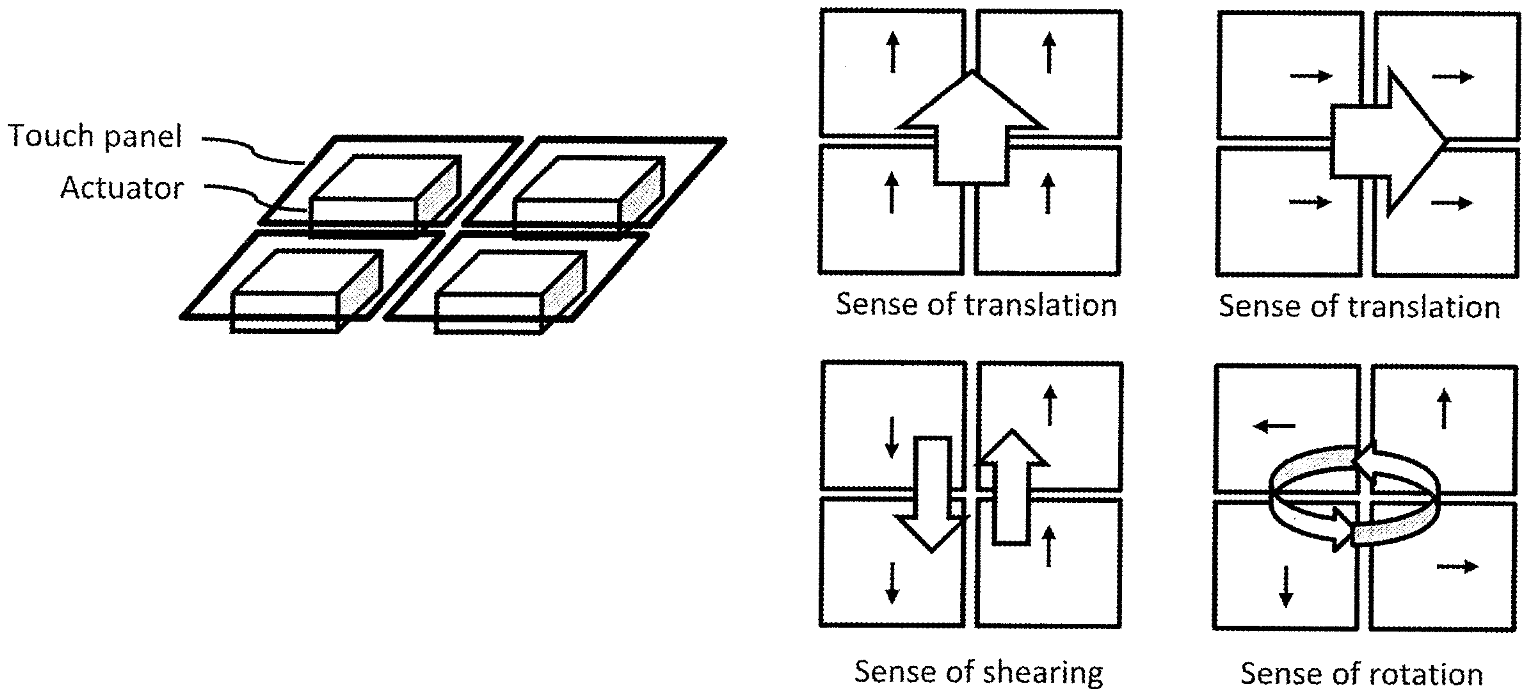
Figure 127:
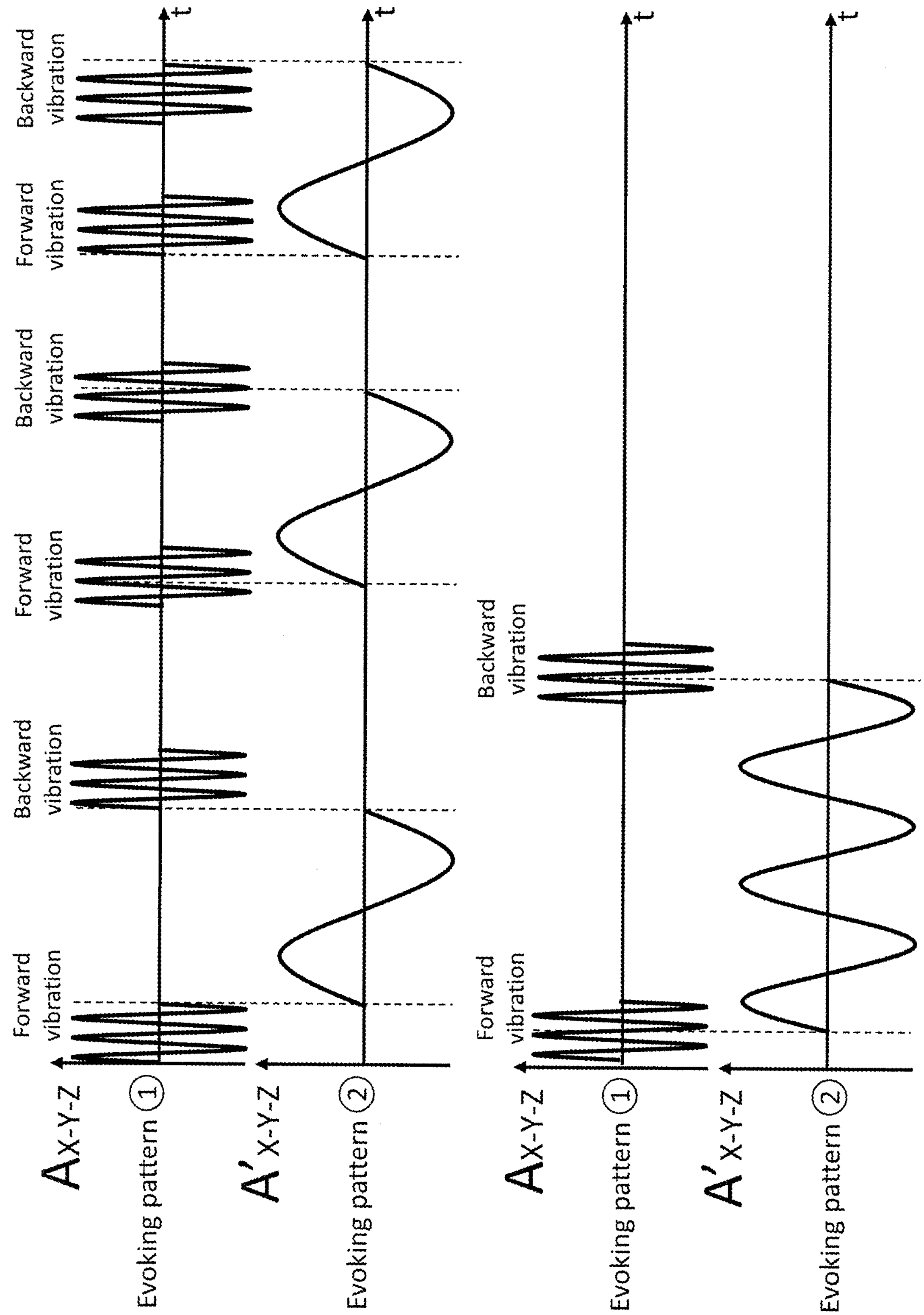

The above is established also when the sensory characteristic 731 exhibits nonlinear characteristics of an exponential function case or the like. Also in the case where the sensory characteristic 731 of FIG. 100 has a threshold value as in the sensory characteristic 231 of FIG. 3A, a torque sensation similar to that of FIG. 3B occurs, and a torque sensation can continue to be intermittently presented only in one direction.

FIGS. 11A to 11D are explanatory views of an eccentric rotator applicable to the rotator of the haptic presentation device of the embodiment, and is a view showing a haptic information presentation method of a vibration sensation, torque sensation, and force sensation by suitable synchronization of rotation directions and phases of both an eccentric rotator A 812 and an eccentric rotator B 813.

Figure 11A:
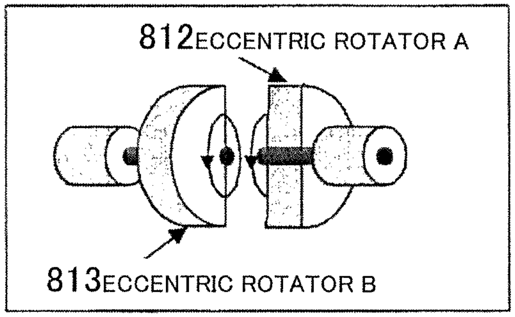
FIGS. 11A to 11D are views showing a haptic information presentation method of a vibration sensation, a torque sensation, and a force sensation by suitably synchronizing rotation directions and phases of both an eccentric rotator A 812 and an eccentric rotator B 813.
Figure 11B:
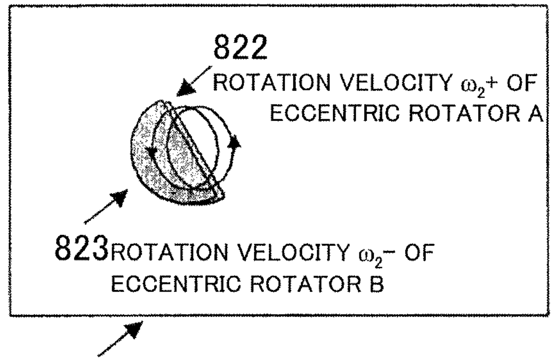
Figure 11C:
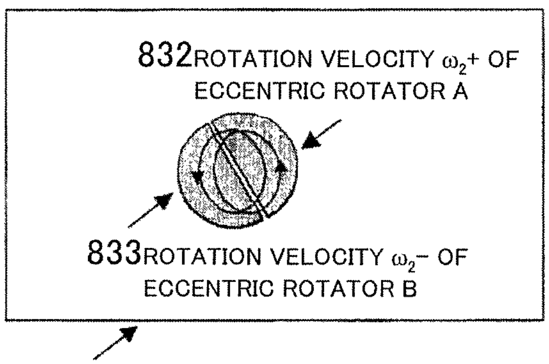

FIG. 11B schematically shows a case where both the eccentric rotator A 812 and the eccentric rotator B 813 of FIG. 11A are synchronously rotated in the same direction. As a result of the synchronous rotation, the eccentric rotations are combined. FIG. 11C schematically shows a case where both the eccentric rotator A 812 and the eccentric rotator B 813 of FIG. 11A are synchronously rotated with a phase delay of 180 degrees and in the same direction. As a result of the synchronous rotation, the torque rotation without eccentricity can be formed.

Figure 11D:
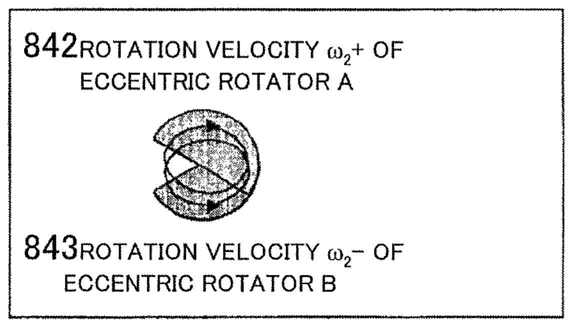

FIG. 11D schematically shows a case where both the eccentric rotator A 812 and the eccentric rotator B 813 of FIG. 11A are synchronously rotated in the opposite directions. As a result of the synchronous rotation in the opposite directions, a force to linearly generate simple harmonic oscillations in an arbitrary direction can be synthesized.

Figure 12A:
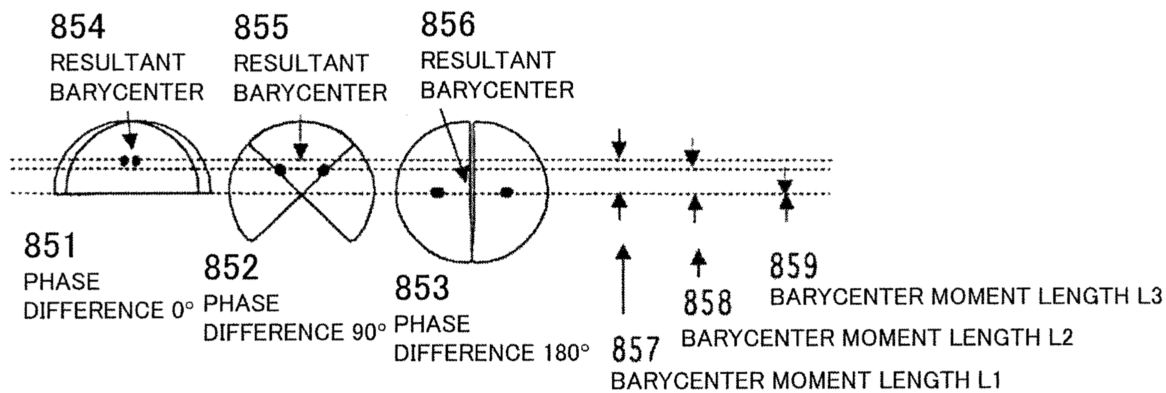
FIGS. 12A and 12B are views showing a haptic information presentation method of a vibration sensation and a force sensation by suitably synchronizing rotation directions and phases of both the eccentric rotator A 812 and the eccentric rotator B 813.

FIG. 12A is a view showing a method of changing a vibration intensity of an eccentric vibration by suitably synchronizing the rotation directions and phases of both the eccentric rotator A 822 and the eccentric rotator B 823 in FIG. 11B. A phase difference (for example, a phase difference 0° 851, a phase difference 90° 852, a phase difference 180° 853) of rotations of both the eccentric rotator A 822 and the eccentric rotator B 823 is adjusted, and resultant barycenters (854, 855, 856) of the two eccentric rotators, and barycenter moment lengths (857, 858, 859) between the rotation centers of the rotators and the resultant barycenters are suitably changed, so that the vibration intensity of the eccentric vibration can be changed without changing the rotation velocities of the eccentric rotators (822, 823). By this, the vibration frequency and the vibration intensity can be independently controlled.

On the other hand, in an eccentric rotator used in a manner mode of a cellular phone or the like, the vibration intensity is increased by increasing the rotation velocity, and the vibration frequency and the vibration intensity can not be independently controlled.

Figure 12B:
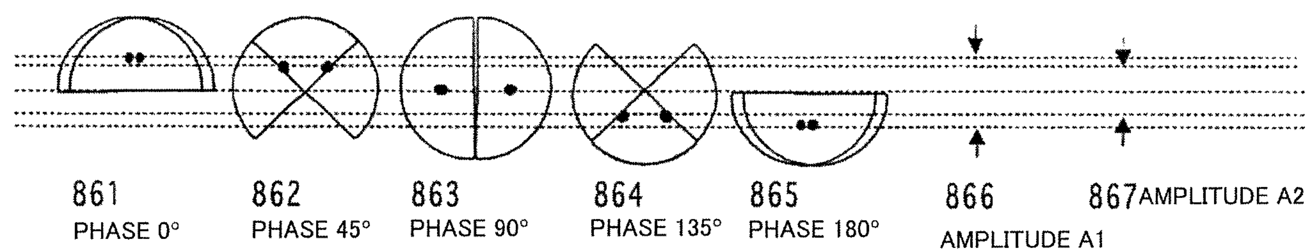

FIG. 12B is a view showing a method in which the rotation directions of both the eccentric rotator A 842 and the eccentric rotator B 843 in FIG. 11D are suitably inverted, so that the intensity of a force and/or a force sensation and the intensity of a vibration and/or a vibration sensation are changed. By inverting the rotation direction in suitable phases (for example, phase 0° 861, phase 45° 862, phase 90° 863, phase 135° 864, phase 180° 865) of both the eccentric rotator A 842 and the eccentric rotator B 843, amplitudes (866, 867) of vibrations are suitably changed, and the intensity of a force and/or a force sensation can be made variable without changing the rotation velocities of the eccentric rotators (842, 843). By this, the frequency and the intensity of the force and/or the force sensation can be independently controlled.

In the description of FIGS. 11A to 11D, 12A, and 12B, although the rotation axes of both the eccentric rotators are represented on the same axis, it is not inevitable that they are on the same axis, and the rotation axes have only to be parallel to each other, inclusive of the case where they are on the same axis.

Figure 13:
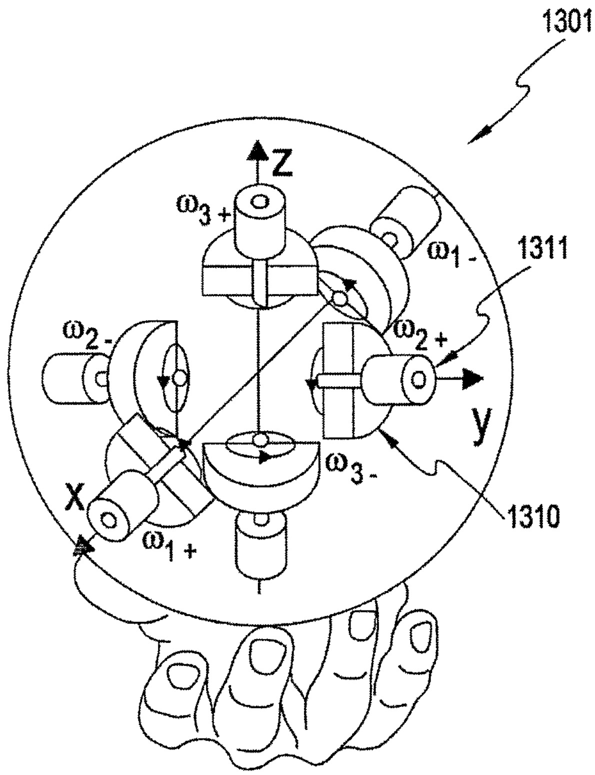
FIG. 13 is an explanatory view in which both the eccentric rotator A 812 and the eccentric rotator B 813 are made one pair, and three such pairs are arranged in an orthogonal coordinate system.

FIG. 13 is a view showing a haptic presentation device 1301 in which both the eccentric rotator A 812 and the eccentric rotator B 813 are made one pair and three such pairs are arranged in an orthogonal coordinate system. Reference numeral 1310 in the drawing denotes an eccentric rotator; and 1311, a motor to drive it. By arranging the plural eccentric rotators in the three-dimensional space, the vibration sensation, the torque sensation, and the force sensation shown in FIG. 11B to FIG. 11D can be presented in an arbitrary three-dimensional direction. The arrangement of the orthogonal coordinate system is an example for presentation in the three-dimensional direction.

Applied Example 1

Figure 14:
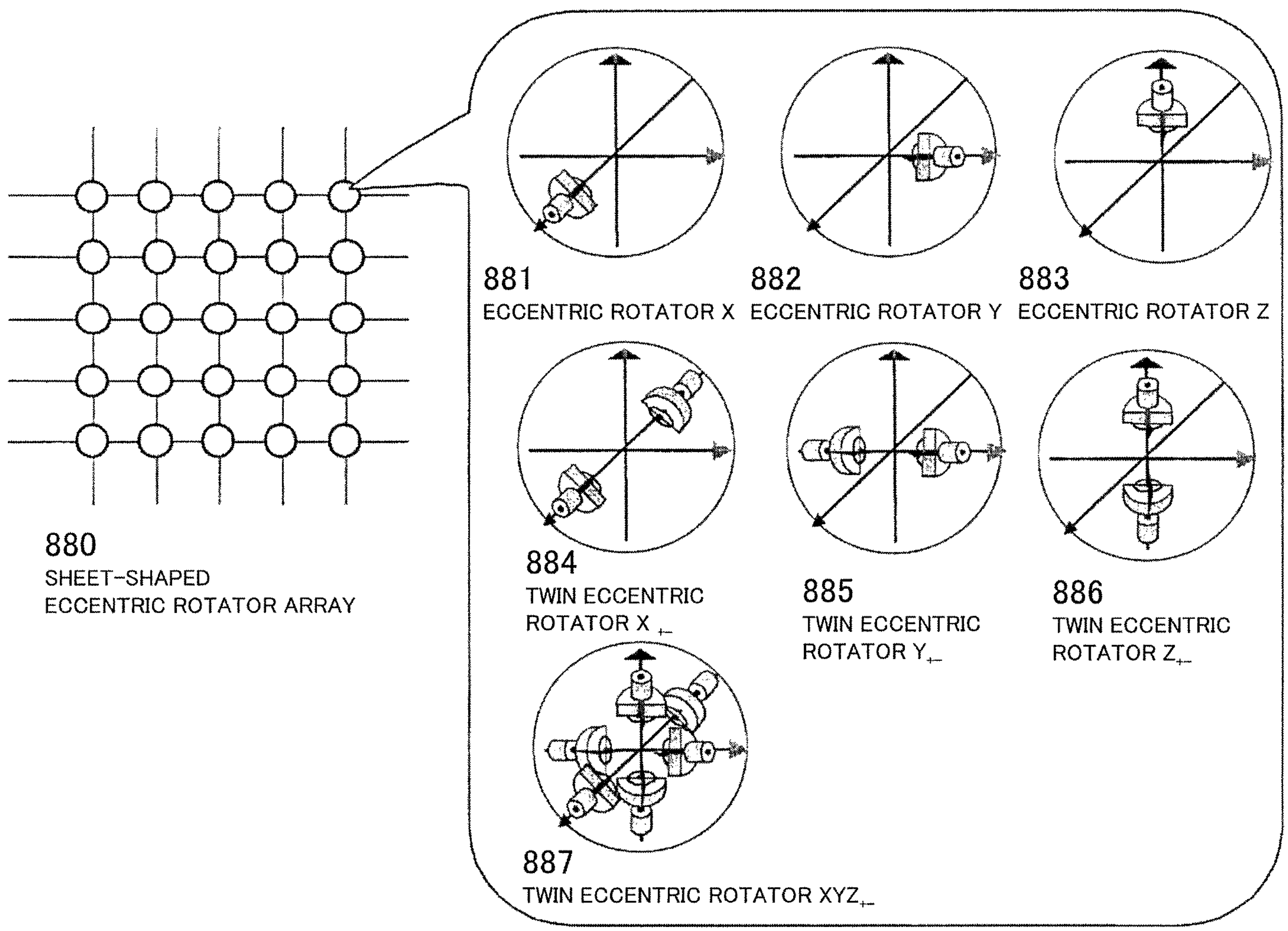
FIG. 14 is an explanatory view of a sheet-shaped eccentric rotator array to which the invention is applied.

FIG. 14 is a view showing a sheet-shaped eccentric rotator array 880 in which one of the eccentric rotator 711 of FIG. 10A, the twin eccentric rotator 811 of FIG. 11A, and the twin eccentric rotator arranged in the three-dimensional space of FIG. 13 is arranged like a sheet in a two-dimensional plane. A practicing method of a drive portion of the twin eccentric rotator may be a molecular motor or a piezoelectric element, and anything may be used as long as an objective physical quantity can be presented.

Figure 15:
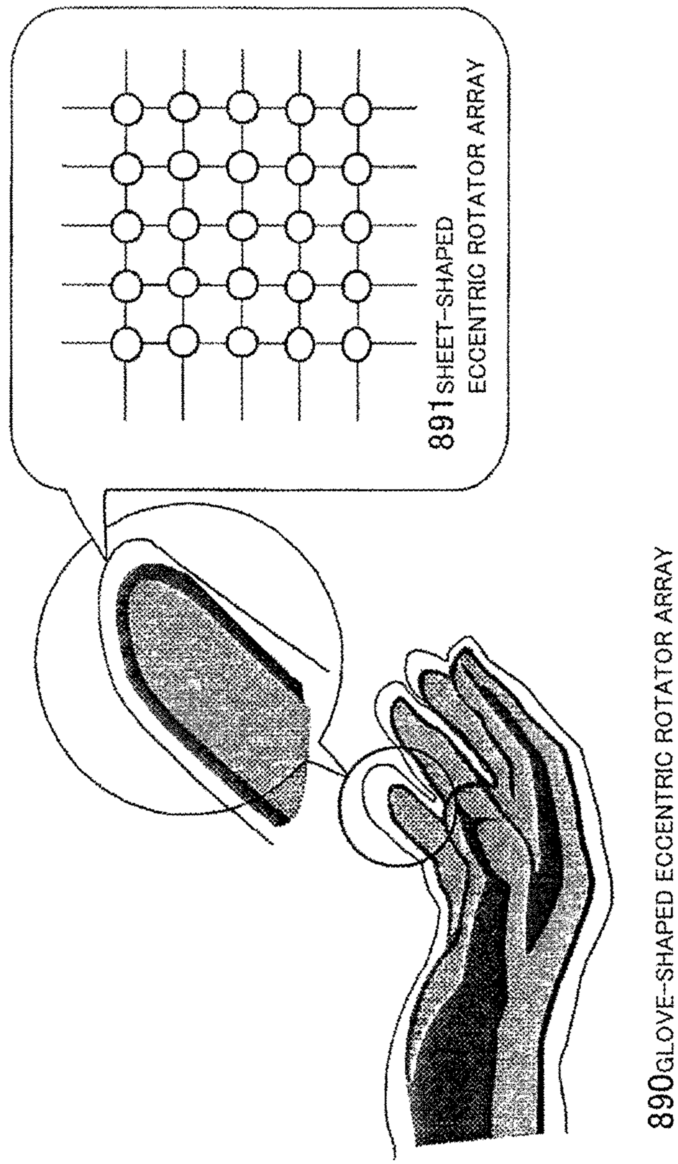
FIG. 15 is an explanatory view of a glove-shaped eccentric rotator array to which the invention is applied.

FIG. 15 is a view showing a glove-shaped eccentric rotator array 890 in which the sheet-shaped eccentric rotator array 880 is formed into a glove shape. By suitably controlling the rotation of each eccentric rotator, the vibration sensation, torque sensation, and force sensation of various patterns in space and time can be presented onto a palm.

Incidentally, the sheet-shaped eccentric rotator array 880 and the glove-shaped eccentric rotator array 890 are merely examples of the embodiment, and the embodiment can be applied to clothes and wearable haptic information presentation, inclusive of a case where the eccentric rotator array is three-dimensionally arranged.

FIGS. 16A to 16D are views showing a haptic information presentation method in which a sensory characteristic relating to a haptic sense is used, and rotations of both an eccentric rotator A 912 and an eccentric rotator B 913 are phase synchronized.

Figure 16A:
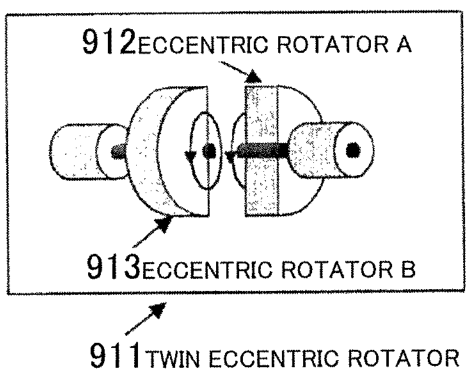
FIGS. 16A to 16D are views showing a haptic information presentation method in which a sensory characteristic relating to a haptic sense is used, and rotations of both an eccentric rotator A 912 and an eccentric rotator B 913 are phase synchronized.
Figure 16B:
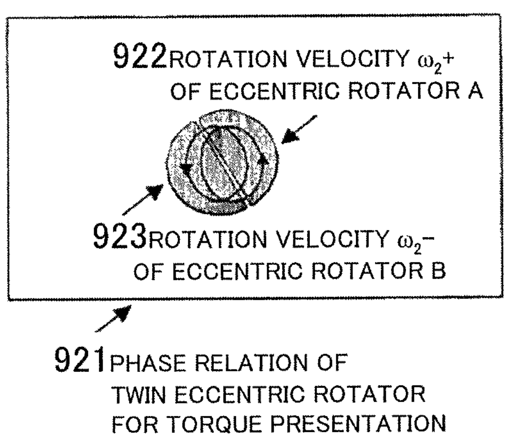

Here, FIG. 16B schematically shows a case where both the eccentric rotator A 912 and the eccentric rotator B 913 of FIG. 16A are synchronously rotated with a phase delay of 180 degrees in the same direction. As a result of the synchronous rotation, the torque rotation without eccentricity can be formed.

Figure 16C:
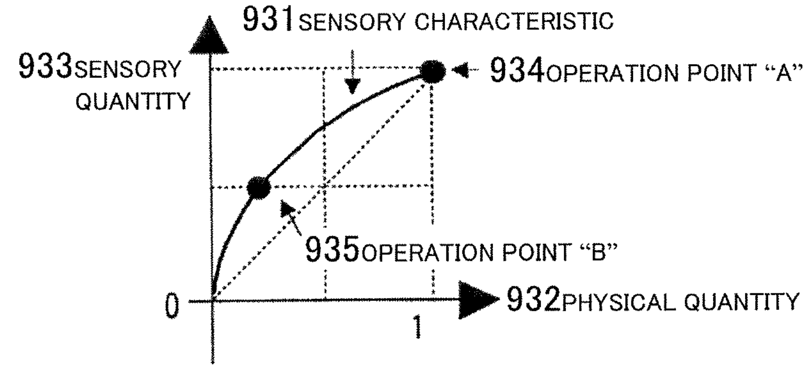
Figure 16D:
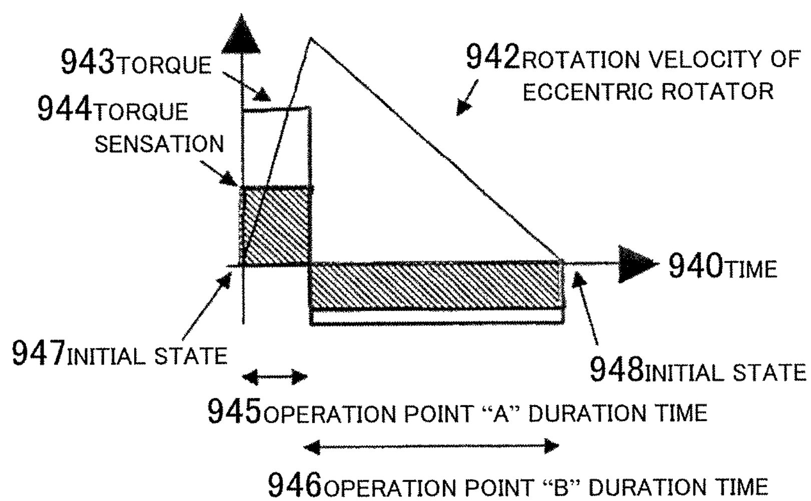

FIG. 16C schematically shows a case where a sensory characteristic 931 is a logarithmic function characteristic, and similarly to the sensory characteristic 211, the sensory characteristic 931 indicates that a sensory quantity 933 has a nonlinear characteristic of a logarithm or the like with respect to a physical quantity 932 as a stimulus. When consideration is given to a case where a positive torque is generated at an operation point A 934 on the sensory characteristic 931, and a negative torque in the reverse direction is generated at an operation point B935, a torque sensation 944 is represented as in FIG. 16D. A torque 943 is proportional to the time differential of a rotation velocity 942 of a rotator. When an operation is performed at an operation point A 934 and an operation point B 935, the torque sensation 944 is perceived.

The torque 943 is physically returned to an initial state 948 in one cycle, and an integral value thereof is zero. However, a sensory integral value of the torque sensation 944 as a sensory quantity does not necessarily become zero. By suitably selecting the operation point A 934 and the operation point B 935 and by suitably setting an operation point A duration time 945 and an operation point B duration time 946, the torque sensation can continue to be freely presented in an arbitrary direction.

The above is established also when the sensory characteristic 931 exhibits a nonlinear characteristic of an exponential function case or the like. Also in the case where the sensory characteristic 931 of FIG. 16C has a threshold value like the sensory characteristic 231 of FIG. 3A, a torque sensation similarly to that of FIG. 3B occurs, and the torque sensation can continue to be intermittently presented only in one direction.

FIGS. 17A to 17D are views showing a haptic information presentation method in which a sensory characteristic relating a haptic sense is used, and the rotations of both an eccentric rotator A 1012 and an eccentric rotator B 1013 are phase synchronized in the opposite directions.

Figure 17A:
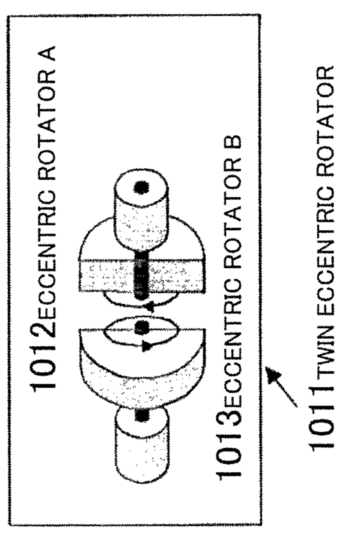
FIGS. 17A to 17D are views showing a haptic information presentation method in which a sensory characteristic relating to a haptic sense is used, and rotations of both an eccentric rotator A 1012 and an eccentric rotator B 1013 are phase synchronized in opposite directions.
Figure 17B:
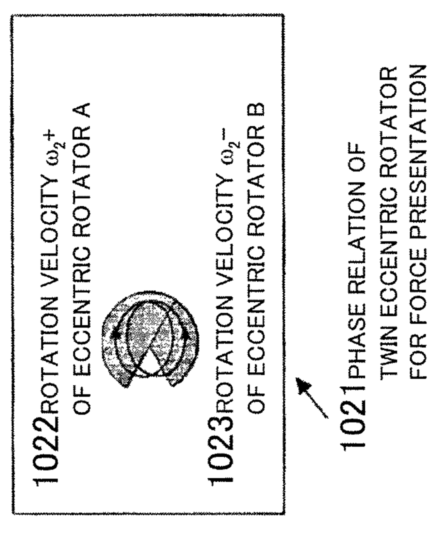
Figure 17C:
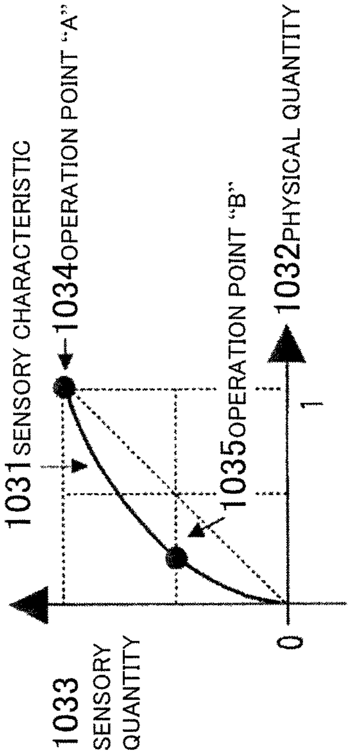
Figure 17D:
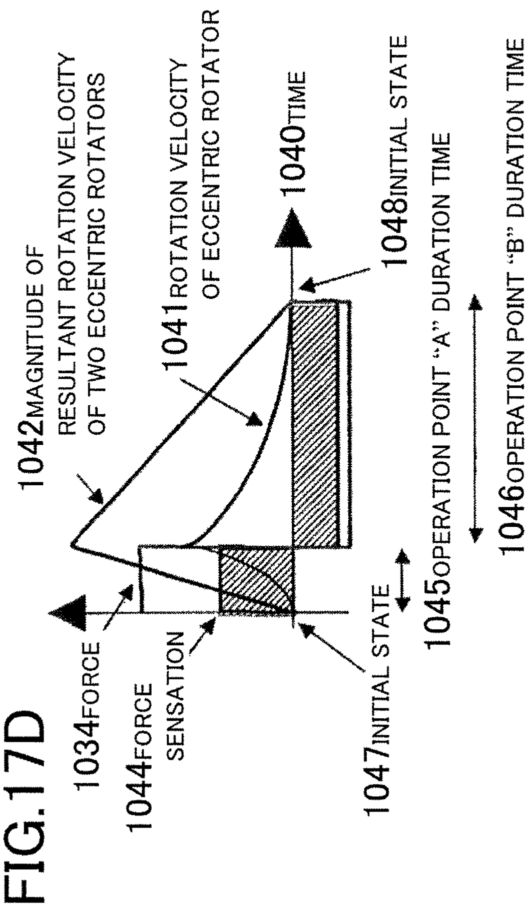

FIG. 17B schematically shows a case where both the eccentric rotator A 1012 and the eccentric rotator B 1013 of FIG. 17A are synchronously rotated in the opposite directions. As a result of the synchronous rotation in the opposite directions, a force to linearly generate simple harmonic oscillations in an arbitrary direction can be synthesized. FIG. 17C schematically shows a case where a sensory characteristic 1031 is a logarithmic function characteristic, and similarly to the sensory characteristic 211, the sensory characteristic 1031 indicates that a sensory quantity 1033 has a nonlinear characteristic of a logarithm or the like with respect to a physical quantity 1032 as a stimulus. When consideration is given to a case where a positive force is generated at an operation point A 1034 on the sensory characteristic 1031 and a negative force in the reverse direction is generated at an operation point B 1035, a force sensation 1044 is represented as in FIG. 17D. A magnitude 1042 of a resultant rotation velocity of both the eccentric rotators is the combination of rotation velocities of the eccentric rotator A 1012 and the eccentric rotator B 1013, and a force 1043 is proportional to the time differential of the magnitude 1042 of the resultant rotation velocity of both the eccentric rotators. When an operation is performed at an operation point A 1034 and an operation point B1035, a force sensation 1044 is perceived. The force 1043 is physically returned to an initial state 1048 in one cycle, and an integral value is zero. However, a sensory integral value of the force sensation 1044 as a sensory quantity does not necessarily become zero. The force sensation can continue to be freely presented in an arbitrary direction by suitably selecting the operation point A 1034 and the operation point B 1035, by suitably selecting an operation point A duration time 1045 and an operation point B duration time 1046, and by adjusting the synchronous phases of both the eccentric rotator A 1012 and the eccentric rotator B 1013.

The above is established also when the sensory characteristic 1031 exhibits a nonlinear characteristic of an exponential function case or the like. Also in the case where the sensory characteristic 1031 of FIG. 17C has a threshold value like the sensory characteristic 231 of FIG. 3A, a force sensation similar to that of FIG. 3B occurs, and the force sensation can continue to be intermittently presented only in one direction.

Figure 18A:
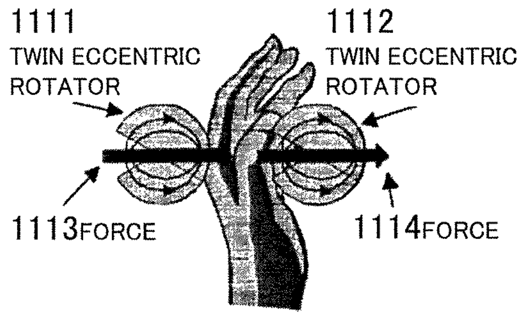
FIGS. 18A to 18F are schematic views of a method in which the presentation method of a force sensation using both the eccentric rotators shown in FIG. 17A is used to present a pushing feeling by oneself, an expansion feeling, a pressure feeling, a pulling feeling by oneself, a pulled feeling from outside, and a pushed feeling from outside.
Figure 18B:
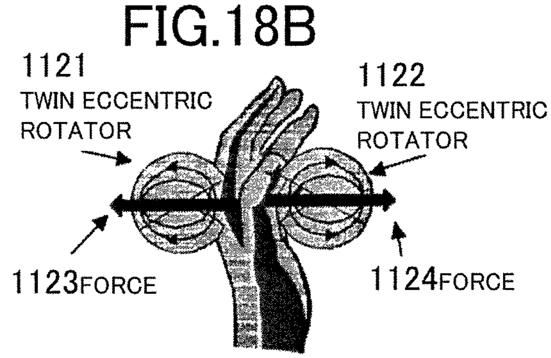
Figure 18C:
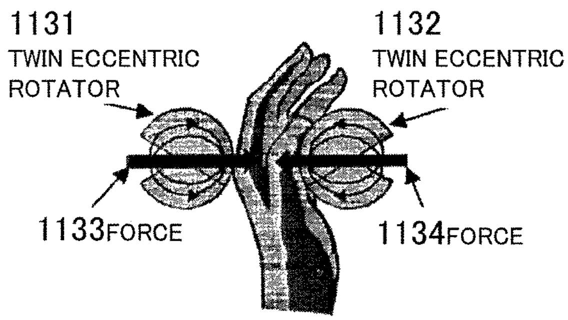
Figure 18D:
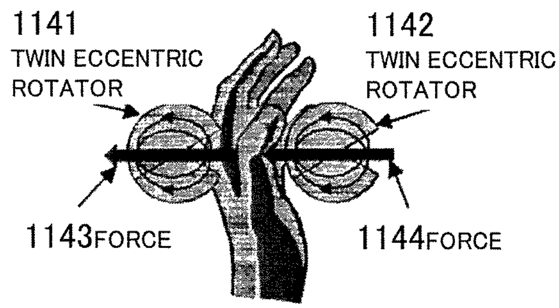
Figure 18E:
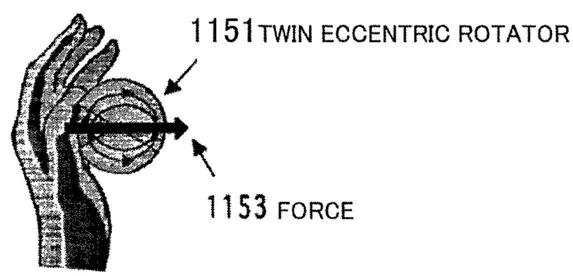
Figure 18F:
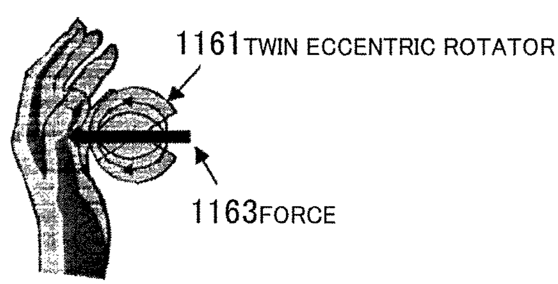

FIGS. 18A to 18F are schematic views of a method in which the presentation method of the force sensation using both the eccentric rotators shown in FIGS. 17A to 17D is used to present a pushing feeling by oneself (FIG. 18A), an expansion feeling (FIG. 18B), a pressure feeling (FIG. 18C), a pulling feeling by oneself (FIG. 18D), a pulled feeling from outside (FIG. 18E), and a pushed feeling from outside (FIG. 18F).

In the pushing feeling by oneself (FIG. 18A), a twin eccentric rotator 1111 and a twin eccentric rotator 1112 are used on the front and back of a palm, and a force 1113 and a force 1114 are presented, so that a feeling such as to push an object by oneself with the front of the palm can be presented.

The expansion feeling (FIG. 18B), the pressure feeling (FIG. 18C), the pulling feeling by oneself (FIG. 18D), the pulled feeling from outside (FIG. 18E), and the pushed feeling from outside (FIG. 18F) can also be similarly presented.

Figure 19:
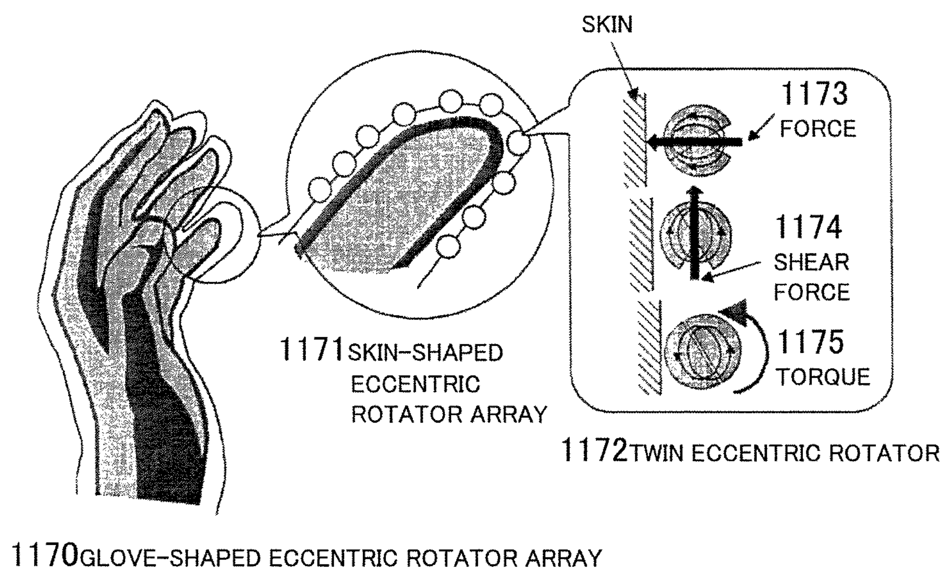
FIG. 19 is an explanatory view of a skin-shaped eccentric rotator array to which the invention is applied.

FIG. 19 is a view showing a method of presenting a force 1173, a shear force 1174, and a torque 1175 to a palm and a finger tip by suitably controlling the rotation of each twin eccentric rotator 1172 on 1171 of the groove-shaped eccentric rotator arrays 1170.

Figure 20:
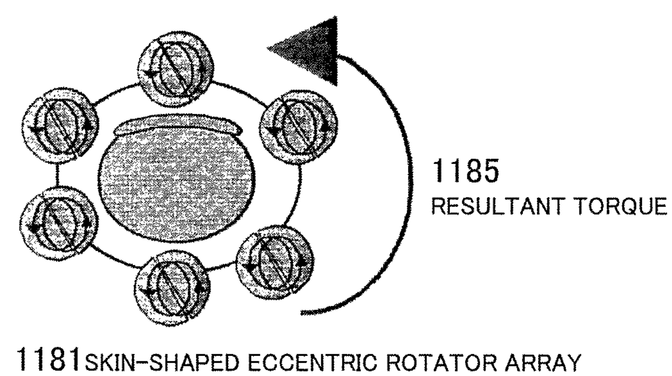
FIG. 20 is an explanatory view of a skin-shaped eccentric rotator array to which the invention is applied.

Besides, as shown in FIG. 20, by presenting a torque in the same direction on a skin-shaped eccentric rotator array 1181 round around a finger, a resultant torque 1185 to twist the whole finger can be presented.

Figure 21:
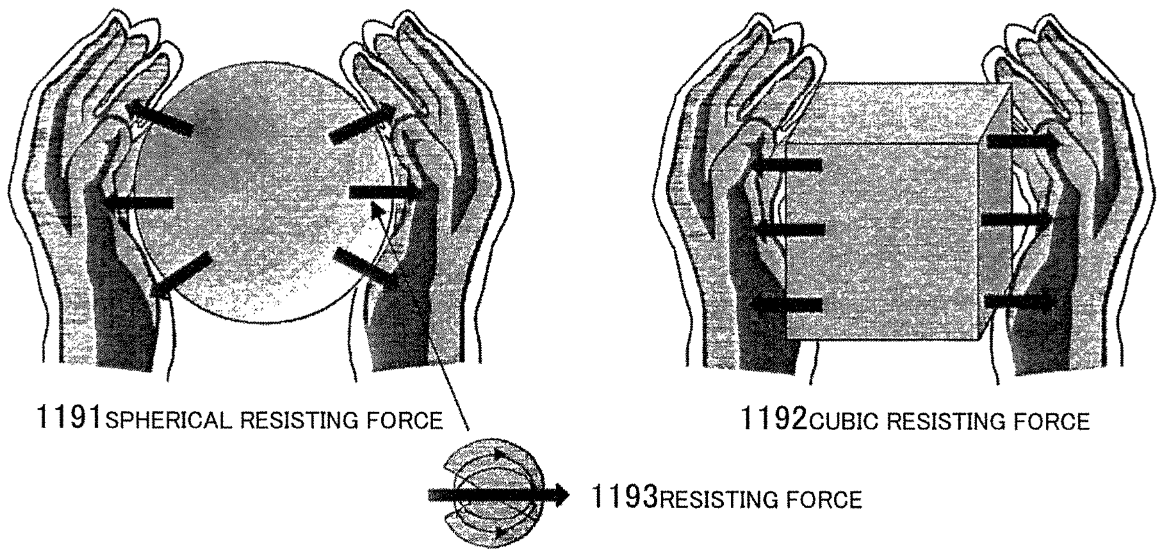
FIG. 21 is an explanatory view of a skin-shaped eccentric rotator array to which the invention is applied.

Further, as shown in FIG. 21, by suitably adjusting the spatial intensity distribution of a resisting force 1193 presented to a palm, and by presenting a spherical resisting force 1191, a cubic resisting force 1192 or the like, a three-dimensional shape feeling of a sphere, a cubic or the like, or a tactile sensation such as an elastic feeling or a soft feeling can be presented to the palm.

Figure 22:
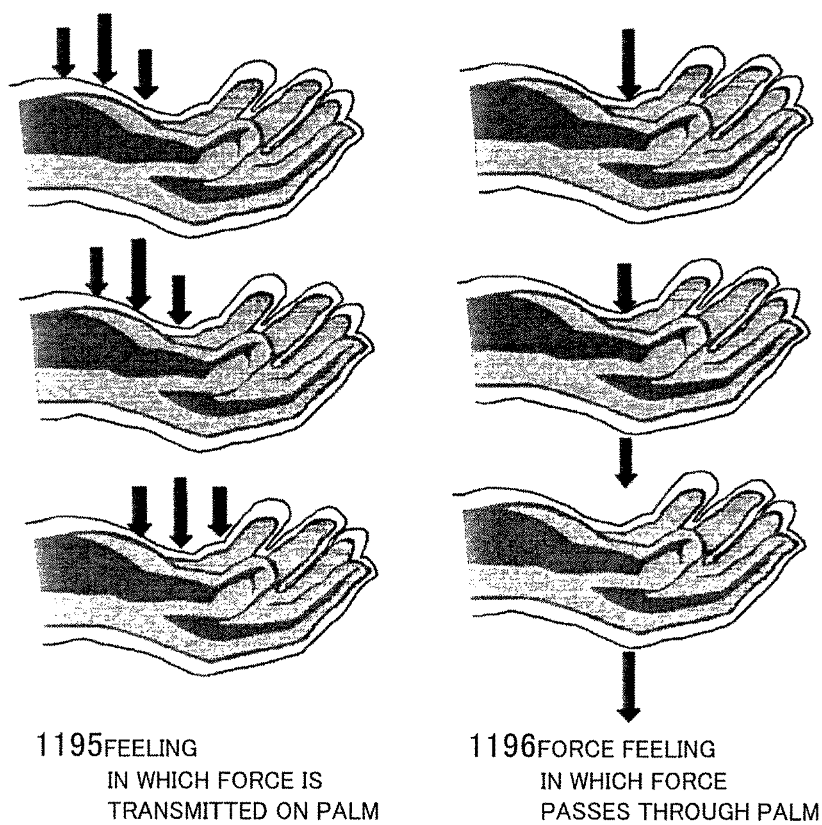
FIG. 22 is an explanatory view of a skin-shaped eccentric rotator array to which the invention is applied.

Further, as shown in FIG. 22, by temporally changing the spatial intensity distribution of the resisting force 1193 presented onto the palm, it is possible to present a feeling 1195 in which a force is transmitted on the palm, a feeling in which a object rotates on the palm, and a force sensation 1196 in which a force passes through the palm. Similarly, by changing the shear force, the torque and the like, the texture of a surface of a virtual object, such as surface roughness, can be presented.

According to the presentation methods shown in FIGS. 19 to 22, by suitably changing the space distribution of the force sensation in conformity with the movement of the palm, it is possible to present various haptic information relating to the object, such as the existence, shape, elasticity, texture and the like of the virtual object.

(Operation Principle 2)

FIGS. 23A to 23D are views showing a vibration haptic information presentation method in an arbitrary direction using a method of changing a sensory characteristic by a masking effect relating to a haptic sense, which is an example of a control method of continuously or intermittently presenting haptic information of at least one of a vibration sensation, a force sensation and a torque sensation in an arbitrary direction.

Figure 23A:
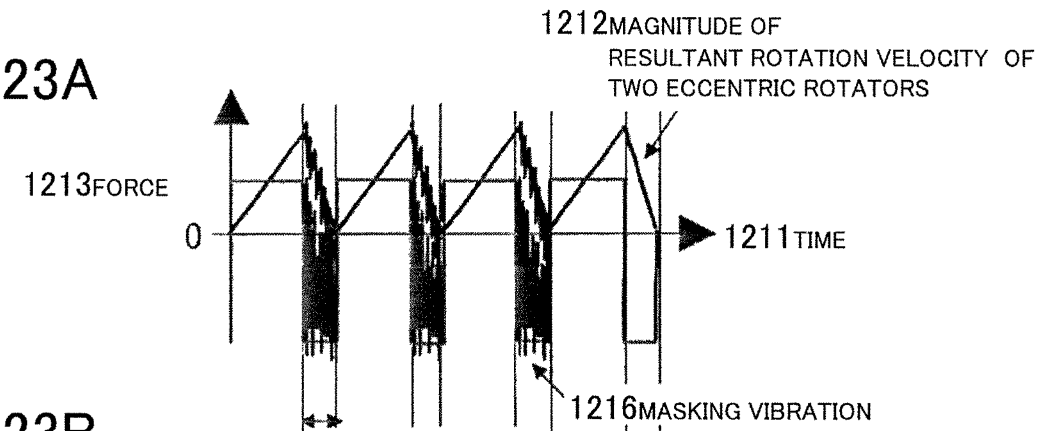
FIGS. 23A to 23D are views showing a haptic information presentation method in an arbitrary direction by using a method of changing a sensory characteristic by a masking effect relating to a haptic sense.
Figure 23B:
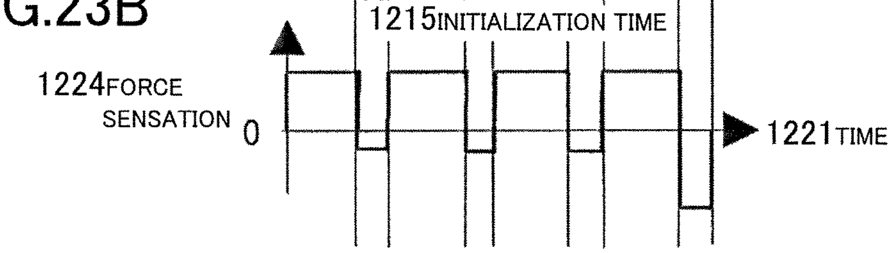

The sensory characteristic is masked by a masking vibration 1216, and a force sensation 1224 is decreased. This masking vibration can be generated by synchronizing the rotation velocity 1022 of the eccentric rotator A with the rotation velocity 1023 of the eccentric rotator A in FIG. 17B and by fluctuating the velocities. FIG. 23A schematically shows this, and the force sensation 1224 perceived at this time is represented as in FIG. 23B. A force 1213 is proportional to the time differential of a magnitude 1212 of a resultant rotation velocity of the two eccentric rotators.

Figure 23C:
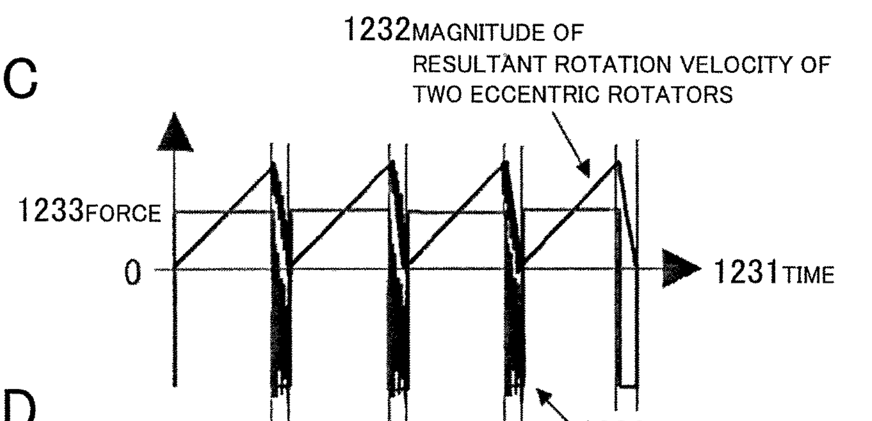
Figure 23D:
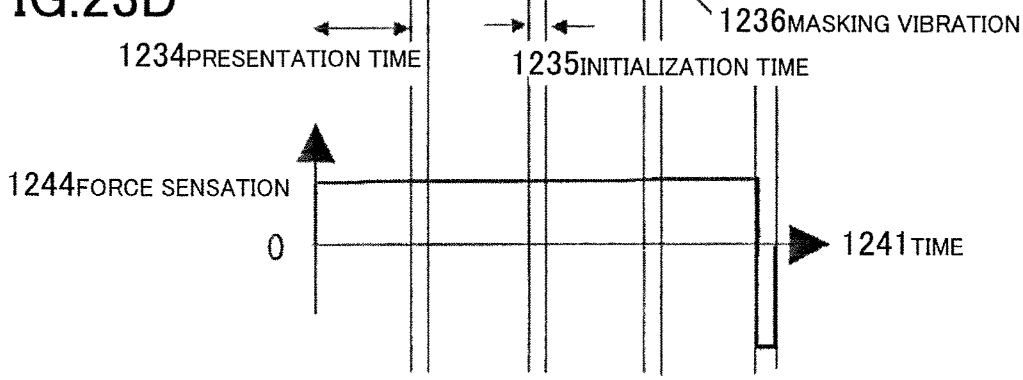

At this time, an initialization time 1215 in which the rotation velocity 1212 of the rotator is initialized is shortened and when it becomes shorter than a certain specific time as shown in FIG. 23C, a critical fusion occurs in which although a negative force due to the initialization physically exists, it is felt as if a force is continuously presented like a force sensation 1244.

The above occurs also in the case where a maskee and a masker are different rotators, and a similar continuous presented sensation occurs not only in the case of the force but also in the case of a torque.

In the actual use of the haptic information presentation system, since a posture change of a torque presentation device by a human unconscious motion is felt as an inertial force due to the Coriolis force or gyro effect, it is necessary that the inertial force of the rotator itself is suppressed to the utmost, and a large torque can also be presented. In the following, this inertial force will be considered.

Figure 24A:
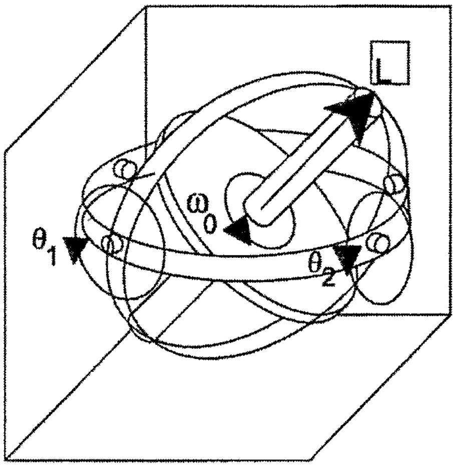
FIGS. 24A and 24B are explanatory views of a gyroscope type and a resultant angular momentum vector differential type.
Figure 24B:
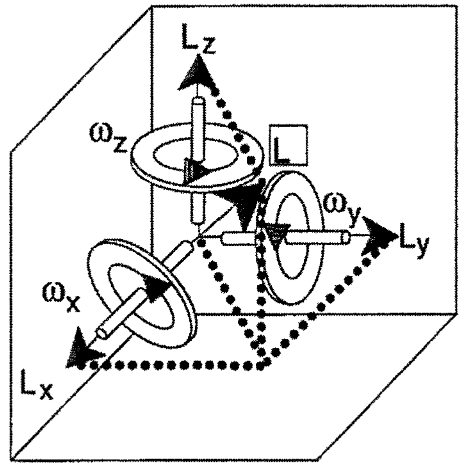

As methods of generating a torque sensation, there are a method of accelerating and decelerating the rotation velocity of a rotation body having an inertia moment, and a method of turning a rotation body around an axis orthogonal to its rotation axis. From the viewpoint of dynamics of mechanism, the method is roughly classified into following two types, namely, a rotator posture control type (hereinafter referred to as a gyroscope type 1311) and a resultant angular momentum vector differential type 1312 (FIGS. 24A and 24B).

First, the gyroscope type 1311 using a gyroscope to control the posture of a rotator will be described. A gimbal structure is used, and with respect to the posture of the rotator turning at a constant angular velocity $\omega_0$, turning angles $\theta_1$ and $\theta_2$ around two gimbal shafts are changed so that torque can be generated. An angular momentum $L_0$ at the time when the rotation body with an inertia moment I is rotated at an angular velocity $\omega_0$ is expressed by $$L_0=I\omega_0.$$

At this time, in view of the direction in which the torque is generated, a torque vector $\tau$ at the time when an angular momentum vector $L=(|L|=L_0)$ having a constant magnitude is turned at an angular velocity $\omega$ is expressed by $$\tau=\omega\times L,\ \text{where}\ \omega=d\theta/dt.$$

Next, the resultant angular momentum vector differential type 1312 to control the time change of the resultant angular momentum vector will be described. Rotation speeds $\omega_x$, $\omega_y$ and $\omega_z$ of three rotators fixed to an x-axis, a y-axis and a z-axis are independently controlled, and the angular momentums of the rotators are combined, so that an angular momentum vector can be formed in an arbitrary direction. When this is suitably controlled, a torque can be formed in an arbitrary direction. A torque vector at the time when the angular momentum vector L is changed is expressed as follows.

When an inertia moment around each axis is made $I_i$, the angular momentum $L_i$ of rotation at an angular velocity $\omega_i$ around each of the x-axis, y-axis and z-axis is expressed by $$L_i=I_i\omega_i, i=x,y,z.$$

When unit vectors in the x-axis, y-axis and z-axis directions are made i, j and k, the resultant angular momentum vector composed of the angular momentums around the respective axes is expressed by $$L=L_xi+L_yj+L_zk.$$

The time differential of the resultant angular momentum vector is the torque vector $\tau$.

$$\tau=dL/dt$$

Accordingly, by changing the ratio $\omega_x$: $\omega_y$: $\omega_z$ of the angular speeds in the x-axis, y-axis and z-axis directions, the direction of the angular momentum vector generated can be controlled in an arbitrary direction. This method has merits that the control is easy, and various three-dimensional force sensations can be presented. Incidentally, the torque felt by a person has the same magnitude as this torque vector r and the opposite direction by the action-reaction law (Newton's third law).

Figure 25:
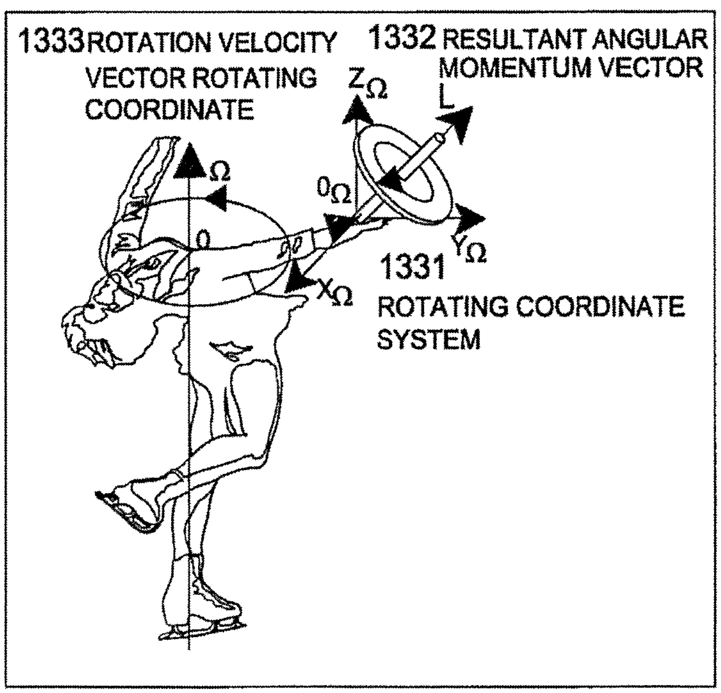
FIG. 25 is an explanatory view of a resultant angular momentum in an inertia coordinate system.

When reference is made to FIG. 25,

Where, in the case where $|L|=L_0$ is constant, and the direction of the resultant angular momentum vector L is turned at $\omega=d\Omega/dt$, the torque vector is expressed by $$\tau=dL/dt$$

$$=\omega\times L,$$

and is coincident with that of the gyroscope type. This indicates that although the torque which can be presented in the gyroscope type can be presented by the proposed method, the converse is not.

Now, in the case where consideration is given to the use in the so-called human navigation, the motion of the posture of a user generates a change of angular momentum vector, and there is a possibility that an unintentional torque is presented. Then, consideration is given to a torque generated by the resultant angular momentum vector L turning on a turning coordinate system $O_\Omega$ turning at an angular velocity vector Ω with respect to the inertia coordinate system O.

The equation of motion in the inertia coordinate system O 1330 and the turning coordinate system $O_\Omega$ 1331 is expressed by $$\tau=[dL/dt]_o$$

$$=[dL/dt]_{o\Omega}+\Omega\times L.$$

As shown in FIG. 25, a torque felt by a person through the temporal change of a resultant angular momentum vector 1332 on the palm of the turning person is the sum of a torque $[dL/dt]_{o\Omega}$ by the temporal change of the resultant angular momentum vector 1332 in the turning coordinate system $O_\Omega$ 1331 and the precession torque Ω×L. The term "precession" means that when a torque is applied to a gyro from outside, the spin axis of the gyro is turned in a direction orthogonal to the applied torque. The cause of the generation of the precession torque here is the turning of the coordinate axis. That is, even in the case where there is no temporal change of the angular momentum L on the palm of the user when viewed from the user, when the user turns at the angular velocity Ω as shown in FIG. 25, the precession torque Ω×L is felt.

Here, in the case where the navigation is performed, there occurs a case where the change of the posture of the user is suppressed. This is because when the body of the user is turned in the horizontal direction, the precession torque well known in a gyrocompass is exerted on the angular momentum $L_x$i orthogonal to the angular velocity Ω and $L_y$j, and functions to suppress the turn D of the body of the user. Although this precession torque prevents the free movement of the user, it has an effect to suppress the fluctuation of the torque presentation device due to the walking of the user. Besides, when the arm of the user is moved in the vertical direction, a similar precession torque is exerted on the angular momentum $L_x$i and $L_z$k. That is, when the user moves the body, the torque is exerted, and the same direction is always indicated like the gyrocompass.

The control feature of this embodiment is to control the temporal change of the resultant angular momentum vector L1332, and the easiness of the control is a great merit. By abruptly changing L in the vicinity of zero, a large torque $[dL/dt]_{o\Omega}$ is generated, and the precession torque (Ω×L) can be suppressed to be low. By this, the navigation is enabled without hindering the movement of the user.

On the other hand, in the case where the torque presentation device is swayed by the movement of the user and a difficulty occurs, by temporally changing L in the vicinity of the resultant angular momentum vector L 1332 having a suitable magnitude, the torque can be presented while the sway of the torque presentation device is suppressed.

On the other hand, in the case where the gyroscope type 1311 is used, $$\tau=[dL/dt]_{o\Omega}+\Omega\times L$$

$$=\omega\times L+\Omega\times L$$

is established. In order to present a large torque, a large angular momentum vector L is required, and as a result, a large precession torque is generated without fail.

Especially, for the use in the so-called human navigation, miniaturization is required to such a degree as to enable internal or external mounting to a cellular phone or a PDA. Here, consideration will be given to a torque presentation method and operation principle in the case where internal mounting to a cellular phone is performed.

According to the number of dimensions in which a torque is actually generated, a classification into four can be made as shown in FIGS. 26A to 26D.

In a conventional cellular phone, a vibration has been used to inform an incoming call. In the navigation by a recent cellular phone, when a street corner approaches, attention is first aroused by vibration, and then, the direction in which a turn is to be made is indicated by voice. That is, since attention is aroused by the vibration, and direction information is not presented, this is defined as a Zero dimension (vibration 1341).

Figure 26A:
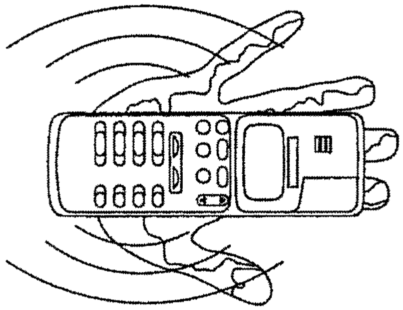
FIGS. 26A to 26D are explanatory views showing a torque presentation method and an operation principle in the case where a cellular phone has a built-in haptic information presentation system to which the invention is applied.
Figure 26B:
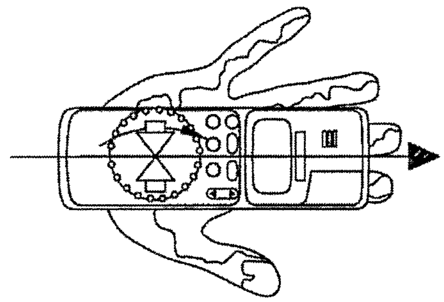
Figure 26C:
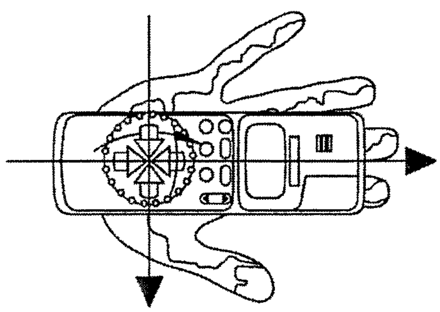
Figure 26D:
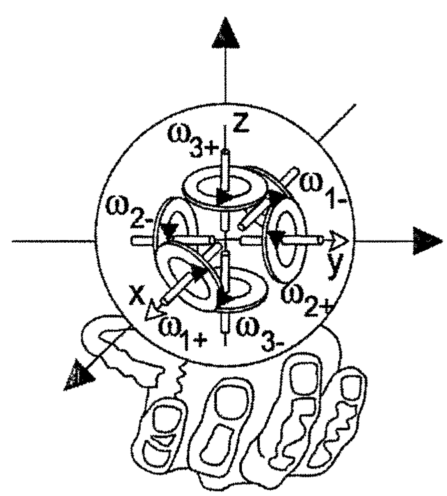
Figure 27:
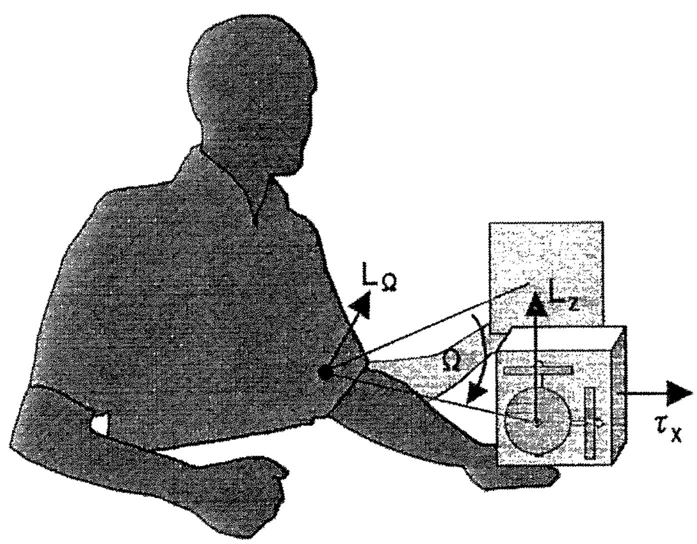
FIG. 27 is an explanatory view showing that in the explanation of merits of three-dimensional torque presentation, when an arm is moved vertically, the posture of a torque presentation device is stabilized by the conservation of a turning axis like a vertical gyro in an airplane.

Besides, in the direction presentation on a plane space as in the navigation or the like, two dimensions are sufficient as shown in FIG. 26C, and a haptic navigation system can be constructed by internal mounting to a cellular phone or the like. FIG. 26D shows a model which adopts an opposed type twin motor system newly invented in view of the balance of the center of gravity and the like.

Next, merits of three-dimensional torque presentation will be described.

As described above, since the Ω×L component hinders the motion of the user, it has been proposed that the operation is performed at the control point where L is in the vicinity of zero. However, with respect to the Lz component, although the precession torque is not exerted in the turn on the horizontal surface, such as the turning of the user, the posture of the torque presentation device becomes stable in the vertical motion of the arm by the conservation of the rotation axis like a vertical gyro in an airplane (see FIG. 27).

That is, the arm is lowered, the turning vector Ω is generated around an elbow as a fulcrum, a torque $\tau_x$ is generated in the torque presentation device and in the x direction on the palm so as to turn the $L_z$ vector, and a torque is generated in the direction of canceling the turning vector Ω. It is conceivable that the torque around the elbow as the fulcrum, which suppresses the vertical movement of the torque presentation device, stabilizes the position of the torque presentation device.

When this is Lx, like a gyroscope (an 'CHUKYU GOMA') which does not fall but turns while keeping the horizontal, it is conceivable that while the arm is turning on the horizontal plane, the torque to cancel the gravity is generated to float the torque presentation device, and reduces the user's fatigue caused by continuing to hold it.

(Operation Principle 3)

Hereinafter, a description will be given to a haptic presentation device in which the haptic presentation device 1301 shown in FIG. 13 is further improved.

Figure 28:
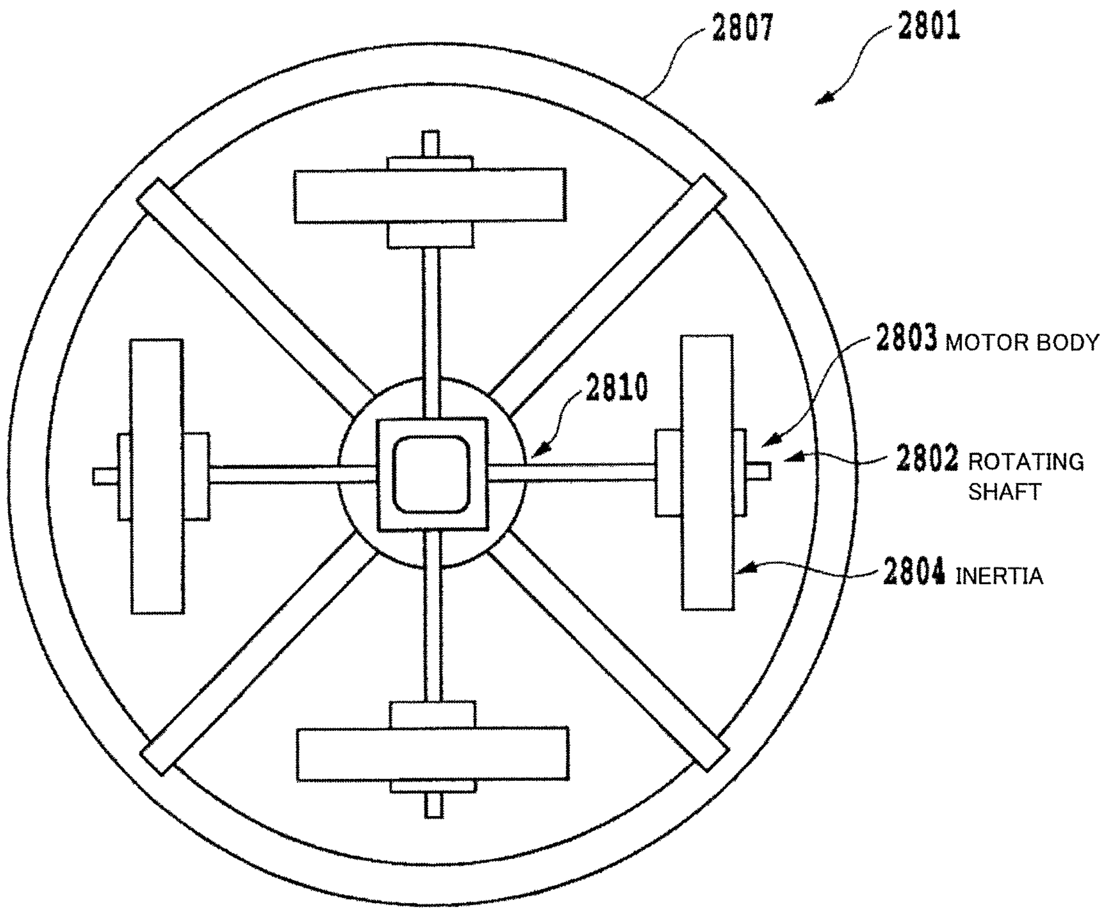
FIG. 28 is a view showing a two-dimensional sectional view of a haptic presentation device 2801 in which two facing eccentric rotators are made one pair and three such pairs are arranged in an orthogonal coordinate system.

FIG. 28 is a view showing a two-dimensional sectional view of a haptic presentation device 2801 in which similarly to the haptic presentation device 1301 of FIG. 13, two facing eccentric rotators are made one pair and three such pairs are arranged in an orthogonal coordinate system. In the haptic presentation device 2801, an eccentric rotator (inertia; inertial body) 2804, a motor 2803 and the like are arranged in a spherical housing 2807, and FIG. 28 is a sectional view taken along the center of the spherical housing 2807. The eccentric rotator 2804 and the motor 2803 are united, and a rotating shaft 2802 of the motor is fixed to a joint 2810 of the housing 2807. That is, the rotating shaft 2820 is fixed, and similarly to the rotation of a normal motor, a magnet of a rotator of the motor integral with the rotating shaft 2802 and an electromagnet of the main body of the motor 2803 repel each other and the motor 2803 is rotated. By this, in the haptic presentation device 2801, a rotation body in which the eccentric rotator and the motor are united is rotated. Incidentally, it would be apprehensible for one of ordinary skill in the art that a terminal for power supply to the main body of the motor 2803 is fabricated so that the polarity of the contact is kept even if the main body of the motor 2803 is rotated (not shown). Thus, as compared with the haptic presentation device 1301 of FIG. 13 in which the motor is fixed to the housing and only the eccentric rotator is rotated, in the haptic presentation device 2801, the mass of the rotation portion can be made large (that is, the inertia moment can be made large), and the efficiency of the mechanical operation (presentation of vibration, torque and force) by the rotation of the rotation body is improved. Further, as the weight of the housing 2807 is reduced, the efficiency is improved.

Incidentally, the haptic presentation device 2801 shown in FIG. 28 is not limited to the case where the eccentric rotator is applied, but is naturally applicable to a rotator which is not eccentric. Further, although the spherical housing is exemplified for the haptic presentation device 2801, the principle of the haptic presentation device 2801 can be naturally applied to a housing other than the spherical shape.

Figure 29:
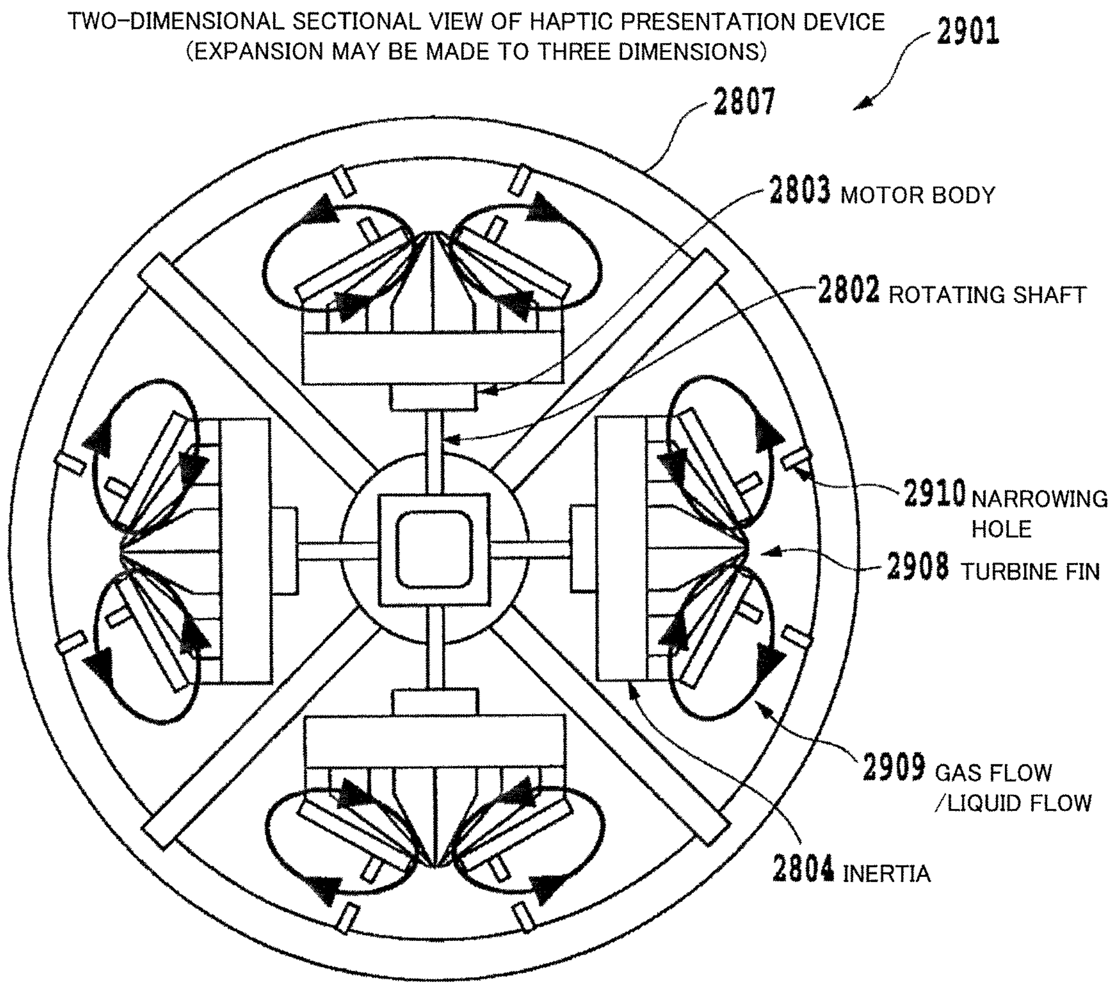
FIG. 29 is a view showing a two-dimensional sectional view of a haptic presentation device 2901 in which the haptic presentation device 2801 is further improved.

FIG. 29 is a view showing a two-dimensional sectional view of a haptic presentation device 2901 in which the haptic presentation device 2801 of FIG. 28 is further improved. The haptic presentation device 2901 includes a turbine fin 2908 arranged in a spherical housing 2807 and a fluid (gas flow or liquid flow) 2909, and FIG. 28 is a sectional view taken along the center of the spherical housing 2807. The turbine fin 2908 is provided in a rotation body in which an eccentric rotator 2804 and a motor 2803 are united. By this, in the haptic presentation device 2901, when the rotation body in which the eccentric rotator and the motor are united is rotated, the turbine fin stirs the fluid 2909. Thus, as compared with the rotation of the rotation body of the haptic presentation device 2801 of FIG. 28, in the haptic presentation device 2901, the load resistance is applied to the rotation of the turbine fin by the circulation of the fluid, and as a result, since the effective inertia moment of the rotation body is increased, the efficiency of the mechanical operation (presentation of vibration, torque and force) by the rotation of the rotation body is improved. Further, as the relative weight of the housing 2807 is reduced, the efficiency is improved. Besides, the load resistance can be applied to the rotation of the turbine fin by providing a narrowing hole 2910 to narrow the section of a liquid flow passage in a route for circulation of the fluid.

Figure 30:
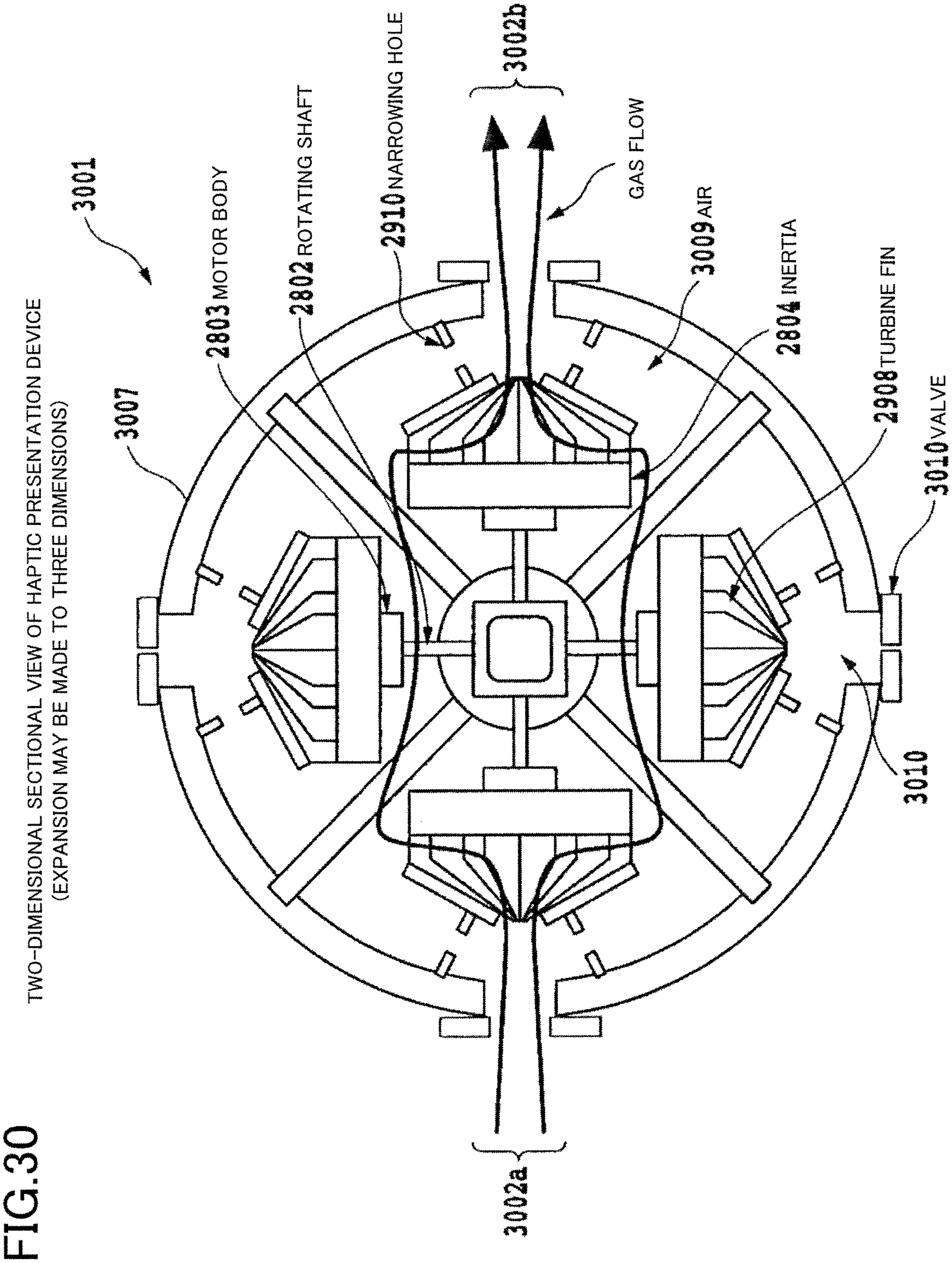
FIG. 30 is a view showing a two-dimensional sectional view of a haptic presentation device 3001 in which the haptic presentation device 2901 is further improved.

FIG. 30 is a view showing a two-dimensional sectional view of a haptic presentation device 3001 in which the haptic presentation device 2901 of FIG. 29 is further improved. The haptic presentation device 3001 includes an air 3009 in a spherical housing 3007, holes 3010 are provided in the housing 3007 to be opposite to turbine fins, and FIG. 30 is a sectional view taken along the center of the spherical housing 3007. As a result that the holes 3010 are provided in the housing 3007, in the haptic presentation device 3001, according to the control of a motor, for example, air flows 3002*a* and 3002*b* flowing through the haptic presentation device 3001 from the left to the right of FIG. 30 are generated. In this case, as compared with the haptic presentation device 2901 of FIG. 29 in which a force sensation continues to be presented in the left direction in the drawing, in the haptic presentation device 3001, the force of jet of the air flow 3002*b* is also added, and the efficiency of continuing to present the force sensation in the left direction in the drawing is improved. Incidentally, it would be obvious for one skilled in the art that the closing and opening of these holes is controlled (not inevitable) by a valve 3010 and a control circuit, so that the flow rate and flow speed can be controlled.

The turbine fin is a variable fin which can control a relation between a rotation direction and a blast direction, and even if the torque direction resulting from the rotation is the same direction, the flowing direction of an air current can be controlled by changing the angle of the fin. Besides, it may be fixed according to a use.

Incidentally, rotators of two motors, motor bodies, eccentric rotation bodies, two turbine fins in which the generating directions of air currents are opposite to each other are mounted to one rotating shaft 2802, and the flow direction of the air current may be controlled by selecting the turbine fin to be rotated (not shown).

Applied Example 2

Figure 31:
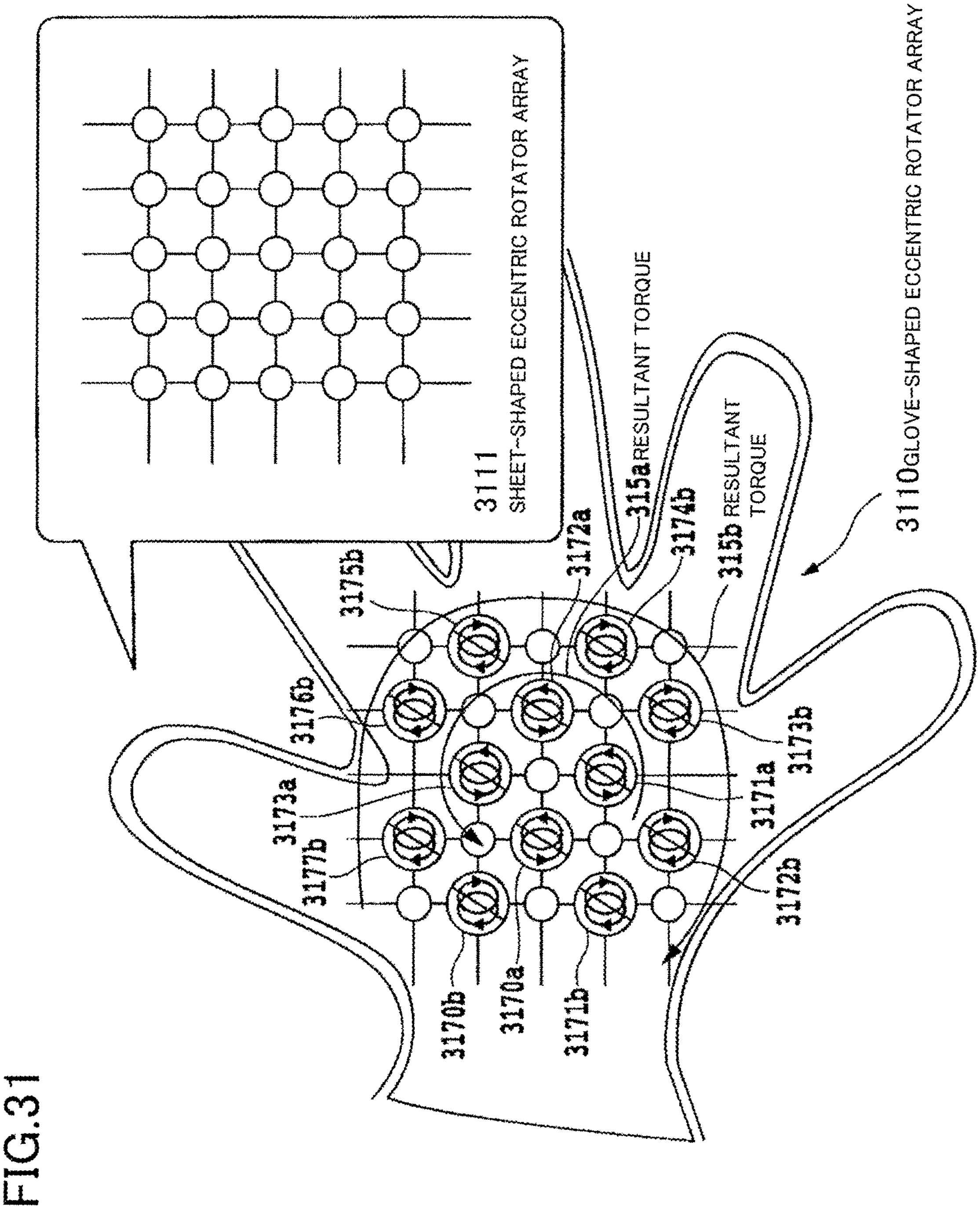
FIG. 31 is a view showing another applied example of the glove-shaped eccentric rotator array 890 of FIG. 15.

FIG. 31 is a view showing another applied example of the groove-shaped eccentric rotator array 890 of FIG. 15 and is a view showing a groove-shaped eccentric rotator array 3110 in which a sheet-shaped eccentric rotator array 3111 is formed into a groove shape. In FIG. 31, rotators are arranged like a grid, and only eccentric rotators 3170*a* to 3173*a*, and 3170*b* to 3177*b* rotate. By this, by suitably controlling the rotations of the eccentric rotators 3170*a* to 3173*a*, and 3170*b* to 3177*b* of the groove-shaped eccentric rotator array 3110, haptic information of a virtual twist as a spatial expansion can be presented onto the palm. In more detail, a large torque is presented in the same direction by the eccentric rotators 3170*a* to 3173*a*, so that a large resultant torque 315*a* to twist the center part of the palm counterclockwise is presented. Besides, a small torque is presented in the same direction by the eccentric rotators 3170*b* to 3177*b*, so that a resultant torque 315*b* to twist the palm peripheral part clockwise is presented. By this, a virtual twist haptic sensation is felt in which the palm center part is intensely twisted counterclockwise, and the palm peripheral part is weakly twisted clockwise.

Figure 32:
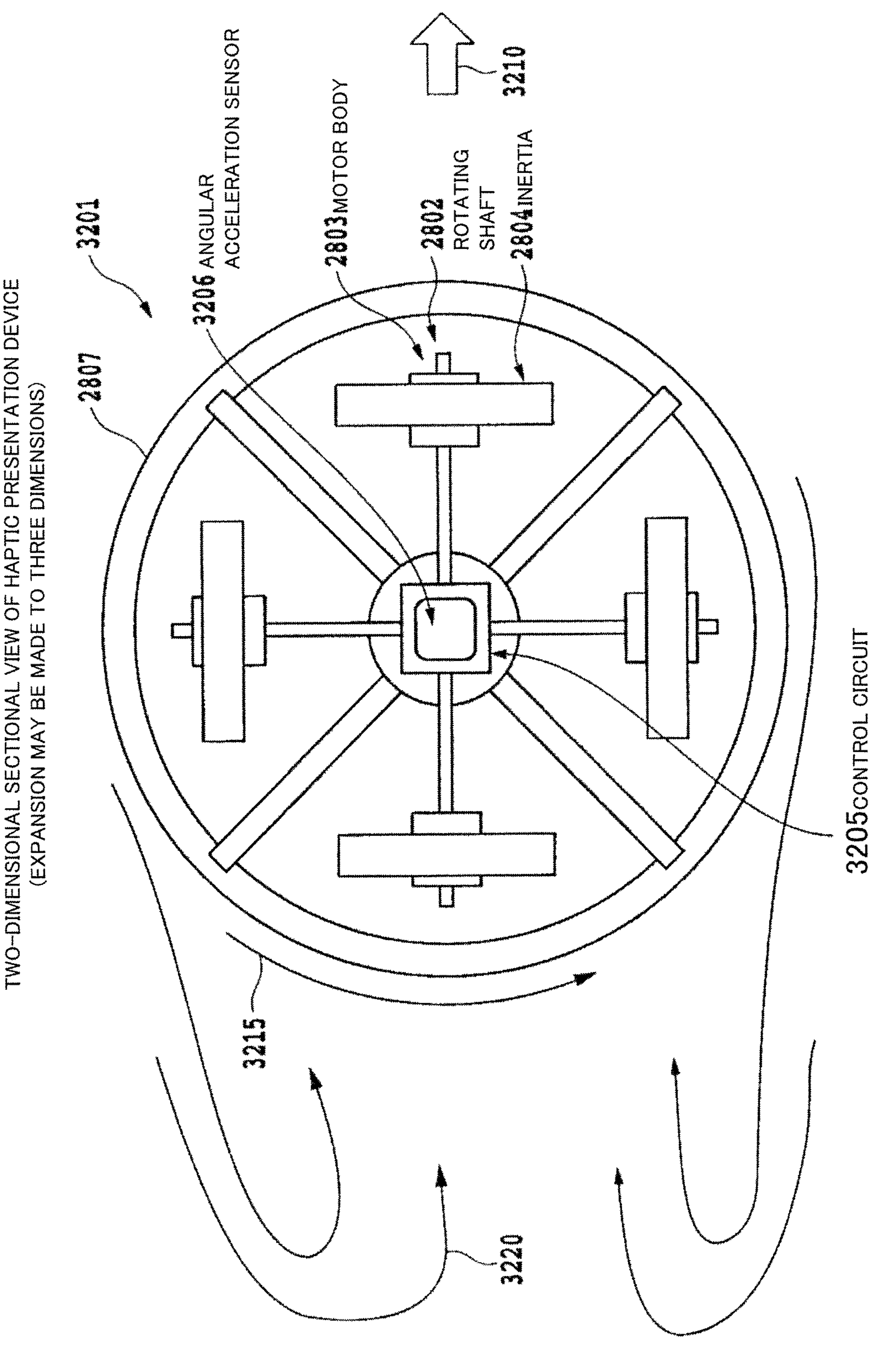
FIG. 32 is a view showing a two-dimensional sectional view of a haptic presentation device 3201 in which the haptic presentation device 2801 is further improved.

FIG. 32 is a view showing a two-dimensional sectional view of a haptic presentation device 3201 in which the haptic presentation device 2801 of FIG. 28 is further improved. In the haptic presentation device 3201, a control circuit 3205 and an angular acceleration sensor (and gravity/acceleration sensor) 3206 are arranged at the center part of a spherical housing 2807, and FIG. 32 is a sectional view taken along the center of the spherical housing 2807. The control circuit 3205 corresponds to the control device 4120 of FIG. 41, and the angular acceleration sensor (and the gravity/acceleration sensor) 3206 corresponds to the input device 4130 of FIG. 41. Although it is assumed that the haptic presentation device 3201 of FIG. 32 is a ball in a mode of a baseball ball, it may be a ball with any shape. The angular acceleration sensor 3206 monitors a back spin 3215 generated at the release when the ball (haptic presentation device 3201) is pitched in a direction denoted by reference numeral 3210 in the drawing. Besides, in the case of a uniform rotation motion, the gravity direction is detected by the gravity/acceleration sensor, and since the gravity direction is periodically changed in the xyz axis components of the sensor, the rotation of the ball can be monitored. Incidentally, even if the method as stated above is not used, when the rotation of the ball can be detected, another method can be applied. The control circuit 3205 analyzes the input information from the angular acceleration sensor (and the gravity/acceleration sensor) 3206, and controls a motor in the haptic presentation device 3201 so as to cancel the back spin 3215 of the ball (haptic presentation device 3201). Thus, the ball (haptic presentation device 3201) is not rotated, and becomes a breaking ball (so-called knuckle ball) irregularly swaying and changing by the influence of the flow and swirl generated behind it. Similarly, by freely controlling the rotation and the like, it is possible to realize various breaking balls including a curve, a shoot, and a breaking ball which is impossible in a real baseball, such as a breaking ball which is curved and then shoots and drops. Incidentally, the embodiment of FIG. 32 can be applied to the haptic presentation device 2901 of FIG. 29.

Reference is again made to the haptic presentation device 3001 of FIG. 30. In a conventional haptic presentation device in the VR, its own weight reduces the original VR effect to be felt by the user. Then, in the haptic presentation device 3001 of FIG. 30, the air current flowing through the haptic presentation device 3001 from the top to the bottom of FIG. 30 is generated by the control of the motor, so that the force of the jet of the air current toward the bottom reduces the weight of the haptic presentation device 3001 itself to be felt by the user, and the original effect to cause the user to feel the VR can be improved. Similarly, by generating the air current flowing through the haptic presentation device 3001 from the bottom to the top of FIG. 30, the user can be made to feel that the weight of the haptic presentation device 3001 itself is heavier than actual by the force of the jet of the air current toward the top.

Figures 33A, 33B:
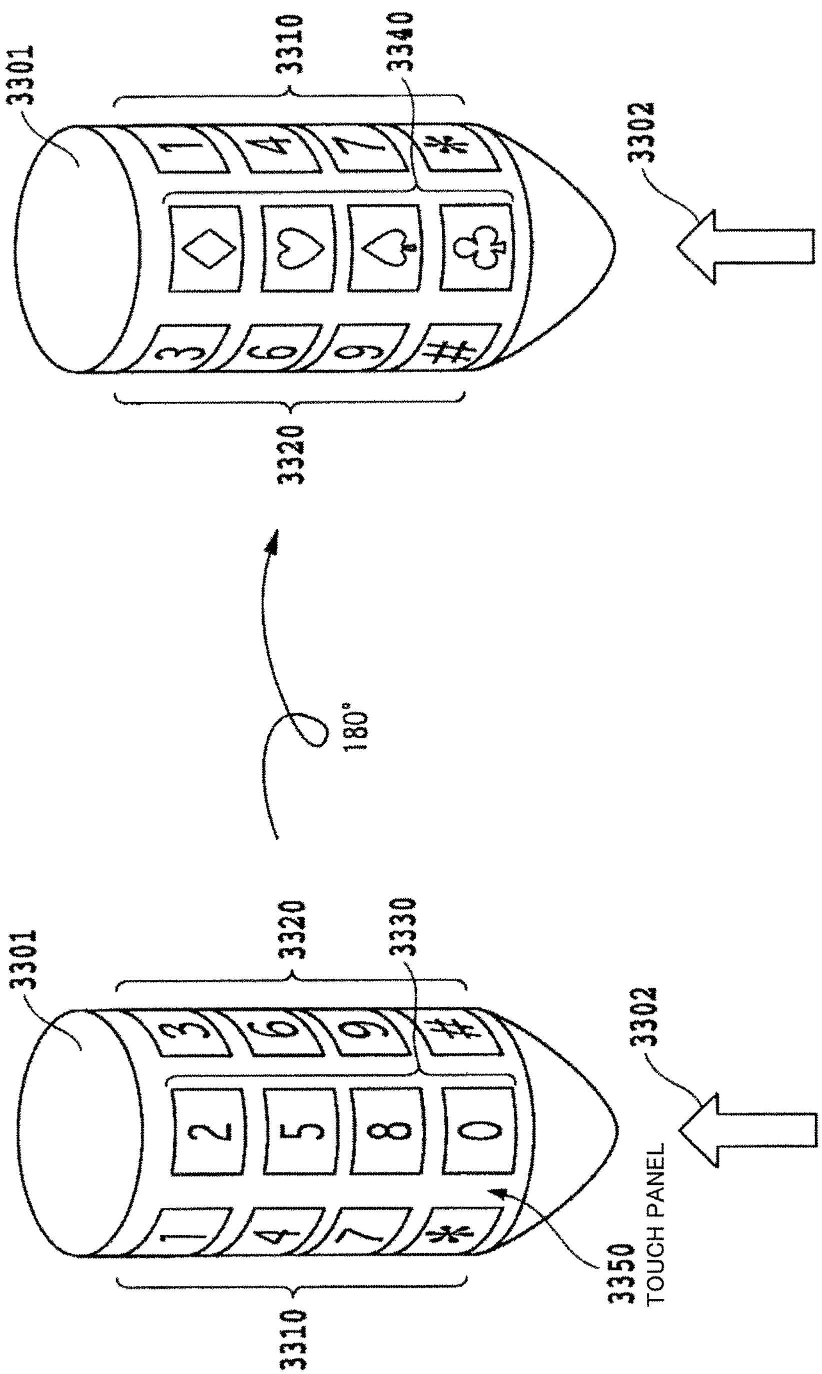
FIGS. 33A and 33B are explanatory views of a pen-shaped device 3301 having a built-in haptic presentation device of the embodiment.
Figure 42C:
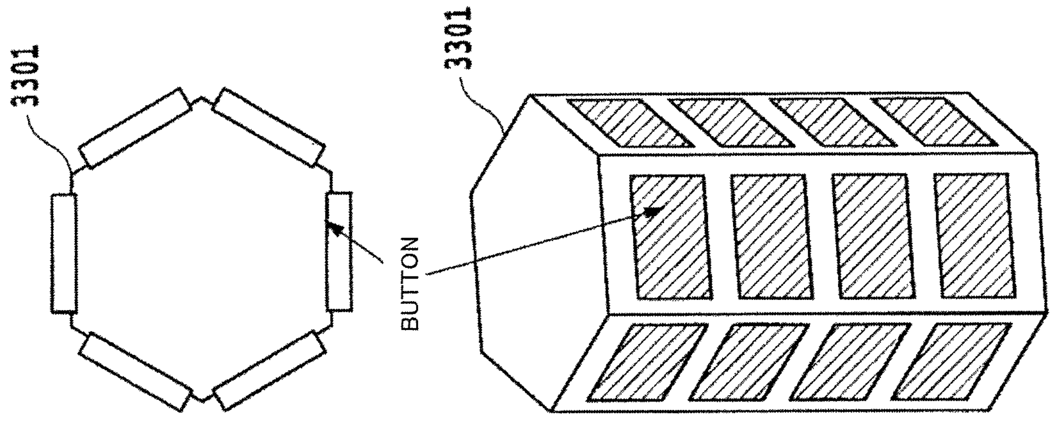
FIGS. 42A to 42C are supplemental explanatory views of the pen-shaped device 3301 having the built-in haptic presentation device of the embodiment.
Figure 42B:
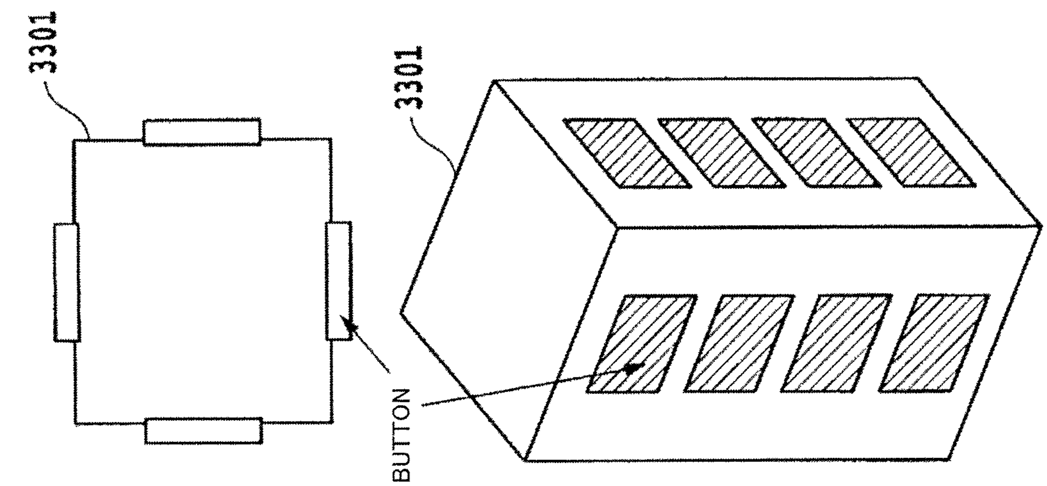
Figure 42A:
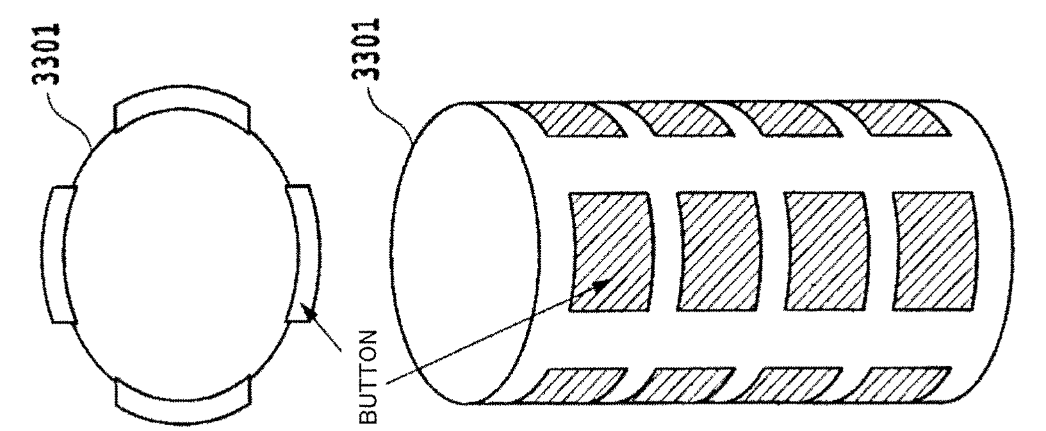
Figure 43:
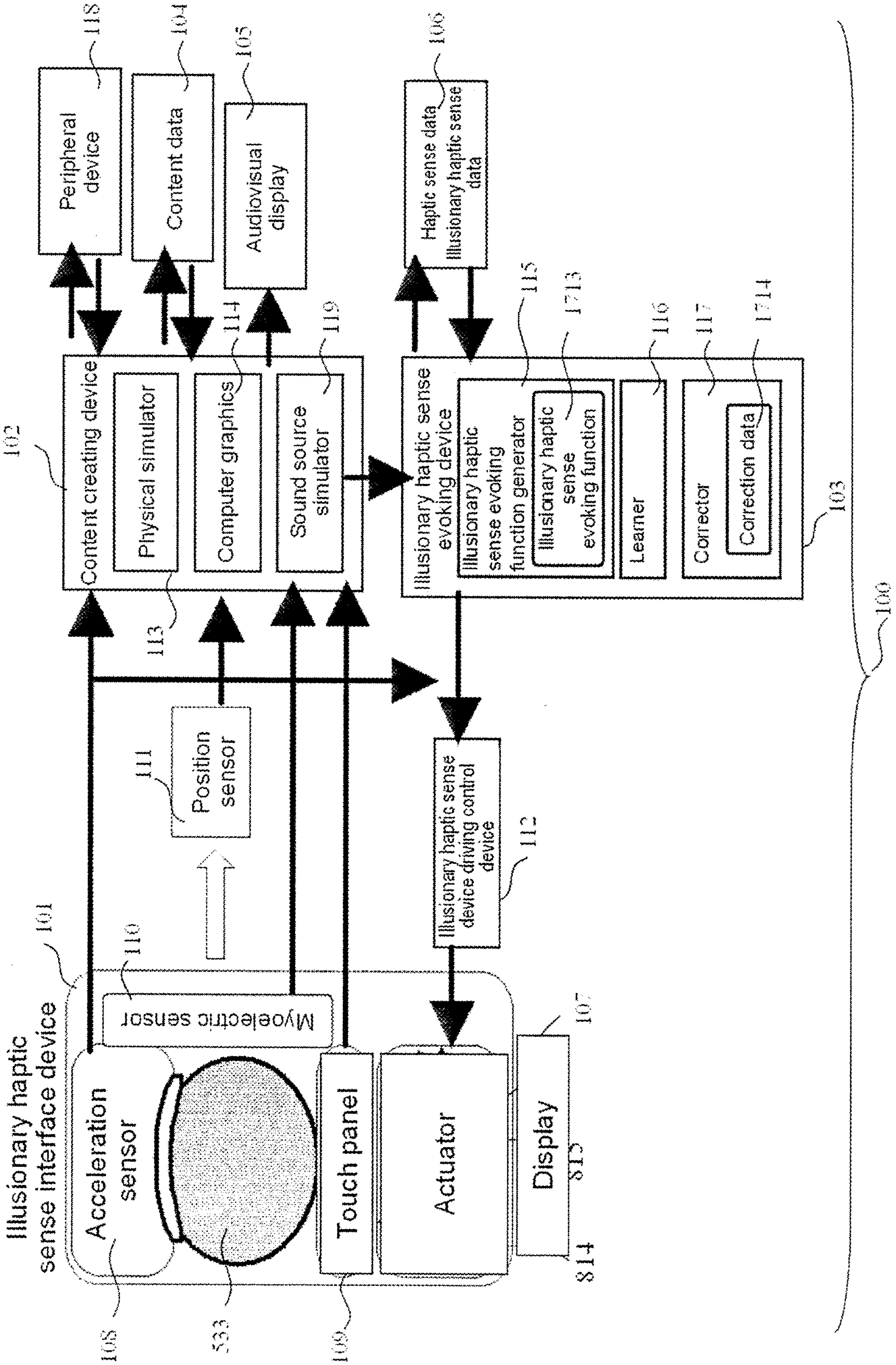
FIG. 43 is a view showing a rough structure of a system configuration of haptic sense display.
Figure 44:
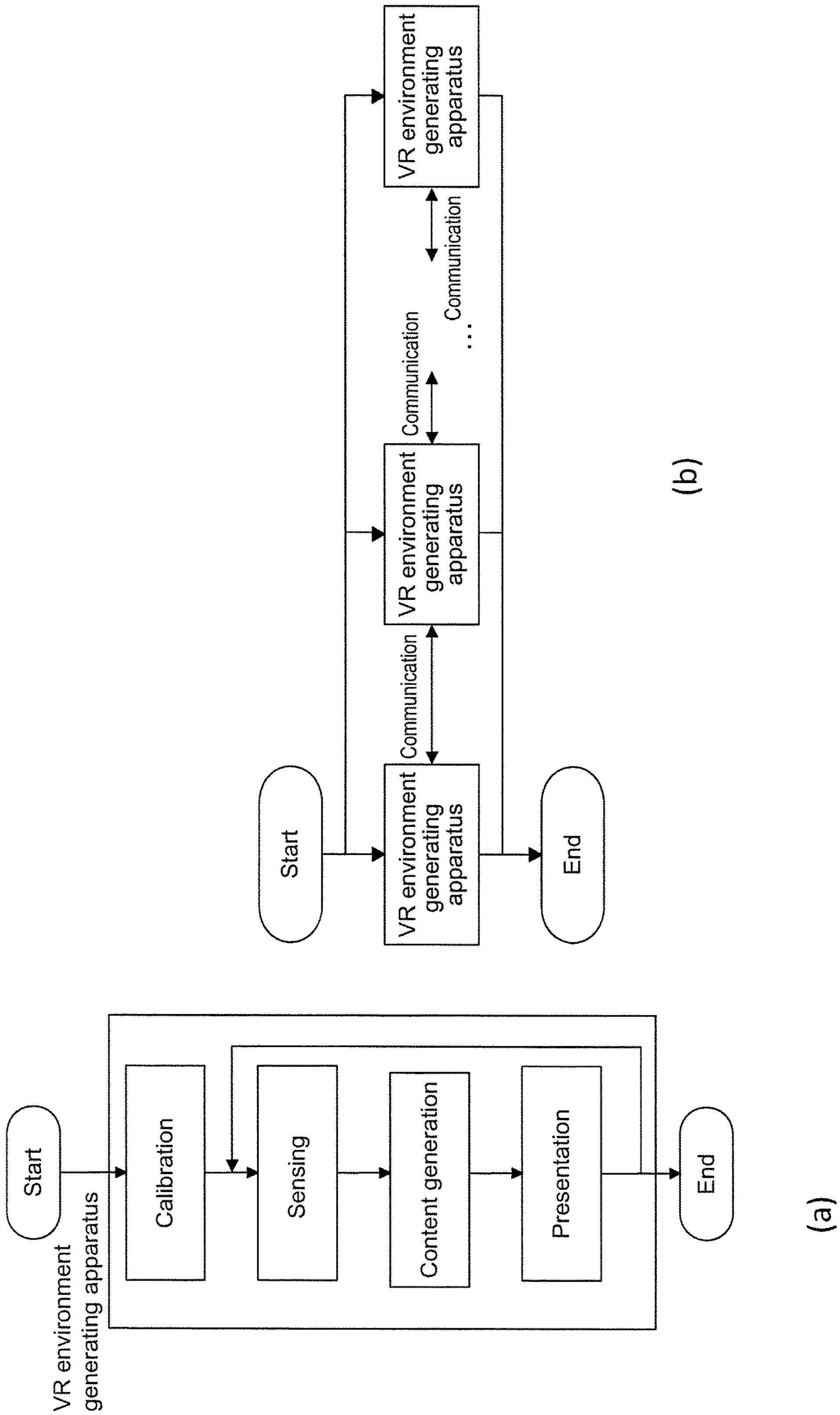
FIG. 44 is an explanatory process flow of a VR environment generating apparatus.
Figure 45:
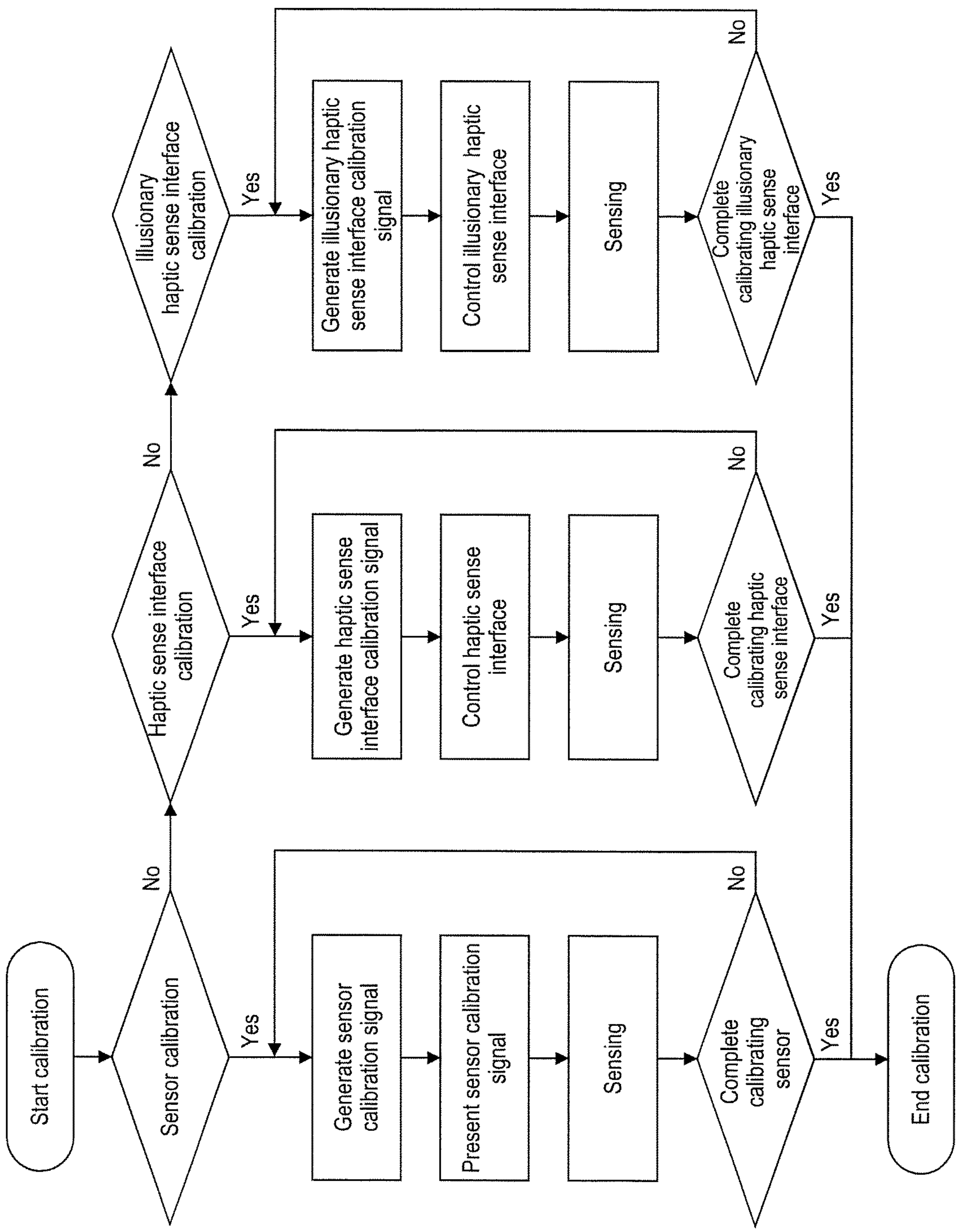
FIG. 45 is an explanatory calibration flow.
Figure 46:
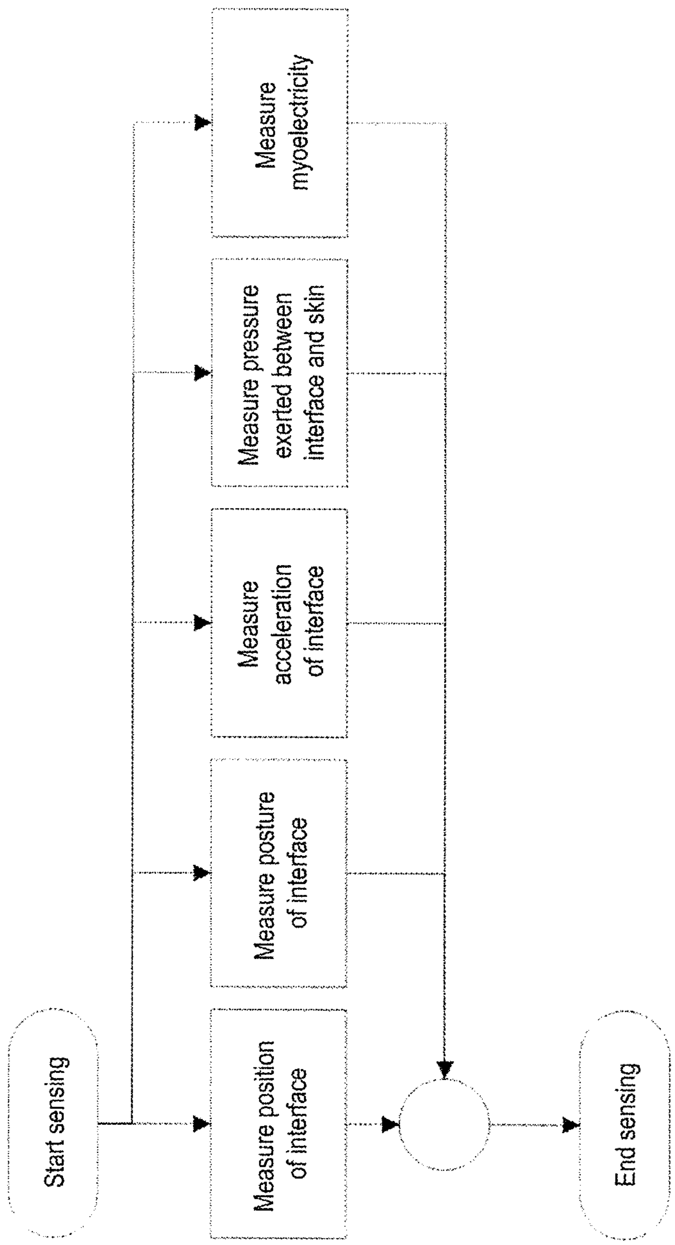
FIG. 46 is an explanatory sensing flow.
Figure 47:
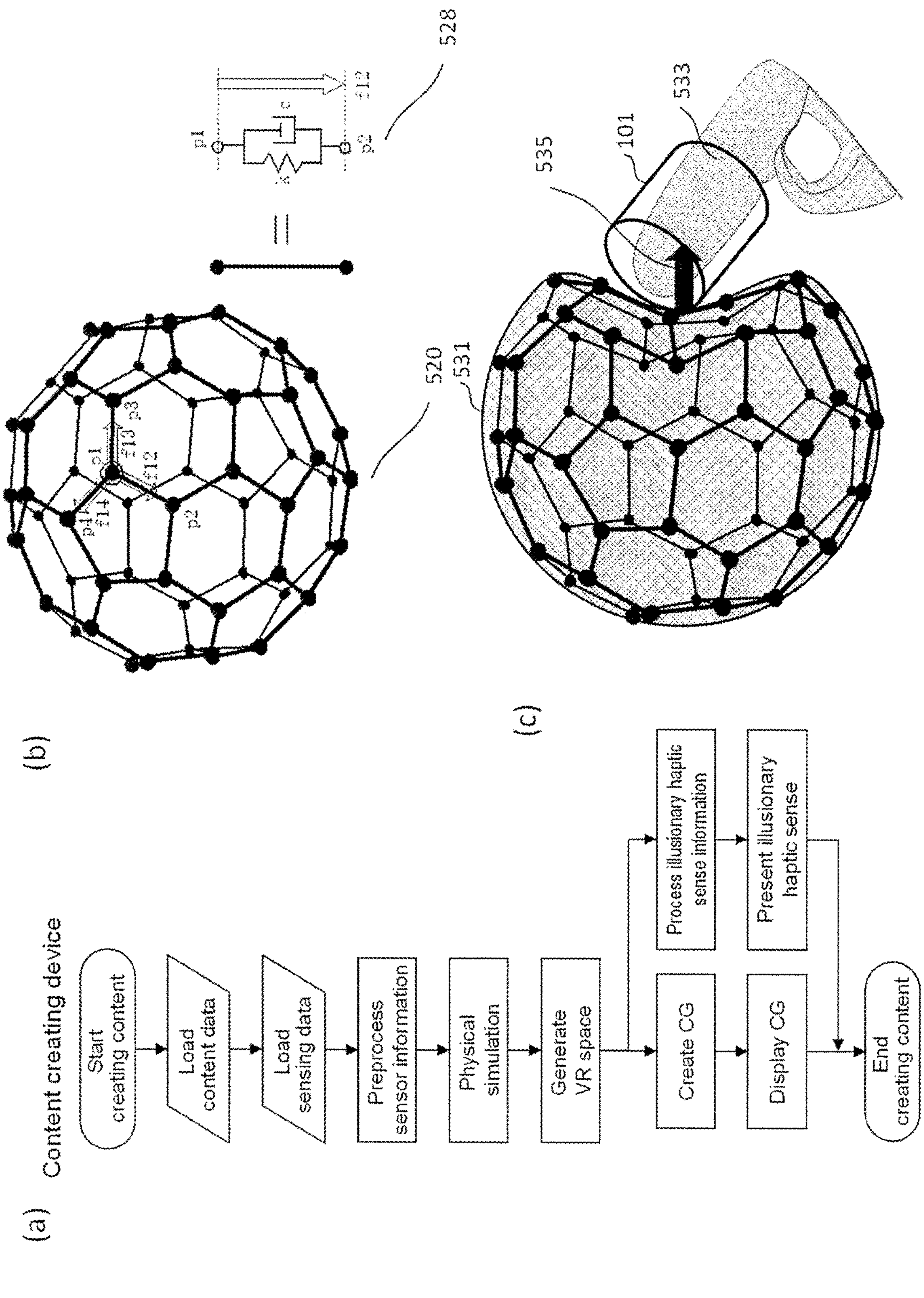
FIG. 47 is an explanatory physical simulation flow.

FIGS. 33A and 33B are explanatory views of a pen-shaped device 3301 having the built-in haptic presentation device described in the embodiment. The pen-shaped device 3301 is provided with a touch panel 3350 on a surface, the touch panel 3350 indicates respective button columns denoted by reference numerals 3310, 3320, 3330, and 3340 in the drawing, and each of the button columns includes four buttons. It is intended that the pen-shaped device 3301 of this embodiment is applied to, for example, a pen-shaped cellular phone. Incidentally, the function of the touch panel 3350 may be realized by a physical button instead of the touch panel. Besides, each of the button columns may include a desired number of buttons instead of the four buttons. Besides, a desired number of button columns may be provided (as examples of these, FIGS. 42A to 42C are provided as supplemental explanation views of FIGS. 33A and 33B). Here, although the rotation of 180° is performed from FIG. 33A to FIG. 33B and the use is made, virtual operation panels which is the number of columns exist at intervals of a rotation angle of (360°/the number of columns).

As shown in FIG. 33A, in the case where the user grasps the pen-shaped device 3301 and the pen-shaped device 3301 is seen from a direction denoted by reference numeral 3302, the button columns 3310, 3320 and 3330 respectively have buttons of numeral input functions of “1, 4, 7, *”, “3, 6, 9, #” and “2, 5, 8, 0”.

On the other hand, as shown in FIG. 33B, in the case where the user rotates the pen-shaped device 3301 from the state of FIG. 33A by 180° and grasps it, and the pen-shaped device 3301 is seen from a direction denoted by reference numeral 3302, the buttons “1, 4, 7, *” of the button column 3310 respectively become kana input functions of “A, TA, MA, “.”, the buttons “3, 6, 9, #” of the button column 3320 respectively become kana input functions of “SA, HA, RA, (enter)”, and the buttons 「◇、♡、♤、♧」 of the button column 3340 become kana input functions of “KA, NA, HA, WA”. That is, in the case of this example, the realization is performed with four rows and four columns, and as the front side of the device, the first column, the second column and the third column are used, and as the back side of the device, the third column, the fourth column, and the first column are made usable.

Figure 34A:
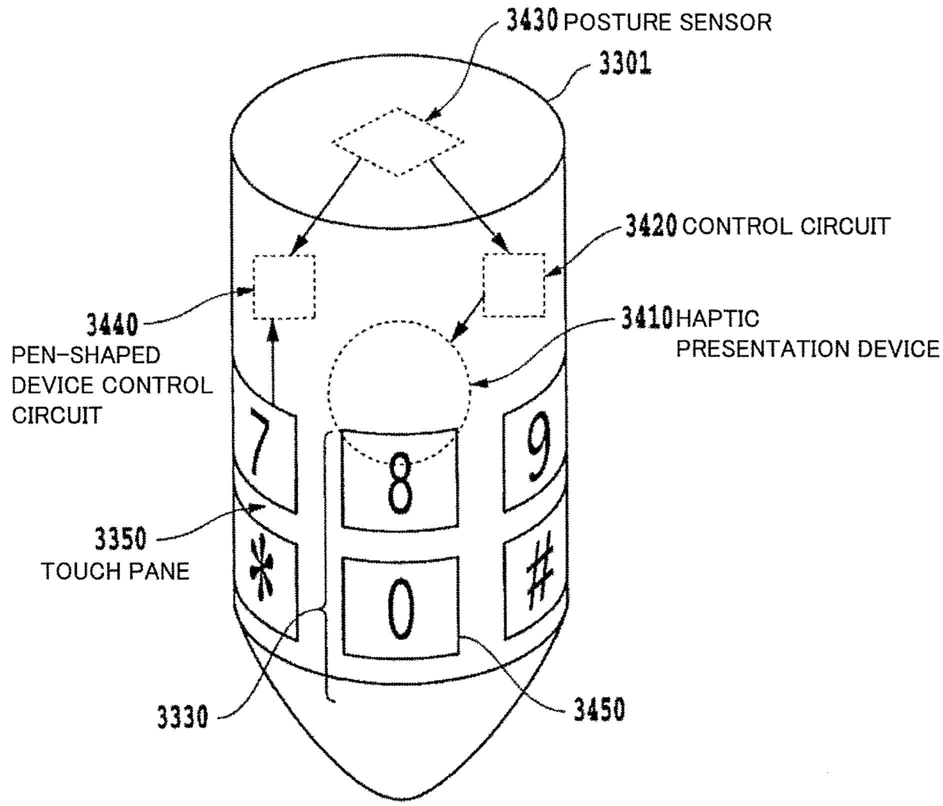
FIGS. 34A and 34B are views showing a rough structure of a pen-shaped device 3301.
Figure 34B:
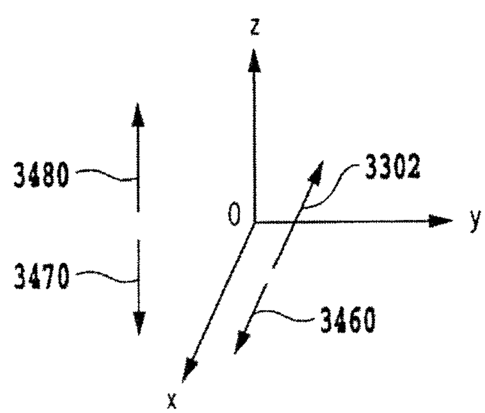

FIGS. 34A and 34B are views showing a rough structure of the pen-shaped device 3301. The pen-shaped device 3301 includes a haptic presentation device 3410, a control circuit 3420, a posture sensor 3430 based on a well-known acceleration sensor, a pen-shaped device control circuit 3440, and a touch panel 3350. The control circuit 3420 corresponds to the control device 4120 of FIG. 41, and the posture sensor 3430 corresponds to the input device 4130 of FIG. 41. The pen-shaped device control circuit 3440 judges, based on the input from the posture sensor 3430, in which state of FIG. 33A and FIG. 33B the user sees the pen-shaped device 3301. As in FIG. 33A or FIG. 33B, the input functions of the respective button columns denoted by reference numerals 3310, 3320, 3330 and 3340 are determined, and the corresponding buttons are displayed on the touch panel. Besides, the pen-shaped device control circuit 3440 processes the input from the touch panel 3350, and in the case where for example, the button “0” is depressed by the user, the input of numeral 0 is processed. Since a circuit and its control to process the input from the posture sensor 3430 and the input from the touch panel 3550, such as the pen-shaped device control circuit 3440, are well-known for one skilled in the art, the detailed description would be unnecessary.

Here, for example, in the case where the button “0” is depressed by the user, the posture sensor 3430 detects the posture change toward a direction 3302 in FIG. 34B, or the pressure sensor of the touch panel detects the motion of the depressing finger, and the control circuit 3420 analyzes the input information from the posture sensor 3430, controls the motor in the haptic presentation device 3410, and gives haptic feedback so as to present the movement in the directions 3460 and 3302, so that a feeling such as to press an actual button is presented in spite of the virtual button on the touch panel. Thus, the haptic presentation device 3410 presents the force in the directions 3460 and 3302, and causes the user to feel the depression of the button "0".

Besides, for example, in the case where the button "0" is rubbed by the user from the top to the bottom, the posture sensor 3430 detects a posture change toward a direction 3470 in FIG. 34B, or the sensor of the touch panel detects the movement of the finger, and the control circuit 3420 analyzes input information from the posture sensor 3430 and the touch panel sensor, controls the motor in the haptic presentation device 3410, and gives haptic feedback the movement in the directions 3470 and 3480, so that a feeling such as to operate an actual scroll wheel or joystick is presented in spite of the virtual wheel on the touch panel. Thus, the haptic presentation device 3410 presents the force in the directions 3470 and 3480, and causes the user to feel the operation feeling of the virtual scroll wheel.

Figure 35:
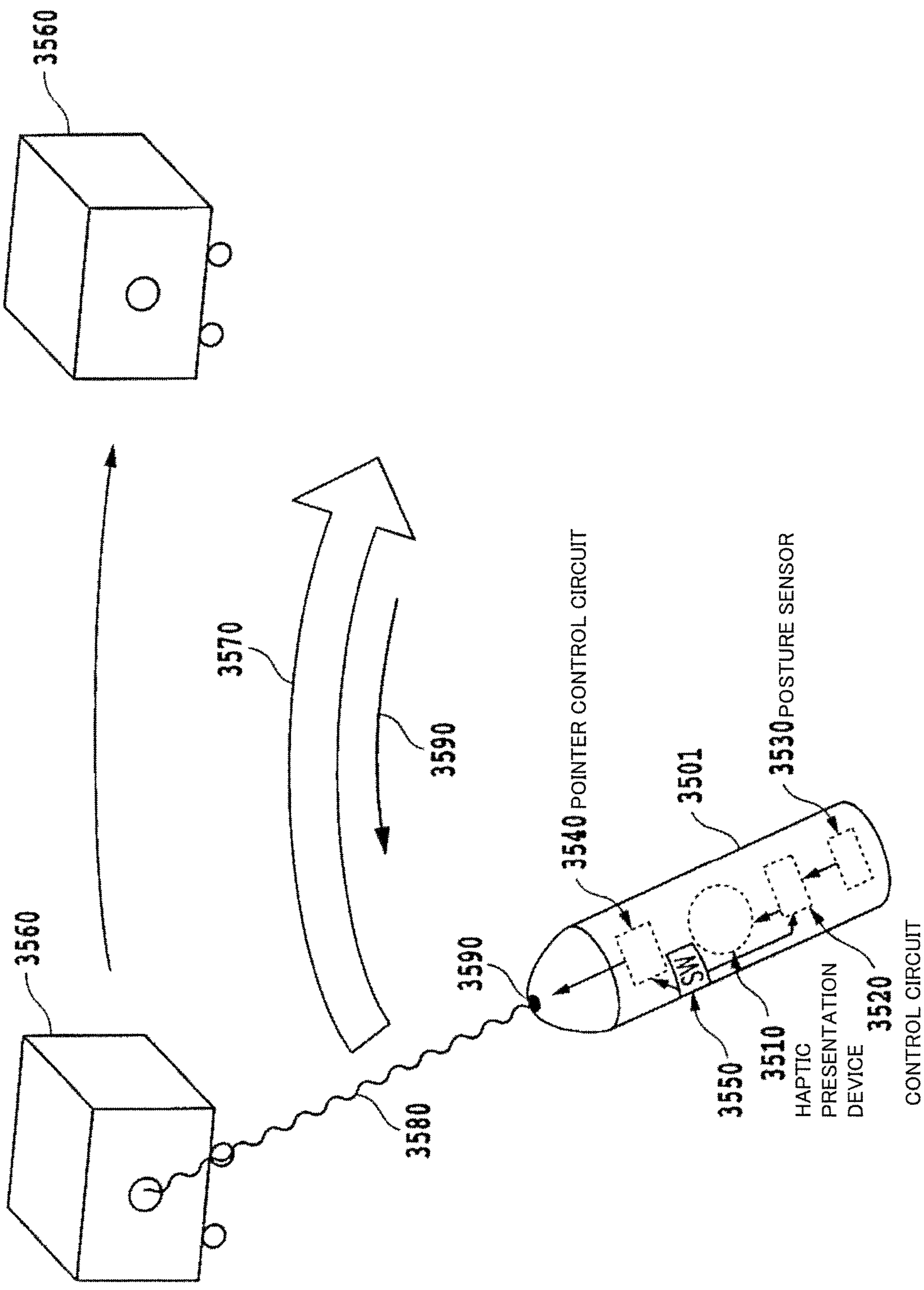
FIG. 35 is an explanatory view of a laser pointer 3501 having a built-in haptic presentation device of the embodiment and is a view showing a rough structure of the laser pointer 3501.

FIG. 35 is an explanatory view of a pointer 3501 having a built-in haptic presentation device described in the embodiment, and is a view showing a rough structure of the pointer 3501. The pointer 3501 includes a haptic presentation device 3510, a control circuit 3520, a posture sensor (or a position sensor or an acceleration sensor) 3530, a pointer control circuit 3540, a switch 3550, and a laser light source 3590. The control circuit 3520 corresponds to the control device 4120 in FIG. 41, and the posture sensor 3530 and the switch 3550 correspond to the input device 4130 in FIG. 41. The pointer control circuit 3540 makes a control so that when the switch 3550 is turned ON, a laser beam 3580 is emitted from the laser light source 3590. Since a circuit to control the laser light source 3590 to emit the laser beam 3580, such as the pointer control circuit 3540, and its control are well known for one skilled in the art, the detailed description would be unnecessary.

Here, in the case where the user depresses the switch 3550, and the pointer 3501 is swayed in a direction 3570, the posture sensor 3530 detects the posture change toward the direction 3570, and the control circuit 3520 analyzes input information from the posture sensor 3530, and controls a motor in the haptic presentation device 3510 so as to suppress the movement of the haptic presentation device 3510 toward the direction 3570. Thus, the haptic presentation device 3510 presents a force in a direction 3590, and causes the user to feel a resisting force against the sway direction 3570. By this, for example, in the case where the laser beam 3580 is irradiated to an object 3560 having a laser beam tracking function, and the object 3560 is moved from the left to the right in FIG. 35 while being pointed, the user is made to feel the resisting force (force in the direction 3590) against the direction 3570 in which the object 3560 is moved, and as a result, such a feeling that the user grasps the object 3560 and moves it is given. Here, although the selection of the object 3560 and the grasping intention are informed to the pointer control circuit 3540 by using the laser light source 3590 and the laser beam tracking function, no limitation is made to this as long as the selection and the grasping intension can be inputted.

Figure 36:
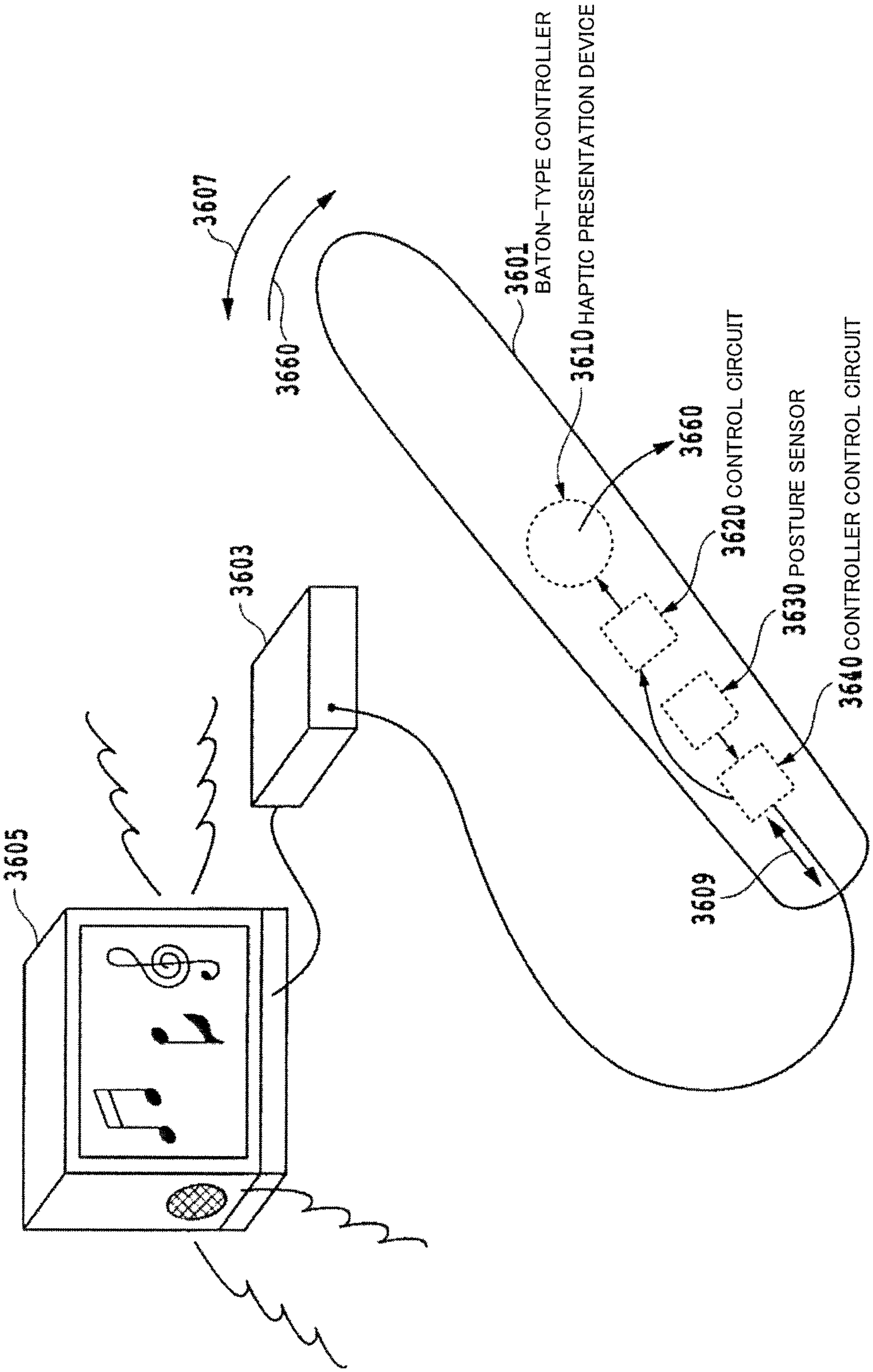
FIG. 36 is an explanatory view of a baton-type controller 3601 having a built-in haptic presentation device of the embodiment and is a view showing a rough structure of the baton-type controller 3601.

FIG. 36 is an explanatory view of a baton-type controller 3601 having a built-in haptic presentation device described in the embodiment, and is a view showing a rough structure of the baton-type controller 3601. The baton-type controller 3601 is a controller used in a well-known (conducting) music game of a home video game machine. The baton-type controller 3601 includes a haptic presentation device 3610, a control circuit 3620, a posture sensor 3630, and a controller control circuit 3640. The control circuit 3620 corresponds to the control device 4120 in FIG. 41, and the posture sensor 3630 and the controller control circuit 3640 correspond to the input device 4130 in FIG. 41. The controller control circuit 3640 transmits/receives a signal 3609 to/from a game machine 3606, processes input information from the posture sensor 3630 to transmit it to the game machine 3606, and receives an instruction from the game machine 3606. Since a circuit to perform a control to communicate with the game machine 3606, such as the controller control circuit 3640, and its control are well-known for one skilled in the art, the detailed description would be unnecessary. Incidentally, in FIG. 36, although a signal of a wired system is exemplified as the signal 3609, no limitation is made to this, and the signal 3609 may be a signal in a wireless system.

Here, when the user plays the music game of a monitor 3605, in the case where the baton-type controller 3601 is swayed in a direction 3607, the posture sensor (or pressure sensor) 3630 detects the grasping way and the posture change toward the direction 3607, and the controller control circuit 3640 processes the input information from the posture sensor 3630, and transmits it to the game machine 3606. The game machine 3606 processes the music game based on the information of the posture change from the posture sensor 3630, and the performance of an orchestra in the music game, such as a tempo, rhythm, and breath, is changed by the swinging way of the baton of the conductor. In the case where it is judged that the music at that time exceeds the performance speed at which a person can play and the dynamic range of a playing method, a suppression signal is transmitted to the controller control circuit 3640. When receiving the suppression signal, the controller control circuit 3640 transmits the information to the control circuit 3620. The control circuit 3620 analyzes the input information from the controller control circuit 3640, and controls a motor in the haptic presentation device 3610 so as to suppress the motion of the haptic presentation device 3610 toward the direction 3607. Thus, the haptic presentation device 3610 presents a force toward a direction 3660, and causes the user to feel a resisting force against the swing direction 3607. By this, in the music game, the music does not exceed the performance speed at which a person can play and the dynamic range of the playing method, and the music game becomes more real.

Modified Examples

Hereinafter, modified examples of the operation principles 1 to 3 will be described.

Figure 37:
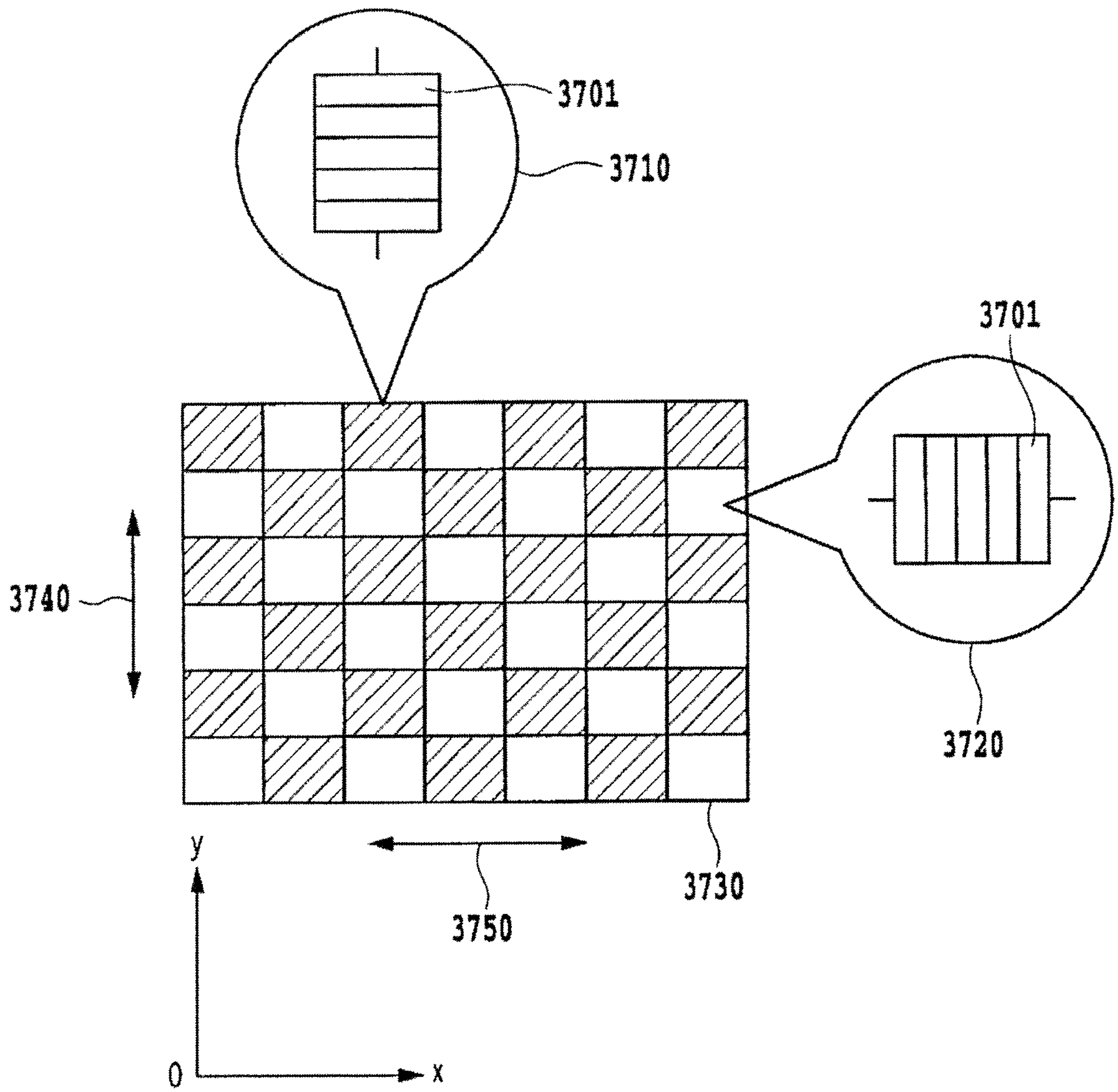
FIG. 37 is a view showing a rough structure of a modified example of the haptic information presentation method of FIG. 11D, FIGS. 38A and 38B are views showing a rough structure of another modified example of the haptic information presentation method of FIG. 11D.

FIG. 37 is a view showing a rough structure of a modified example of the haptic information presentation method of FIG. 11D described in the embodiment. In FIG. 11D, the two eccentric rotators are synchronously rotated in the opposite directions, and the force to linearly generate the simple harmonic oscillations in an arbitrary direction is synthesized. FIG. 37 is a view showing a piezoelectric matrix 3730 as an oscillator in which instead of the eccentric rotators, piezoelectric elements 3701 are used. A piezoelectric array 3710 is constructed in which the plural piezoelectric elements 3701 are laminated in an x-direction in the drawing, a piezoelectric array 3720 is constructed in which the plural piezoelectric elements 3701 are laminated in a y-direction in the drawing, and the piezoelectric arrays 3710 and 3720 are alternatively arranged in the x and the y directions in the oscillator.

A haptic information presentation method using the piezoelectric matrix 3730 of FIG. 37 is a method in which the piezoelectric matrix 3730 is used instead of the rotator 4180 in FIG. 41. In the structure as stated above, the control device 4120 of FIG. 41 controls the voltage in the x direction in FIG. 37 to control simple harmonic oscillations 3750 in the x direction, and controls the voltage in the y direction in FIG. 37 to control simple harmonic oscillations 3740 in the y direction. Although a sufficient amplitude is not obtained by the single piezoelectric element 3701, in the structure of FIG. 37, the piezoelectric arrays 3710 and 3720 are constructed, so that a large amplitude can be produced. According to the method of FIG. 37, in the haptic presentation device 4110 of FIG. 41, a stepping motor and a servo motor required for driving the rotator 4180 become unnecessary, and also in the control device 4120, a control circuit for the motors becomes unnecessary, and the structure of the combination of the haptic presentation device and the control device becomes simple.

Further, it would be understood for one skilled in the art that when the piezoelectric matrix 3730 of FIG. 37 is expanded, and a piezoelectric cube is formed in which the piezoelectric arrays 3710 and 3720 are alternately arranged in the x, y and z directions, an oscillator can be formed in which simple harmonic oscillations in the x, y and z directions can be controlled. The method of FIG. 37 can be applied to, for example, a mechanism for generating a force in a desired direction by a controller of a game machine. Here, the arrangement pattern of the piezoelectric elements 3701 is arbitrary as long as the simple harmonic oscillations in the x, y and z directions can be generated.

Figure 38A:
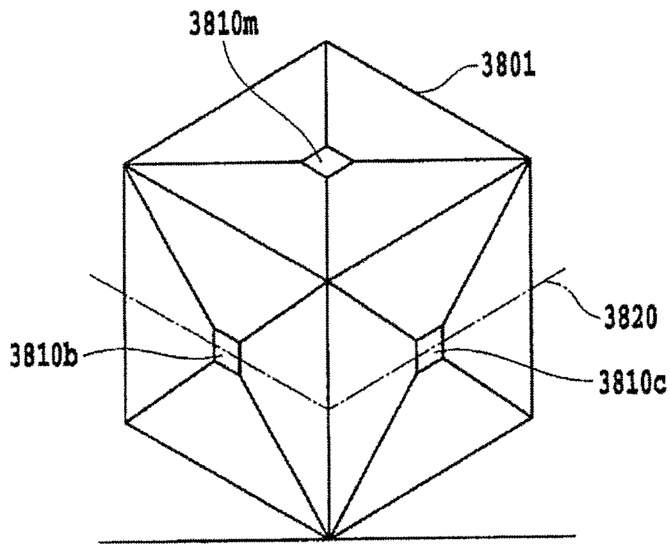
Figure 38B:
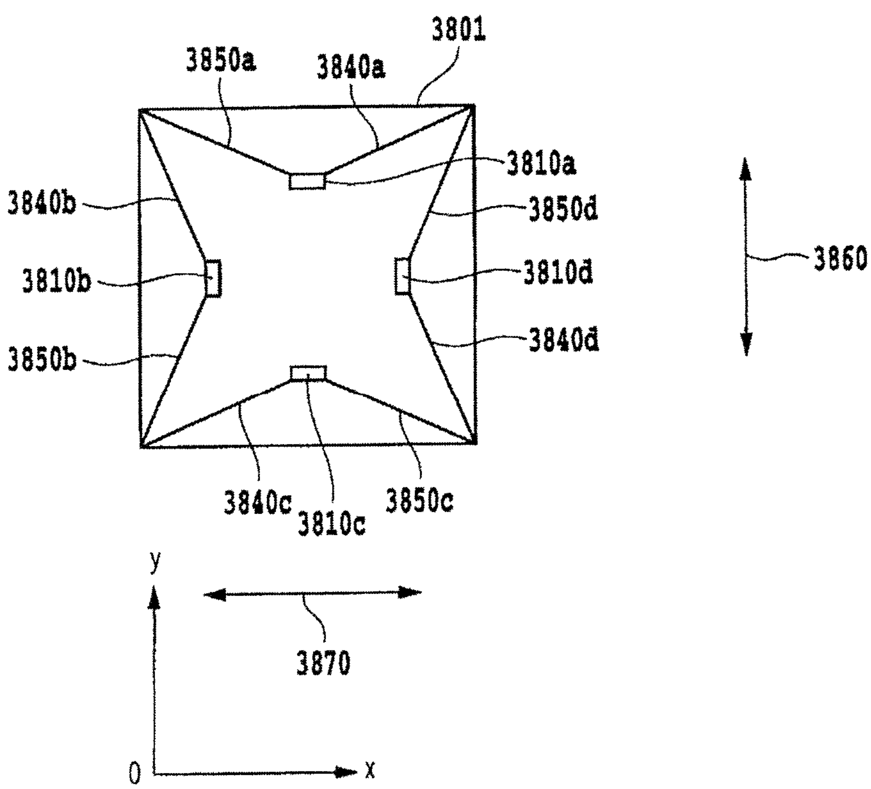

FIGS. 38A and 38B are also views showing a rough structure of another modified example of the haptic information presentation method of FIG. 11D described in the embodiment. FIG. 38A shows a cubic oscillator 3801 using a speaker structure instead of an eccentric rotator, and the oscillator 3801 includes magnets 3810*b*, 3810*c*, 3810*m* and the like of the speaker at the centers of the respective planes. Incidentally, the magnets 3810*b*, 3810*c*, 3810*m* and the like are not restricted to the centers of the respective planes, but may be located at arbitrary positions on the planes.

FIG. 38B is a view showing a sectional view in a case where in FIG. 38A, the oscillator 3801 is cut along a horizontal section 3820 passing through the barycenter and is seen. The oscillator 3801 includes, at the respective planes, cones 3840*a*, 3850*a*, 3840*b*, 3850*b*, 3840*c*, 3850*c*, 3840*d* and 3850*d* of the speaker combined with the magnets 3810*a*, 3810*b*, 3810*c* and 3810*d*, respectively.

The haptic information presentation method using the oscillator 3801 of FIGS. 38A and 38B is a method using the oscillator 3801 instead of the rotator 4180 in FIG. 41. In the structure as stated above, the control device 4120 of FIG. 41 controls, for example, the voltage of the magnet in the x direction in FIG. 38B to control simple harmonic oscillations 3870 in the x direction, and controls the voltage of the magnet in the y direction in FIG. 38B to control simple harmonic oscillations 3860 in the y direction. In the structure of FIGS. 38A and 38B, a large amplitude caused by the magnets of the speaker and by the vibrations of the cones can be produced. According to the method of FIGS. 38A and 38B, in the haptic presentation device 4110 of FIG. 41, a stepping motor and a servo motor required for driving the rotator 4180 become unnecessary, and also in the control device 4120, a control circuit for the motors becomes unnecessary, and the structure of the combination of the haptic presentation device and the control device becomes simple. Here, the structure of the cones 3840*a*, 3850*a*, 3840*b*, 3850*b*, 3840*c*, 3850*c*, 3840*d* and 3850*d* of the speaker combined with the respective magnets 3810*a*, 3810*b*, 3810*c* and 3810*d* may not be adopted, and as long as the simple harmonic oscillations in the x, y and z directions can be generated, no limitation is made particularly to the combination of the magnets and the cones, and a structure of only magnets may be adopted.

Figure 39B:
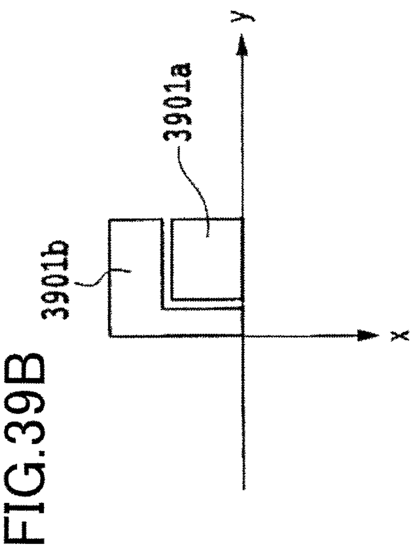
FIGS. 39A and 39B are views showing a rough structure of a modified example of a haptic presentation device 1301 of FIG. 13.
Figure 39A:
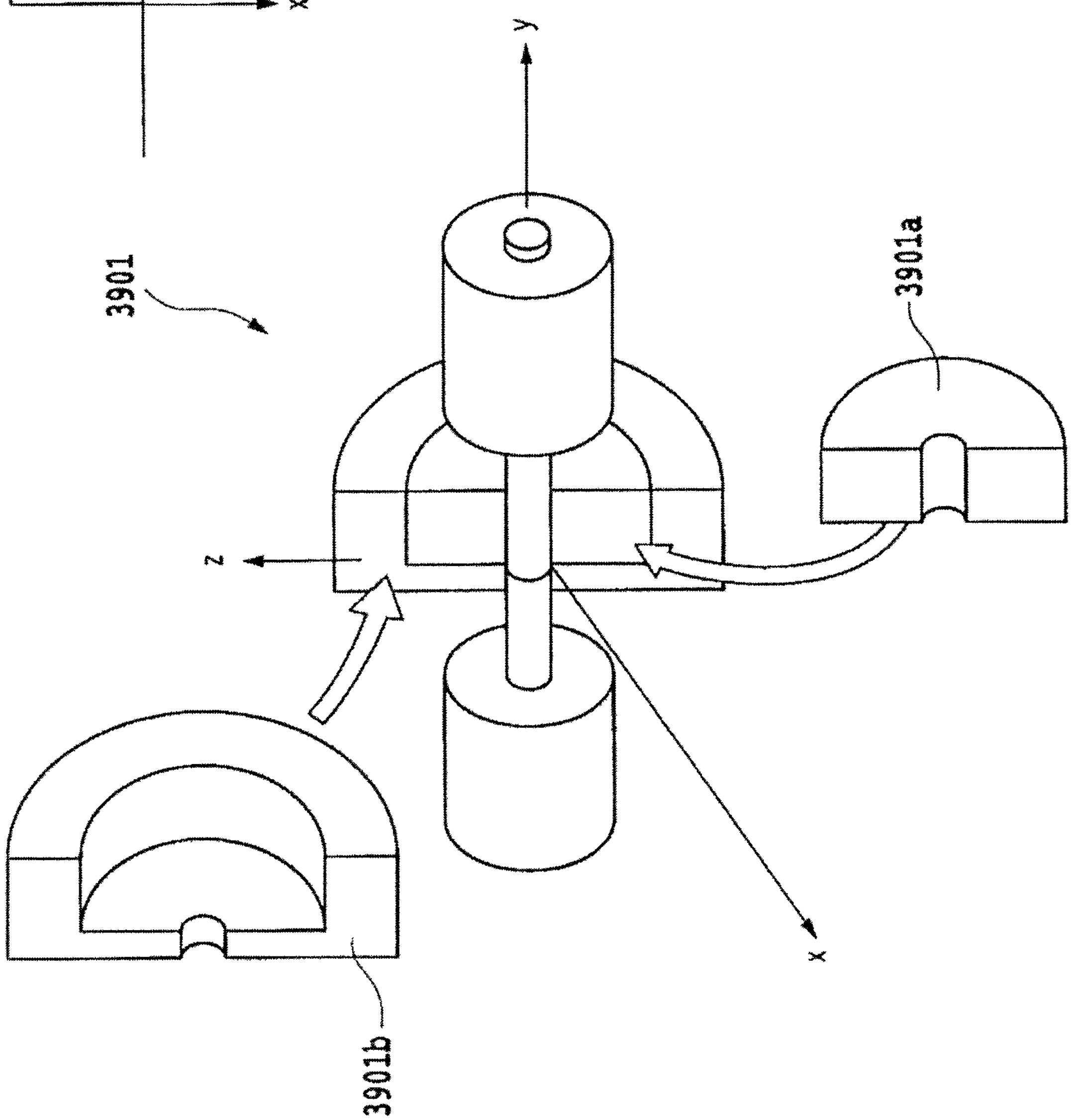

FIGS. 39A and 39B are views showing a rough structure of a modified example of the haptic presentation device 1301 of FIG. 13 described in the embodiment. In the haptic presentation device 1301 of FIG. 13, as in the description in FIGS. 11A to 11D, 12A and 12B which is the premise thereof, the rotation axes of the two eccentric rotators opposite to each other have only to be parallel to each other, inclusive of the case where they are on the same axis. Thus, in the haptic presentation device 1301 of FIG. 13, since the two facing eccentric rotators are separated in the rotation axis direction and respectively rotate on different planes, a surplus moment caused by mutual forces generated in the rotation plane directions of the two eccentric rotators is generated in the haptic presentation device 1301, and there is a fear that a rattle or the like of the rotation axis is caused. FIGS. 39A and 39B are views showing a structure in which a surplus moment caused by the rotation of two eccentric rotators on different planes is suppressed.

The arrangement of two facing eccentric rotators 3901*a* and 3901*b* shown in FIGS. 39A and 39B is such that the rotation axes thereof are on the same axis, and a part of the eccentric rotator 3901*b* covers the eccentric rotator 3901*a*. By the structure as stated above, since many material particles of the two eccentric rotators 3901*a* and 3901*b* are rotated on the same plane around the same rotation axis, the generation of the surplus moment caused by the rotation of the two facing eccentric rotators on the different planes is suppressed, and the rattle or the like of the rotation axis is also relieved. As a result of this, it is impossible to cause three pairs of the eccentric rotators 3901*a* and 3901*b* and the like to intersect at right angles at the barycenter position as in FIG. 13, and the respective eccentric rotator pairs 3901*a* and 3901*b* and the like have only to be in an orthogonal relation. Besides, when the rotations can be three-dimensionally combined in an arbitrary direction, they may not be orthogonal to each other. Incidentally, this embodiment is not limited to the three dimensions, and according to a use, it can be applied to one dimension or two dimensions.

Applied Example 3

Figure 40:
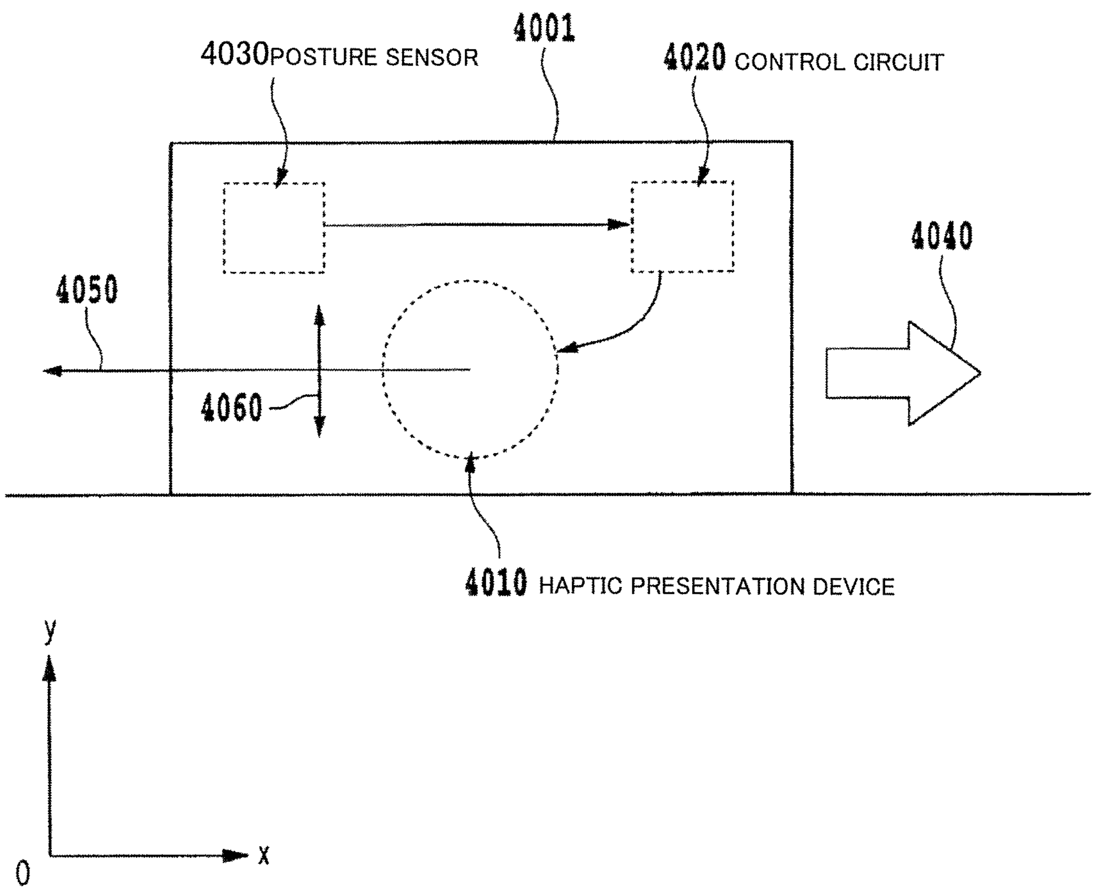
FIG. 40 is an explanatory view of a desk device 4001 having a built-in haptic presentation device of the embodiment and is a view showing a rough structure of the desk device 4001.

FIG. 40 is an explanatory view of a desk device 4001 having a built-in haptic presentation device described in the embodiment, and is a view showing a rough structure of the desk device 4001. The desk device 4001 includes a haptic presentation device 4010, a control circuit 4020, and a posture sensor 4030 (may be an acceleration, angular acceleration, or position sensor). The control circuit 4020 corresponds to the control device 4120 in FIG. 41, and the posture sensor 4030 corresponds to the input device 4130 in FIG. 41.

Here, for example, in the case where the desk device 4001 is moved on the desk by the user toward a direction 4040, the posture sensor 4030 detects the position change toward the direction 4040 in FIG. 40, and the control circuit 4020 analyzes input information from the posture sensor 4030, and controls motors in the haptic presentation device 4010 so as to suppress the motion of the haptic presentation device 4010 toward the direction 4040 or so as to sway it in the horizontal direction. Thus, the haptic presentation device 4010 presents a force in a direction 4050, and causes the user to feel the friction force on the desk against the movement toward the direction 4040.

Besides, for example, in the case where the desk device 4001 is moved on the desk by the user toward the direction 4040, the posture sensor 4030 detects the position change toward the direction 4040 in FIG. 40, and the control circuit 4020 analyzes input information from the posture sensor 4030, and controls motors in the haptic presentation device 4010 so as to generate a force in a normal direction to the direction 4040 of the haptic presentation device 4010. Thus, the haptic presentation device 4010 presents a force to generate simple harmonic oscillations or the like in the direction 4060, and causes the user to feel the roughness on the desk against the movement toward the direction 4040.

INDUSTRIAL APPLICABILITY

By carrying out the invention, it is possible to realize the useful man-machine interface which can be mounted on an equipment used in the field of VR (Virtual Reality), an equipment used in the field of game, a cellular phone, a portable navigation equipment, a PDA (Personal digital Assistant) and the like.

More specifically, for example, in the field of the VR, the existence of an object in a virtual space, or the shock due to a collision can be presented by presenting a force to the person through the man-machine interface to which the invention is applied, or by giving a resisting force or a reaction force to limit the motion of the person. Besides, by mounting the interface on the cellular phone, the portable navigation equipment or the like, various instructions, guides and the like, which have not been conventionally seen, can be realized through the skin of the operator.

The above-mentioned embodiments may be configured to evoke at least one of the following senses: a sense of insertion, a sense of depth, a sense of floating, a sense of direction, a sense of digging into a surface, a sense of getting stuck in mud, a sense of touching a hard object, a sense of touching a soft object, a sense of touching a smooth surface, a sense of touching a slimy surface, a sense of touching a smooth, slimy surface, a sense of touching a textured surface, a sense of touching a bumpy surface, a sense of touching a scratchy surface, a sense of touching a stiff surface, a sense of touching a solid surface, and a sense of touching a squishy surface.

The above-mentioned embodiments may be applied to the following examples:

- buttons, switches, dials, and operation panels;
- stationeries, notebooks, and pens;
- home electrical appliances, signboards, signages, and terminals at kiosks;
- walls of rooms, tables, chairs, and massagers;
- vehicles, robots, and wheelchairs;
- tablewares and shakers; and
- simulators (surgeries, driving, massages, sports, walking, craft, painting, musical instruments, and art)

The actuator illustrated in the Figures may include at least one of a motor, an eccentric motor, a linear motor, a voice coil, a piezoelectric element, an electrostatic motor, and a molecular motor. Any actuator can be used as long as it generates displacement or vibration, such as magnetic, electromagnetic, magnetic force, static electricity, piezoelectric, artificial muscle, shape-memory alloy, polymer, polymeric material, dielectric material, and a coil.

In the conventional technique, tactile directionalities are poorly discriminated. Displacement and a vibration in a Y-direction that are caused by applying finger pressure in a Z-direction are considered to occur in the Z-direction. The conventional technique has drawbacks in terms of sensitivity, a discrimination threshold, insensitivity and the sensory illusion, direction insensitivity, time insensitivity, anisotropy, and a hysteresis. In view of the above-described point, the invention has a purpose of providing an illusory phenomenon database that can realize an illusory phenomenon induced by a combination of vibrations and that includes a trigger vibration, a characteristic inducing stimulus and trigger stimulus, a misperceived (false) vibration, a synergistic effect related to a sensory illusion, and consonantal and vocalic vibration configurations.

A haptic information presenting system according to the invention includes:

an object, said object being a an actual object or a virtual object;

a sensor that detects a stimulus by the object and/or to the object including at least one of a position, a velocity, acceleration, a shape, displacement, deformation, oscillation, rotation, a vibration, a force, torque, pressure, a humidity, a temperature, viscosity, and elasticity;

a haptic information presenting device that applies a sensory characteristic and/or a sensory illusion of an operator to the object, so as to present a haptic to said operator as if he/she actually operates said object; and a haptic presentation controller that controls said haptic presenting device on the basis of the stimulus from the sensor.

The haptic presentation controller uses such a fact that the sensory characteristic, which indicates a relationship between a quantity of stimulus applied to a human body and a sensory quantity, is nonlinear and/or the sensory illusion, so as to control the stimulus and present haptic information, the sensory characteristic includes: at least one of the quantity of stimulus that is provided to the operator and the quantity of stimulus that is generated through an operation by the operator; and the sensory quantity that is presented to the operator, and said sensory quantity is a sensory quantity that cannot exist physically, and the haptic presenting device presents the stimulus by the object and/or to the object, controls the stimulus that is applied to the object in accordance with the operation by the operator, and thereby generates the tactile force.

In the haptic information presenting system, a touch panel is divided into plural units and disposed in at least one of an array, dots, and pixels, and the plural units of the touch panel are independently controlled.

In the haptic information presenting system, the object is a touch panel, and each of said touch panels generates a different sensation of touch and/or a different sensation of a force from each other.

A haptic information presenting system according to the invention includes:

an object, said object being a an actual object or a virtual object;

a sensor that detects a stimulus by the object and/or to the object including at least one of a position, a velocity, acceleration, a shape, displacement, deformation, oscillation, rotation, a vibration, a force, torque, pressure, a humidity, a temperature, viscosity, and elasticity;

a haptic presenting device that applies a sensory characteristic and/or a sensory illusion of an operator to the object, so as to present a haptic to said operator as if he/she actually operates said object; and a haptic presentation controller that controls said haptic presenting device on the basis of the stimulus from the sensor.

The haptic presentation controller uses such a fact that the sensory characteristic, which indicates a relationship between a quantity of stimulus applied to a human body and a sensory quantity, is nonlinear and/or the sensory illusion, so as to control the stimulus and present haptic information, the sensory characteristic includes: at least one of the quantity of stimulus that is provided to the operator and the quantity of stimulus that is generated through an operation by the operator; and the sensory quantity that is presented to the operator, and said sensory quantity is a sensory quantity that cannot exist physically, and the haptic presenting device presents at least one of the oscillation, the displacement, and the deformation to the object.

In the haptic information presenting system, a touch panel is divided into plural units and disposed in at least one of an array, dots, and pixels, and the plural units of the touch panel are independently controlled.

In the haptic information presenting system, the tactile force presenting device presents the haptic in accordance with the oscillation, the displacement, and/or the deformation generated in the object.

In the haptic information presenting system, the haptic presenting device performs six-dimensional guidance of the object in terms of at least one of the oscillation, the displacement, and the deformation for at least one of each position, each phase, and each time.

In the haptic information presenting system, the haptic presenting device generates at least one of the oscillation, the displacement, and the deformation at right angles, in parallel with, or at an arbitrary angle with respect to a tangent of the object.

A haptic information presenting system according to the invention includes:

an object, said object being a an actual object or a virtual object;

a sensor that detects a stimulus by the object and/or to the object including at least one of a position, a velocity, acceleration, a shape, displacement, deformation, oscillation, rotation, a vibration, a force, torque, pressure, a humidity, a temperature, viscosity, and elasticity;

a haptic presenting device that applies a sensory characteristic and/or a sensory illusion of an operator to the object, so as to present a tactile force to said operator as if he/she actually operates said object; and a haptic presentation controller that controls said tactile force presenting device on the basis of the stimulus from the sensor.

The haptic presentation controller uses such a fact that the sensory characteristic, which indicates a relationship between a quantity of stimulus applied to a human body and a sensory quantity, is nonlinear and/or the sensory illusion, so as to control the stimulus and present tactile force information, the sensory characteristic includes: at least one of the quantity of stimulus that is provided to the operator and the quantity of stimulus that is generated through an operation by the operator; and the sensory quantity that is presented to the operator, and said sensory quantity is a sensory quantity that cannot exist physically, and the haptic presenting device is a sense synthesizing and guiding device that synthesizes sensations of guidance, and said sense synthesizing and guiding device generates at least one of a sensation of pressure, a sensation of a force, and the sensory illusion to the object by a vibration that includes a sweep vibration.

An illusory phenomenon database that can realize an illusory phenomenon induced by a combination of the vibrations and that includes a trigger vibration, a characteristic inducing stimulus and trigger stimulus, a misperceived (false) vibration, a synergistic effect related to a sensory illusion, and consonantal and vocalic vibration configurations can be provided.

A haptic information presenting system according to the invention includes the followings.

the haptic information presenting system includes: an object that is an actual object or a virtual object;

a sensor that detects a stimulus by the object and/or to the object including at least one of a position, a velocity, acceleration, a shape, displacement, deformation, oscillation, rotation, a vibration, a force, torque, pressure, a humidity, a temperature, viscosity, and elasticity;

a haptic presenting device that applies a sensory characteristic and/or a sensory illusion of an operator to the object, so as to present a haptic to said operator as if he/she actually operates said object; and a haptic presentation controller that controls said haptic presenting device on the basis of the stimulus from the sensor.

the haptic presentation controller uses such a fact that the sensory characteristic, which indicates a relationship between a quantity of stimulus applied to a human body and a sensory quantity, is nonlinear and/or the sensory illusion, so as to control the stimulus and present haptic information, and the sensory characteristic includes: at least one of the quantity of stimulus that is provided to the operator and the quantity of stimulus that is generated through an operation by the operator; and the sensory quantity that is presented to the operator, and said sensory quantity is a sensory quantity that cannot exist physically.

The haptic presenting device presents the stimulus by the object and/or to the object, controls the stimulus that is applied to the object in accordance with the operation by the operator, and thereby generates the haptic.

A touch panel is divided into plural units and disposed in at least one of an array, dots, and pixels, and the plural units of the touch panel are independently controlled.

The object is the touch panel, and each of said touch panels generates a different sensation of touch and/or a different sensation of a force from each other.

The haptic presenting device presents at least one of the oscillation, the displacement, and the deformation to the object.

The touch panel is divided into the plural units and disposed in at least one of the array, the dots, and the pixels, and the plural units of the touch panel are independently controlled.

The haptic presenting device presents the haptic in accordance with the oscillation, the displacement, and/or the deformation generated in the object.

The haptic presenting device performs six-dimensional guidance of the object in terms of at least one of the oscillation, the displacement, and the deformation for at least one of each position, each phase, and each time.

The haptic presenting device generates at least one of the oscillation, the displacement, and the deformation at right angles, in parallel with, or at an arbitrary angle with respect to a tangent of the object.

The haptic presenting device is a sense synthesizing•guiding device that synthesizes sensations of guidance, and said sense synthesizing and guiding device generates at least one of a sensation of pressure, a sensation of a force, and the sensory illusion to the object by the vibration that includes a sweep vibration.

FIG. 196 includes a configuration diagram of a system of a haptic display.

The system of the haptic display replicates the haptic that includes the sensation of pressure, the sensation of touch, and the sensation of the force on the display panel. The displacement and the vibration are controlled in accordance with motion of a finger. In this way, a stereoscopic feel with a sensation of depth can be obtained on the flat-plate object. The sensation of pressure and the sensation of the force are presented through the displacement and the vibration in different directions. Such a system may be applied to a button, a slider, a dial, and a switch.

The system of the haptic display includes a controller and a haptic actuator. The haptic actuator supplies a sensor signal to the controller, and the controller supplies a control signal to the haptic actuator.

The sensor signal includes a stimulus by the object and/or to the object that includes at least one of the position, the velocity, the acceleration, the shape, the displacement, the deformation, the oscillation, the rotation, the vibration, the force, the torque, the pressure, the humidity, the temperature, the viscosity, and the elasticity.

The controller is driven by a control algorithm and changes intensity of the stimulus over time in accordance with the motion of the finger. The stimulus includes the displacement, momentum, the vibration, and the oscillation. The control signal is generated by drive voltages of force information and oscillation information. The controller is driven by a control algorithm and changes intensity of the stimulus over time in accordance with the motion of the finger. The stimulus includes the displacement, momentum, the vibration, and the oscillation. The control signal is generated by drive voltages of force information and oscillation information.

The actuator may be a motor, an eccentric motor, a linear motor, an electrostatic motor, a molecular motor, a piezo element, an artificial muscle, a memory alloy, a coil, a voice coil, a piezoelectric element, or any member that generates a magnetic force, static electricity, the displacement, the vibration, or the like.

The haptic display panel can be worn on any portion of the human body (see FIG. 252).

The present system presents haptic sense information such that the actual object is operated by an operator by applying sensory characteristics and sensory illusion of the operator. Specifically, the system is controlled based on stimulation that is detected by a sensor and presents haptic sense information by controlling stimulation utilizing the fact that the sensory characteristics that indicate a relationship between an amount of stimulation and a sensory amount applied to the human body are non-linear and sensory illusions.

The sensory characteristics include the amount of stimulation of at least one of the amount of stimulation that is applied to the operator and the amount of stimulation brought about by the operation of the operator and the sensory amount that is presented to the operator, and the sensory amount is a sensory amount that is unable to be physically present.

Here, the system presents stimulation from the object or to the object, and stimulation applied to the operator is controlled to match the operation of the operator. A minimum haptic sense information presentation system is configured from a haptic sense actuator and a controller. Position, speed, acceleration, form, displacement, deformation, amplitude, rotation, vibration, force, torque, pressure, humidity, temperature, viscosity, and elasticity are measured by the sensor that is attached to the haptic sense actuator, the information is sent to the controller, a control signal for controlling the haptic sense actuator is calculated and sent to the haptic sense actuator, and the haptic sense actuator is controlled.

The haptic sense actuator has a sensor function and a presentation function of a panel type and a display type, in the controller, measures displacement, momentum, vibration amplitude, displacement stimulation, vibration stimulation, time change of stimulation intensity, and the like accompanying movement of the body such as of a finger or a palm, controls the position, speed, acceleration, form, displacement, deformation, amplitude, rotation, vibration, force, torque, pressure, humidity, temperature, viscosity, elasticity, and the like of the tactile force sense actuator to match movement, pressure, and the like of the body such as the finger or the palm that is monitored by the sensor based on a control algorithm, and presents tactile force sense information such as a pressure sensation, a tactile sensation, and a sense of force to a person or the like.

In the control signal, force information (t), amplitude information (t), and the like are expressed by driving voltage and the like, and as long as the actuator is a motor, a piezo actuator, an artificial muscle, a memory alloy, a molecular motor, an electrostatic actuator, a coil, a magnetic force actuator, a static electricity actuator, or another actuator that generates displacement and vibration, device operating principles are not important. As a result, regardless of a panel and a display that are configured as a flat surface, a curved surface, or a three-dimensional shape being installed to be fixed or minutely vibrate in a casing or the like, an insertion feeling, a pushing feeling, a sinking feeling, a depth feeling, a push back feeling, a floating feeling, a convergence feeling of vibration and amplitude, a reverberation feeling of vibration and amplitude, a sense of orientation of displacement and movement, a sticking feeling, a hard feeling, a soft feeling, and a three-dimensional feel are felt. Regardless of if such a sense is not reproduced and presented physically, such a sense and bodily reaction and reflection are experienced sensuously.

As a result, regardless of if an information terminal and the like is a flat surface or a flat panel, it is possible to really obtain an operation feel of an object such as a button, a slider, a dial, a switch, and an operation panel.

FIG. 198 is a schematic view of a displacement control of the haptic sense actuator.

The haptic sense actuator has six degrees of freedom concerning translation and rotation, and is able to freely control displacement, amplitude, speed, acceleration, and phase difference. In addition, it is possible to control displacement, a displacement pattern, a waveform, electrical stimulation other than vibration stimulation, and stimulation such as Coulomb force.

FIGS. 199 to 205 indicate schematic views of an apparatus which indicates an illusion phenomenon.

In the drawings, the apparatus is provided with an actuator on a base material, and on the base material, provided are a touch panel and a sensor that measures position, rotation, and tensor by sensing displacement, pressure, acceleration, and the like of an object. The touch panel is displaced in a y direction, but pressing in is felt in a z direction of the button.

FIG. 199 indicates normal operation that is not the illusion phenomenon. A base unit of the haptic sense actuator is configured from the touch panel, the sensor, and the actuator. In the touch panel and the sensor, the position, speed, acceleration, form, displacement, deformation, amplitude, rotation, vibration, force, torque, pressure, humidity, temperature, viscosity, elasticity, and the like are measured as a scalar, vector, or tensor.

The actuator presents the position, speed, acceleration, form, displacement, deformation, amplitude, rotation, vibration, force, torque, pressure, humidity, temperature, viscosity, elasticity, and the like as a scalar, vector, or tensor. When the touch panel is often not normally rigidly deformed and the operator presses the touch panel at a pushing pressure P, Z=0 is maintained without the touch panel displacing or deforming in the Z direction. The pushing pressure P increases, a fingertip of the operator is deformed, and pressing pressure is perceived, but sinking displacement Z (=0) and sinking sense Sz (=0) is not felt.

In the present patent, perception of haptic sense information using the fingertip is described, but is not particularly limited to the fingertip, and it is assumed that the whole body of the operator is throughout the body.

FIG. 200 indicates an operation of a case of the illusion phenomenon. When the touch panel is often not normally rigidly deformed and the operator presses the touch panel at the pushing pressure P, Z=0 is maintained without the touch panel displacing or deforming in the Z direction.

Here, differently from normal, using the actuator, when the touch panel is displaced (Y) in the Y direction, regardless of if there is no sinking displacement Z (=0), along with perception of an increase of pushing force P, sinking sense Sz is felt in the Z direction. Even in a case where the touch panel is displaced (X) in the X direction, similarly, sinking sense Sz is felt in the Z direction. However, in a case where the direction (Y) that is pointed out by the fingertip and a displacement direction of the touch panel do not match, movement in the displacement direction may be weakly perceived. When the displacement direction of the touch panel is adjusted using the fingertip and the sinking direction of the finger, illusion is effective.

The phenomenon here is an illusion in which displacement in the Y direction is perceived in a sinking sense in the Z direction, and between the axes, is the illusion phenomenon (cross-direction effect) that exceeds the operating direction.

Displacement in the Y direction matches predetermined tactile feel and various displacement patterns are present. It is possible to express various tactile feel by a design of an arbitrary waveform, amplitude modulation, frequency modulation, convolution, and a combination there between to create tone and music of an musical instrument using a synthesizer not only in combination of a linear increase and decrease, sinusoidal vibration, and a fundamental frequency component.

An illusion pattern is provided with a combination of nine patterns of a pushing pressure method (three directions) x actuator displacement direction (three directions). Furthermore, a rotation pattern is provided. In addition, since there is an intermediate direction, the combinations are infinite. In addition to translational displacement, there may also be rotation displacement.

FIG. 201 indicates an operation of a latch continuous illusion phenomenon. Here, using the actuator, when the touch panel is displaced (Y) in a stepwise manner in the Y direction, regardless of if there is no sinking displacement Z (=0), along with perception of the increase of pushing force P, accompanying stepwise change of displacement (Y), sticking in the Z direction and stepwise sinking sense Sz are felt.

FIG. 202 indicates an operation of a latch continuous illusion phenomenon. Here, using the actuator, when the touch panel repeats displacement (Y) in the Y direction, regardless of if there is no sinking displacement Z (=0), along with perception of an increase of pushing force P, accompanying change of displacement (Y), sticking in the Z direction and sinking sense Sz are felt. A condition is present in which pressing displacement (Y) tends not to be felt.

The drawing respectively illustrates pressing, pressing force, displacement, and sinking sense. FIG. 203 expresses displacement in which the phase is delayed. When the touch panel is often not normally rigidly deformed and the operator presses the touch panel at the pushing pressure P, Z=0 is maintained without the touch panel displacing or deforming in the Z direction. Here, differently from normal, using the actuator, when the phase is delayed with respect to increase of the pushing force P and the touch panel is displaced (Y) in the Y direction, regardless of if there is no sinking displacement Z (=0), accompanying displacement (Y) in the Y direction, sinking sense Sz is felt in the Z direction. Until the increase in displacement (Y) starts, resistance with respect to pressing of a virtual button is presented, and pressing sense Sz (≠0) that is a maximum value of resistance is presented as hardness of the virtual button.

In FIG. 207, after a peak is indicated without displacement persisting, displacement is zero. Here, using the actuator, when the touch panel is reciprocally displaced (Y) in the Y direction, regardless of if there is no sinking displacement Z (=0), accompanying increase of pushing force P and change of displacement (Y), sinking sense Sz is felt such that the button "clicks" in the Z direction.

In FIG. 208, after a peak displacement in a positive direction and a peak displacement in a negative direction are indicated, displacement is zero. Here, using the actuator, when the touch panel is reciprocally displaced (Y) in the Y direction, regardless of if there is no sinking displacement Z (=0), accompanying increase of pushing force P and change of displacement (Y), sinking sense Sz is felt such that the button "clicks" in the Z direction.

FIG. 209 to FIG. 213 each includes schematic views that show a finger pressing method that generates the stimulus by the object (the panel) and/or to the object. FIG. 209 shows presentation of stimuli that are generated by stepwise pressing of the button. The stimuli includes a stimulus by slight resistance of the button on the panel, a responsive stimulus by instantaneous reaction, a clicking stimulus after a feel of the button, a stimulus at a time when the button is not felt but only a wall is felt. FIG. 212 shows presentation of stimuli that are generated by the stepwise pressing of the button. The stimuli include a stimulus by motion of the panel, a stimulus by stillness of the panel, and a sensory stimulus between the finger and the panel. FIG. 213 shows presentation of stimuli that are generated by pressing of the button. The stimuli include a stimulus of a triangle wave and a stimulus of a sine wave that are generated to the panel.

FIG. 214 to FIG. 220 each includes schematic views that show control of the displacement and the oscillation that are applied, as the stimuli, to the panel. In FIG. 214, the panel is displaced and generates the triangle wave when the panel is pressed right below. With this displacement, a sensory stimulus that induces a sensation of deepening of the finger, a physical stimulus of a tensile force to the finger, and a sensory stimulus of resistance to the finger are presented. In FIG. 215, the panel is displaced and generates the triangle wave when the panel is unconsciously moved and pressed down. With this displacement, a sensory stimulus that induces a sensation of advancing the finger, the physical stimulus of the tensile force to the finger, and the sensory stimulus that induces the sensation of deepening of the finger are presented. In FIG. 216, the panel is displaced and generates the triangle wave when the panel is provided with a viscous/elastic stimulus as a button characteristic. With this displacement, the sensory stimulus that induces the sensation of advancing the finger, the physical stimulus of the tensile force to the finger, and the sensory stimulus of a reactive force to the finger are presented on the panel.

In FIG. 217, the panel is displaced and generates the triangle wave when the panel is provided with the viscous/elastic stimulus as an artificial cutaneous sense. With this displacement, the sensory stimulus that induces the sensation of advancing the finger, the physical stimulus of the haptic to the finger, and the sensory stimulus of the reactive force to the finger are presented on the panel.

FIG. 218 shows the displacement of the panel at a time when the panel is displaced and generates the triangle wave due to application of the stimulus to the panel. When touch panel is displaced (Y) in the Y direction by the actuator, the panel generates a pushing feeling (Sz) such as button in the Z direction with the increase of pushing pressure (p) and the change of the displacement (Y) despite the absence of subduction displacement Z(=0).

The panel will feel pushing (spot) and a feeling (Sz)(click) such as a button in the Z direction depending on how to change in the Y direction.

FIG. 219 shows the displacement of the panel at a time when the panel is displaced and generates the sine wave due to the application of the stimulus to the panel. When touch panel is sinusoidally displaced (Y) in the Y direction by the actuator, the panel generates a pushing feeling (Sz) such as button in the Z direction with the increase of pushing pressure (p) and the change of the displacement (Y) despite the absence of subduction displacement Z(=0). The panel will feel pushing (spot) and a feeling (Sz)(click) such as a button in the Z direction depending on how to change in the Y direction.

FIG. 221 to FIG. 227 each show schematic views of vibration waveform control of the tactile force actuator. The haptic actuator can freely control the differences in vibrational amplitude, the velocity, the acceleration, and the phase.

FIG. 222 shows displacement waveforms, each of which generates the sensation of the force at a time when the waveform is accelerated/decelerated in an asymmetrical manner.

FIG. 222 shows acceleration/deceleration waveforms, each of which generates the sensation of the force at the time when the waveform is accelerated/decelerated in the asymmetrical manner.

FIG. 223 shows acceleration sweep waveforms (of a sensation of clicking) that are obtained in the cases where the panel is vibrated for a short time to generate the sensation of clicking and a frequency is changed for each of the waveforms so as to change the feel. A patterned deceleration waveform and a patterned acceleration waveform are generated. FIG. 224 includes schematic views of an acceleration/deceleration shift waveform and a phase shift waveform. In the acceleration/deceleration shift waveform, a phase of the waveform is fixed while acceleration/deceleration positions are switched. In the phase shift waveform, acceleration/deceleration positions are fixed while a phase of the waveform is switched. A velocity and the phase of the waveform are controlled.

FIG. 225*a* is views showing a haptic information presentation method using a sensory characteristic relating to a force sensation, in which rotations of two eccentric rotators A912 and B913 are phase-synchronized to combine the displacement.

Figure 59:
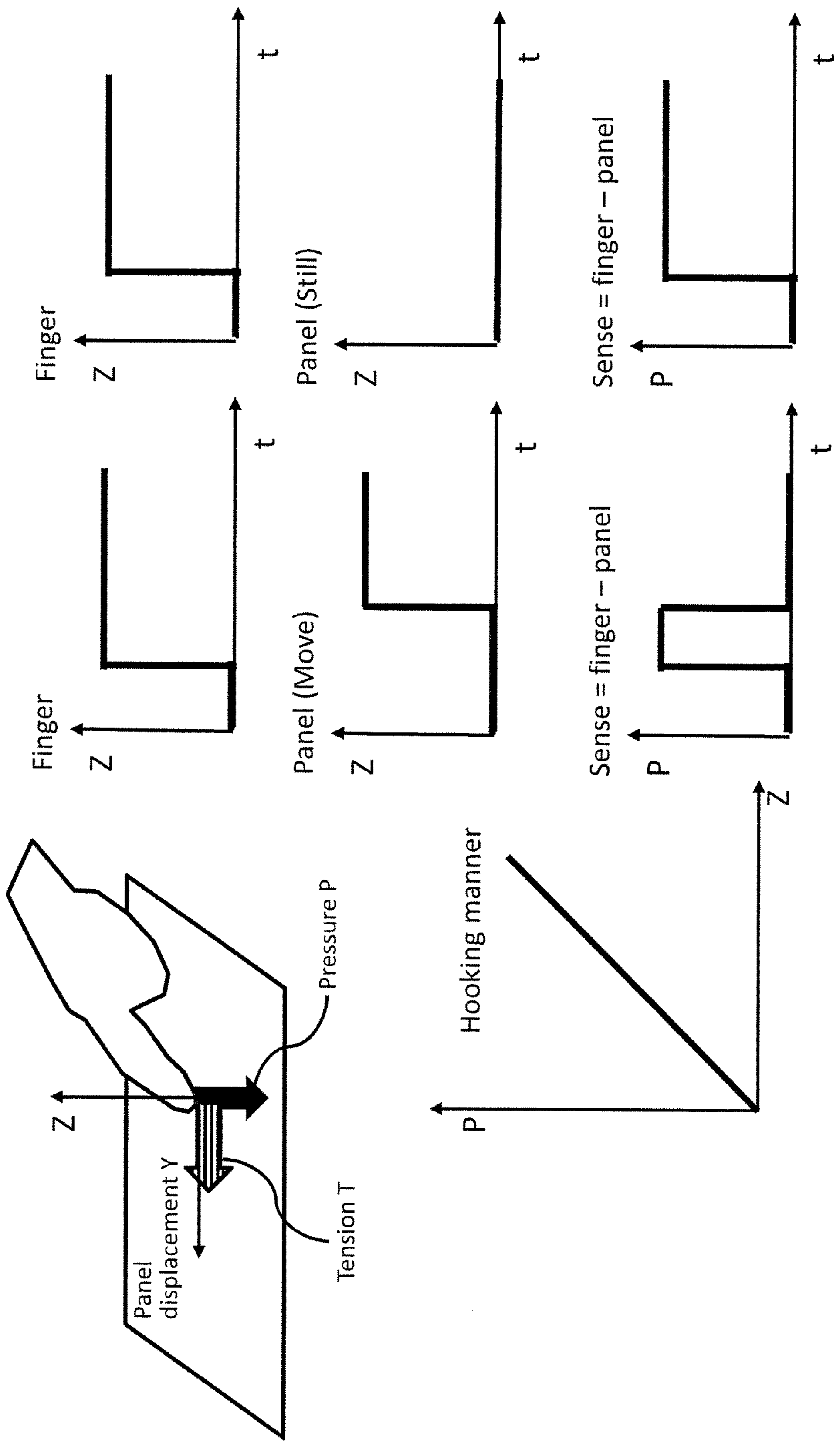
FIG. 59 is an explanatory view showing a way to depress panel with a finger (stepwise depression (common)).
Figure 60:
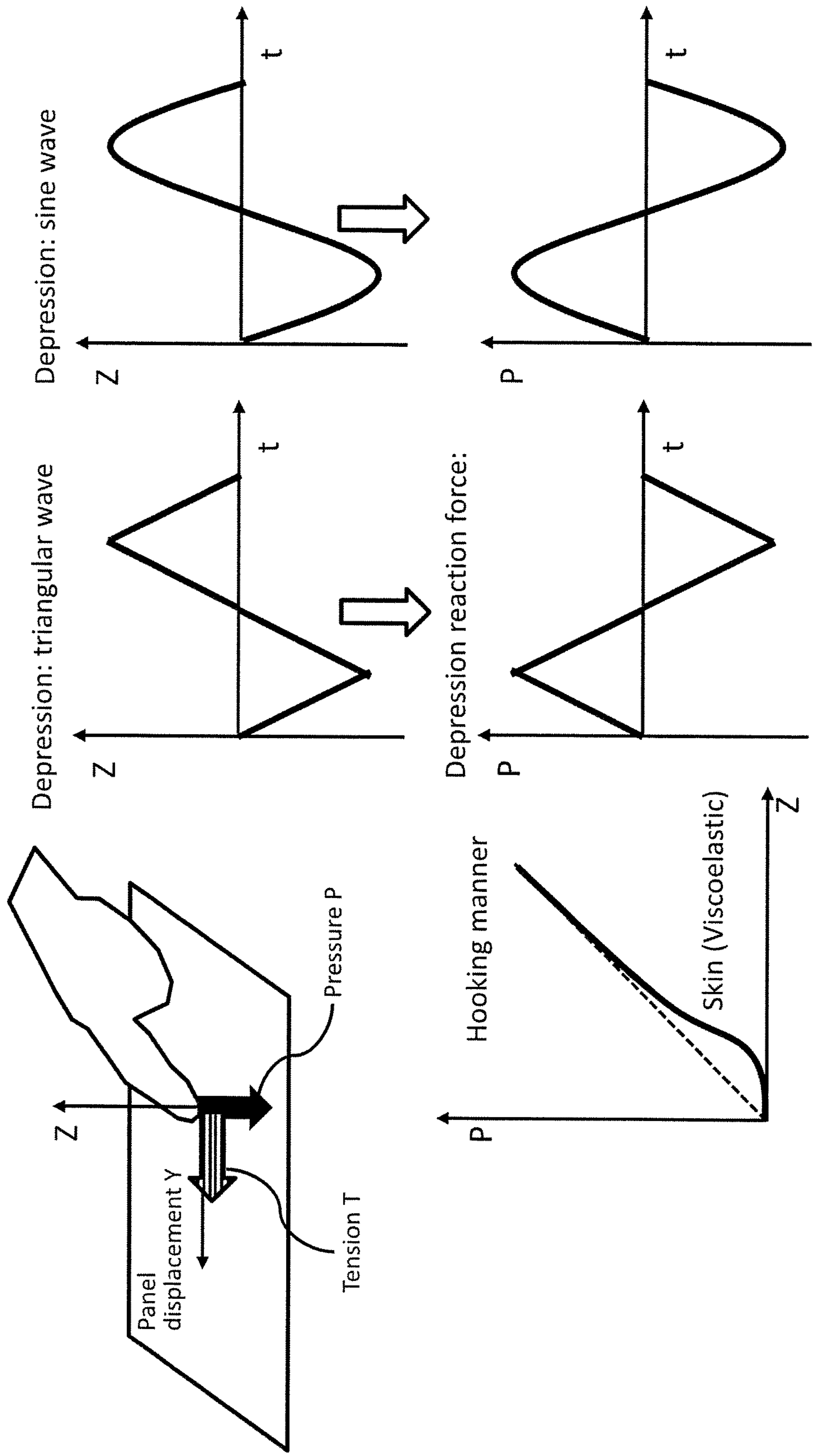
FIG. 60 is an explanatory view showing a way to depress panel with a finger (a triangular wave and a sine wave).

Here, FIG. 225*b* schematically shows a case where the two eccentric rotators A912 and B913 in FIG. 59*a* are synchronously rotated in the same direction with a phase delay of 180 degrees. As a result of this synchronous rotation, a torque rotation without eccentricity can be formed.

FIG. 225*c* schematically shows a case where a sensory characteristic 931 has a logarithmic function characteristic, indicating that the sensory characteristic 931 has, similarly to the sensory characteristic 211, has a sensory quantity 933 having a nonlinear characteristic of a logarithm or the like to a physical quantity 932 as a stimulus. When consideration is given to a case where a positive torque is generated at an operation point A934 on the sensory characteristic 931 and a negative torque in the opposite direction is generated at an operation point B935, a torque sensation 944 is represented as in FIG. 225*d*. A torque 943 is proportional to the time differential of a rotation velocity 942 of a rotator. When an operation is performed at the operation points A934 and B935, the torque sensation 944 is perceived.

The torque 943 is physically returned to an initial state 948 in one cycle, and its integral value is zero. However, the sensory integral value of the torque sensation 944 as a sensory quantity does not necessarily become zero. By suitably selecting the operation points A934 and B935 to set an operation point A duration time 945 and an operation point B duration time 946 suitably, the torque sensation can continue to be freely presented in an arbitrary direction.

The above is also established in the case of a rotational or translational displacement as well as in the case of a torque rotation or when the sensory characteristic 931 exhibits a nonlinear characteristic of an exponential function or the like. Even when the sensory characteristic 931 in FIG. 225*c* has a threshold value, a similar torque sensation occurs and the torque sensation can continue to be intermittently presented only in one direction.

FIG. 226*a* shows the direction of a pseudo-haptic sensation that is induced by an initial phase (θi) of a phase pattern and perceived by the user.

A pseudo-haptic device 107 can control the direction 1202 of a pseudo-haptic sensation that is induced by a change in the momentum formed by the eccentric rotators to the direction of the initial phase (θi) by changing the initial phase (θi) at the beginning of rotation in FIG. 226*b*. For example, the pseudo-haptic device 107 can induce a pseudo-haptic sensation in an arbitrary direction within 360 degrees in a plane by changing the initial phase (θi) as shown in FIG. 226*c*.

At this time, when a pseudo-haptic interface device 101 has a large weight, the pseudo-haptic interface device 101 cannot create a sufficient buoyancy sensation 1202 which makes the user feel as if it is lifted up and may be felt heavy because an upward force sensation 1202 caused by the pseudo-haptic sensation and a downward force sensation 1204 caused by the gravity cancel each other out. In such a case, a decrease or inhibition of buoyancy sensation caused by the gravity can be reduced by inducing the pseudo-haptic sensation 1203 in a direction slightly offset from the direction opposite the direction of gravity.

When a pseudo-haptic sensation is desired to be presented in a direction opposite the direction of gravity, a pseudo-haptic sensation may be induced alternately in two directions slightly offset from the vertical direction, that is, at $180°+\alpha°$ and $180°-\alpha°$.

FIG. 227*a* to FIG. 227*f* show one example of control of a pseudo-haptic device (haptic device) that presents a basic haptic sensation or pseudo-haptic sensation.

Figure 61:
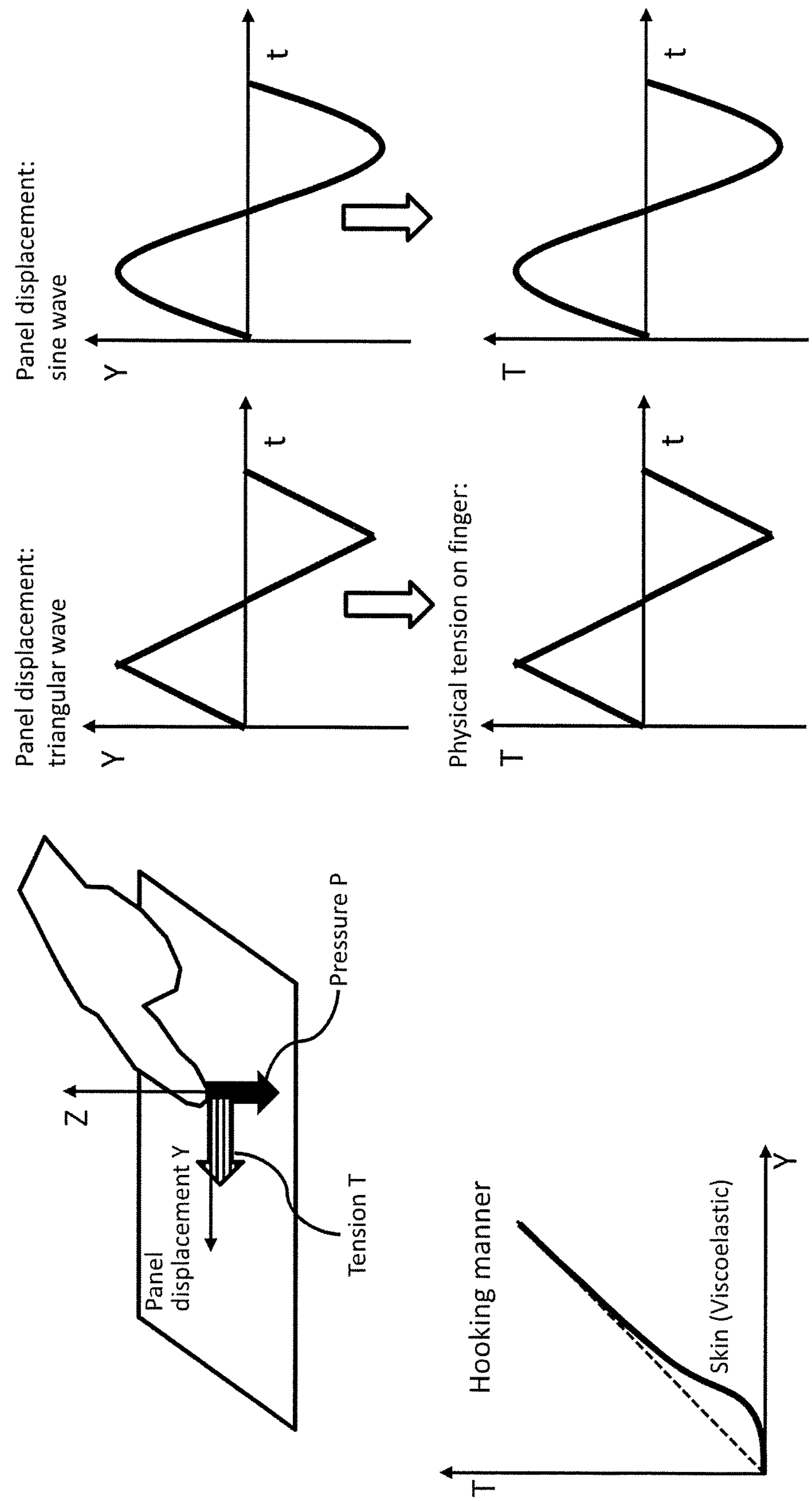
FIG. 61 is an explanatory view showing displacement and amplitude control (a triangular wave and a sine wave).
Figure 62:
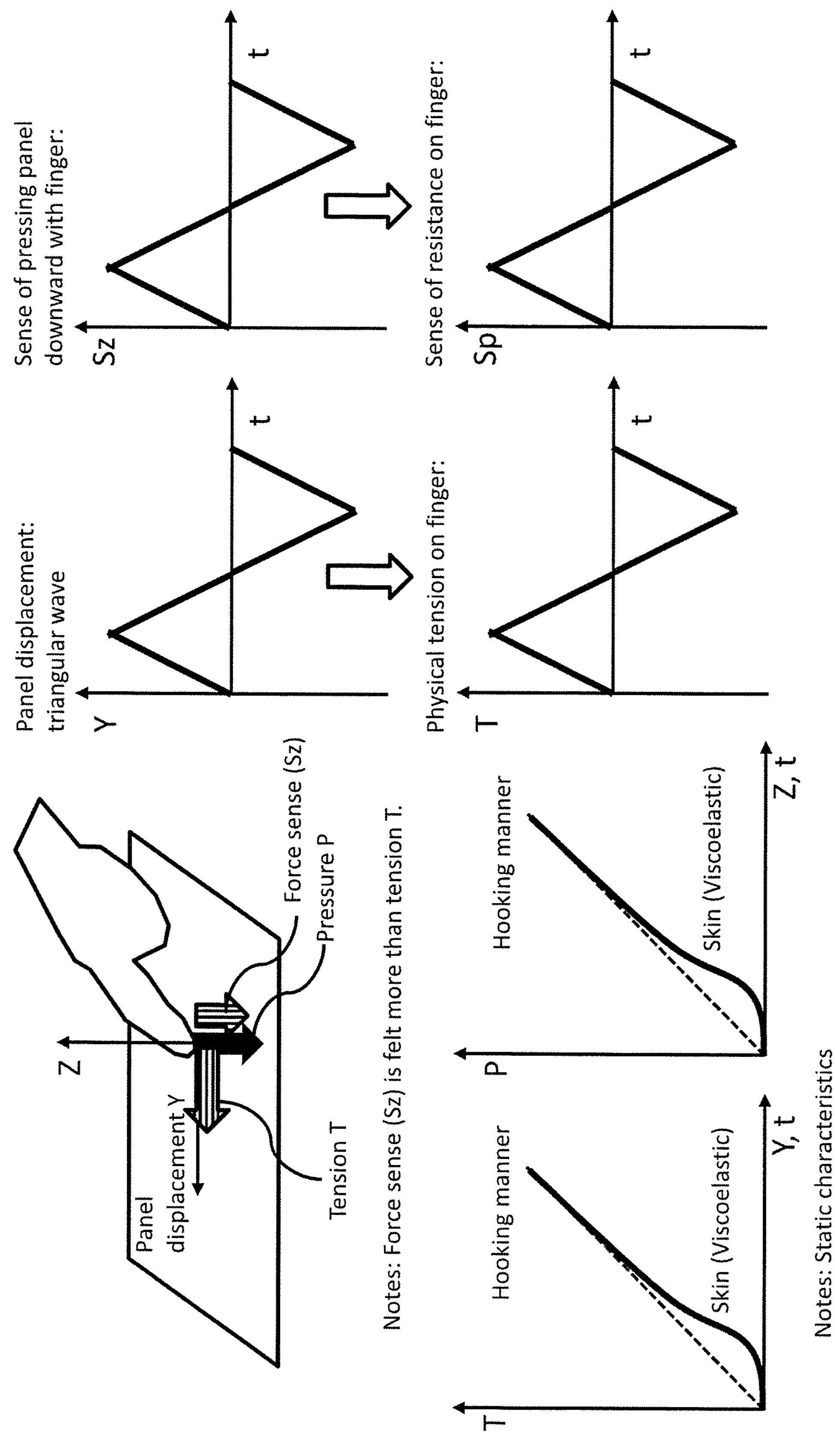
FIG. 62 is an explanatory view showing displacement and amplitude control (pressing downward).
Figure 63:
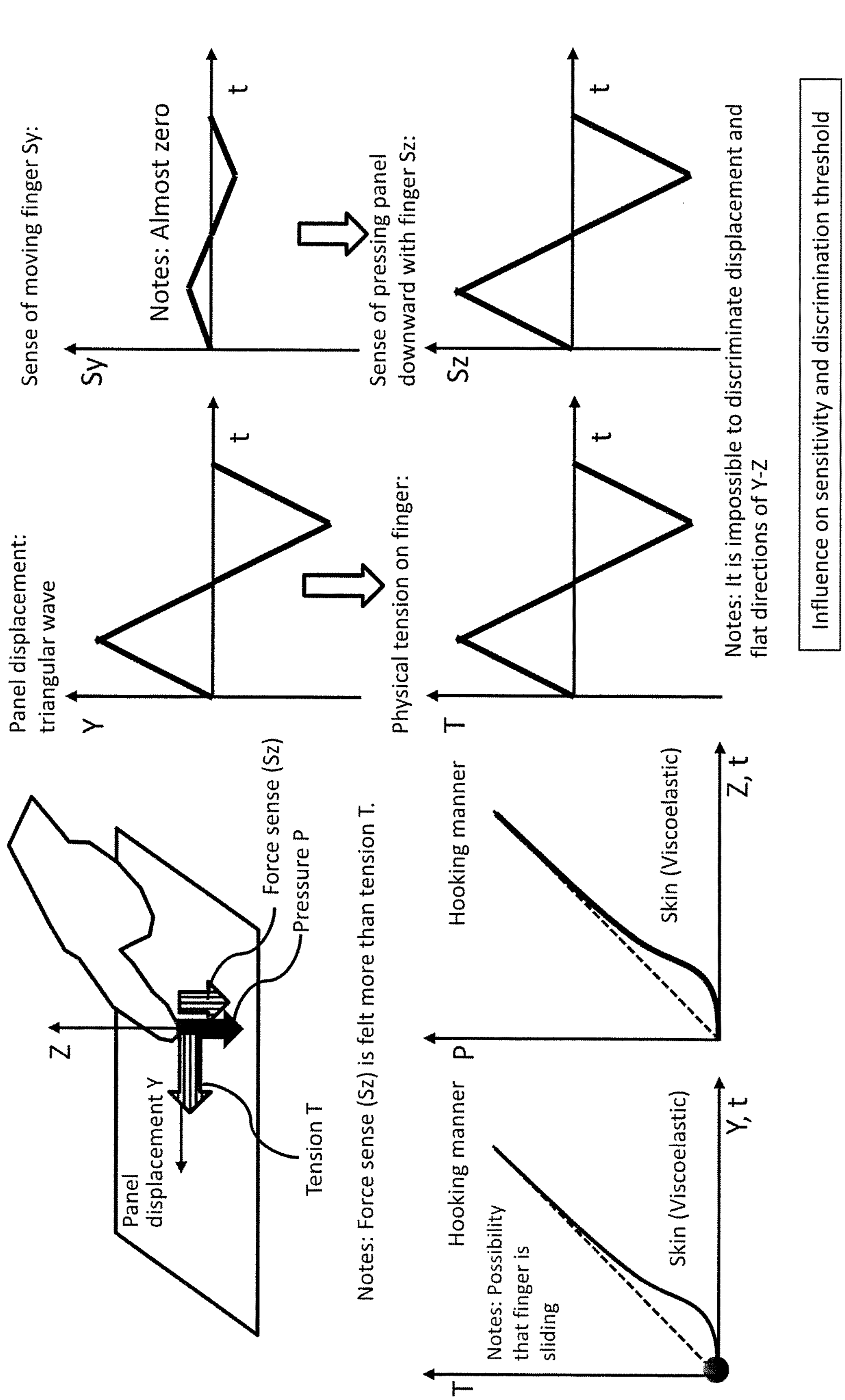
FIG. 63 is an explanatory view showing displacement and amplitude control (a sense of pressing panel (unconscious sliding)).
Figure 64:
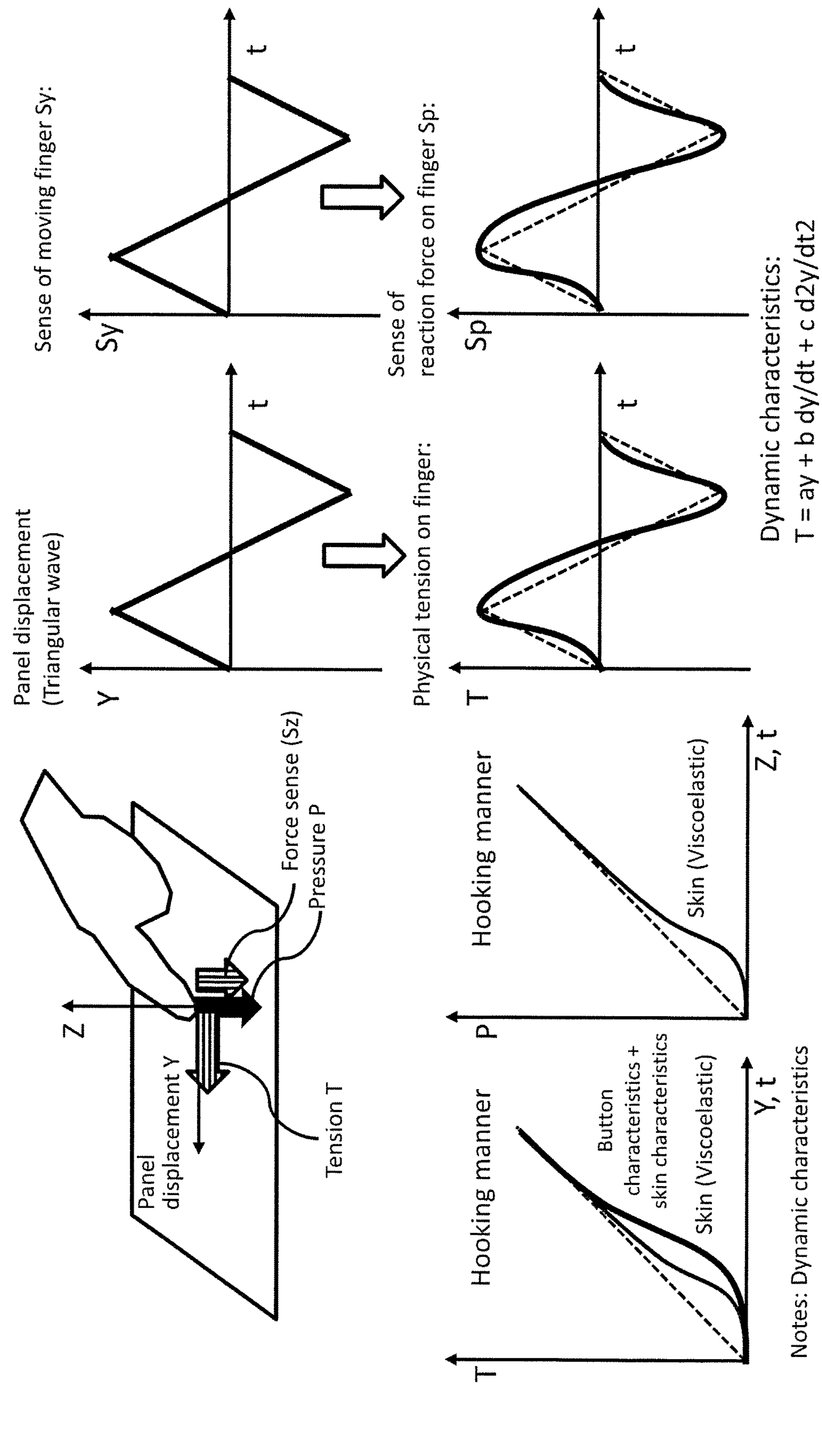
FIG. 64 is an explanatory view showing displacement and amplitude control (a isco-elasticity (button characteristics)).
Figure 65:
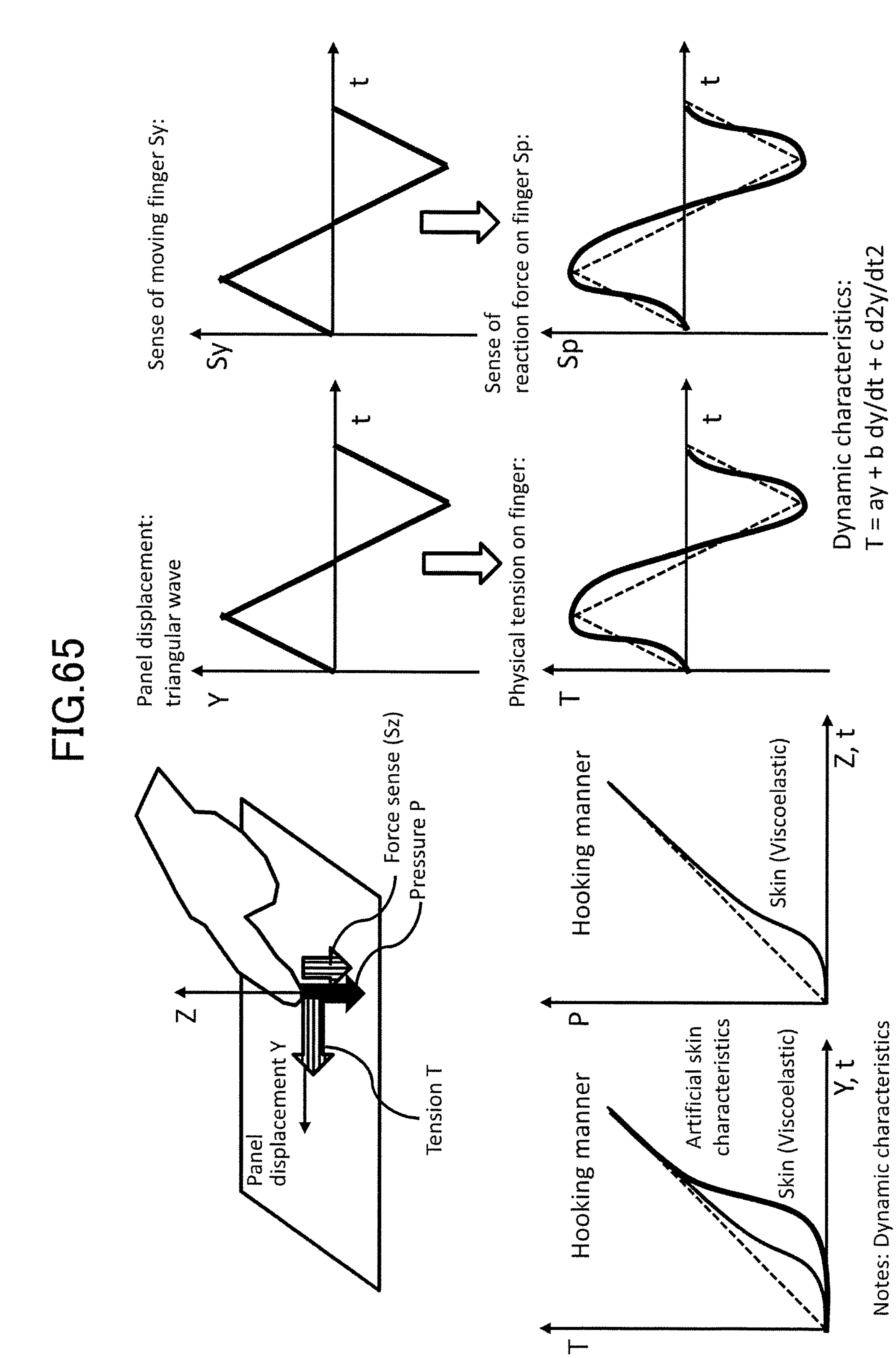
FIG. 65 is an explanatory view showing displacement and amplitude control (visco-elasticity (an artificial skin sense)).
Figure 66:
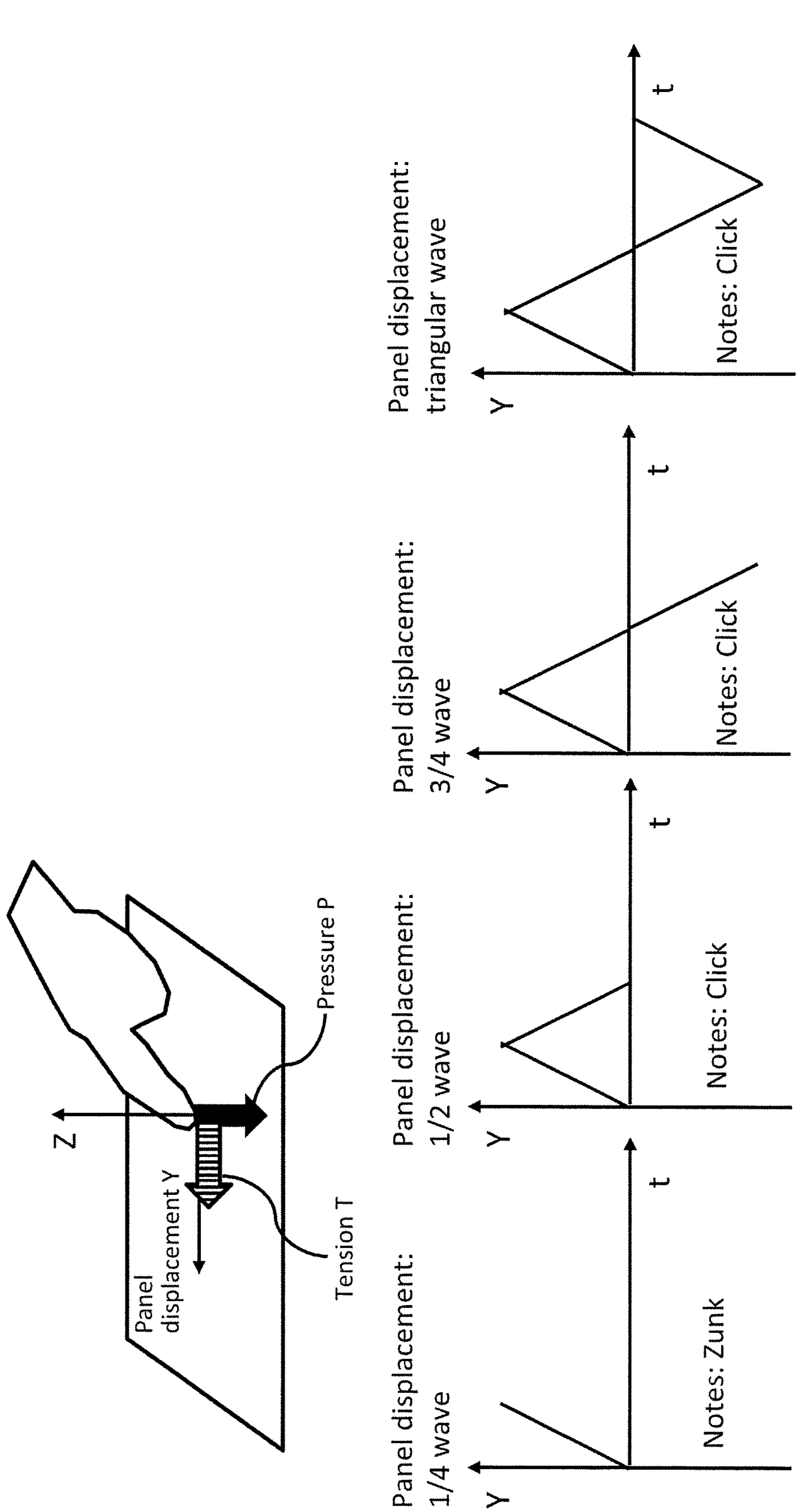
FIG. 66 is an explanatory view showing displacement and amplitude control (a triangular wave).
Figure 67:
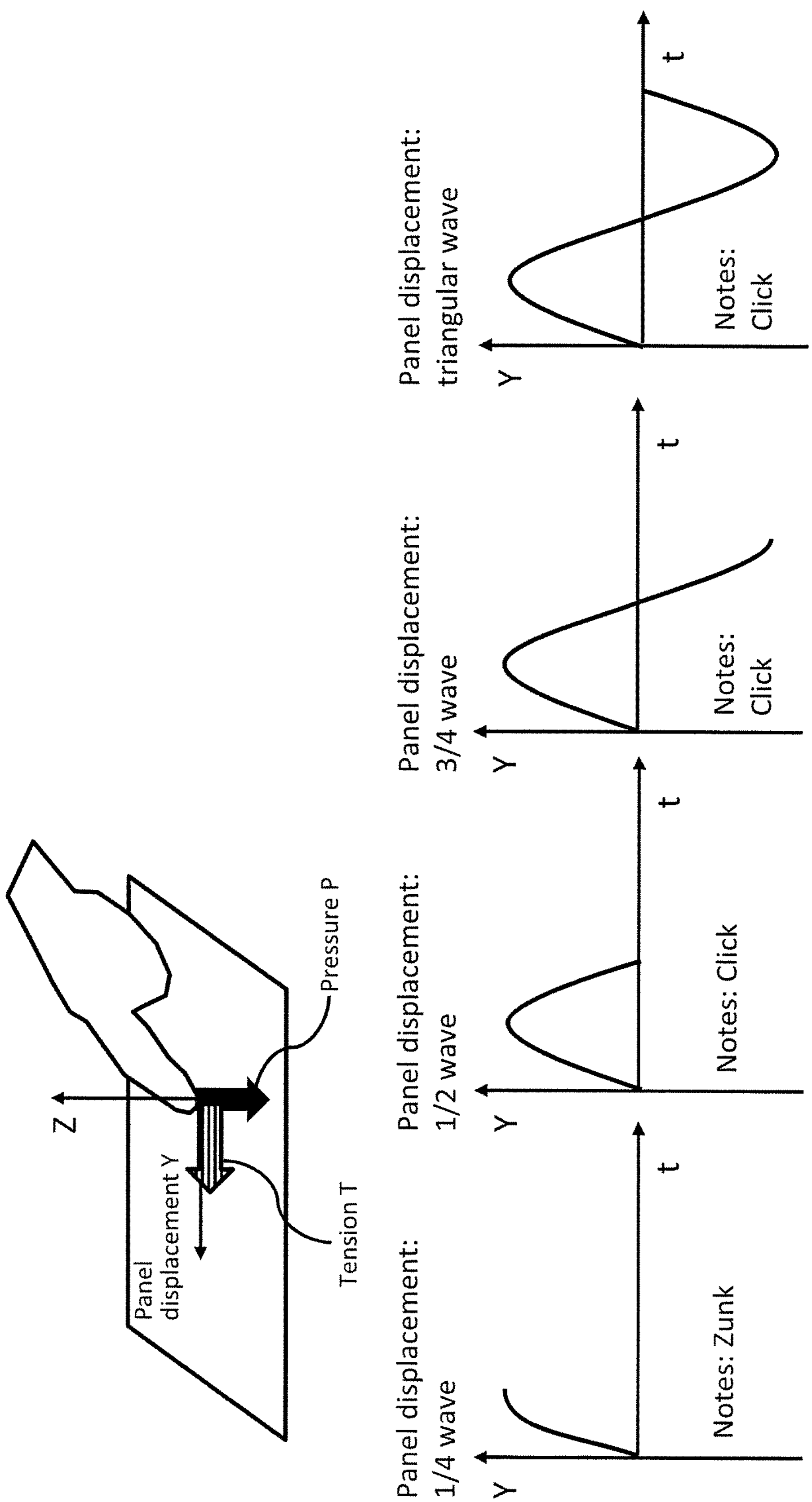
FIG. 67 is an explanatory view showing displacement and amplitude control (a sine wave).
Figure 68:
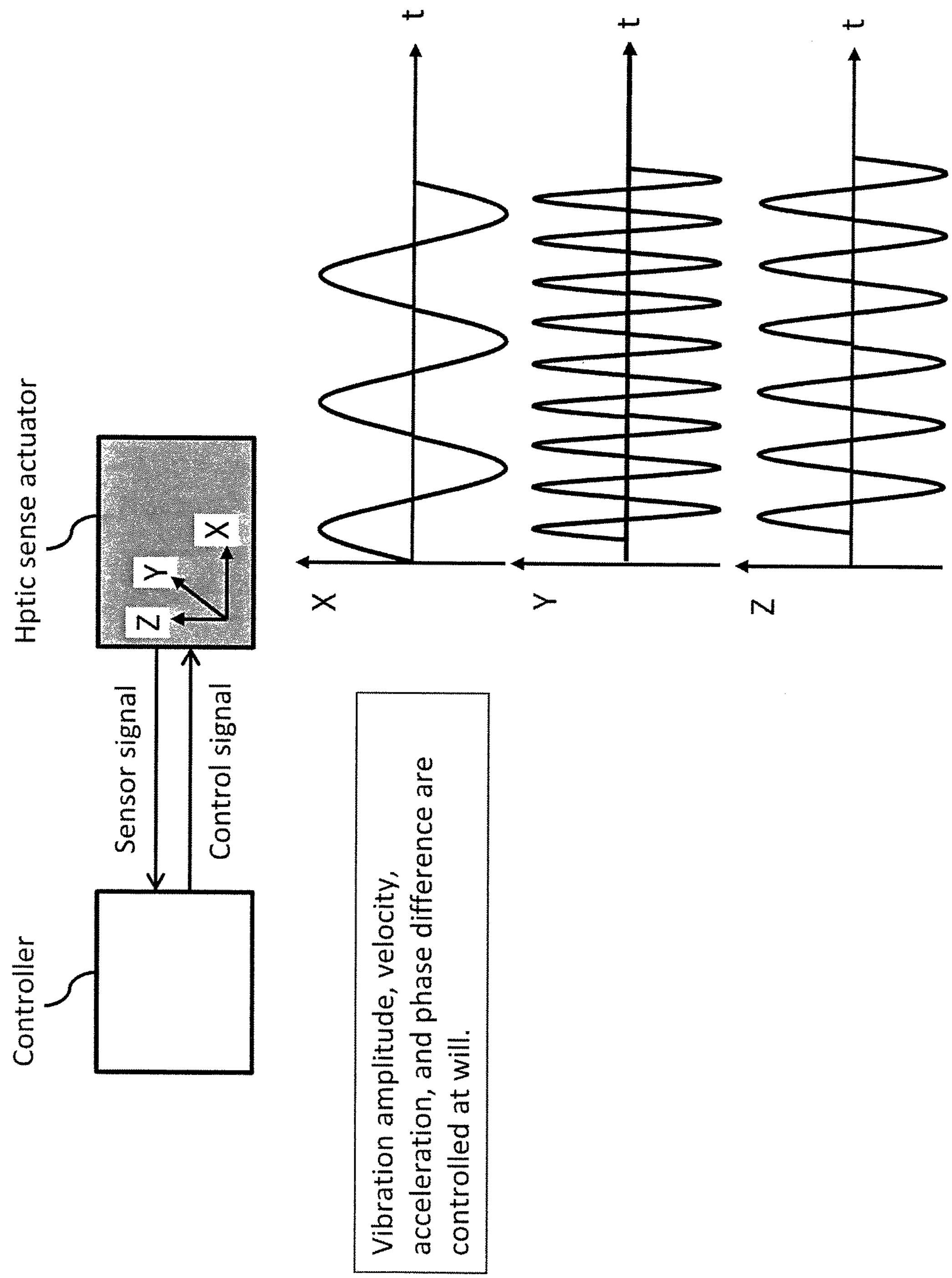
FIG. 68 is an explanatory view showing vibration control of a haptic sense actuator.

FIG. 227*a* schematically shows a method for generating a rotational force in a pseudo-haptic device 107, and FIG. 61*d* schematically shows a method for generating a translational force. Two eccentric weights 814 in FIG. 227*a* rotate in the same direction with a phase delay of 180 degrees. On the other hand, in FIG. 227*d*, the eccentric weights 814 rotate in the opposite directions.

(1) When two eccentric rotators are synchronously rotated in the same direction with a phase delay of 180 degrees as shown in FIG. 227*b*, a torque rotation without eccentricity is formed because the two eccentric rotators are located at point symmetrical positions and therefore the center of gravity coincides with the axis of rotation. This enables presentation of a rotational force sensation. However, because a time differential of angular momentum is a torque and because it is necessary to continue to increase the rotation velocity of a motor continuously in order to continue to present a torque in one direction continuously, it is in reality difficult to present a rotational force sensation continuously.

(2) A pseudo-haptic sensation of a rotational force continuous in one direction (continuous torque sensation) is induced by synchronous control using angular velocities ω1 and ω2 as shown in FIG. 227*c*.

(3) When the two rotators are synchronously rotated in opposite directions at a constant angular velocity as shown in FIG. 227*e*, a force that vibrates linearly in an arbitrary direction (simple harmonic oscillation) can be formed by controlling an initial phase θi1201.

(4) When the two rotators are respectively rotated synchronously in opposite directions at angular velocities ω1 and ω2 according to a sensory characteristic relating to a pseudo-haptic sensation as shown in FIG. 227*f*, a pseudo-haptic sensation of a translational force that is continuous in one direction (continuous force sensation) is induced.

In the pseudo-haptic interface device 101, when the rotation velocities (angular velocities) and the phase synchronization are adequately controlled based on a human sensory characteristic as shown in FIG. 227*c* and FIG. 227*f*, the control circuit can be simplified because a pseudo-haptic sensation can be induced only by combining two angular velocities (ω1, ω2).

FIG. 228 schematically shows the phenomenon in FIG. 225 and its effect. By controlling the rotation pattern of an eccentric motor 815 to vary the combined momentum of the two eccentric rotators temporally in view of a sensory characteristic relating to a pseudo-haptic sensation, it is possible to induce a sensory illusion 905 that makes the user perceive a force acting continuously in one direction from vibration 904 that periodically accelerate or decelerate about an equilibrium point. In other words, a sensory illusion that makes the user feel as if a force is acting in one direction is induced regardless of the fact that no force component acting in one direction exists physically.

When the rotators are alternately accelerated or decelerated at the operation points A and B every time the phase changes by 180 degrees, a force sensation 905 in one direction is continuously perceived. The force is physically returned to an initial state in one cycle, and its momentum and an integral value of the force are zero. In other words, the acceleration-deceleration mechanism remains around the equilibrium point and does not move leftward. However, the sensory integral value of the force sensation as a sensory quantity does not become zero. At this time, the perception of an integral 908 of a positive force decreases and only an integral 909 of a negative force is perceived.

Here, because a time differential of an angular momentum is a torque and a time differential of a momentum is a force and because it is necessary to continue to increase the rotation velocity of a motor or a linear motor continuously in order to continue to generate a torque and a force in one direction, a method in which a rotating body or the like is periodically rotated is not suitable for continuously presenting a force sensation in one direction. In particular, it is physically impossible to present a continuous force in one direction with a non-base type interface such as those used in mobile devices.

However, because humans have a nonlinear sensory characteristic, it is possible to make them perceive a force or force pattern that is different from physical properties illusionally by utilizing the perceptual sensitivity relating to a pseudo-haptic characteristic or controlling the acceleration-deceleration patterns of momentum when the method of the present invention is used. For example, the human's sensory characteristic has different sensitivities to stimuli of different intensities (here, sensitivity is defined as the ratio of the intensity of the perceived stimulus to the intensity of the given stimulus); they are more sensitive to weak stimuli and less sensitive to strong stimuli. Thus, by controlling the acceleration and deceleration phases of motor rotation to repeat acceleration and deceleration periodically, it is possible to present a continuous force sensation in the direction in which a weak stimulus is presented. In addition, it is also possible to present a continuous force sensation in the direction in which a strong stimulus is presented by selecting operation points A and B with an appropriate sensory characteristic.

A driving simulator is considered as a similar device. In a driving simulator, acceleration of a vehicle is presented by slowly returning the user to the original position with acceleration that is too small to be noticed after a target force (acceleration feeling) is given. Thus, the force is presented intermittently. It is, therefore, impossible to present a force sensation or acceleration feeling feel in one direction continuously with such an asymmetric acceleration type method. The situation is the same even with a conventional haptic interface device. However, in the present invention, a sensory illusion is utilized to present a translational force sensation 905 that is continuous in one direction. In particular, the pseudo-haptic interface device 101, which uses a sensory illusion, is characterized in enabling the user to perceive a continuous force in a direction opposite the direction of an intermittent force that is presented by a physical method in the above driving simulator.

In other words, by utilizing the human nonlinear sensory characteristic that shows different sensitivities to different intensities, even if the integral of forces that are generated by periodical acceleration and deceleration or vibration is physically zero, the forces are not cancelled out sensuously and a translational force-like force sensation 905 or torque feeling is presented continuously in a negative direction 909 as a target direction (see FIG. 215 for a method for producing a continuous torque sensation). In this case, a positive force 908 is not perceived. These phenomena provide the same effect for any nonlinear characteristics even when a sensory characteristic 831 has a non-logarithm sensory quantity with respect to a physical quantity 832 as a stimulus. This effect can be achieved with a non-base type interface as well as with a base type interface.

In FIG. 228, when the rotation duration time Ta at the operation point A is reduced close to zero, the combined momentum in the section of the rotation duration time Ta becomes large and the force sensation also become large because the momentum in the each section of the rotation duration times Ta and Tb are equal to each other. However, because the force sensation changes logarithmically and the sensitivity decreases, the integral of the perceived value in the section of the rotation duration time Ta approaches zero. Thus, the force sensation in the section of the rotation duration time Tb becomes relatively larger and the continuity of the force sensation 905 in one direction improves. As a result, it is possible to continue to present a force sensation freely in an arbitrary direction by suitably selecting the operation points A and B and suitably setting an operation point A duration time and an operation point B duration time to adjust the synchronized phase between the two eccentric rotators A and B.

FIG. 229 shows nonlinear characteristics that are used in the pseudo-haptic interface device. In the drawing, a sensory characteristic (FIG. 229*a* and FIG. 229*b*), a nonlinear characteristic of a viscoelastic material (FIG. 229*c*), and a hysteresis characteristic of a viscoelastic material (FIG. 229*d*) are shown.

FIG. 229*b* is a schematic view showing, similarly to FIG. 225, a sensory characteristic of a human having a threshold value 2206 for a physical quantity. The drawing shows that a sensation which does not exist physically is induced as a pseudo-haptic sensation when the pseudo-haptic interface device is controlled in view of this sensory characteristic.

When a material having physical properties which show a nonlinear stress characteristic in response to an applied force is interposed between a device that generates a drive force such as displacement, vibration, torque or force and an integumentary sense organ of a human as shown in FIG. 229C, a similar pseudo-haptic sensation is also induced.

In addition, as shown in FIG. 229*d*, the sensory characteristic is not isotropic between a time when displacement is increased and a time when it is decreased, for example, between a time when a muscle is extended and a time when it is contracted, and often indicates a hysteresis sensory characteristic. A muscle contracts significantly immediately after it is pulled strongly. When such a strong hysteresis characteristic is generated, an induction of a similar pseudo-haptic sensation is promoted.

FIG. 230 is views showing a haptic information presentation method using a method in which a sensory characteristic is changed by a masking effect relating to a force sensation as one example of a method for changing the sensory characteristic.

Figure 80:
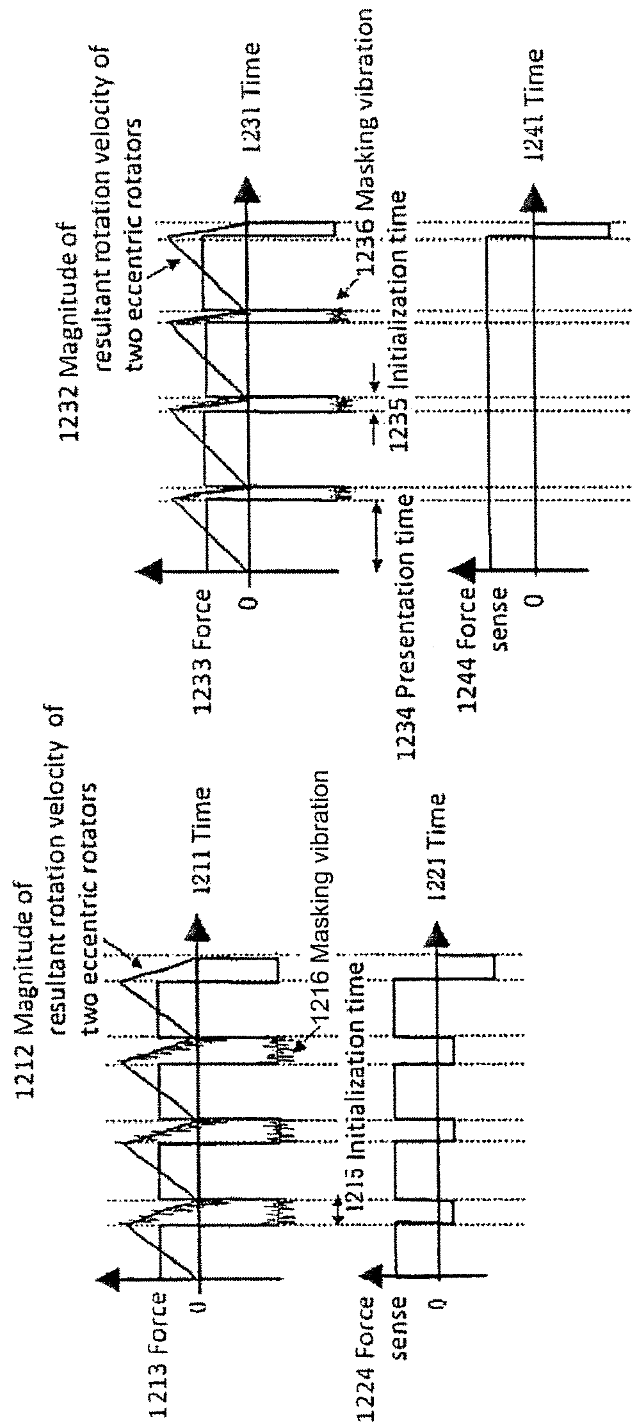
FIG. 80 is an explanatory view showing a sensory characteristic and a masking method.
Figure 81:
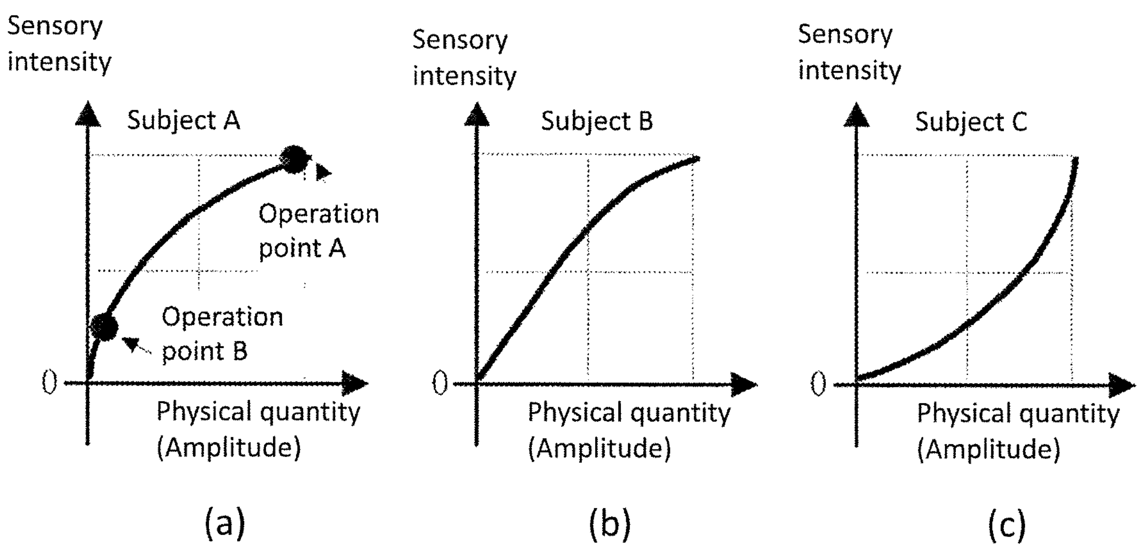
FIG. 81 is an explanatory view showing an individual difference of sensory characteristics.
Figure 82:
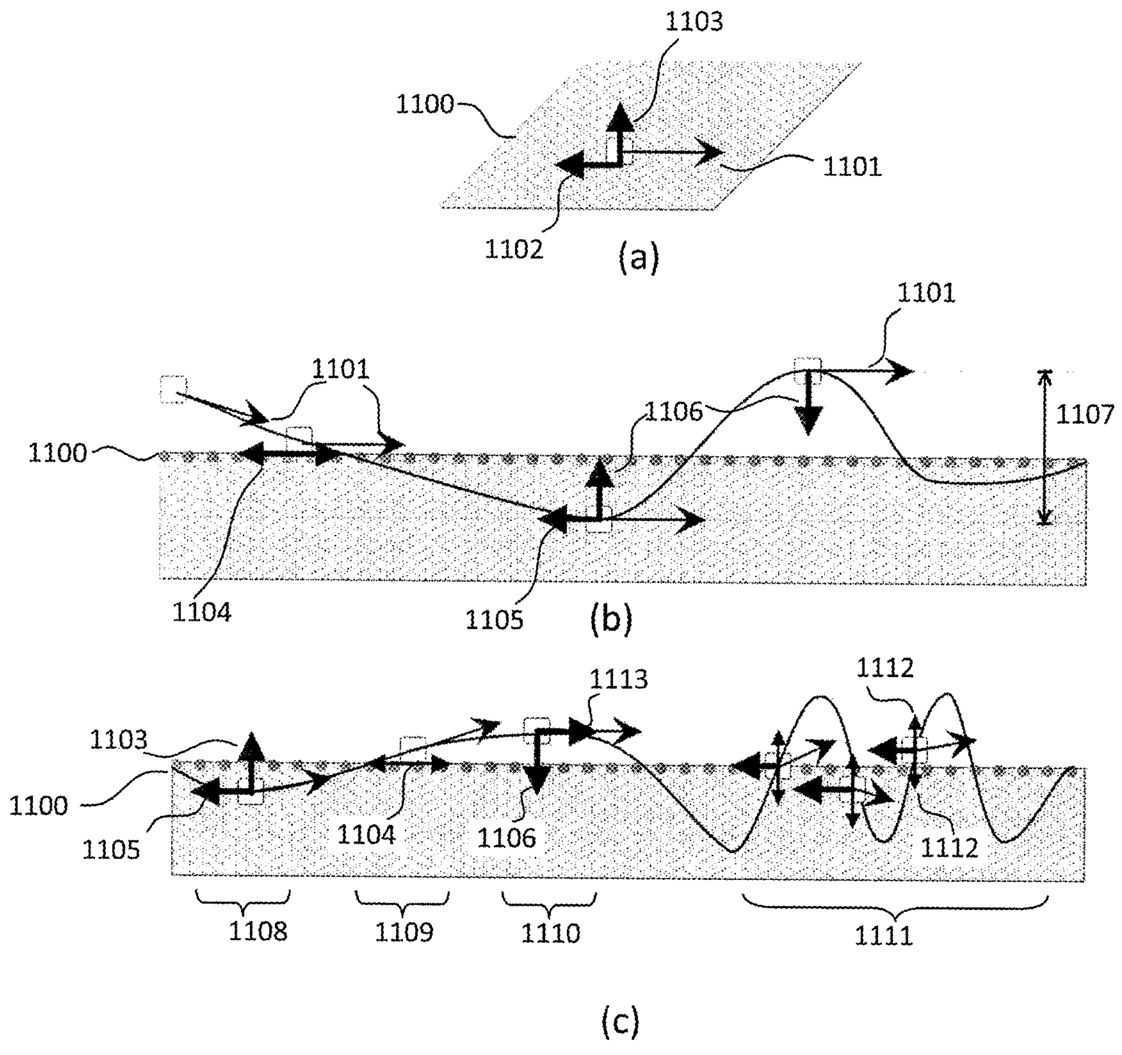
FIG. 82 is an example of a control method.
Figure 83:
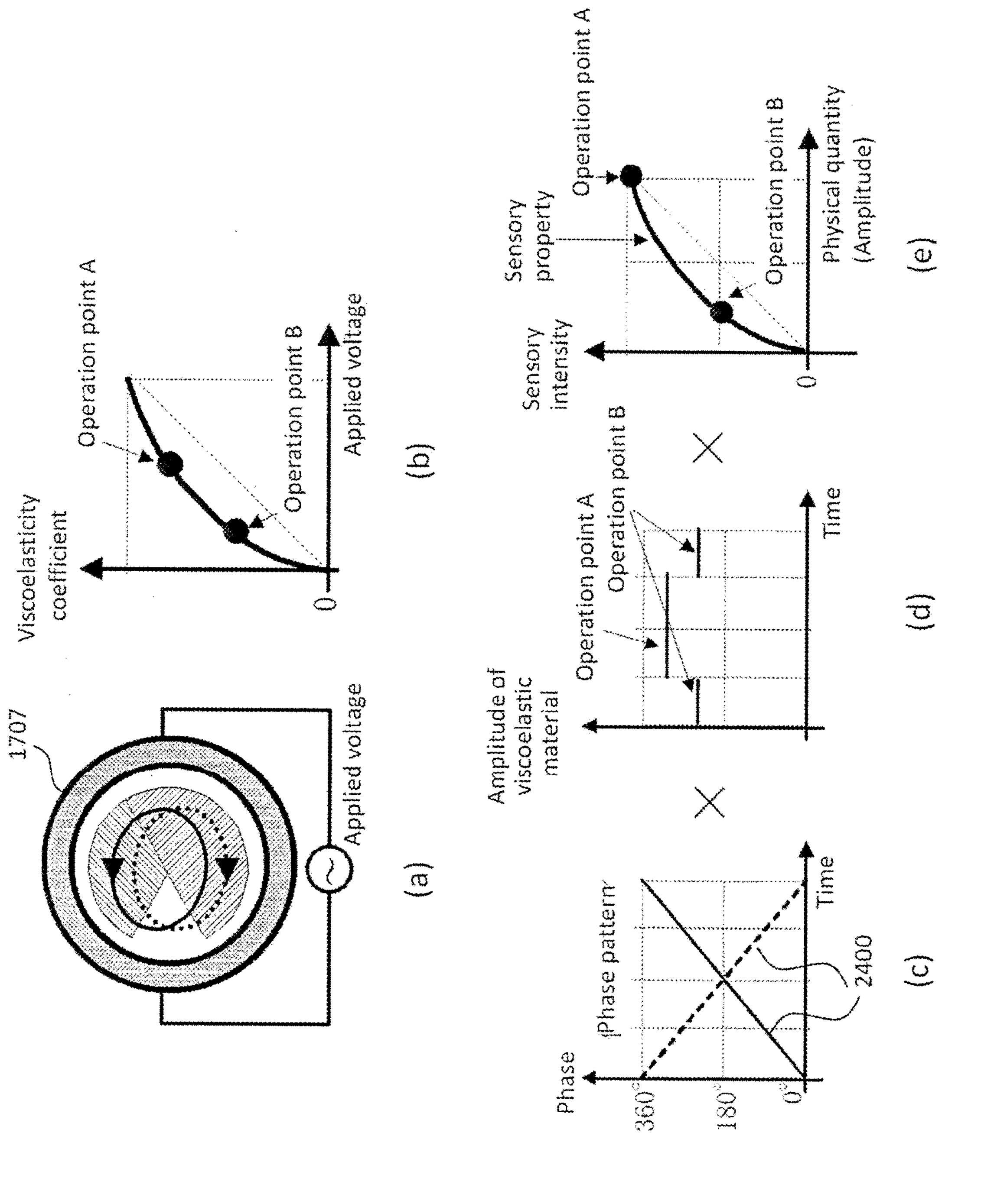
FIG. 83 is an explanatory view showing nonlinear control of a physical property.
Figure 84:
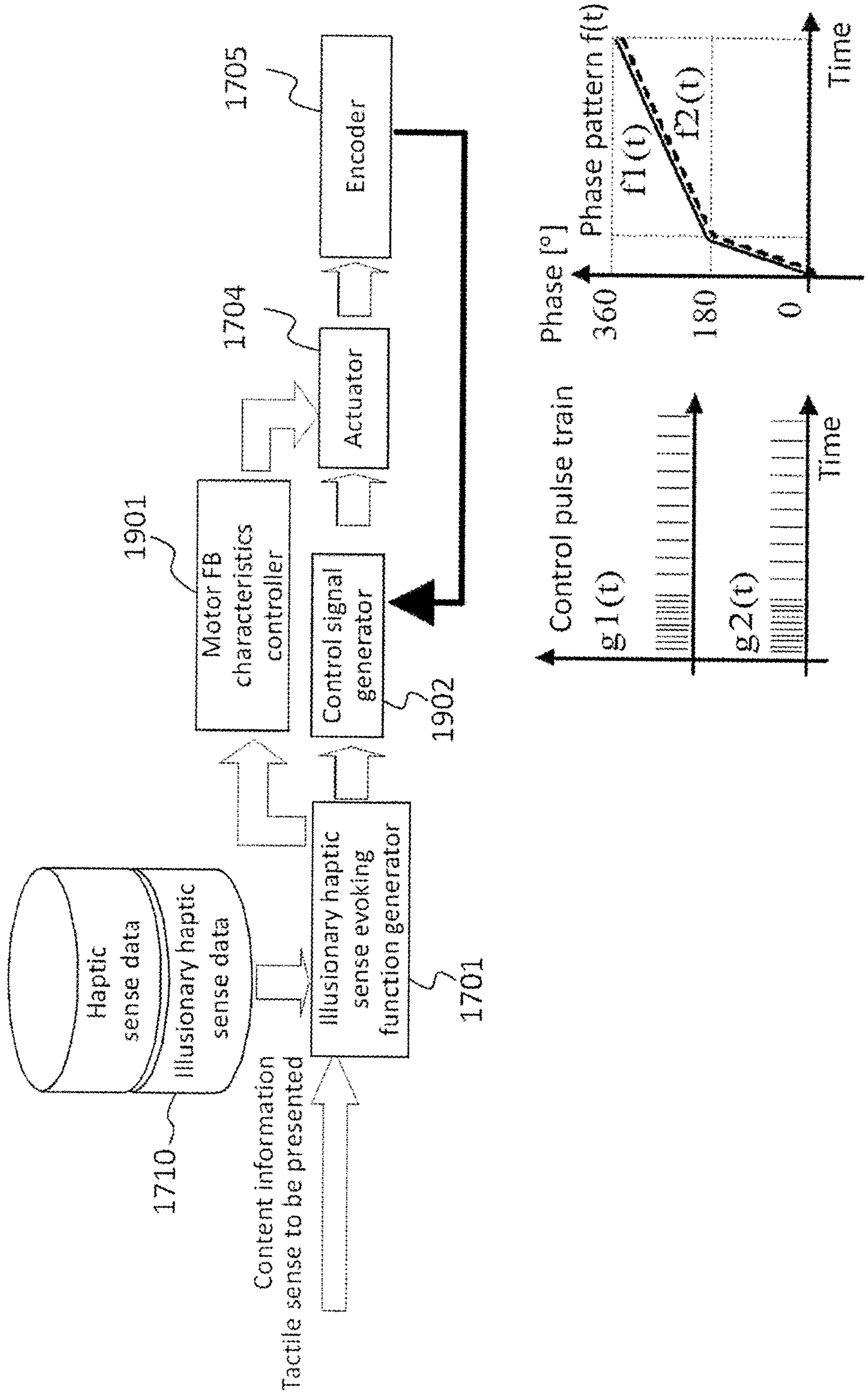
FIG. 84 is an example of an actuator (eccentric motor).
Figure 85:
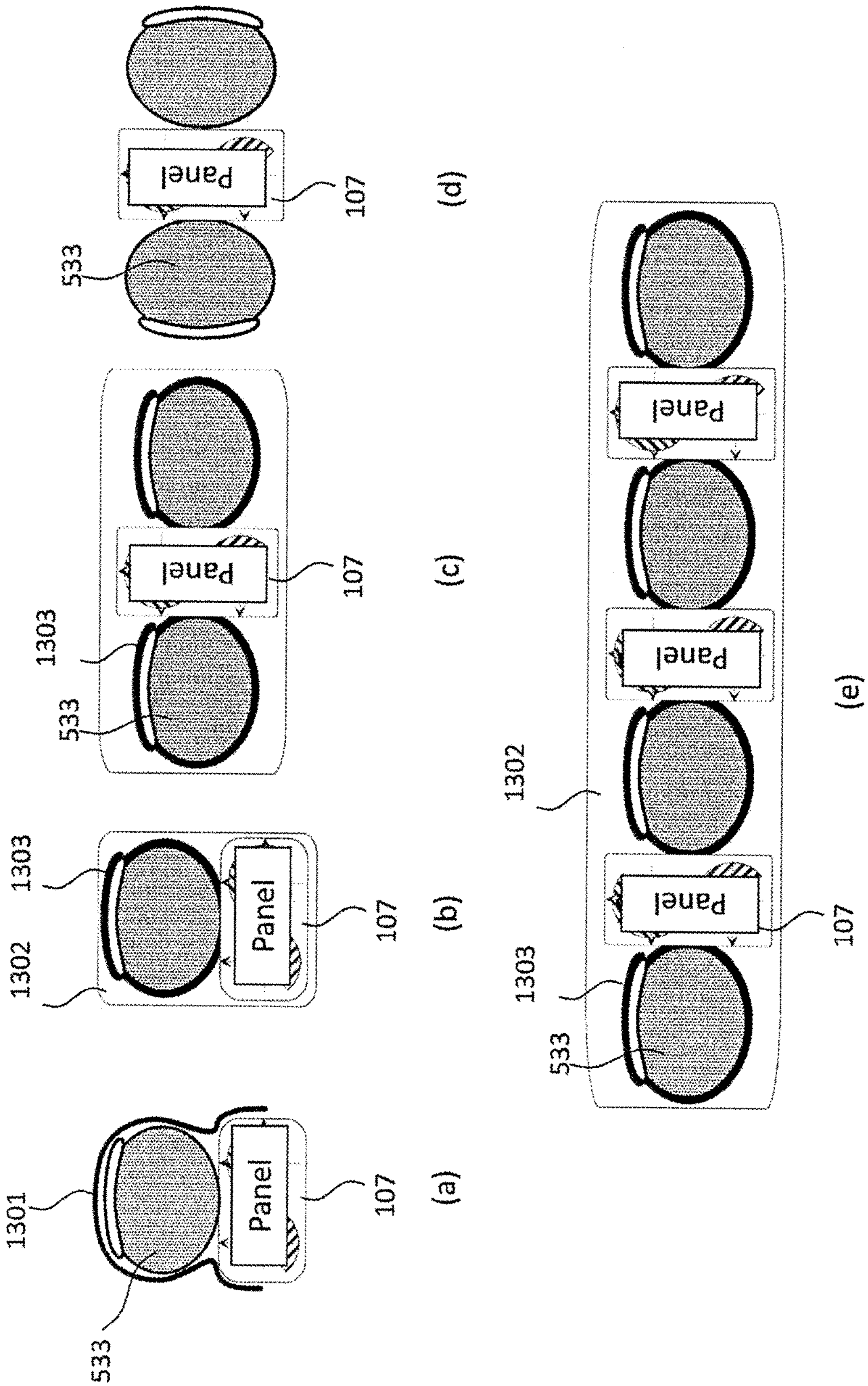
FIG. 85 is an explanatory view showing installation methods (for installing a panel on fingertips).
Figure 86:
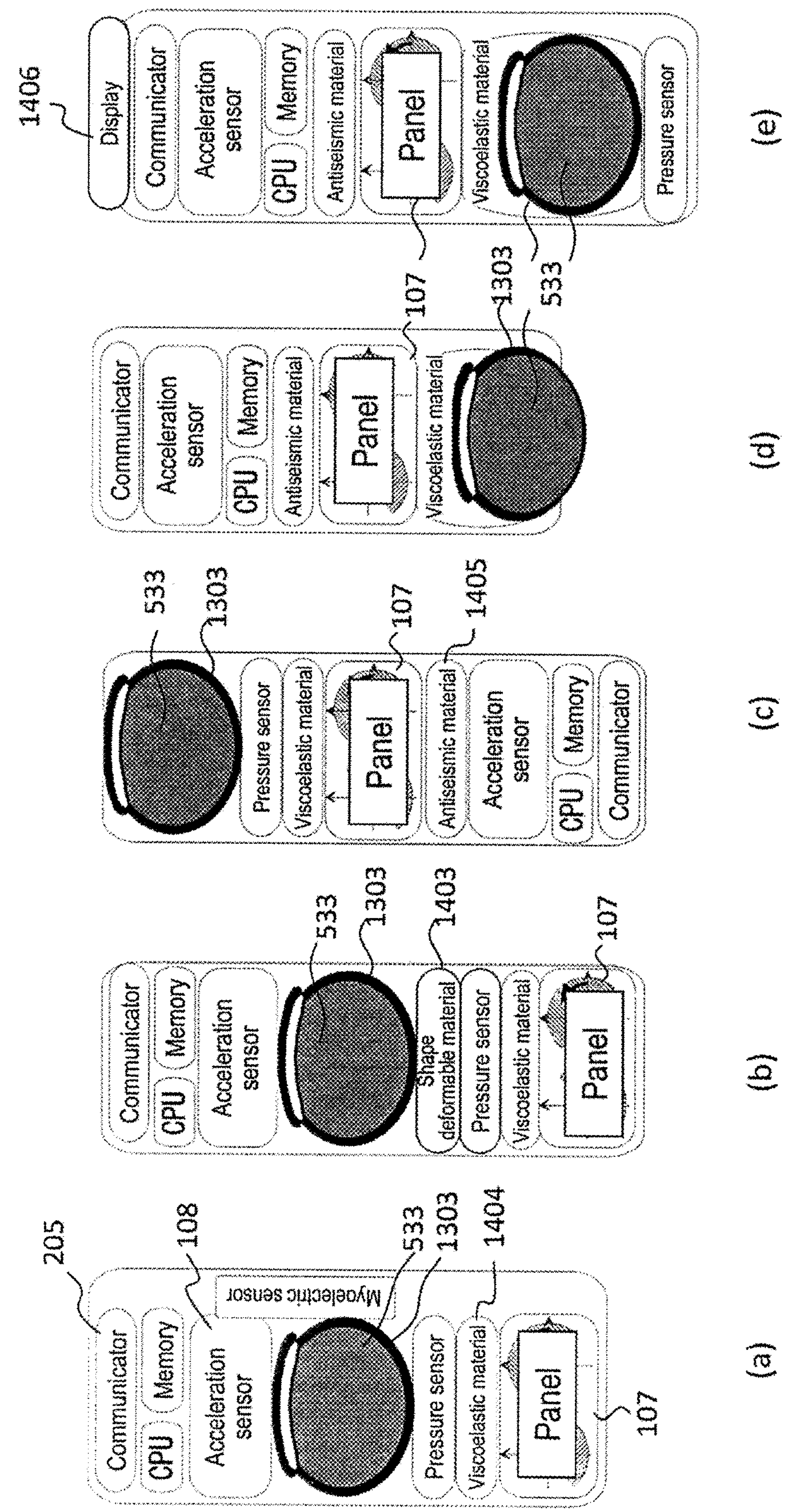
FIG. 86 is an explanatory view showing configurations and examples of an installation method.
Figure 87:
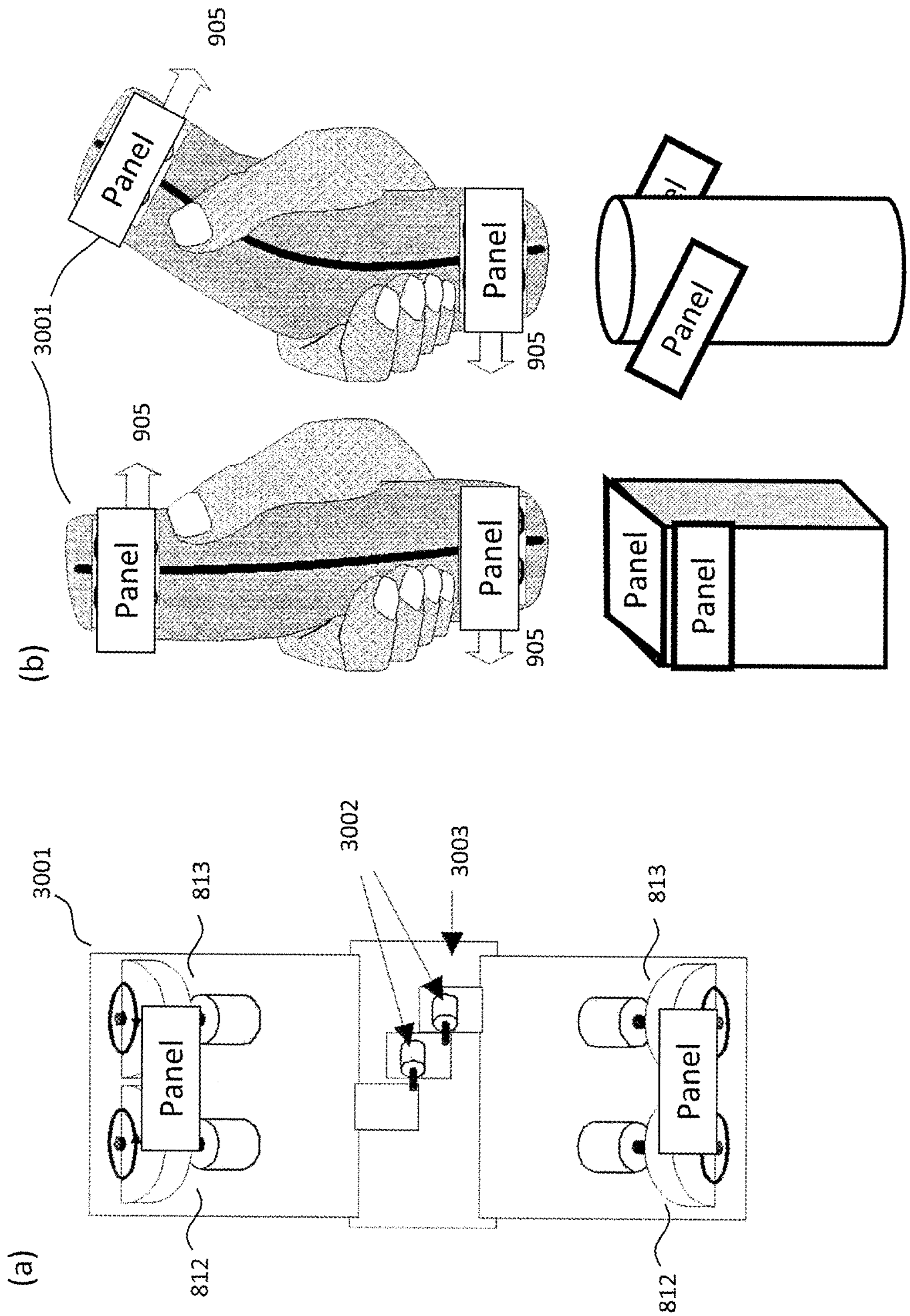
FIG. 87 is an explanatory view showing an installation method (grip type and variation).
Figure 88:
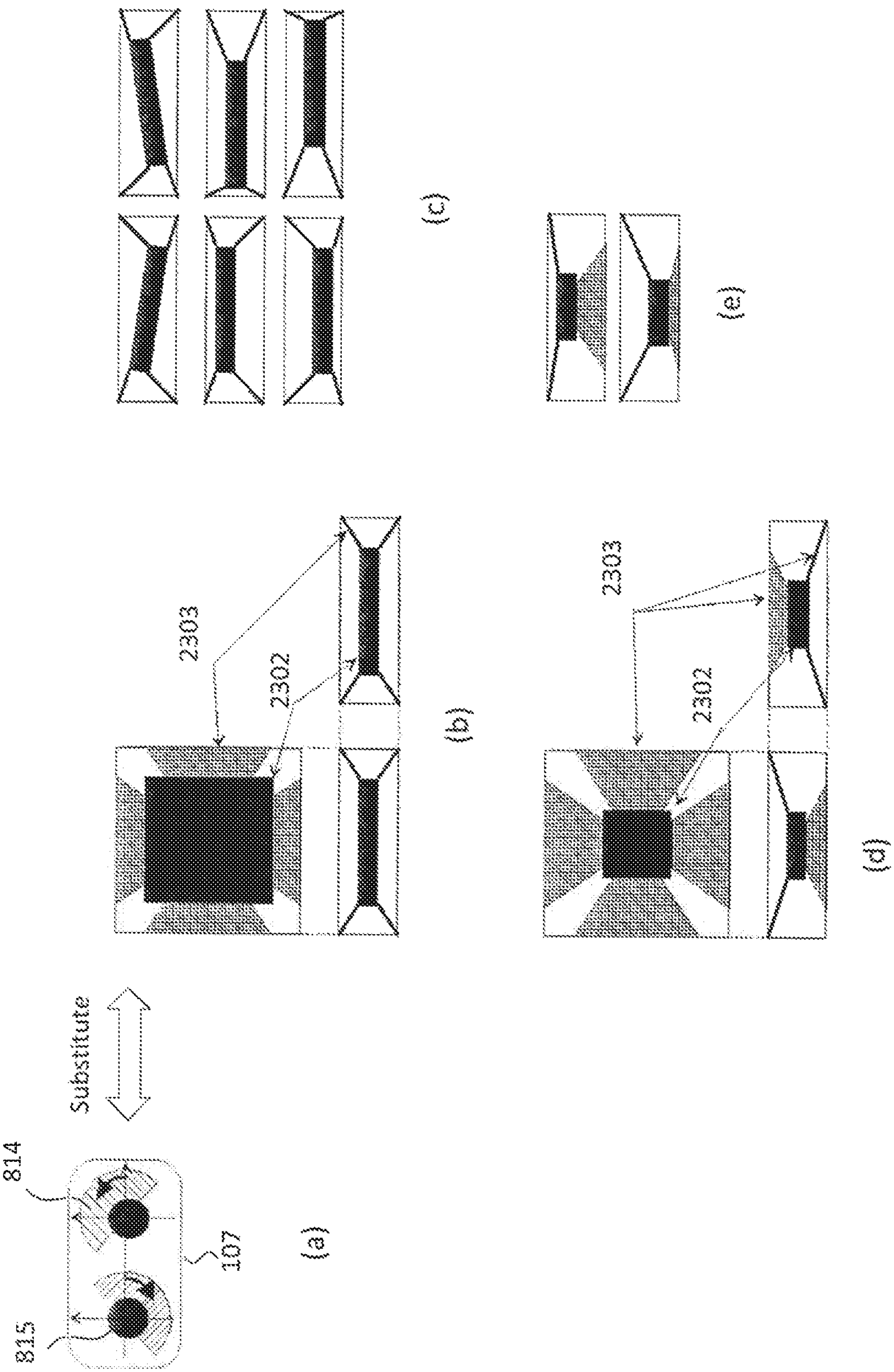
FIG. 88 is an example of an actuator (artificial muscle).
Figure 89:
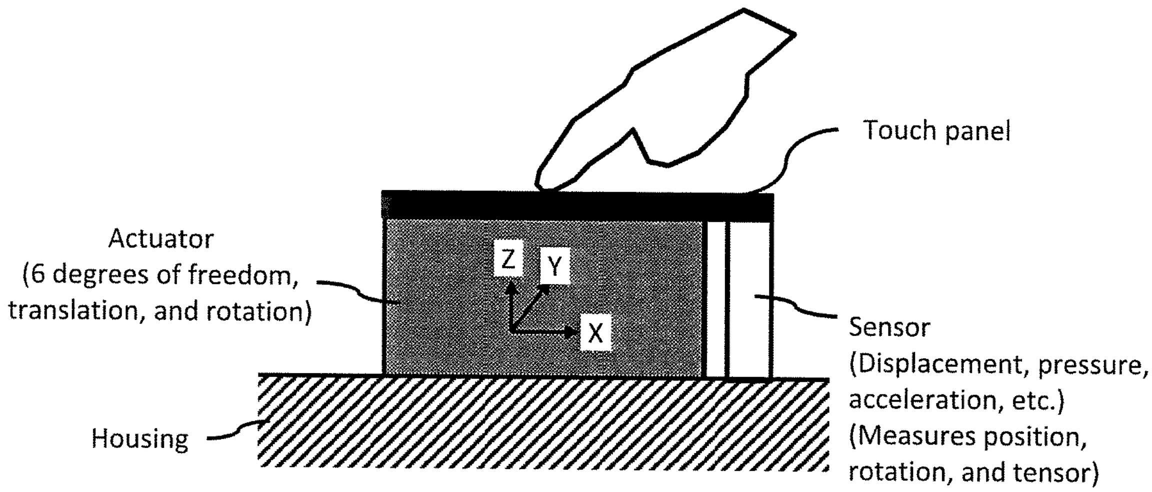
FIG. 89 is a table type example.
Figure 90:
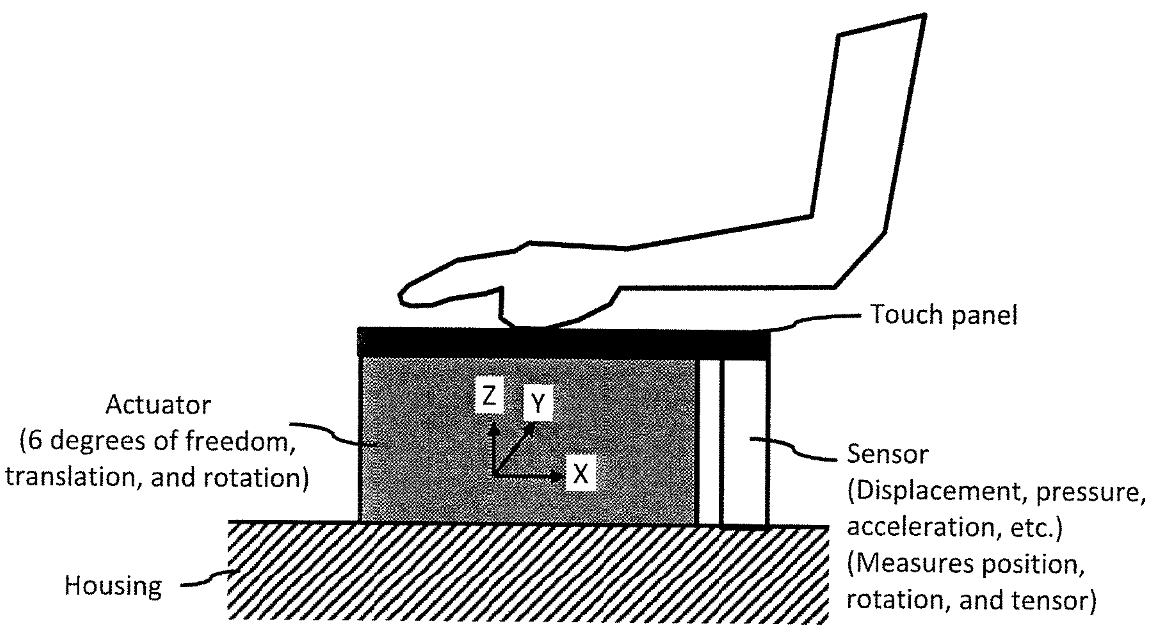
FIG. 90 is a table type example.
Figure 91:
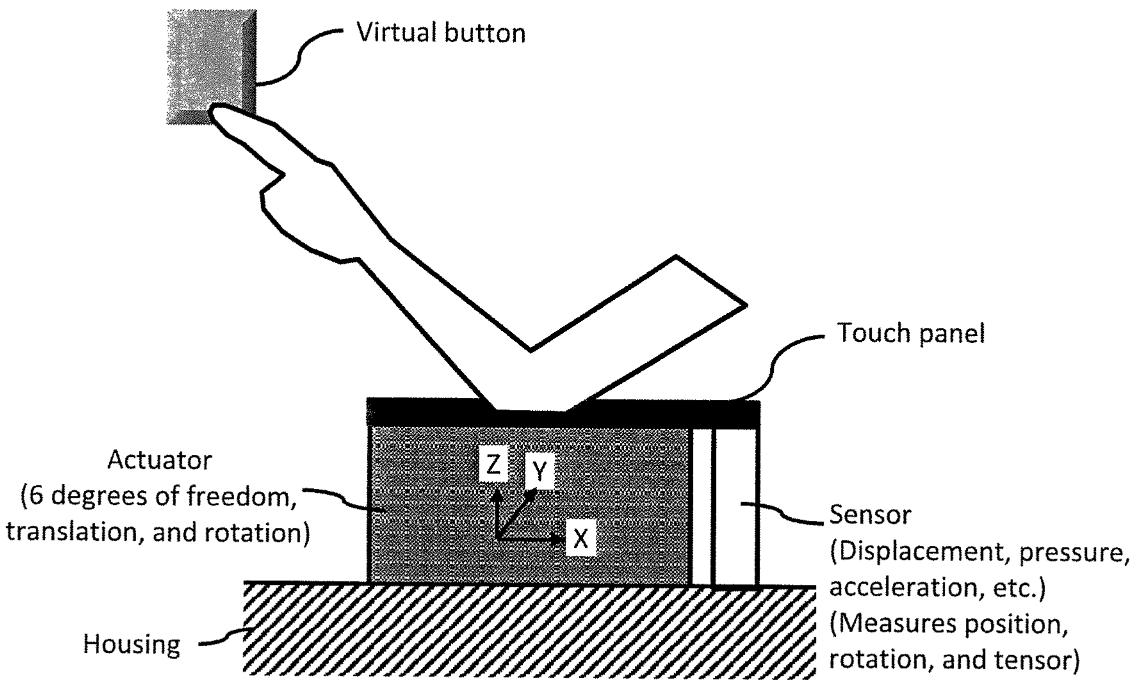
FIG. 91 is a table type example.
Figure 92:
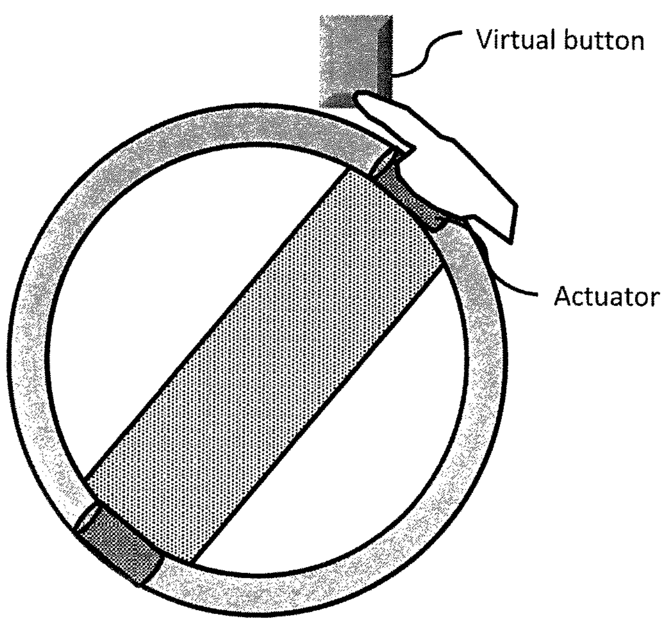
FIG. 92 is a handle type example.
Figure 93:
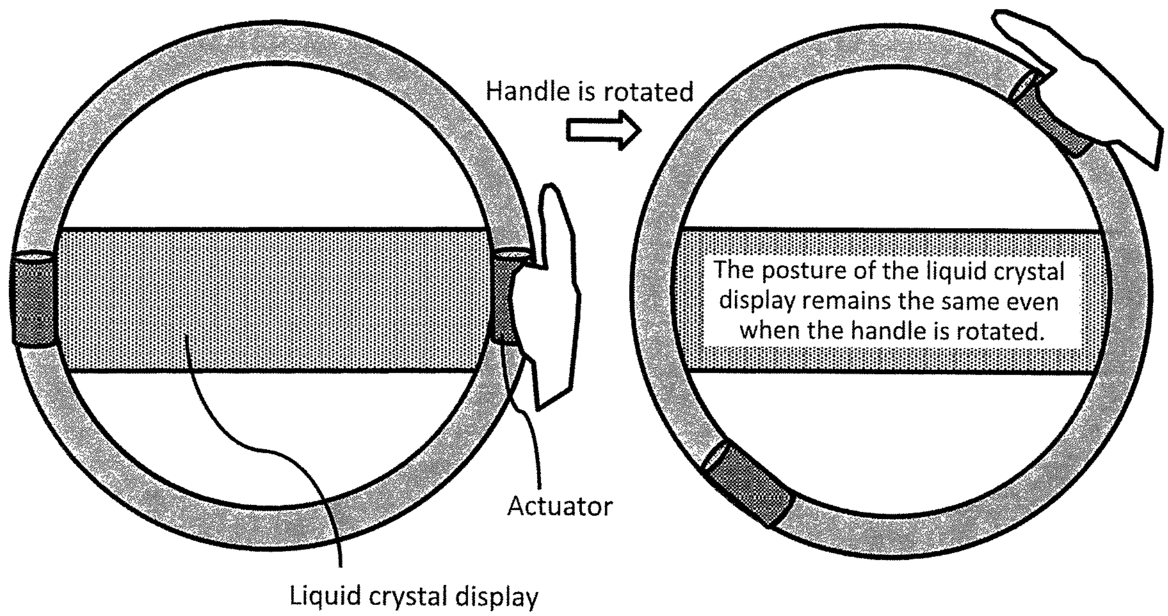
FIG. 93 is a handle type example.
Figure 94:
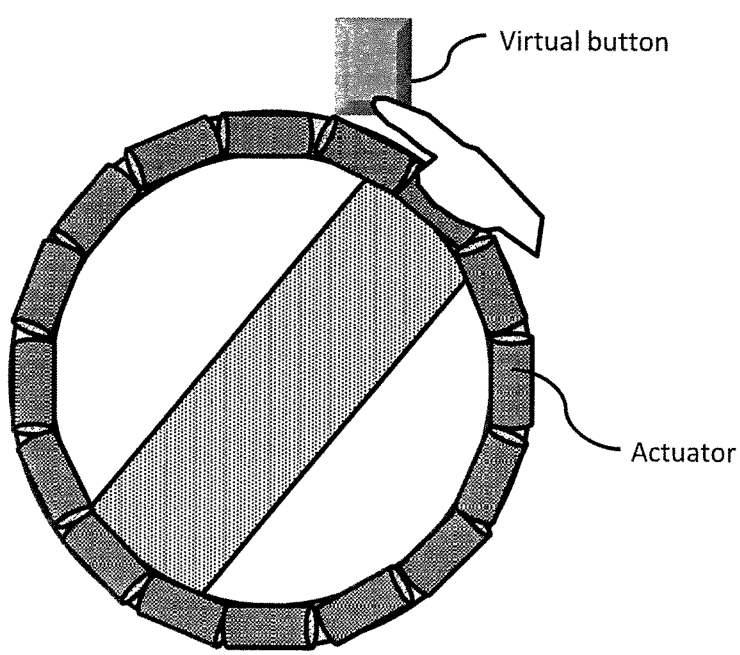
FIG. 94 is a handle type example.
Figure 95:
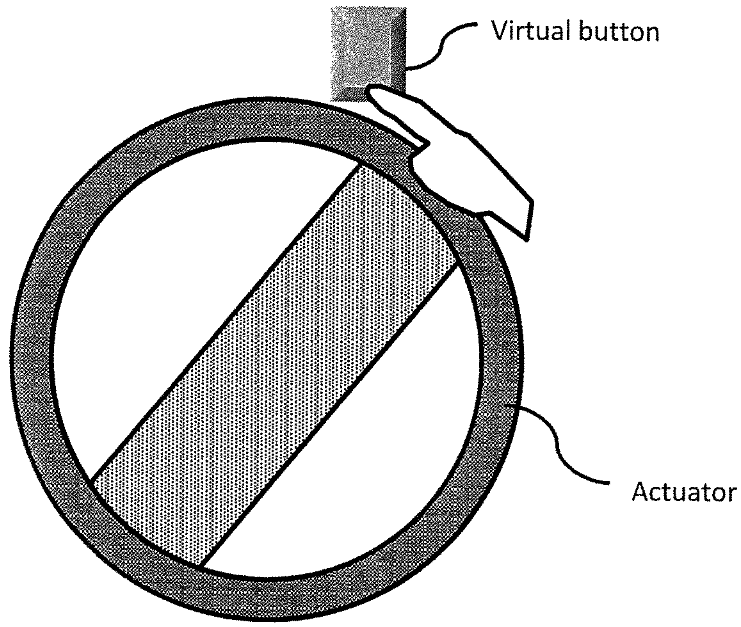
FIG. 95 is a handle type example.
Figure 96:
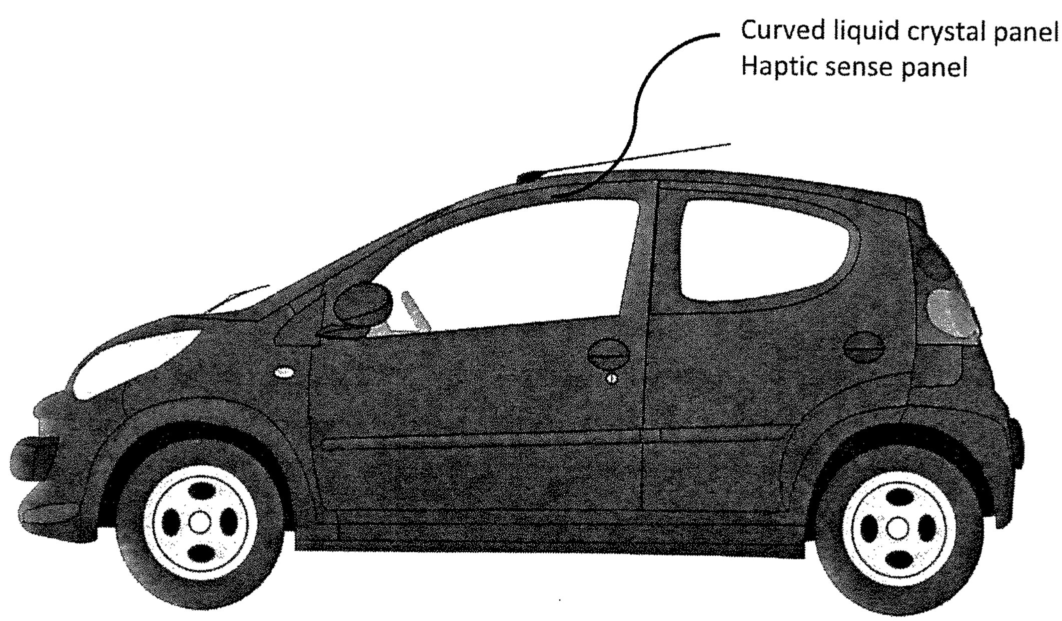
FIG. 96 is a surface layer type example.
Figure 97:
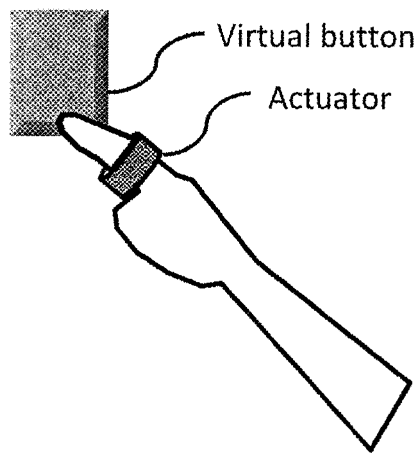
FIG. 97 is a ring type example.
Figure 98:
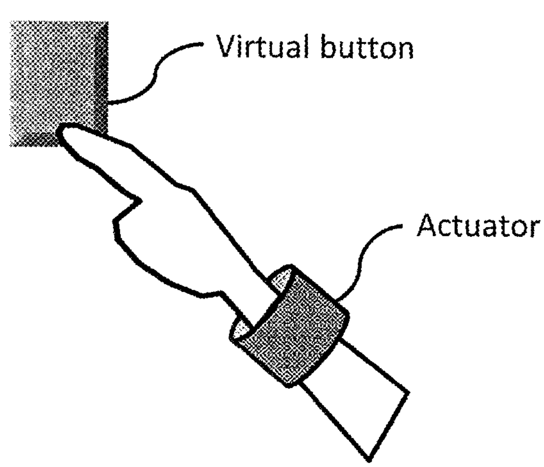
FIG. 98 is a wrist band type example.
Figure 99:
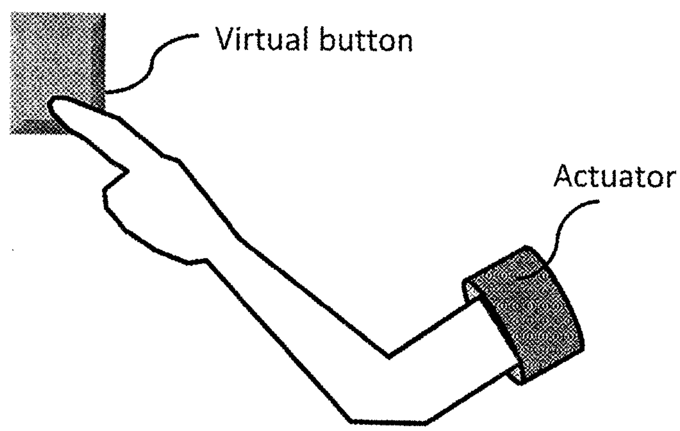
FIG. 99 is an arm ring type example.

The sensory characteristic is masked by a masking displacement (vibration), and a torque sensation 434 is decreased. As this masking method, simultaneous masking 424 (having satisfactory results in masking of the visual sense and hearing sense), forward masking 425 and backward masking 426 are enumerated. FIG. 230*a* schematically shows a torque 413 as a maskee, and the torque sensation 434 perceived at this time is represented as in FIG. 80C. The torque 413 is proportional to the time differential of a rotation velocity 412 of a rotator.

At this time, initialization times 415 in which the rotation velocity 412 of the rotator is initialized and masking duration times 425 corresponding thereto are shortened like initialization times 445 and masking duration times 455 shown in FIG. 230*d* until they become shorter than a certain specific time, critical fusion occurs in which although a negative torque due to the initialization physically exists, it is felt as if torque is continuously presented like a torque sensation 464.

A masker to generate a masking displacement (vibration) may be a rotator different from a rotator as a maskee by which torque is masked or the rotator itself as the maskee. The case where the rotator of the maskee also serves as masker means that at the time of masking, the rotator is controlled to generate the masking displacement (vibration) by the control device. The displacement (vibration) direction of the masker may or may not be the same as the rotation direction of the rotator as the maskee.

The above can also occur in the case where the maskee and the masker are the same stimulus (in the case where the rotator of the maskee serves also as a masker).

FIG. 231 schematically shows this case. As shown in FIG. 231, before and after strong torque sensations 485 and 486, a torque sensation 484 is decreased by a forward masking 485 and a backward masking 486.

With respect to the sensory characteristic, the sensitivity of a torque sensation 517 is changed according to a muscle tensile state or at least one state of physical, physiological and psychological states. For example, when a muscle is instantaneously extended by a presented torque 514 (high torque 524 in a short time) as an external force, a sensor called a muscle spindle in the muscle senses this, and the muscle is quickly contracted in a conditioned reflex way by a muscle cause torque 515 (muscle reflex cause torque 525) having power not lower than this external force. At this time, myoelectricity 511 is generated. Upon detecting it, a control circuit 512 controls a haptic presentation device 513, and changes the sensitivity of the torque sensation 517 by activating a presented torque 516 (gentle middle torque 526) in synchronization with the contraction of the muscle.

The above is established not only in the muscle tensile state but also in the case of the change of sensory sensitivity due to at least one state of breath, posture and neural firing states.

In a palm, the sensitivity is different according to the palm direction because of the anatomical structure of a skeleton, joint, tendon, muscle and the like. A direction presentation with high precision becomes possible by correcting the intensity (rotation velocity ω612) of the presented physical quantity in conformity with the sensitivity (anisotropic sensitivity curve 611) dependent on the palm direction.

FIG. 232 is views showing a method for presenting vibration haptic information in an arbitrary direction using a method in which a sensory characteristic is changed by a masking effect relating to a force sensation as one example of a control method for continuously or intermittently presenting haptic information on at least one of a displacement sensation, a vibration sensation, a force sensation and a torque sensation in an arbitrary direction.

The sensory characteristic is masked by a masking displacement (vibration) 1216, and a force sensation 1224 is decreased. This masking displacement (vibration) can be generated by synchronizing the rotation velocity 1022 of the eccentric rotator A with the rotation velocity 1023 of the eccentric rotator A in FIG. 225*b* to change (fluctuate) the velocities as shown in FIG. 225*b*. FIG. 232*a* schematically shows this, and the force sensation 1224 perceived at this time is represented as in FIG. 232*b*. A force 1213 is proportional to the time differential of a magnitude 1212 of the combined rotation velocity of the two eccentric rotators.

At this time, when initialization times 1215 in which the rotation velocity 1212 of the rotator is initialized are shortened until they become shorter than a certain specific time as shown in FIG. 232*c*, critical fusion occurs in which although a negative force due to the initialization physically exists, it is felt as if a force is continuously presented like a force sensation 1244.

The above also occurs in the case where a maskee and a masker are different rotators, and a similar continuous presented sensation occurs not only in the case of a force but also in the case of a torque.

Like the sensory characteristic shown in FIG. 233*a* to FIG. 233*c*, different users have different sensory characteristics. Thus, some people clearly perceive a pseudo-haptic sensation but some do not, and some people improve their perceptivity by learning. The present invention has a device that corrects such differences among individuals. In addition, when the same stimulus is persistently presented, the sensation to the stimulus may become dull. Thus, fluctuating the intensity, frequency and/or direction of stimulus is effective to prevent the user from getting used to the stimulus.

FIG. 233*d* shows one example of a method for presenting a force in one direction using a pseudo-haptic sensation. When a high rotation velocity ω1 (high frequency f1) 1002*a* at an operation point A and a low rotation velocity ω2 (low frequency f2) 1002*b* at an operation point B are alternately presented at phase intervals of 180 degrees in a method in which displacement components or vibration components from two eccentric vibrators rotated in opposite directions are combined, the pseudo-haptic sensation intensity (II) is proportional to the logarithm of the acceleration-deceleration ratio Δf/f (wherein (f=(f1+f2)/2, Df=f1−f2)) of the frequencies which are the rotation velocities of the eccentric rotators (FIG. 233*e*). The gradient n that is created when the logarithmic values of the pseudo-haptic sensation intensity and Δf/f are plotted represents an individual difference.

In addition, a sensation intensity (VI) represents the intensity of a displacement component or vibration component that is perceived simultaneously with a force sensation in one direction caused by a sensory illusion. The intensity of the displacement component or vibration component is approximately inversely proportional to the physical quantity f (logarithm), and the sensation intensity (VI) relatively decreases when the frequency f is increased (FIG. 233*f*). By controlling the intensity containing the displacement component or vibration component, the texture of force is changed when a pseudo-haptic sensation is presented. The gradient m that is created when the logarithms are plotted represents an individual difference. The values n and m each representing an individual difference change as learning proceeds and converges to a certain value when the learning is saturated.

FIG. 234*a* to FIG. 234*c* show a method for expressing a texture of a virtual flat plate 1100. The motion of the pseudo-haptic interface device 101 represents the motion 1101 (position, posture angle, velocity or acceleration) of a virtual object monitored by the pseudo-haptic interface device 101 through sensing, and a friction sensation 1109 or roughness sensation 1111 as a texture of the virtual flat plate and its shape are controlled by controlling the direction, intensity and texture parameters (contained vibration components) of a resisting force 1102 created by the pseudo-haptic sensation in response to the motion of the virtual object.

FIG. 234*a* shows a resisting force 1103 that acts from the virtual flat plate to a virtual object when the virtual object (pseudo-haptic interface device 101) is moved on the virtual flat plate 1100 and the resisting force 1102, which acts against the motion.

FIG. 234*b* shows that a frictional force 1104 that acts between the pseudo-haptic interface device 101 and the virtual flat plate 1100 when they are in contact with each other vibrationally alternates between kinetic and static frictions. In addition, the pseudo-haptic interface device 101 makes the user to perceive the presence and shape of the virtual flat plate by presenting a resisting force 1106 that push the pseudo-haptic interface device 101 back so that the pseudo-haptic interface device 101 remains within the tolerance thickness 1107 of the virtual flat plate by feedback control. The resisting force for pushing the pseudo-haptic interface device 101 back is not presented when the pseudo-haptic interface device 101 is not on the virtual flat plate 1100. The resisting force is presented only when the pseudo-haptic interface device 101 is on the virtual flat plate 1100 so that the user can perceive the presence of a wall.

FIG. 234*c* shows a method for expressing a surface roughness. The pseudo-haptic interface device 101 makes the user to feel resistance or stickiness 1108 by presenting a resisting force in a direction opposite the direction 1101 in which the pseudo-haptic interface device 101 is moved based on its moving velocity or acceleration. The pseudo-haptic interface device 101 can emphasize the smooth feeling 1110 of the virtual flat plate as if it is sliding on ice by presenting a negative resisting force (accelerating force 1113) in the same direction as the direction in which the pseudo-haptic interface device 101 is moved. Such an acceleration feeling or smooth feeling 1110, which is difficult to present with a non-base type haptic interface device using a conventional vibrator, is the texture and effect that are achieved by the pseudo-haptic interface device 101, which uses sensory illusions. In addition, the pseudo-haptic interface device 101 makes the user to perceive a surface roughness sensation 1111 of the virtual flat plate by vibrationally fluctuating the resisting force (a fluctuating resisting force 1112).

FIG. 235 shows a control algorithm using a viscoelastic material whose properties change depending on an applied voltage.

Figure 69:
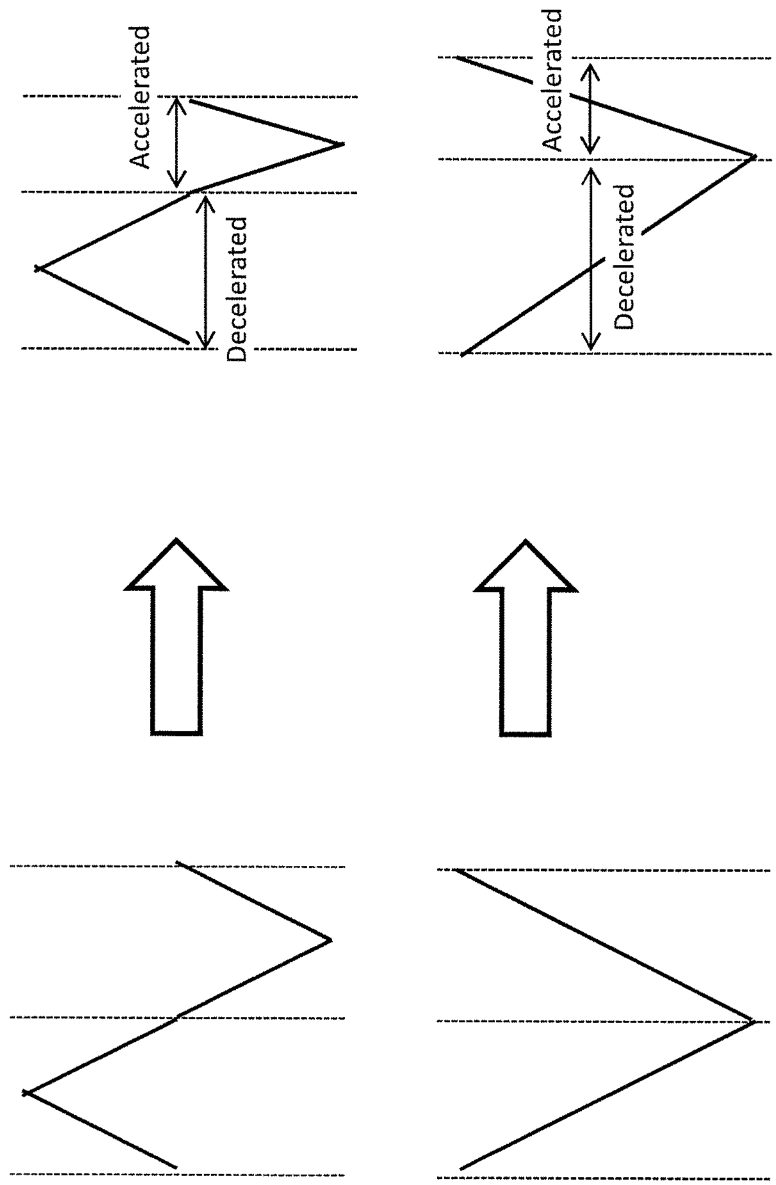
FIG. 69 is an explanatory view showing waveform control (displaced waveforms).
Figure 70:
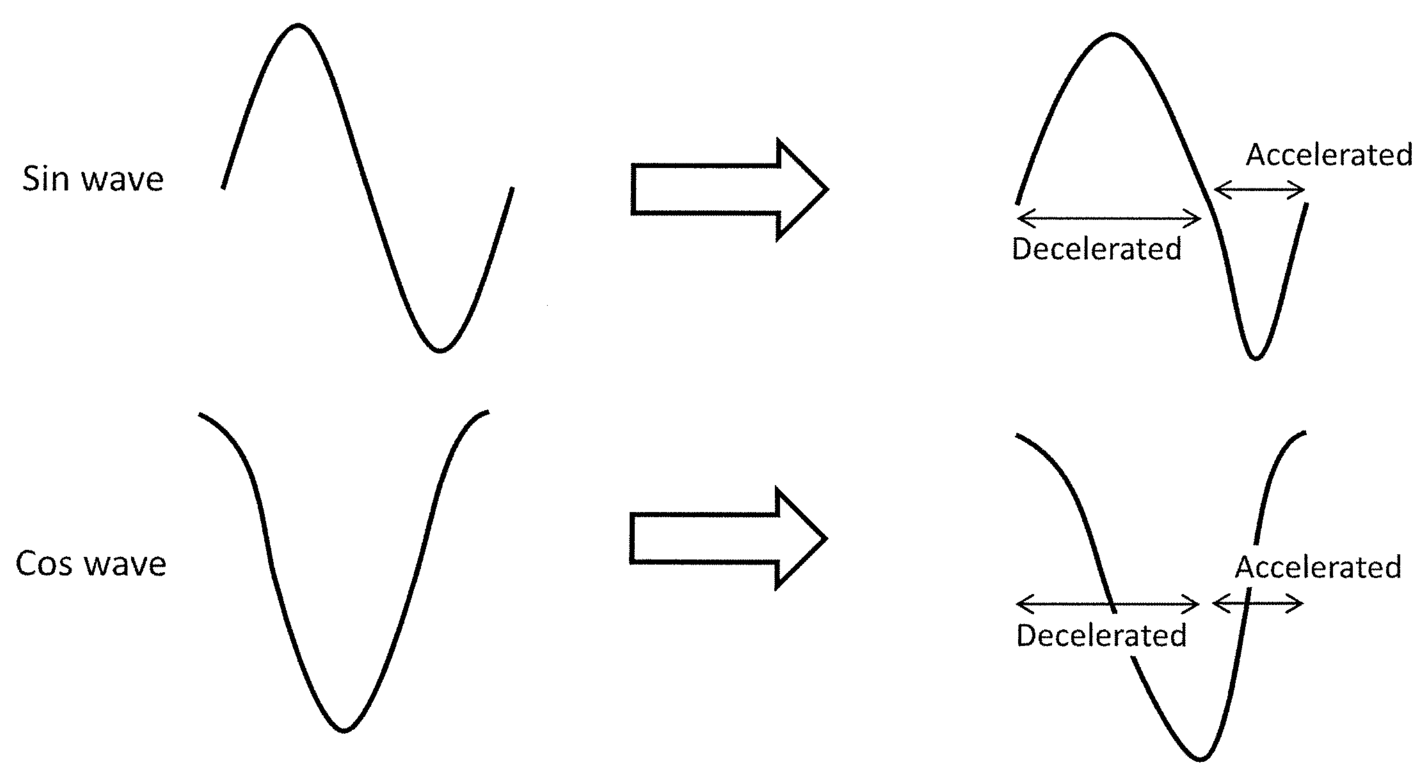
FIG. 70 is an explanatory view showing waveform control (accelerated and decelerated waveforms).
Figure 71:
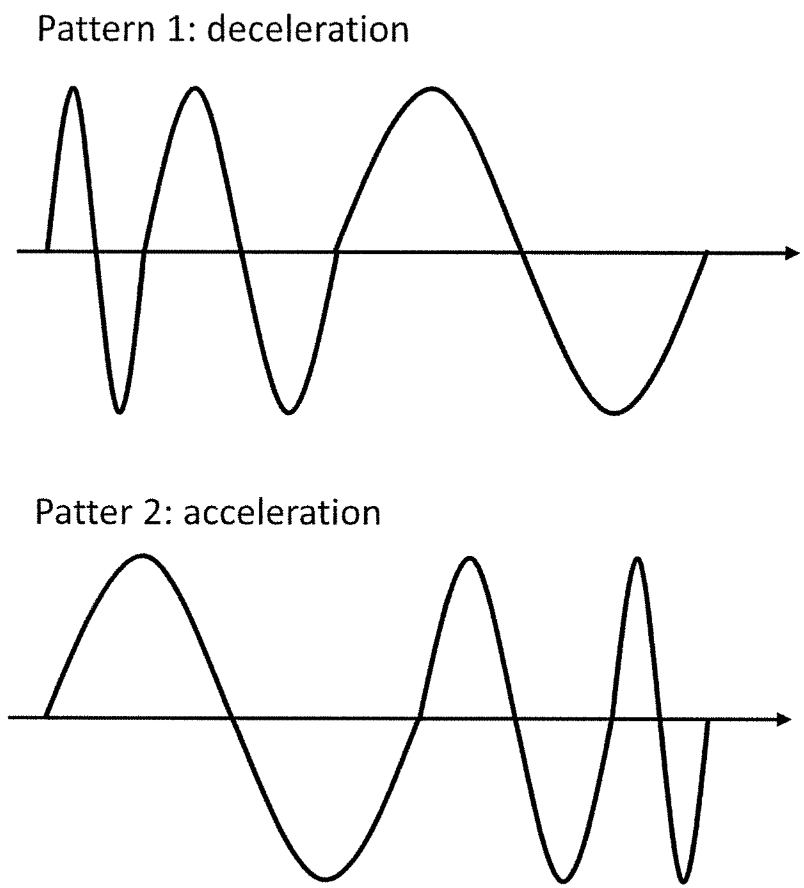
FIG. 71 is an explanatory view showing waveform control (accelerated sweep (a sense of click)).
Figure 72:
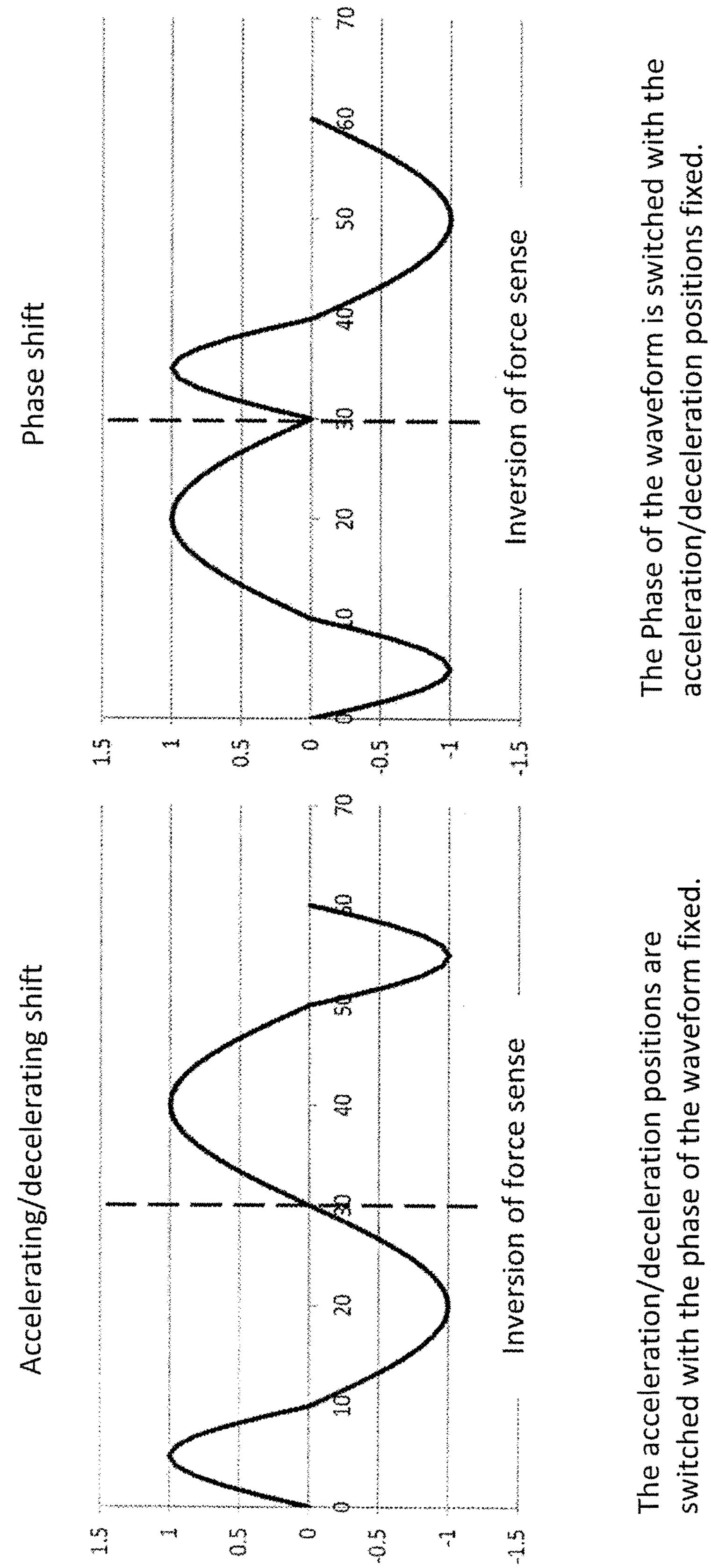
FIG. 72 is an explanatory view showing waveform control (acceleration/shift control).
Figure 73:
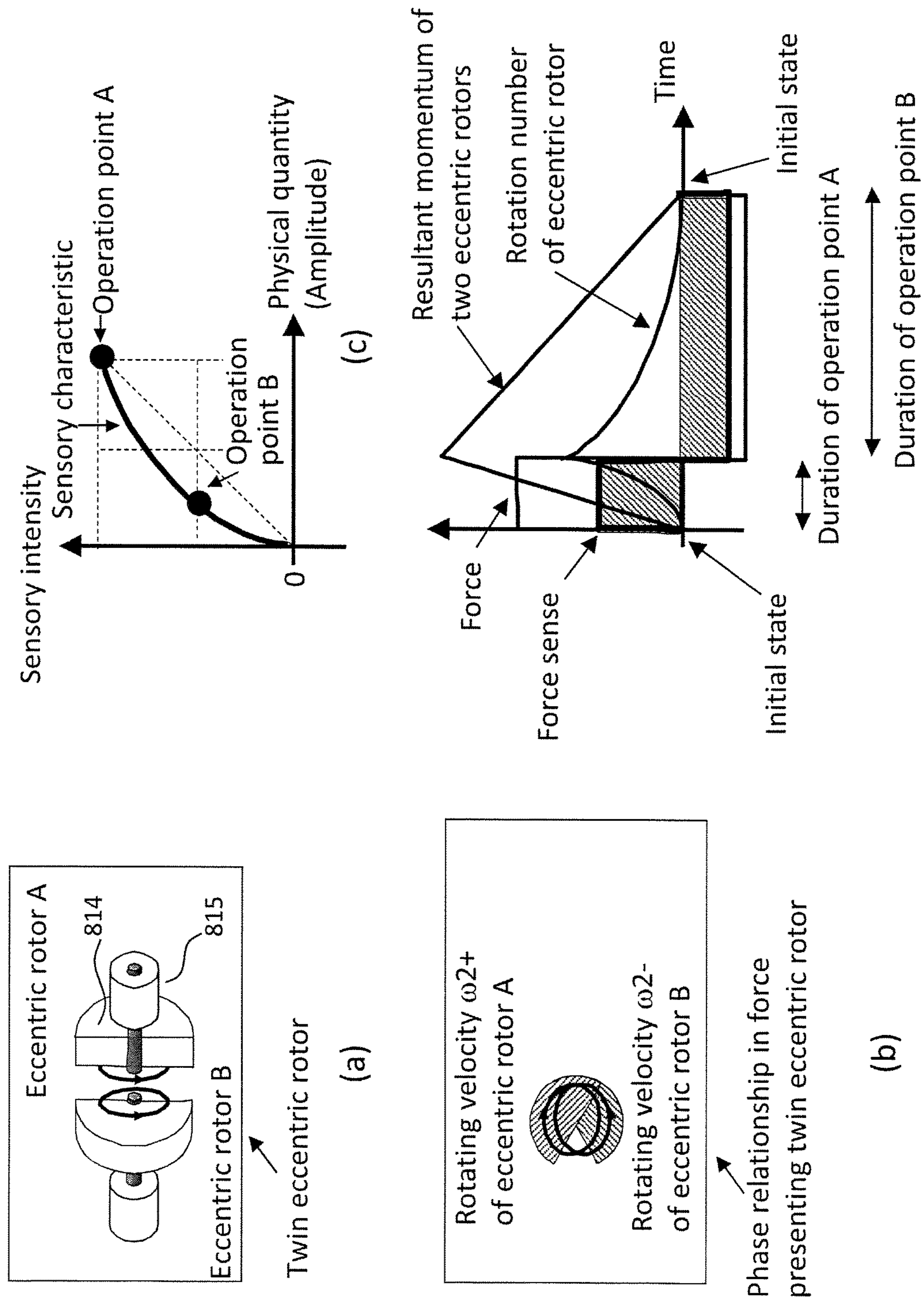
FIG. 73 is an example of an actuator (eccentric motor).
Figure 74:
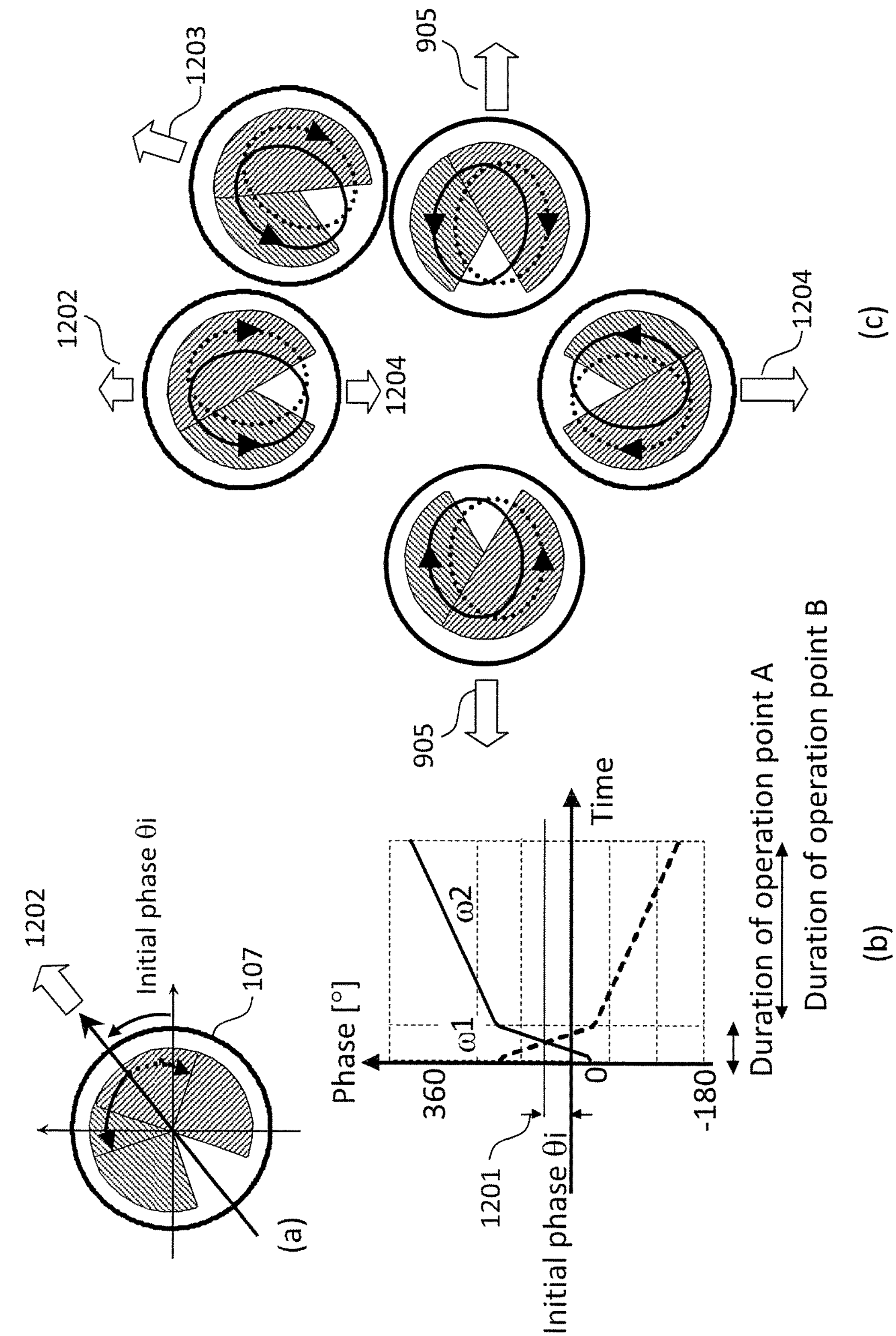
FIG. 74 is an example of an actuator (eccentric motor).
Figure 75:
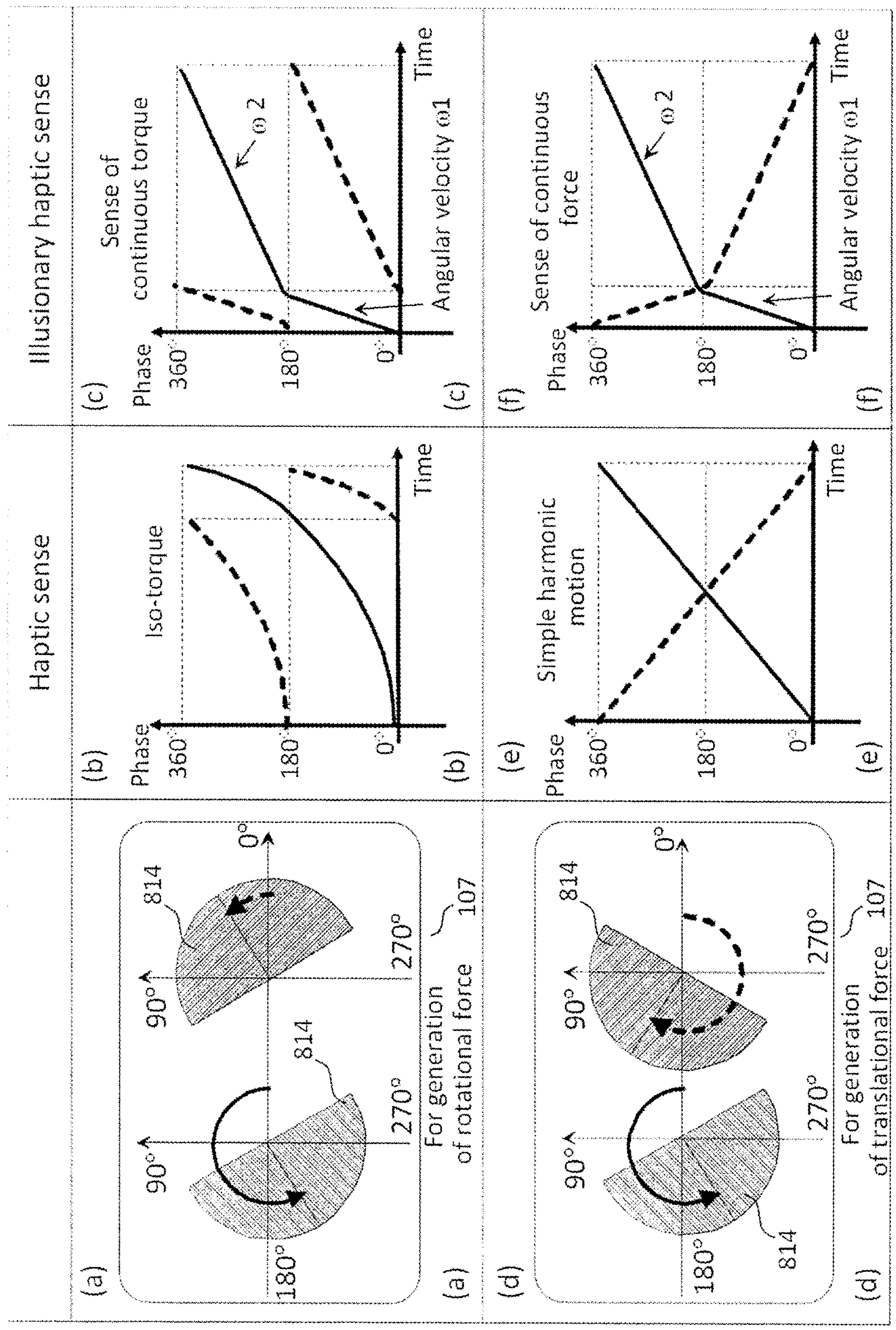
FIG. 75 is an example of an actuator (eccentric motor).
Figure 76:
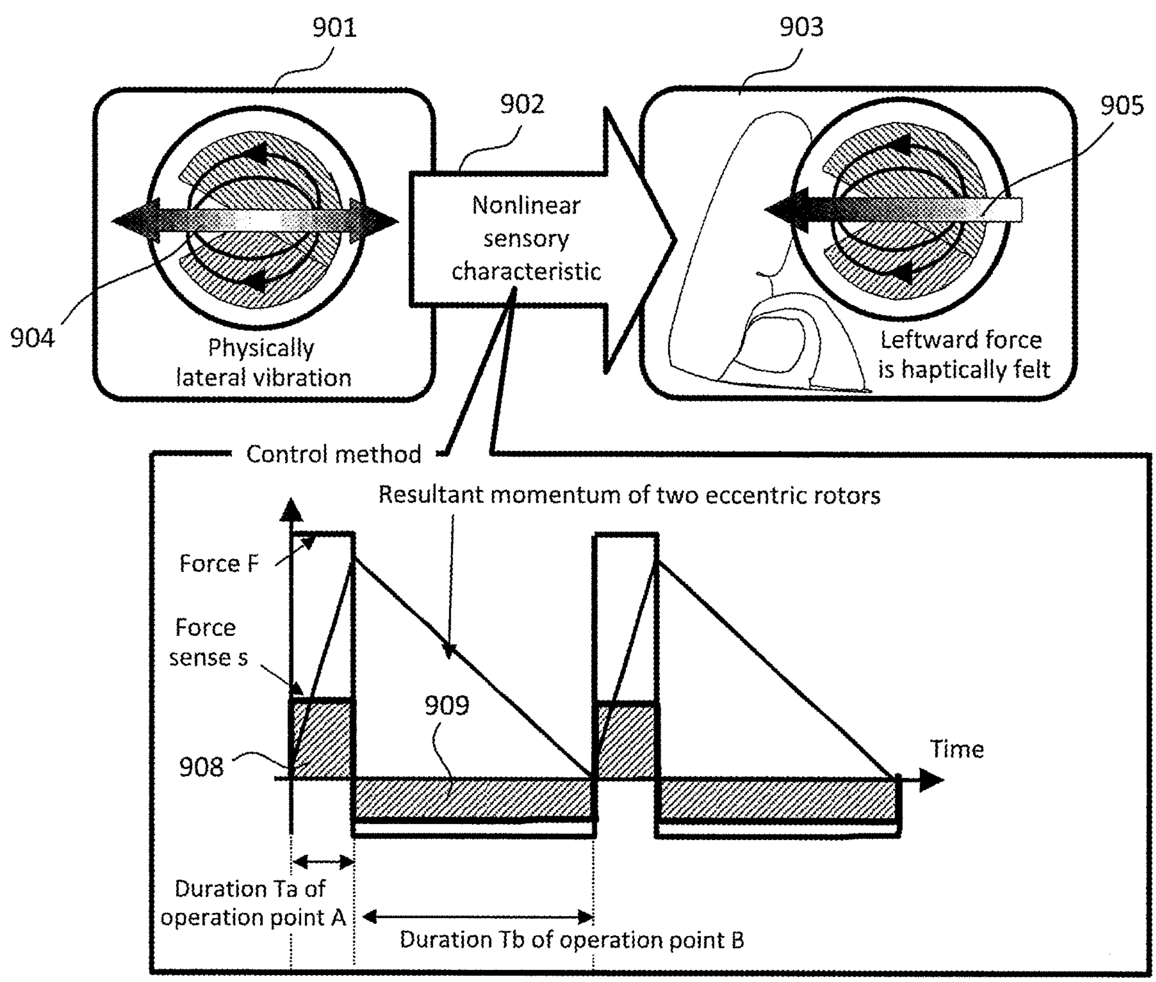
FIG. 76 is an explanatory view showing generation of an illusionary haptic sense.
Figure 77:
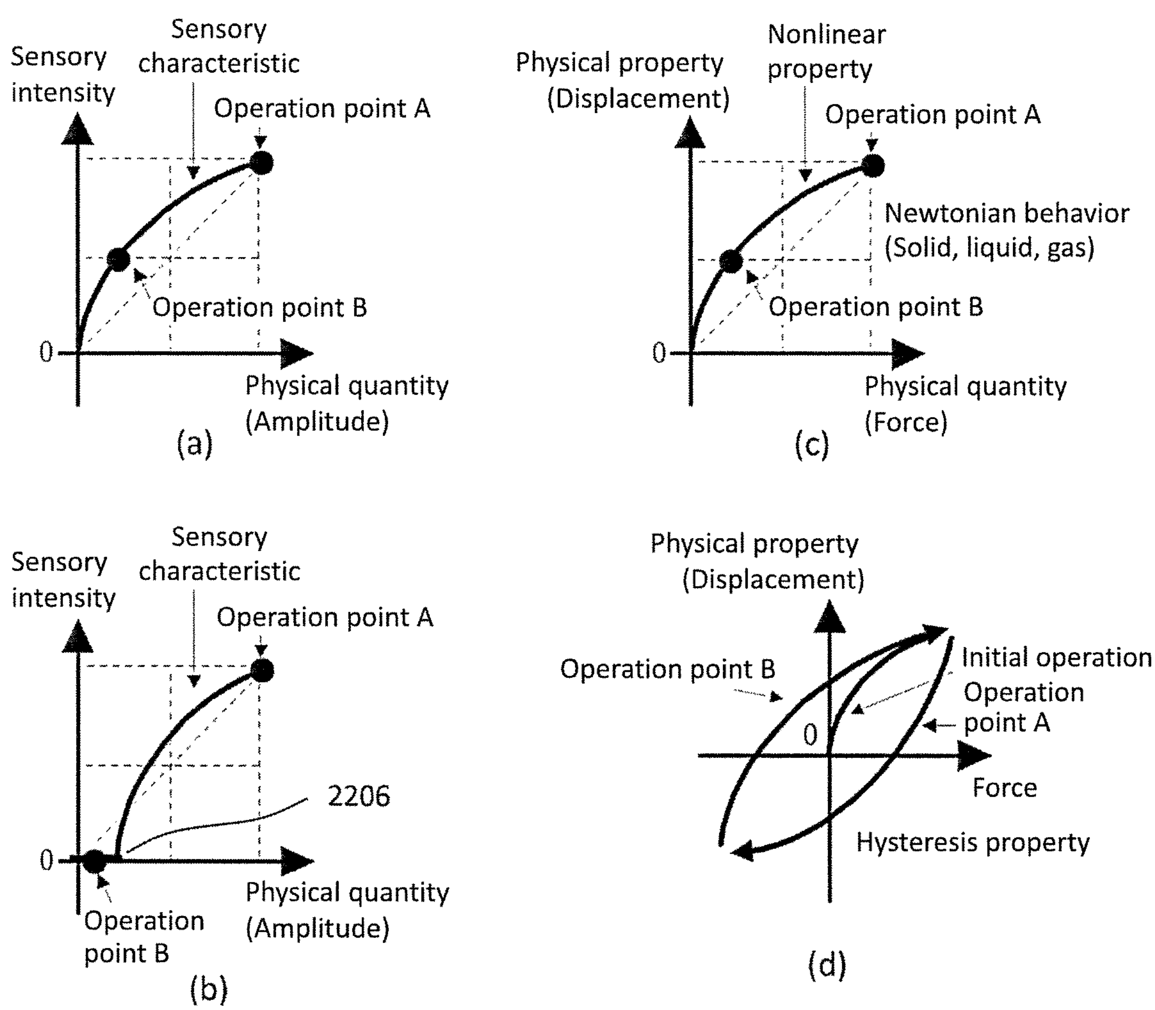
FIG. 77 is an explanatory view showing a sensory characteristic, a physical property, and a hysteresis.
Figure 78:
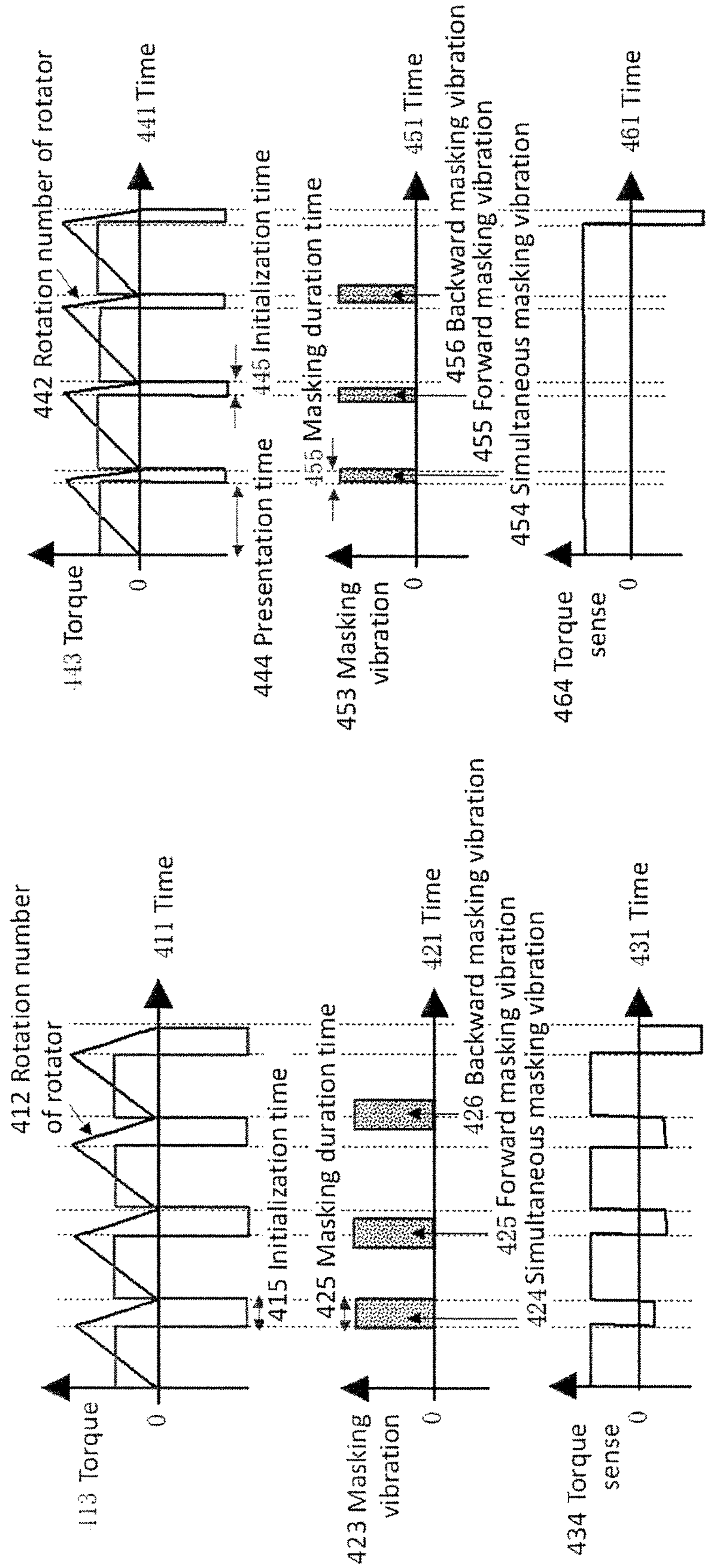
FIG. 78 is an explanatory view showing a sensory characteristic and a masking method.
Figure 79:
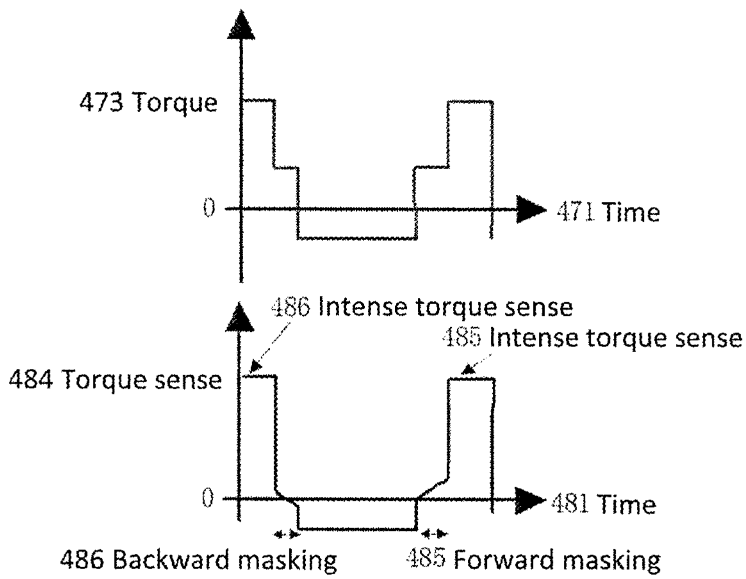
FIG. 79 is an explanatory view showing a sensory characteristic and a masking method.

In a method using a viscoelastic material, materials with different stress-deformation characteristics (2403, 2404) are attached but a material 1707 whose viscoelastic properties change depending on an applied voltage as shown in FIG. 235*a* may be used. By controlling the applied voltage to change the viscoelastic coefficient (FIG. 235*b*), the rate of transfer of the momentum that is generated by the eccentric rotators and is changed periodically to the palm is changed in synchronization with the rotational phases of the eccentric rotators. Then, because the momentum that is transferred to the palm or finger tip can be controlled by temporally changing the viscoelastic properties so that they can reach the characteristic values at operation points B and A as shown in FIG. 69*d*, the same effect as that achieved by increasing or decreasing the rotation velocity of the eccentric rotators can be achieved even when the eccentric rotators are being rotated at a constant rotation velocity as shown in FIG. 69*c* (constant-velocity rotation).

In addition, this method has the same effect as simulatively changing the physical properties of the skin, and has the effect of simulatively changing the sensory characteristic curve (FIG. 235*e*). Thus, it can be used in control to absorb differences in sensory characteristic among individuals or to enhance the efficiency in inducing a pseudo-haptic sensation. In addition, a viscoelastic material may be attached to the finger tip or body of the user as shown in FIG. 235*e* similarly to the case where a viscoelastic material is attached to a surface of the pseudo-haptic device as shown in FIG.

235*a*. Here, the quality and characteristics of the viscoelastic material are not limited as long as its stress-strain characteristics can be linearly controlled by changing the applied voltage. In addition, the control method is not limited to the control using an applied voltage as long as nonlinear control can be used.

When the rotation of a motor is accelerated and decelerated repeatedly as shown in FIG. 235*b*, large energy loss and heat generation occur. In this method, however, because the rotation velocity of the motor is constant (FIG. 235*c*) or the acceleration ratio f1/f2 has a value close to 1 and because the characteristics are changed by changing the applied voltage, the energy consumed in this method is smaller than the energy that is consumed when a motor is accelerated and decelerated.

FIG. 236 shows one example of control of the pseudo-haptic interface device 101.

In this device, a motor 1704 is controlled by a motor feedback (FB) characteristic controller that controls a feedback characteristic of the motor 1704 and a control signal generator that converts a pseudo-haptic sensation induction pattern into a motor control signal. In the present invention, it is essential to control the synchronization of phase patterns θ(t)=F(u, II, VI, R) of motor rotation, and it is necessary to synchronously control it temporally with high accuracy. As one example of a method for that, position control using a pulse train for controlling a servo motor is herein shown. When a step rotator is used for position control, it often loses synchronism or becomes uncontrollable easily because of sudden acceleration or deceleration. Thus, here, pulse position control using a servo motor is described. In the present invention, which uses a number of pseudo-haptic interface devices 101 that are synchronously controlled, when control is divided into control of a motor feedback (FB) control characteristic and motor control using a pulse position control method, consistency of motor control signals that is required when a different motor is used, quick generation of a pseudo-haptic sensation induction pattern, and scalability which enables the devices to easily adapt to an increase of the number of control motors to be synchronously controlled can be achieved. In addition, correction of personal differences can be made easily.

In a pseudo-haptic induction function generator 1701, a motor FB characteristic controller and a motor control signal generator are controlled by separate control signals. A pulse signal train gi(t)=gi(f(t)) for controlling the phase position of the motor is generated in the motor control signal generator to control the phase pattern θ(t) of the motor.

In this method, the rotational phase of the motor is feedback-controlled by the number of pulses. For example, the motor is rotated by 1.8 degrees by one pulse. The direction of rotation is selected from forward and reverse by a direction control signal. The use of this pulse control method enables any acceleration or deceleration pattern (rotation velocity, rotation acceleration) to be controlled at arbitrary phase timing with the phase relationship among two or more motors maintained.

FIGS. 237*a* to 237*e* shows an example of implementation of the pseudo-haptic interface device 101.

As shown in FIG. 237*a* and FIG. 237*b*, the pseudo-haptic interface device 101 is worn on a finger tip 533 with an adhesive tape 1301 or using a finger insertion portion 1303 of a housing 1302. The pseudo-haptic interface device 101 may be worn between fingers 533 (FIG. 237*c*) or may be held between fingers 533 (FIG. 237*d*) while in use. The housing 1302 may be made of a hard material which is not deformed easily, a material which is deformed easily, or a slimy material having viscoelasticity. Possible variations of these ways of wearing are shown in FIG. 237. By controlling the phases of two basic units of the pseudo-haptic device, it is possible to express a swelling sensation and a compressing or oppressing sensation in addition to a force sensation in leftward, rightward, upward and downward directions with a flexible adhesive tape or housing. An item used to mount the pseudo-haptic interface device 101 on the body of the user, such as the adhesive tape or the housing having a finger insertion portion, is referred to as "mounting portion." The mounting portion may be of any form as long as it can be mounted on an object or body. The mounting portion may be in the form of a sheet, belt or tights instead of an adhesive tape or housing having a finger insertion portion as described above. The pseudo-haptic interface device 101 can be mounted in a similar fashion on any part of the body such as finger tip, palm, arm and thigh.

The term "viscoelastic material" and "viscoelastic properties" as used herein referred to as a material having viscosity or elasticity.

FIG. 238 shows other examples of implementation of the pseudo-haptic interface device 101.

In FIG. 238*a*, a pseudo-haptic device 107 and an acceleration sensor 108 are located on opposite sides with respect to a finger 533 to reduce the influence of vibration on the acceleration sensor 108. Otherwise, the pseudo-haptic device 107 is detected as noise vibration by the acceleration sensor 108. In addition, noise contamination is further reduced by cancelling noise vibration detected by the acceleration sensor 108 based on a control signal from the pseudo-haptic device 107.

In FIG. 238*c* to FIG. 238*e*, a vibration absorbing material 1405 is interposed between the pseudo-haptic device 107 and the acceleration sensor 108 to reduce noise vibration contamination.

FIG. 238*d* shows a pseudo-haptic interface device 101 that enables the user to touch a real object and perceive a pseudo-haptic sensation simultaneously. A pseudo-haptic sensation is added to the feel of a real object. In a conventional data glove, a force sensation is presented by pulling wires attached to fingers to which a haptic sensation is presented. When haptic sensation is presented to fingers on a real object using a data glove, it is difficult to combine the feel of real and virtual objects since the fingers may be separated from the real object or grip may be inhibited. Such problems do not occur in the pseudo-haptic interface device 101. It can provide a combined sensation (mixed reality) which enables the user to feel a virtual touch even when the user holds a real object firmly.

In FIG. 238*e*, the feel of holding or contacting a real object is altered or converted into the feel of a virtual object 531 by adding a pseudo-haptic sensation based on the degree of contact with the real object and the grip pressure measured by a pressure sensor 110. In FIG. 238*f*, a shape sensor (such as a photosensor) for measuring a surface shape or changes in shape is used, instead of the pressure sensor shown in FIG. 238*e*, to measure the shape or surface shape of the held object that relates to its feel and measure the grip force, strain sear force or contact resulting from deformation. As a result, a touch sensation magnifier that emphasizes the measured stress, sear force or surface shape is realized. The user can not only visually recognize the minute surface shape on a display as if he or she is observing it under a microscope but also haptically recognize its shape. In addition, when a photosensor is used as a shape sensor, the user can feel the shape of an object only by laying a hand over it because it can measure the shape of an object in a contactless manner.

In addition, in the case of a variable touch button with a command on a touch panel that changes depending on the status of use or context, in particular, in the case of a variable touch button, such as those of cellular phones, which is hidden by a finger when it is pressed, the command of the variable touch button is hidden and made invisible by a finger. Similarly, when a variable touch button in a virtual space of VR content is pressed, the user becomes unaware of the meaning of the button he or she now wants to press because the menu or command changes depending on the context. Thus, when the meaning of the command on a pseudo-haptic button is displayed on a display 1406 on the pseudo-haptic interface device 101 as shown in FIG. 238*e*, the user can check it before pressing the button.

To enable the user to operate a virtual object 531 and the pressing information and pressing reaction force from a virtual button of a virtual controller in the same way as a real object without any discomfort, the time lag between the application of a pressing force and the presence of a pressing reaction force becomes a problem. For example, in the case of an arm-shaped grounding-type haptic interface, the position of the holding finger is measured based on the angle of the arm or the like, and stress to be presented is calculated after contact or interference with a digital model is determined. Thereafter, the rotation of the motor is controlled and motion or stress of the arm is presented. Thus, there may occur a response delay. In particular, when the user is playing a game, monitoring and controlling on the content side may lead to delays in response because the user operates buttons reflexively and quickly. In such a case, a CPU and a memory for monitoring the sensors (108, 109, 110) and controlling the pseudo-haptic device 107 and the viscoelastic material 1404 are also equipped in the pseudo-haptic interface device 101 to provide real-time control. This improves the response to pressing of virtual buttons and improves reality and operability.

The pseudo-haptic interface device 101 has a communication device 205 and communicates with other pseudo-haptic interface devices 101. For example, when pseudo-haptic interface devices 101 are mounted on all the fingers and thumb, it is possible to change the shape of a shape-changeable material in each pseudo-haptic interface device (1403 in FIG. 238*b*) in synchronization with a motion of the corresponding finger or thumb or to enable the user to perceive a change in shape or feel of a virtual controller or operate virtual buttons in real time. This improves reality and operability.

In FIG. 238*a*, in order to utilize a hysteresis characteristic of a sensation or muscle effectively, a myoelectric reaction is measured with a myoelectric sensor 110 and the pseudo-haptic induction function is corrected in a feedback manner so that the time and intensity of muscle contraction can increase. One factor that affects the induction of a pseudo-haptic sensation is the way of mounting the pseudo-haptic interface device 101 on a finger or palm (the way of pinching or pinching strength) or the user's manner of putting power into the arm that receives a force from the pseudo-haptic interface device 101. Different people have different sensitivities to a pseudo-haptic sensation. Some people feel a pseudo-haptic sensation with high sensitivity when they make a loose fist and some feels a pseudo-haptic sensation with high sensitivity when they make a tight fist. Similarly, the sensitivity changes depending on the tightness with which the pseudo-haptic interface device 101 is worn. To absorb the differences between individuals, the pressure sensor 109 or the myoelectric sensor 110 monitors the user's way of making a fist to measure the individual difference and correct the pseudo-haptic induction function in real time. People get used to physical simulations in content and learn the right way of making a fist. This correction has the effect of promoting it.

While the pseudo-haptic interface device 101 has a large thickness so that the component structure can be seen in FIG. 72*a* to FIG. 72*e*, each component may be of a sheet-like flat configuration.

FIG. 239*a* shows a device that emphasizes a pseudo-haptic sensation 905 induced by a pseudo-haptic device by changing the shape 3001 of a pseudo-haptic interface device in synchronization with a pseudo-haptic force with shape changing motors 3002 in addition to causing the pseudo-haptic device to induce a pseudo-haptic sensation.

For example, when this is applied to a fishing game as shown in FIG. 239*b*, the tensile force sensation from the fishing line induced by the pseudo-haptic sensation 905 is enhanced by bending the shape 3001 of the interface backward in synchronization with the fish pulling the fishing rod. At this time, the user cannot experience such a real tug by simply changing the shape of the interface without a pseudo-haptic sensation. The addition of a change in shape of the interface to the pseudo-haptic sensation improves reality. In addition, when basic units of a pseudo-haptic device are spatially arranged as shown in FIG. 239*c*, a deformation effect can be created without the shape changing motors 3002.

Instead of the shape changing motors 3002, any mechanism that can change a shape, such as a drive unit using a shape-memory alloy or piezoelectric element, may be used to create such a change in shape.

FIG. 240 shows an alternative device for the pseudo-haptic device 107.

Instead of eccentric weights 814 of the eccentric rotators and the eccentric motor 815 for driving them shown in FIG. 240*a*, a weight 2302 and extendable members 2303 are used in FIG. 240*b* to FIG. 240*e*. For example, FIG. 240*b* shows a plan view, a front view and a side view in a case where the weight 2302 is supported by eight extendable members 2303, and FIG. 240*d* show a plan view, a front view and a side view in a case where the weight 2302 is supported by four extendable members 2303. In each drawing, the weight can be moved in an arbitrary direction by extending and contracting paired extendable members 2303. As a result, translational or rotational displacement or vibration can be generated. Any structure having an acceleration-deceleration mechanism that can generate and control a translational movement of the center of gravity or a rotation torque can be used as an alternative.

FIGS. 242 to 251 indicate various configurations of a haptic sense display or the touch panel. The haptic sense display or the touch panel is provided with an actuator which is provided on the base material and a sensor that detects the touch panel, and displacement, pressure, acceleration, and the like of the touch panel, and measures a position of displacement, pressure, acceleration, and the like, rotation, and tensor.

FIGS. 242 and 243 indicate various configurations of a table form haptic sense display or the touch panel.

Figure 48:
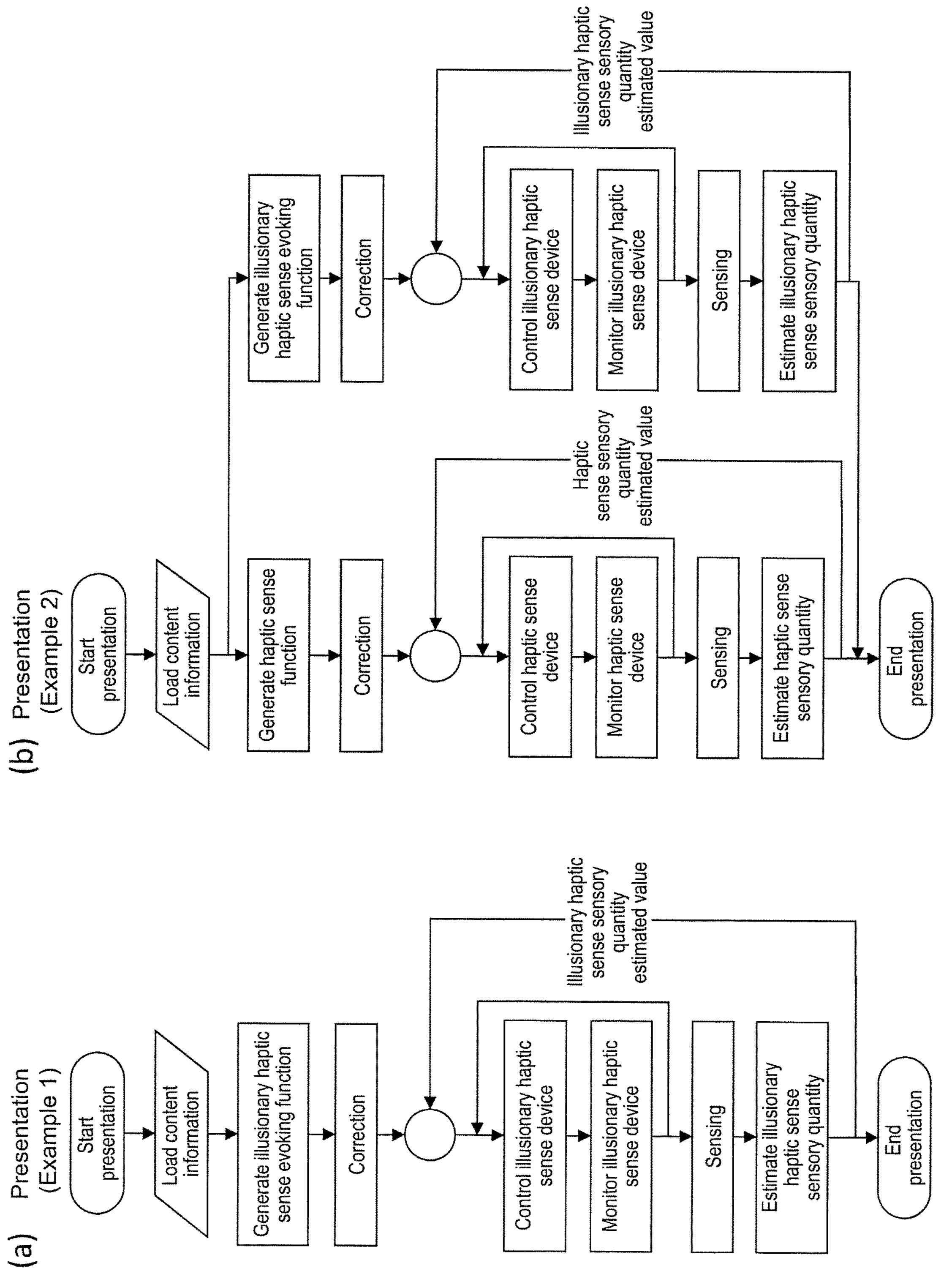
FIG. 48 is an explanatory monitoring flow and an explanatory feedback flow of sensory quantity.

FIG. 241 indicates a base unit of the haptic sense actuator, and is configured from the touch panel, the sensor, and the actuator. In the touch panel and the sensor, the position, speed, acceleration, form, displacement, deformation, amplitude, rotation, vibration, force, torque, pressure, humidity, temperature, viscosity, elasticity, and the like are measured as a scalar, vector, or tensor. The actuator presents the position, speed, acceleration, form, displacement, deformation, amplitude, rotation, vibration, force, torque, pressure, humidity, temperature, viscosity, elasticity, and the like as a scalar, vector, or tensor. Here, perception of haptic sense information using the fingertip is described, but is not particularly limited to the fingertip, and it is assumed that the whole body of the operator is throughout the body. FIG. 48 indicates an example in which the base unit of the haptic sense actuator is used in a table form and for a table. Other than the operation by the fingertip, it is possible to operate by the palm.

In FIG. 243, a virtual button is provided for operating by an operator on a wall or the like in a table form. It is possible to execute operation by a body part such as an elbow and an operation by an object such as the virtual button via the body part.

Figure 49:
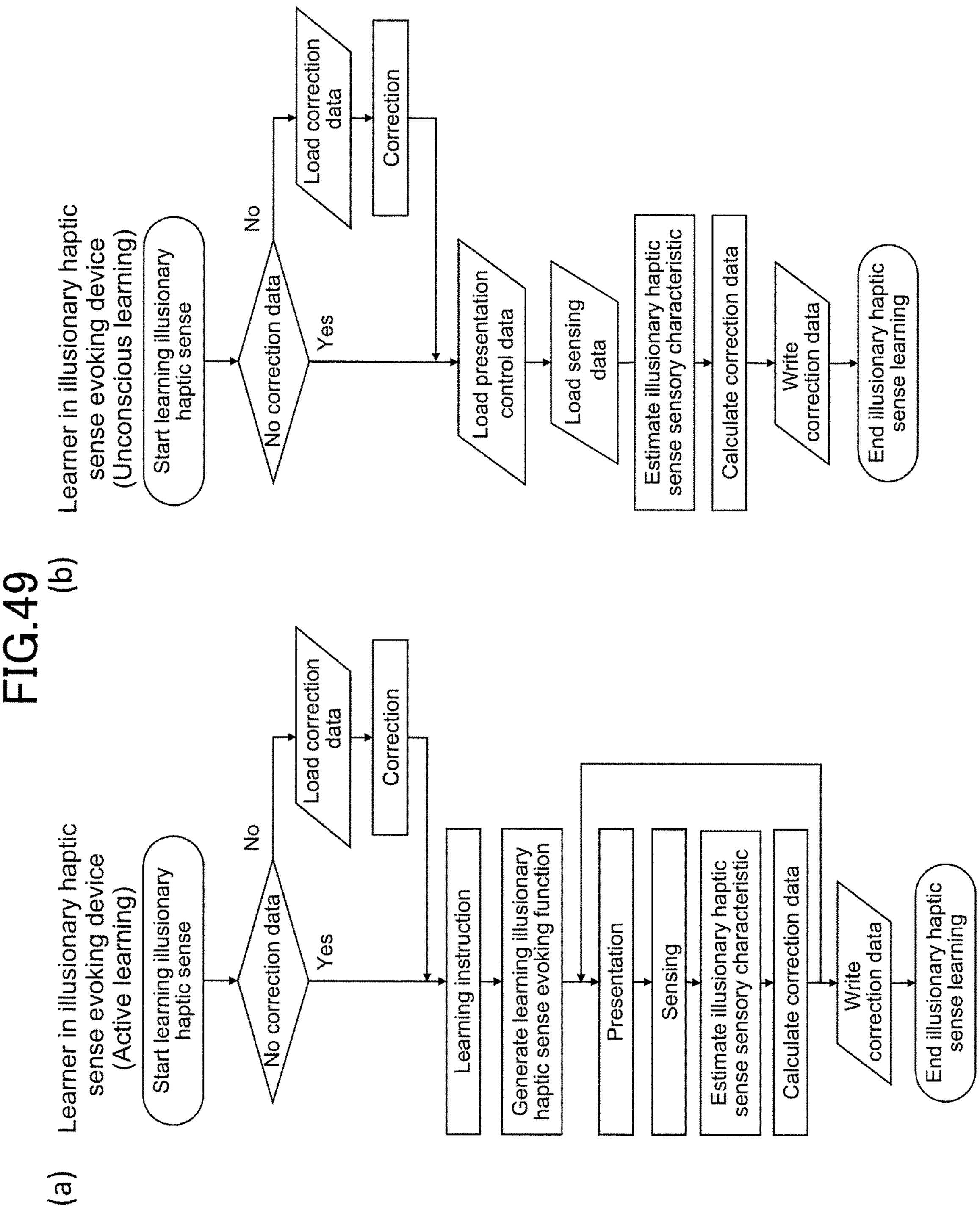
FIG. 49 is an explanatory learning flow.
Figure 51:
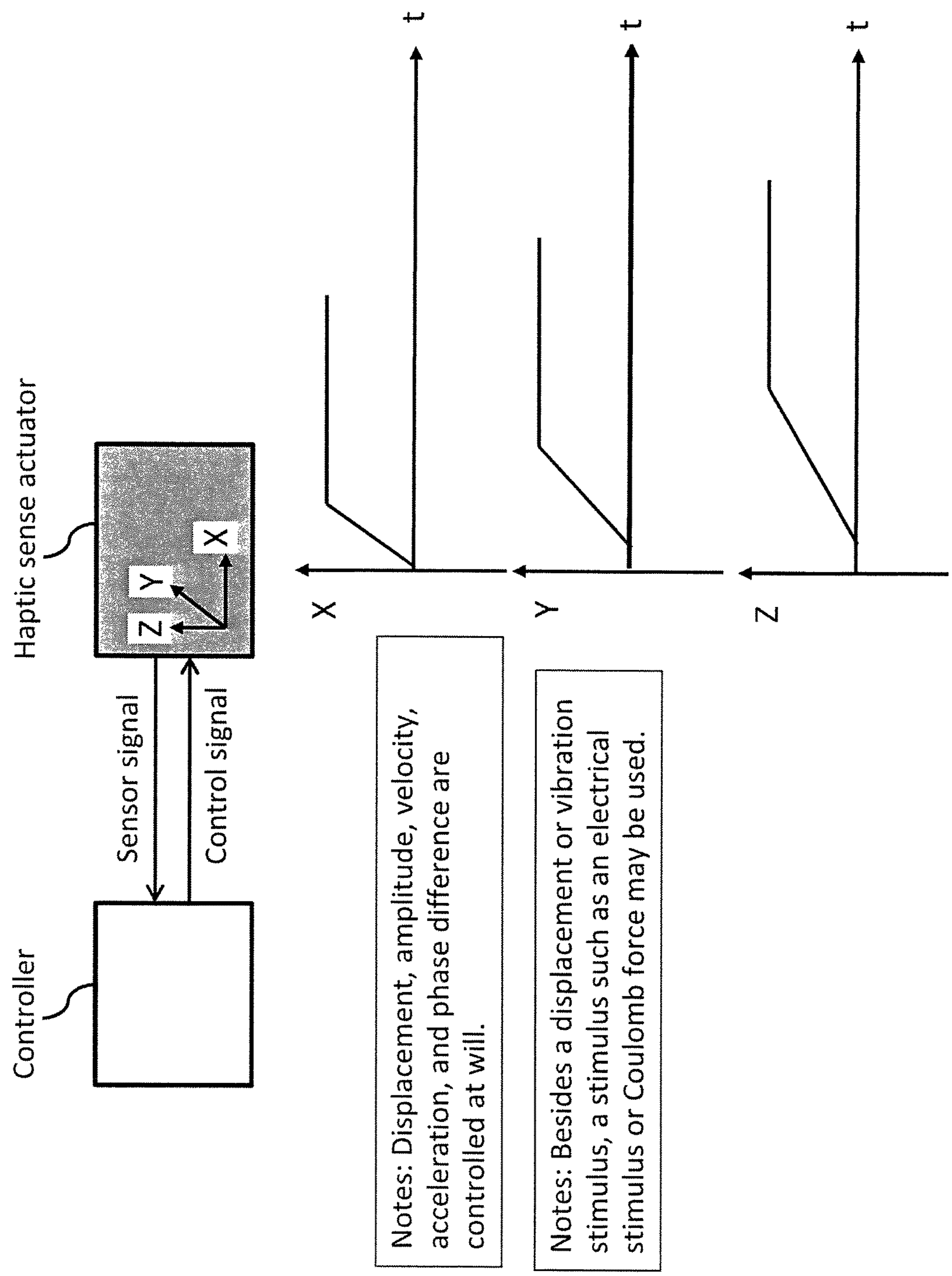
FIG. 51 is an explanatory view showing displacement control of a haptic sense actuator.
Figure 52:
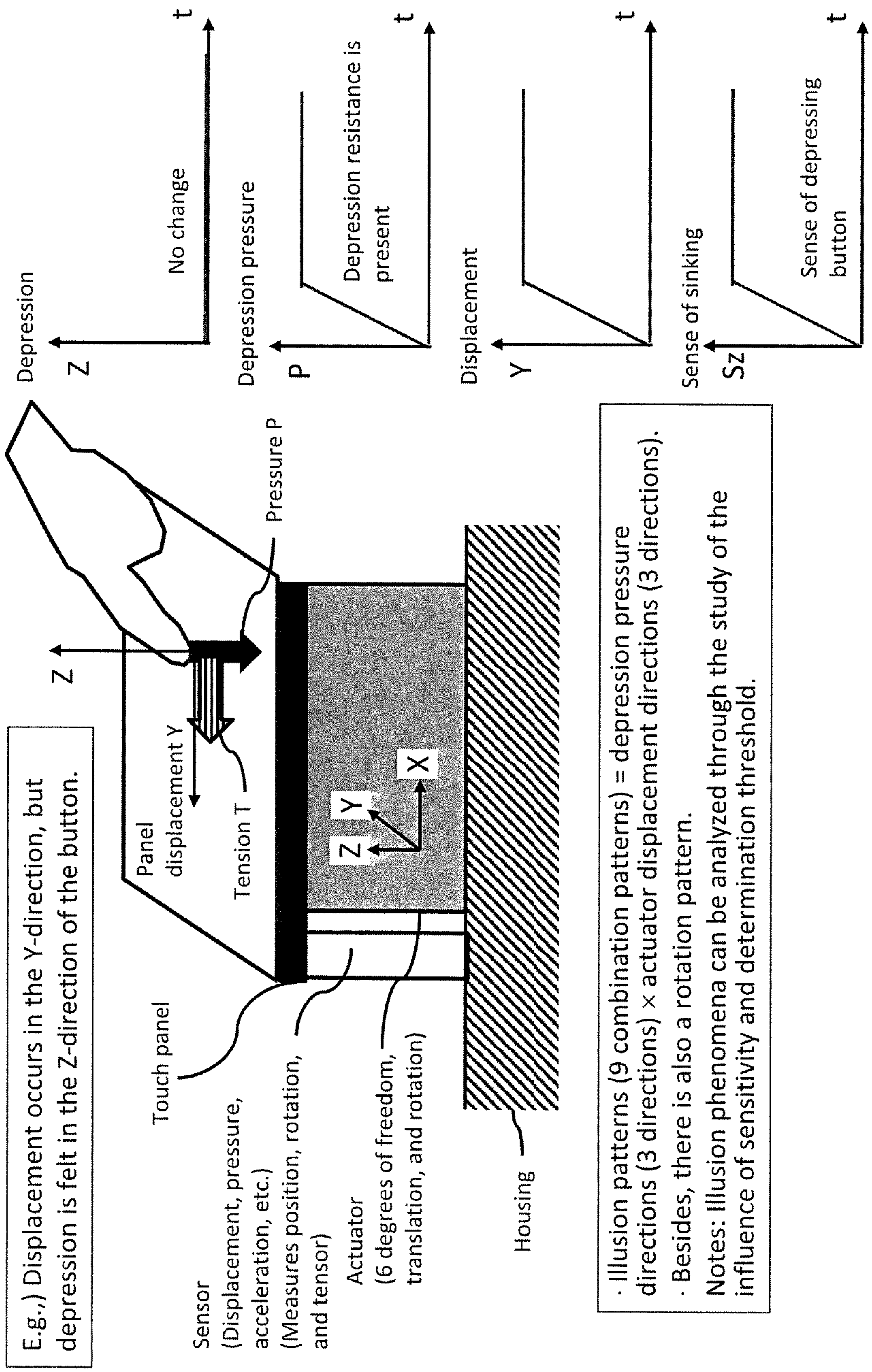
FIG. 52 is an explanatory view showing points of illusion phenomena.
Figure 53:
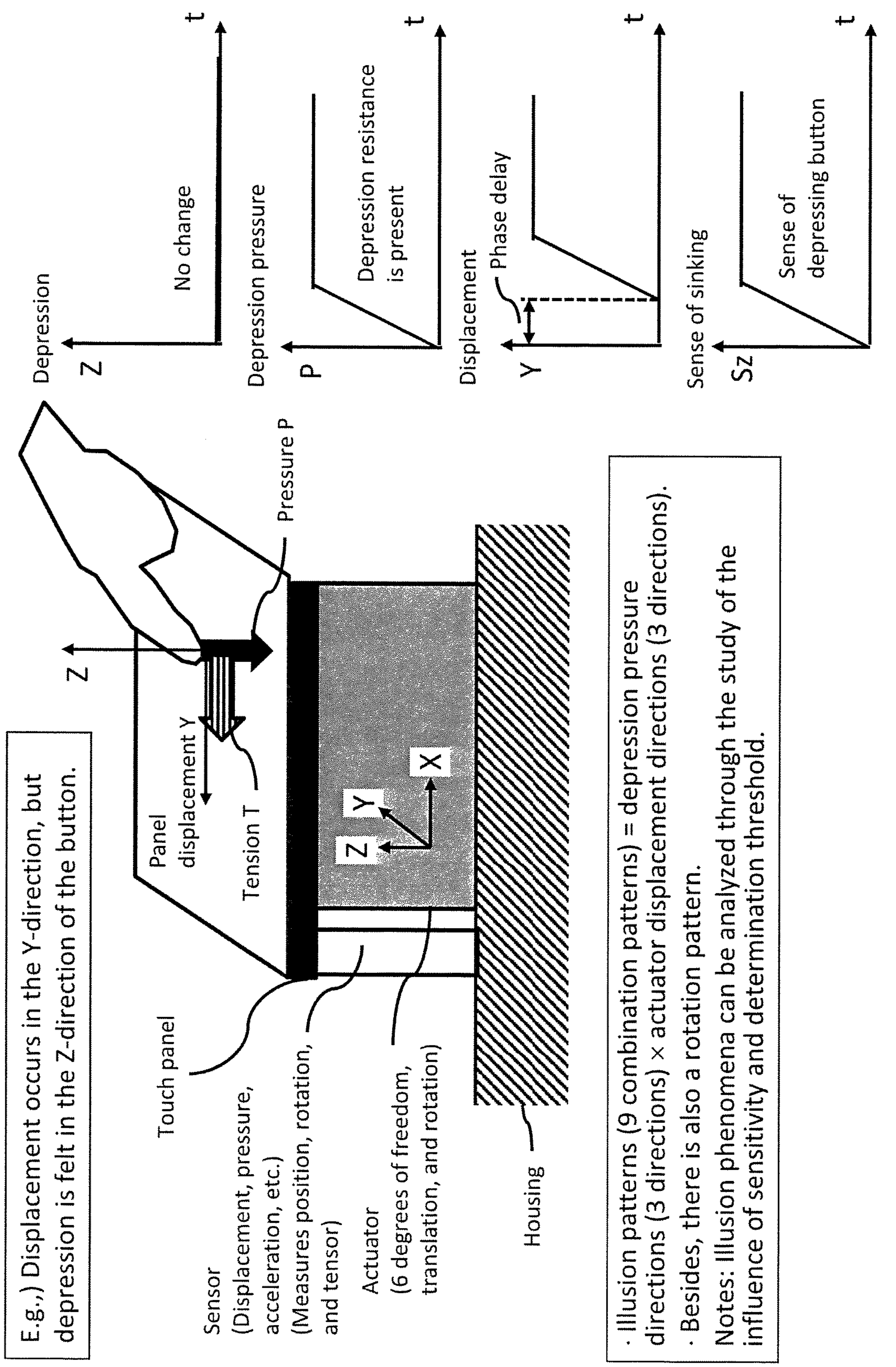
FIG. 53 is an explanatory view showing points of illusion phenomena (phase delay).
Figure 54:
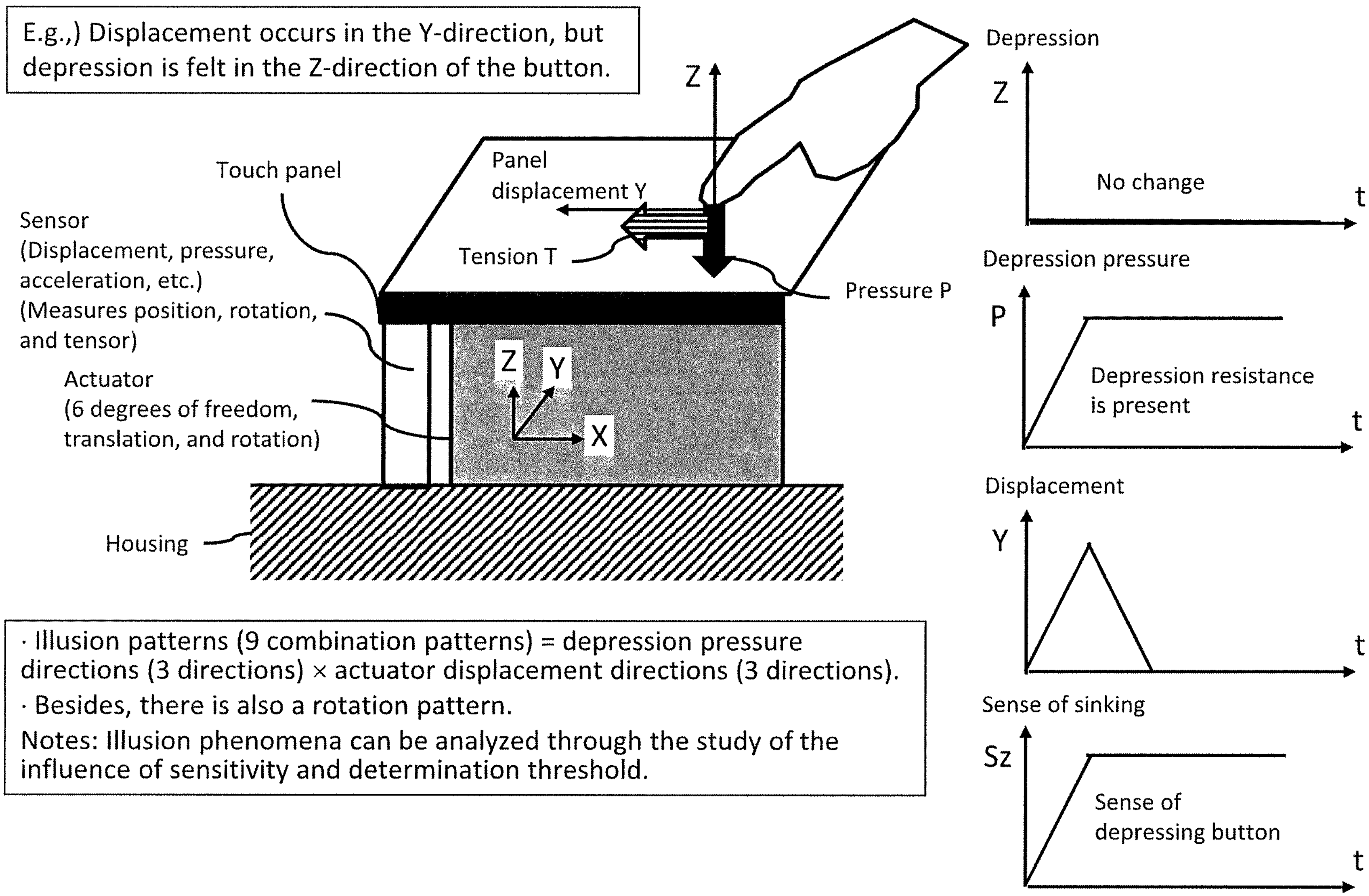
FIG. 54 is an explanatory view showing points of illusion phenomena.
Figure 55:
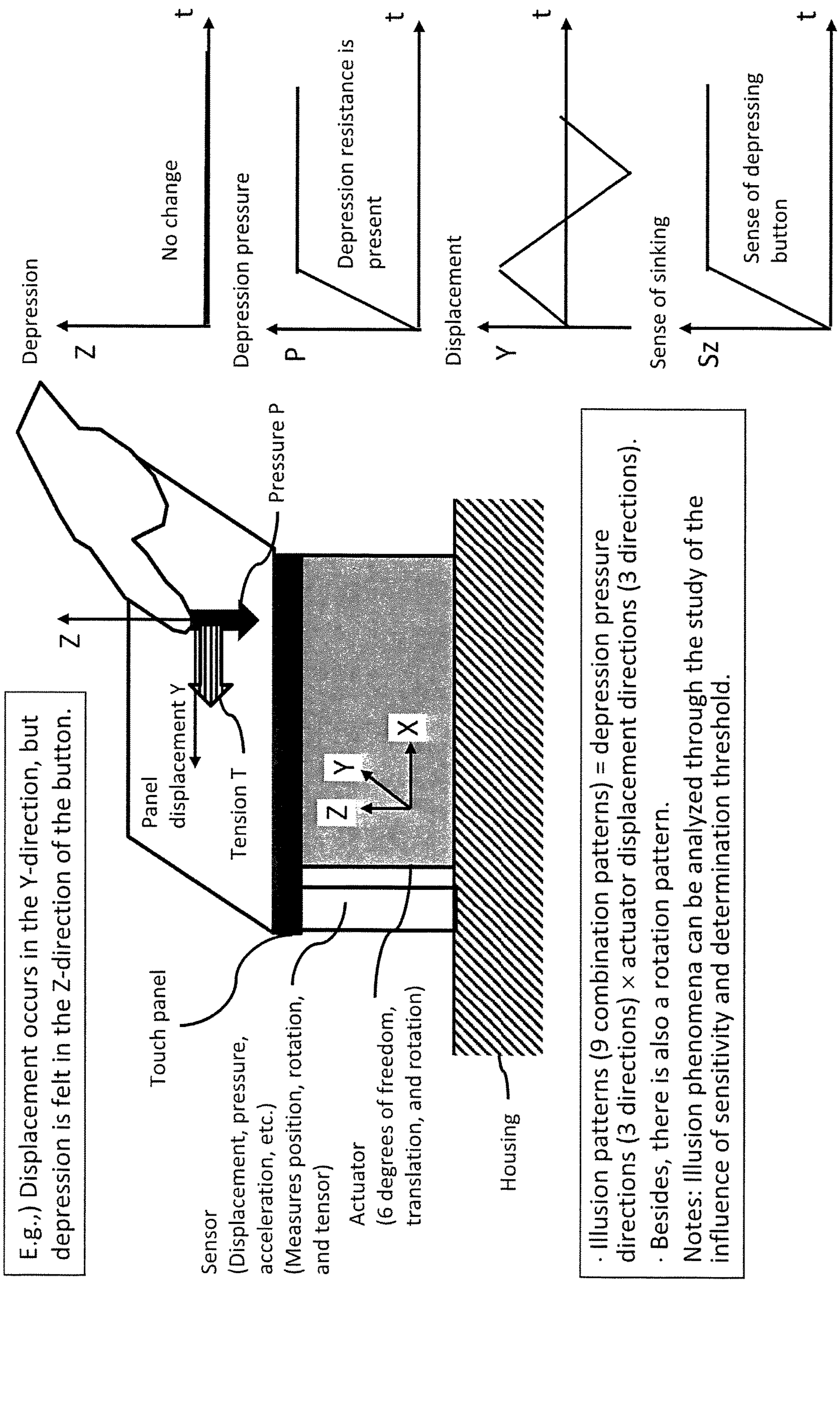
FIG. 55 is an explanatory view showing points of illusion phenomena.
Figure 56:
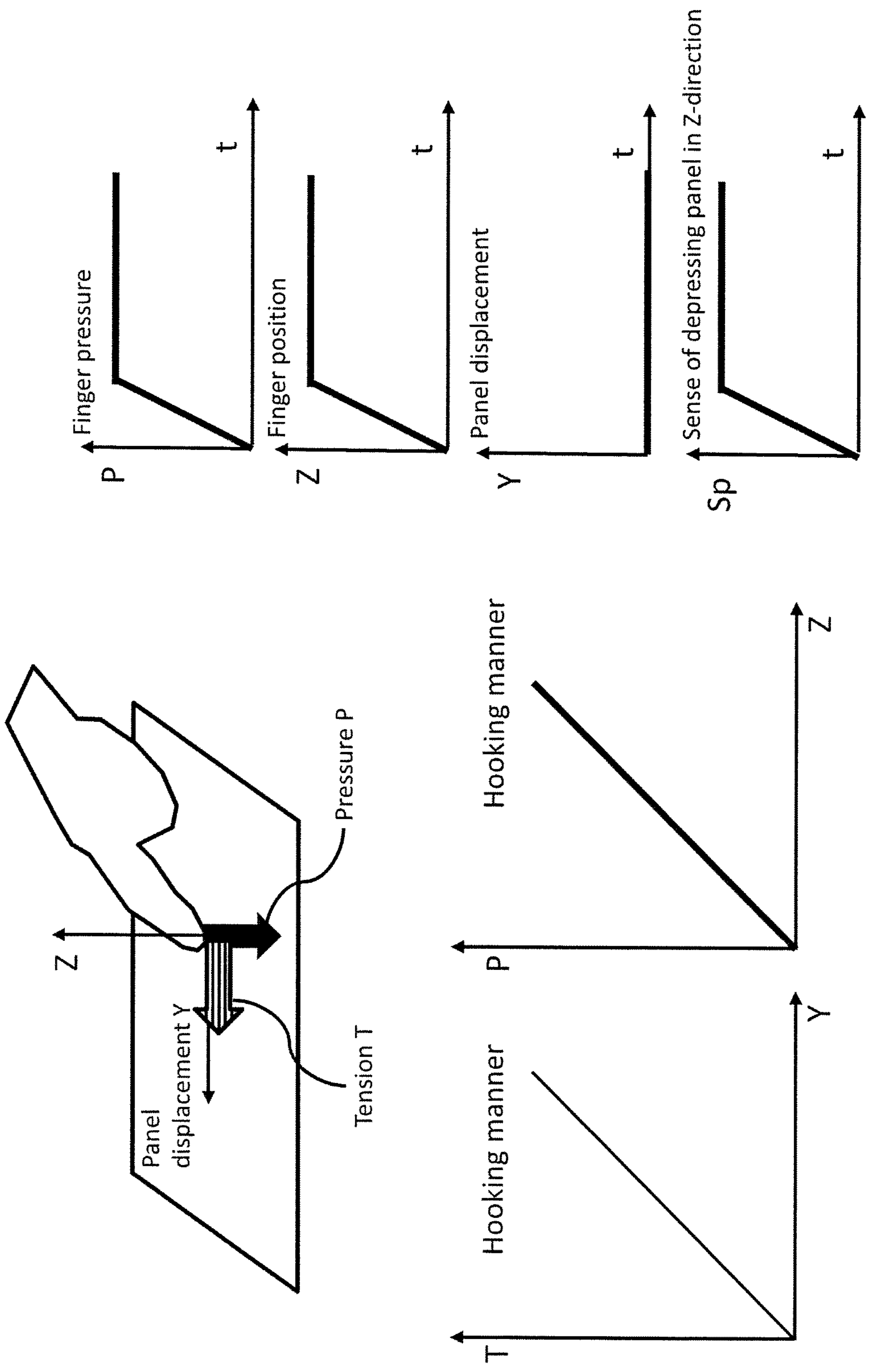
FIG. 56 is an explanatory view showing a way to depress panel with a finger (stepwise depression (common)).
Figure 57:
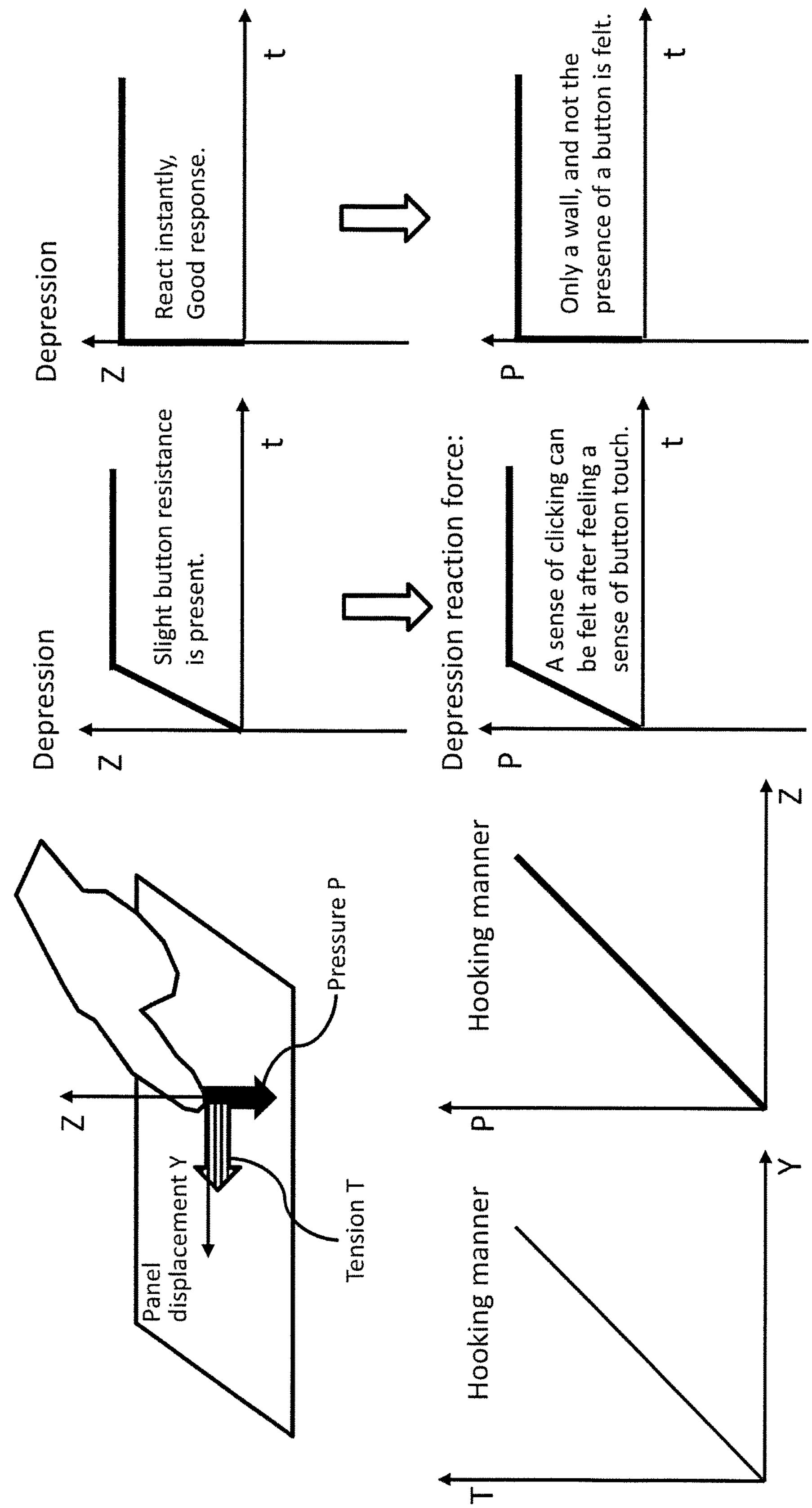
FIG. 57 is an explanatory view showing a way to depress panel with a finger (stepwise depression).

In FIGS. 244 to 247 in a steering wheel form, an actuator such as a steering wheel of a vehicle and the virtual button close to the steering wheel for operation by the operator are provided. Examples in which the base unit of the haptic sense actuator is used in a steering wheel form and for a steering wheel are indicated. In FIG. 49, it is possible to execute operation by the body part such as a finger or palm and operation by the object such as the virtual button via the body part. In FIG. 50, a liquid crystal display is provided on the steering wheel. A posture of the liquid crystal display even if the steering wheel turns during operation is maintained in a state without change. It is possible to execute operation by the body part such as the finger or palm and operation by the object such as the virtual button via the body part. At this time, in visual information presentation of the liquid crystal display and the like, the posture of the liquid crystal display is maintained to be fixed even if the steering wheel is rotated such that it is possible to secure a perspective and field of view.

In FIG. 246, it is possible to execute operation by the body part such as the finger or palm and operation by the object such as the virtual button via the body part. The haptic sense actuator is disposed on the entirety of the steering wheel, and even if the steering wheel is rotated it is possible to use the haptic sense actuator at a position such as the finger, palm, and an arm.

In FIG. 247, it is possible to execute operation by the body part such as the finger or palm and operation by the object such as the virtual button via the body part. The entire steering wheel is a haptic sense actuator, and even if the steering wheel is rotated it is possible to use the haptic sense actuator at a position such as the finger, palm, and arm.

In FIG. 248, it is possible to execute operation by the body part such as the finger or the palm and operation by the object such as the virtual button via the body part. Thereby, even if there is no door handle, it is possible to feel or operate the door handle. A curved surface liquid crystal panel and a haptic panel are provided on a windowpane. It is possible to perform an operation like this in all of a button, a slider, a dial, a switch, an operation panel, and the like of the object.

In FIG. 249, the haptic sense actuator is mounted on the finger, in FIG. 280, the actuator is mounted on the wrist, and in FIG. 252, the actuator is mounted, and the virtual button is pressed and operated by the finger. FIG. 249 indicates an example in which the base unit of the haptic sense actuator is used in a ring form and for a ring. It is possible to execute operation by the body part such as the finger or palm and operation by the object such as the virtual button via the body part. Thereby, even if there is no door handle, it is possible to feel or operate the door handle. It is possible to perform an operation like this in all of a button, a slider, a dial, a switch, an operation panel, and the like of the object.

FIG. 250 indicates an example in which the base unit of the haptic sense actuator is used in a list form and for a list. It is possible to execute operation by the body part such as the finger or palm and operation by the object such as the virtual button via the body part. Thereby, even if there is no door handle, it is possible to feel or operate the door handle. It is possible to perform an operation like this in all of a button, a slider, a dial, a switch, an operation panel, and the like of the object.

FIG. 251 indicates an example in which the base unit of the haptic sense actuator is used in an arm ring form and for an arm ring. It is possible to execute operation by the body part such as the finger or palm and operation by the object such as the virtual button via the body part. Thereby, even if there is no door handle, it is possible to feel or operate the door handle. It is possible to perform an operation like this in all of a button, a slider, a dial, a switch, an operation panel, and the like of the object.

FIG. 252 indicates an example in which the base unit of the haptic sense actuator is used in the whole body. It is possible to execute operation by the body part such as the finger or palm and operation by the object such as the virtual button via the body part. Thereby, even if there is no door handle, it is possible to feel or operate the door handle. It is possible to perform an operation like this in all of a button, a slider, a dial, a switch, an operation panel, and the like of the object.

Figure 58:
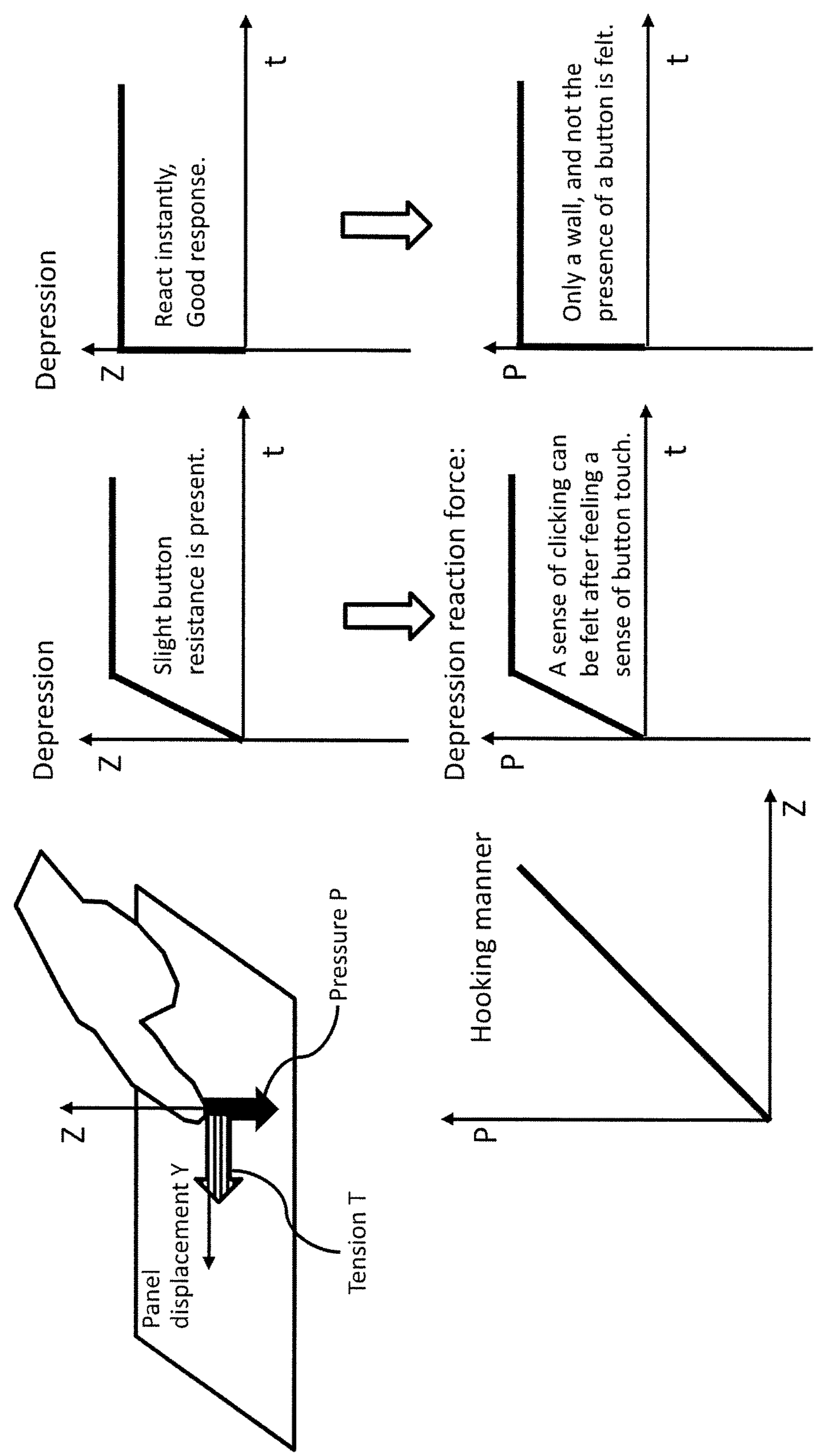
FIG. 58 is an explanatory view showing a way to depress panel with a finger (stepwise depression).

FIGS. 253 and 254 indicate an outline of a method of a wiring that connects the controller and the tactile force sense actuator. FIG. 58 indicates a case where the haptic sense actuator is connected in a parallel arrangement, and FIG. 254 indicates a case where the haptic sense actuator is connected in a cross arrangement.

FIG. 255 indicates a schematic view of a system in which information is exchanged by communication of a haptic display panel and a computer (PC). The touch panel is equipped with an actuator array, or is integrally provided.

The present system presents haptic sense information such that the actual object is operated by an operator by applying sensory characteristics and sensory illusion of the operator. Specifically, the system is controlled based on stimulation that is detected by a sensor and presents haptic sense information by controlling stimulation utilizing the fact that the sensory characteristics that indicate a relationship between an amount of stimulation and a sensory amount applied to the human body are non-linear and sensory illusions. The sensory characteristics include the amount of stimulation of at least one of the amount of stimulation that is applied to the operator and the amount of stimulation brought about by the operation of the operator and the sensory amount that is presented to the operator, and the sensory amount is a sensory amount that is unable to be physically present.

Here, the system presents stimulation from the object or to the object, and stimulation applied to the operator is controlled to match the operation of the operator. Components of a minimum value are configured from the tactile force sense actuator and the controller, and are able to be used as the component. The components are accumulated to create an actuator array, and a video touch panel that has a haptic sense information presentation function is thus configured. The haptic sense information presentation system is configured by a system such as a latch display using a module and the like other than the components. In this manner, it is possible to configure the haptic sense information presentation system of various forms or shapes such as a flat surface, a curved surface, and a solid body by accumulating as the actuator array.

Position, speed, acceleration, form, displacement, deformation, amplitude, rotation, vibration, force, torque, pressure, humidity, temperature, viscosity, and elasticity are measured by the sensor that is attached to the haptic sense actuator, and the haptic sense actuator is controlled by the information being sent to the controller, a control signal for controlling the haptic sense actuator being calculated and sent to the haptic sense actuator. The haptic sense actuator has a sensor function and a presentation function of a panel type and a display type, in the controller, measures displacement, momentum, vibration amplitude, displacement stimulation, vibration stimulation, time change of stimulation intensity, and the like accompanying movement of the body such as of a finger or a palm, controls the position, speed, acceleration, form, displacement, deformation, amplitude, rotation, vibration, force, torque, pressure, humidity, temperature, viscosity, elasticity, and the like of the tactile force sense actuator to match movement, pressure, and the like of the body such as the finger or the palm that is monitored by the sensor based on a control algorithm, and presents haptic sense information such as a pressure sensation, a tactile sensation, and a sense of force to a person or the like.

In the control signal, force information (t), amplitude information (t), and the like are expressed by driving voltage and the like, and as long as the actuator is a motor, a piezo actuator, an artificial muscle, a memory alloy, a molecular motor, an electrostatic actuator, a coil, a magnetic force actuator, a static electricity actuator, or another actuator that generates displacement and vibration, device operating principles are not important.

As a result, regardless of the panel and the display that are configured as the flat surface, the curved surface, or the three-dimensional shape being devices so as to be fixed or minutely positioned and minutely vibrate in a casing or the like, an insertion feeling, a pushing feeling, a sinking feeling, a depth feeling, a pushed back feeling, a floating feeling, a convergence feeling of vibration and amplitude, a reverberation feeling of vibration and amplitude, a sense of orientation of displacement and movement, a sticking feeling, a hard feeling, a soft feeling, and a three-dimensional feel are felt. Regardless of if such a sense is not reproduced and presented physically, such a sense and bodily reaction and reflection are experienced sensuously. In addition, regardless of if the information terminal and the like is a flat surface or a flat panel, it is possible to really obtain an operation feel of the object such as a button, a slider, a dial, a switch, and an operation panel.

In addition to the description above, it is possible to use in stationery, a notebook, a pen, a home appliance, a billboard, signage, a kiosk terminal, a wall, a table, a chair, a massager, a vehicle, a robot, a wheelchair, tableware, a shaker, a simulator (surgery, operation, massage, sports, walking, musical instrument, for crafts, for painting, for art), and the like.

FIG. 256 shows various configurations of the integrated haptic display panel system.

Plural units of the actuators are attached to the touch panel. The actuators may be arranged in an array. The actuators may be integrated in the touch panel. The actuators comprises a units composed of a plurality of modules, integrated array type, sphere or solid type arranged on the surface, solid type packed in a sphere or solid. As the actuator is arranged as an array, a tactile force information presenting system can comprise the system of various shaped or size such as plane, curved plane, or solid.

In FIG. 257, the actuators that are provided on the haptic display panel are arranged in the array. These units are attached to each other via a link mechanism, a vibration buffer, or a buffering mechanism. The vibration buffer or the buffering mechanism may not be interposed between the units. The plurality of module provide arrangement method such as plain, curved surface, stereo, the module connected by link mechanism, vibration damping material, or damping mechanism, and independently.

FIG. 259 to FIG. 262 each show schematic views of a basic module of a tactile force device. The basic module of the haptic device digitizes and presents digitalized expression of the sensation of the button, a sensation of friction, the haptic sensation obtained through a sensation of an irregularity, a sensation of pain, a sensation of existence of the virtual object, and a sensation of expression.

The haptic device presents the haptic and the illusory haptic that is a physical quantity and the stimulus of the displacement, the rotation, the deformation, the vibration, or the like in accordance with contact or the motion of the finger, the human body, or the like with the device. Then, the haptic device measures the displacement, the rotation, the velocity, the acceleration, the pressure, or the force of the contact, the motion, or the like by using a photo device or a sensor that uses distortion, bending, resistance, conduction, capacitance, a sound wave, a laser, or the like.

The sensor signal includes the stimulus by the object and/or to the object that includes at least one of the position, the velocity, the acceleration, the shape, the displacement, the deformation, the oscillation, the rotation, the vibration, the force, the torque, the pressure, the humidity, the temperature, the viscosity, and the elasticity. Therefore, sense, or pain sense of haptic sensation such as button feeling, friction feeling, uneven feeling and presence or feel of virtual object is expressed.

The touch panel can have any type of a plane and a shape. An instantaneous change in the haptic can be presented digitally. Prior to the contact with the touch panel, motion in the vicinity of the touch panel is monitored. In this way, real-time responsiveness of the touch panel at the time of the contact therewith can be improved. The displacement, the rotation, the velocity, the acceleration, the pressure, or the force of the motion or the like is measured by a non-contact sensor or the like. In this way, a sensation of a shock and a sensation of a collision can be expressed.

A contact state of the finger that is related to the haptic can be expressed digitally. The contact state is monitored in terms of a contact angle, a contact area, moistness, and the like of the finger, and control that reflects such a state can be executed. Thus, a sensation of tracing can be expressed further precisely.

FIG. 263 to FIG. 271 each show a schematic view of a panel type module. The panel type module of the haptic device digitizes and presents digitalized expression of the sensation of the button, the sensation of friction, the sensation of the haptic obtained through the sensation of the irregularity, the sensation of pain, the sensation of existence of the virtual object, and the sensation of expression.

The panel type module of the haptic device presents the haptic and the illusory haptic that are the physical quantity and the stimulus of the displacement, the rotation, the deformation, the vibration, or the like in accordance with the contact, a contact position, or the motion of the finger, the human body, or the like with the module. Then, the panel type module of the haptic device presents the haptic and the illusory haptic that are the physical quantity and the stimulus of the displacement, the rotation, the deformation, the vibration, or the like in accordance with the contact, the contact position, or the motion and that represent spatial balance, intensity distribution, and temporal changes of the stimulus on the touch panel. Accordingly, a sense (phantom sensation) of the force, the object, movement of the existence, transmission, or a shape change that is generated through the spatial balance, the intensity distribution, and the temporal change of the stimulus can be presented. Thus, the object, and the sensation of the existence thereof can be presented on the rigid panel.

FIG. 264 shows a structure of the touch panel in which a photointerrupter is mounted on the base material.

The photointerrupter perceives a sensation of pressing (a sinking pitch, depth) of the button by detecting a distance and a change. Accordingly, when the sensation of the button is expressed digitally on the rigid panel, expression of sensations of texture and touch can instantaneously and adaptively be changed in accordance with use or preference.

FIG. 265, FIG. 266, and FIG. 267 each show a structure in which the actuators are attached to the touch panel in a hanging manner. FIG. 265 shows the structure in which the actuator is attached to the vicinity of the center of the touch panel in the hanging manner.

FIG. 266 shows the structure in which the actuators are attached to both ends of the touch panel in the hanging manner. In the structures shown in FIG. 265 and FIG. 266, a viscous/elastic material or the vibration buffer is preferably provided on a lateral wall between the touch panel and the wall.

FIG. 267 shows the structure in which the actuators are attached to both ends of the touch panel in the hanging manner. In the structure shown in FIG. 267, a low-friction material is preferably provided on the lateral wall between the touch panel and the wall.

With each of these structures, intensity of the sensation of the tactile force and an effect thereof can be increased. The structure shown in FIG. 265, 266 has a three-dimensional speaker mechanism in which the touch panel and the actuator are hung and that generates the vibration with six degrees of freedom. Accordingly, the physical quantity and the quantity of stimulus that are transmitted to the finger or the human body through the touch panel can be increased. In addition, in FIG. 267, the structure in which the actuators are attached to both of the ends of the touch panel is provided. In FIG. 267, the structure in which the inertial actuators are attached to both of the ends of the touch panel is provided. Accordingly, the physical quantity and the quantity of stimulus that are transmitted to the finger or the human body through the touch panel can be increased. The sensory quantity of the haptic is increased. Furthermore, a sensory quantity of pressing, the sinking pitch, and the sensation of depth are increased. Each of such structures can be applied to an IoT device. Regardless of selection of a mounting position, each of these modules can increase the sensory quantity and the efficiency.

FIG. 268 to FIG. 270 are schematic views of a touch panel module in which the liquid-crystal panel is incorporated into the touch panel. In a touch panel module shown in FIG. 268, the liquid-crystal panel is arranged in a pair of spatial portions of the module on both sides of the touch panel. Because the touch panel and each of the actuators are separated from each other, a video displayed on the liquid-crystal panel is neither distorted nor vibrated. The sensation of touch, the feel, and the sensation of existence of the object that is displayed on the liquid-crystal panel are presented. Thus, the sensation of touch and the feel of a three-dimensional object can be simulated by a two-dimensional model.

FIG. 269 and FIG. 270 are schematic views of a thin touch panel module. FIG. 269 shows the same arrangement as that in FIG. 268. In FIG. 270, the actuators are arranged on both of the ends of the touch panel. Thus, the module can be mounted in thin equipment, such as a smartphone.

FIG. 271 is a schematic view of a touch panel module system in which a screen is provided on the surface of the touch panel of the touch panel module shown in FIG. 268 to FIG. 270 and a projector is disposed above the screen. In this way, a function of presenting the digitized tactile force of the video can be realized. Video projection by the projector and the tactile force touch panel are controlled.

FIG. 272 is a schematic view in which a five sense information presenter is installed on the touch panel module shown in FIG. 268 to FIG. 271. With installation of the five sense information presenter, a sensation of reality that is obtained through use of five senses that includes sight, hearing, touch, and the like can be improved. In addition, the video, sound, the texture, smell, a taste, and the like that are obtained by using the five senses can be used. With a mutual effect of the tactile force information and the five sense information that either corresponds or does not correspond to (match) the tactile force information of the object, the sensory illusion can be enhanced or promoted. In addition, a sensation that does not exist in reality can be extended.

FIG. 273 is a schematic view of a multi-touch array unit. The multi-touch array unit presents the basic sensations of movement and motion. The multi-touch array unit executes phase control in a vibration direction in each of the panels and thus can express the sensations of movement and motion other than the simple vibration presented through a stimulus of movement. The multi-touch array unit also presents a sensation of rotation by the fixed panels.

FIG. 274 shows presentation of complicated sensations of motion. The phase control in the vibration direction is executed in each of the panels to control synthesis of sensations on a fingertip. In this way, a sensation of expansion, a sensation of constriction, and a sensation of twisting are presented. In addition, a sensation of deformation is presented on the fixed panels.

FIG. 275 shows presentation of complicated sensations of motion. The phase control in the vibration direction is executed in each of the panels, sensations in a perception layer and a recognition layer are synthesized, and a multi-touch sensation is synthesized and controlled. In this way, the sensation of expansion, the sensation of constriction, and the sensation of twisting are obtained, and the sensation of expansion and the sensation of constriction are presented. In addition, the sensation of deformation is presented on the fixed panels.

FIG. 276 shows presentation of the sensation of touch and the sensation of the force by a single device. Sensation synthesizing control is executed to simulate a different component (the sensation of touch or the sensation of the force) on each of the panels. The sensation of touch and the sensation of the force are simultaneously presented in the Z-direction by controlling driving of the sensation of pressure in the Z-direction by finger pressure and an X-Y vibration trigger. In this way, plural resonance peaks are realized.

FIG. 277 shows presentation of the sensation of touch and the sensation of the haptic by the single device. The different component (the touch sensation or the haptic sensation) is simulated on each of the panels. The touch sensation and the haptic sensation are simultaneously presented on the panels by controlling driving of the pressure sensation in the Z-direction by the finger pressure and the X-Y vibration trigger and by generating and controlling the pressure sensation in the Z-direction. In this way, the plural resonance peaks are realized.

FIG. 278 shows presentation of the touch sensation and the haptic sensation by the single device. The different component (the touch sensation or the haptic sensation) is simulated on each of the panels at different timing. However, a synthesizing method is not limited thereto. A mutual effect, such as mutual masking of the touch sensation and the haptic sensation, is avoided.

Consonants and vowels are presented.

In FIG. 279, induction patterns are controlled so as to control a forward vibration pattern and a rearward vibration pattern. FIG. 280 shows presentation of the touch sensation and the haptic sensation by the single device.

The different component (the touch sensation and the haptic sensation) is simulated on each of the panels at the different timing. However, a synthesizing method is not limited thereto in the case where there are portions in inductive patterns where the touch sensation and the haptic sensation overlap each other and where the touch sensation and the haptic sensation do not overlap each other.

The mutual effect, such as mutual masking of the touch sensation and the haptic sensation is avoided. The consonants and the vowels are presented.

FIG. 281 shows presentation of the touch sensation and the haptic sensation by the single device. A different component (the intensity, the oscillation, the frequency, the waveform, or the phase) is presented on each of the panels.

Due to a comparison of the waveforms, a difference in the waveforms, a phase difference, and the synergistic effect, a different sensation from the component is generated.

FIG. 282 shows presentation of the touch sensation and the haptic sensation of the haptic by the single device.

The different component (the intensity, the oscillation, the frequency, the waveform, or the phase) is presented on each of the panels.

Due to the comparison of the waveforms, the difference in the waveforms, the phase difference, and the synergistic effect, the different sensation from the component is generated.

In FIG. 283, a sensation of a mountaintop projection by the haptic is presented by generating a sensation of a button shape.

The oscillation of the panel is increased as the fingertip approaches the center thereof, and is reduced as the fingertip separates from the center thereof.

Sensations (a sensation of being pulled and a sensation of crossing) at the mountaintop are presented. Sensations of gradients and the pointed projection are presented on the panel. In FIG. 284, a sensation of a projected semicircular column by the haptic is presented. The stimulus, the intensity of the vibration, and the oscillation are controlled. The sensations (the sensation of being pulled and the sensation of crossing) are presented. In this way, the sensation of the projection is presented on the panel.

In FIG. 285, a sensation of a recessed gap by the haptic is presented. A sensation of a gap is presented by momentarily eliminating a sensation of resistance. In this way, the sensation of the recessed gap is presented on the panel.

In FIG. 286, movement of the finger (a sensation of connecting) between the buttons is controlled through control of the sensation of guidance. The stimulus, the intensity of the vibration, and the oscillation are controlled. In this way, the fingertip is not retained at a position between the buttons for a long time and is guided to the button. The movement of the finger is guided on the flat panel like an attractor on a potential.

A pointer is operated on the panel to move between the buttons. When the pointer moves out of a button region, the finger is guided to a next pointer. The oscillation of the panel is increased as the pointer approaches the center of a guidance section (and is reduced as the pointer separates therefrom). A direction of the sensation of the force is switched at the center of the guidance section.

In FIG. 287, the sensation of guidance between the buttons is controlled to present a sensation of an edge and a sensation of an end point. A clicking vibration is generated at an end of the guidance section. In this way, a sensation of existence of the edge, a floating sensation of the button can be obtained. The pointer is operated on the panel to move between the buttons. When the pointer moves out of the button region, the finger is guided to the next pointer. The oscillation of the panel is increased as the pointer approaches the center of the guidance section (and is reduced as the pointer separates therefrom). The direction of the sensation of the haptic is switched at the center of the guidance section.

In FIG. 288, the sensation of guidance is controlled to present the sensation of the edge of the button. A masking variation occurs in an edge portion. In this way, the sensation of existence of the edge and sensations of a step and a recess of the button on the flat panel are obtained. The pointer is operated on the panel to move between the buttons. When the pointer moves out of the button region, the finger is guided to the next pointer. The oscillation of the panel is increased as the pointer approaches the center of the guidance section (and is reduced as the pointer separates therefrom). The direction of the sensation of the force is switched at the center of the guidance section.

In FIG. 289, a stable haptic is presented by executing tactile force control of a slider. The pointer is operated on the panel to move between the buttons. When the pointer moves out of the button region, the pointer is guided to the button. The oscillation of the panel is increased as the pointer approaches the center of the guidance section (and is reduced as the pointer separates therefrom). The direction of the sensation of the haptic is switched at the center of the guidance section. In this way, a sensation of the slider is obtained.

In FIG. 290, the stable haptic is presented by executing the haptic control of the slider. A clicking vibration is generated at an end point of the slider. In this way, the sensation of the slider is obtained. FIG. 291 shows sensation control of the slider.

In FIG. 292, the stable tactile force during sweeping is presented. The haptic is controlled in accordance with a case with static friction and a case with kinetic friction. The stable haptic is presented in different control modes. In FIG. 293, the static haptic is presented by controlling (equalizing intervals of) the kinetic friction during sweeping. Coherent vibration phases by cutout vibrations are controlled. In this way, the stable haptic is presented in the different control modes.

In FIG. 294, the stable haptic is presented by controlling the static friction during sweeping. A virtual slider is moved by fixing the finger (or a portion of the human body) thereto. The virtual slider is fixed. Then, the finger slides thereon to cause reciprocal motion. In this way, the sensation of the slider is obtained. In FIG. 295, the stable haptic is presented by controlling the static friction during sweeping.

The virtual slider is moved by fixing the finger (or the portion of the human body) thereto. The virtual slider is fixed. Then, the finger slides thereon. Once the finger reaches an end, the movement is reset (the finger is lifted off from the surface of the panel). In this way, the sensation of the slider is obtained.

In FIG. 296, the stable haptic is presented by controlling the static friction during sweeping.

The virtual slider is moved by fixing the finger (or the portion of the human body) thereto. The virtual slider is fixed. Then, the finger slides thereon. Once the finger reaches the end, the movement is reset (the vibration is cut). In this way, the sensation of the slider is obtained. In FIG. 297, the stable haptic is presented by controlling the kinetic friction during sweeping.

The virtual slider is moved by fixing the finger (or the portion of the human body) thereto. The virtual slider is fixed. Then, the finger slides thereon. When the friction exceeds a tensile limit, contact fixation is eliminated. In this way, the sensation of the slider is obtained.

In the arbitrary waveform, various waveform patterns exist in accordance with the desired feel or feel. The arbitrary waveform are not limited the combination of linear increase or decrease, sinusoidal vibration, and basic frequency components, but also by arbitrary waveform design and the combination as if to create timbre and music of instruments with synthesizer various feel or feel can be expressed.

In FIG. 298, the sensation of pressing of the button is presented by controlling pressing of the button. The panel is oscillated (or vibrated) at the timing at which the press-down pressure during the increase exceeds the threshold 1 and the timing at which the press-down pressure during the reduction exceeds the threshold 2. The stiffness of the button is expressed by the values of the thresholds, the oscillation of the panel, and the frequency. Accordingly, even with the panel that is not dented, the sensation of pressing depth is felt. That is, the sensation of the dent can be presented without physical pressing.

In FIG. 299, the sensation of pressing of the button is controlled and presented. Plural thresholds are set to express a sensation of half pressing such as of a shutter release button, a sensation of holding a focus of a camera, and the like.

In FIG. 300, a sensation of pressing of the shutter release button is controlled and presented. Plural thresholds are set to express the sensation of half pressing such as of the shutter release button, the sensation of holding the focus of the camera, and the like.

In FIG. 301, the sensation of pressing of the button is controlled and presented. Sensations of pressing and releasing are separated (no sensation of releasing in the first time, and the sensation of releasing in the second time). In FIG. 303, the sensation of pressing of the button is subjected to latch control and presented. The sensations of pressing and releasing are separated (no sensation of releasing in the first time, and the sensation of releasing in the second time).

In FIG. 304, notch pulse thresholds are controlled to have equal intervals. In this way, a sensation of cutting a mille-feuille or a chocolate-covered ice cream is obtained. In FIG. 305, the notch pulse thresholds are controlled to have unequal intervals. In FIG. 306, the notch pulse thresholds are controlled to have equal intervals. In this way, the sensation of cutting the mille-feuille or the chocolate-covered ice cream is obtained. In FIG. 307, the notch pulse thresholds are controlled to have unequal intervals. In this way, the sensation of cutting the mille-feuille or the chocolate-covered ice cream is obtained.

In FIG. 308, the notch pulse thresholds are controlled to have equal intervals. In this way, the sensation of cutting the mille-feuille or the chocolate-covered ice cream is obtained.

In FIG. 309, the notch pulse thresholds are controlled to have unequal intervals. In this way, the sensation of cutting the mille-feuille or the chocolate-covered ice cream is obtained.

In FIG. 310, a button with the sensation of pressing is subjected to hysteresis control.

The panel is oscillated at the timing at which the press-down pressure during the increase exceeds the threshold 1 and the timing at which the press-down pressure during the reduction exceeds the threshold 2. The stiffness of the button is expressed by the values of the thresholds, the oscillation of the panel, and the frequency.

In FIG. 311, the button with the sensation of pressing is subjected to finger pressure function control. The panel is oscillated at the timing at which the press-down pressure during the increase exceeds the threshold 1 and the timing at which the press-down pressure during the reduction exceeds the threshold 2. The stiffness of the button is expressed by the values of the thresholds, the oscillation of the panel, and the frequency.

In FIG. 312, application of a waveform is controlled. The waveform adds oscillation to the panel at the timing at which the press-down pressure during the increase exceeds the threshold 1 and the timing at which the press-down pressure during the reduction exceeds the threshold 2. The stiffness of the button is expressed by the values of the thresholds, the oscillation of the panel, and the frequency.

In FIG. 313, the button with the sensation of pressing is pressed, and a vibration surface (the phase) thereof is three-dimensionally controlled in accordance with the thresholds.

The panel is oscillated at the timing at which the press-down pressure during the increase exceeds the threshold 1 and the timing at which the press-down pressure during the reduction exceeds the threshold 2. The stiffness of the button is expressed by the values of the thresholds, the oscillation of the panel, and the frequency.

In FIG. 314, the panel is oscillated at the timing at which the press-down pressure during the increase exceeds the threshold 1 and the timing at which the press-down pressure during the reduction exceeds the threshold 2, and the button with the sensation of pressing is controlled in accordance with a situation. The stiffness of the button is expressed by the values of the thresholds, the oscillation of the panel, and the frequency.

In FIG. 315, the panel is oscillated at the timing at which the press-down pressure during the increase exceeds the threshold 1 and the timing at which the press-down pressure during the reduction exceeds the threshold 2, and the button with the sensation of pressing is controlled in accordance with the situation. The stiffness of the button is expressed by the values of the thresholds, the oscillation of the panel, and the frequency.

In FIG. 316, the button with the sensation of pressing is controlled in accordance with a time pattern. In FIG. 317, the notch pulse thresholds are controlled to have equal intervals.

In FIG. 318, the notch pulse thresholds are controlled to have equal intervals, and a panel oscillation is controlled.

In FIG. 319, the notch pulse thresholds are subjected to the waveform control so as to have equal intervals.

In FIG. 320, the notch pulse thresholds are subjected to masking control so as to have equal intervals.

In FIG. 321, the button with the sensation of pressing is subjected to kinetic and static friction control, and the panel is oscillated at the timing at which the press-down pressure during the increase exceeds the threshold 1 and the timing at which the press-down pressure during the reduction exceeds the threshold 2. The stiffness of the button is expressed by the values of the thresholds, the oscillation of the panel, and the frequency.

In FIG. 322, the button with the sensation of pressing is subjected to the phase control, and the panel is oscillated at the timing at which the press-down pressure during the increase exceeds the threshold 1 and the timing at which the press-down pressure during the reduction exceeds the threshold 2. The stiffness of the button is expressed by the values of the thresholds, the oscillation of the panel, and the frequency.

In FIG. 323, equal pressing intervals are controlled, and the panel is oscillated only at the timing at which the press-down pressure during the increase exceeds each of plural thresholds. A high frequency is used for the oscillation of the notch. A notch button is realized in combination with the button.

In FIG. 324, unequal pressing intervals are controlled, and the panel is oscillated only at the timing at which the press-down pressure during the increase exceeds each of the plural thresholds. The high frequency is used for the oscillation of the notch. The notch button is realized in combination with the button.

In FIG. 325, threshold equal intervals are controlled, and the panel is oscillated only at the timing at which the press-down pressure during the increase exceeds each of the plural thresholds. The high frequency is used for the oscillation of the notch. The notch button is realized in combination with the button.

In FIG. 326, a haptic dial is controlled by a control function. The vibration direction is controlled for each position phase. The vibration can be controlled in a three-dimensional direction. In this way, various feels of the dial can be realized. In addition, a realistic feel of the dial is presented on the flat panel without a need of a physical/analog dial mechanism.

In FIG. 327, the pointer is operated on the panel to rotate the dial with a sensation of acceleration. The panel is oscillated in parallel with a tangent of the dial, and the sensation of acceleration is thereby realized. For sliding expression, the dial is controlled to present the sensation of the force in a rotational direction thereof.

In FIG. 328, the pointer is operated on the panel to rotate the dial with the sensation of resistance. The panel is oscillated in a manner to be orthogonal to the tangent of the dial, and the sensation of resistance is thereby realized.

In FIG. 329, the pointer is operated on the panel to rotate the dial with a sensation of horizontal acceleration. The panel is oscillated in the manner to be orthogonal to the tangent of the dial, and the sensation of horizontal acceleration is thereby realized.

In FIG. 330, the pointer is operated on the panel to rotate the dial with a variable feel. The panel is oscillated in the manner to be orthogonal to the tangent of the dial, and the variable feel is thereby realized. In this way, various feels are generated by changing the phase (the vibration surface) at each position.

In FIG. 331, the pointer is operated on the panel to rotate the dial with a random sensation. The panel is oscillated in the manner to be orthogonal to the tangent of the dial, and the random sensation is thereby realized.

In FIG. 332, the clicking vibration is generated in constant position phases to realize the sensation of clicking. In this way, a feel of a loader/encoder, a sensation of a digital dial, and a sensation of a volume knob are realized on the flat panel.

In FIG. 333, a sensation of a circumferential guiding operation of volume on a circumference of the volume knob, a sensation of the finger held in the circumference or moving on the circumference, and a sensation of a circumferential operation that is obtained at a time when an actual rotary volume knob is rotated are each presented as a centripetal tactile force in constant position phases.

In FIG. 334, the sensation of motion can be expressed by presenting the sensation of the circumferential operation of the volume knob, a sensation of circumferential guidance at the time when the actual rotary volume knob is rotated, and the sensation of resistance.

The centripetal tactile force and the resistant tactile force are presented either alternatively or temporally and exclusively in the constant position phases. At the same time, the sensation of the circumferential operation that is obtained at the time when the volume knob is rotated is realized.

In FIG. 335, the haptic volume adjustment and confirmation operations are expressed.

The clicking vibration is presented in the constant position phases. In this way, a sensation of the rotary volume knob is realized by the clicking vibration, and the sensation of pressing of the button is realized by the clicking vibration for confirmation. Thus, sensations of the volume operation, confirmation, and switching are realized on the flat panel.

In FIG. 336, variations of the feels of the tactile force dial are increased. The vibration direction and a vibration method are controlled by each of the position phases. The vibration can be controlled in the three-dimensional direction. Various feels and touches of the dial are realized, so as to differently use presentations of the directions, each of which calls the operator's attention. The various feels and touches of the dial are appropriately presented at appropriate positions on the open panel at appropriate timing. The feel and the touch are controlled at the appropriate timing in accordance with the situation.

In FIG. 337, when size and/or the shape of the device is changed, the haptic is nonlinearly changed by weight. Perceived sound pressure and perceived torque intensity are set to be variable. In FIG. 338, the threshold and a quantity of perception of the haptic are changed by the device size. The perceived torque intensity is obtained by subtracting the weight from the torque. The optimum quantity of perception differs by the device size.

In FIG. 339, the texture includes the pressure sensation (a contact sensation); pressure, hotness/coldness, the sensation of touch; micro-time structure, the sensation of the force; macro-time structure, the sensation of the vibration; the frequency. FIG. 340 shows database of a texture structure in which numerous types of the texture are expressed in macro-time and micro-time structures.

In FIG. 341, the waveforms are controlled, so as to control a two-dimensional oscillation direction. An X-axis waveform and a Y-axis waveform are synthesized to generate oscillation on an arbitrary axis of the panel surface.

In FIG. 342, the numerous touch panels are arranged in the array, and the actuator is provided for each of the touch panels. In this way, the position in the vibration direction can be controlled on each of the panels. The sensation of advancing, a sensation of retreating, a sensation of shearing and tearing, a sensation of enlarging and pinching, a sensation of grasping, and the sensation of rotation can be realized. An intuitive mouse operation can be realized in a subtle level.

FIG. 343 shows a system that uses an illusory force inducing function generator to measure a characteristic of an individual.

FIG. 344 is a flowchart that illustrates an actuator control method.

In FIG. 345 to FIG. 347, an application examples and the results are present.

In FIG. 345, profiling of the individual is realized by using the dial and the pointer. An individual ID, a psychological state, a health state, and a degree of fatigue are estimated through an analysis of operation profile and physiological information like graphoanalysis.

In FIG. 346, the numerous touch panels are disposed in the array, and the actuator is provided for each of the touch panels. In this way, the position in the vibration direction can be controlled on each of the panels. The sensation of advancing, the sensation of retreating, the sensation of shearing and tearing, the sensation of enlarging and pinching, the sensation of grasping, and the sensation of rotation can be realized. In this way, palpation training can be realized by providing a state of a human body (solidness, softness, a shape, and the like) such as an organ or the like in addition to the video, a way of moving the fingertips, and a way of applying the force.

In FIG. 347, a remote synthesizing operation can be realized by connecting virtual reality environment generators via communication. Despite a flat panel of a information terminal device or the like, the operation feeling of object such as button, slider, dial, switch, operation panel etc. can be realistically obtained. The tactile force sense presentation device can present a various feelings.

Therefore, the haptic sense presentation device can use stationary, note, pen, home electrical, appliance, signaler, kiosk terminal, wall, table, chair, massager, ride, wheel chair, dish, shaker, simulator (surgery, driving, massager, sport, walking, musical instrument, craft, painting, art). An added value such as tactile sensation and feel can be added to products such as sense of plug-in, filling, depth, returned, floal, convergence, reverberation, direction sense, zubusubu, dardness, soft, slippery, stuffed, slimy, rough, bumpy, tiny, here and there, drudgeru, and bibunyuu.

A man-machine interface equipped a equipment used in the field of virtual reality, in the field of game, amusement, entertainment, or mobile communication, information terminal, navigation device, mobile information terminal device, in the field of automobile, robot, in the field of medical and welfare, in the field of space can be realized.

In the field of VR or information appliance or information appliance, tactile sensation information such as sensation and feeling is presented to person via man-machine interface according to the invention, or by applying resistance force or reaction force to person to limit a movement.

A shock due to existence of object and clooision in the virtual space and real space or operational feeling of the device can be presented. By installing a man-machine interface in mobile phone, or an information terminal device, it is possible to realize a various kinds of instruction and guidance which have not been conventionally seen through the operator skin.

Despite the flat or plane panel, it is possible to obtain a realistic feeling of operation of button, slider, switch, operation panel, and the like. As a variety of sensations are presented, you can use it for stationer, notebook, pen, home appliance, signage, kiosk terminal, wall, table, chair, massager, vehicle, robot, wheel chair, dishware, shaker, simulator (surgery, driving, massage, sports, walking, musical instruments, craft, painting, art). Feeling of plug-in, feeling of entering, feeling of depth, feeling of floating, convergence feeling, reverberation feeling, sense of direction, sense of zubuzub, uneven feeling, scratchy feeling, crisp crash feeling, crisp feeling, unyubun feeling is applied to products as added value.

The invention claimed is:

1. A man machine interface with a haptic information presenting system comprising:

an object, the object being an actual object or a virtual object;

a sensor that detects a stimulus by the object and/or to the object including at least one of a position, a velocity, an acceleration, a shape, a displacement, a deformation, an oscillation, a rotation, a vibration, a force, a torque, a pressure, a humidity, a temperature, a viscosity, and an elasticity;

a haptic presenting device that applies a sensory characteristic and/or a sensory illusion of a member to the object, so as to present tactile force and/or a haptic information to the member as if the member actually operates the object; and a haptic presentation controller that controls the haptic presenting device on the basis of the stimulus from the sensor, wherein the haptic presentation controller uses that the sensory characteristic which indicates a relationship between a quantity of stimulus applied to the member and a sensory quantity comprises nonlinear and/or the sensory illusion to control the stimulus and present the tactile force and/or the haptic information, the sensory characteristic includes at least one of the quantity of stimulus that is provided to the member and the quantity of stimulus that is generated through an operation by the member and the sensory quantity that is presented to the member, and the sensory quantity may not exist physically by utilizing the illusion and/or the sensory characteristic, and the haptic presenting device presents the stimulus by the object and/or to the object, controls the stimulus that is applied to the object in accordance with the operation by the member, and thereby generates the haptic information.

2. The man machine interface according to claim 1, wherein a touch panel is divided into plural units and disposed in at least one of an array, dots, and pixels, and the plural units of the touch panel comprise to be independently and/or dependently controlled.

3. The man machine interface according to claim 1, wherein the object is the touch panel, and at least one section of the touch panels generates a different sensation of touch and/or a different sensation of a tactile force.

4. The man machine interface according to claim 1, wherein the member comprises an operating member or a member to be operated.

5. The man machine interface according to claim 1, wherein the man machine interface comprises at least one of virtual reality (VR) equipment, game equipment, navigation equipment, or phone equipment.

6. A man machine interface with a haptic information presenting system comprising:

an object, the object being an actual object or a virtual object;

a sensor that detects a stimulus by the object and/or to the object including at least one of a position, a velocity, an acceleration, a shape, a displacement, a deformation, an oscillation, a rotation, a vibration, a force, a torque, a pressure, a humidity, a temperature, a viscosity, and an elasticity;

a haptic presenting device that applies a sensory characteristic and/or a sensory illusion of a member to the object, so as to present to the member as if the member actually operates the object; and a haptic presentation controller that controls a tactile force and/or a haptic sensation on the basis of the stimulus from the sensor, wherein the haptic presentation controller uses that the sensory characteristic which indicates a relationship between a quantity of stimulus applied to the member and a sensory quantity comprises nonlinear and/or the sensory illusion to control the stimulus and present the tactile force and/or the haptic information, the sensory characteristic includes at least one of the quantity of stimulus that is provided to the member and the quantity of stimulus that is generated through an operation by the member and the sensory quantity that is presented to the member, wherein the sensory quantity may not exist physically by utilizing the illusion and/or the sensory characteristic, and the haptic presenting device presents at least one of the oscillation, the displacement, and the deformation to the object.

7. The man machine interface according to claim 6, wherein a touch panel is divided into plural units and disposed in at least one of an array, dots, and pixels, and the plural units of the touch panel comprise to be independently and/or dependently controlled.

8. The man machine interface according to claim 6, wherein the haptic presenting device presents the tactile force and/or haptic sensation in accordance with the oscillation, the displacement, and/or the deformation generated in the object.

9. The man machine interface according to claim 6, wherein the haptic presenting device performs six-dimensional guidance of the object in terms of at least one of the oscillation, the displacement, and the deformation for at least one of each position, each phase, and each time.

10. The man machine interface according to claim 6, wherein the haptic presenting device generates at least one of the oscillation, the displacement, and the deformation at right angles, in parallel with, or at an arbitrary angle with respect to a tangent of the object.

11. The man machine interface according to claim 6, wherein the member comprises an operating member or a member to be operated.

12. The man machine interface according to claim 6, wherein the man machine interface comprises at least one of virtual reality (VR) equipment, game equipment, navigation equipment, or phone equipment.

13. A man machine interface with a haptic information presenting system comprising:

an object, the object being an actual object or a virtual object;

a sensor that detects a stimulus by the object and/or to the object including at least one of a position, a velocity, an acceleration, a shape, a displacement, a deformation, an oscillation, a rotation, a vibration, a force, a torque, a pressure, a humidity, a temperature, a viscosity, and an elasticity;

a haptic presenting device that applies a sensory characteristic and/or a sensory illusion of a member to the object, so as to present a tactile force and/or a haptic sensation to the member as if the member actually operates the object; and a haptic presentation controller that controls the tactile force and/or the haptic sensation on the basis of the stimulus from the sensor, wherein the haptic presentation controller uses that the sensory characteristic which indicates a relationship between a quantity of stimulus applied to a member and a sensory quantity comprises nonlinear and/or the sensory illusion to control the stimulus and present a tactile force and/or a haptic information, the haptic presentation controller uses the sensory characteristic which a relationship between a quantity of stimulus applied to a member and a sensory quantity comprises nonlinear and/or the sensory illusion to control the stimulus and present the tactile force and/or the haptic information, the sensory characteristic includes at least one of the quantity of stimulus that is provided to the member and the quantity of stimulus that is generated through an operation by the member and the sensory quantity may not exist physically by utilizing the illusion and/or the sensory characteristic, and the haptic presenting device is a sense synthesizing and/or guiding device that synthesizes sensations of guidance, and the sense synthesizing and/or guiding device generates at least one of a sensation of pressure, a sensation of force, and the sensory illusion to the object.

14. The man machine interface according to claim 13, wherein the member comprises an operating member or a member to be operated.

15. The man machine interface according to claim 13, wherein the member comprises a person or an object.

16. The man machine interface according to claim 11, wherein the man machine interface comprises at least one of virtual reality (VR) equipment, game equipment, navigation equipment, or phone equipment.

* * * * *